US007365824B2

(12) United States Patent
Byun et al.

(10) Patent No.: US 7,365,824 B2

(45) Date of Patent: Apr. 29, 2008

(54) SYSTEM AND METHOD FOR MANUFACTURING LIQUID CRYSTAL DISPLAY DEVICES

(75) Inventors: Yong Sang Byun, Kumi-shi (KR); Moo Yeol Park, Taegu-kwangyokshi (KR); Sung Su Jung, Taegu-kwangyokshi (KR); Sung Chun Kang, Kumi-shi (KR); Jong Woo Kim, Kyongsangbuk-do (KR); Young Hun Ha, Kumi-shi (KR); Sang Seok Lee, Taegu-Kwangyokshi (KR); Sang Ho Park, Pusan-kwangyokshi (KR); Hun Jun Choo, Kumi-shi (KR); Hyug Jin Kweon, Kumi-shi (KR); Kyung Su Chae, Kumi-shi (KR); Hae Joon Son, Kyongsangbuk-do (KR); Sang Sun Shin, Pohang-shi (KR); Jong Go Lim, Kyongsangbuk-do (KR); Wan Soo Kim, Arryang-shi (KR); Young Hun Jeung, Youngcheon-shi (KR); Joung Ho Ryu, Kumi-shi (KR); Ji Heum Uh, Seoul (KR); Im Su Lee, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 7 days.

(21) Appl. No.: 11/002,888

(22) Filed: Dec. 3, 2004

(65) Prior Publication Data

US 2005/0122463 A1 Jun. 9, 2005

Related U.S. Application Data

(63) Continuation of application No. 10/184,096, filed on Jun. 28, 2002, now Pat. No. 7,295,279.

(51) Int. Cl.
*G02F 1/13* (2006.01)

(52) U.S. Cl. ........................ 349/187; 349/189; 349/190

(58) Field of Classification Search ................ 349/187, 349/189, 190
See application file for complete search history.

(56) References Cited

U.S. PATENT DOCUMENTS 3,978,580 A 9/1976 Leupp et al.
4,094,058 A * 6/1978 Yasutake et al. ........... 29/592.1

(Continued)

FOREIGN PATENT DOCUMENTS

EP 1003066 A1 5/2000
JP 51-065656 6/1976

(Continued)

*Primary Examiner*—Lisa Caputo
(74) *Attorney, Agent, or Firm*—McKenna Long & Aldridge LLP

(57) ABSTRACT

A system for fabricating a liquid crystal display using liquid crystal dropping and a method of fabricating a liquid crystal display using the same includes a liquid crystal forming line dropping liquid crystals on the first substrate, a sealant forming line forming the sealant on the second substrate, and a bonding and hardening line bonding the two substrates to each other and hardening the sealant, printing a sealant, bonding the substrates each other, and hardening the sealant and an inspection process line of cutting the bonded substrates into panel units and grinding and inspecting the unit panels. The present invention includes the processes of dropping LC on a first substrate using a dispenser, forming a main UV hardening sealant on a second substrate, bonding the first and second substrates to each other in a vacuum state, UV hardening the main UV hardening sealant, cutting the bonded substrates into cell units, grinding the cut substrates, and finally inspecting the grinded substrates.

3 Claims, 267 Drawing Sheets

U.S. PATENT DOCUMENTS

| | | | | |
|---|---|---|---|---|
| 4,653,864 | A | | 3/1987 | Baron et al. |
| 4,691,995 | A | | 9/1987 | Yamazaki et al. |
| 4,775,225 | A | | 10/1988 | Tsuboyama et al. |
| 5,247,377 | A | | 9/1993 | Omeis et al. |
| 5,263,888 | A | | 11/1993 | Ishihara et al. |
| 5,379,139 | A | | 1/1995 | Sato et al. |
| 5,406,989 | A | | 4/1995 | Abe |
| 5,499,128 | A | | 3/1996 | Hasegawa et al. |
| 5,507,323 | A | | 4/1996 | Abe |
| 5,511,591 | A | | 4/1996 | Abe |
| 5,539,545 | A | | 7/1996 | Shimizu et al. |
| 5,548,429 | A | | 8/1996 | Tsujita |
| 5,642,214 | A | | 6/1997 | Ishii et al. |
| 5,680,189 | A | | 10/1997 | Shimizu et al. |
| 5,742,370 | A | | 4/1998 | Kim et al. |
| 5,757,451 | A | | 5/1998 | Miyazaki et al. |
| 5,828,435 | A | * | 10/1998 | Kato et al. .................. 349/190 |
| 5,852,484 | A | | 12/1998 | Inoue et al. |
| 5,854,664 | A | | 12/1998 | Inoue et al. |
| 5,861,932 | A | | 1/1999 | Inata et al. |
| 5,875,922 | A | | 3/1999 | Chastine et al. |
| 5,898,041 | A | * | 4/1999 | Yamada et al. ............... 522/81 |
| 5,952,678 | A | | 9/1999 | Ashida |
| 5,956,112 | A | | 9/1999 | Fujimori et al. |
| 6,001,203 | A | | 12/1999 | Yamada et al. |
| 6,011,609 | A | * | 1/2000 | Kato et al. .................. 349/190 |
| 6,016,178 | A | | 1/2000 | Kataoka et al. |
| 6,016,181 | A | | 1/2000 | Shimada |
| 6,055,035 | A | | 4/2000 | von Gutfeld et al. |
| 6,163,357 | A | | 12/2000 | Nakamura |
| 6,219,126 | B1 | | 4/2001 | von Gutfeld |
| 6,226,067 | B1 | | 5/2001 | Nishiguchi et al. |
| 6,236,445 | B1 | | 5/2001 | Foschaar et al. |
| 6,304,306 | B1 | | 10/2001 | Shiomi et al. |
| 6,304,311 | B1 | | 10/2001 | Egami et al. |
| 6,337,730 | B1 | | 1/2002 | Ozaki et al. |
| 6,414,733 | B1 | | 7/2002 | Ishikawa et al. |
| 6,531,329 | B2 | * | 3/2003 | Asakura et al. ............... 438/30 |
| 2001/0021000 | A1 | | 9/2001 | Egami |

FOREIGN PATENT DOCUMENTS

| | | |
|---|---|---|
| JP | 57038414 | 3/1982 |
| JP | 57088428 | 6/1982 |
| JP | 58027126 | 2/1983 |
| JP | 59-057221 | 4/1984 |
| JP | 59-195222 | 11/1984 |
| JP | 60-111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 05-154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |
| JP | 6160871 | 6/1994 |
| JP | 06-235925 | 8/1994 |
| JP | 06265915 | 9/1994 |
| JP | 06-313870 | 11/1994 |
| JP | 07-084268 | 3/1995 |
| JP | 07128674 | 5/1995 |
| JP | 07181507 | 7/1995 |
| JP | 08-101395 | 4/1996 |
| JP | 08095066 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 09-061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10-177178 | 6/1998 |
| JP | 10221700 | 8/1998 |
| JP | 10282512 | 10/1998 |
| JP | 10-333157 | 12/1998 |
| JP | 10-333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11-133438 | 5/1999 |
| JP | 11-142864 | 5/1999 |
| JP | 11174477 | 7/1999 |
| JP | 11212045 | 8/1999 |
| JP | 11-248930 | 9/1999 |
| JP | 11-326922 | 11/1999 |
| JP | 11344714 | 12/1999 |
| JP | 2000-002879 | 1/2000 |
| JP | 2000029035 | 1/2000 |
| JP | 2000-056311 | 2/2000 |
| JP | 2000-066165 | 3/2000 |
| JP | 2000-137235 | 5/2000 |
| JP | 3000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-005401 | 1/2001 |
| JP | 2001-005405 | 1/2001 |
| JP | 2001-013506 | 1/2001 |
| JP | 2001-033793 | 2/2001 |
| JP | 2001-042341 | 2/2001 |
| JP | 2001-051284 | 2/2001 |
| JP | 2001-066615 | 3/2001 |
| JP | 2001-091727 | 4/2001 |
| JP | 2001-117109 | 4/2001 |
| JP | 2001117105 | 4/2001 |
| JP | 2001-133745 | 5/2001 |
| JP | 2001-133799 | 5/2001 |
| JP | 2001133794 | 5/2001 |
| JP | 2001142074 | 5/2001 |
| JP | 2001147437 | 5/2001 |
| JP | 2001-166272 | 6/2001 |
| JP | 2001-166310 | 6/2001 |
| JP | 2001154211 | 6/2001 |
| JP | 2001-183683 | 7/2001 |
| JP | 2001-209052 | 8/2001 |
| JP | 2001-209060 | 8/2001 |
| JP | 2001-222017 | 8/2001 |
| JP | 2001-235758 | 8/2001 |
| JP | 2001-215459 | 9/2001 |

| | | |
|---|---|---|
| JP | 2001255542 | 9/2001 |
| JP | 2001264782 | 9/2001 |
| JP | 2001-201750 | 10/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001330840 | 11/2001 |
| JP | 2001-356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |
| KR | 2000-0035302 A1 | 6/2000 |

* cited by examiner hardening rate of sealant (%)

| range of sealant Δx (μm) | tilt angle θ (°) | | | | |
|---|---|---|---|---|---|
| | 0 | 15 | 30 | 45 | 60 |
| 0 ~ 260 | 56.8 | 77.8 | 87.7 | 98.7 | 99.1 |
| 260 ~ 520 | 38.4 | 78.7 | 81.7 | 93.7 | 98.2 |

SYSTEM AND METHOD FOR MANUFACTURING LIQUID CRYSTAL DISPLAY DEVICES

This application is a continuation of U.S. application Ser. No.: 10/184,096 filed Jun. 28, 2002, now U.S. Pat. No. 7,295,279, which is hereby incorporated by reference for all purposes as if fully set forth herein.

BACKGROUND OF THE INVENTION

1. Field of the Invention

The present invention relates to disposing liquid crystal within a liquid crystal display panel.

2. Description of the Related Art

Portable electronic devices such as mobile phones, personal digital assistants (PDA), and notebook computers often require thin, lightweight, and efficient flat panel displays. There are various types of flat panel displays, including liquid crystal displays (LCD), plasma display panels (PDP), field emission displays (FED), and vacuum fluorescent displays (VFD). Of these, LCDs have the advantages of being widely available, easy to use, and possessing superior image quality.

With characteristic advantages of excellent image quality, lightness, slim size, and low power consumption, LCD, one of the panel devices, has been widely used so as to replace CRT (cathode ray tube) as a mobile image display. Besides the mobile usage for a monitor of a notebook computer, LCD is also developed as a monitor for computer, television, or the like so as to receive and display broadcasting signals.

In spite of various technical developments to perform a role as an image display in various fields, an effort to improve image quality of LCD inevitably becomes contrary to the above characteristics and advantages in some aspects. In order to use LCD for various fields as a general image display, the development of LCD depends on the facts that the characteristics of lightness, slim size, and low power consumption are maintained and that image of high quality including definition, brightness, large-scaled area, and the like is realized properly.

Such an LCD is mainly divided into a liquid crystal display panel displaying an image thereon and a driving unit applying a drive signal to the liquid crystal display panel, in which the liquid crystal display panel includes first and second glass substrates bonded to each other so as to have a predetermined space therebetween and a liquid crystal layer injected between the first and second glass substrates.

The LCD device displays information based on the refractive anisotropy of liquid crystal. As shown in FIG. 1, an LCD 10000 includes a lower substrate 10005, an upper substrate 10003, and a liquid crystal layer 10007 that is disposed between the lower substrate 10005 and the upper substrate 10003. The lower substrate 10005 includes an array of driving devices and a plurality of pixels (not shown). The individual driving devices are usually thin film transistors (TFT) located at each pixel. The upper substrate 10003 includes color filters for producing color. Furthermore, a pixel electrode and a common electrode are respectively formed on the lower substrate 10005 and on the upper substrate 10003. Alignment layers are formed on the lower substrate 10005 and on the upper substrate 10003. The alignment layers are used to uniformly align the liquid crystal layer 10007.

The lower substrate 10005 and the upper substrate 10003 are attached using a sealing material 10009. In operation, the liquid crystal molecules are initially oriented by the alignment layers, and then reoriented by the driving device according to video information so as to control the light transmitted through the liquid crystal layer to produce an image.

The fabrication of an LCD device requires the forming of driving devices on the lower substrate 10005, the forming of color filters on the upper substrate 10003, and disposing liquid crystal in a cell process (described subsequently) between the lower substrate 10005 and the upper substrate 10003. Those processes as typically performed in the prior art will be described with reference to FIG. 2.

Initially, in step S11101, a plurality of perpendicularly crossing gate lines and data lines are formed on the lower substrate 10005, thereby defining pixel areas between the gate and data lines. A thin film transistor that is connected to a gate line and to a data line is formed in each pixel area. Also, a pixel electrode that is connected to the thin film transistor is formed in each pixel area. This enables driving of the liquid crystal layer according to signals applied through the thin film transistor.

In step S11104, R (Red), G (Green), and B (Blue) color filter layers (for reproducing color) and a common electrode are formed on the upper substrate 10003. Then, in steps S11102 and S11105, alignment layers are formed on the lower substrate 10005 and on the upper substrate 10003. The alignment layers are rubbed to induce surface anchoring (thereby establishing a pretilt angle and an alignment direction) for the liquid crystal molecules. Thereafter, in step S11103, spacers for maintaining a constant, uniform cell gap is dispersed onto the lower substrate 10005.

Then, in steps S11106 and S11107, a sealing material is applied to outer portions such that the resulting seal has a liquid crystal injection opening. The opening is used to inject liquid crystal. The upper substrate 10003 and the lower substrate 10005 are then attached together by compressing the sealing material.

While the foregoing has described forming a single panel area, in practice it is economically beneficial to form a plurality of unit panel areas. To this end, the lower substrate 10005 and the upper substrate 10003 are large glass substrates that contain a plurality of unit panel areas, each having a driving device array or a color filter array that is surrounded by sealant having a liquid crystal injection opening. To isolate the individual unit panels, in step S11108 the assembled glass substrates are cut into individual unit panels. Thereafter, in step S11109 liquid crystal is injected into the individual unit panels by way of the liquid crystal injection openings, which are then sealed. Finally, in step S11110 the individual unit panels are tested.

As described above, in the prior art liquid crystal is injected through a liquid crystal injection opening. Injection of the liquid crystal was usually pressure induced. FIG. 3 shows a prior art device for injecting liquid crystal. As shown, a container 10012 that contains liquid crystal, and a plurality of individual unit panels 10001 are placed in a vacuum chamber 10010 such that the individual unit panels 10001 are located above the container 10012. The vacuum chamber 10010 is connected to a vacuum pump that generates a predetermined vacuum. A liquid crystal display panel moving device (not shown) moves the individual unit panels 10001 into contact with the liquid crystal 10014 such that each injection opening 10016 is in the liquid crystal 10014.

When the pressure within the chamber 10010 is increased by inflowing nitrogen gas ($N_2$), the liquid crystal 10014 is injected into the individual unit panels 10001 through the liquid crystal injection openings 10016. After the liquid crystal 10014 entirely fills the individual unit panels 10001, the liquid crystal injection opening 10016 of each individual unit panel 10001 is then sealed by a sealing material.

While the prior art technique described above is generally successful, there are problems with pressure injecting liquid crystal 10014. First, the time required for the liquid crystal 10014 to inject into the individual unit panels 10001 is rather long. Generally, the gap between the driving device array substrate and the color filter substrate is very narrow, on the order of micrometers. Thus, only a very small amount of liquid crystal 10014 is injected per unit time. For example, it takes about 8 hours to inject liquid crystal 10014 into an individual 15-inch unit panel 10001. Increasing the size of the individual unit panel 10001, say to a 24-inch unit panel, dramatically increases the already excessive time (to more than twenty hours) that is required to inject the liquid crystal.

Second, the prior art technique requires an excessive amount of liquid crystal 10014. For example, consider that only a small amount of liquid crystal 10014 in the container 10012 is actually injected into the individual unit panels 10001. However, since liquid crystal 10014 exposed to air or to certain other gases can be contaminated by chemical reaction, the remaining liquid crystal 10014 in the container 10012 should be discarded. This increases liquid crystal fabrication costs.

Therefore, an improved method and apparatus for applying a liquid crystal between substrates would be beneficial.

SUMMARY OF THE INVENTION

Accordingly, the present invention is directed to a system and method for manufacturing liquid crystal display devices from large mother substrate panels that substantially obviates one or more of the problems due to limitations and disadvantages of the related art.

An advantage of the present invention is to provide a system for fabricating a liquid crystal display panel using liquid crystal dropping and a method of fabricating a liquid crystal display panel using the same enabling a reduced processing time and improved productivity.

An advantage of the present invention is to provide a method of dispensing liquid crystal onto a liquid crystal panel mother substrate before bonding of a second mother substrate panel thereto.

Another advantage of the present invention is to provide improved dispensing devices for dispensing a precise amount of liquid crystal onto a substrate.

Another advantage of the present invention is to provide a pattern of dispensing or dropping liquid crystal drops onto a substrate.

Another advantage of the present invention is to provide a pattern of applying sealant to a substrate to facilitate filling a cell gap between first and second substrates of a unit LCD panel with liquid crystal without contaminating the liquid crystal with sealant.

Another advantage of the present invention is to provide a spacer between substrates of a large unit panel liquid crystal display device.

Another advantage of the present invention is to provide a method of bonding first and second mother substrates to form a plurality of unit liquid crystal display panels therefrom.

Another advantage of the present invention is to provide a device for bonding first and second mother substrates to form a plurality of unit liquid crystal display panels therefrom.

Another advantage of the present invention is to provide a method of curing sealant for bonding a first mother substrate panel and a second mother substrate panel.

Another advantage of the present invention is to provide a method of inspecting liquid crystal display panels.

Another advantage of the present invention is to provide an apparatus for inspecting liquid crystal display panels.

Another advantage of the present invention is to provide a method for cutting unit liquid crystal display panels from a mother substrate assembly.

Another advantage of the present invention is to provide an apparatus for cutting unit liquid crystal display panels from a mother substrate assembly.

Another advantage of the present invention is to provide a method for grinding edges of unit liquid crystal display panels.

Another advantage of the present invention is to provide an apparatus for grinding edges of unit liquid crystal display panels.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a device for fabricating a liquid crystal display device includes a liquid crystal dispensing device for dispensing liquid crystal onto one of a first and second substrates; a sealant applicator for applying sealant onto one of the first and second substrates; a bonding unit for bonding the first and second substrates to each other with the liquid crystal therebetween; a sealant curing device for curing the sealant after the first and second substrates have been bonded; a cutting device for cutting the bonded first and second substrates into unit liquid crystal panels; and a grinder for grinding edges of the unit liquid crystal panels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 110A is a plane view of the exemplary substrate receiving system along I-I of FIG. 109 according to the present invention;

FIG. 110B is a plane view of another exemplary substrate receiving system along line I-I of FIG. 109 according to the present invention;

FIG. 111A is a cross sectional view of an exemplary operational state of a substrate receiving system according to the present invention;

FIG. 111B is a cross sectional view of another exemplary operational state of the substrate receiving system receiving a substrate in FIG. 109 according to the present invention;

FIG. 112 is a plane view of an exemplary substrate receiving system according to the present invention;

FIG. 113 is a plane view of an apparatus having another exemplary substrate receiving system;

FIG. 114 is a plane view of an apparatus having another exemplary substrate receiving system;

FIG. 115 is a cross sectional view of an exemplary substrate receiving system according to the present invention;

FIG. 116 is a plane view of another exemplary substrate receiving system according to the present invention;

FIG. 117 is a cross sectional view of an exemplary apparatus according to the present invention;

FIG. 118 is a plane view along line I-I of FIG. 117 according to the present invention;

FIG. 119 is a perspective view of an operational state of the exemplary substrate receiving system according to the present invention;

Figure 120A:
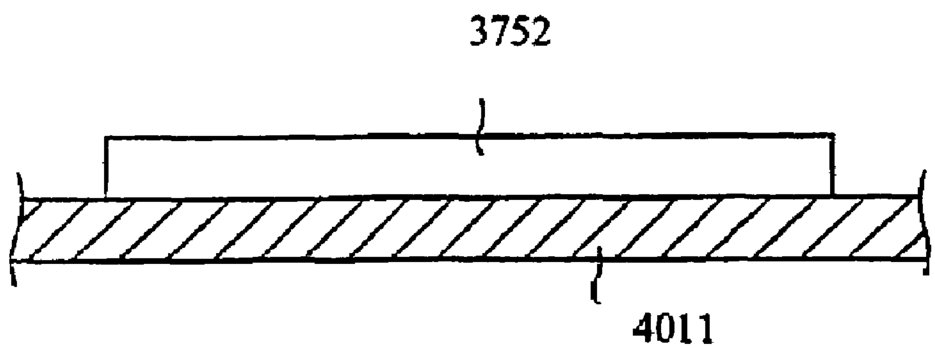
Figure 120B:
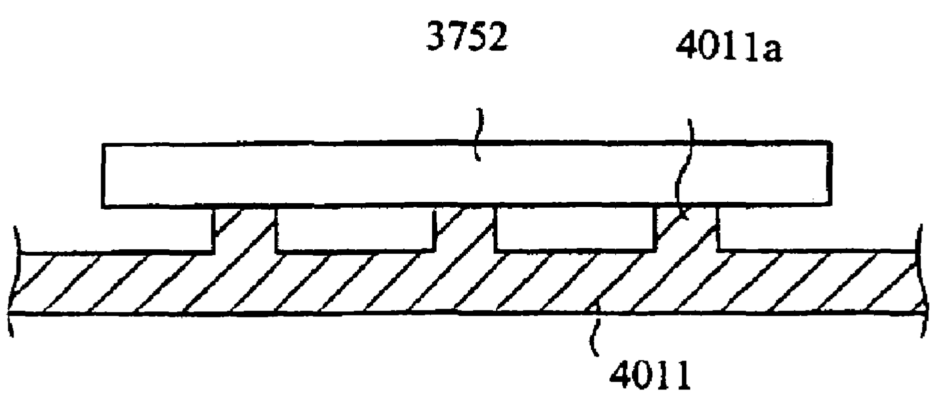
Figure 120C:
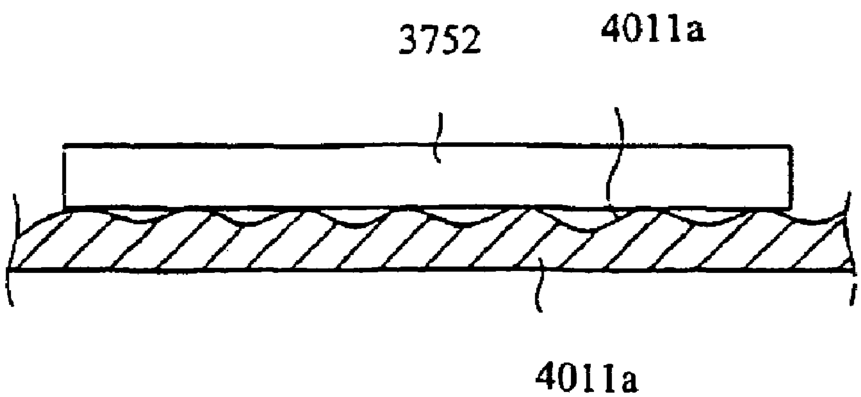
Figure 121:
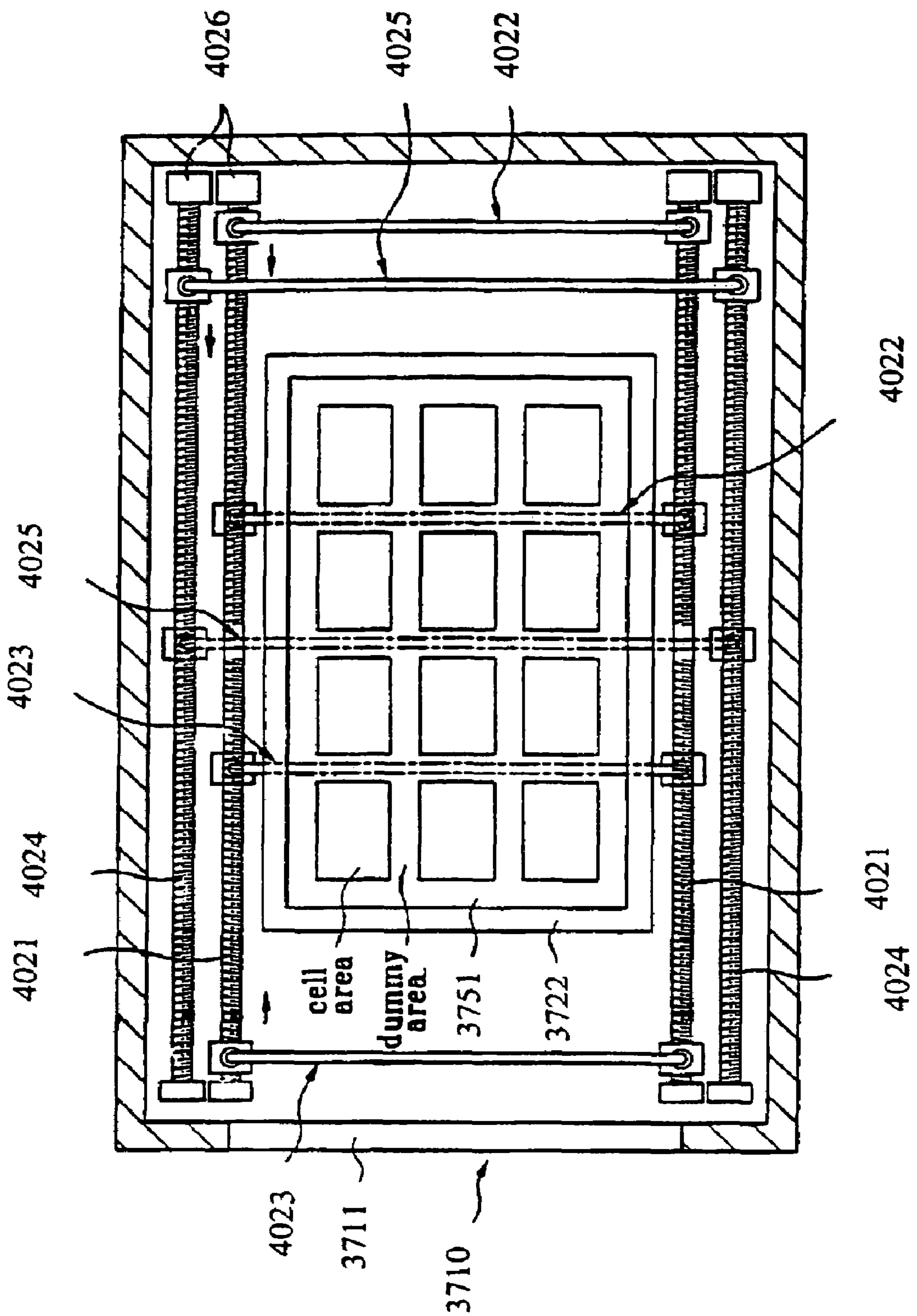
Figure 122:
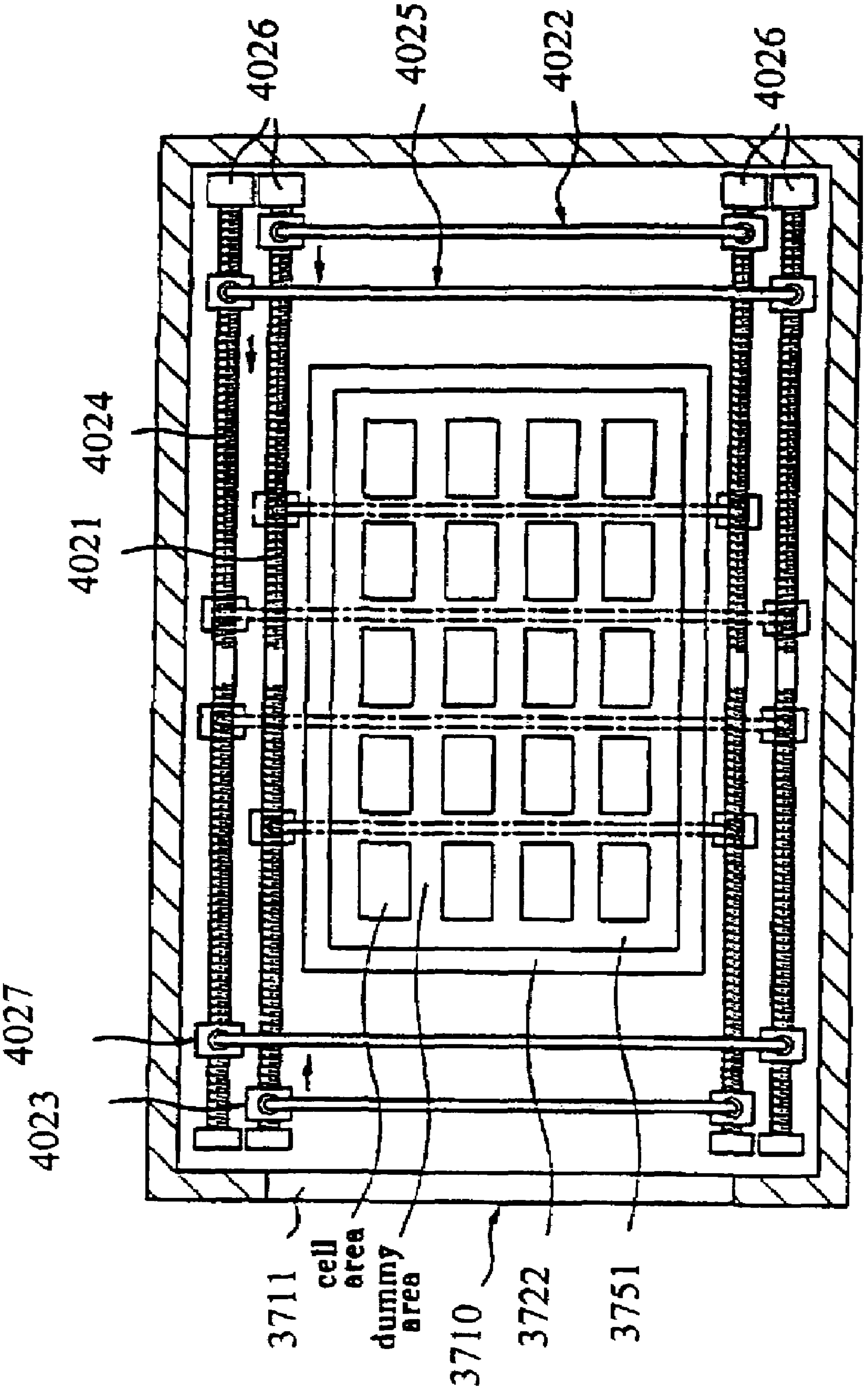
Figure 123:
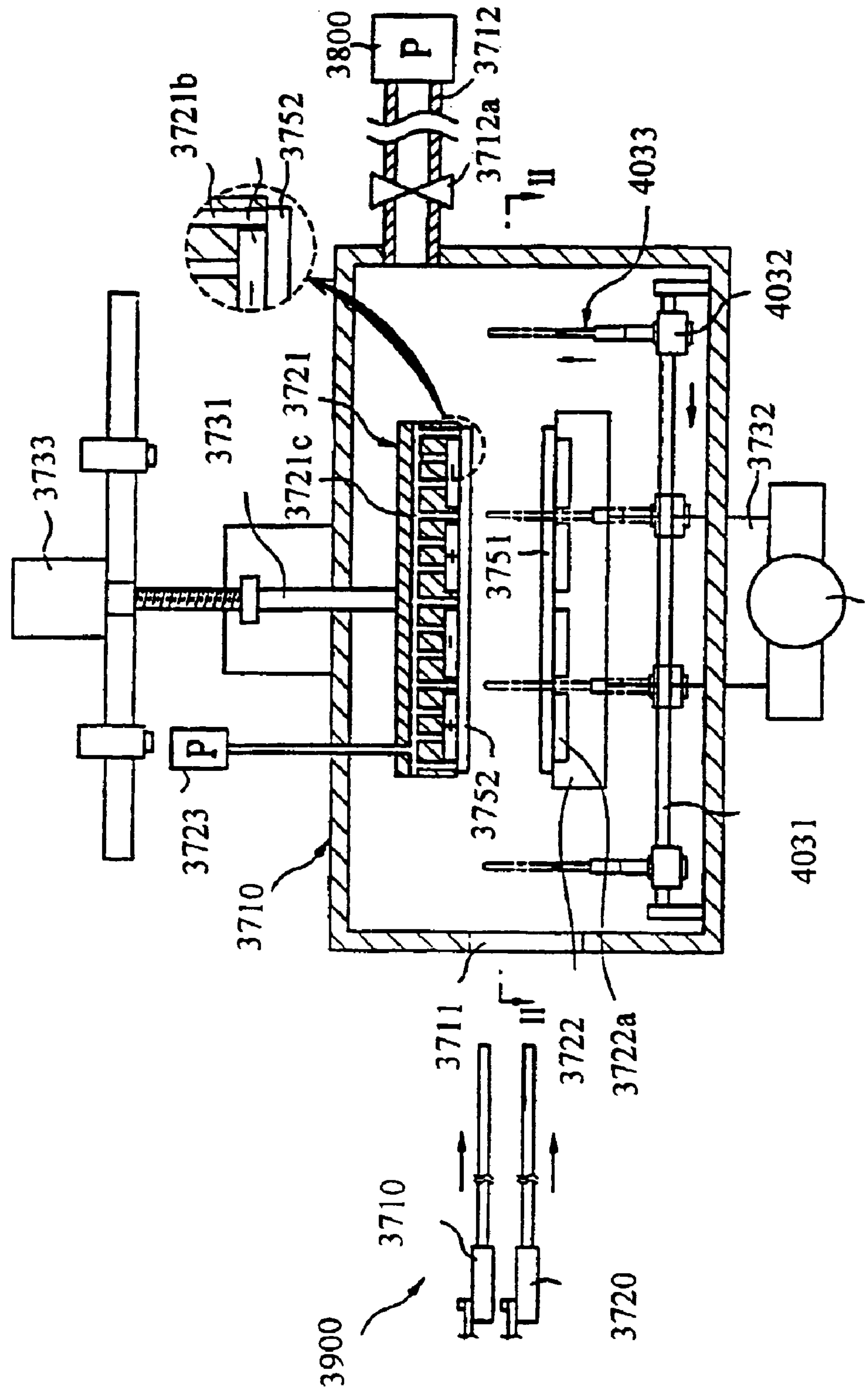
Figure 124:
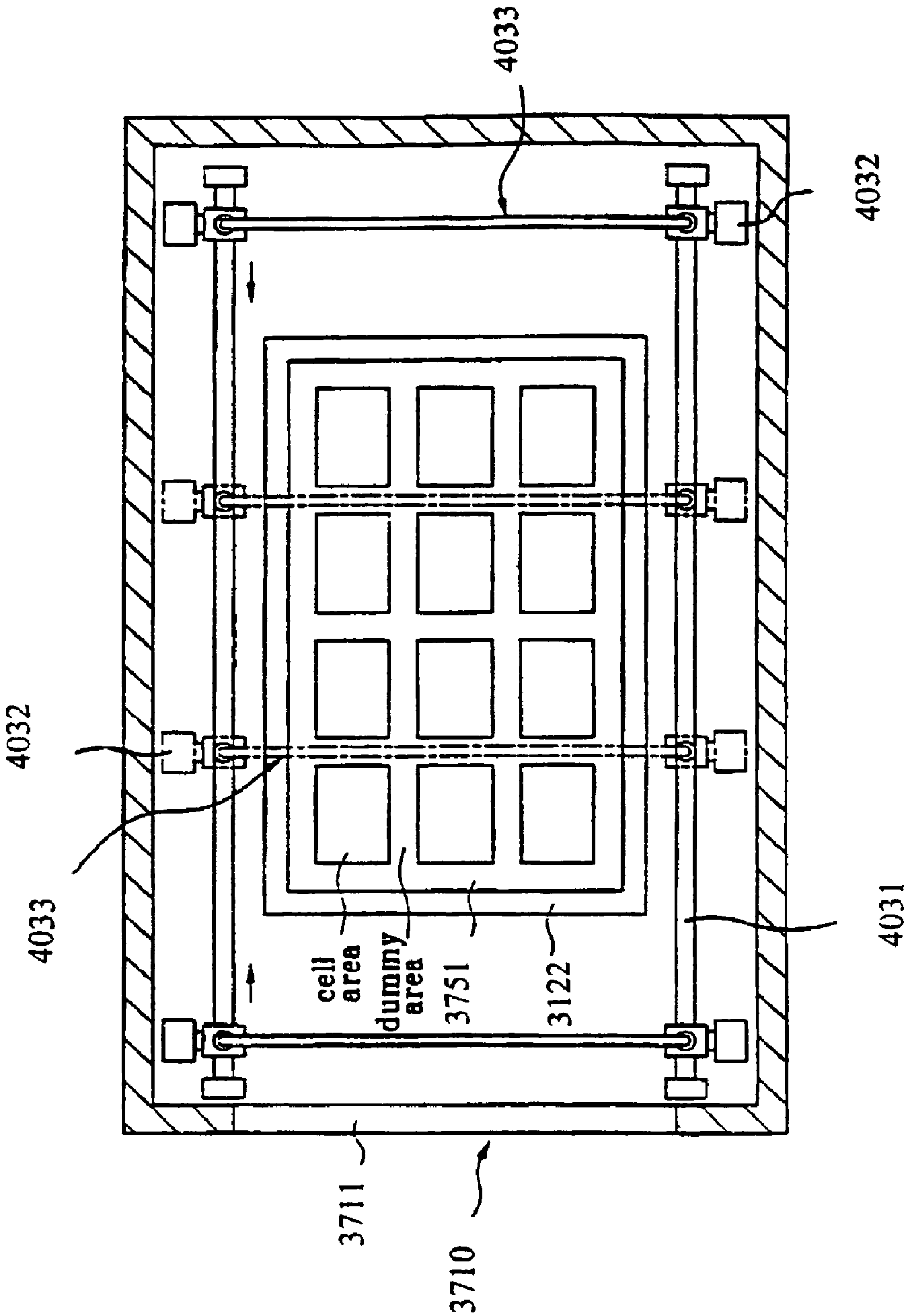
Figure 125:
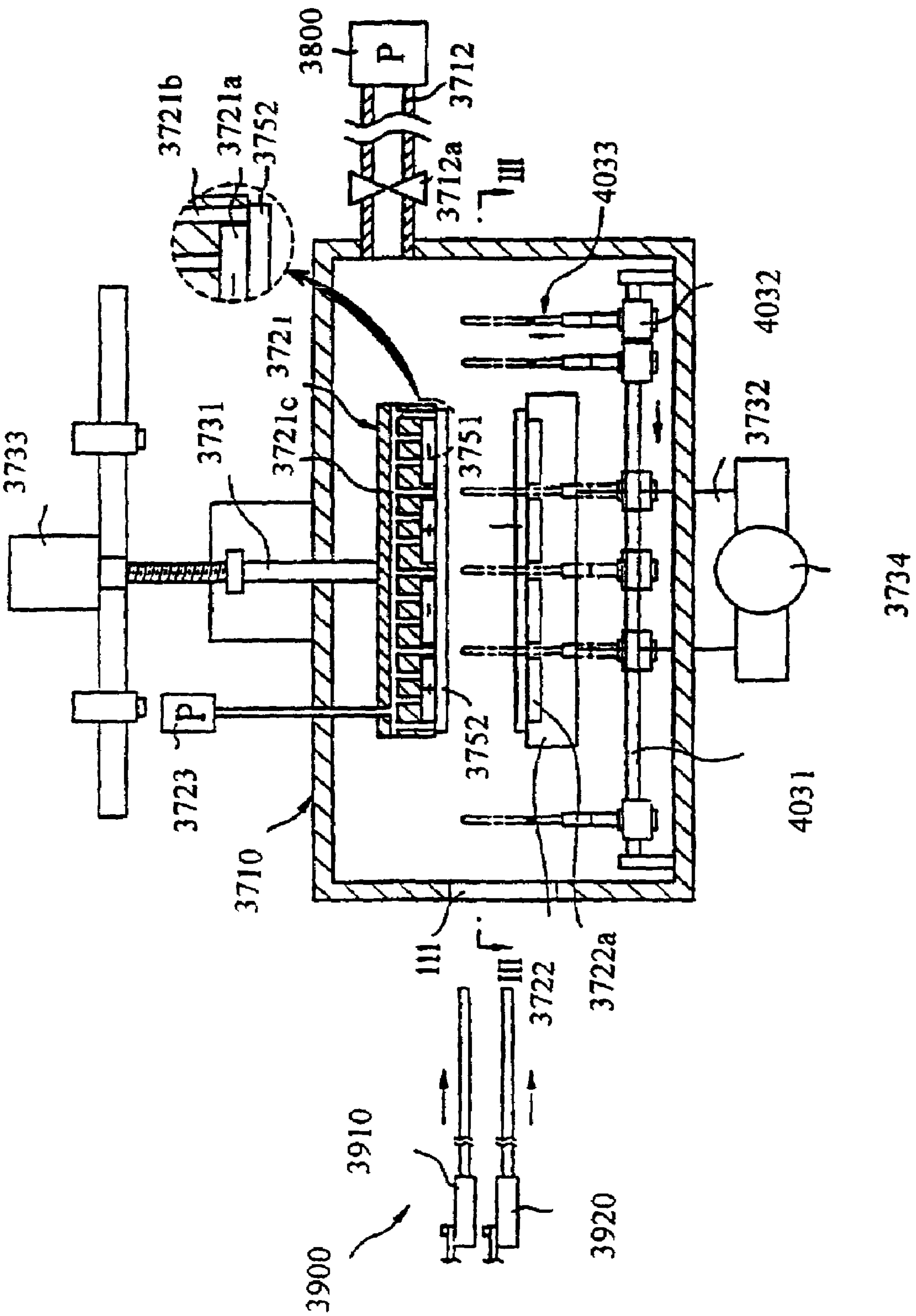
Figure 126:
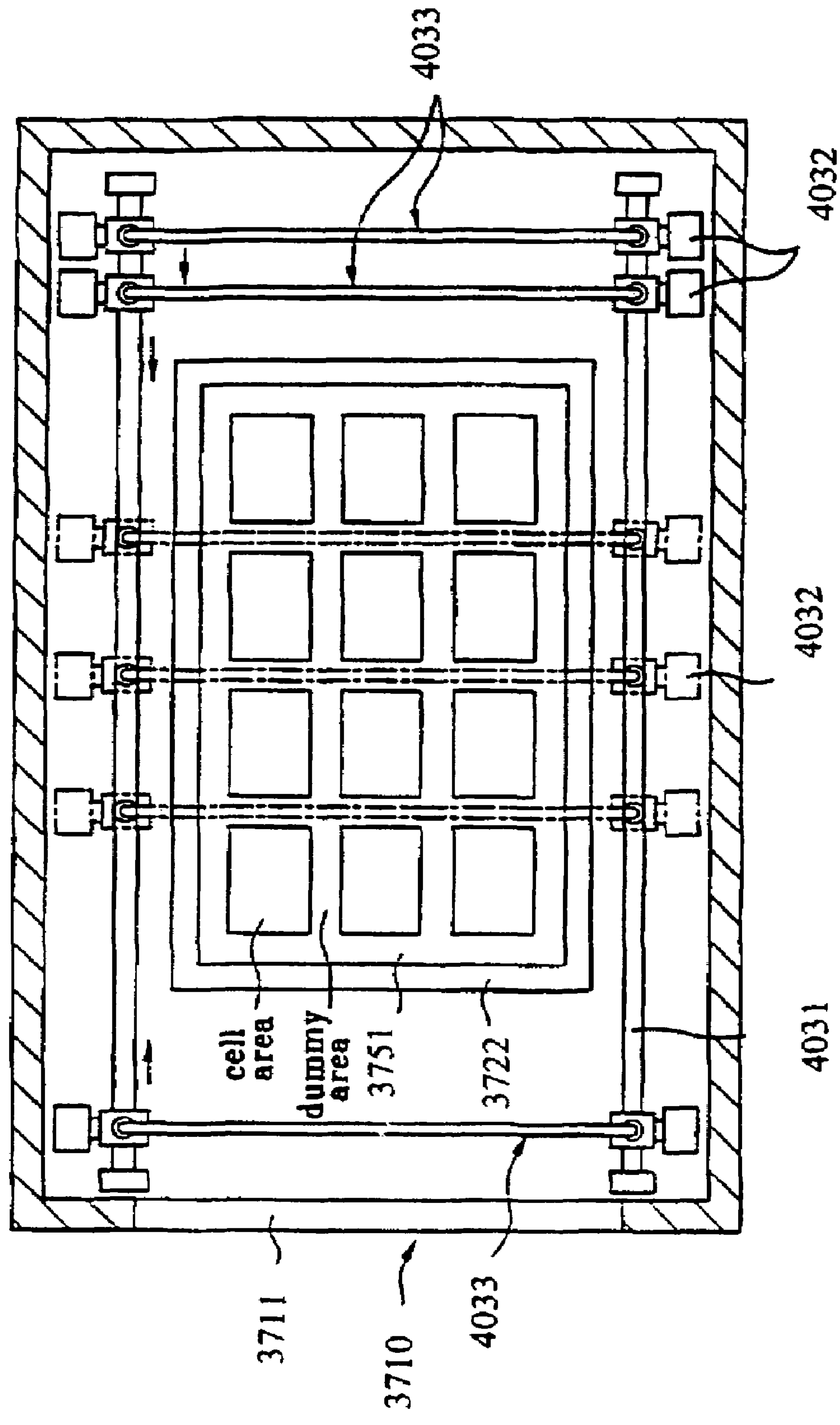
Figure 131:
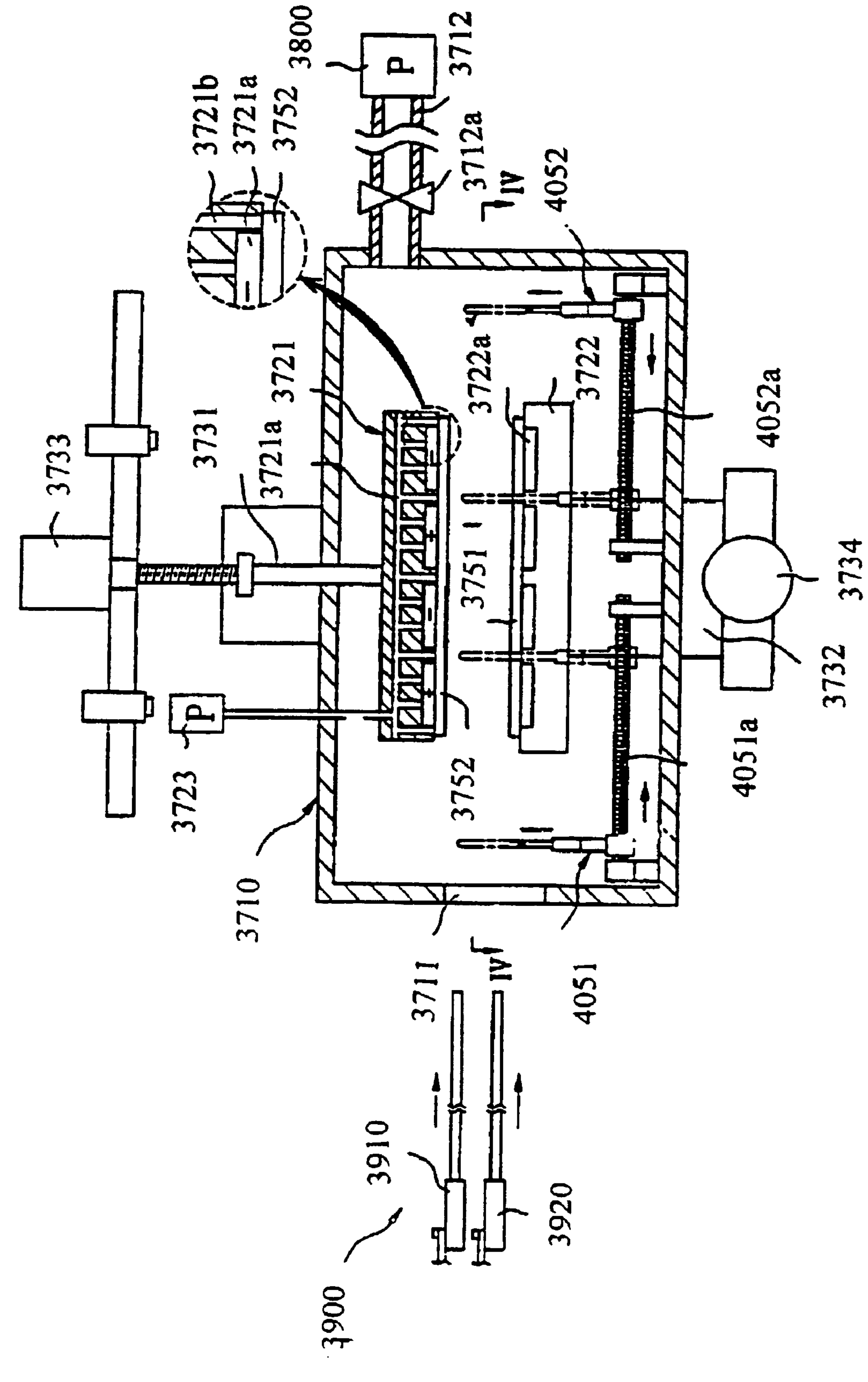
Figure 132:
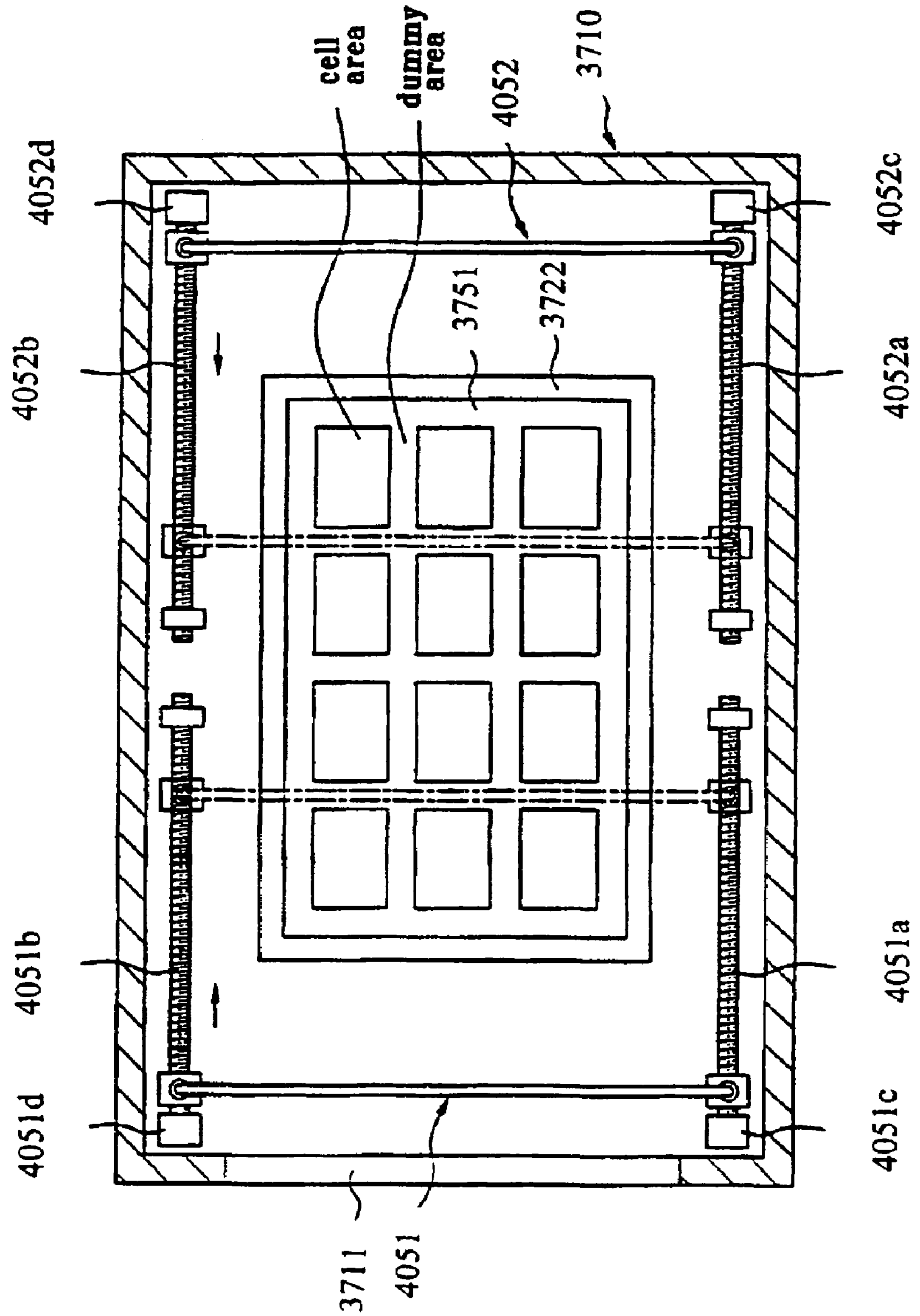
Figure 133:
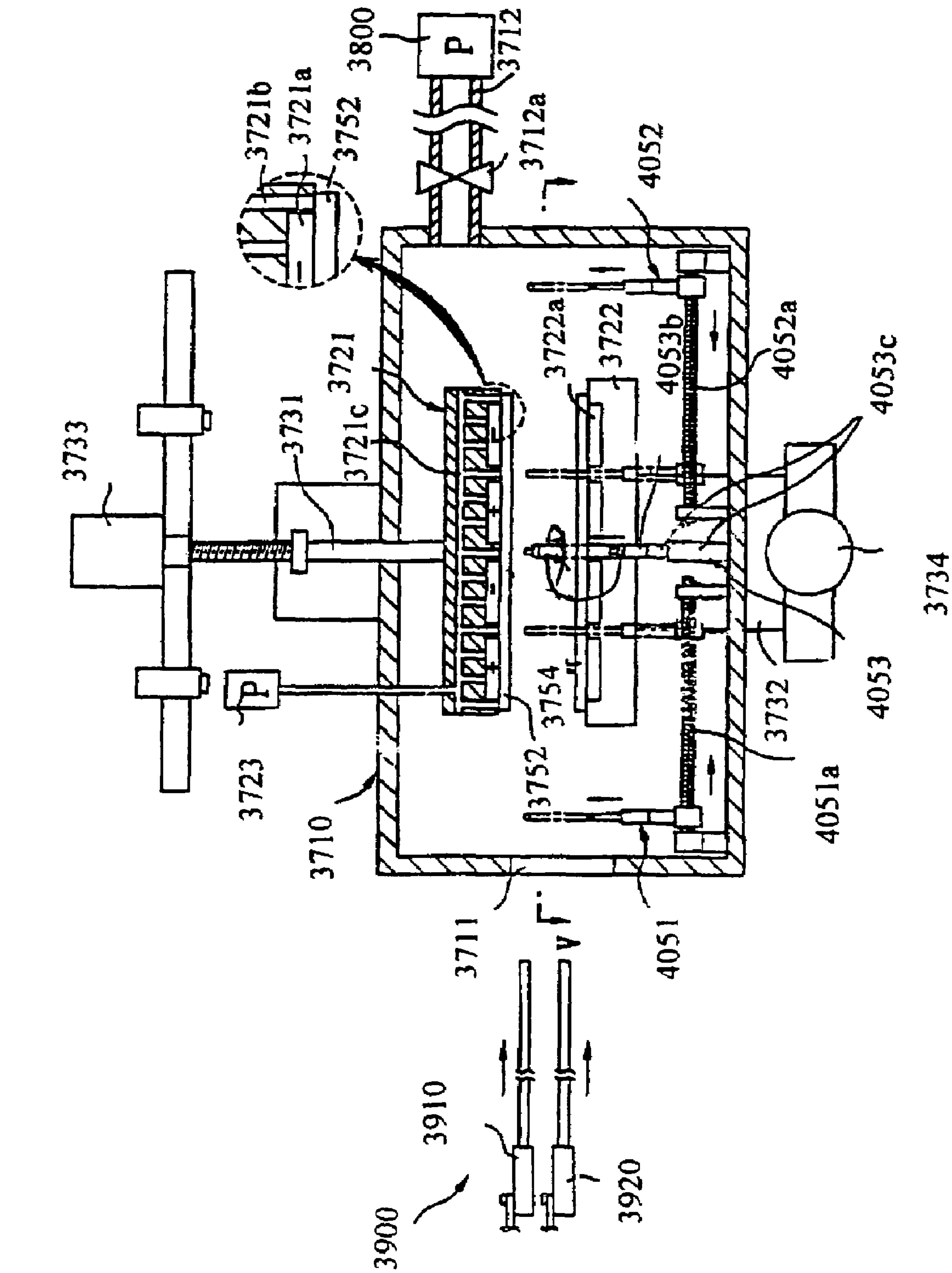
Figure 134:
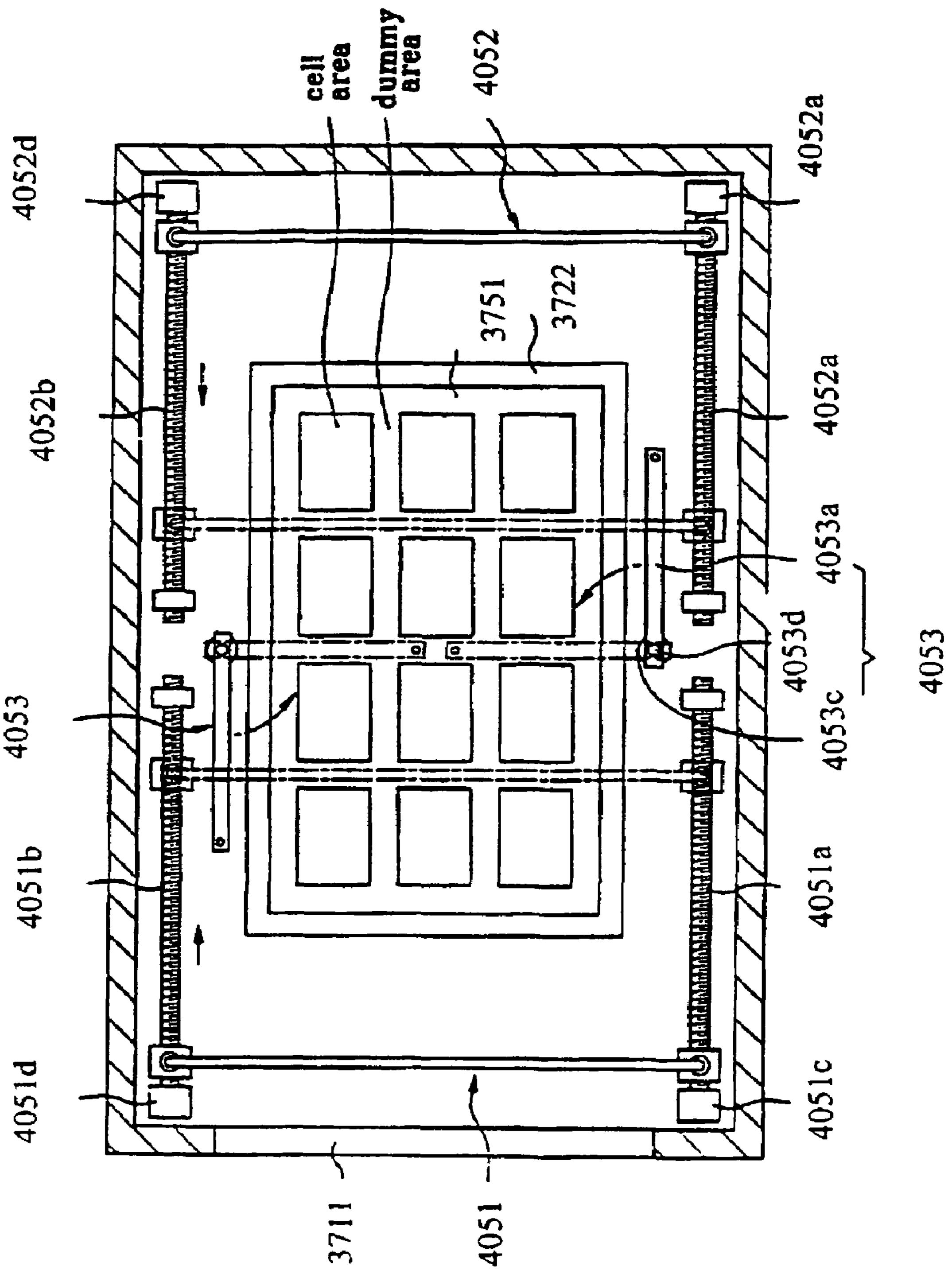
Figure 135:
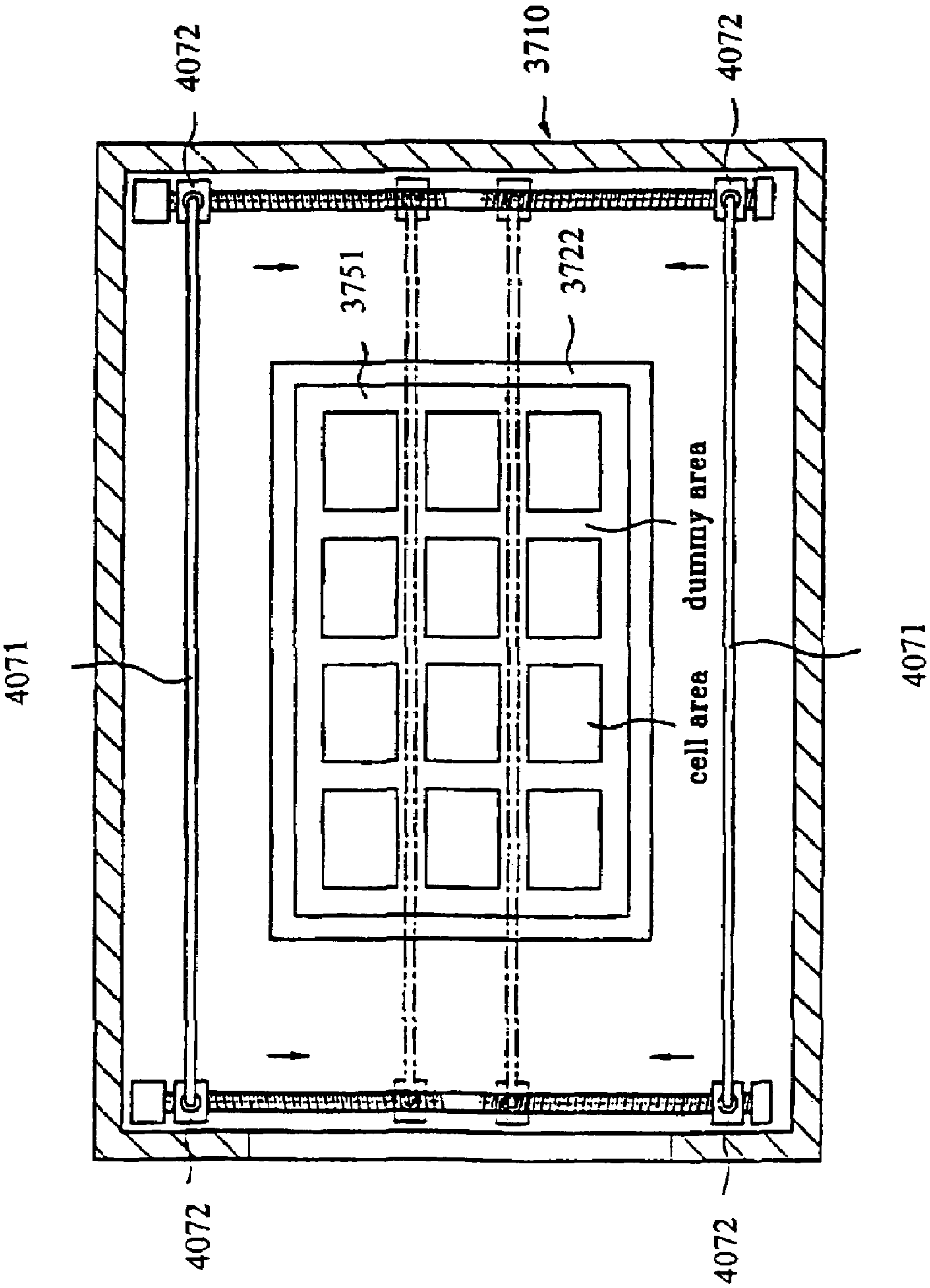
Figure 136:
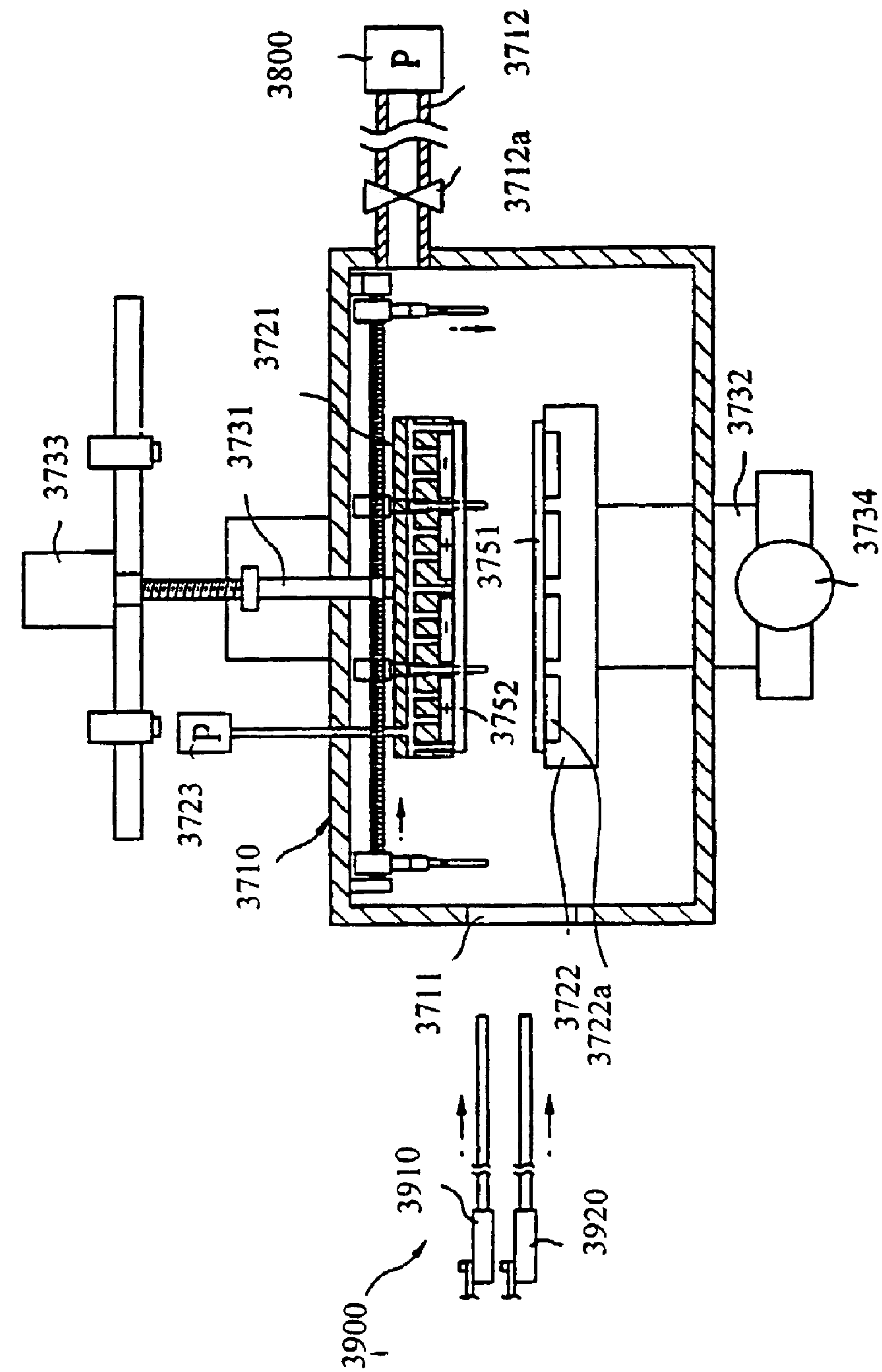
Figure 138:
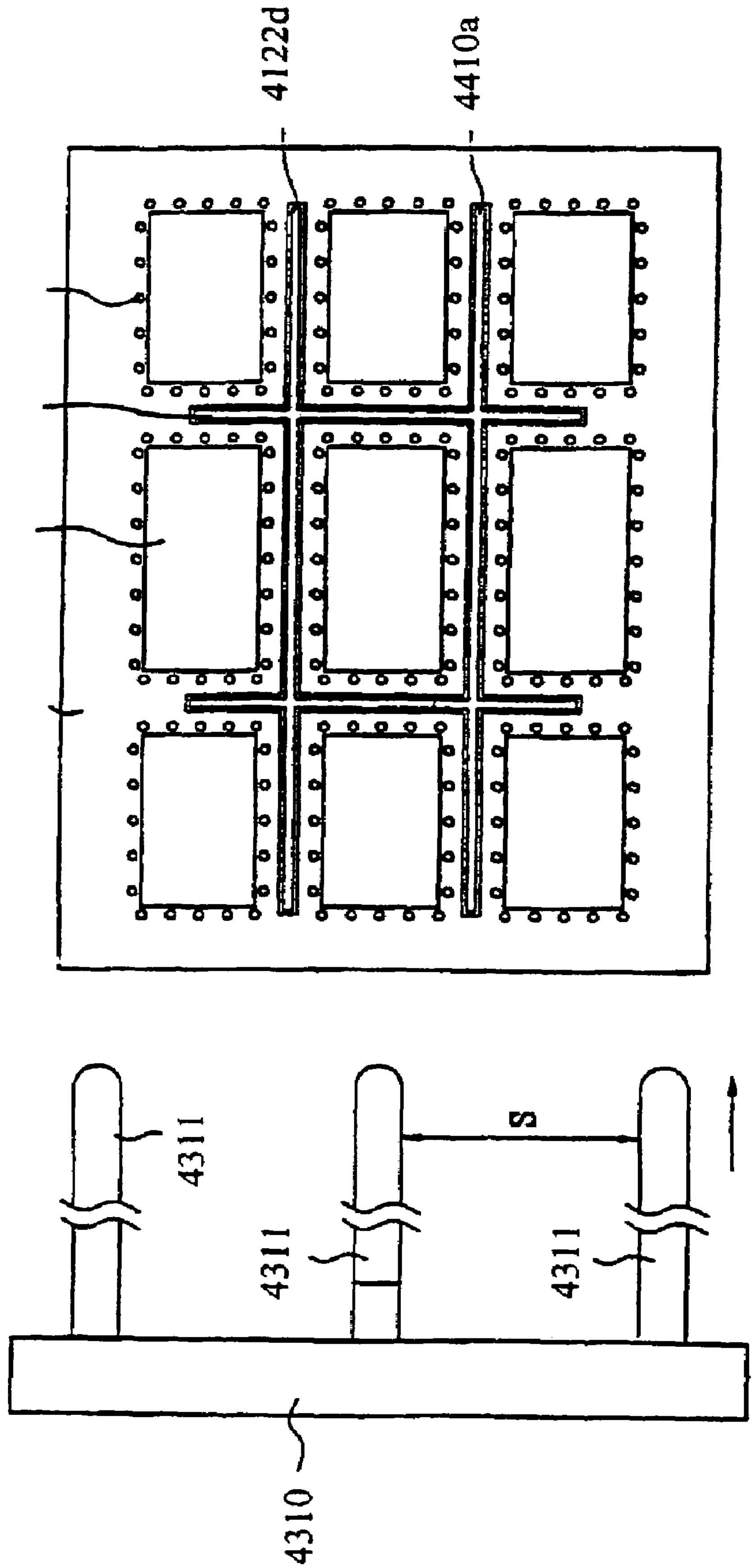
Figure 139A:
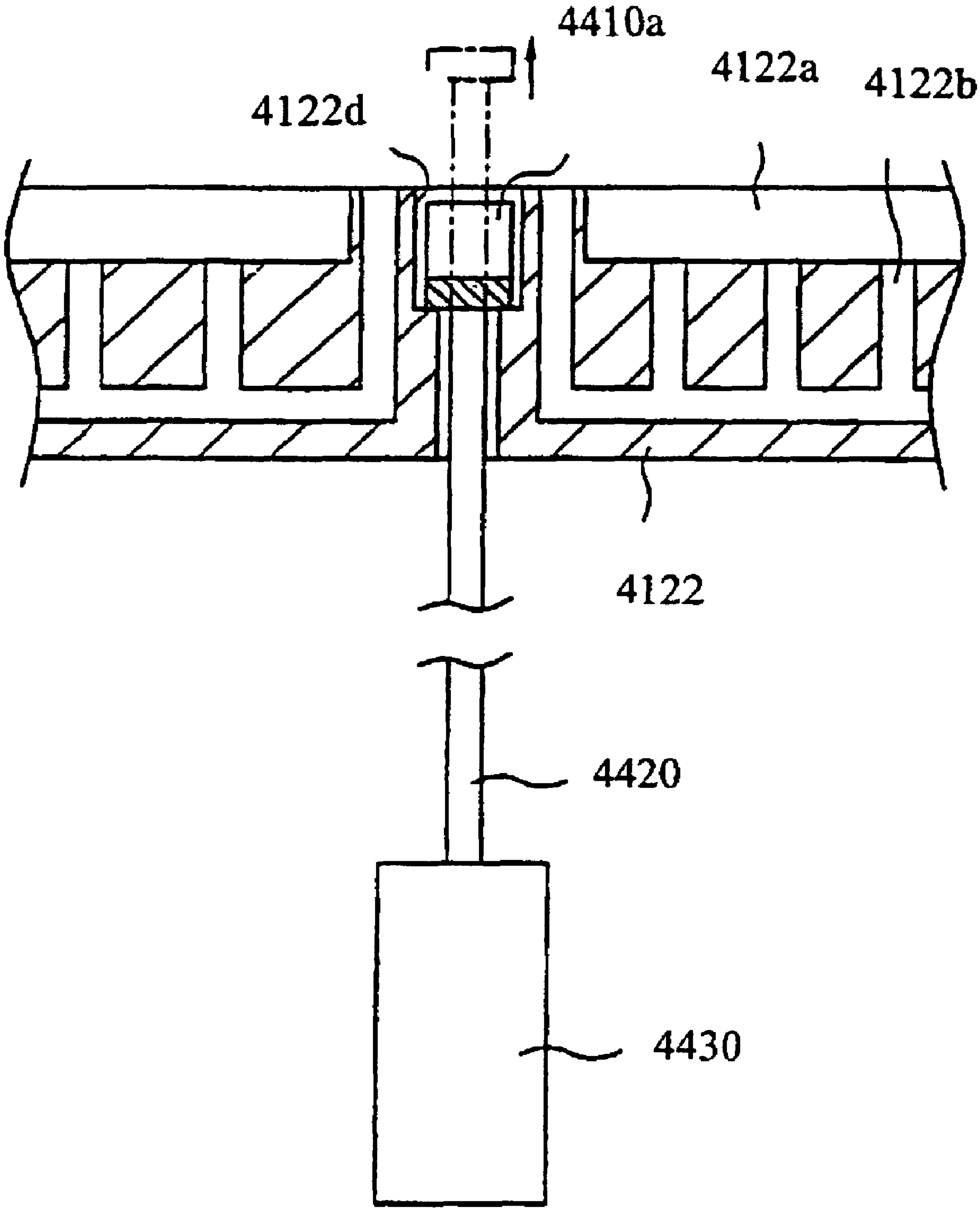
Figure 139B:
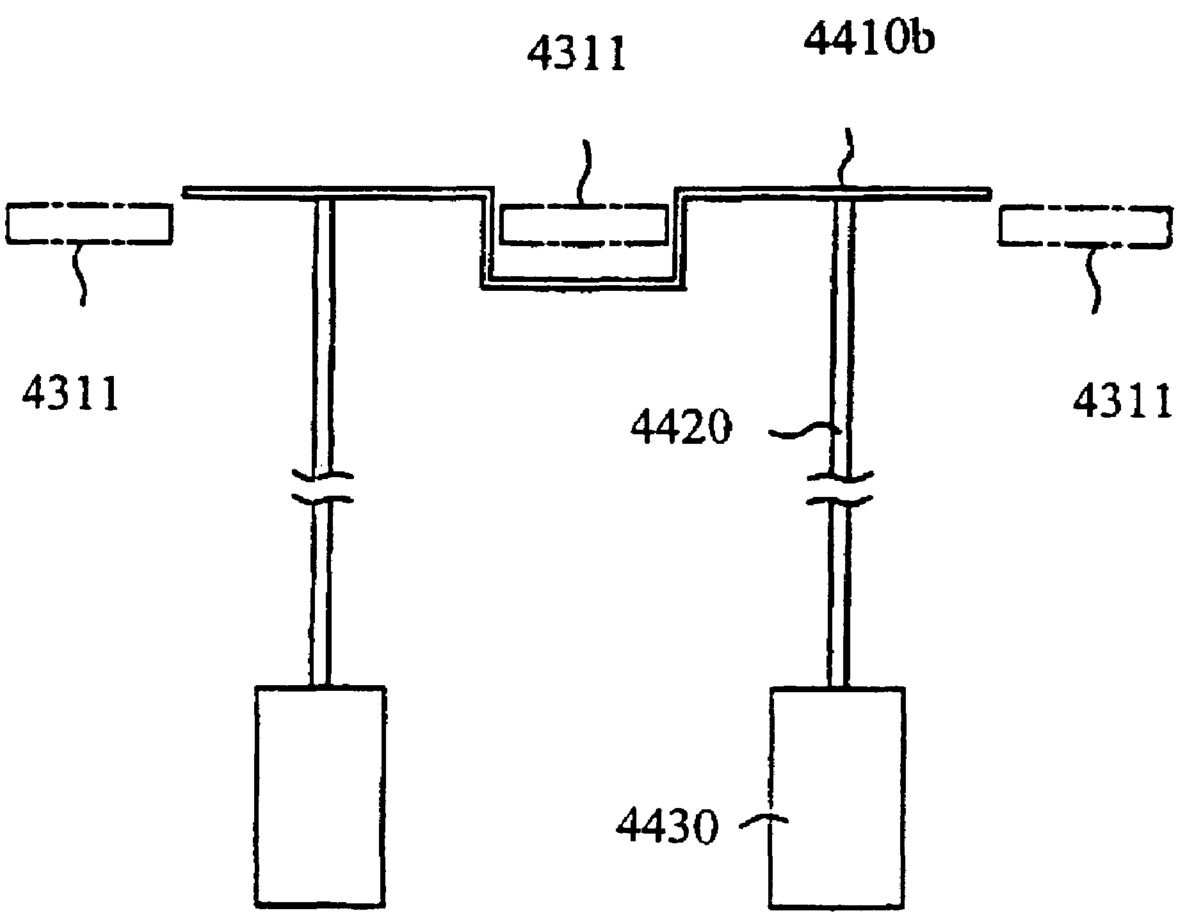
Figure 140:
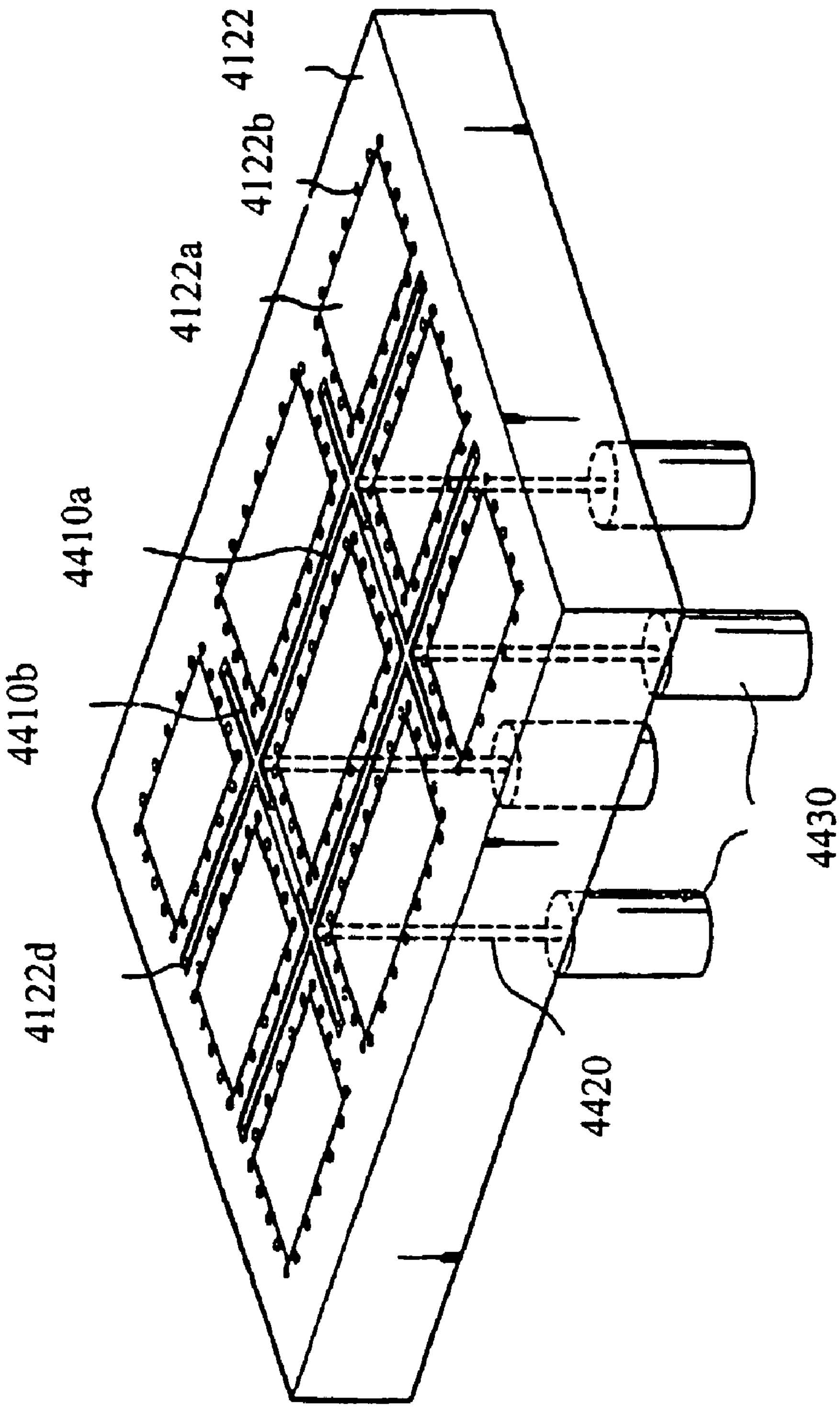
Figure 141A:
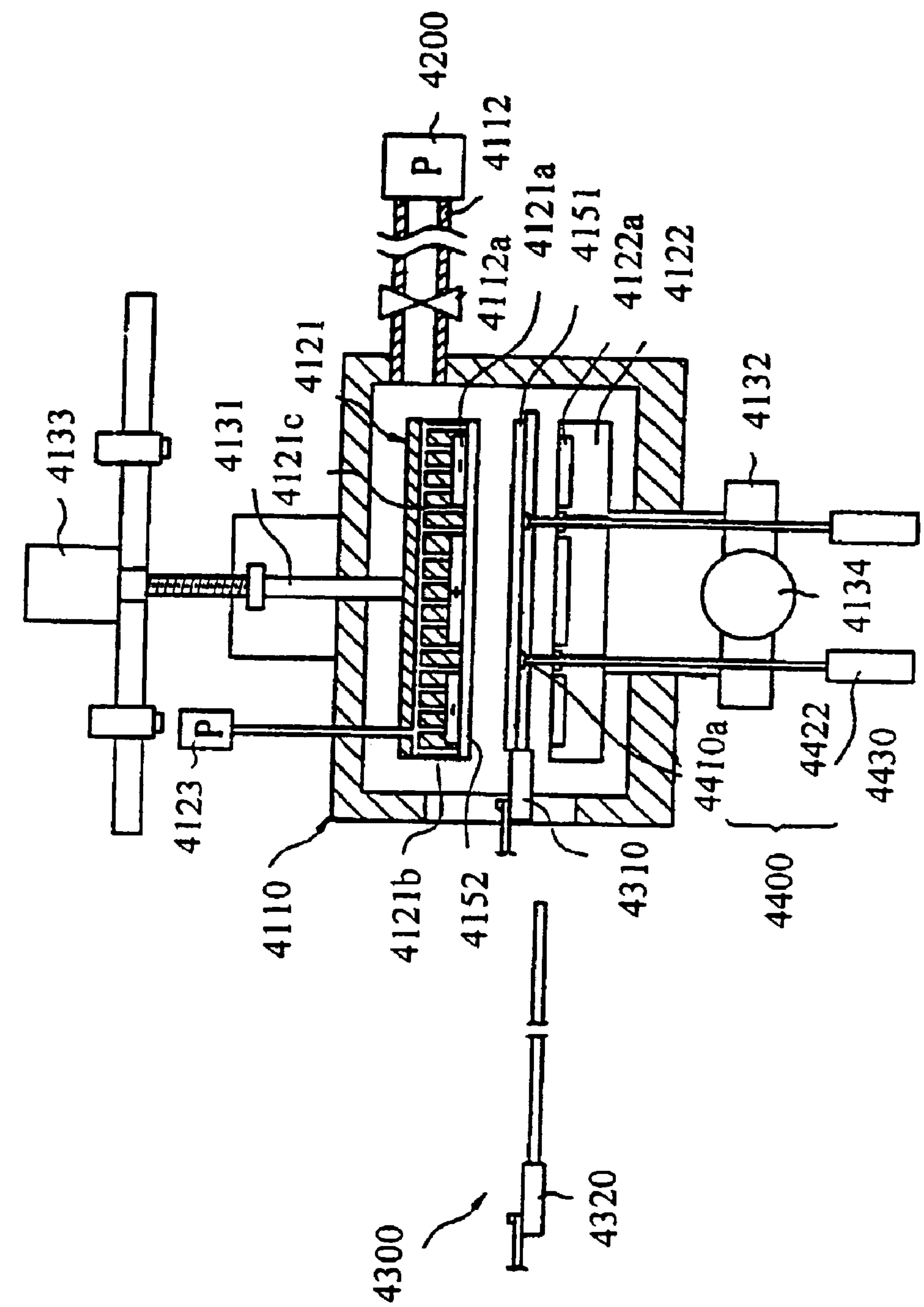
Figure 141B:
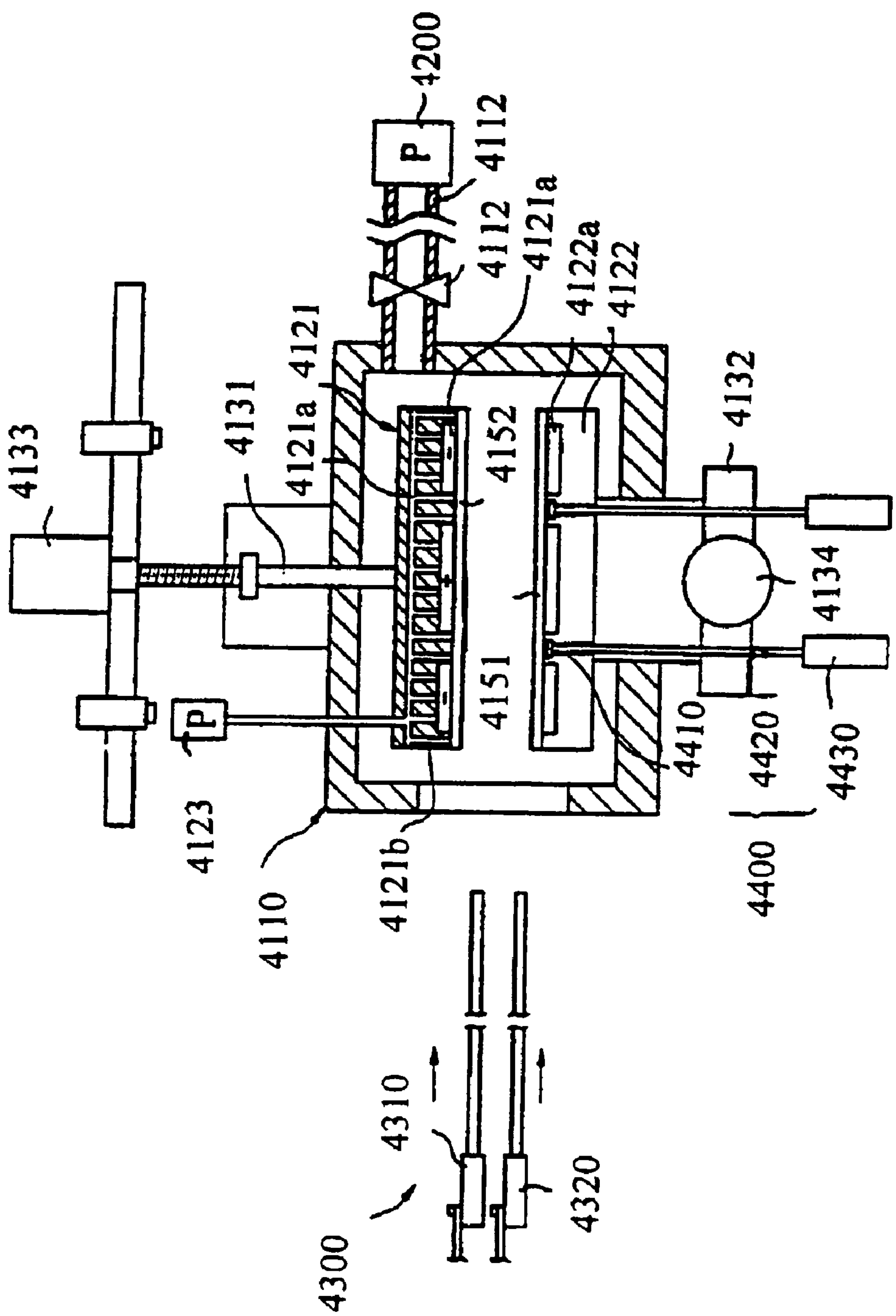
Figure 142:
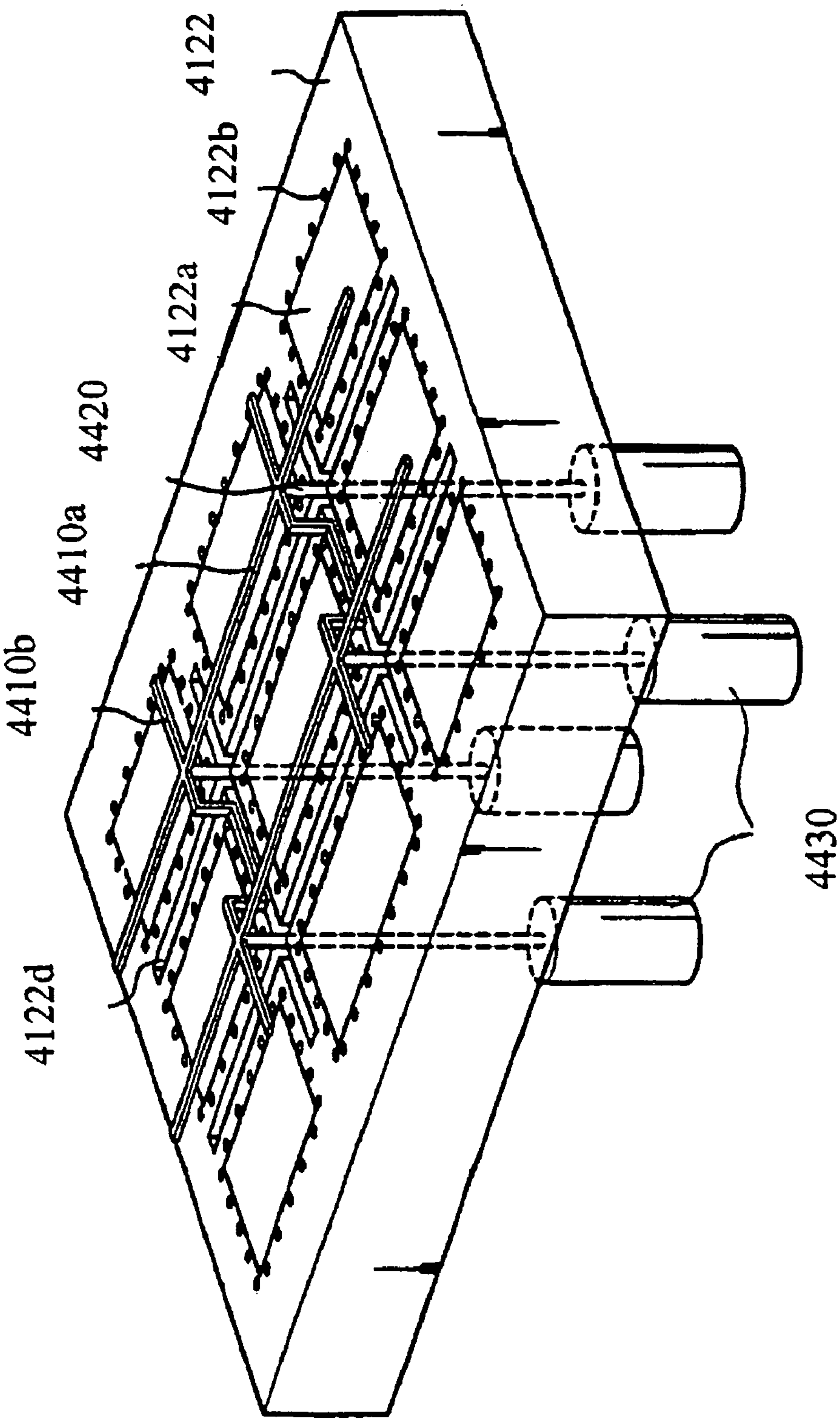
Figure 143:
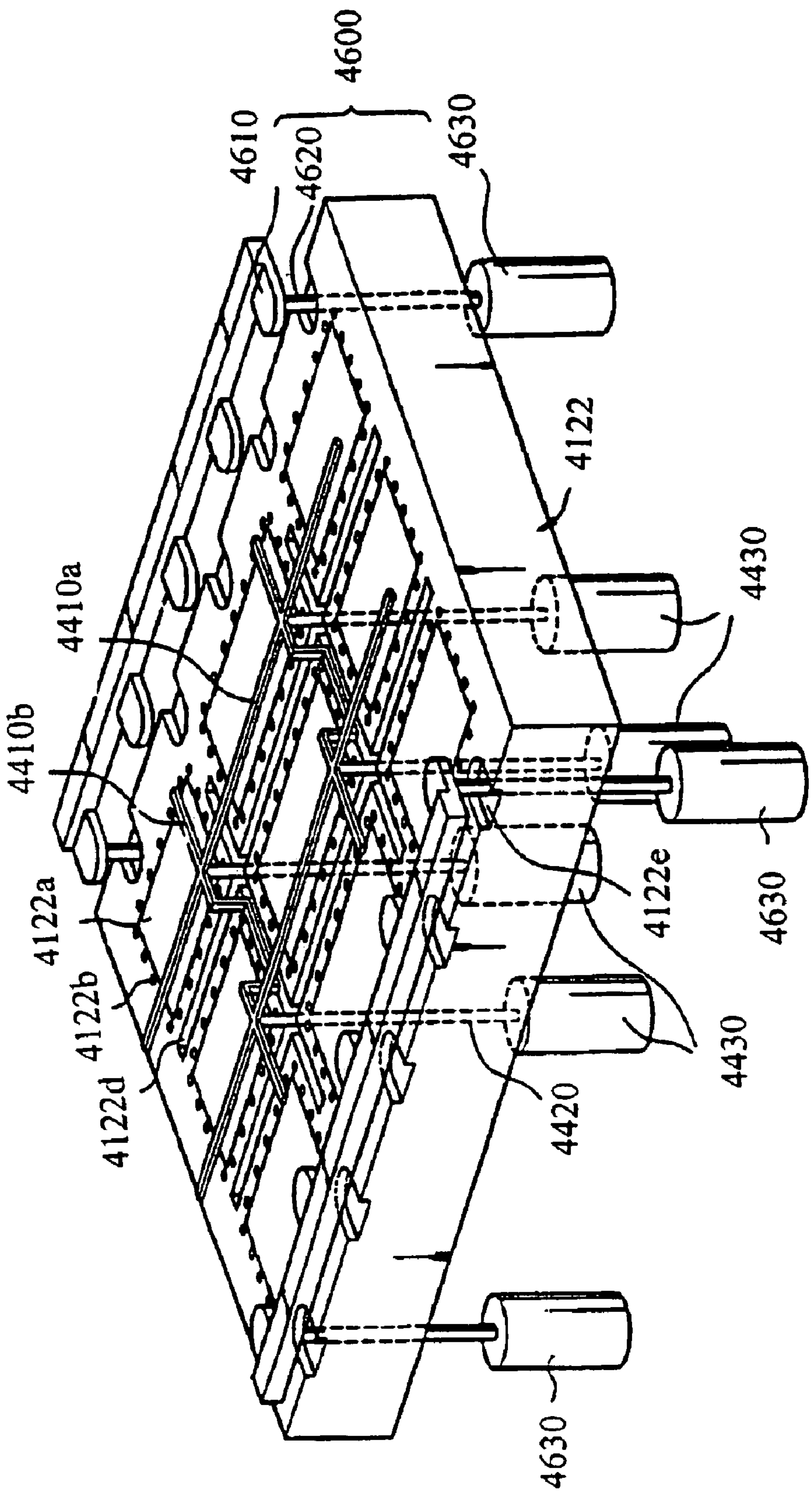
Figure 144:
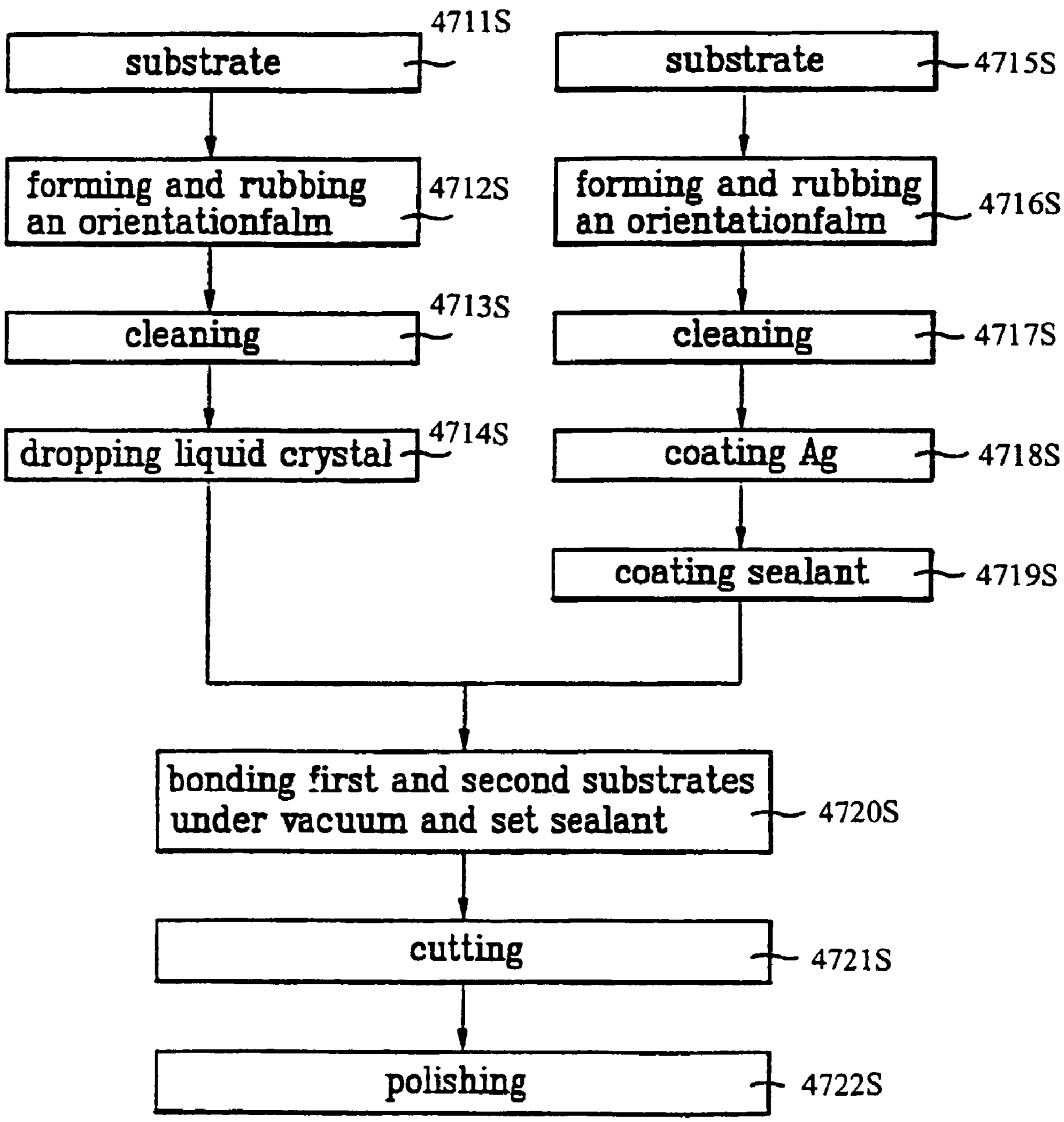
Figure 146:
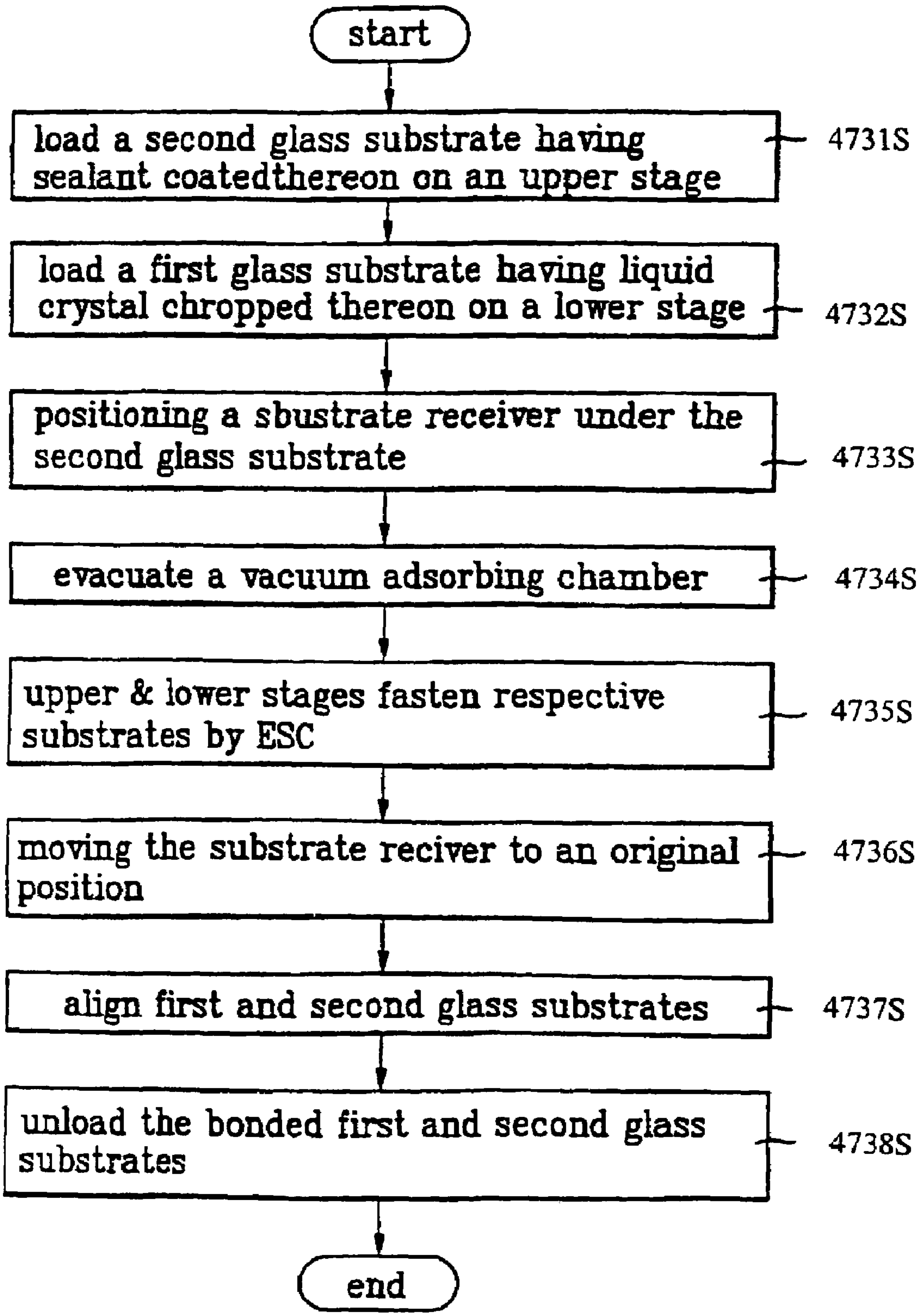
Figure 147:
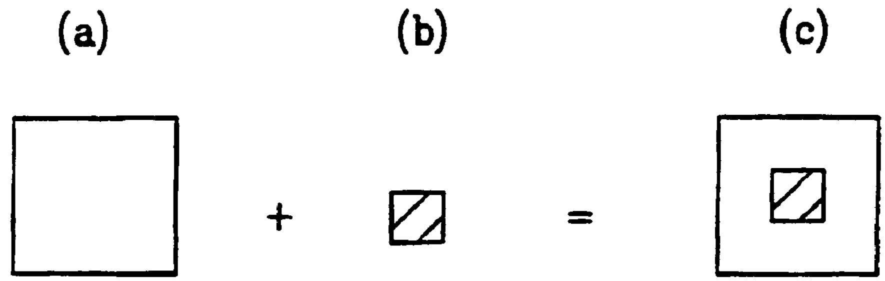
Figure 148:
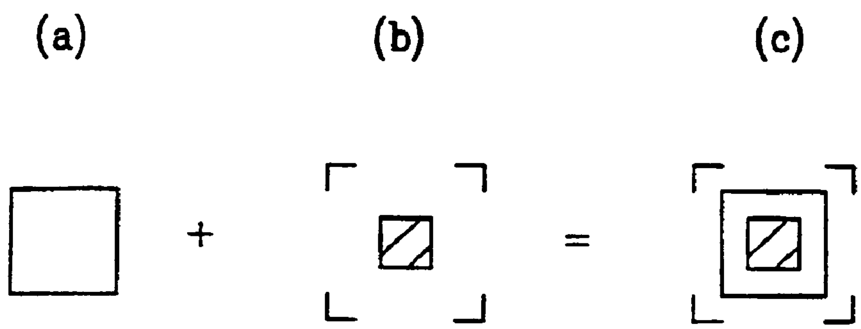
Figure 149:
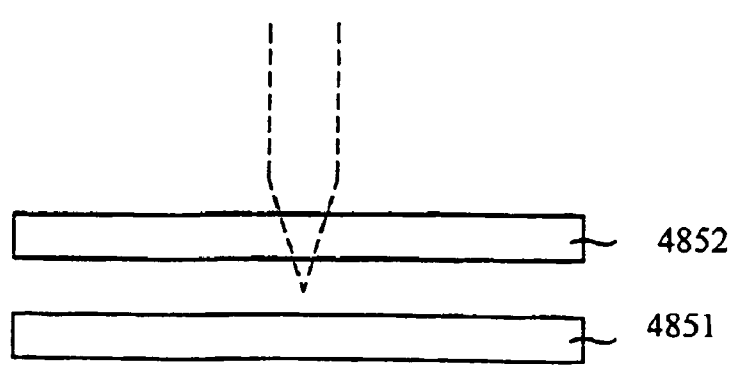
Figure 150:
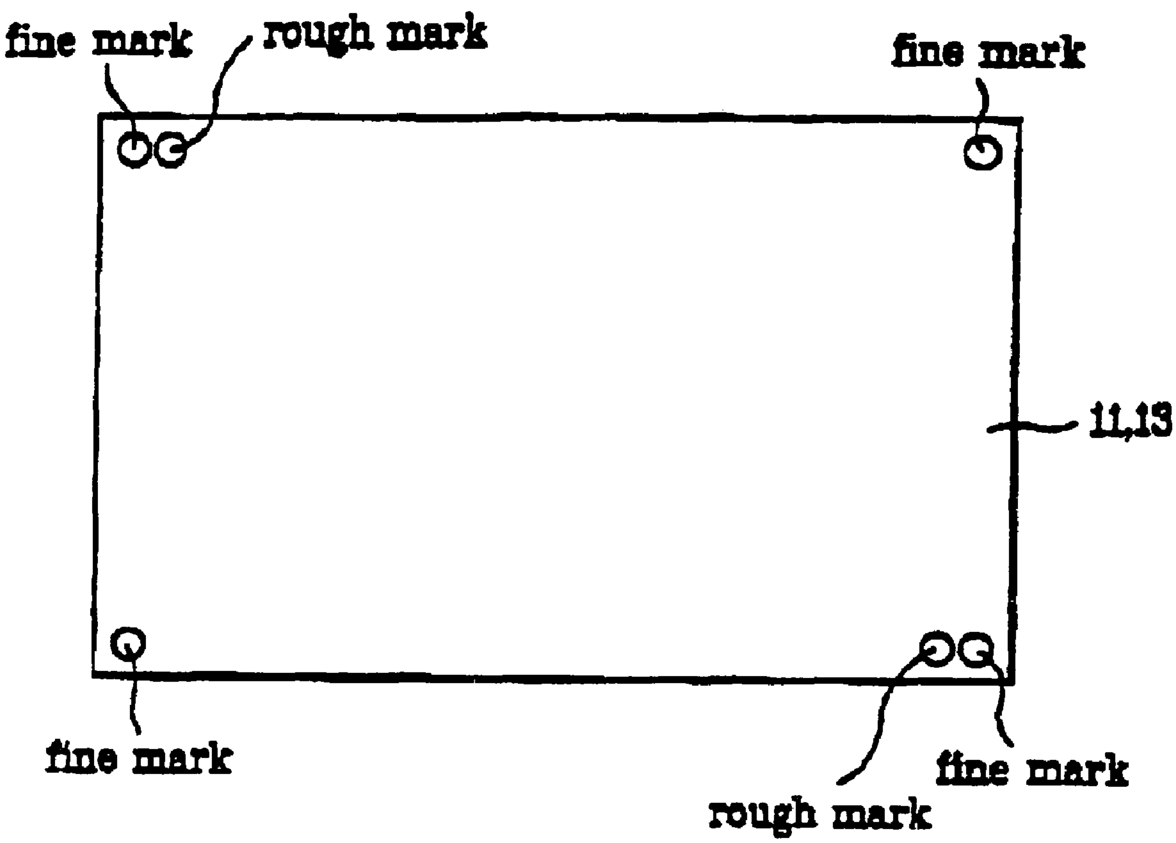
Figure 152:
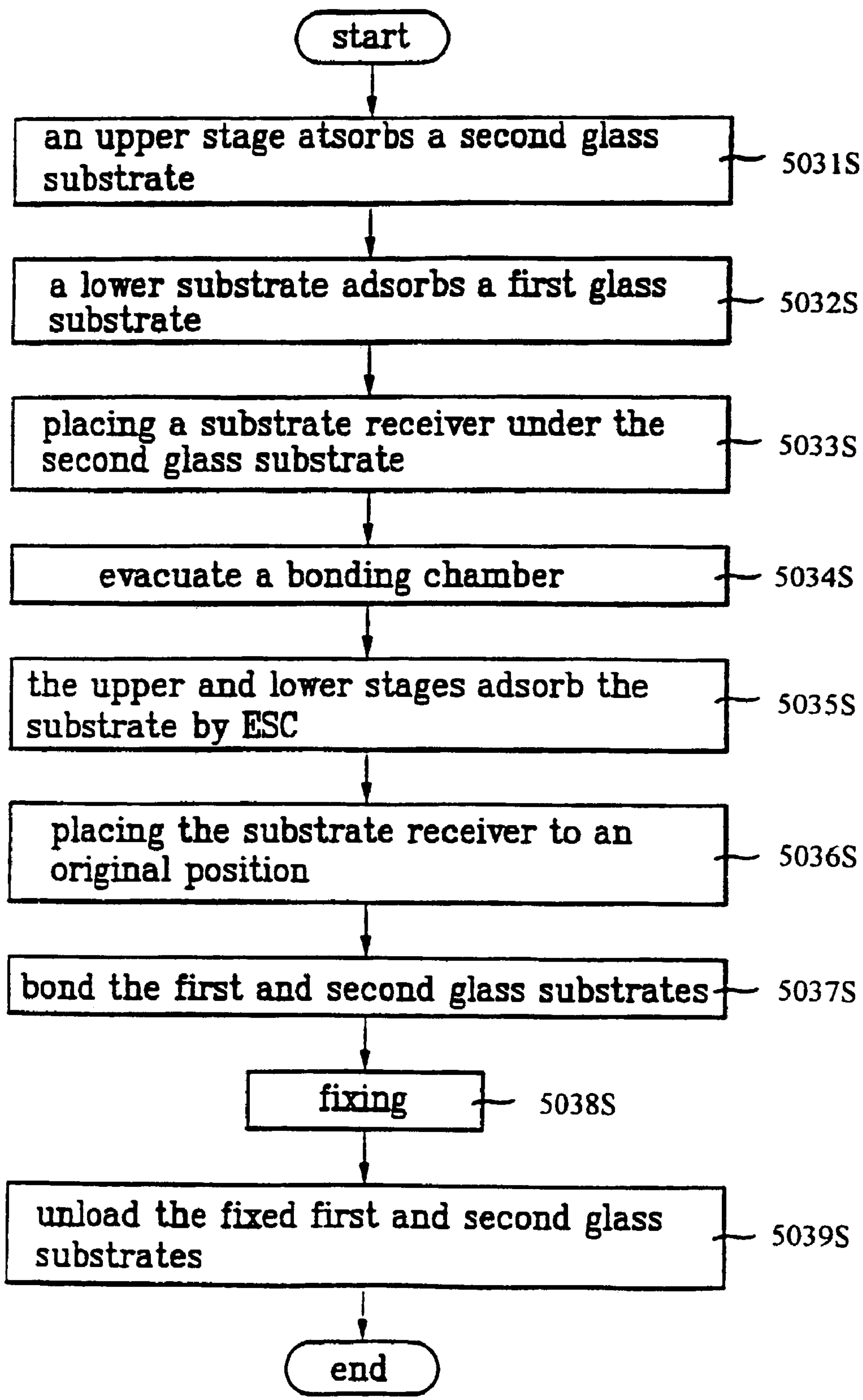
Figure 153:
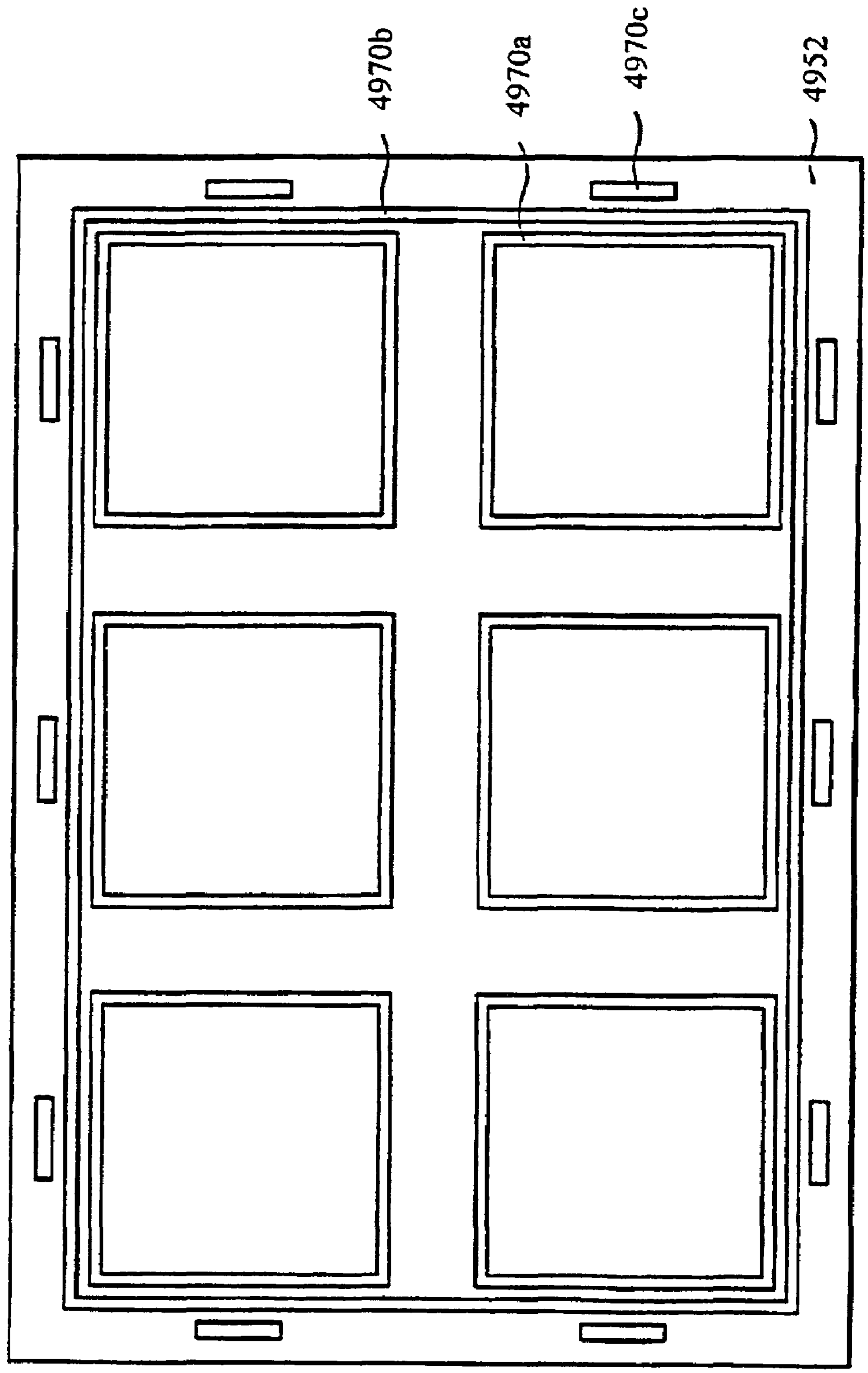
Figure 154:
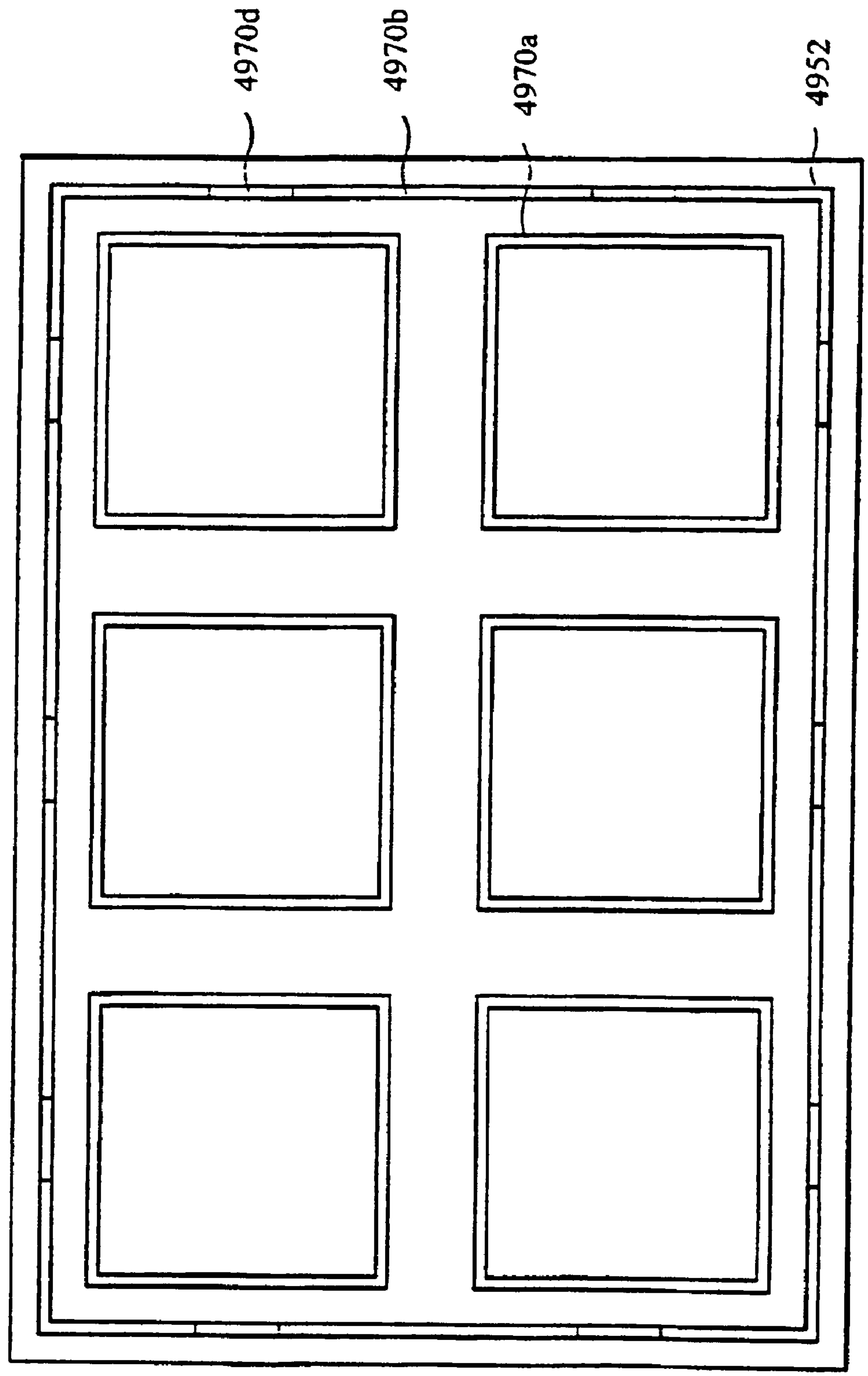
Figure 155:
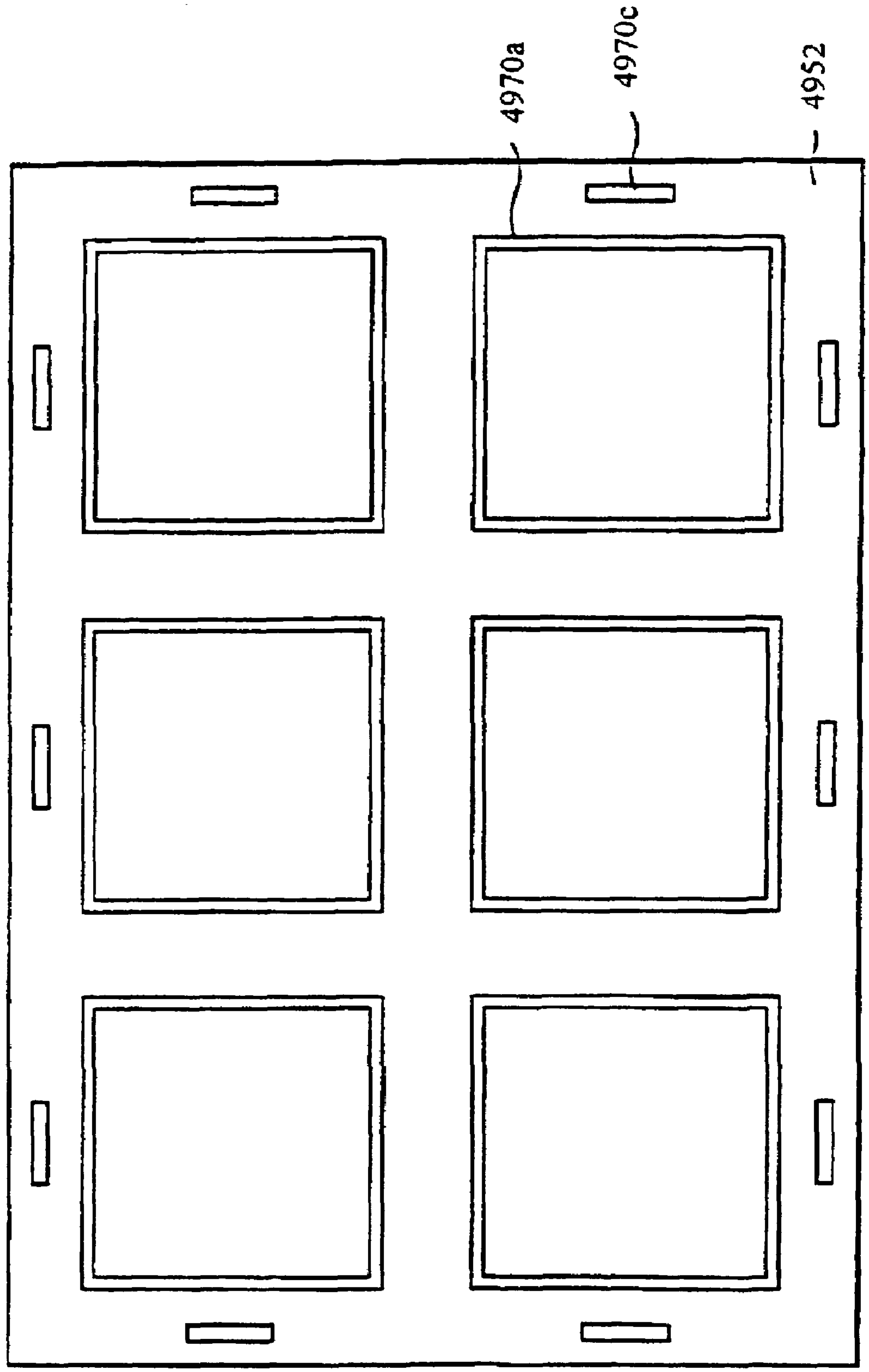
Figure 156:
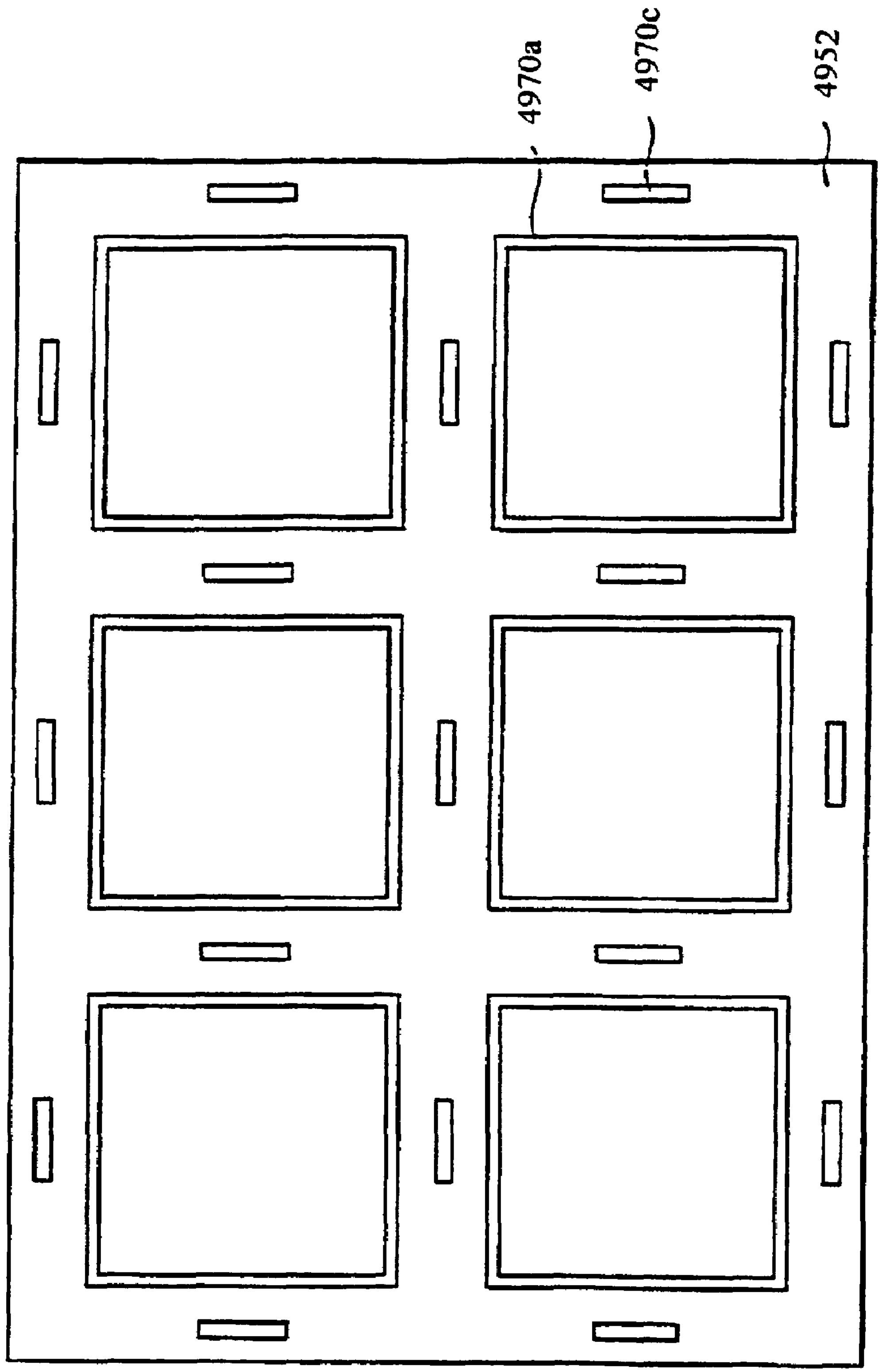
Figure 157:
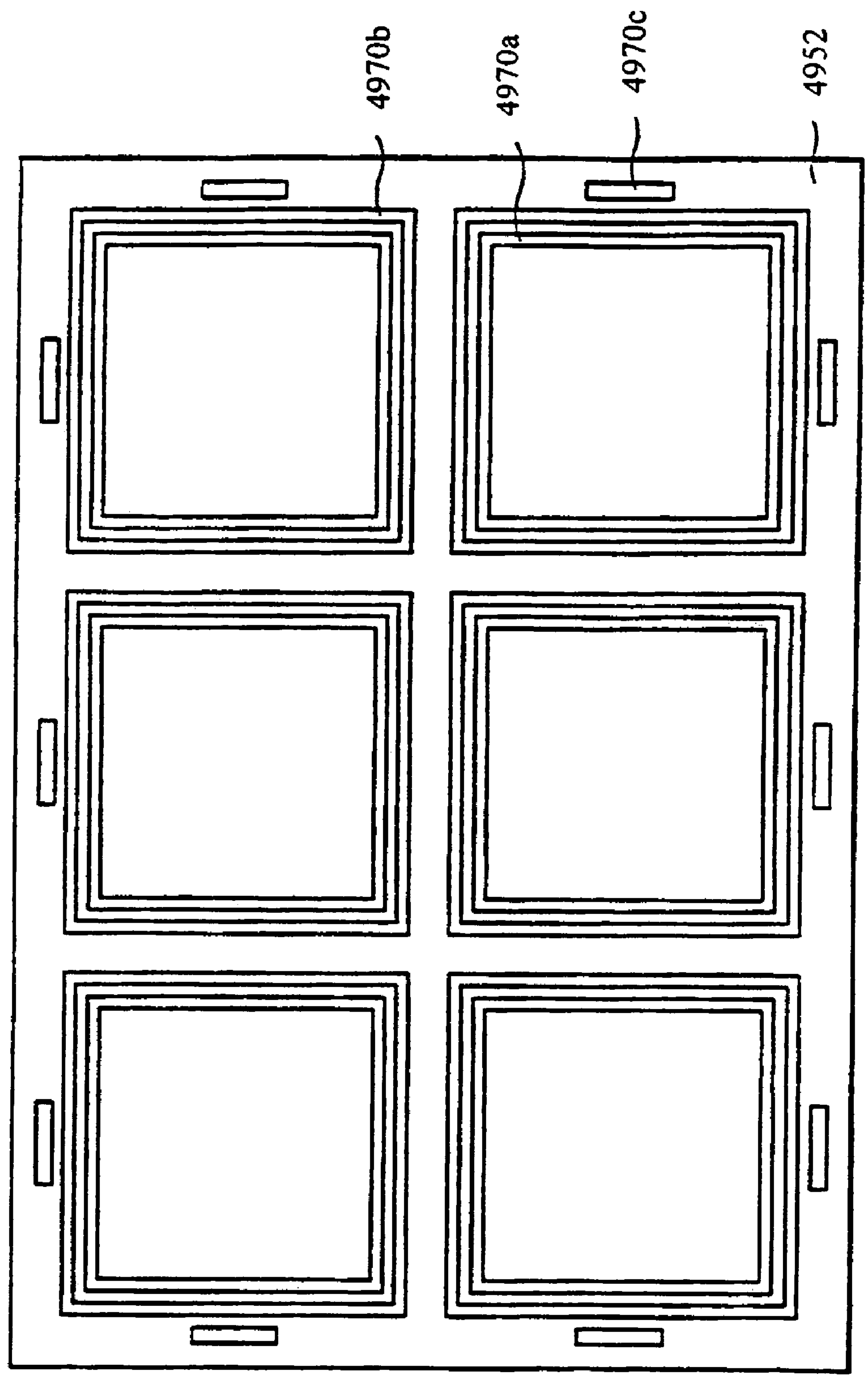
Figure 158:
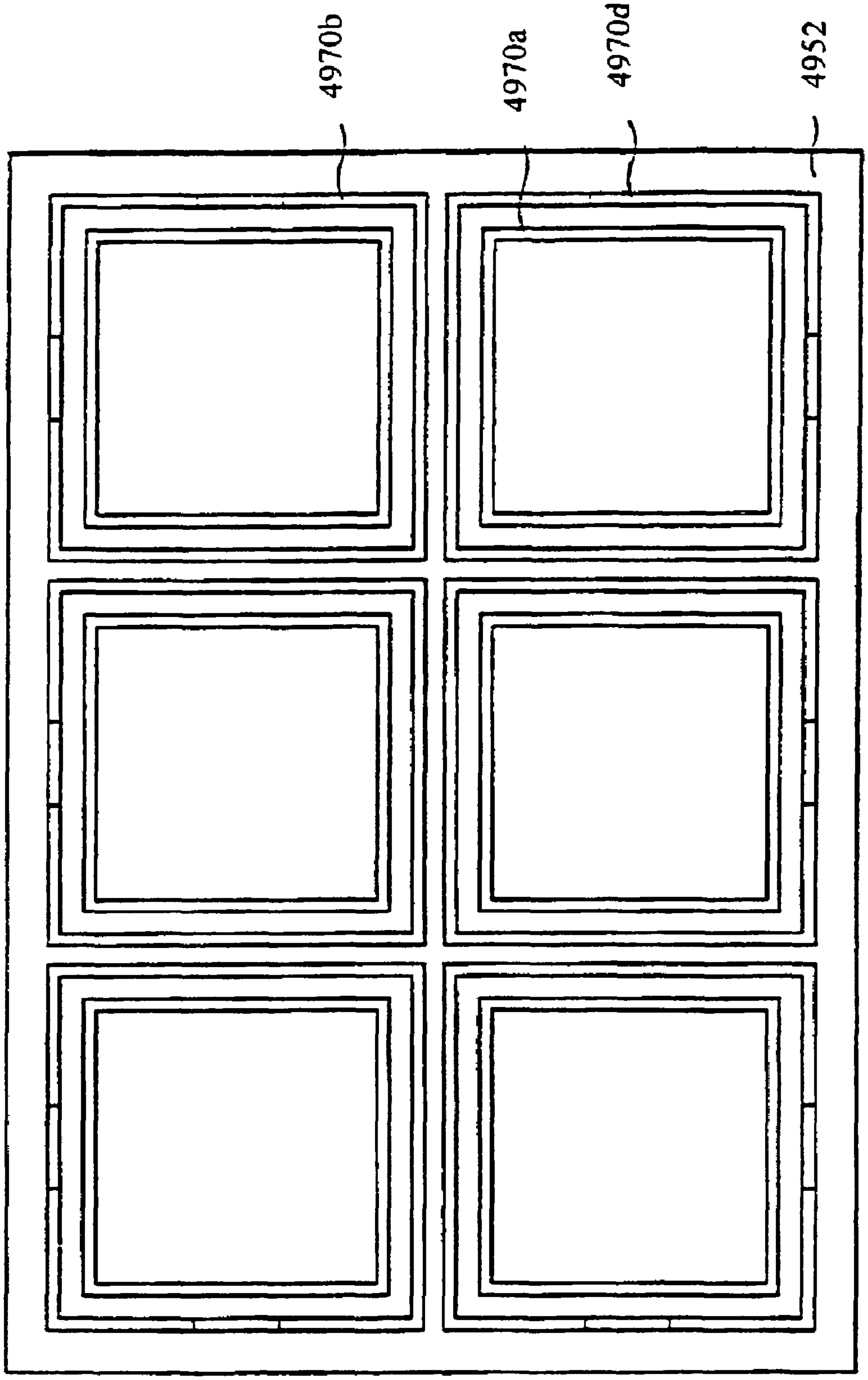
Figure 159:
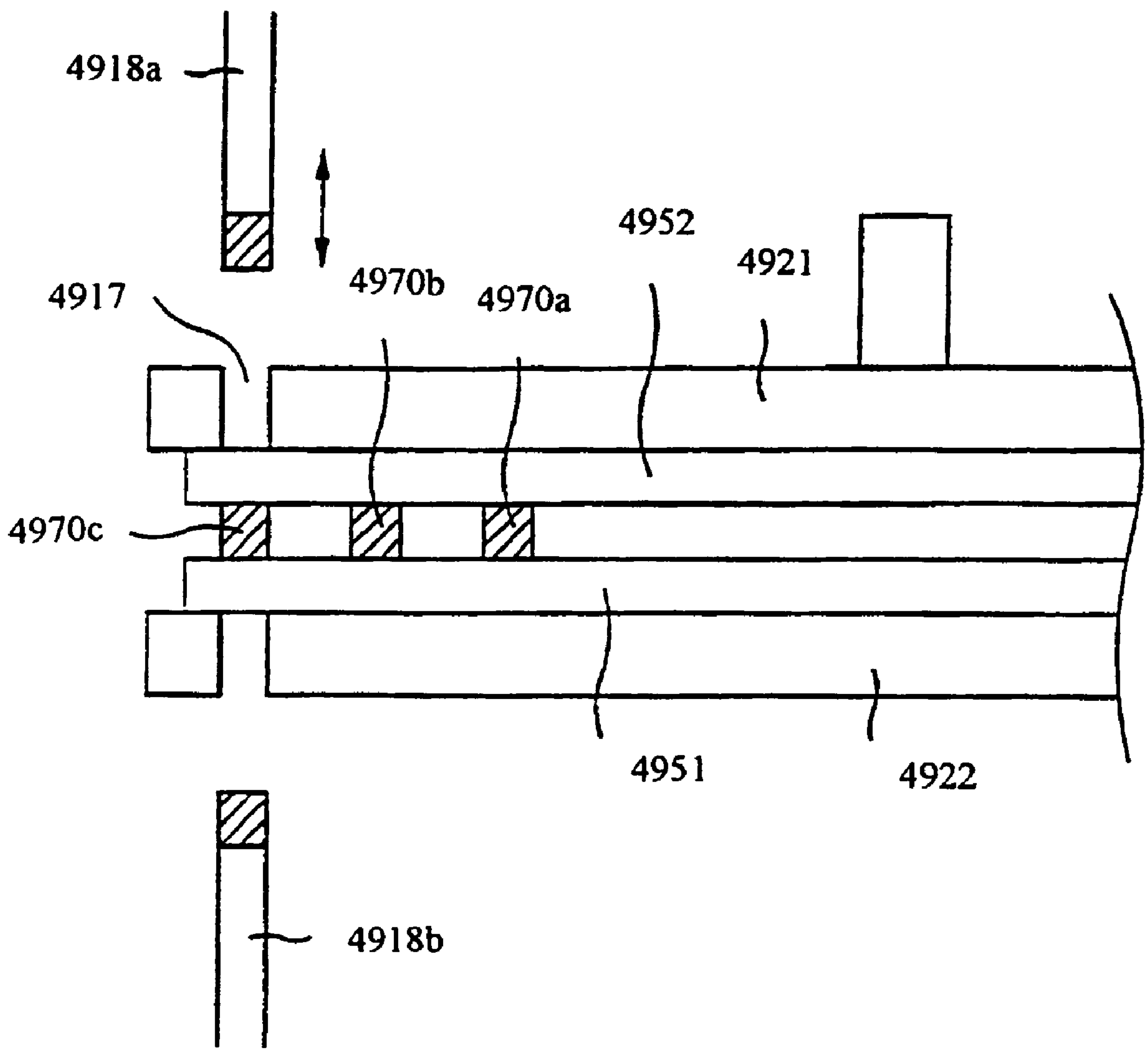
Figure 161:
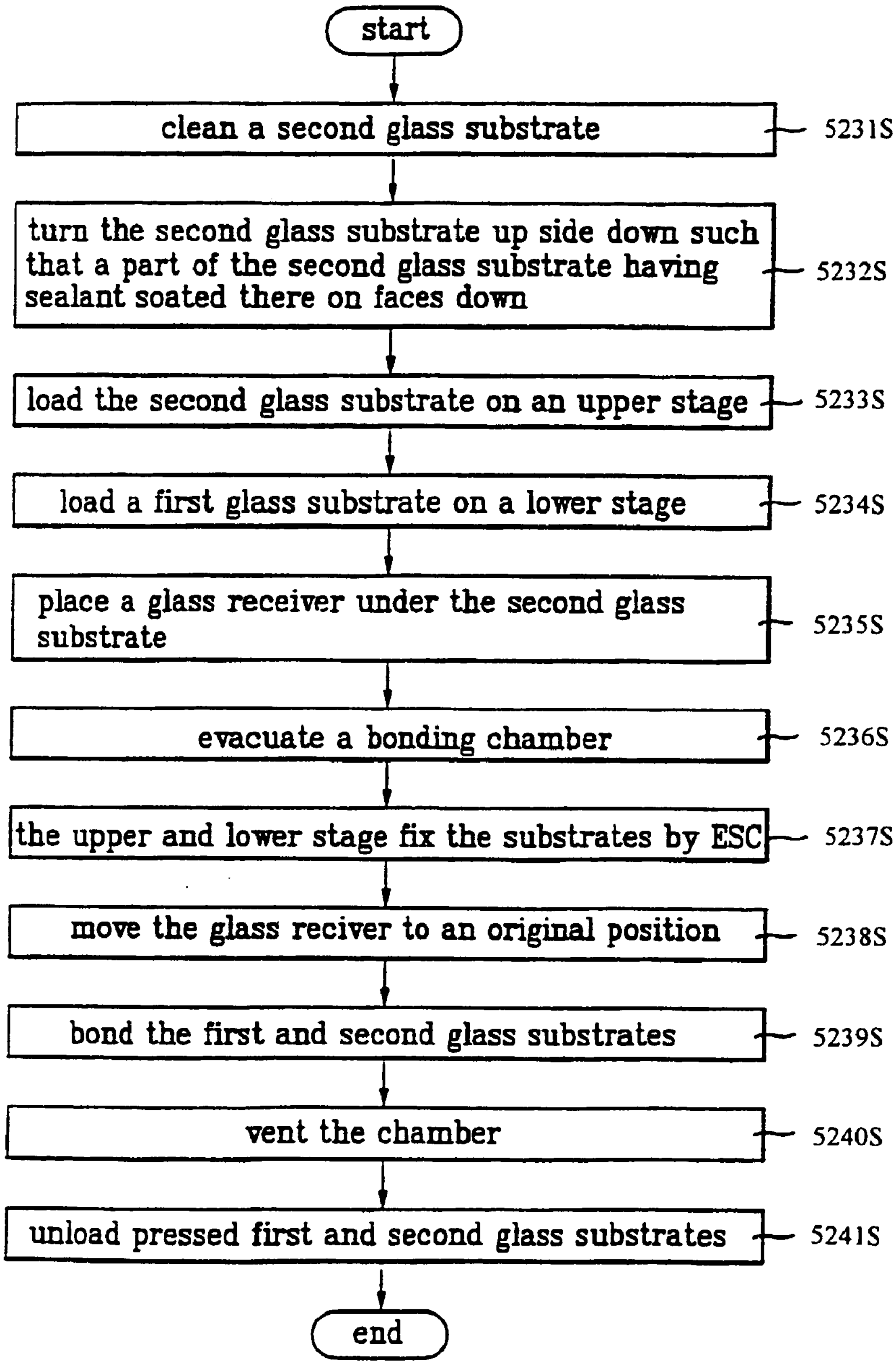
Figure 163A:
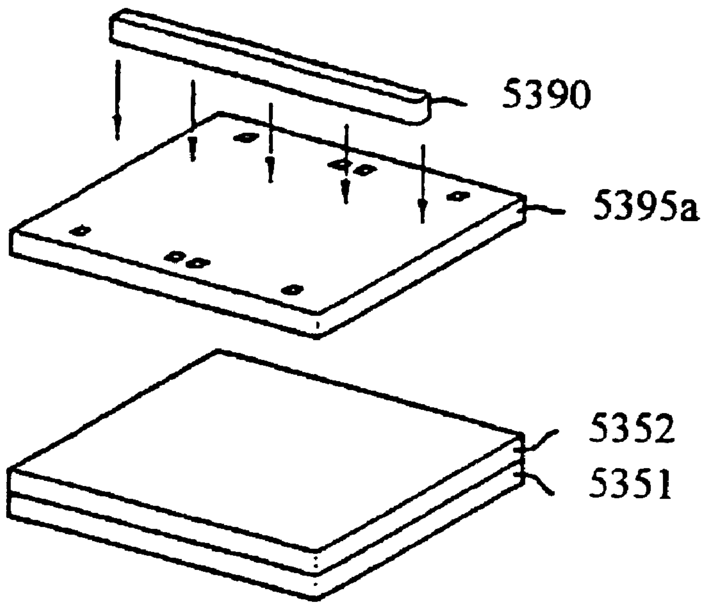
Figure 163B:
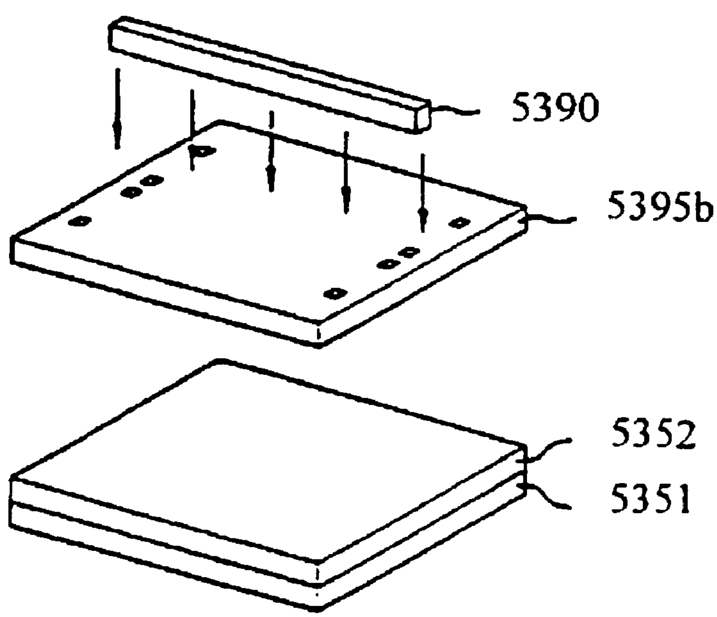
Figure 163C:
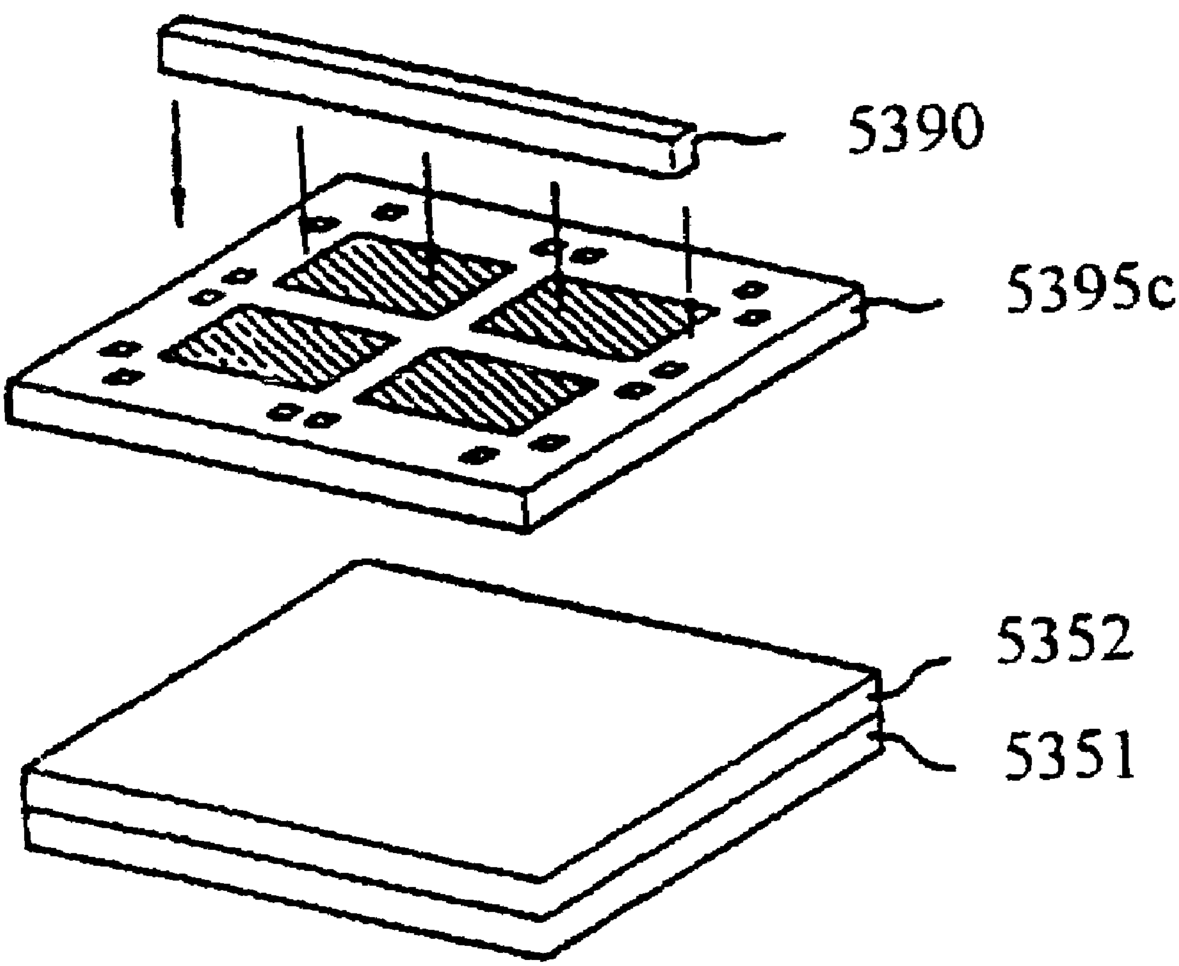
Figure 164:
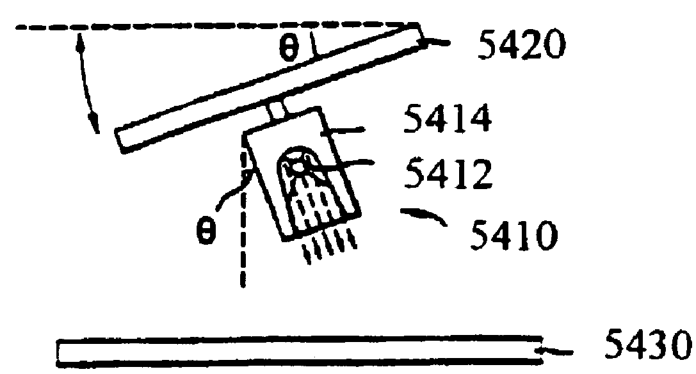
Figure 165A:
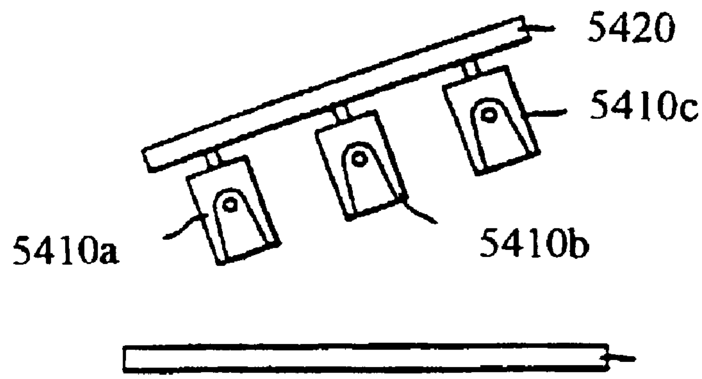
Figure 165B:
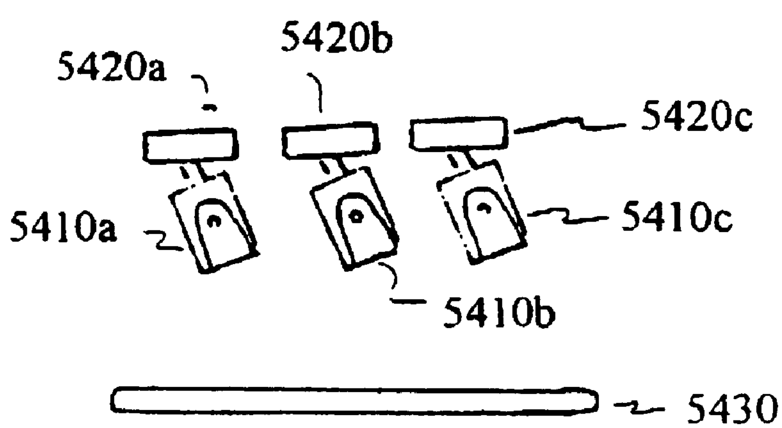
Figure 166:
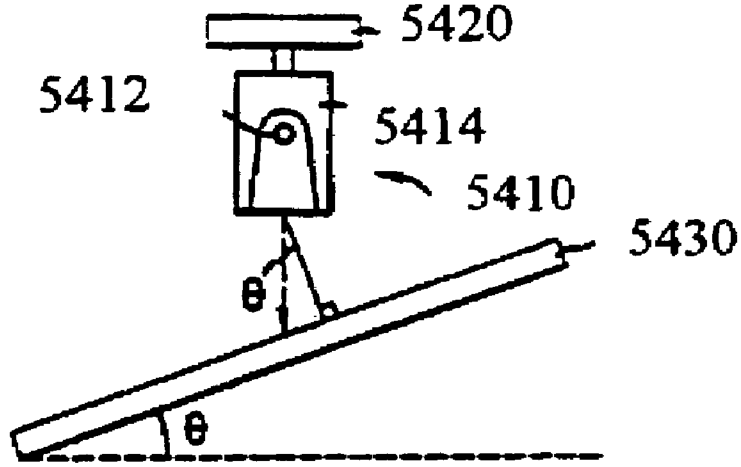
Figure 167:
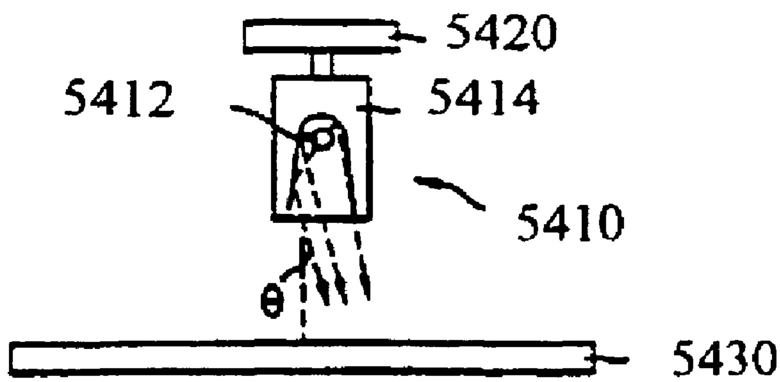
Figures 169A, 169B:
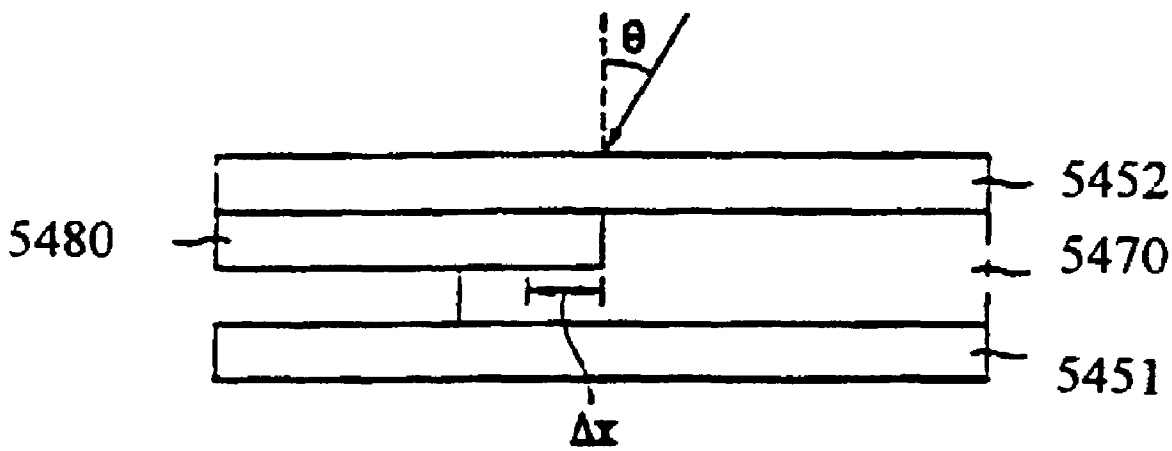
Figure 172:
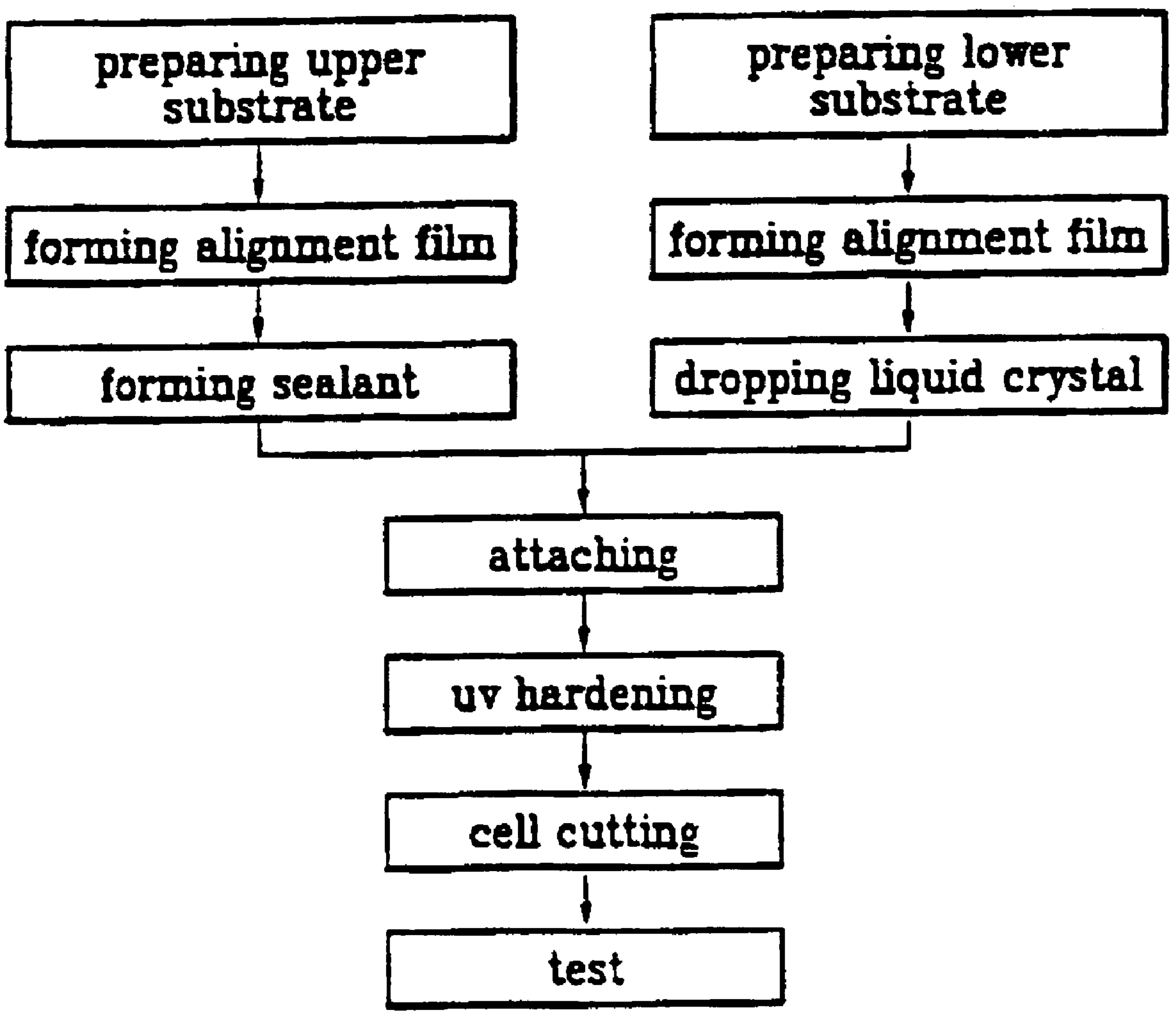
Figure 173:
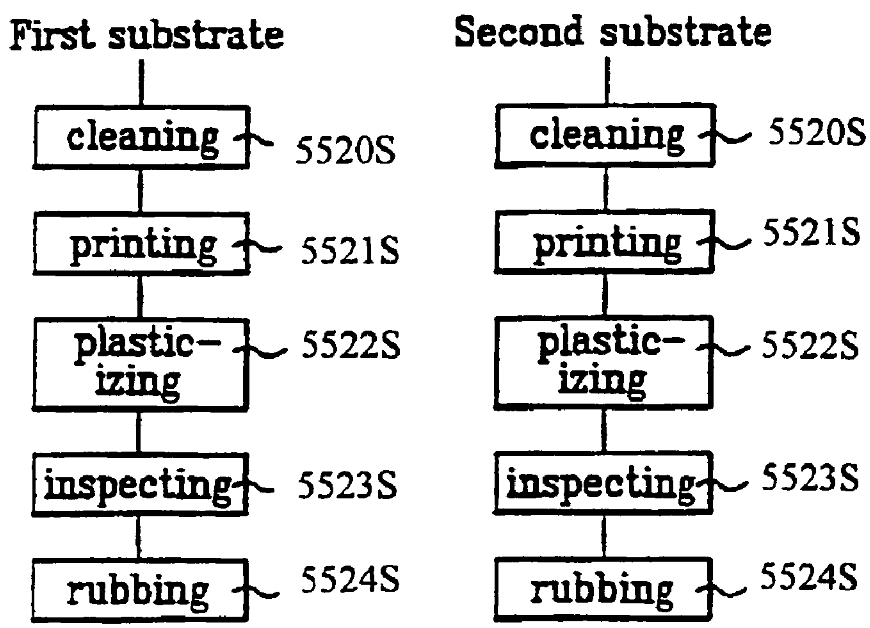
Figure 174:
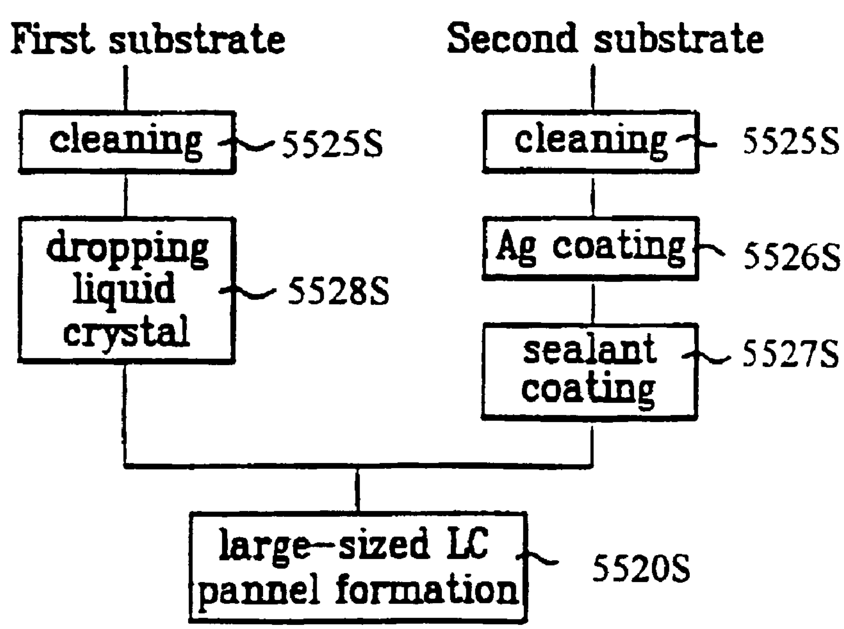
Figure 175:
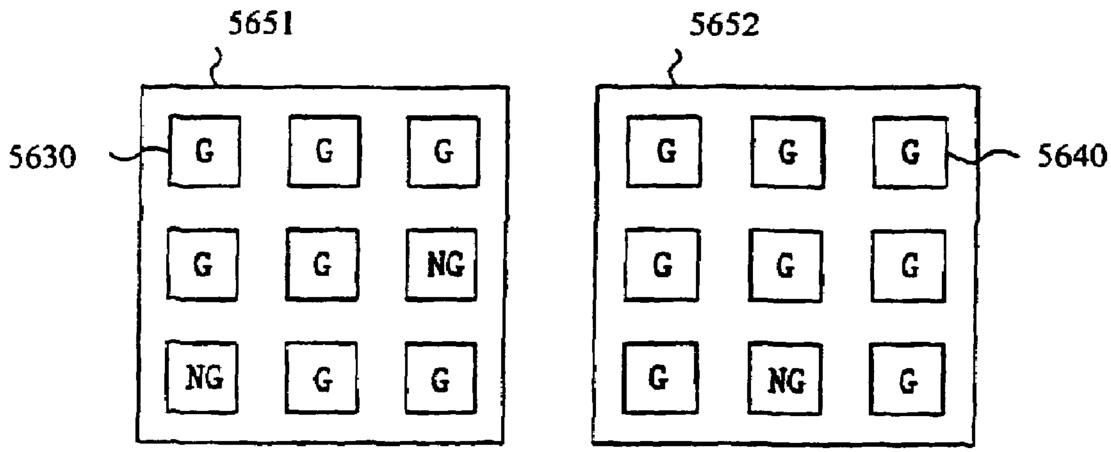
Figure 176:
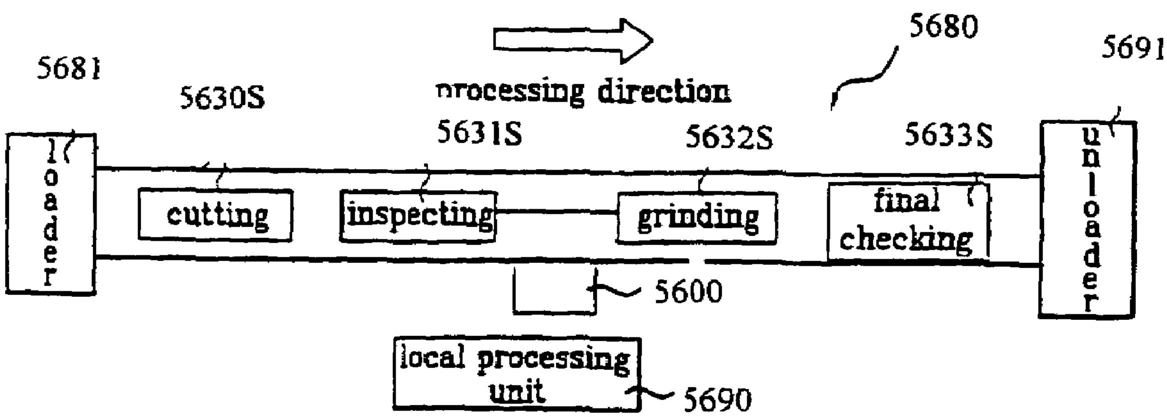
Figure 177:
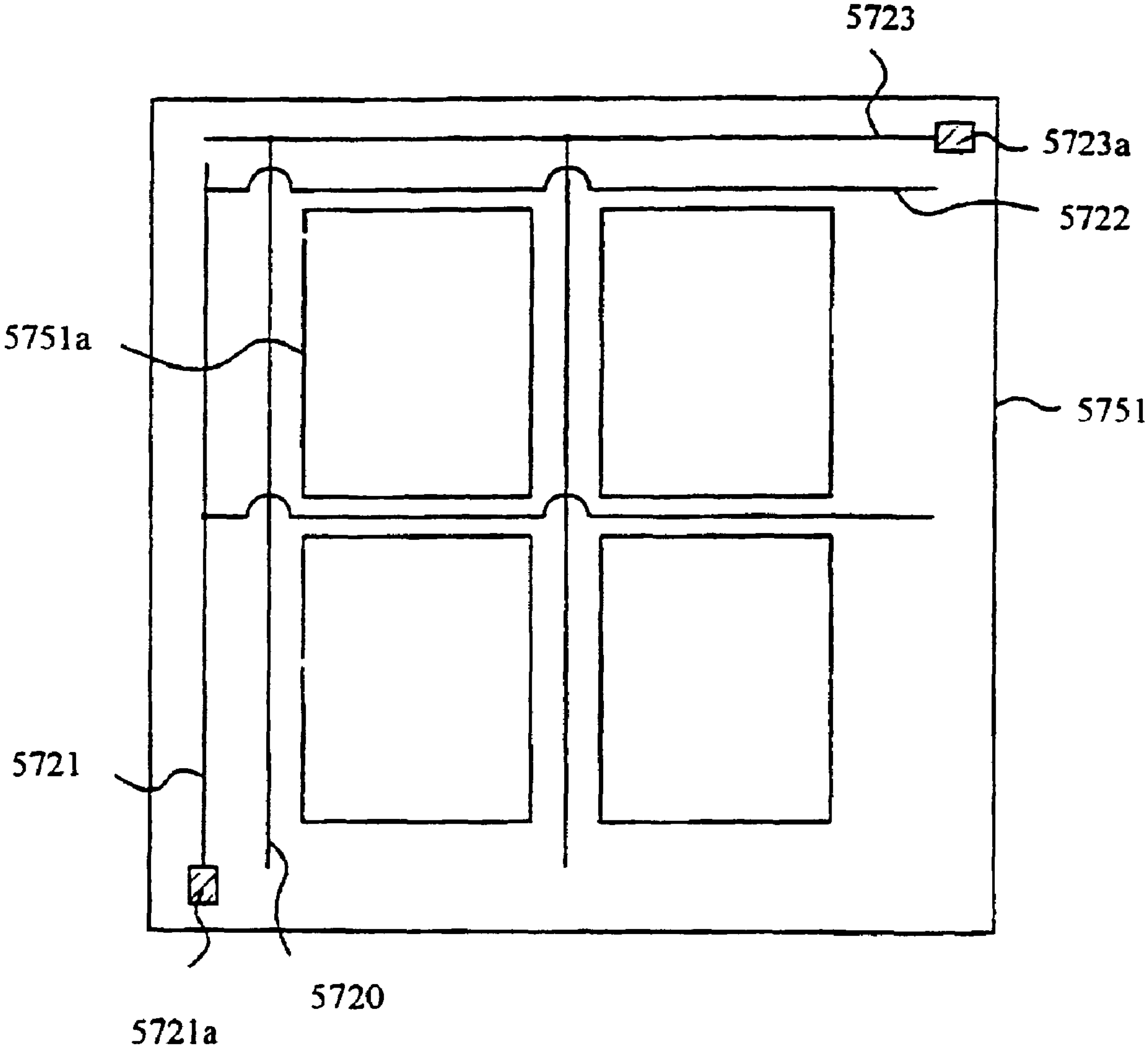
Figure 178:
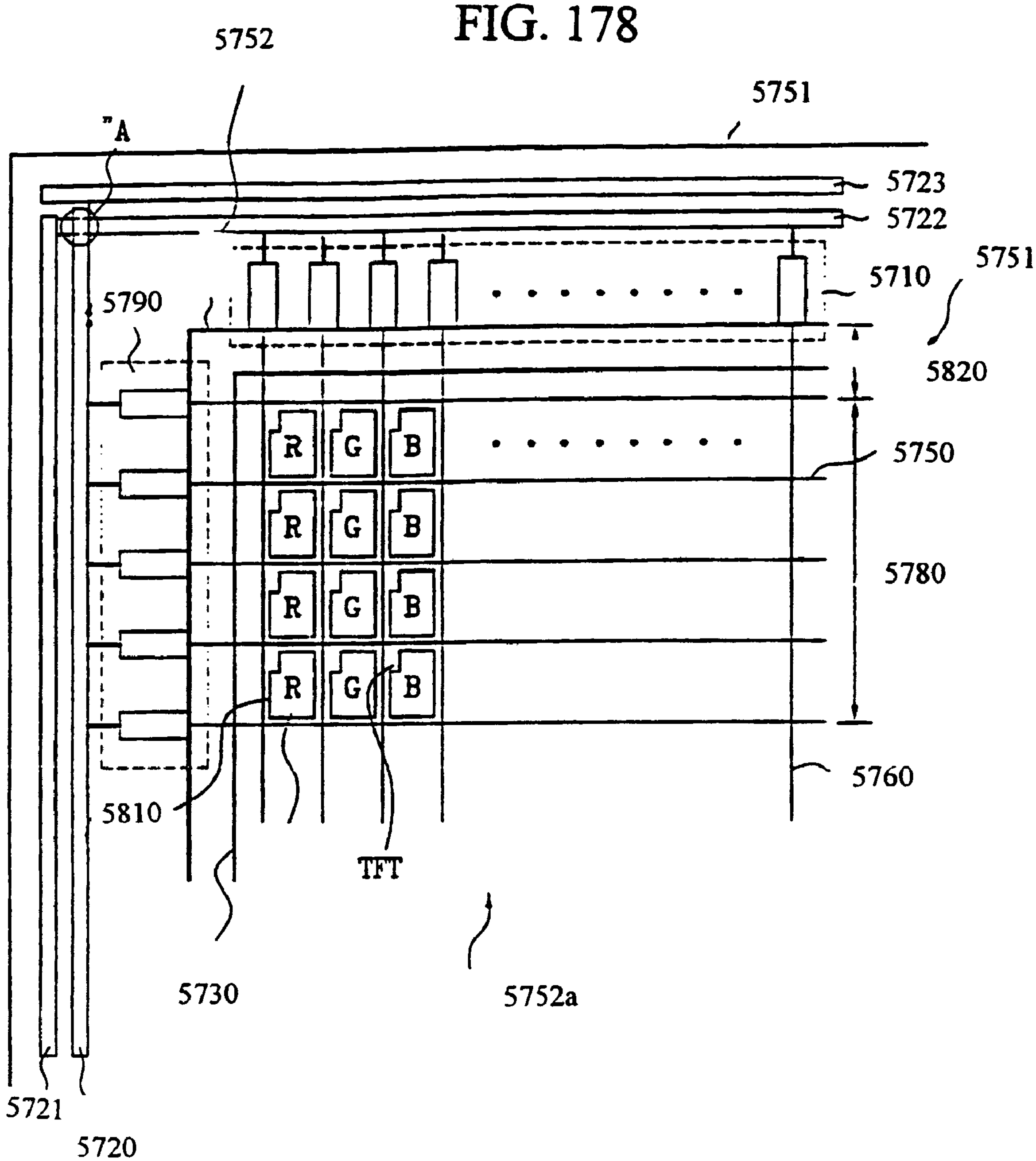
Figure 179:
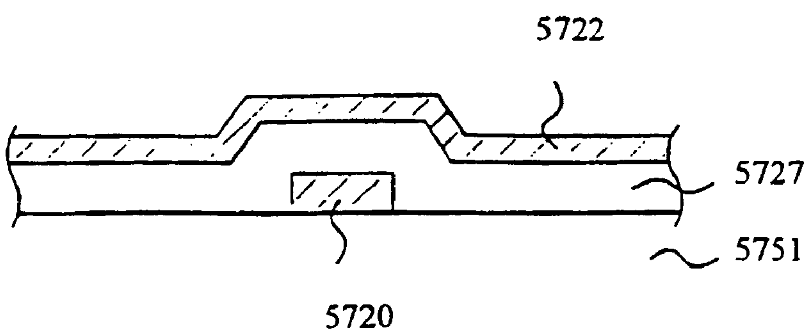
Figure 180:
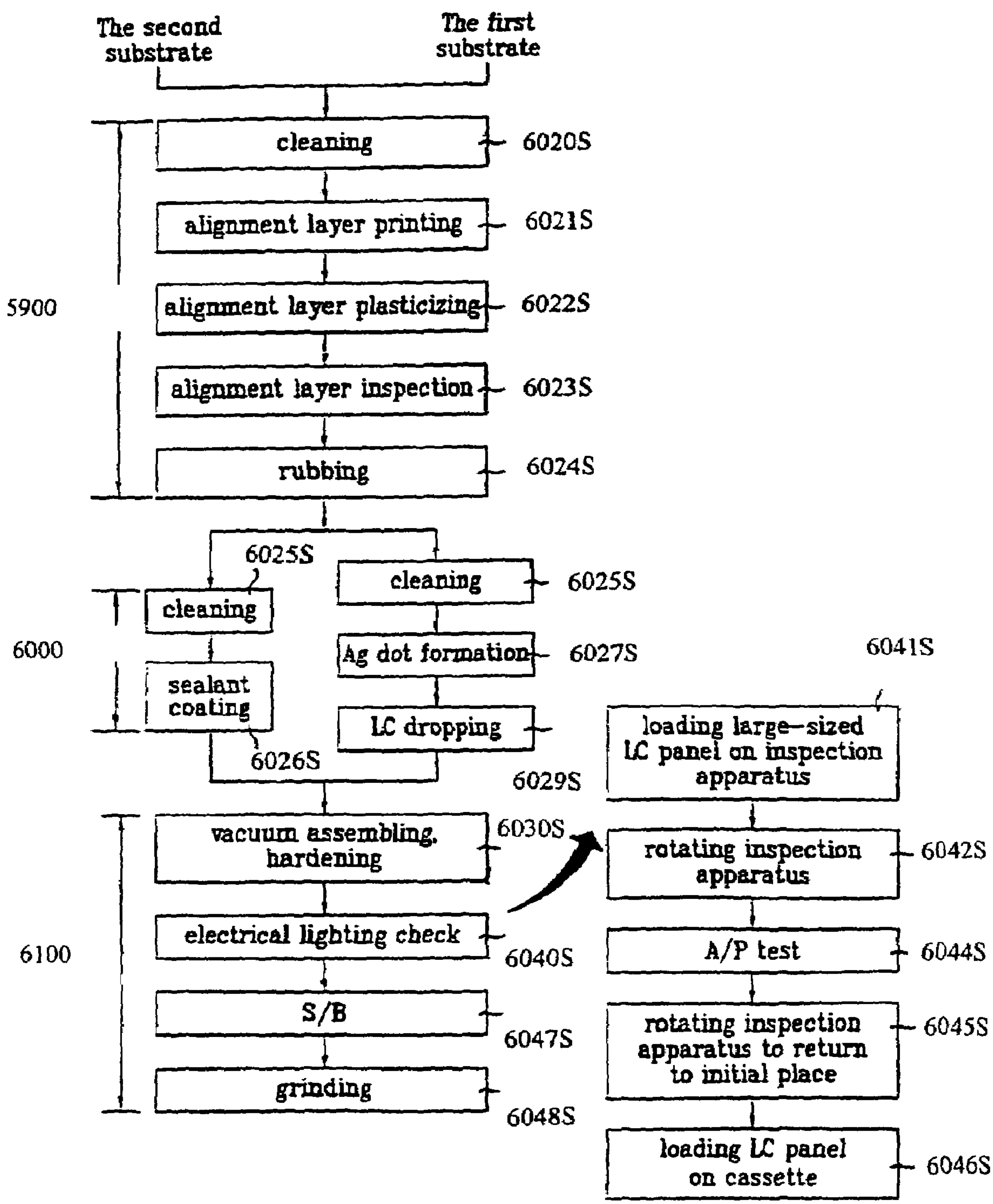
Figure 181:
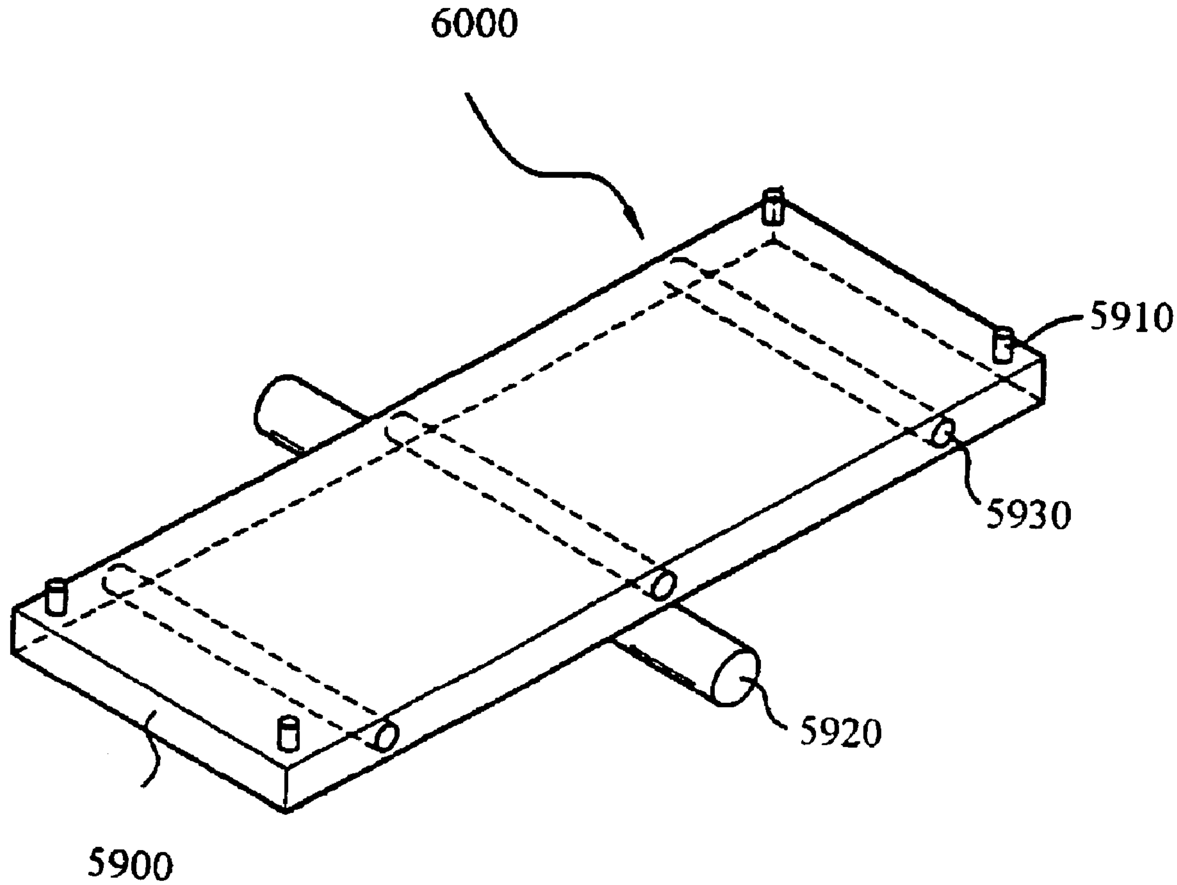
Figure 182:
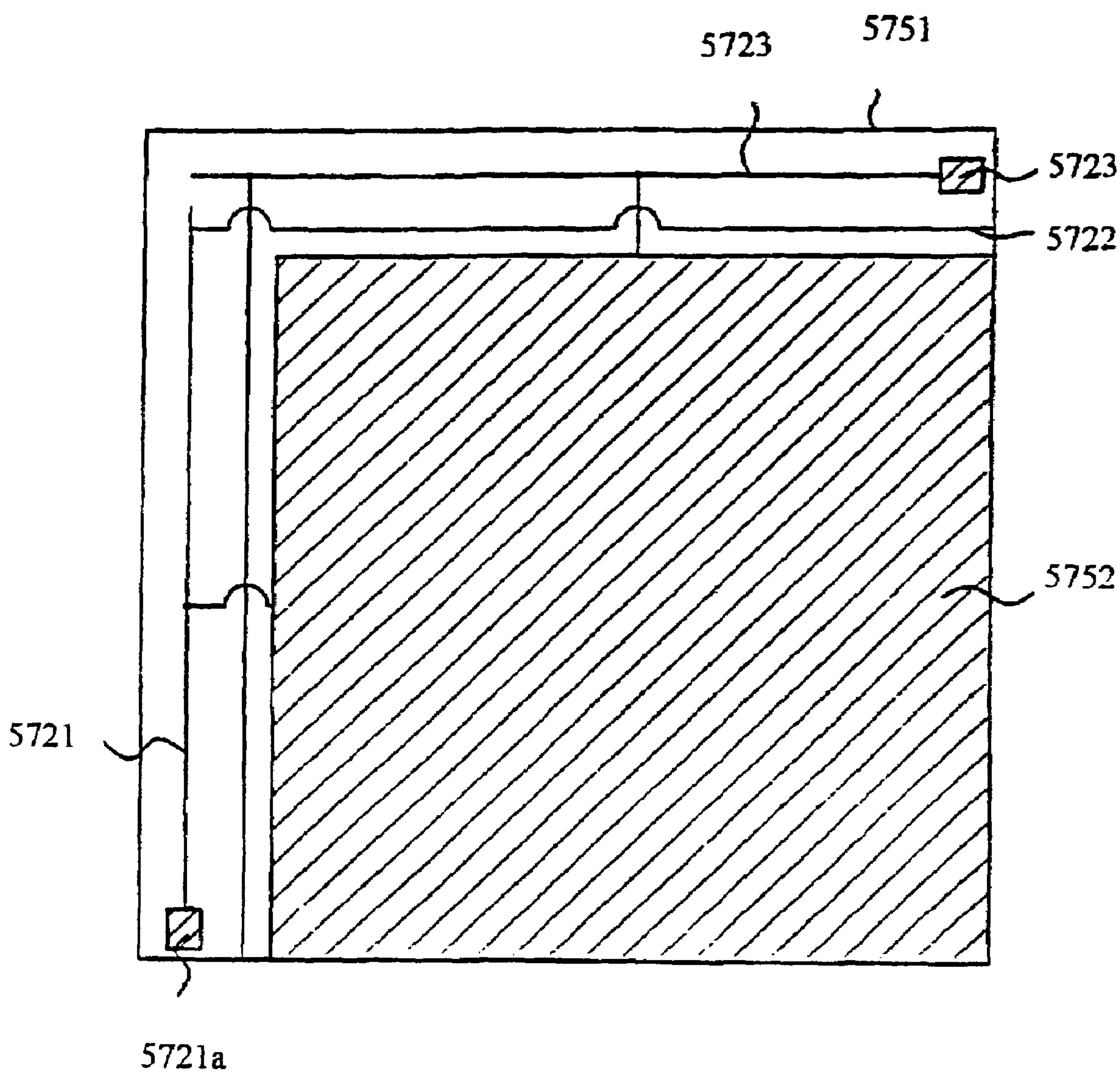
Figure 183:
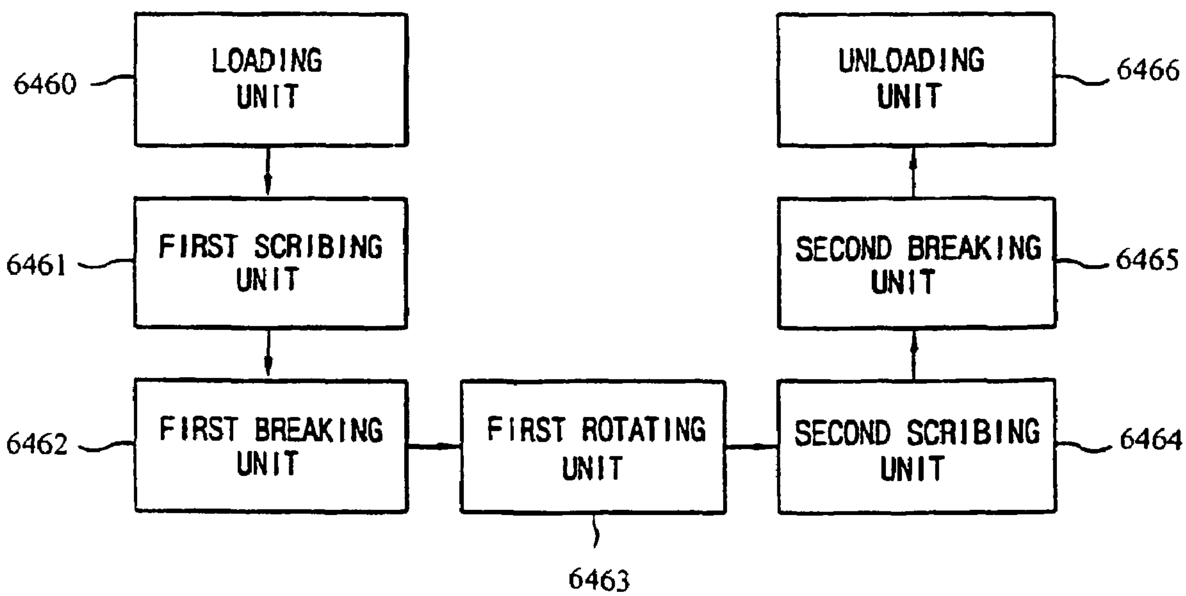
Figure 185:
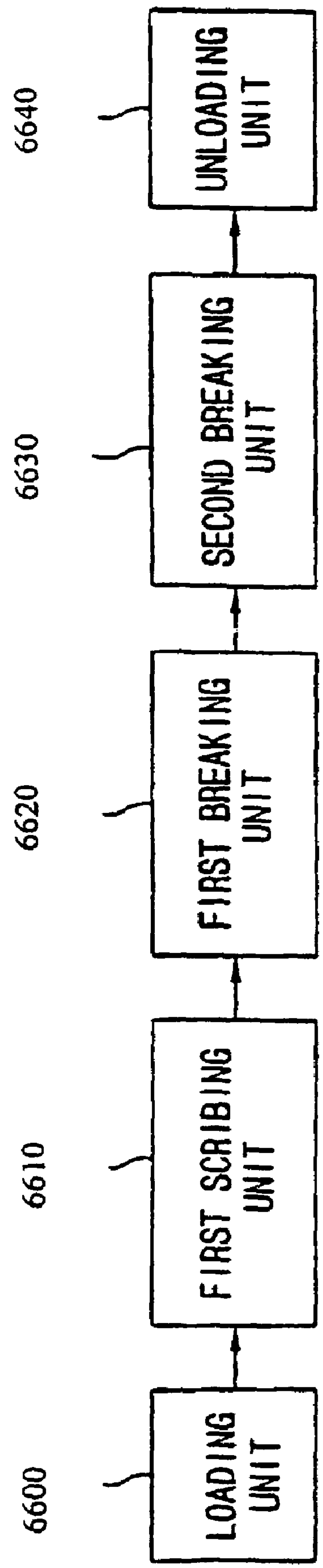
Figure 186A:
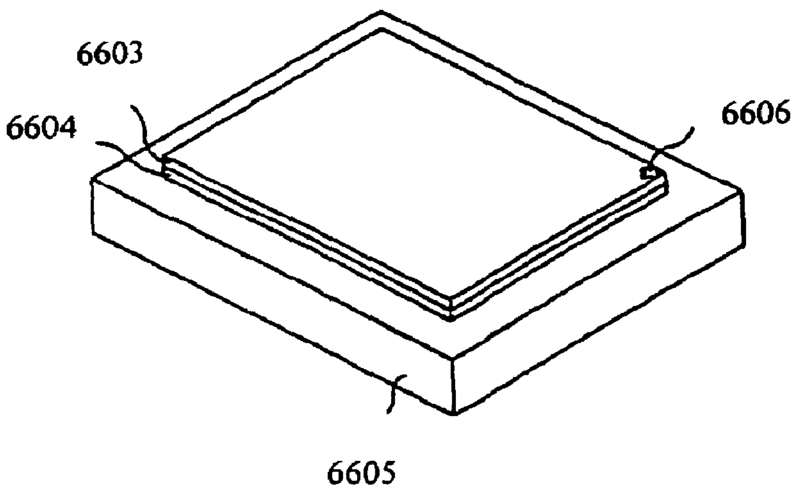
Figure 187A:
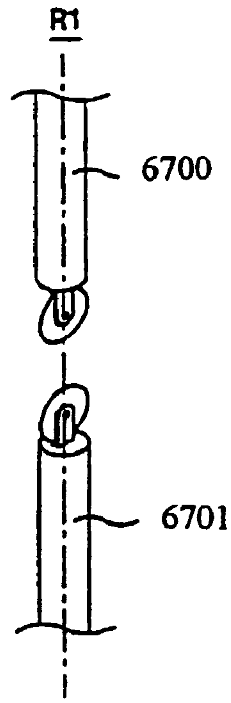
Figure 187B:
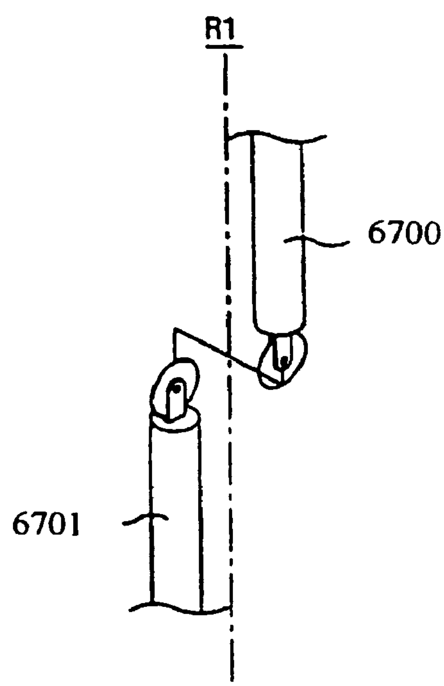
Figure 187C:
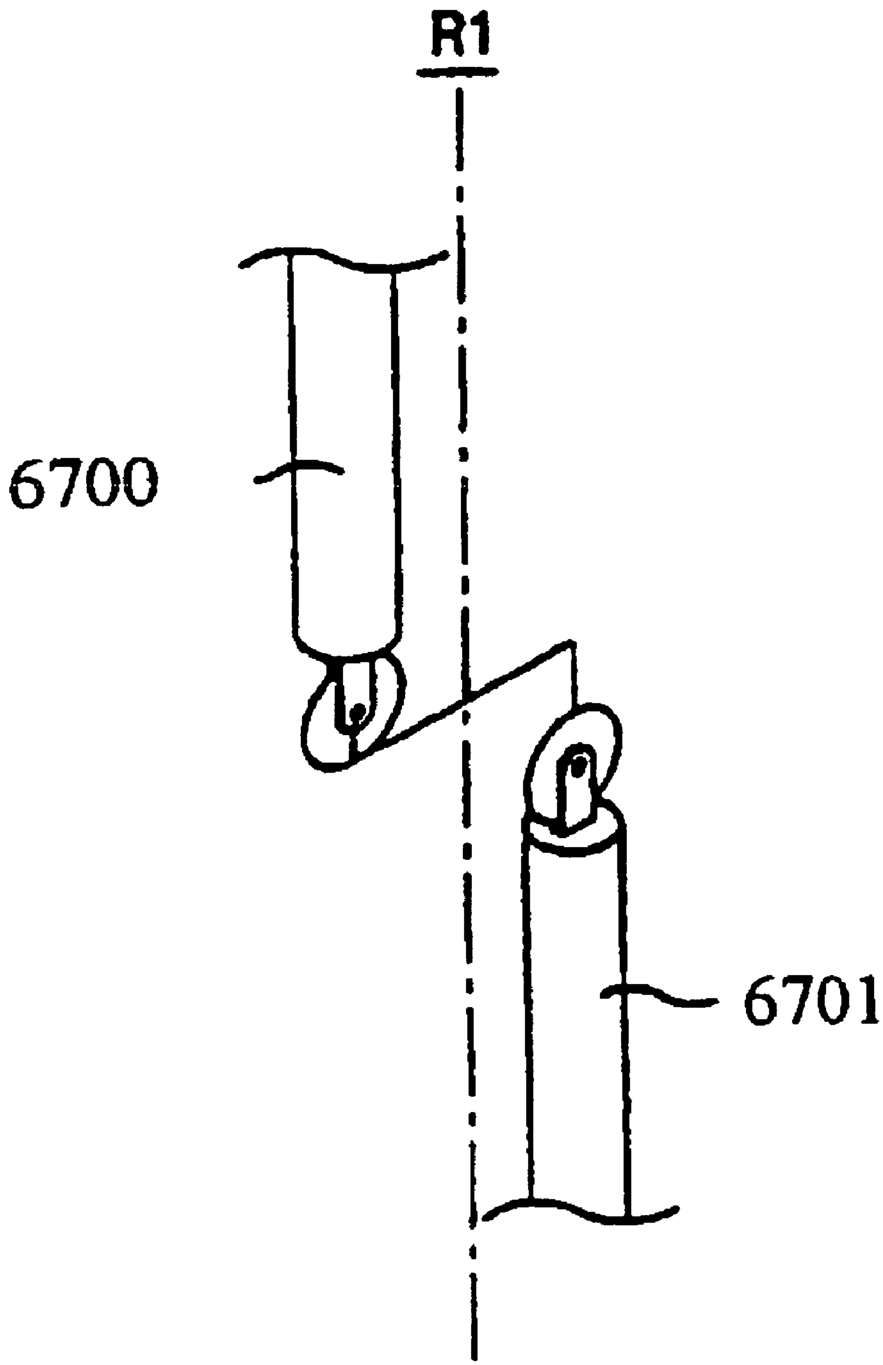
Figure 188:
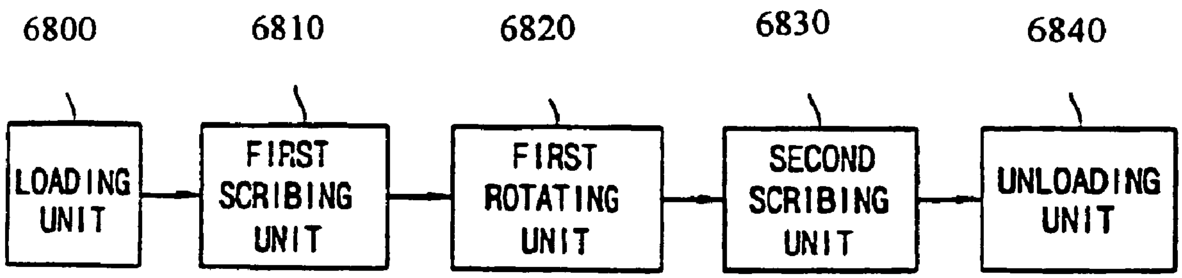
Figure 190:
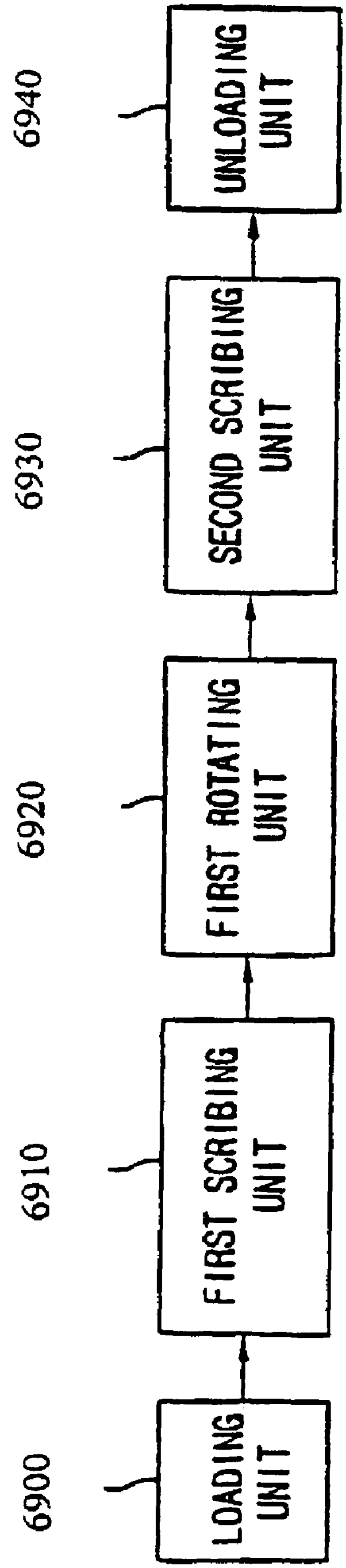
Figure 191A:
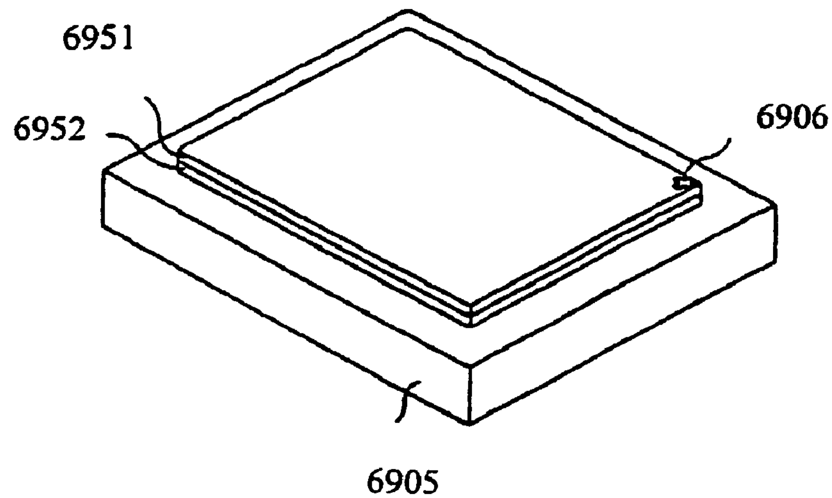
Figure 191B:
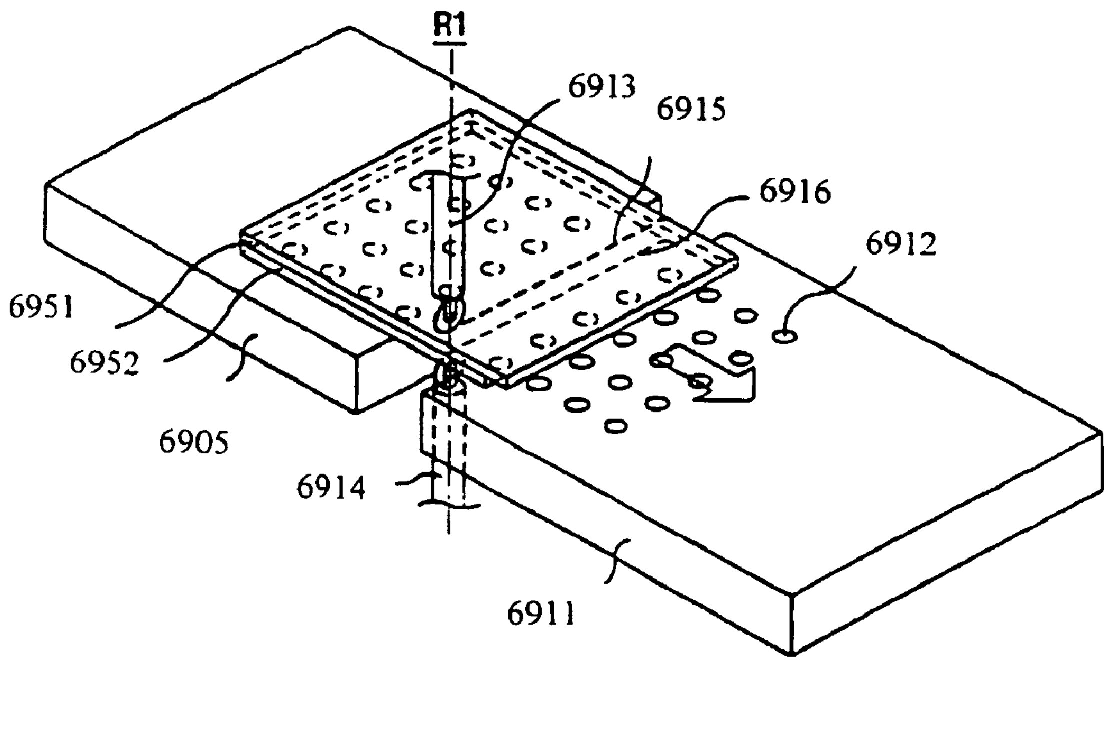
Figure 191C:
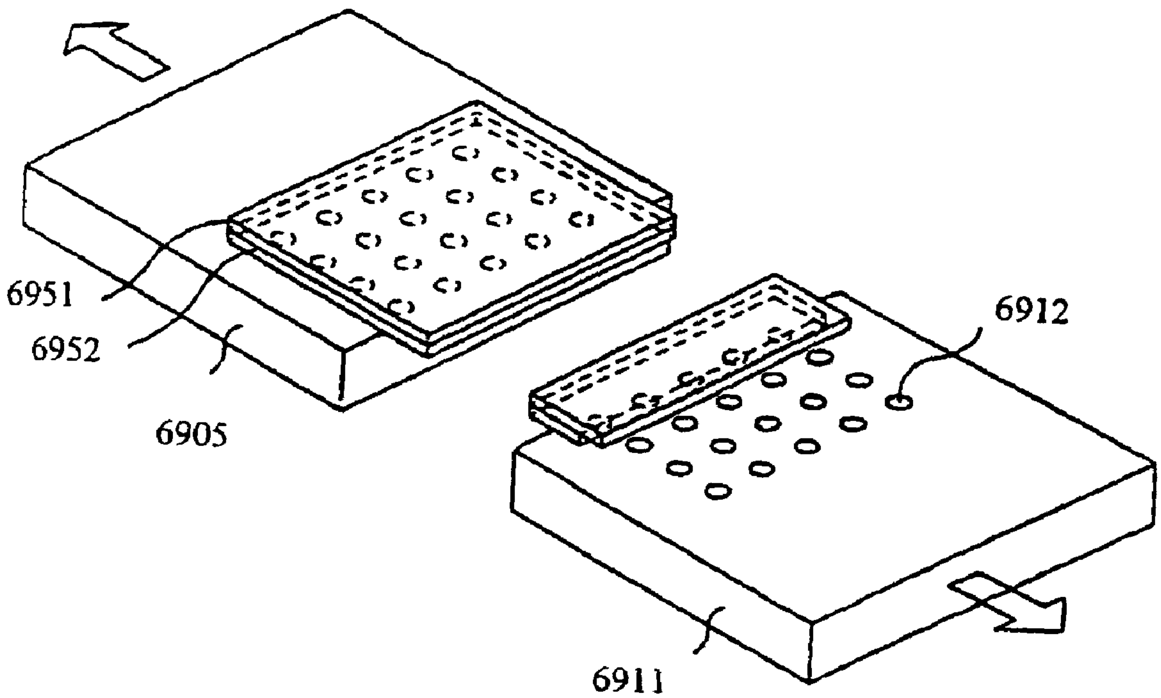
Figure 191D:
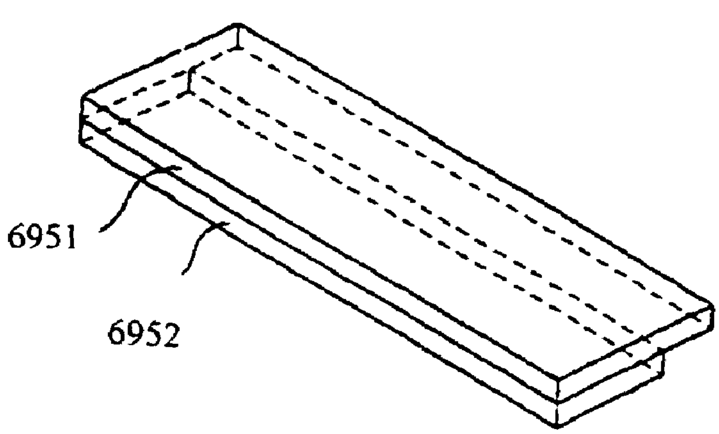
Figure 191E:
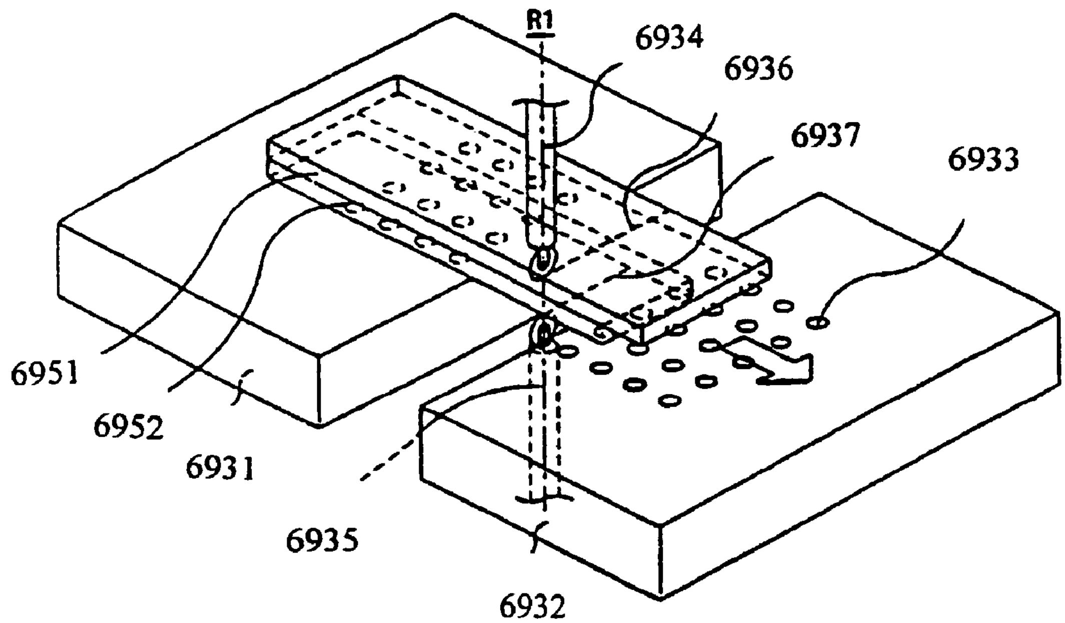
Figure 191F:
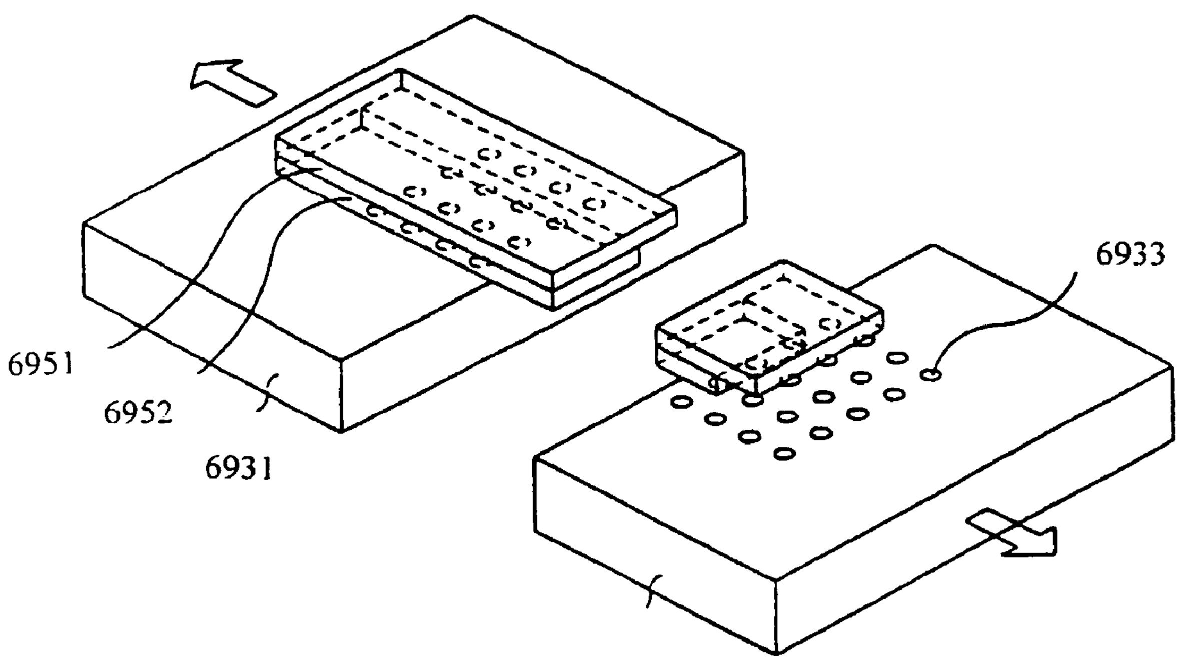
Figure 191G:
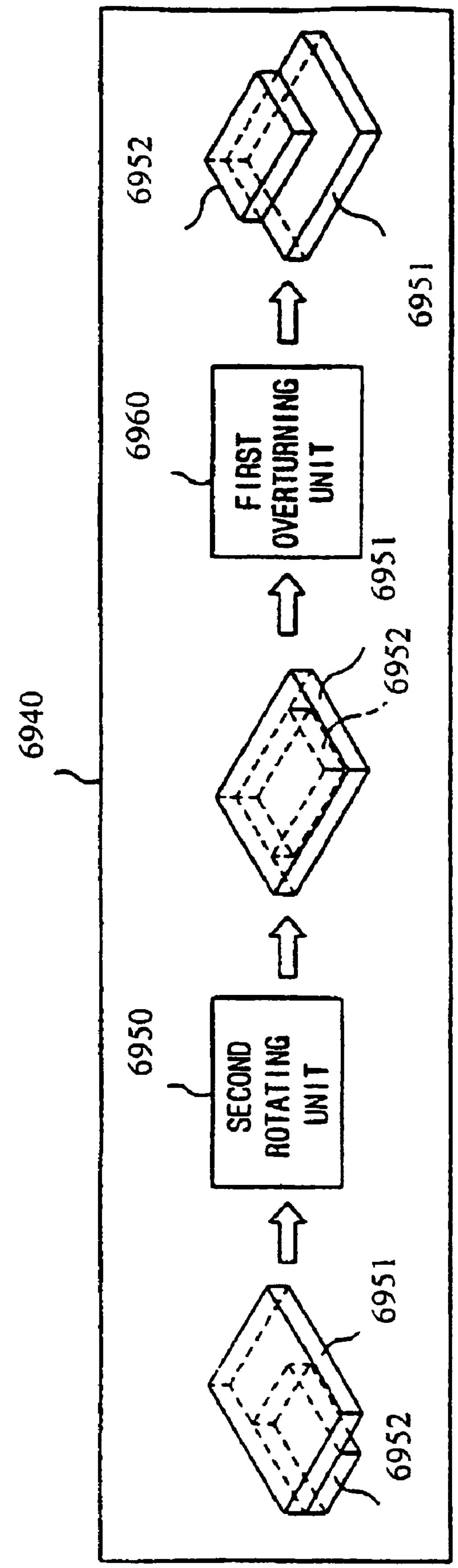
Figure 192:
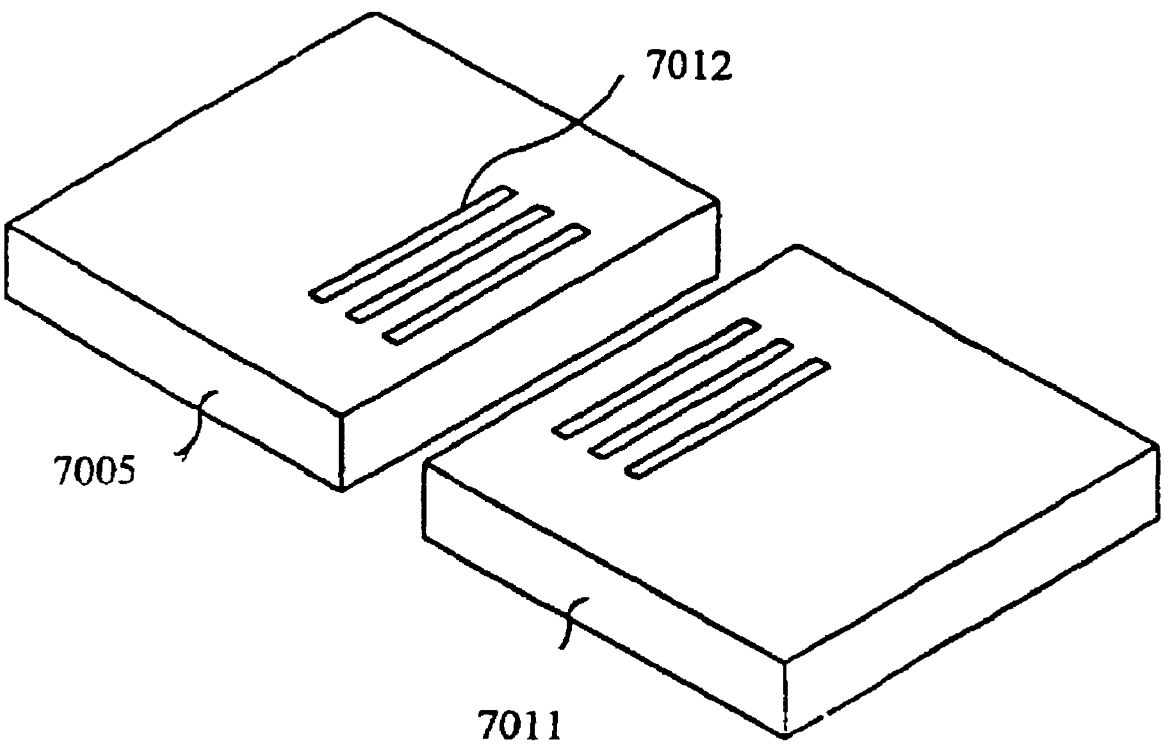
Figure 193A:
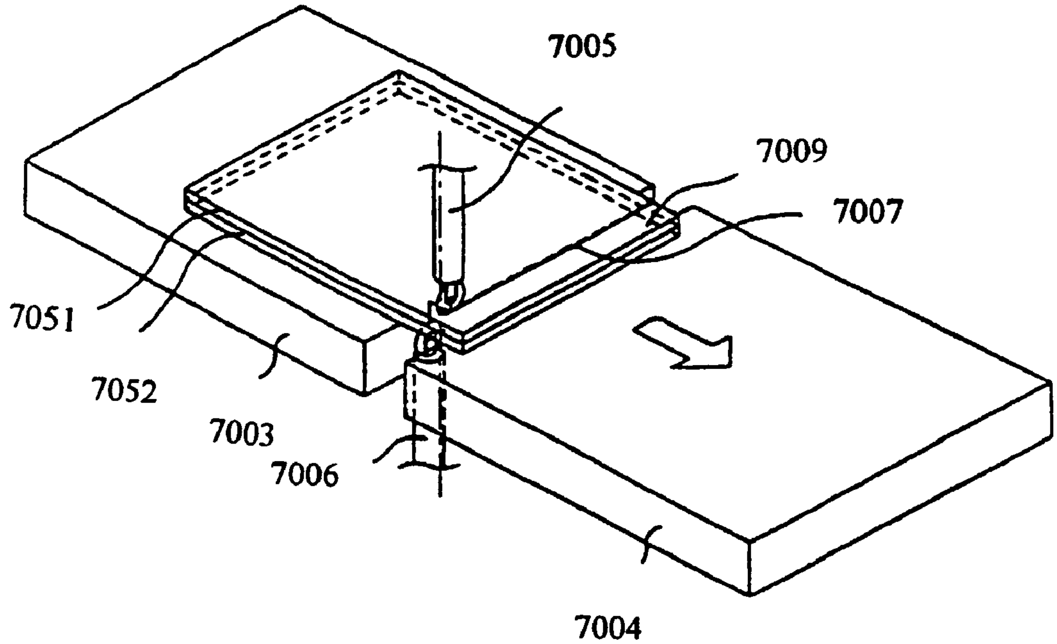
Figure 193B:
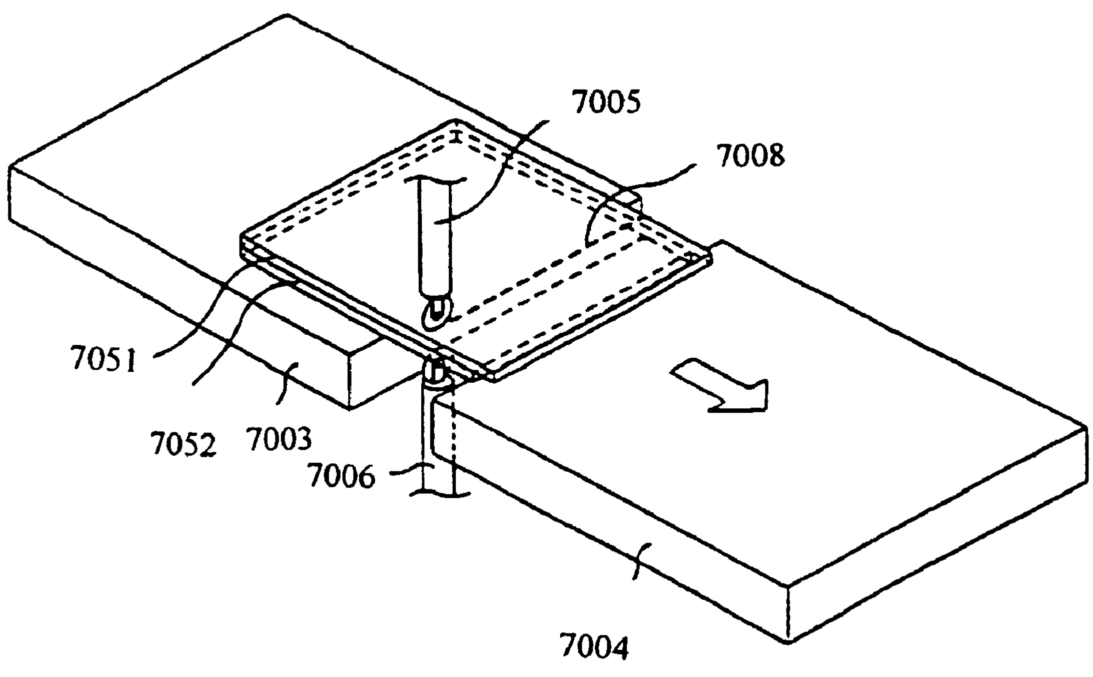
Figure 195:
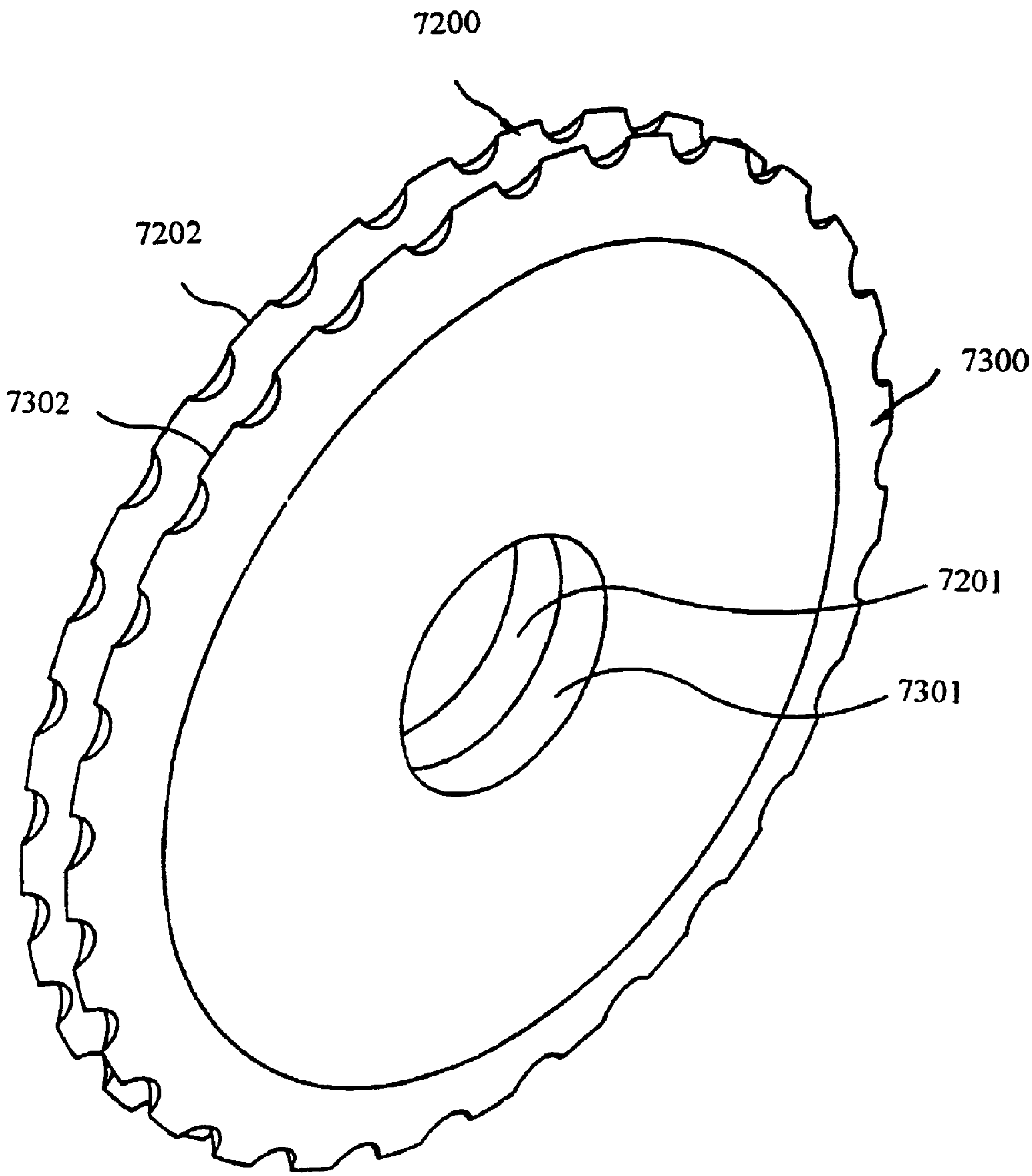
Figure 196:
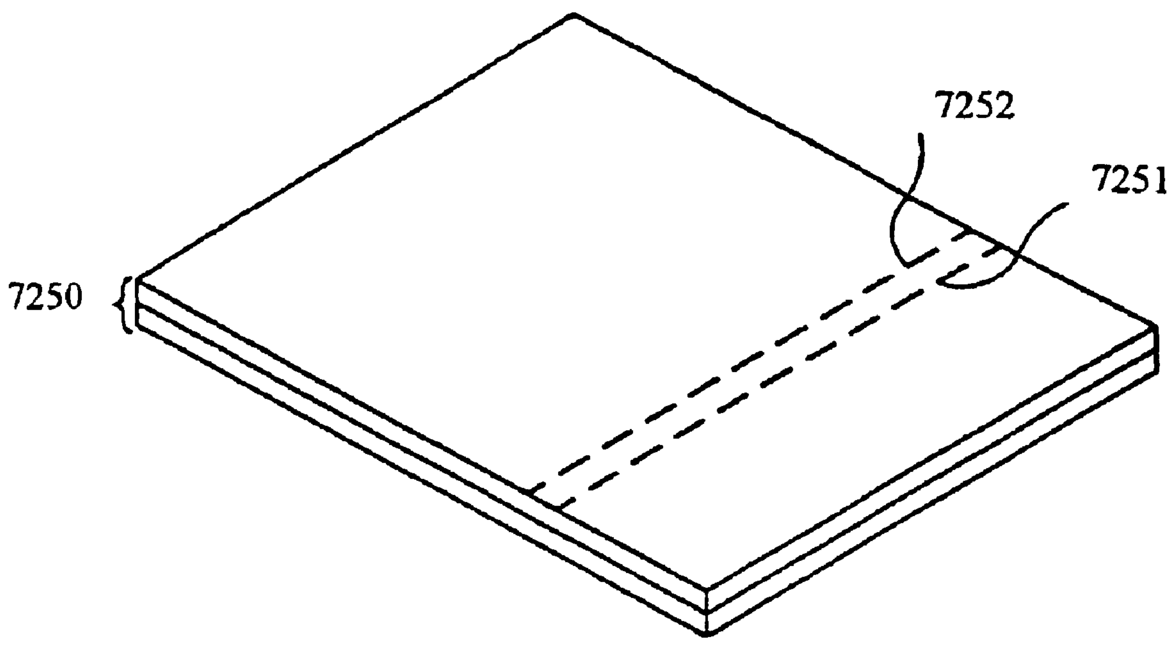
Figure 197:
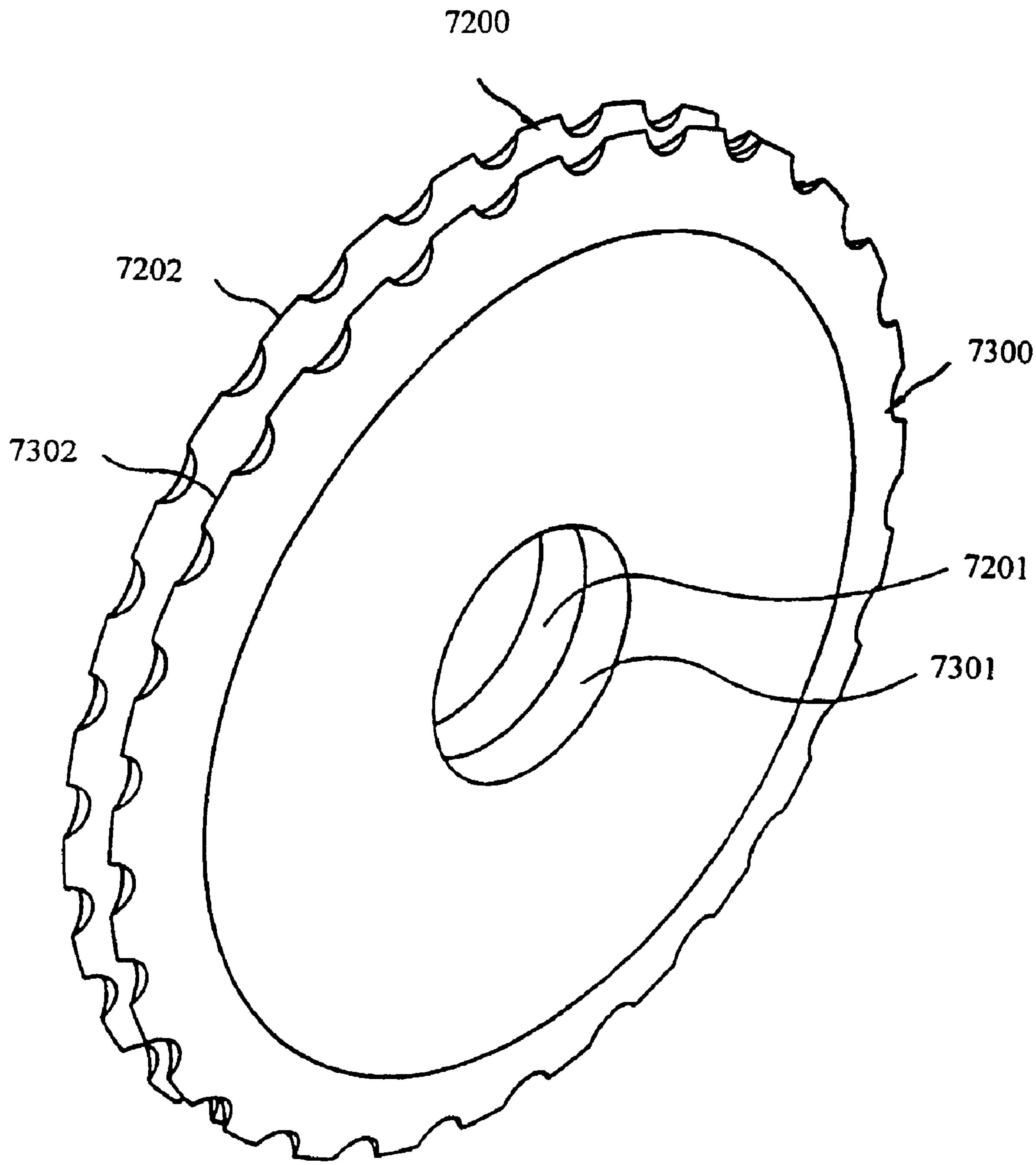
Figure 198:
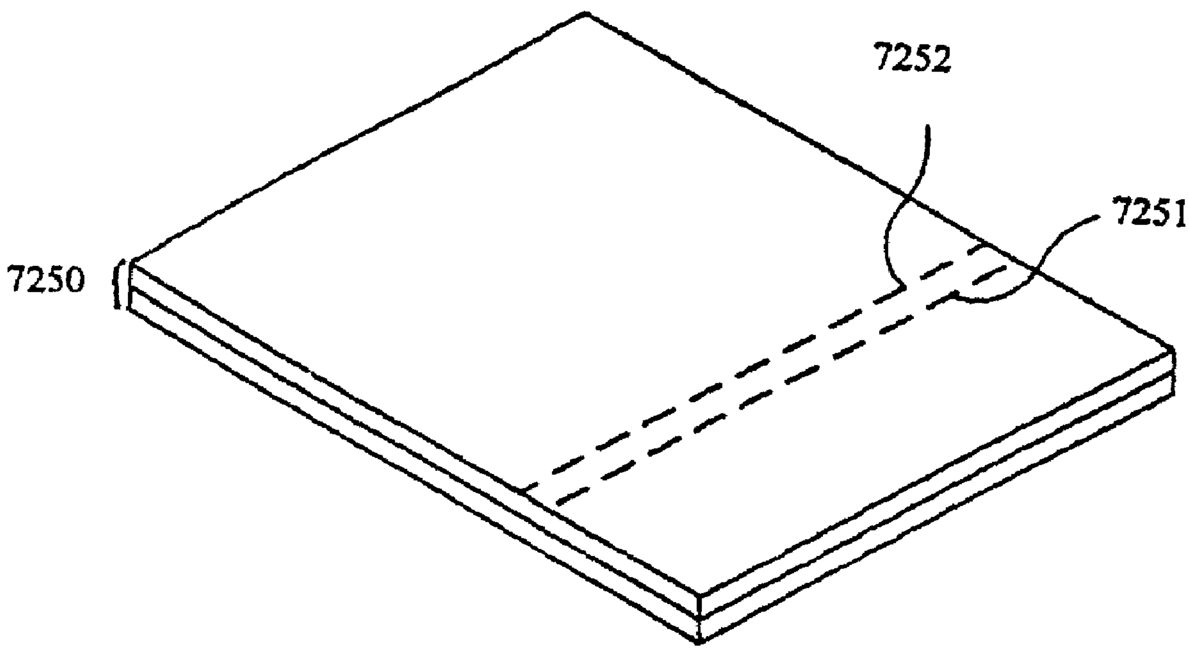
Figure 199:
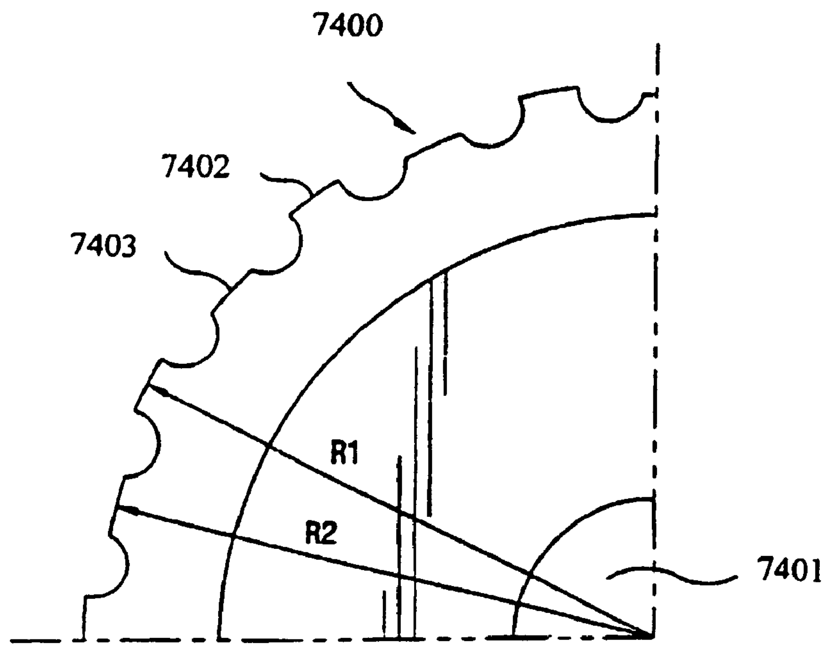
Figure 200:
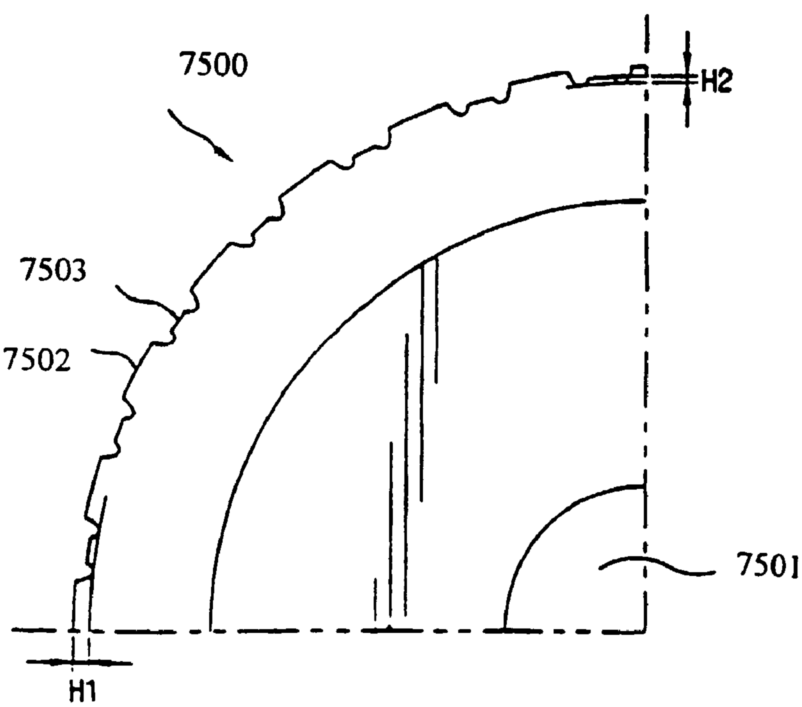
Figure 201:
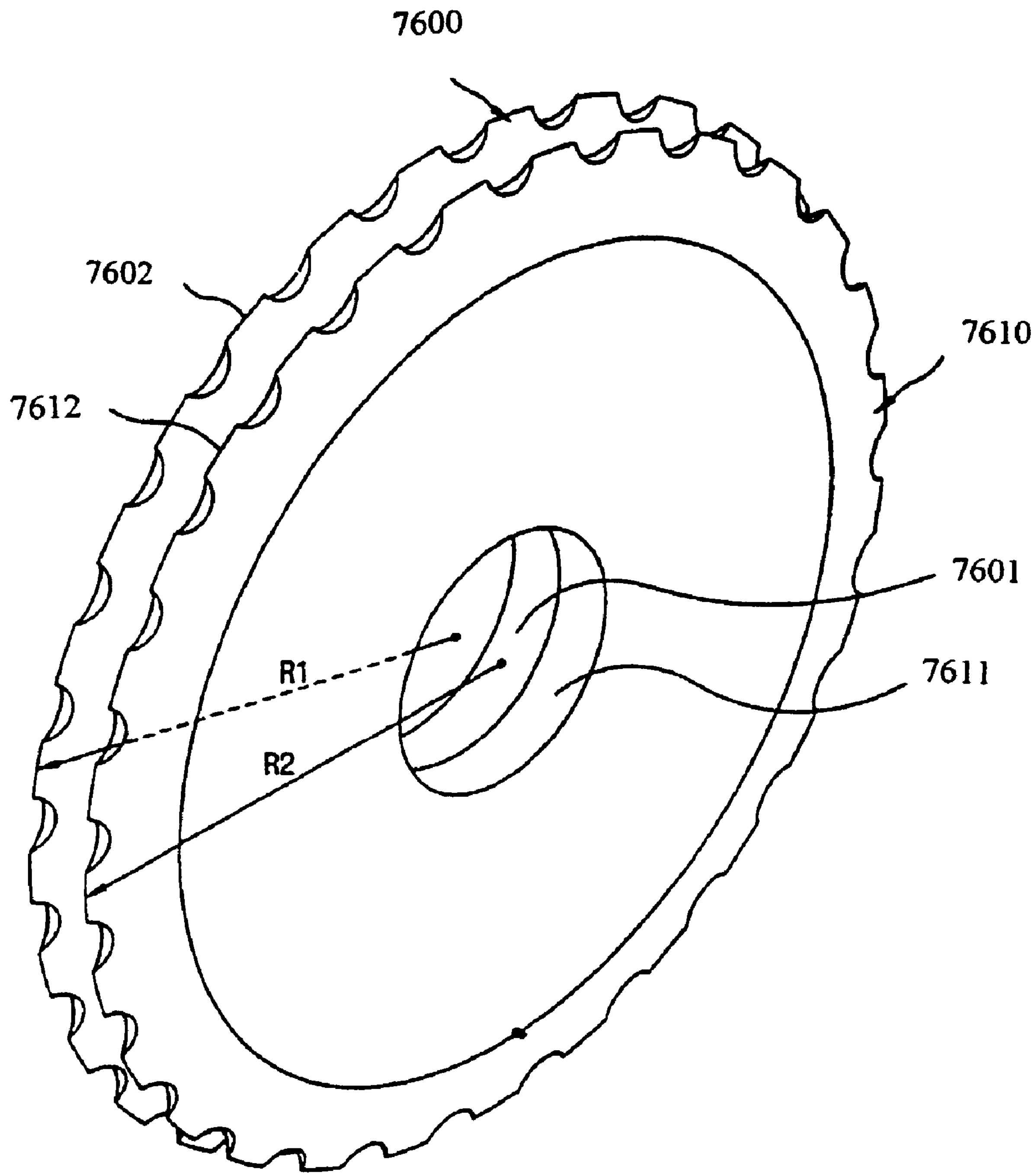
Figure 202:
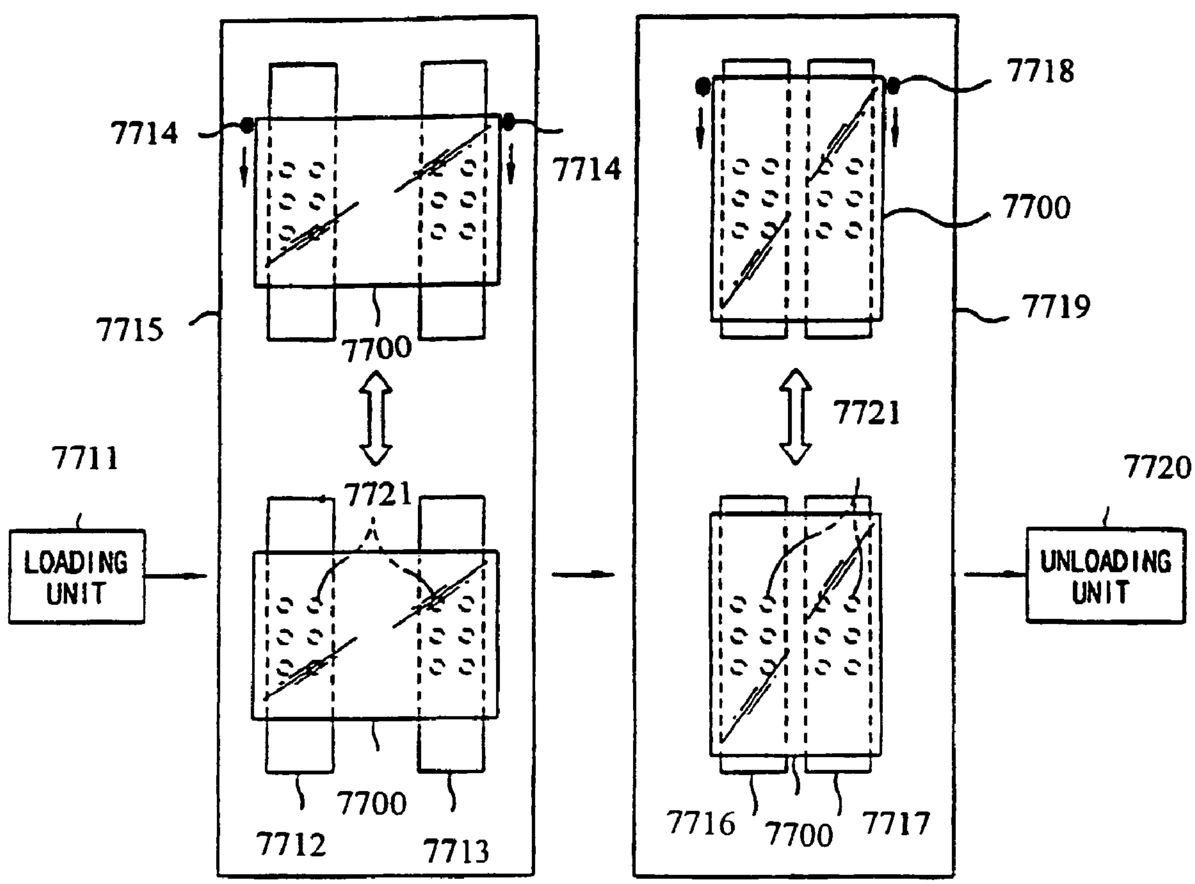
Figure 203A:
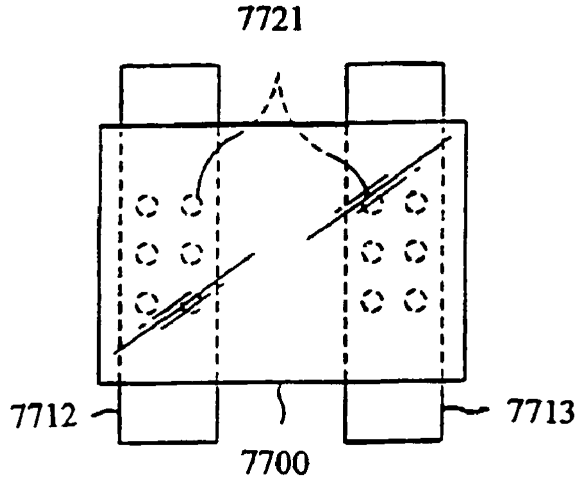
Figure 203B:
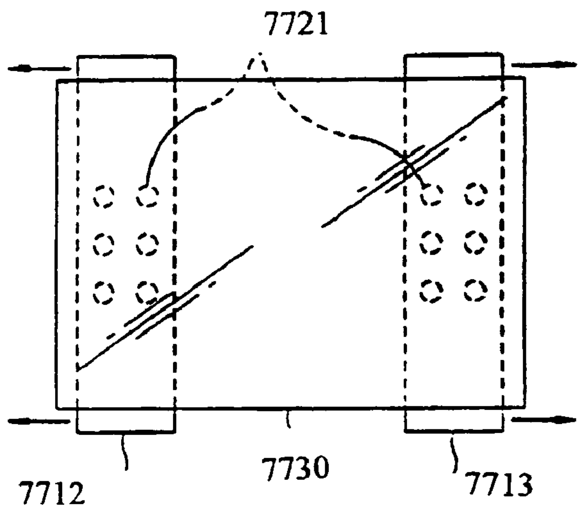
Figure 203C:
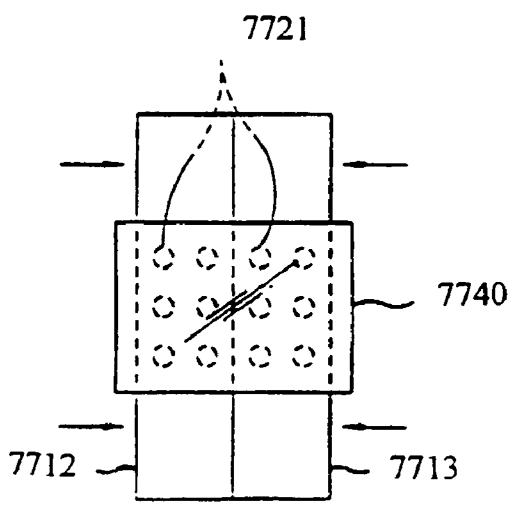
Figure 204:
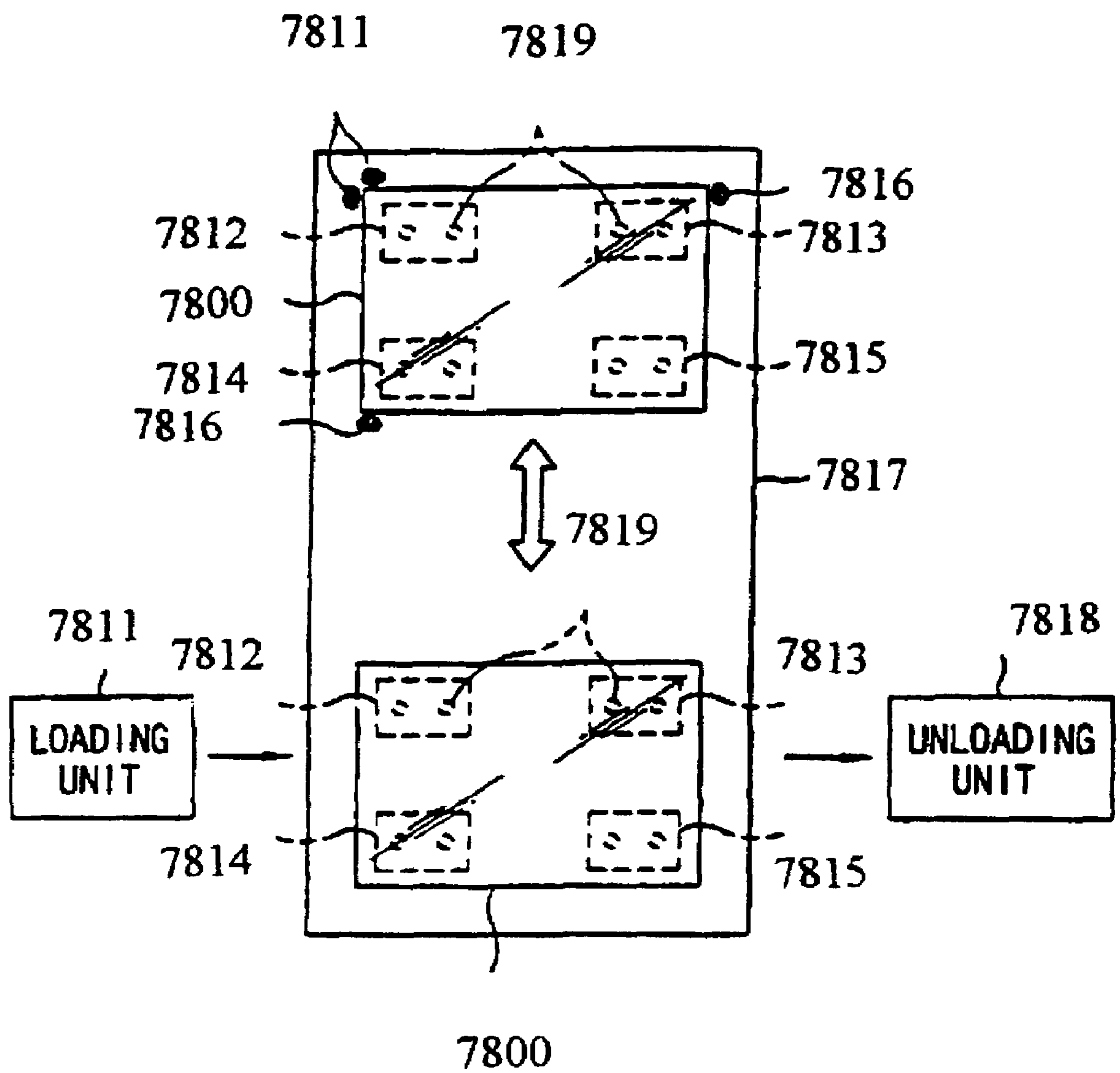
Figure 205A:
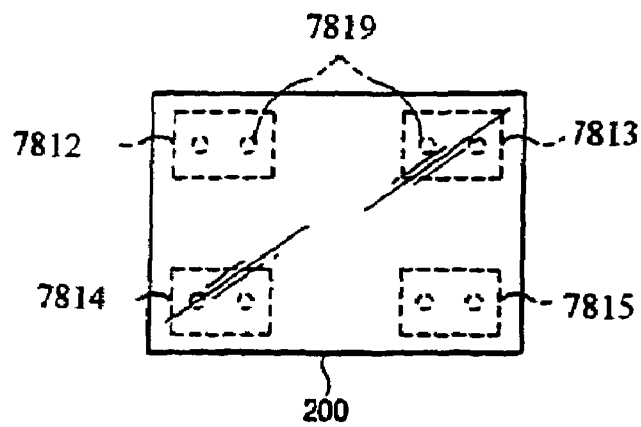
Figure 205B:
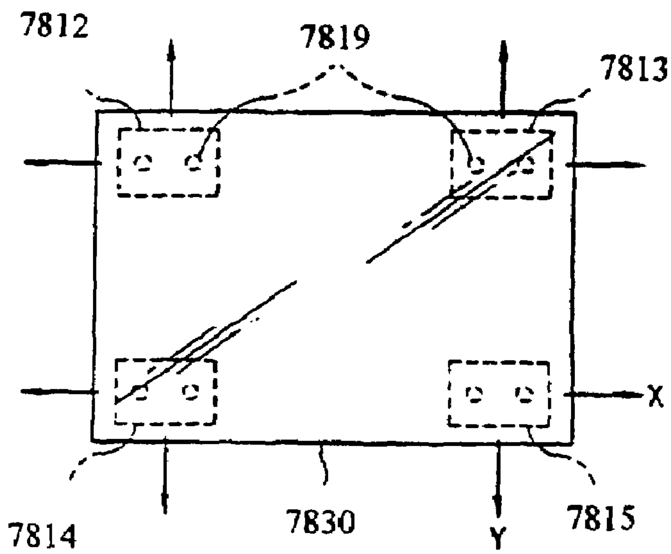
Figure 205C:
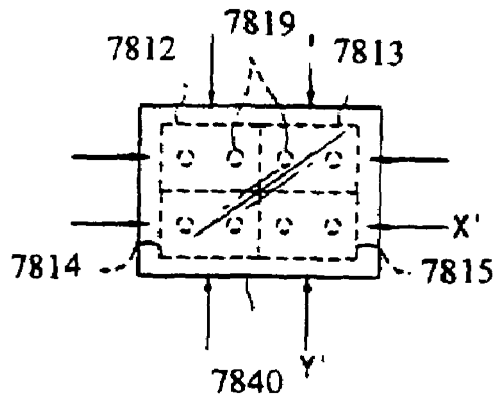
Figure 206A:
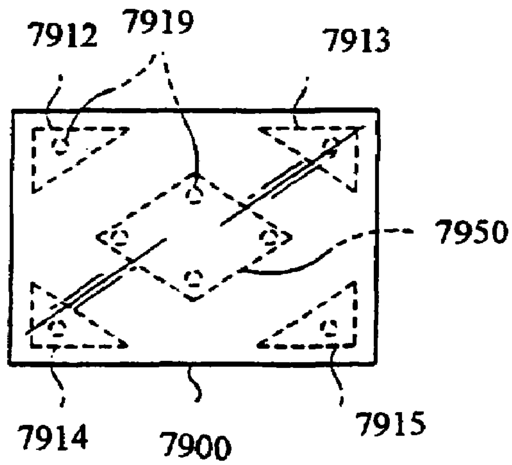
Figure 206B:
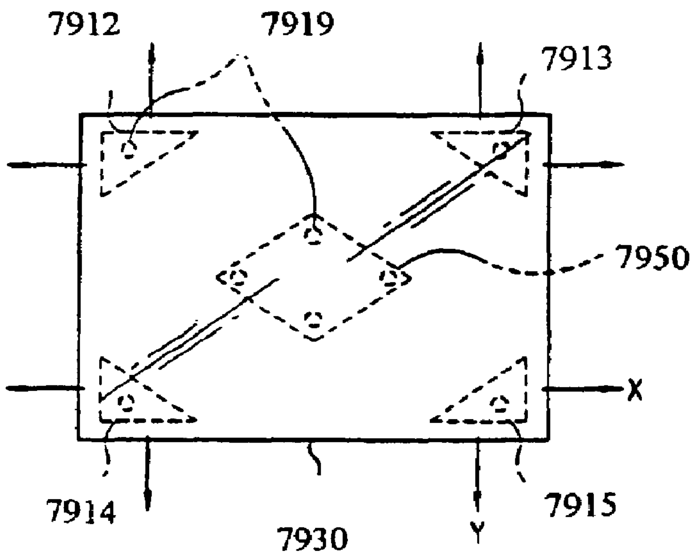
Figure 206C:
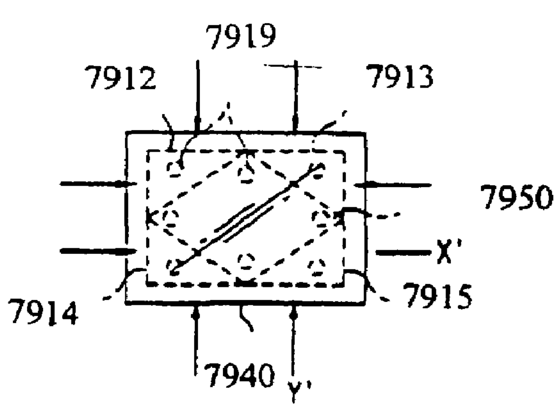
Figure 207:
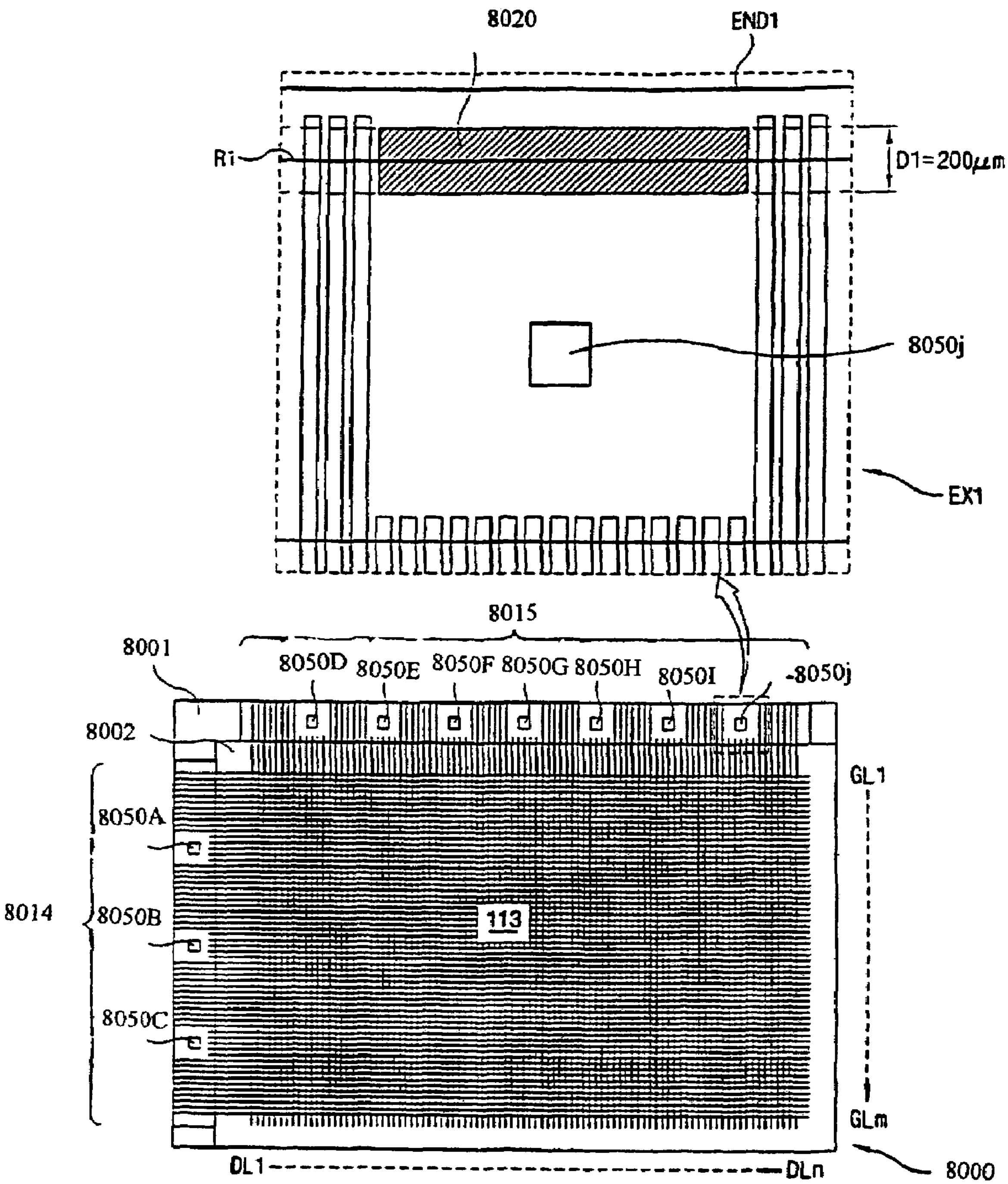
Figure 208:
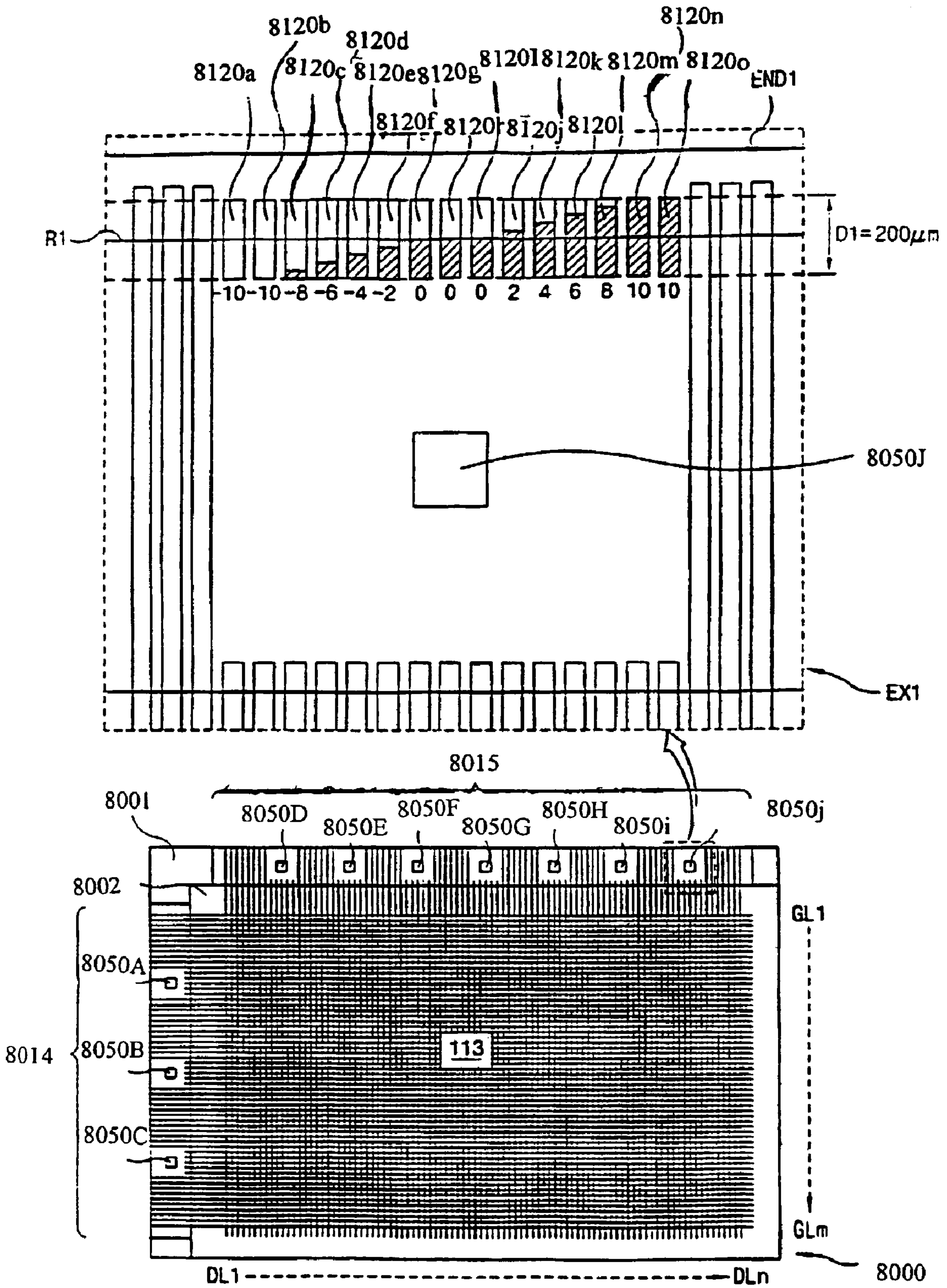
Figure 209:
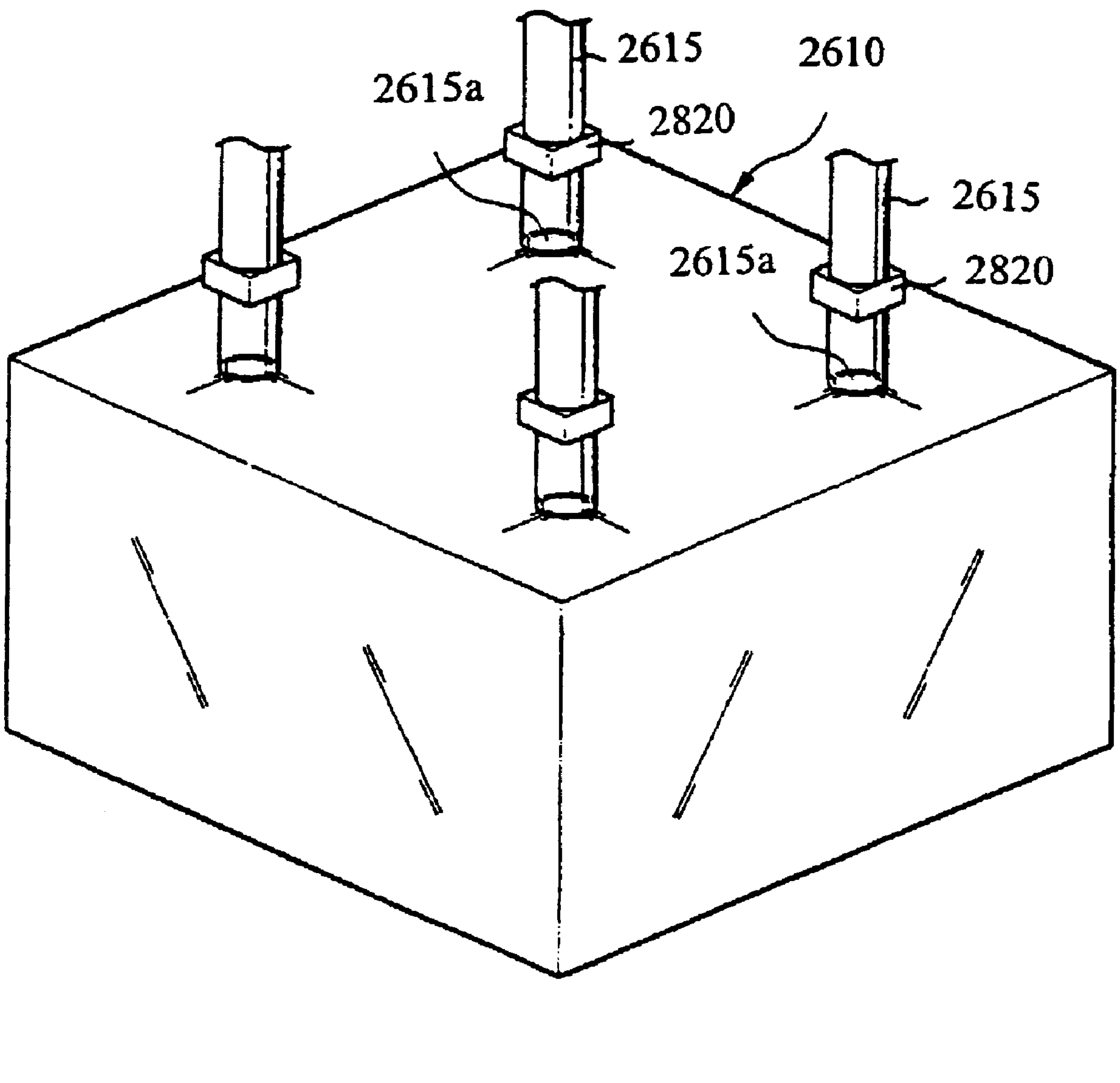
Figure 210:
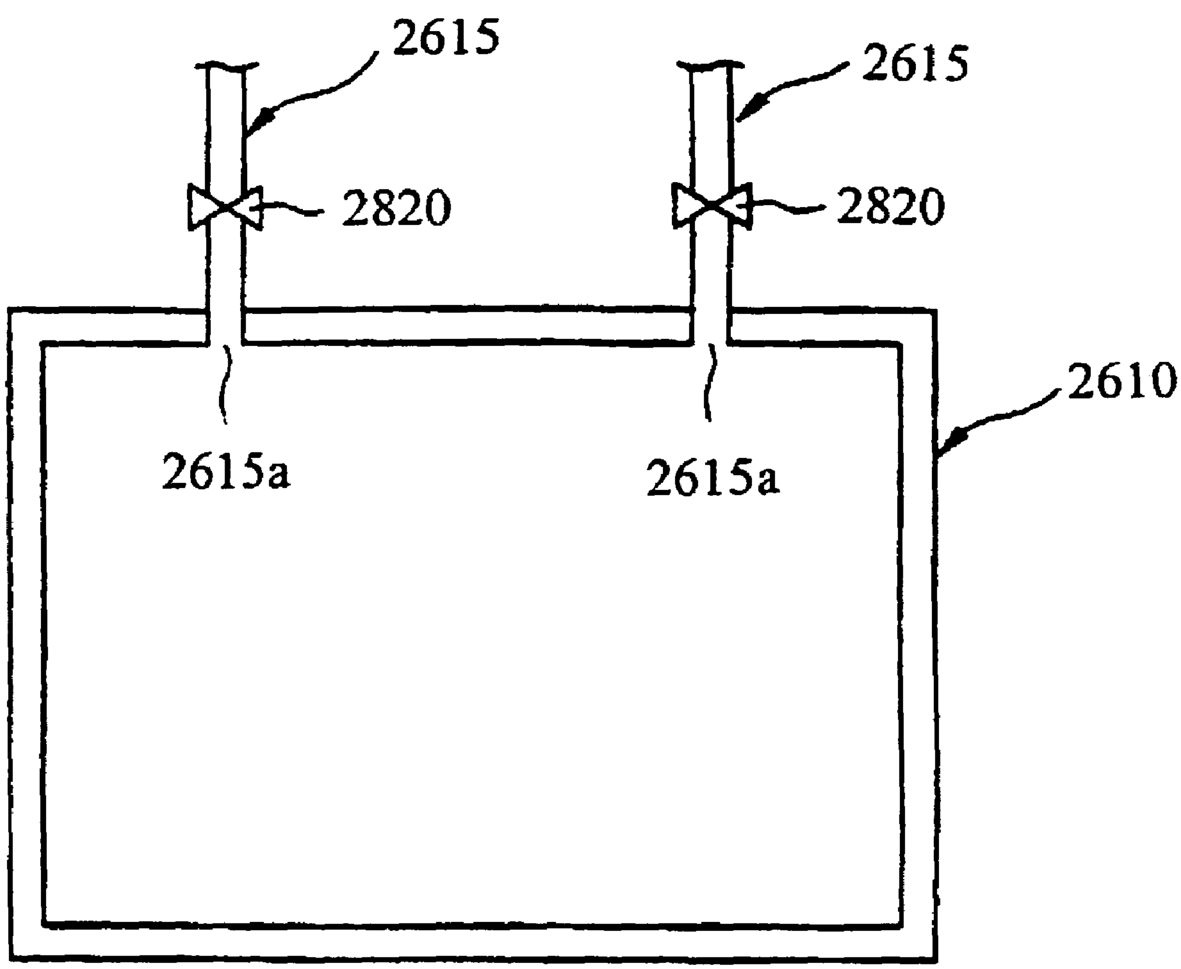
Figure 211:
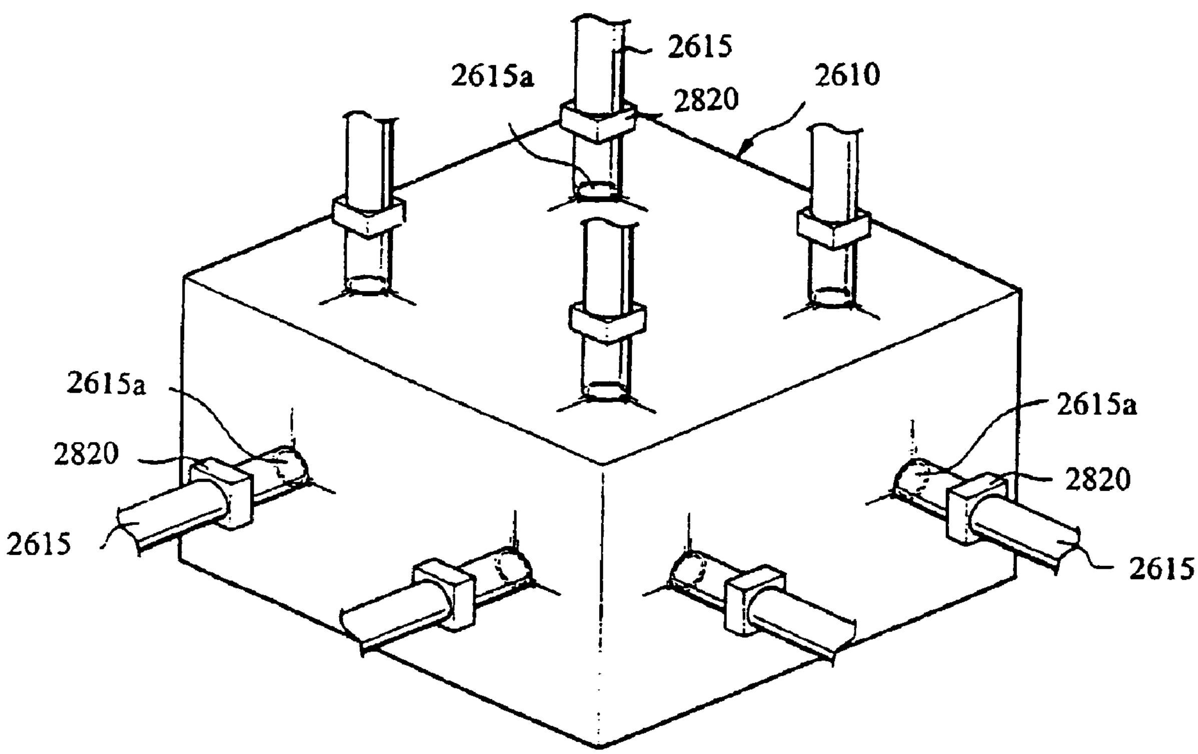
Figure 212:
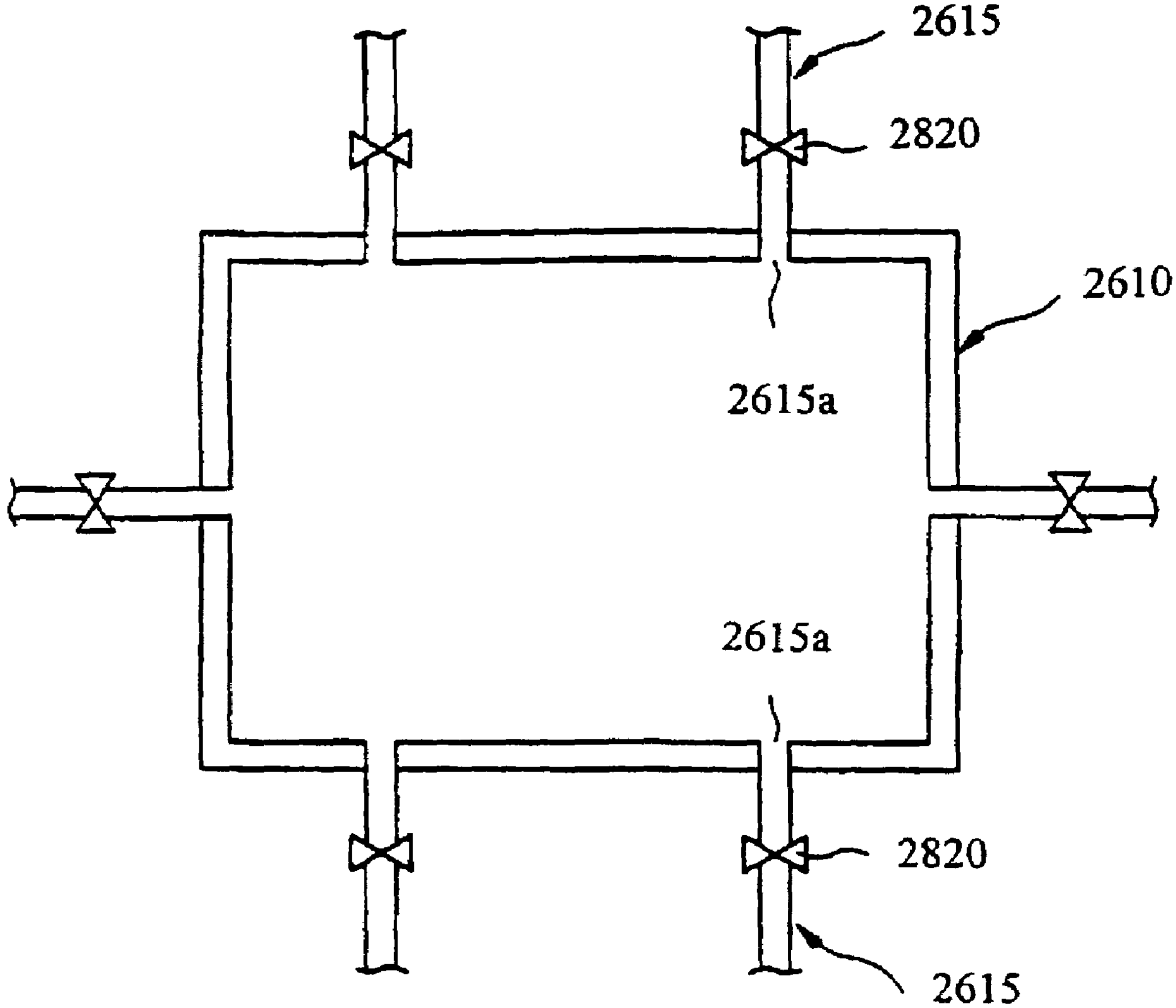

FIGS. 120A to 120C are cross sectional views showing a contact state between a substrate and a lift-bar according to the present invention;

FIG. 121 is a plane view showing an internal structure of an exemplary apparatus having a substrate receiving system according to the present invention;

FIG. 122 is a plane view showing an internal structure of another exemplary apparatus according to the present invention;

FIG. 123 is a cross sectional view showing an internal structure of another exemplary apparatus according to the present invention;

FIG. 124 is a plane view along line II-II of FIG. 123;

FIG. 125 is a cross sectional view showing another exemplary apparatus according to the present invention;

FIG. 126 is a plane view along line III-III of FIG. 125;

FIGS. 127 to 130 are plane views showing other exemplary apparatus' according to the present invention;

FIG. 131 is a cross sectional view showing another exemplary apparatus according to the present invention;

FIG. 132 is a plane view along line IV-IV of FIG. 131;

FIG. 133 is a cross sectional view showing another exemplary apparatus according to the present invention;

FIG. 134 is a plane view along line V-V of FIG. 133;

FIG. 135 is a plane view showing another exemplary apparatus according to the present invention;

FIG. 136 is a cross sectional view showing another exemplary apparatus according to the present invention;

FIG. 137 is a cross sectional view of an exemplary apparatus including a substrate lifting system according to the present invention;

FIG. 138 shows a schematic layout of a lower stage of an exemplary substrate lifting system according to the present invention;

FIG. 139A is an exploded view of a portion A in FIG. 137;

FIG. 139B shows an exemplary substrate lifting system according to the present invention;

FIG. 140 is a perspective view of an exemplary substrate lifting system according to the present invention;

FIG. 141A shows a cross sectional view of an exemplary substrate lifting system according to the present invention;

FIG. 141B shows a cross sectional view of the exemplary substrate lifting system according to the present invention where a substrate is loaded onto a lower stage;

FIG. 142 shows a perspective view of the exemplary substrate lifting system shown in FIG. 141 according to the present invention;

FIG. 143 shows a perspective view of an exemplary substrate lifting system according to the present invention;

FIG. 144 illustrates a flow chart showing the steps of a method for fabricating an LCD in accordance with an embodiment of the present invention, schematically;

FIGS. 145A-145G illustrate sections showing the steps of a method for fabricating an LCD in accordance with an embodiment of the present invention, schematically;

FIG. 146 illustrates a flow chart showing the steps of bonding of the present invention;

FIGS. 147A-148C illustrate rough and fine marks for explaining an alignment method in accordance with an embodiment of the present invention;

FIG. 149 illustrates a camera focusing position used in an alignment method in accordance with an embodiment of the present invention;

FIG. 150 illustrates an exemplary layout of rough and fine marks used in an alignment method in accordance with an embodiment of the present invention;

FIGS. 151A-151F illustrate sections showing the steps of a method for fabricating an LCD having a liquid crystal dropping method applied thereto in accordance with an embodiment of the present invention, schematically;

FIG. 152 illustrates the steps of bonding in accordance with an embodiment of the present invention;

FIG. 153 illustrates a layout of seal for explaining fixing in accordance with an embodiment of the present invention;

FIG. 154 illustrates a layout of seals for explaining fixing in accordance with an embodiment of the present invention;

FIG. 155 illustrates a layout of seals for explaining fixing in accordance with an embodiment of the present invention;

FIG. 156 illustrates a layout of seals for explaining fixing in accordance with an embodiment of the present invention;

FIG. 157 illustrates a layout of seals for explaining fixing in accordance with an embodiment of the present invention;

FIG. 158 illustrates a layout of seals for explaining fixing in accordance with an embodiment of the present invention;

FIG. 159 illustrates a section across a line I-I' in FIG. 153 showing upper and lower stages and substrates;

FIGS. 160A-160G illustrate sections showing the steps of a method for fabricating an LCD having a liquid crystal dropping method applied thereto in accordance with an embodiment of the present invention, schematically;

FIG. 161 illustrates the steps of bonding in accordance with an embodiment of the present invention;

FIGS. 162A to 162E are expanded perspective views illustrating a method for fabricating an LCD panel according to an embodiment of the present invention;

FIGS. 163A to 163C are perspective views to illustrate the process of UV irradiation in a method for fabricating an LCD according to an embodiment of the present invention;

FIG. 164 is a schematic view of a UV irradiating device according to an embodiment of the present invention;

FIGS. 165A and 165B are schematic views of another UV irradiating device according to an embodiment of the present invention;

FIG. 166 is a schematic view of a UV irradiating device according to an embodiment of the present invention;

FIG. 167 is a schematic view of a UV irradiating device according to an embodiment of the present invention;

FIGS. 168A to 168D are perspective views illustrating a method of manufacturing an LCD device in accordance with the principles of the present invention;

FIG. 169A is a sectional view illustrating a process of irradiating UV light at a tilt angle of θ upon an attached substrate having a light-shielding layer overlapped on a sealant;

FIG. 169B is a table illustrating a hardening rate of the sealant according to a change of a tilt angle of θ;

FIGS. 170A to 170D are perspective views illustrating a method of manufacturing an LCD device according to an embodiment of the present invention;

FIGS. 171A to 171D are perspective views illustrating a process of irradiating UV in the method of manufacturing an LCD device according to an embodiment of the present invention;

FIG. 172 is a layout illustrating a method of manufacturing an LCD according to the present invention;

FIG. 173 is a flow chart showing an alignment forming process according to the present invention;

FIG. 174 is a flow chart of a gap forming process according to the present invention;

FIG. 175 shows an exemplary diagram of substrates having good and NG substrate panel areas;

FIG. 176 shows the layout of a processing line according to the present invention;

FIG. 177 schematically illustrates a first substrate of an LC panel according to an embodiment of the present invention;

FIG. 178 schematically illustrates an LC panel according to an embodiment of the present invention;

FIG. 179 illustrates a magnified cross-sectional view of portion ‘A’ in FIG. 178;

FIG. 180 illustrates a flowchart of an LCD fabrication method according to an embodiment of the present invention;

FIG. 181 illustrates an inspection apparatus according to an embodiment of the present invention;

FIG. 182 schematically illustrates a structural layout of an LC panel according to an embodiment of the present invention;

FIG. 183 is a schematic block diagram of a device for cutting a liquid crystal display panel in accordance with an embodiment of the present invention;

FIGS. 184A to 184G illustrate sequential processes in each block of FIG. 183;

FIG. 185 is a schematic block diagram of a device for cutting a liquid crystal display panel in accordance with an embodiment of the present invention;

FIGS. 186A to 183F illustrate sequential processes for performing each block of FIG. 185;

FIGS. 187A to 187C illustrate different alignments of an upper wheel and a lower wheel for simultaneously scribing the first and second mother substrates in accordance with the present invention;

FIG. 188 is a schematic block diagram of a device for cutting a liquid crystal display panel in accordance with an embodiment of the present invention;

FIGS. 189A to 189G illustrate sequential processes in each block of FIG. 188;

FIG. 190 is a schematic block diagram of a device for cutting a liquid crystal display panel in accordance with an embodiment of the present invention;

FIGS. 191A to 191G illustrate sequential processes for performing each block of FIG. 190;

FIG. 192 is a schematic view showing a plurality of vacuum suction holes formed at the first through the fourth tables of FIGS. 191A to 191G;

FIGS. 193A and 193B illustrate first and second scribing processes for cutting a liquid crystal display panel in the present invention;

FIGS. 194A to 194F illustrate sequential processes for cutting a liquid crystal display panel in accordance with an embodiment of the present invention;

FIG. 195 illustrates a perspective view of a cutting wheel for a liquid crystal display panel according to an embodiment of the present invention;

FIG. 196 illustrates an exemplary diagram of first and second grooves formed on a surface of a liquid crystal display panel by first and second cutting wheels;

FIG. 197 illustrates a perspective view of first and second cutting wheels having first and second blades are staggered or offset with respect to each other according to an embodiment of the present invention;

FIG. 198 illustrates an exemplary diagram of first and second grooves formed on a surface of a liquid crystal display panel through first and second cutting wheels in FIG. 197;

FIG. 199 illustrates an enlarged partial view of a liquid crystal display panel cutting wheel according to an embodiment of the present invention;

FIG. 200 illustrates an enlarged partial view of a liquid crystal display panel cutting wheel according to an embodiment of the present invention; and FIG. 201 illustrates an enlarged view of a liquid crystal display panel cutting wheel in part according to an embodiment of the present invention;

FIG. 202 illustrates a diagram of a grinding table apparatus for a liquid crystal display panel and a grinder apparatus using the same according to an embodiment of the present invention;

FIGS. 203A to 203C illustrate exemplary diagrams for grinding tables of a first grinding unit moving in a farther or closer direction reciprocally so as to cope with a size of a liquid crystal display panel in FIG. 202;

FIG. 204 illustrates a diagram of a grinding table apparatus for a liquid crystal display panel and a grinder apparatus using the same according to another embodiment of the present invention;

FIGS. 205A to 205C illustrate exemplary diagrams for grinding tables of a first grinding unit moving in farther or closer directions reciprocally so as to cope with a size of a liquid crystal display panel in FIG. 204;

FIGS. 206A to 206C illustrate exemplary diagrams for grinding tables of a first grinding unit moving in farther or closer directions reciprocally so as to cope with a size of a liquid crystal display panel according to a further embodiment of the present invention;

FIG. 207 is a schematic view illustrating an indicator for detecting a grinding amount of an LCD panel in accordance with an embodiment of the present invention;

FIG. 208 is a schematic view illustrating an indicator for detecting a grinding amount of the LCD panel in accordance with an embodiment of the present invention;

FIG. 209 illustrates multiple vent holes at the top of the bonding chamber in accordance with the present invention;

FIG. 210 illustrates a cross-sectional view of FIG. 209;

FIG. 211 illustrates multiple vent holes at all sides of the bonding chamber in accordance with the present invention; and FIG. 212 illustrates a cross-sectional view of FIG. 211.

DETAILED DESCRIPTION OF THE ILLUSTRATED EMBODIMENTS

Reference will now be made in detail to an embodiment of the present invention, examples of which are illustrated in the accompanying drawings.

Figure 4:
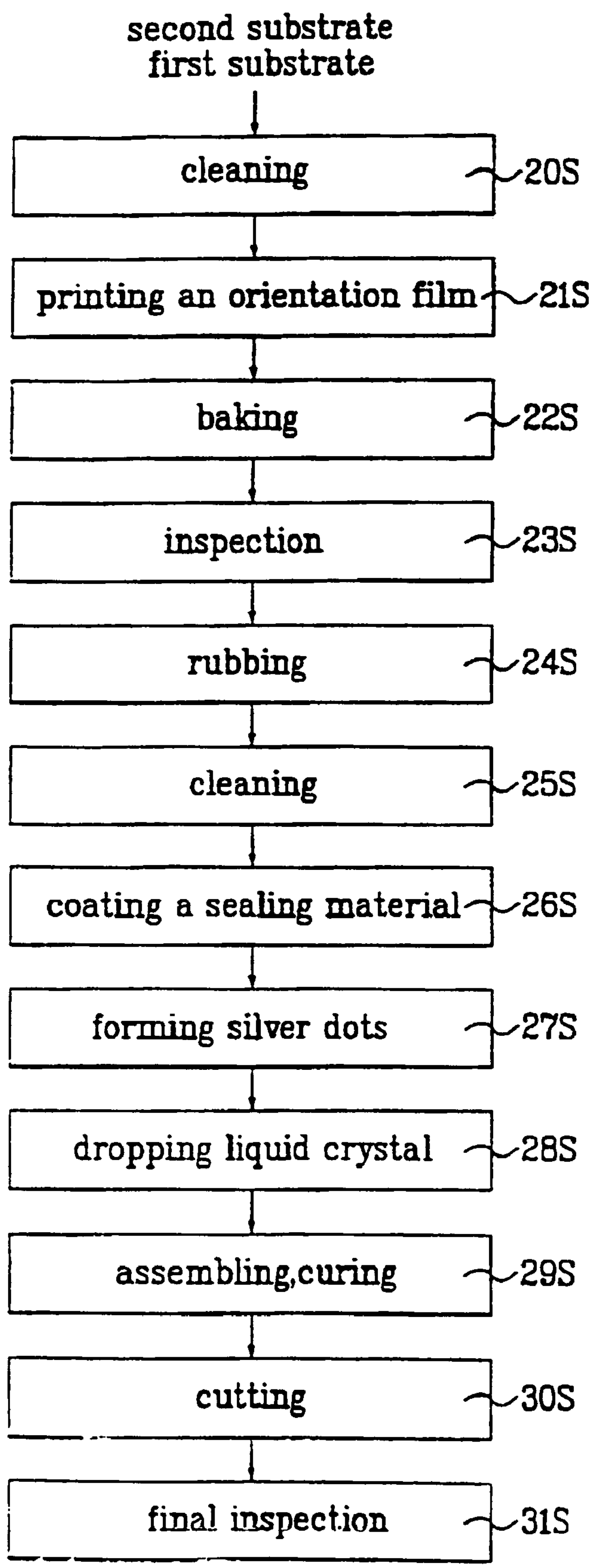
FIGS. 4-6 illustrate are flow charts each illustrating the steps of a method for manufacturing a liquid crystal display device in accordance with exemplary embodiments of the present invention.
Figure 5:
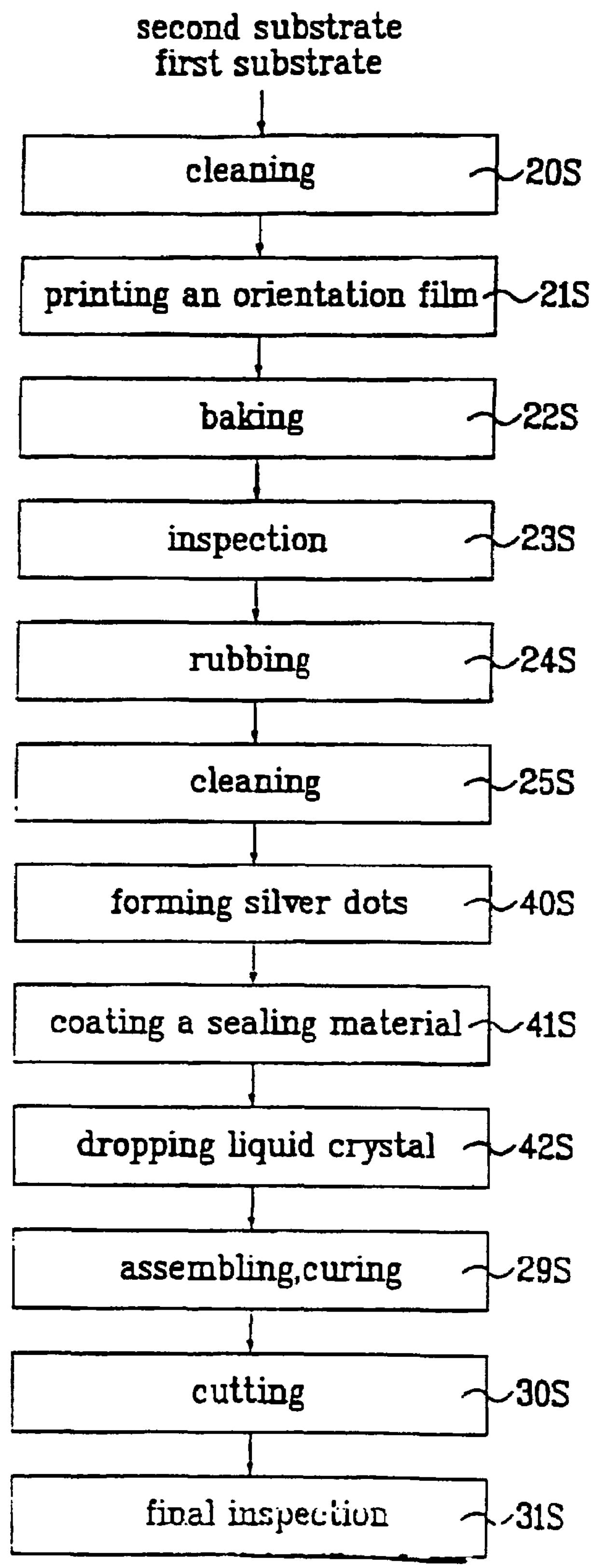
Figure 6:
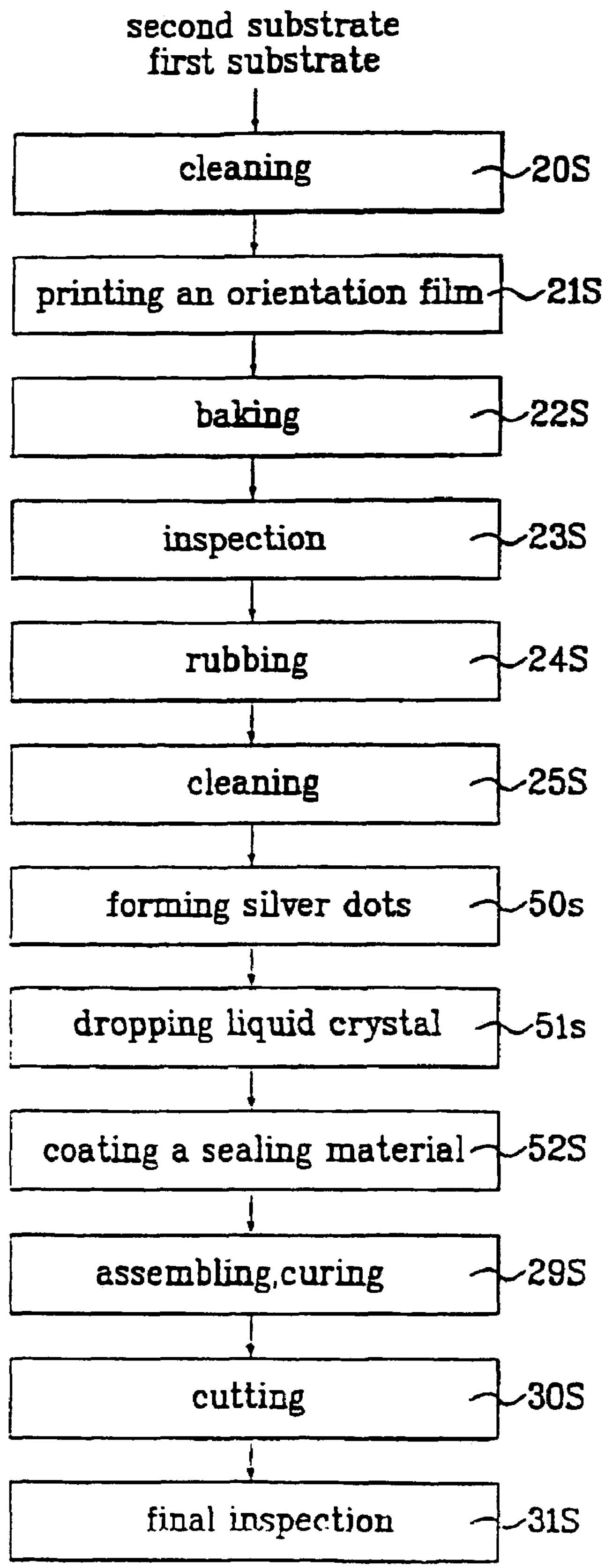

FIGS. 4,5, and 6 illustrate flow charts each showing the steps of a method for manufacturing a liquid crystal display in accordance with first, second, and third embodiments of the present invention.

Referring to FIG. 4, a first substrate and a second substrate are provided. The first substrate (hereafter referred to as a "TFT substrate") includes a plurality of gate lines running in one direction at fixed intervals, a plurality of data lines running in a direction perpendicular to the gate lines at fixed intervals, a plurality of thin film transistors, and pixel electrodes in a matrix pixel region defined by the gate lines and the data lines, formed thereon. The second substrate (hereafter referred to as a "color filter substrate") includes a black matrix layer for shielding a light incident to parts except the pixel region, a color filter layer, and a common electrode.

The TFT substrate and the color filter substrate are alternately provided into a production line having a single line structure for progressing the liquid crystal cell process. Processing equipment can be considered as equipment for the TFT substrate, equipment for the color filter substrate or both. The respective substrates are preferably provided to and processed by the corresponding equipment automatically in accordance with information on the substrates.

An overview of the liquid crystal cell process will now be explained as follows.

An orientation step is carried out for both of the TFT substrate and the color filter substrate. The orientation step is progressed in an order of cleaning (20S) before coating the orientation film, printing of the orientation film (21S), baking of the orientation film (22S), inspecting of the orientation film (23S), and rubbing (24S).

After the TFT substrate and the color filter substrate that have passed through the orientation step are cleaned (25S), a sealing material is coated onto the color filter substrate, without providing an hole structure for liquid crystal injection so that the color filter substrate can later be assembled with the TFT substrate on a periphery of a pixel region with a fixed gap between the TFT substrate and the color filter substrate (26S). In contrast, the TFT substrate passes through the sealing material coating step (26S) without coating the sealing material and is provided into the next step.

Silver is coated on the TFT substrate in forms of dots for electrical connection with a common electrode on the color filter substrate (27S). However, the color filter substrate passes through the silver forming step (27S) without the silver forming and is provided into the next step.

Next, a step for applying or dropping the liquid crystal onto the TFT substrate in a region corresponding to an area inside the sealing material coated on the color filter substrate is carried out (28S). Here, the color filter substrate passes through the liquid crystal applying or dropping step (28S) without having the liquid crystal dropped thereon and is provided into the next step.

Of course, it should be recognized that the present invention is not limited to this arrangement. For example, the forming of the sealing material, and the applying or dropping of the liquid crystal material may carried out on either of the TFT substrate or the color filter substrate. The silver dot forming step may be omitted for the production of an IPS (In-Plane Switching) mode LCD in which both the pixel electrode and the common electrode are formed on a single TFT substrate.

Then, the TFT substrate and the color filter substrate are loaded into a vacuum chamber and assembled into a large panel (i.e., a panel having a plurality of LCD unit panels) such that the applied liquid crystal is spread over the panels uniformly and the sealing material is cured (29S).

The large panel, having a TFT substrate and a color filter substrate with liquid crystal therebetween, is cut into individual unit panels (30S). Each individual unit panel is ground, and finally inspected (31S), thereby completing the manufacturing of an LCD device.

Figure 1:
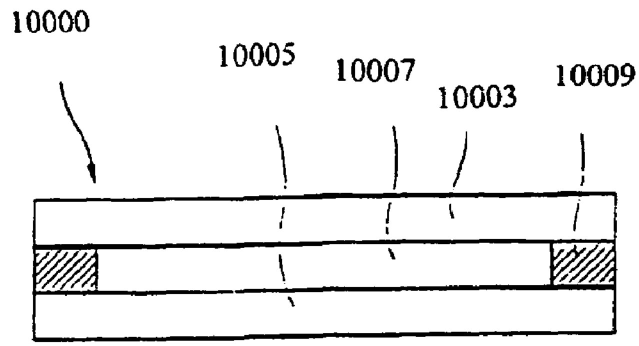
FIGS. 1-3 a related art liquid crystal display device and a method of manufacturing the same.
Figure 2:
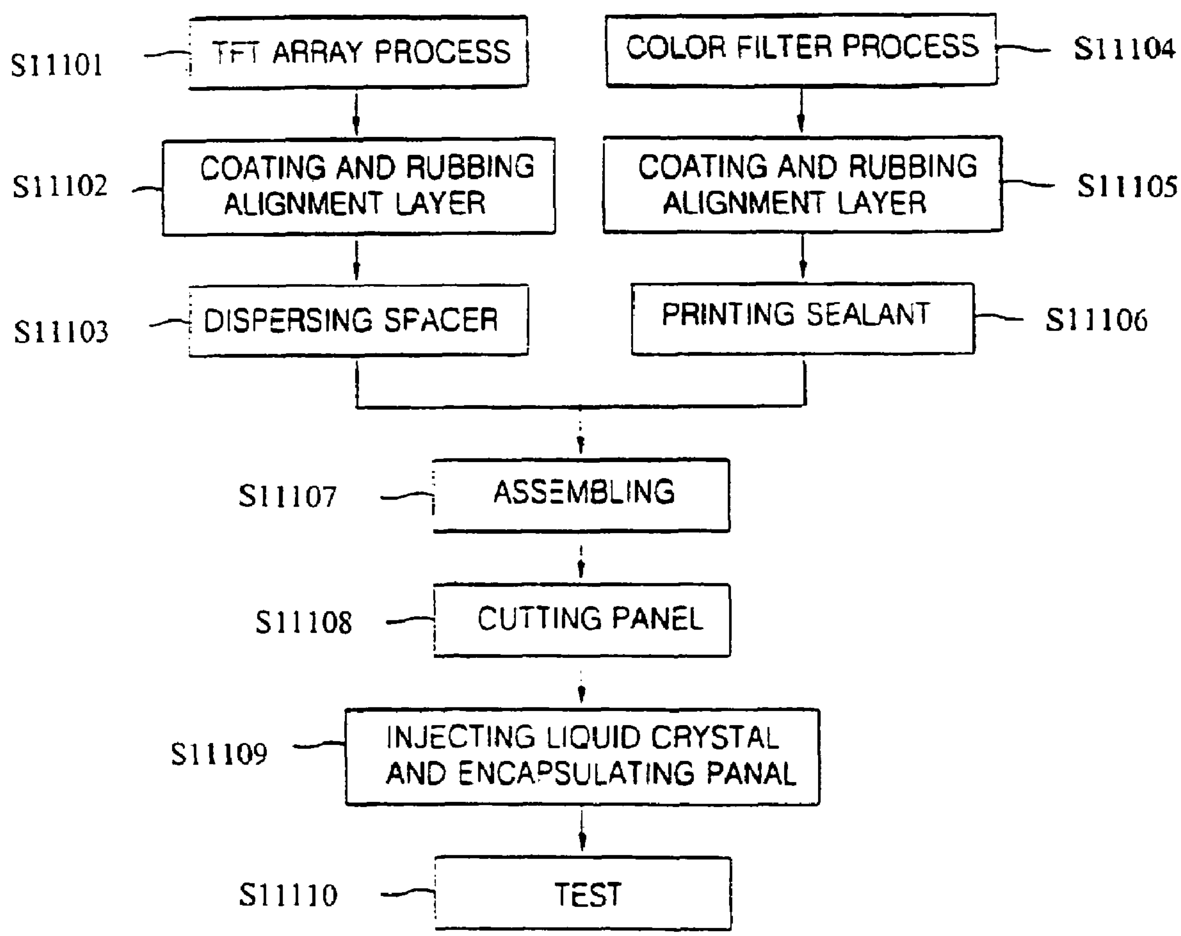
Figure 3:
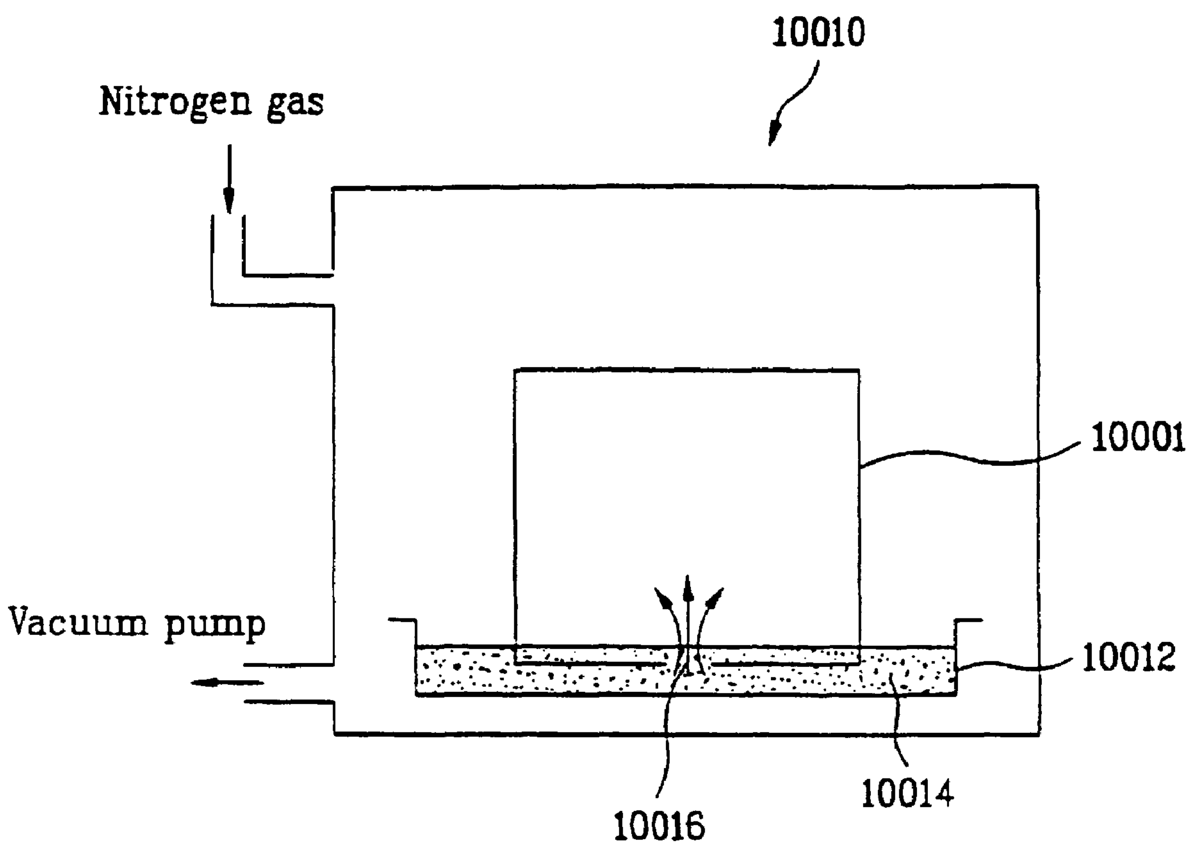

FIGS. 2 and 3 illustrate flow charts showing a method for manufacturing of a liquid crystal display in accordance with a second and third embodiments of the present invention, respectively, where the order of steps from the sealing material forming step (26S) to the liquid crystal dropping step (28S) in FIG. 4 are varied.

That is, referring to FIG. 5, after both the TFT substrate and the color filter substrate passed through the cleaning step (25S) of the orientation process, silver is formed on the TFT substrate in form of dots for electrical connection with a common electrode on the color filter substrate (40S). However, the color filter substrate passes through the silver forming step (40S) without the silver coating and is provided into the next step.

Next, a sealing material is formed on the color filter substrate without providing the liquid crystal filling hole so that the color filter substrate may later be assembled with the TFT substrate on a periphery of a pixel region with a fixed gap between the TFT substrate and the color filter substrate (41S). Here, the TFT substrate passes through the sealing material forming step (41S) without forming the sealing material thereon and is provided into the next step.

Next, a step for dropping the liquid crystal onto the TFT substrate in a region corresponding to an area inside the sealing material formed on the color filter substrate is carried out (42S). However, the color filter substrate passes through the dropping step without having the liquid crystal dropped thereon, and is provided into the next step.

Again, it should be recognized that the present invention is not limited to this arrangement. For example, the forming of the sealing material and the dropping of the liquid crystal may be carried out on either of the TFT substrate or the color filter substrate. The silver dot forming step may be omitted for the production of an IPS mode LCD in which the pixel electrode and the common electrode are formed on a single TFT substrate.

The remaining liquid crystal cell process is finished through the vacuum assembling step of the TFT substrate with the color filter substrate, the curing step of the sealing material (29S), cutting (30S), and final inspection (31S).

Referring to FIG. 6, after both the TFT substrate and the color filter substrate passed through the cleaning step (25S) of the orientation process, silver is formed on the TFT substrate in form of dots for electrical connection with a common electrode on the color filter substrate (50S). Here, the color filter substrate passes through the silver forming step without the silver forming and is provided into the next step.

Next, a step for applying or dropping the liquid crystal onto the TFT substrate in a region corresponding to an area inside the sealing material formed on the color filter substrate is carried out (51S). Here, the color filter substrate passes through the liquid crystal dropping step without having the liquid crystal dropped thereon, and is provided into the next step.

Next, a sealing material is formed on the color filter substrate without providing a liquid crystal filling hole so that the color filter substrate may later be assembled with the TFT substrate on a periphery of a pixel region with a fixed gap between the TFT substrate and the color filter substrate (52S). However, the TFT substrate passes through the sealing material forming step (52S) without forming the sealing material thereon and is provided into the next step.

Again, it should be recognized that the present invention is not limited to the above arrangement. For example, the forming of the sealing material and the dropping of the liquid crystal may be carried out on either of the TFT substrate or the color filter substrate. The silver dot forming step may be omitted for the production of an IPS mode LCD in which the pixel electrode and the common electrode are formed on a single TFT substrate.

The remaining liquid crystal cell process is finished through the vacuum assembling step of the TFT substrate with the color filter substrate, the curing step of the sealing material (29S), cutting (30S), and final inspection (31S).

Also, it should be recognized that a particular step may be performed on one substrate at the same time that a different step is performed on the other substrate. That is, the production process line receives many thin film transistor substrates and color filter substrates in serial order. Each pair of substrates will pass through each component of the production process line. However, both substrates of each pair need not be disposed in the same component of the production process line at the same time. Thus, one substrate of the pair may be operated on by one component of the production process line at the same time that the other substrate of the pair is being operated on by another component.

As has been explained, the method for manufacturing a liquid crystal display in accordance with the present invention can improve spatial efficiency by adopting a single production line for the liquid crystal cell process, increase the productivity by providing an effective and simple liquid crystal cell process, and can overcome problems caused by a process time difference between the TFT substrate process line and the color filter substrate line. Here, management of respectively providing the TFT substrate and the color filter is simple. Meanwhile, though not shown, the silver dot forming (50S) in the third embodiment may be carried out at a step between the liquid crystal dropping (51S) and the sealing material forming (52S), or after the liquid crystal dropping (51S) and the sealing material forming (52S).

Figure 7A:
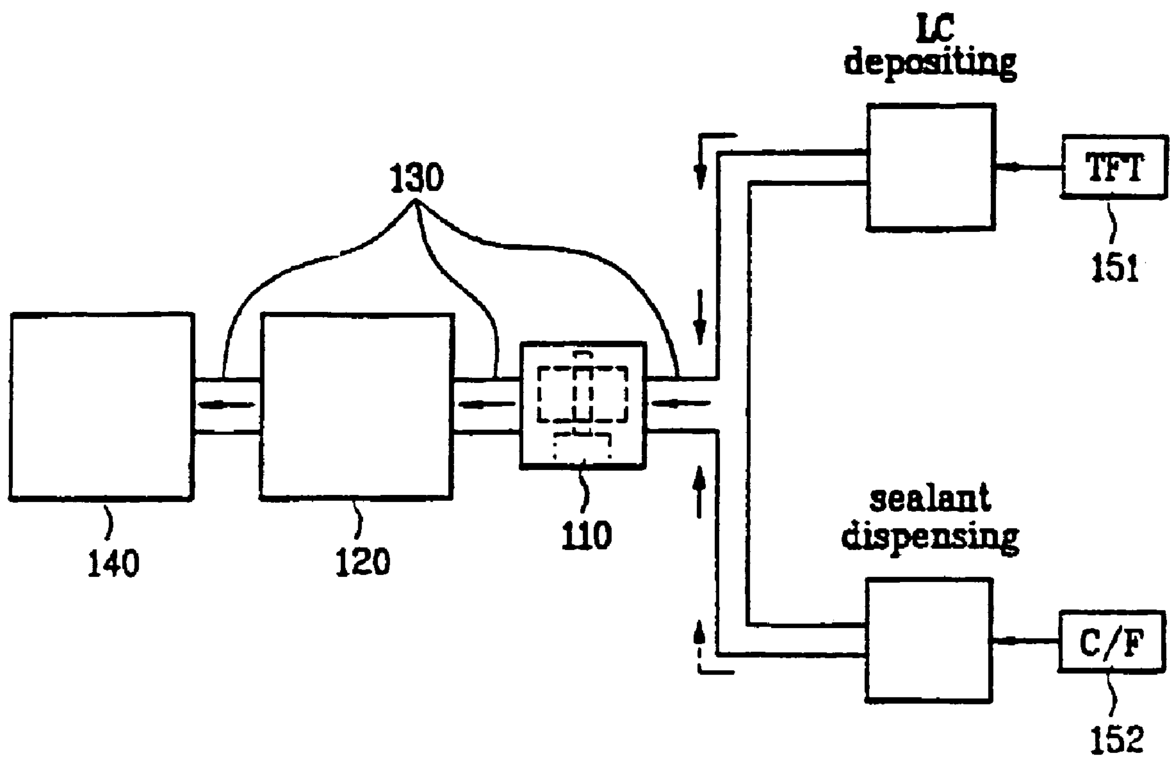
FIGS. 7A and 7B show an exemplary apparatus for manufacturing an LCD device according to the present invention.
Figure 7B:
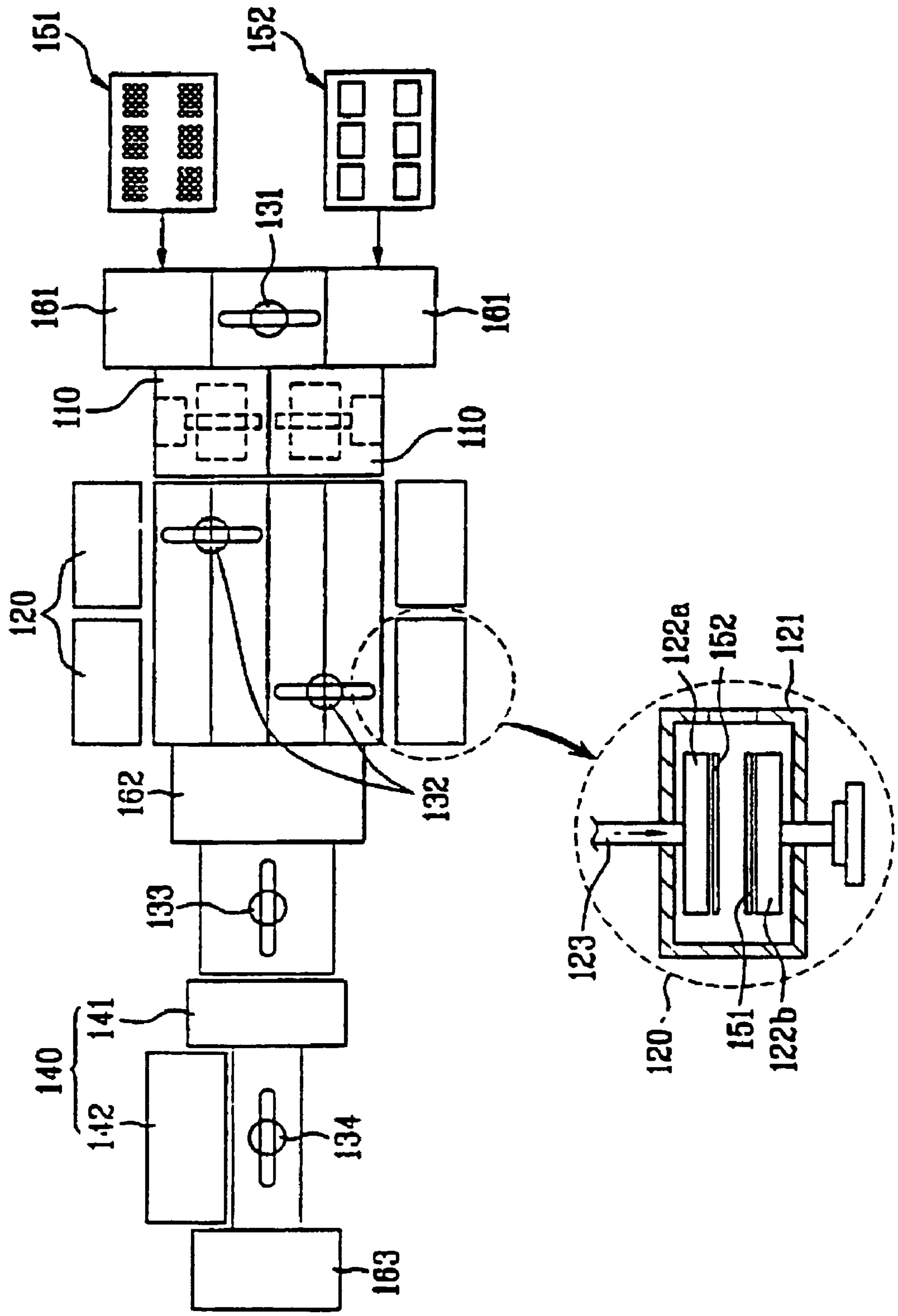

FIGS. 7A and 7B show an exemplary apparatus for manufacturing an LCD device according to the present invention. In FIGS. 7A and 7B, the apparatus may include a first reverse unit 110, at least one bonding unit 120 disposed within a vacuum processing chamber 121, and a plurality of loading/unloading units 130. In addition, the apparatus may be provided with a hardening unit 140.

A liquid crystal material may be applied or deposited (i.e., drop dispensed) onto a first substrate 151, and a sealant (not shown) may be applied or deposited onto a second substrate 152. Then, the first reverse unit 110 may reverse (i.e., flip) the second substrate 152 upon which the sealant is dispensed. The first reverse unit 110 may not necessarily reverse each of the first and second substrates 151 and 152, and may reverse only one of the first and second substrates 151 and 152 upon which the liquid crystal material is not deposited. Moreover, the first and second substrate 151 and 152 may be one of either a TFT array substrate or a color filer (C/F) substrate. Alternatively, the first reverse unit may reverse the substrate having the liquid crystal material deposited thereupon provided that the viscosity of the liquid crystal material is large enough so as to prevent any flow of the liquid crystal material during the reversing process.

The first reverse unit 110 may have various configurations based upon the assumption that only one the first and second substrates 151 and 152 may be reversed. For example, although not shown, the liquid crystal material may be deposited on the first substrate 151, which may be a C/F substrate, and the sealant may be deposited on the second substrate 152, which may be a TFT array substrate. Moreover, both the liquid crystal material and the sealant may be deposited on the first substrate 151, which may be a TFT array substrate, and the second substrate 152, which may be a C/F substrate, may not have either of the liquid crystal material or the sealant deposited thereon. Furthermore, both the liquid crystal material and the sealant may be deposited on the first substrate 151, which may be a C/F substrate, and the second substrate 152, which may be a TFT array substrate, may not have either of the liquid crystal material or the sealant deposited thereon.

The bonding unit 120 may be provided within the vacuum processing chamber 121, and may include an upper stage 122*a*, a lower stage 122*b*, and a moving means 123 for selectively moving either one or both of the upper and lower stages 122*a* and 122*b*. Accordingly, the upper stage 122*a* may be provided at an upper side of the vacuum processing chamber 121 to hold the second substrate 152 and, the lower stage 122*b* may be provided at a lower side of the vacuum processing chamber 121 to hold the first substrate 151. The bonding unit 120 may bond the first and second substrates 151 and 152 to produce bonded substrates.

The hardening unit 140 may include a photo-curing (photo-hardening) unit 141, which may subject the bonded substrates to an emitted light such as UV, for example, and thermal hardening unit 142, which may heat the bonded substrates. Accordingly, the hardening unit 140 may include the photo-curing unit 141 and the thermal hardening unit 142 as a single processing unit. Alternatively, the hardening unit 140 may include the photo-curing unit 141 and the thermal hardening unit 142 as multiple processing units. If the hardening unit 140 is provided with both the photo-curing unit 141 and the thermal hardening unit 142, the photo-curing unit 141 receives the bonded substrates and cures the bonded substrates by the emitted light. Then, the thermal hardening unit 142 may receive the photo-cured, bonded substrates, and harden the sealant by processing under high temperature conditions. In addition, the thermal hardening unit 142 may permit the liquid crystal material to flow between the bonded substrates, thereby dispersing the liquid crystal material uniformly between the bonded substrates.

The loading/unloading units 130 may be provided between the first reverse unit 110, the bonding unit 120, and the hardening unit 140. The loading/unloading units 130 may include a first loading/unloading unit 131, a plurality of second loading/unloading units 132, a third loading/unloading unit 133, and a fourth loading/unloading unit 134. Each of the loading/unloading units 130 may include mechanical devices such as a robot-arm, for example, to obtain relatively high precision and accuracy in moving the substrates. Alternatively, the loading/unloading units 130 may include various types of devices for providing relatively high precision and accuracy and may combine various different types of devices such as conveyors and robot arms.

A processing time of each processing step may vary according to each individual processing modules (i.e., units). For example, a processing time for the plurality of bonding units 120 may be different than a processing time for the hardening unit 140. Accordingly, buffer units may be provided between any of the reverse, bonding, and hardening units to provisionally store any of the first and second substrates 151 and 152, as well as the bonded substrates prior to subsequent processing steps. The buffer units may have at least one substrate cassette in which a plurality of bonded substrates may be provisionally stored at multiple levels.

In FIG. 7B, a first buffer unit 161 may be provided at a first side, or sides of the first loading/unloading unit 131 for loading the first and second substrates 151 and 152 to the first reverse unit 110. A second buffer unit 162 may be provided at a side of the plurality of second loading/unloading units 132 for unloading the bonded substrates from the bonding unit 120 and at a side of the third loading/unloading unit 133 for loading the bonded substrates into the hardening unit 140. A third buffer unit 163 may be provided at a side of the fourth loading/unloading unit 134 for unloading the bonded substrates from the hardening unit 140. Each of the first, second, and third buffer units 161, 162 and 163 may be provided with a pair of substrate cassettes for temporarily storing each of the first and second substrates 151 and 152 in the first buffer unit 161, the bonded substrates in the second buffer unit 162, and the bonded substrates in the third buffer unit 163 after being processed in the hardening unit 140.

In FIG. 7B, a plurality of the bonding units 120 may be disposed to face each other, and the plurality of second loading/unloading units 132 may be provided between the first reverse unit 110 and each of the plurality of bonding units 120. Accordingly, the plurality of second loading/unloading units 132 may selectively load the first and second substrates 151 and 152 from the first reverse unit 110 into the plurality of bonding units 120, and simultaneously transfer the bonded substrates to the second buffer unit 162. In addition, the first reverse unit 110, the second buffer unit 162, and the second loading/unloading unit 132 may be arranged along a first line, and the plurality of bonding units 120 may be arranged along a second line that is perpendicular to the first line. The third loading/unloading unit 133 may be provided between the second buffer unit 162 and the photo-curing unit 141. The third loading/unloading unit 133 may load the bonded substrates into the photo-curing unit 141 from the second buffer unit 162. In addition, a fourth loading/unloading unit 134 may be provided between the photo-curing unit 141 and the thermal hardening unit 142. The fourth loading/unloading unit 134 may load the bonded substrate into the thermal hardening unit 142 from the photo-curing unit 141.

Operation of the exemplary apparatus for manufacturing a LCD device according to the present invention will be described with regard to FIGS. 7A and 7B. During a first transfer process, the first loading/unloading unit 131 may selectively transfer the first and second substrates 151 and 152 to the first reverse unit 110 from the first buffer unit 161. The first substrate 151 and the second substrate 152 may have undergone a plurality of processing steps prior to being placed into the first buffer unit 161. For example, the first and second substrates 151 and 152 may have undergone cleaning, liquid crystal material deposition, and sealant forming processes prior to loading the first and second substrates 151 and 152 into the first buffer unit 161. In addition, the first and second substrates 151 and 152 may have undergone inspection processes prior to, or between the different clean, liquid crystal deposition, and sealant deposition processing. As previously described above, the first and second substrates 151 and 152 may have one of many different combinations of the liquid crystal material and/or sealant deposited thereupon. In addition, the first and second substrates 151 and 152 may alternatively include one of a C/F substrate and a TFT array substrate.

After the first transfer process, a first loading process may include individually loading the first and second substrates 151 and 152 into the first reverse unit 110 from the first buffer unit 161 by the first loading/unloading unit 131. Alternatively, the first loading process may include simultaneously loading the first and second substrates 151 and 152 into the first reverse unit 110 from the first buffer unit 161 by the first loading/unloading unit 131.

After the first loading process, a sensing process may include sensing by the first reverse unit 110 as to whether the first substrate 151 or the second substrates 152 has the liquid crystal material. During the sensing process, the first reverse unit 110 may sense each of the first and second substrates 151 and 152 by reading a specific indicia (not shown) that is assigned to each of the first and second substrates 151 and 152. For example, a distinctive mark or code may be disposed in an inactive region of each of the first and second substrates 151 and 152. Accordingly, the first reverse unit 110 may include a mark or code reader (not shown) that reads the mark or code of each of the first and second substrates 151 and 152 and senses whether the mark or code indicates that the first and second substrates 151 ad 152 does or does not have the liquid crystal material.

After the sensing process, a reversing process may performed in which the one of the first and second substrates 151 and 152 not having the liquid crystal material may be reversed (flipped).

After the reversing process, a second loading process may include individually loading the first and second substrates 151 and 152 into one of the plurality of bonding units 120 from the first reverse unit 110 by a plurality of the second loading/unloading units 132. Alternatively, the second loading process may include simultaneously loading the first and second substrates 151 and 152 into the plurality of bonding units 120 from the first reverse unit 110 by the plurality of second loading/unloading units 132.

During the second loading process, the substrate that includes the liquid crystal material (now referenced as the first substrate 151), may be loaded onto a lower stage 122*b* of the vacuum processing chamber 121 by a first of the plurality of second loading/unloading units 132. In addition, the substrate that does not include the liquid crystal material (now referenced as the second substrate 152), may be loaded onto an upper stage 122*a* of the vacuum processing chamber 121 by the first of the plurality of second loading/unloading units 132. Alternatively, the second substrate 152 may be loaded onto the upper stage 122*a* by a second of the plurality of second loading/unloading units 132.

After the second loading process, a bonding process may include a moving means 123 of the bonding unit 120 that may move at least one of the upper and lower stages 122*a* and 122*b* to press and bond the first and second substrates 151 and 152, thereby forming bonded substrates.

After the bonding process, a third loading process may include individually loading the bonded substrates into the second buffer unit 162 from each of the plurality of bonding units 120 by the plurality of second loading/unloading units 132. Alternatively, the third loading process may include simultaneously loading the bonded substrates into the second buffer unit 162 from the plurality of bonding units 120 by the plurality of second loading/unloading units 132.

After the third loading process, a fourth loading process may include individually loading the bonded substrates into the photo-curing unit 141 of the hardening unit 140 from the second buffer unit 162 by the third loading/unloading unit 133.

After the fourth loading process, a photo-curing process may include exposing the sealant disposed between the bonded substrates to light such as ultraviolet (UV) light, for example, thereby curing the sealant. The photo-curing unit 141 may include a mask such that a TFT array region of the TFT array substrate 151 is shielded from the light.

After the photo-curing process, a fifth loading process may include individually loading the bonded substrates into the thermal hardening unit 142 from the photo-curing unit 141 by the fourth loading/unloading unit 134. The thermal hardening unit 142 may expose the bonded substrates to elevated temperatures, thereby raising a temperature of the liquid crystal material. Accordingly, the liquid crystal material may flow to evenly disperse between the bonded substrates, and the sealant may harden.

After the fifth loading process, a sixth loading process may include individually loading the bonded substrates into a third buffer unit 163 from the thermal hardening unit 142 by the fourth loading/unloading unit 134. Then, the bonded substrates may be transferred for further processing.

Figure 8:
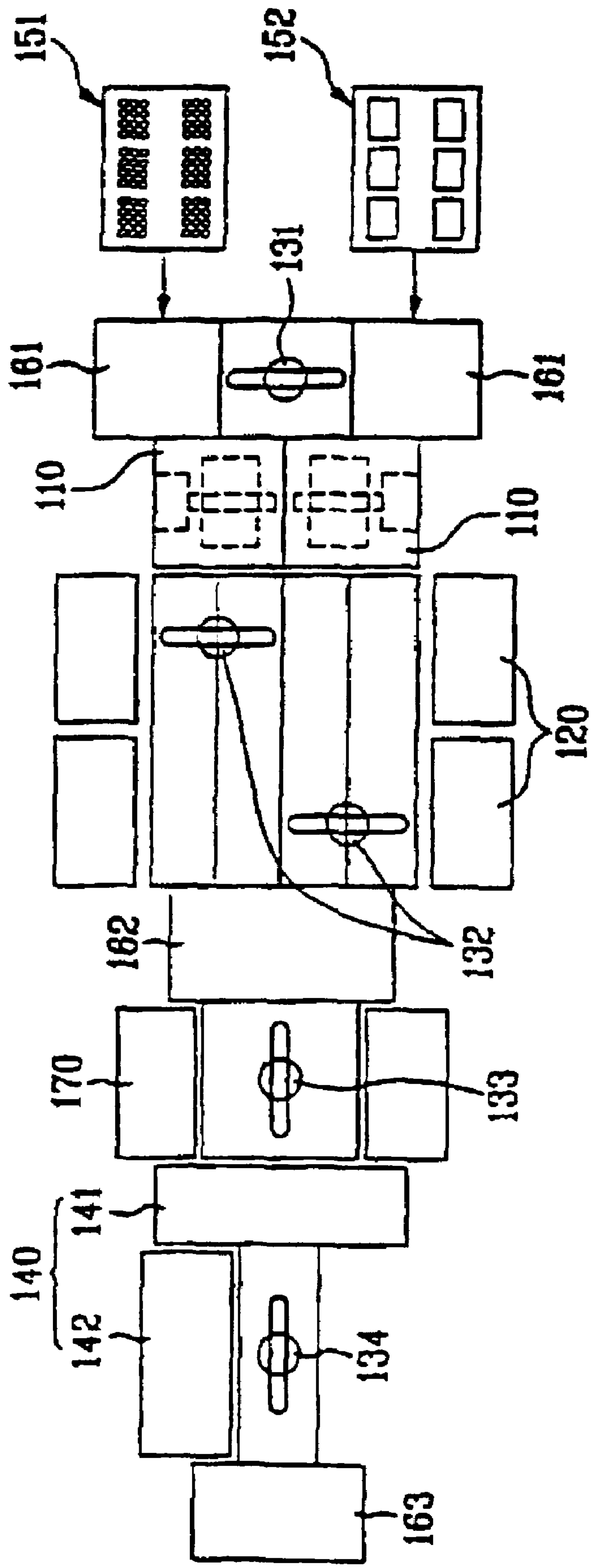
FIG. 8 shows another exemplary apparatus for manufacturing an LCD device according to the present invention.

FIG. 8 shows another exemplary apparatus for manufacturing an LCD device according to the present invention. The exemplary apparatus shown in FIG. 8 may include the features shown in FIGS. 7A and 7B, and may include a plurality of supplemental pressing units 170 arranged between the plurality of bonding units 120 and the hardening unit 140. The supplemental pressing units 170 may additionally apply pressure to the bonded substrates to improve a bonding state between the bonded substrates. In addition, each of the plurality of supplemental pressing units may be arranged at opposing sides of the third loading/unloading unit 133. The third loading/unloading unit 133 may individually load the bonded substrates into one of the supplemental pressing units 170 from the second buffer unit 162. In addition, the third loading/unloading unit 133 may also individually load the bonded substrates into the photo-curing unit 141 of the hardening unit 140 from the supplemental pressing units 170. Accordingly, an additional loading process may include individually loading the bonded substrates into the photo-curing unit 141 from the supplemental pressing units 170 without the need for an additional loading/unloading unit.

In FIG. 8, the second buffer unit 162 and the supplemental pressing units 170 may not be formed along a single line. Accordingly, the third loading/unloading unit 133 may be provided along another line with the second buffer unit 162 and the photo-curing unit 141, and the supplemental pressing units 170 may be provided along a line perpendicular to the third loading/unloading unit 133. Accordingly, the first and second substrates 151 and 152 may first be bonded by the bonding unit 120, and then additionally pressed by the supplemental pressing unit 170. Then, the third loading/unloading unit 133 may transfer the bonded substrates additionally pressed by the supplemental pressing units 170 to the second buffer unit 162.

Figure 9:
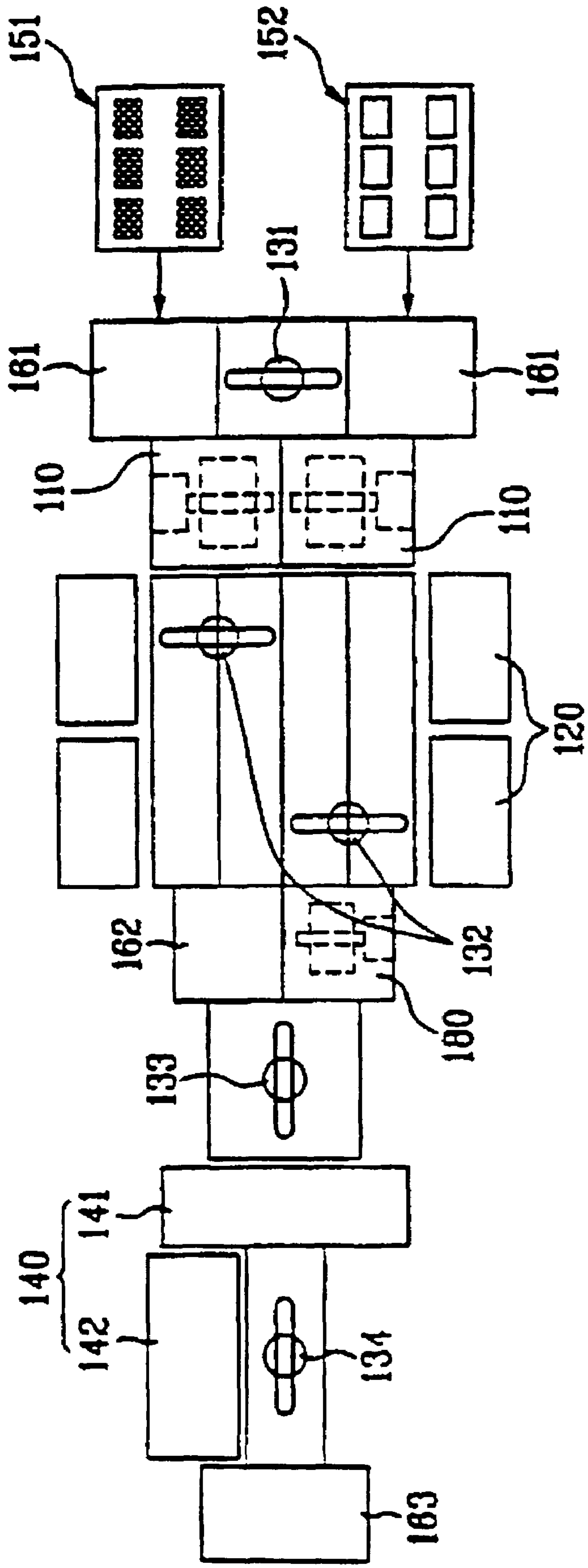
FIG. 9 shows another exemplary apparatus for manufacturing an LCD device according to the present invention.

FIG. 9 shows another exemplary apparatus for manufacturing an LCD device according to the present invention. The exemplary apparatus shown in FIG. 9 may include the features shown in FIGS. 7A and 7B, and may include a second reverse unit 180 arranged between the plurality of bonding units 120 and the hardening unit 140. The second reverse unit 180 may selectively reverse the bonded substrates bonded by the plurality of bonding units 120.

Figure 10A:
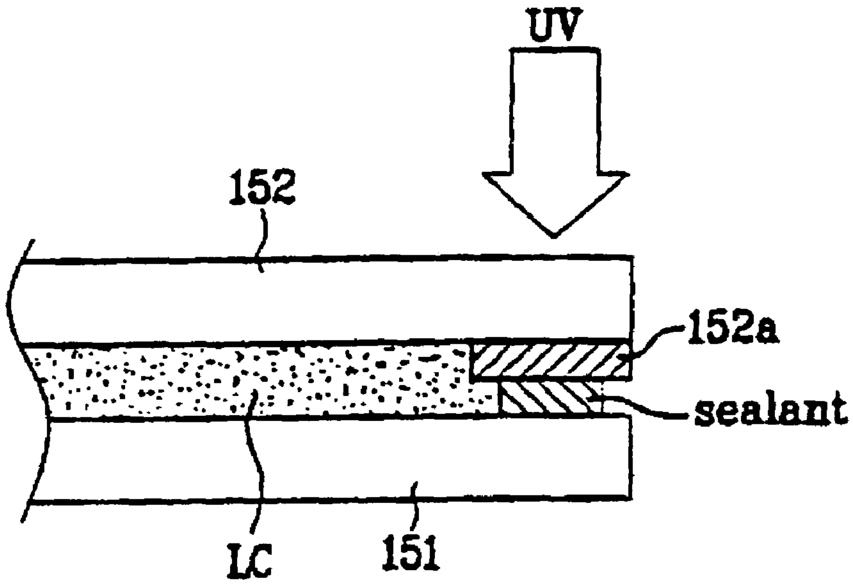
FIGS. 10A and 10B show cross sectional views of main portions an exemplary LCD device illustrating photo-hardening degree states of the sealant according to relative positions of the bonded substrates during a photo-curing process according to the present invention.
Figure 10B:
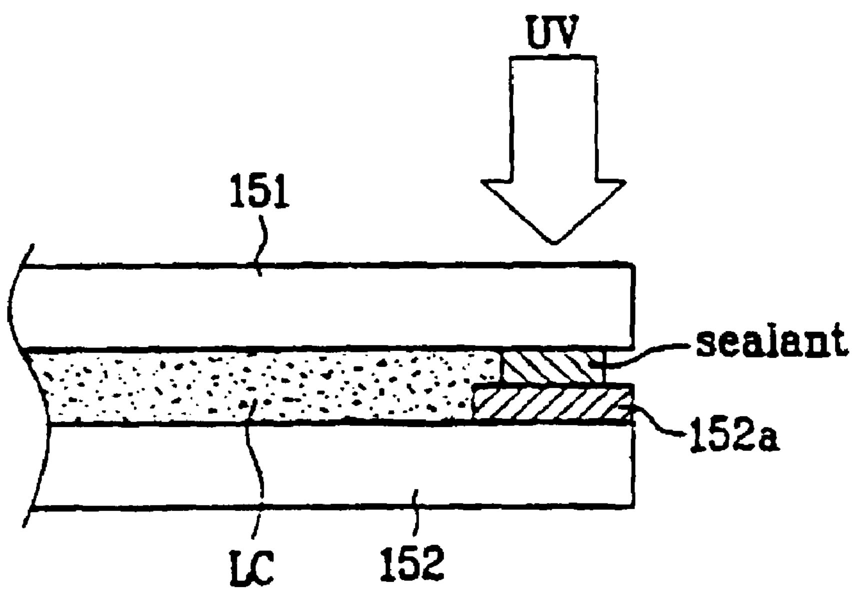

FIGS. 10A and 10B show cross sectional views of main portions an exemplary LCD device illustrating photo-hardening degree states of the sealant according to relative positions of the bonded substrates during a photo-curing process according to the present invention. In FIGS. 10A and 10B, black matrix films 152*a* may be formed on the second substrate 152 (C/F substrate) except for regions corresponding to pixel regions of the first substrate 151 (TFT array substrate). The black matrix 152 prevents the light emitted during the photo-curing unit 141 from reaching the sealant. Accordingly, the sealant may not be sufficiently hardened.

The second reverse unit 180 may include a sensing unit that may sense whether the black matrix 152*a* is formed on the C/F substrate 152 or on the TFT array substrate 151. In cases where the black matrix 152*a* is formed on the C/F substrate 152, the bonded substrates are reversed by the second reverse unit 180 shown in FIG. 9. Accordingly, the sealant will be exposed to the light in the photo-curing unit 141, thereby sufficiently hardening the sealant. The sensing unit may read a specific indicia (not shown) that is assigned to each of the bonded substrates. For example, a distinctive mark or code may be disposed in an inactive region of each of the bonded substrates. The second reverse unit 180 may include a mark or code reader (not shown) that reads the mark or code of each of the bonded substrates, and senses whether the mark or code indicates that the upper bonded substrate is a C/F substrate or a TFT array substrate. Accordingly, during the operation of the apparatus shown in FIG. 9, a second reverse process may be necessary after the third loading process. During the second reverse process, the bonded substrates that are sensed to have a C/F substrate as the uppermost substrate may be individually loaded into the second reverse unit 180 from the plurality of bonding units 120 by the second loading/unloading units 132. Then, the second reverse unit 180 reverses an orientation of the bonded substrates such that the TFT array substrate is now the uppermost substrate. The reversed bonded substrate is loaded to the second buffer unit 162 from the second reverse unit 180 by one of the second loading/unloading units 132, or by the third loading/unloading unit 133. Alternatively, an additional loading/unloading unit may be incorporated, whereby neither of the second loading/unloading units 132 nor the third loading/unloading unit 133 need to be used.

Figure 11:
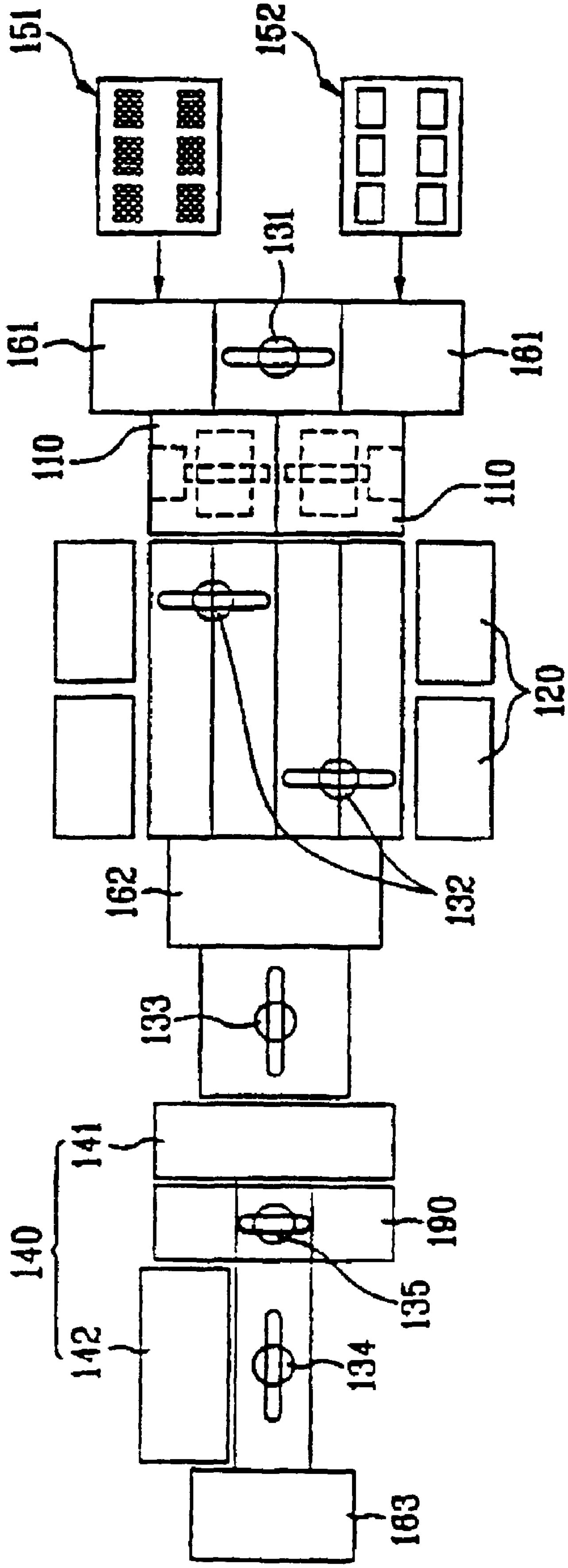
FIG. 11 shows another exemplary apparatus for manufacturing an LCD device according to the present invention.

FIG. 11 shows another exemplary apparatus for manufacturing an LCD device according to the present invention. The exemplary apparatus shown in FIG. 11 may include the features shown in FIGS. 7A and 7B, and may include bonding degree sensing units 190 for sensing a degree of bonding between the bonded substrate provided between the photo-curing unit 141 and the thermal hardening unit 142, and a fifth loading/unloading unit 135 provided between the bonding degree sensing units 190, the photo-curing unit 141, and the fourth loading/unloading unit 134. The fifth loading/unloading unit 135 may load the bonded substrates into the bonding degree sensing units 190 from the photo-curing unit 141, and may load the bonded substrates into the thermal-hardening unit 142 if the bonding degree of the bonded substrates are determined to be sufficient by the bonding degree sensing units 190. Alternatively, the fifth loading/unloading unit 135 may be omitted, and the fourth loading/unloading unit 134 may load the bonded substrates between the photo-curing unit 141, the bonding degree sensing units 190, and the thermal-hardening unit 142. Moreover, it may not be necessary to provide the bonding degree sensing unit 190 between the photo-curing unit 141 and the thermal hardening unit 142.

Alternatively, the bonding degree sensing units 190 may be provided at a processing region after the plurality of bonding units 120 and before the hardening unit 140, thereby removing bonded substrates with insufficient bond degree and preventing unnecessary processing time of the bonded substrates.

Detail processes involved in manufacturing an LCD will now be described in detail. In addition, various devices for performing functions in the production line will also be described.

Figure 12:
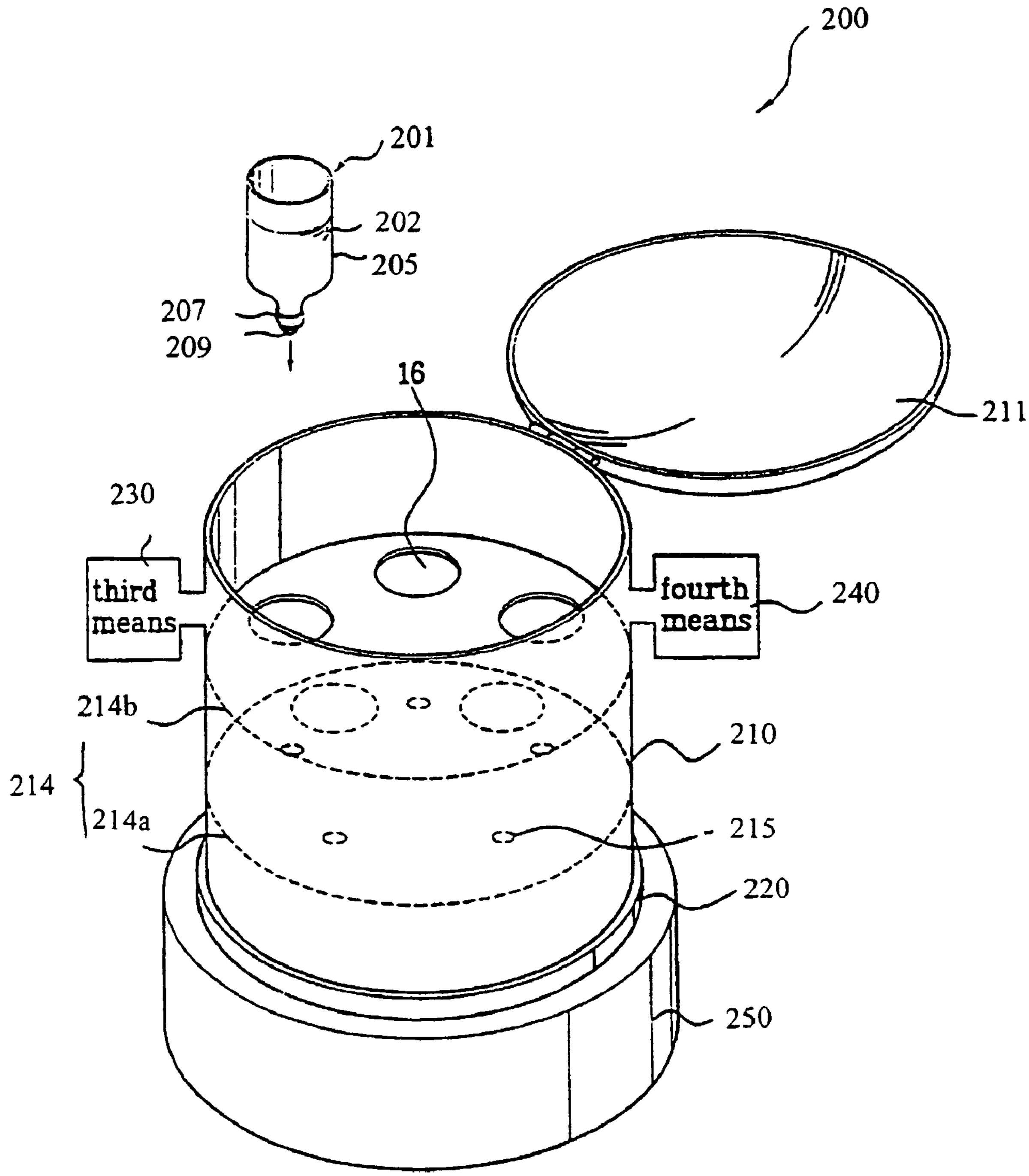
FIG. 12 is a perspective view illustrating an exemplary apparatus and method for deaerating a liquid crystal in accordance with an embodiment of the present invention.

FIG. 12 is a perspective view illustrating an exemplary apparatus for deaerating liquid crystal used in manufacturing a liquid crystal display device by the liquid crystal dropping method in accordance with the present invention.

Referring to FIG. 12, a plurality of liquid crystal syringes 201 (only one syringe is shown in the drawing) filled with a liquid crystal 202 to be deaerated are placed in a chamber 210. Of course, the chamber 210 need not hold more than one liquid crystal syringe 201, but it is more efficient to deaerate more than one at a time. The liquid crystal syringes 201 is placed in the chamber 210 for deaerating the liquid crystal 202 using a deaerating apparatus 200. At this time, the liquid crystal syringes 201 are not yet assembled and set. After deaeration process step is finished, the liquid crystal syringe 201 will be assembled and set to be mounted on the liquid crystal dispenser in the production line. The liquid crystal syringe 201 may include, for example, a container 205 for containing the liquid crystal 202, an opening and shutting part 207 connected to the container 205 for dispensing the liquid crystal 202, and a nozzle 209 connected to the opening and shutting part 207 having the liquid crystal 202 dispensed. Of course, other syringe types or liquid crystal dispensers may be used in accordance with the present invention.

There is a first portion (holder) 214 in the chamber 210 to hold the liquid crystal syringe 201. The first portion 214 may include a first holding part 214*a* for holding the opening and shutting part 207 of the liquid crystal syringe 201, and a second holding part 214*b* for holding the container 205. The first holding part 214*a* has a plurality of first holes 215 matched to a diameter of the opening and shutting part 207, and the second holding part 214*b* has a plurality of second holes 216 matched to a diameter of the container 205. The first and second holding parts 214*a* and 214*b* hold the liquid crystal syringe 201. Of course, other configurations for the first portion 214 may be used as long as such configurations serve as a holder to securely hold the liquid crystal syringes 201.

There is a displacing mechanism 220 to cause displacements of the chamber 210. That is, the displacing mechanism 220 may vibrate and/or rotate the chamber 210. The displacing mechanism 220 may be located below the chamber 210 to vibrate and/or rotate the chamber 210, thereby disturbing or inducing flow in the liquid crystal 202 in the liquid crystal syringe 201 in the chamber 201. Generally, a circular motion is preferred to circulate the liquid crystal 202 without causing air bubbles.

The deaerating apparatus 200 may also include a vacuum system 30 for evacuating the chamber 210, a gas supply 240 for restoring the chamber 210 to an atmospheric pressure state, and a body 250 for supporting the chamber 210 and the displacing mechanism 220. The vacuum system 230 (for example, a vacuum pump) reduces a pressure of the chamber 210 by discharging air from the chamber 210 to the atmosphere. The gas supply 240 inflows gas, preferably an inert gas such as nitrogen gas ($N_2$), into the chamber 210 to restore the chamber 210 to an atmospheric pressure state again.

The method for deaerating the liquid crystal 202 by using the apparatus 200 in accordance with the present invention can be explained as follows.

At first, a cover 211 is opened to mount the liquid crystal syringe 1 on the first and second holding parts 214*a* and 214*b* in the chamber 210. Then, the cover 211 is closed to seal the chamber 210, and the displacing mechanism 220 starts to operate, thereby circulating the liquid crystal 202 in the liquid crystal syringe 201. At the same time, the vacuum system 230 starts to evacuate air inside of the chamber 210 through a vacuum line (not shown), thereby removing moisture and air in the liquid crystal 202 due to a pressure difference between the chamber 210 and the liquid crystal 202. The foregoing deaeration process step can remove moisture and air in the liquid crystal 202 effectively and quickly since the deaeration process step is carried out while flowing of the liquid crystal 202. That is, liquid crystal flow is induced in the up down, left, and right directions or rotational directions.

To finish the deaeration process, the gas supply 240 provides nitrogen gas ($N_2$) into the chamber 210 through a nitrogen gas line (not shown); thereby restoring the pressure of the chamber 210 to the atmospheric pressure.

After completion of all the foregoing process steps, the liquid crystal syringe 201 is taken out of the chamber 210, and the liquid crystal dropping process is carried out as described in detail herein. That is, though not shown, after the liquid crystal syringe 201 having been deaerated, it is assembled and set to be mounted on the liquid crystal dispenser of the production line. Then, the liquid crystal 202 is dropped and dispensed onto the pixel region of the TFT substrate or the color filter substrate to manufacture a large LCD panel. Here, a large LCD panel having a plurality of unit panels is formed.

As has been explained, the apparatus and method for deaerating a liquid crystal of the present invention have the following advantages. First, process time loss can be minimized by carrying out deaeration of a liquid crystal in a plurality of syringes placed in the chamber. Also, the deaeration process can remove moisture and air in the liquid crystal effectively and quickly since the deaeration process step is carried out while liquid crystal flow is induced. Further, the effective removal of moisture and air in the liquid crystal can reduce the occurrence of defective LCDs, thereby improving yield.

Figure 13:
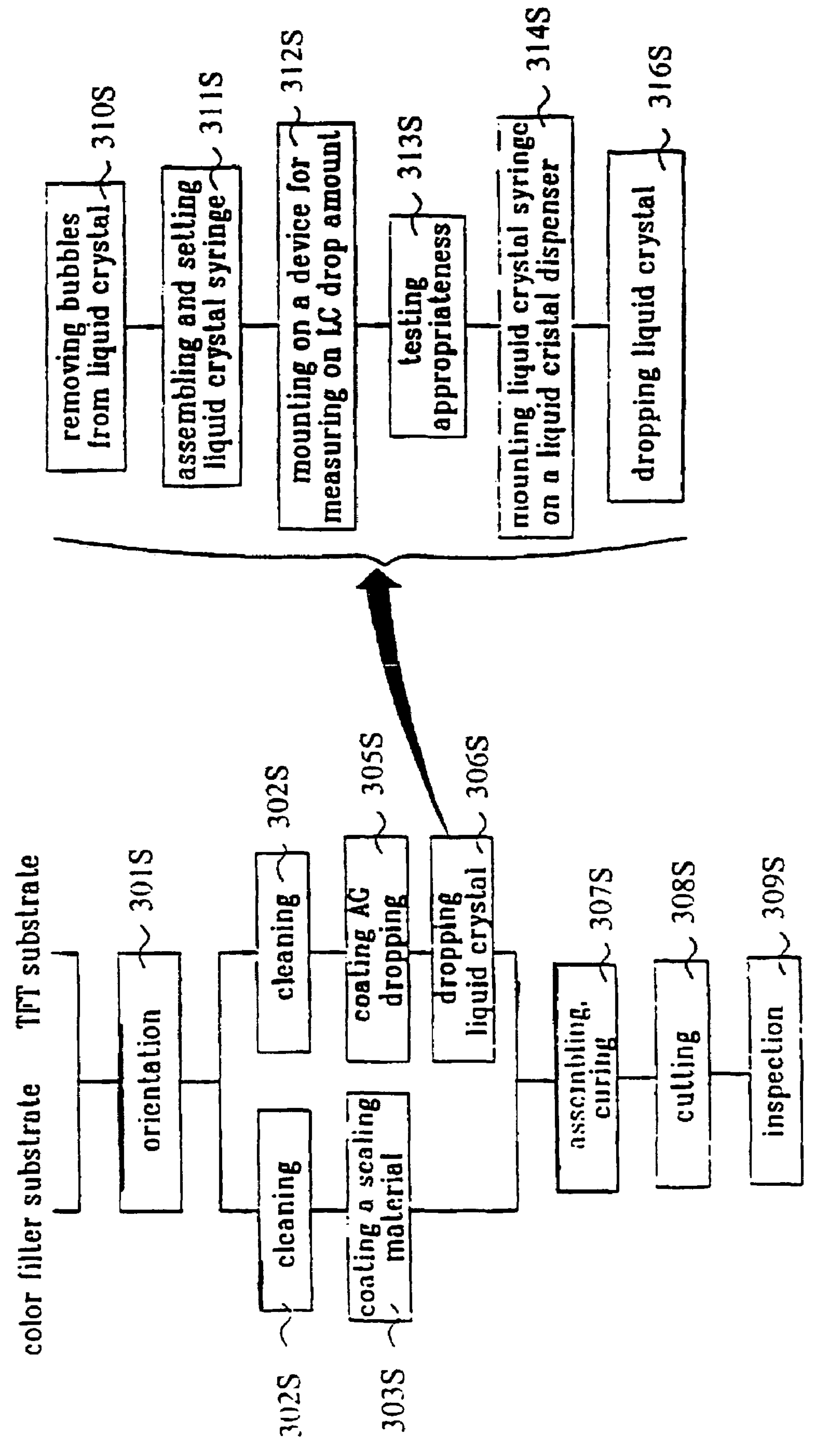
FIG. 13 is a flow chart showing the process steps of a method for manufacturing a liquid crystal display device in accordance with an embodiment of the present invention.
Figure 14:
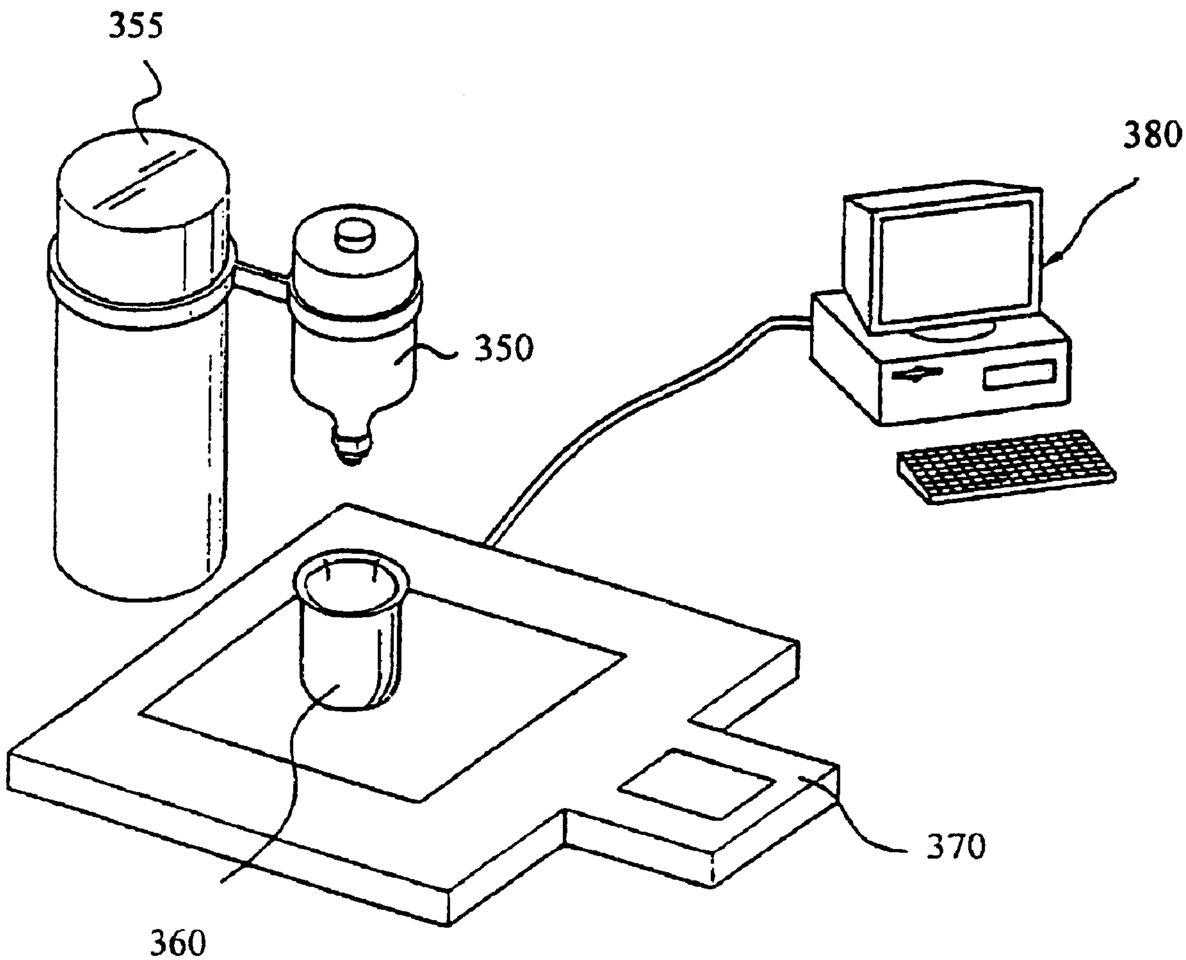
FIG. 14 is a perspective view showing an apparatus for measuring a dispensing amount of liquid crystal drops in FIG. 10.

FIG. 13 illustrates a flow chart showing the process steps of a method for manufacturing a liquid crystal display device in accordance with an embodiment of the present invention, and FIG. 14 illustrates a perspective view for explaining the apparatus for measuring a dispensing amount of the liquid crystal drops in FIG. 6.

Referring to FIG. 13, a first substrate and a second substrate are provided. The first substrate (hereafter called as a "TFT substrate") includes a plurality of gate lines running in one direction at fixed intervals, a plurality of data lines running in the other direction perpendicular to the gate lines at fixed intervals, a plurality of thin film transistors and pixel electrodes in a matrix pixel region defined by the gate lines and the data lines, formed thereon. The second substrate (hereafter called as a "color filter substrate") includes a black matrix layer for shielding a light incident to parts except the pixel region, a color filter layer, and a common electrode.

The liquid crystal cell process will be explained in detail as follows.

An orientation step (301S) is carried out for both of the TFT substrate and the color filter substrate. The orientation step is in order of cleaning before coating the orientation film, printing the orientation film, baking the orientation film, inspecting the orientation film, and rubbing.

Then, the color filter substrate is cleaned (302S). The cleaned color filter substrate is loaded on a stage of a seal dispenser, and a sealing material is formed on a periphery of unit panel areas in the color filter substrate (303S). The sealing material may be a photo-hardening resin, or thermo-hardening resin. However, no liquid crystal filling hole is required.

At the same time, the cleaned TFT substrate is loaded on a stage of a silver (Ag) dispenser, and a silver paste material is dispensed onto a common voltage supply line on the TFT substrate in the form of a dot (305S). Then, the TFT substrate is transferred to a LC dispenser, and a liquid crystal material is dropped onto an active array region of each unit panel area in the TFT substrate (306S). Of course, the present invention is not limited to this configuration. For example, the forming of the sealing material may be either on the TFT substrate or the color filter substrate.

The liquid crystal dropping process will now be described as follows.

After a liquid crystal material is contained into an LC syringe before the LC syringe is assembled and set, air dissolved in the liquid crystal material is removed under a vacuum state (310S), and the liquid crystal syringe is assembled and set (311S). The LC syringe is then mounted on an apparatus for measuring a dispensing amount of liquid crystal drops (312S).

Referring to FIG. 14, the apparatus for measuring a dispensing amount of liquid crystal drops includes a liquid crystal syringe 350, a column 355 for supporting the liquid crystal syringe 350, a container 360 for containing the liquid crystal dispensed from the liquid crystal syringe 350, a measuring part 370 for measuring a dispensed amount of the liquid crystal drops, and a monitoring part 380 for receiving a data from the measuring part 370 and determining functionality of the liquid crystal syringe.

The proper function of the assembled and set liquid crystal syringe 350 is determined by the apparatus for measuring a dispensing amount of liquid crystal drops (313S). Proper function is determined such that, for example, a dispensing amount of the unit liquid crystal drop is displayed on the monitoring part 380 in milligrams, and, if the dispensing amount of the unit liquid crystal drop is out of a preset range of an error (for example, ±1%), assembling, setting, and testing of the liquid crystal syringe is repeated until the amount is within the preset error range.

As a result of the foregoing repeated test, if the amount is within the preset range of error, the assembled and set LC syringe having liquid crystal filled therein and the parts for controlling dispensing of the liquid crystal in the liquid crystal syringe are determined to be good. Once assembled and set the liquid crystal syringe is determined to be good according to the functionality determination of the liquid crystal syringe, the liquid crystal syringe is mounted on the liquid crystal dispenser of the production line (314S).

Then, when the substrate is loaded onto a stage of the liquid crystal dispenser, the liquid crystal is dropped onto the substrate using the liquid crystal syringe (306S), by making uniform dotting of a preset dispensing amount of the liquid crystal drop onto the TFT substrate with defined pitches inside of a coating area of the sealing material (pixel region).

The functionality determination of the assembled and set liquid crystal syringe may be made again by measuring a dispensing amount of the liquid crystal drop by using a container in the liquid crystal dispensing system before actual dispensing of the liquid crystal on the substrate.

After the TFT substrate and the CF substrate are loaded into a vacuum assembling chamber, the TFT substrate and the CF substrate are assembled into a liquid crystal panel such that the dropped liquid crystal is uniformly spread over unit panel areas in the liquid crystal panel (307S). Then, the sealing material is cured (307S). The assembled TFT substrate and color filter substrate (which is a large panel) is cut into individual unit panels (308S). Each unit panel is ground and inspected (309S), thereby completing manufacturing of the LCD unit panel.

As has been explained, the apparatus for measuring a dispensing amount of a liquid crystal drops and the method for manufacturing a liquid crystal display device by using the same of the present invention has numerous advantages. For example, by progressing the liquid crystal cell process step after making sure of appropriateness of assembled and set states of the liquid crystal syringe using an independent apparatus for measuring a dispensed amount of liquid crystal drops before mounting the liquid crystal syringe on the liquid crystal dispenser in the production line, we can prevent the inconvenience and time delay of the manufacturing process causing by ensuring the functionality of the liquid crystal syringe after it is mounted on the liquid crystal dispenser in a state where the liquid crystal syringe is completely assembled and set. Thus, a working environment and a time efficiency can be maximized, thereby increasing a production yield.

To solve the problems of the conventional liquid crystal injection methods, a novel liquid crystal dropping method has been recently introduced. The liquid crystal dropping method forms a liquid crystal layer by directly applying liquid crystal onto a substrate and then spreading the applied liquid crystal by pressing substrates together. According to the liquid crystal dropping method, the liquid crystal is applied to the substrate in a short time period such that the liquid crystal layer can be formed quickly. In addition, liquid crystal consumption can be reduced due to the direct application of the liquid crystal, thereby reducing fabrication costs.

Figure 15:
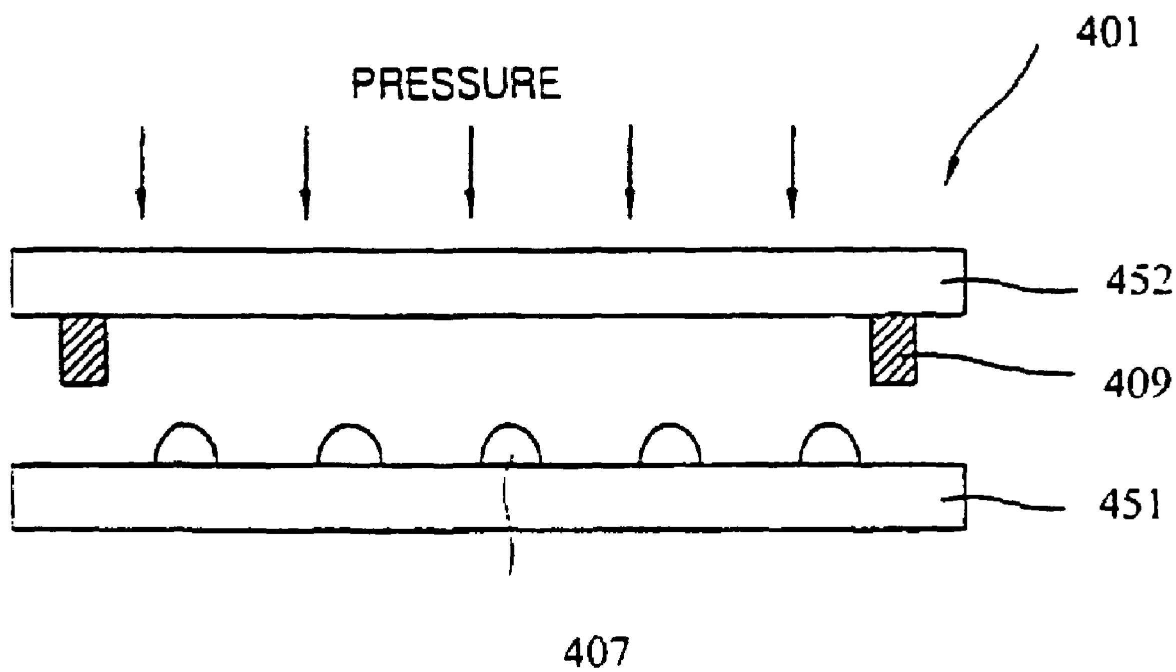
FIG. 15 is a view showing an exemplary LCD fabricated using a method for dropping liquid crystal according to the present invention.

FIG. 15 illustrates the basic liquid crystal dropping method. As shown, liquid crystal is dropped (applied) directly onto a lower substrate 451 before the lower substrate 451 and the upper substrate 452 are assembled. Alternatively, the liquid crystal 407 may be dropped onto the upper substrate 452. That is, the liquid crystal may be formed either on a TFT (thin film transistor) substrate or on a CF (color filter) substrate. However, the substrate on which the liquid crystal is applied should be the lower substrate during assembly.

A sealing material 409 is applied on an outer part of the upper substrate (substrate 452 in FIG. 15). The upper substrate 452 and the lower substrate 451 are then mated and pressed together. At this time the liquid crystal drops 407 spread out by the pressure, thereby forming a liquid crystal layer having uniform thickness between the upper substrate 452 and the lower substrate 451.

Figure 16:
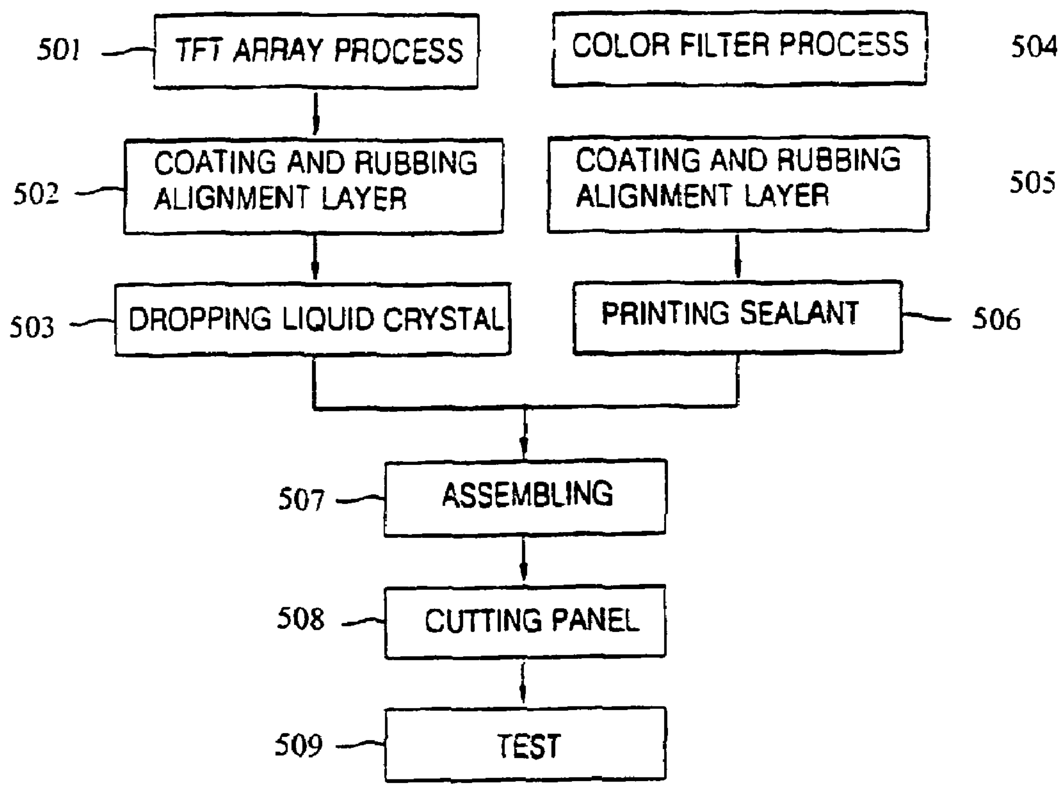
FIG. 16 is a flow chart showing an exemplary method for fabricating the LCD according to the liquid crystal dropping method.

FIG. 16 presents a flowchart of a method of fabricating LCDs using the liquid crystal dropping method. As shown, in steps S501 and S502 the TFT array is fabricated and processed, and an alignment layer is formed and rubbed. In steps S504 and S505 a color filter array is fabricated, and processed, and an alignment layer is formed and rubbed. Then, as shown in step S503 liquid crystal is dropped (applied) onto one of the substrates. In FIG. 16, the TFT array substrate is shown as receiving the drops, but the color filter substrate might be preferred in some applications. Additionally, as shown in step S506, a sealant is formed on one of the substrates, in FIG. 16 the color filter substrate (the TFT array substrate might be preferred in some applications). It should be noted that the TFT array fabrication process and the color filter fabrication process are generally similar to those used in conventional LCD fabrication processes. By applying liquid crystals by dropping it directly onto a substrate it is possible to fabricate LCDs using large-area glass substrates (1000×1200 $mm^2$ or more), which is much larger than feasible using conventional fabrication methods.

Thereafter, the upper and lower substrates are disposed facing each other and pressed to attach to each other using the sealing material. This compression causes the dropped liquid crystal to evenly spread out on entire panel. This is performed in step S507. By this process, a plurality of unit liquid crystal panel areas having liquid crystal layers are formed by the assembled glass substrates. Then, in step S508 the glass substrates are processed and cut into a plurality of liquid crystal display unit panels. The resultant individual liquid crystal panels are then inspected, thereby finishing the LCD panel process, reference step S509.

The liquid crystal dropping method is much faster than conventional liquid crystal injection methods. Moreover, the liquid crystal dropping method avoids liquid crystal contamination. Finally, the liquid crystal dropping method, once perfected, is simpler than the liquid crystal injection method, thereby enabling improved fabrication efficiency and yield.

Figure 17:
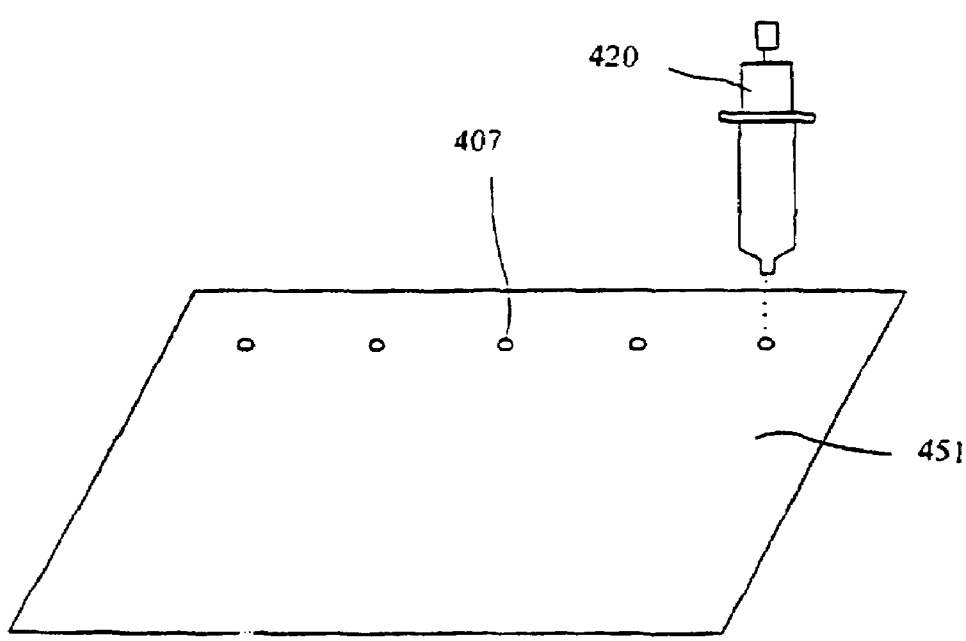
FIG. 17 is a view showing the basic concept of the liquid crystal dropping method.

In the liquid crystal dropping method, to form a liquid crystal layer having a desired thickness, the dropping position of the liquid crystal and the dropping amount of the liquid crystal should be carefully controlled. FIG. 17 illustrates dropping liquid crystal 407 onto the substrate 451 (beneficially a large glass substrate) using a liquid crystal dispensing device 420. As shown, the liquid crystal dispensing device 420 is installed above the substrate 451.

Generally, liquid crystal 407 is dropped onto the substrate 451 as well-defined drops. The substrate 451 preferably moves in the x and y-directions according to a predetermined pattern while the liquid crystal dispensing device 420 discharges liquid crystal at a predetermined rate. Therefore, liquid crystal 407 drops are arranged in a predetermined pattern such that the drops are separated by predetermined spaces. Alternatively, the substrate 451 could be fixed while the liquid crystal dispensing device 420 is moved. However, a liquid crystal drop may be trembled by the movement of the liquid crystal dispensing device 420. Such trembling could induce errors. Therefore, it is preferable that the liquid crystal dispensing device 420 is fixed and the substrate 451 is moved.

Figure 18A:
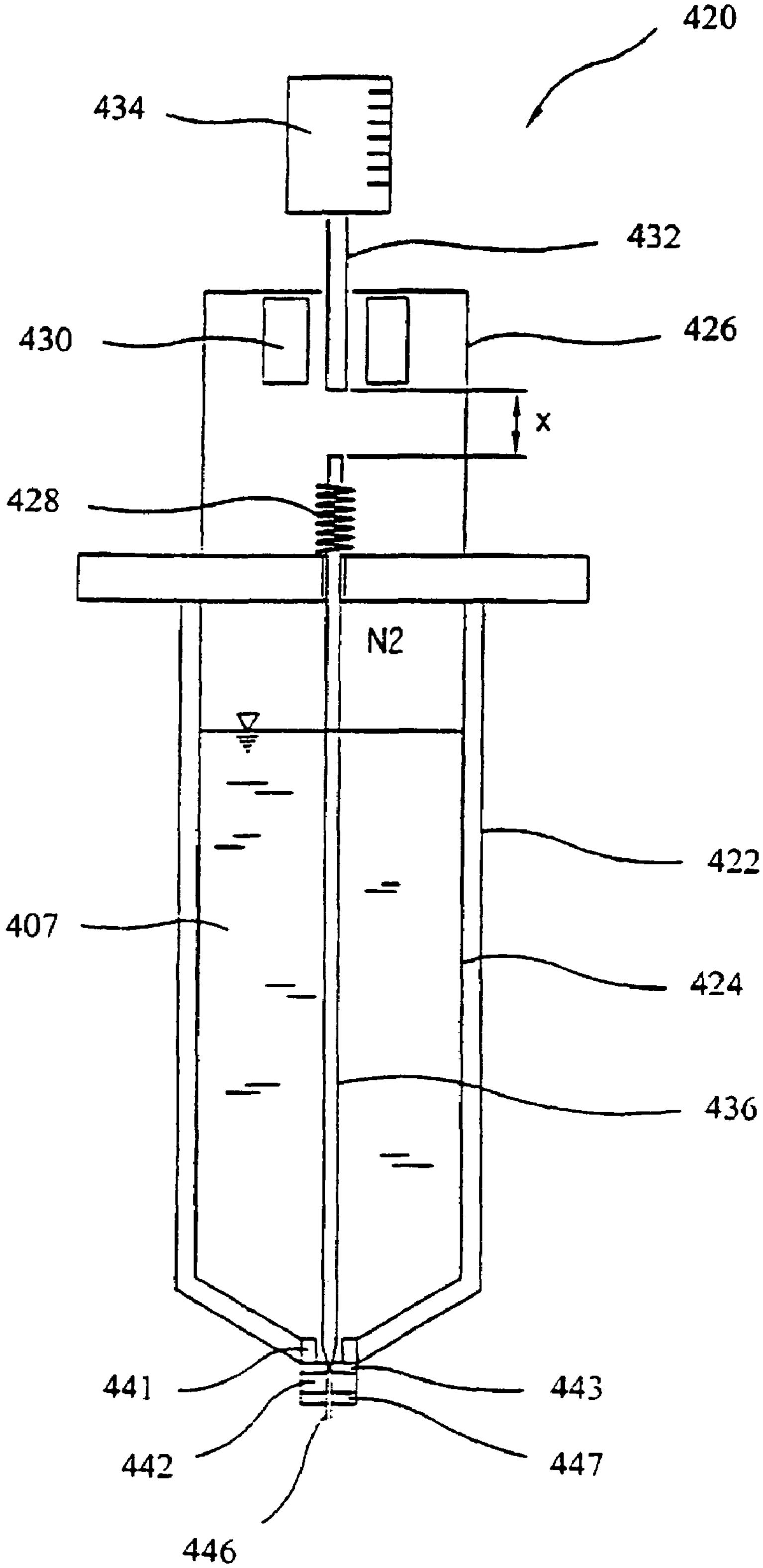
FIG. 18A illustrates a state in which liquid crystal is not dropped from a liquid crystal dropping apparatus.
Figure 18B:
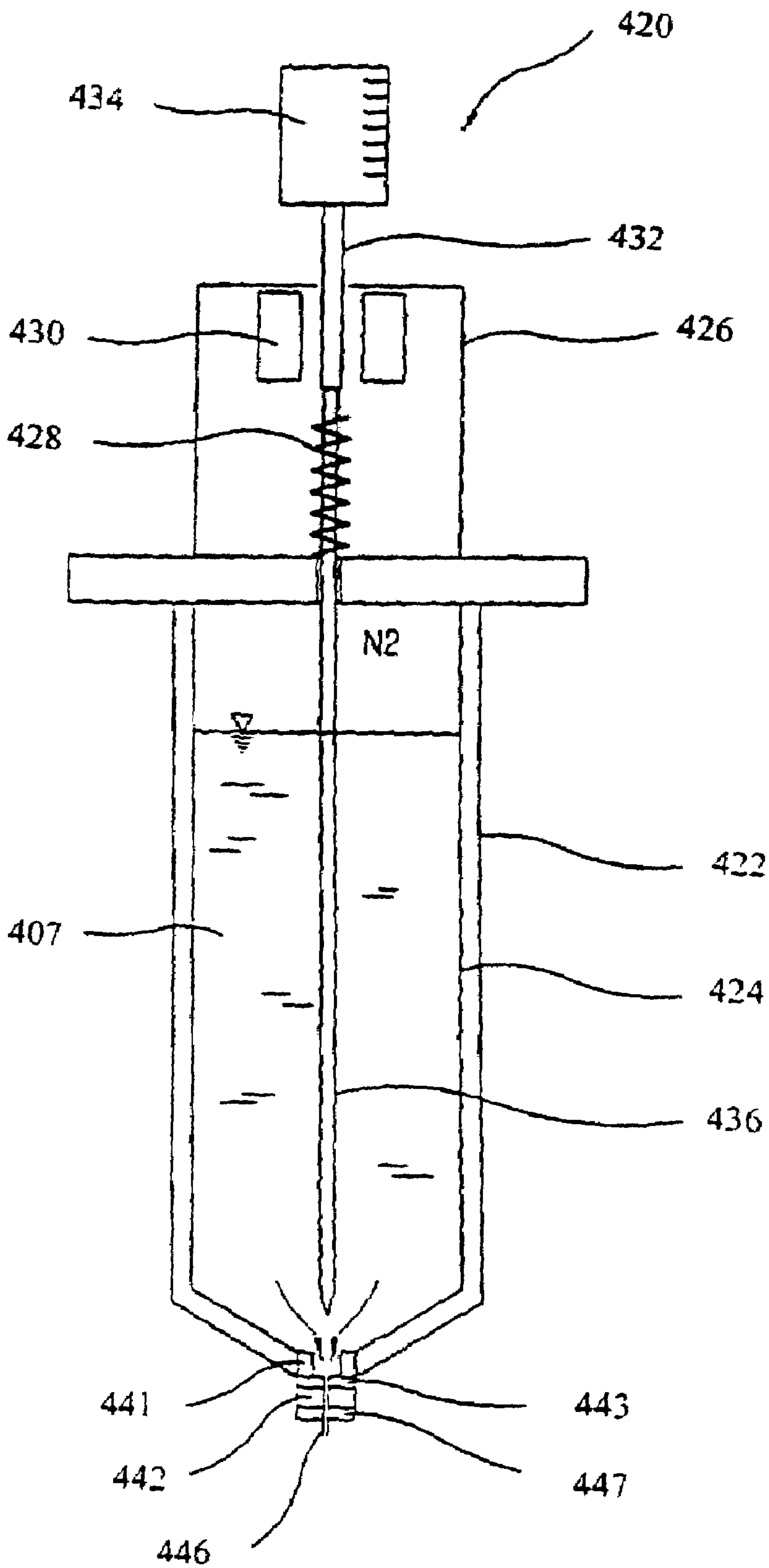
FIG. 18B illustrates a state in which liquid crystal is being dropped from a liquid crystal dropping apparatus.

FIG. 18A illustrates the liquid crystal dispensing device 420 in a state in which liquid crystal is not being dropped. FIG. 18B illustrates the liquid crystal dispensing device 420 in a state in which liquid crystal is being dropped. As shown in those figures, the liquid crystal dispensing device 420 includes a cylindrically shaped, polyethylene liquid crystal container 424 that is received in a stainless steel case 422. Generally, polyethylene has superior plasticity, it can be easily formed into a desired shape, and does not react with liquid crystal 407. However, polyethylene is structurally weak and is thus easily distorted. Indeed, if the case was of polyethylene it could be distorted enough that liquid crystal might not be dropped at the exact position. Therefore, a polyethylene liquid crystal container 424 is placed in a stainless steel case 422.

A gas supplying tube (not shown) that is connected to an external gas supplying (also not shown) is beneficially connected to an upper part of the liquid crystal container 424. A gas, such as nitrogen, is input through the gas supplying tube so as to fill the space without liquid crystal. The gas compresses the liquid crystal, thus tending to force liquid crystal from the liquid crystal dispensing device 420.

The liquid crystal container 424 may be made of a metal such as stainless steel. Then, the liquid crystal container 424 is unlikely to be distorted and an outer case would not be needed. But, a fluorine resin film should be applied on the liquid crystal container 424 to prevent liquid crystal 407 from chemically reacting with the liquid crystal container.

Referring back to FIGS. 18A and 18B, an opening is formed on a lower end of the case 422 by a first connecting portion 441. The first connecting portion 441 mates to a second connecting portion 442. A needle sheet 443 is positioned between the first connecting portion 441 and the second connecting portion 442. Beneficially, the first connecting portion 441 and the second connecting portion 442 are threaded members dimensioned to receive the needle sheet 443, which is then retained in place when the first and second connecting portions are mated. The needle sheet 443 includes a discharge hole through which liquid crystal 407 is discharged into the second connecting portions 442.

Still referring to FIGS. 18A and 18B, a nozzle 446 having a small discharge opening is connected to the second connecting portion 442. The nozzle 446 is for dropping liquid crystal 407 as small, well-defined drops. The nozzle 446 beneficially includes a supporting portion 447 that mates to the second connecting portion 442, thus retaining the nozzle 446 in position. A discharging tube from the discharge hole of the needle sheet 443 to the discharge opening of the nozzle 446 is thus formed.

Still referring to FIGS. 18A and 18B, a needle 436 is inserted into the liquid crystal container 424. One end of the needle 436 contacts the needle sheet 443 discharge hole when the needle 436 is inserted as far as possible into the liquid crystal container 424. That end of the needle 436 is conically shaped and fits into the discharge hole so as to close that hole.

A spring 428 is installed on the other end of the needle 436. That end of the needle extends into an upper case 426 of the liquid crystal dispensing device 420. A magnetic bar 432 connected to a gap controlling unit 434 is positioned above the end of the needle 436. The magnetic bar 432 is made from a ferromagnetic material or from a soft magnetic material. A cylindrical solenoid coil 430 is positioned around the magnetic bar 432. The solenoid coil 430 selectively receives electric power. That power produces a magnetic force that interacts with the magnetic bar 432 to move the needle 436 against the spring 428, thus opening the discharge hole of the needle sheet 445. When the electric power is stopped, the needle 436 is returned to its static position by the elasticity of the spring 428, thus closing the discharge hole.

Several comments about the liquid crystal dispensing device 420 might be helpful. First, the gap controlling unit 434 controls the distance X between the end of the magnetic bar 432 and the end of the needle 436. Next, since one end of the needle 436 repeatedly contacts the needle sheet 443, the needle 436 and the needle sheet 443 are exposed to repeated shock that could damage those parts. Therefore, it is desirable that the end of the needle 436 that contacts the needle sheet 443, and the needle sheet itself, should be formed from materials that resist shock, for example, a hard metal such as stainless steel. Finally, it should be noted that the liquid crystal 407 drop size depends on the time that the discharge hole is open and on the gas pressure. The opening time is determined by the distance (x) between the needle 436 and the magnetic bar 432, the magnetic force produced by the solenoid coil 430, and the tension of the spring 428. The magnetic force can be controlled by the number of windings that form the solenoid coil 430, or by the magnitude of the applied electric power. The distance x can be controlled by the gap controlling unit 434.

As shown in FIG. 17, a liquid crystal dispensing device 420 drops liquid crystal onto a substrate. However, in practice it is beneficial to use a number of liquid crystal dispensing devices 420 to speed up liquid crystal application. While the number of liquid crystal dispensing device 420 can vary according to processing conditions, hereinafter it will be assumed that four liquid crystal dispensing devices 420 are used in an automated application process.

In order to solve the problems of the conventional liquid crystal injection methods such as a liquid crystal dipping method or liquid crystal vacuum injection method, a liquid crystal dropping method is described herein. The liquid crystal dropping method is a method for forming a liquid crystal layer by directly dropping the liquid crystal and spreading the dropped liquid crystal over the entire panel by assembling pressure of the panel, not by injecting the liquid crystal by the pressure difference between the inner and outer sides of the panel. According to the liquid crystal dropping method, the liquid crystal is directly dropped on the substrate for a short period so that the liquid crystal layer in the LCD of larger area can be formed quickly. In addition, the liquid crystal consumption can be minimized due to the direct dropping of the liquid crystal as required amount, thereby reducing the fabrication cost.

In the method for fabricating LCD adopting the liquid crystal dispensing method, to form the liquid crystal layer having the desired thickness, the dropping position of the liquid crystal and the dropping amount of the liquid crystal must be controlled. Since the thickness of the liquid crystal layer is related closely to the cell gap of the liquid crystal display panel, especially, the exact dropping position of the liquid crystal and the dropping amount are very important to prevent the inferiority of the liquid crystal display panel. Therefore, there is need for an apparatus for dropping an exact amount of liquid crystal at a predetermined position.

FIG. 17 illustrates a basic method for dropping the liquid crystal 407 on the substrate (glass substrate of larger area) using the liquid crystal dispensing apparatus 420 according to the present invention. As shown, the liquid crystal dispensing apparatus 420 is installed above the substrate 451. Although not shown in FIG. 17, the liquid crystal is filled into and contained in the liquid crystal dispensing apparatus 420 to be dropped on the substrate.

Generally, the liquid crystal is dropped onto the substrate as a drop shape. The substrate 451 is preferably moving in the x and y-directions according to a predetermined speed and the liquid crystal dispensing apparatus 420 discharges the liquid crystal during a predetermined time interval. Therefore, the liquid crystal 407 dropping on the substrate 451 is arranged toward x and y direction with a predetermined intervals therebetween. At this time, the substrate may be fixed, while the liquid crystal dispensing apparatus 420 may move toward the x and y direction to drop the liquid crystal with a predetermined interval. However, in this case, the liquid crystal of drop shape is trembled by the movement of the liquid crystal dispensing apparatus, so that an error in the dropping position and the dropping amount of the liquid crystal may be occurred. Therefore, it is preferable that the liquid crystal dispensing apparatus 420 be fixed and that substrate 451 be moved.

Figure 24A:
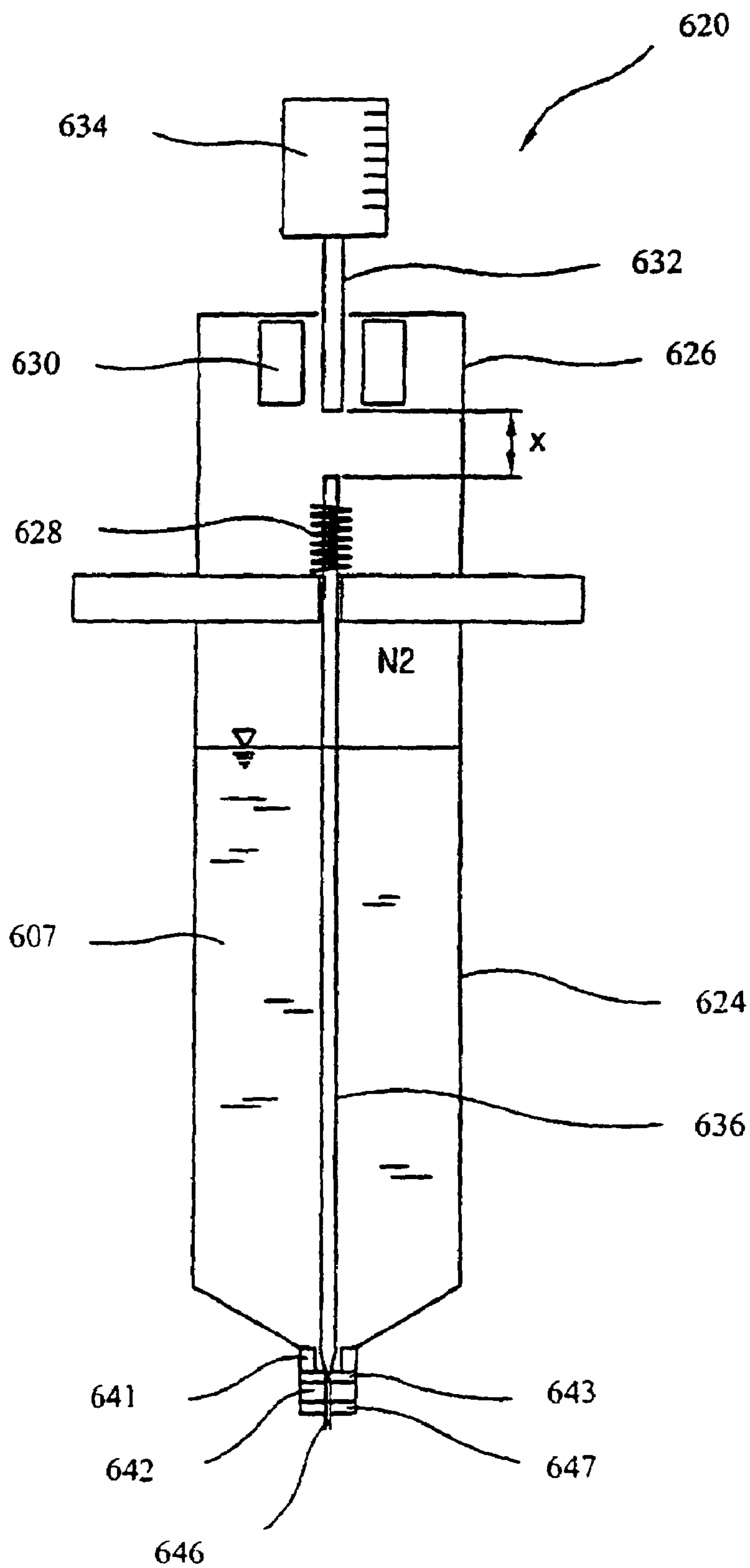
FIGS. 24A and 24B are views showing a structure of an exemplary liquid crystal dispensing apparatus according to the present invention.
Figure 24B:
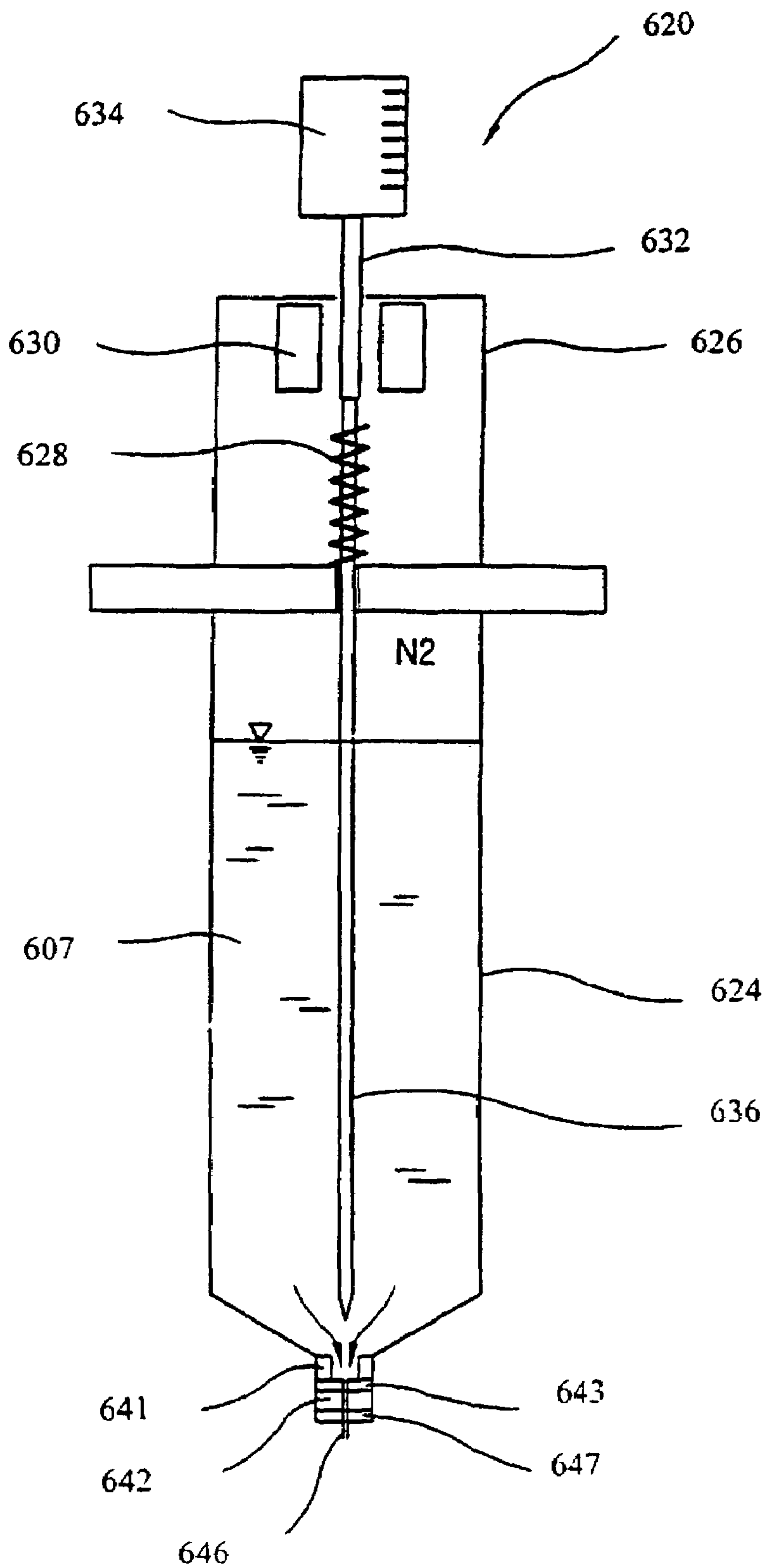
Figure 25:
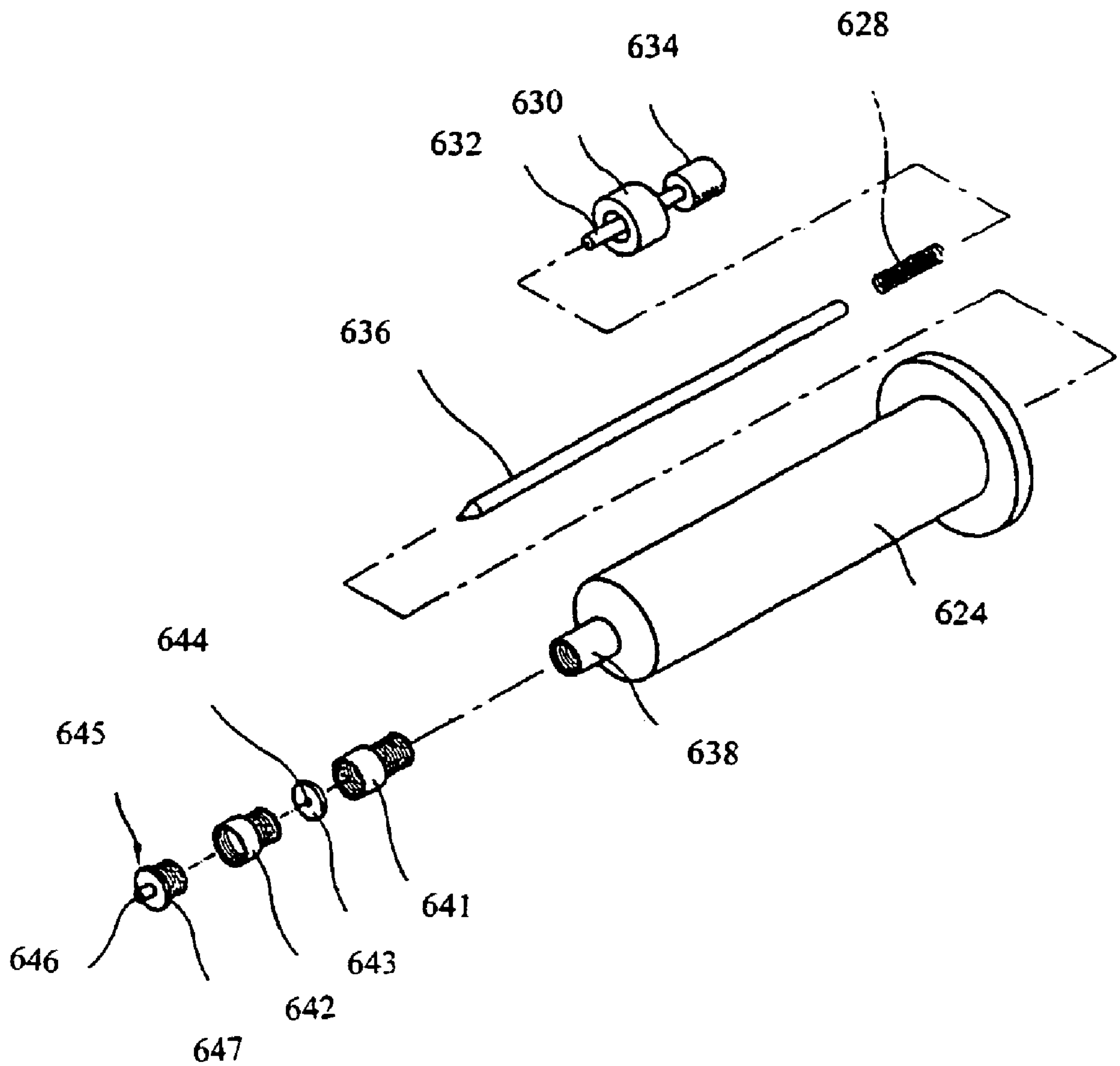
FIG. 25 is an exploded perspective view showing the liquid crystal dispensing apparatus shown of FIGS. 24A and 24B.

FIG. 24A is a cross-sectional view showing another exemplary liquid crystal dispensing apparatus when the liquid crystal is not dropped, FIG. 24B is a cross-sectional view showing the apparatus when the liquid crystal is dropped, and FIG. 25 is an exploded perspective view of the apparatus shown in FIGS. 24A and 24B. The liquid crystal dispensing apparatus according to the present invention will now be described with reference to the accompanying Figures.

As shown, the liquid crystal 607 is contained in a liquid crystal container 624 of cylindrical shape. The liquid crystal container 624 is made of a metal such as stainless steel, and a gas supplying tube (not shown) which is connected to a gas supply unit formed on an upper part of the container. Gas such as nitrogen ($N_2$) is supplied through the gas supply tube from the gas supply unit to fill the area above where the liquid crystal is contained, thereby compressing the liquid crystal 607. As a result, the liquid crystal 607 is dropped (i.e., dispensed) when the needle 636, which forms a valve with needle sheet 643, is in an up position.

The liquid crystal container 624 had been formed using polyethylene in the general liquid crystal dispensing apparatus. Since the polyethylene has superior plasticity, a container of the desired shape can be made easily. However, the polyethylene is weak in strength, and therefore, is distorted easily even by a weak external shock. Therefore, to use a liquid crystal container made of the polyethylene, an additional case should be used having high strength to enclose the liquid crystal container is enclosed. However, the structure of the liquid crystal dispensing apparatus becomes complex, and the fabrication cost is increased.

In addition, with the polyethylene liquid crystal container, if the liquid crystal container is distorted by the external forces (for example, movement of the liquid crystal dispensing apparatus, or the non-uniform pressure applied by the nitrogen) within the case, a liquid crystal discharging path (i.e., the nozzle) is also distorted. Therefore, the liquid crystal can not be dropped at the exact position due to the distorted nozzle.

However, if the liquid crystal container 624 is made of metal as described above, the structure of the liquid crystal dispensing apparatus becomes simple and the fabrication cost is reduced. Also, the dropping of the liquid crystal 607 at inexact position due to non-uniform external forces can be prevented.

A protrusion 638 is formed on a lower end part of the liquid crystal container 624 to be connected to a first connecting portion 641, as shown in FIG. 25. A nut (female threaded portion) is formed on the protrusion 638 and a bolt (male threaded portion) is formed on one side of the first connecting portion 641 so that the protrusion 638 and the first connecting portion 641 are interconnected by the nut and the bolt. Of course, the connection may be formed such that the bolt is formed on the protrusion 638 and the nut is formed on the first connecting portion 638 to connect the protrusion 638 and the first connecting portion 641. The bolt and the nut act as a connection when they are formed on the objects which will be connected, and they do not need to be installed on a certain connecting objects. Therefore, the bolt and the nut which will be described hereinafter are for connecting the components, and it is not important the manner in which they are installed.

A nut is formed on the other side of the first connecting portion 641 and a bolt is formed on one side of a second connecting portion 642, so that the first connecting portion 641 and the second connecting portion 642 are interconnected. At that time, a needle sheet 643 is located between the first connecting portion 641 and the second connecting portion 642. The needle sheet 643 is inserted into the nut of the first connecting portion 641, and then the needle sheet 643 is placed between the first connecting portion 641 and the second connecting portion 642 when the bolt of the second connecting portion 642 is inserted and bolted. A discharging hole 644 is formed on the needle sheet 643, and the liquid crystal 607 (of FIGS. 24A and 24B) contained in the liquid crystal container 624 is discharged through the discharging hole 644 passing by the second connecting portions 642.

Also, a nozzle 645 is connected to the second connecting portion 642. The nozzle is for dropping the liquid crystal 607 contained in the liquid crystal container 624 as a small amount. The nozzle 645 comprises a supporting portion 647 including a bolt connected to the nut at one end of the second connecting portion 642 so as to connect the nozzle 645 with the second connecting portion 642 and a discharging opening 646 protruded from the supporting portion 647 so as to drop a small amount of liquid crystal on the substrate as a drop shape. A discharging tube extended from the discharging hole 644 of the needle sheet 643 is formed in the supporting portion 647 and the discharging tube is connected to the discharging opening 646. Generally, the discharging opening 646 of the nozzle 645 has very small diameter in order to control the fine liquid crystal dropping amount and the discharging opening 646 is protruded from the supporting portion 647. Here, the nozzle 645 may also include a protection member to protect discharging opening 646 as described in Korean Patent Application Nos. 7151/2002 and 7772/2002 which are hereby incorporated by reference for all purposes as if fully set forth herein.

A needle 636 made of the metal such as the stainless steel is inserted into the liquid crystal container 624, and one end part of the needle 636 contacts with the needle sheet 643. Especially, the end of the needle contacted with the needle sheet 643 is conically shaped to be inserted into the discharging hole 644 of the needle sheet 643 so as to close the discharging hole 644.

Further, a spring 628 is installed on the other end of the needle 636 located in the upper case 626 of the liquid crystal dispensing apparatus 620, and a magnetic bar 632 above which a gap controlling unit 634 is connected is mounted on an upper part of the needle 636. The magnetic bar 632 is made of magnetic material such as a ferromagnetic material or a soft magnetic material, and a solenoid coil 630 of cylindrical shape is installed on outer side of the magnetic bar 632 to be surrounded thereof. The solenoid coil 630 is connected to an electric power supplying unit to supply the electric power thereto. Thus, a magnetic force is generated on the magnetic bar 632 as the electric power is applied to the solenoid coil 630.

The needle 636 and the magnetic bar 632 are separated by a predetermined interval (x). When the electric power is applied to the solenoid coil 630 from the electric power supplying unit 650 to generate the magnetic force on the magnetic bar 632, the needle 636 is contacted with the magnetic bar 632 by the generated magnetic force. When the electric power supplying is stopped, the needle 636 is returned to the original position by the elasticity of the spring 628 installed on the end of the needle 636. By the movement of the needle in up-and-down direction, the discharging hole 644 formed on the needle sheet 643 is opened or closed. The end of the needle 636 and the needle sheet 643 repeatedly contact to each other according to the supplying status of the electric power to the solenoid coil 630. Accordingly, the end of the needle 636 and the needle sheet 643 may be damaged by the repeated shock of the repeated contact. Therefore, it is desirable that the end of the needle 636 and the needle sheet 643 be formed using a material which is strong with respect to shock. For example, a hard metal may be used to prevent the damage caused by the shock. As a result, the needle 636 and needle sheet 643 may be formed of stainless steel.

As shown in FIG. 24B and referring to FIG. 25, when the electric power is applied to the solenoid coil 630, the discharging hole 644 of the needle sheet 643 is opened by the moving of the needle 636 upward, and accordingly, the nitrogen gas supplied into the liquid crystal container 624 compresses on the liquid crystal to drop the liquid crystal 607 through the nozzle 645. At that time, the dropping amount of the liquid crystal 607 is dependant upon the opening time of the discharging hole 644 and the pressure compressed onto the liquid crystal. The opening time is determined by the distance (x) between the needle 636 and the magnetic bar 632, the magnetic force of the magnetic bar 632 generated by the solenoid coil, and the tension of the spring 628 installed on the needle 636. The magnetic force of the magnetic bar 632 can be controlled according to the winding number of the solenoid coil 630 installed around the magnetic bar 632 or the magnitude of the electric power applied to the solenoid coil 630. And the distance x between the needle 636 and the magnetic bar 632 can be controlled by the gap controlling unit 634 installed on the end part of the magnetic bar 632.

Although not shown, the solenoid coil 630 may be installed around the needle 636 instead of the magnetic bar 632. In that case, the needle 636 is magnetized when the electric power is applied to the solenoid coil 630 because the needle is made using a magnetic material, and therefore, the needle 636 moves upward to contact with the magnetic bar 632 because the magnetic bar 632 is fixed and the needle can move in up-and-down direction.

As described above, the liquid crystal container 624 is formed using the metal such as the stainless steel and it is connected to the nozzle through which the liquid crystal is dropped on the substrate using the protrusion formed on the liquid crystal container 624, according to the present invention. Therefore, the liquid crystal container 624 can be easily fabricated, the fabrication cost can be reduced, and the inexact dropping of liquid crystal can be prevented effectively. However, there may some problems in the metal container as follows. That is, when the liquid crystal contacts with the metal, the metal and the liquid crystal react chemically. By this reaction, the liquid crystal may be contaminated. As a result, the LCD using this contaminated liquid crystal may have inferiority.

Figure 26:
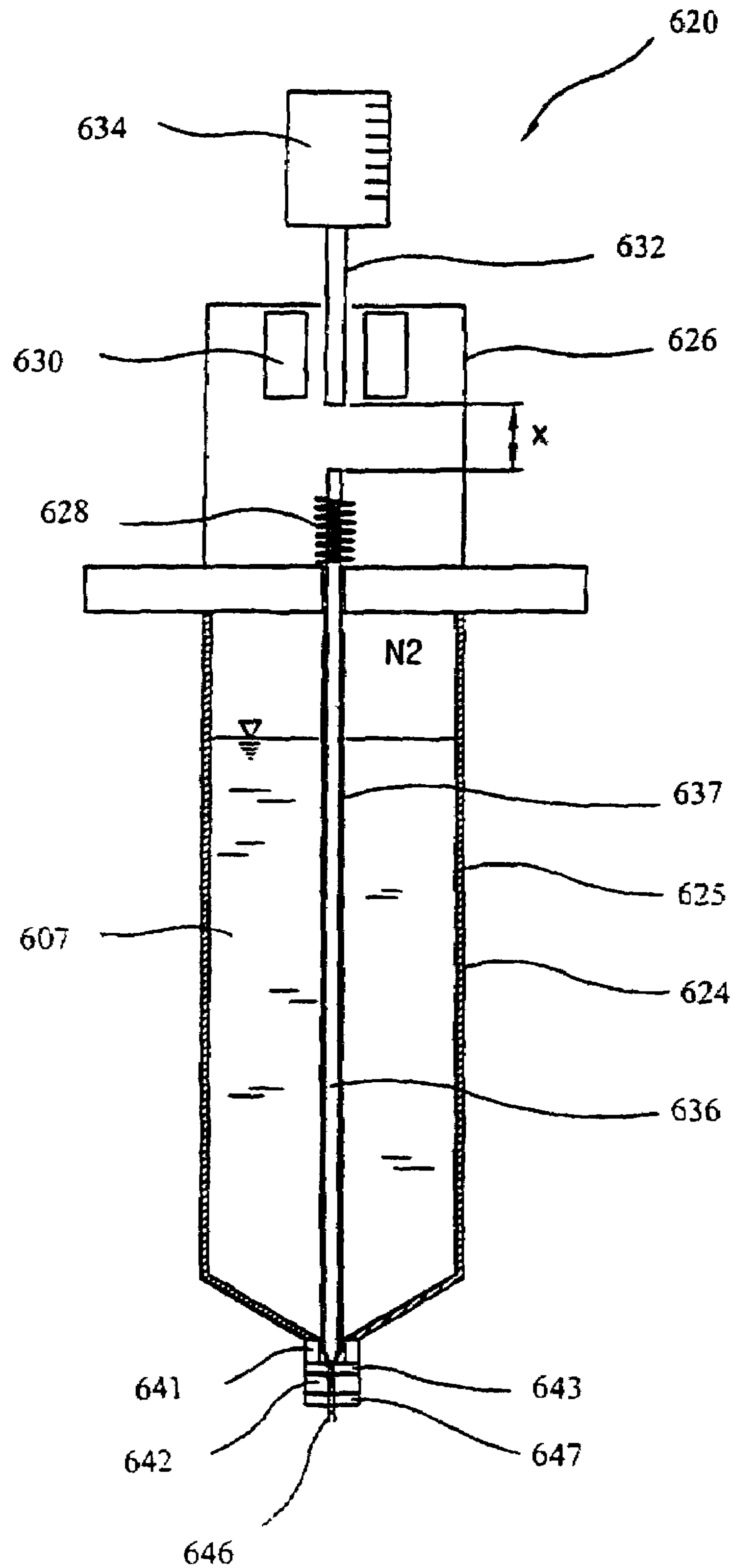
FIG. 26 is a view showing the liquid crystal dispensing apparatus in which a fluorine resin film is formed on inner side of the liquid crystal container and on the needle according to the present invention.

In the present invention, a fluorine resin film (e.g., teflon layer) 625 is preferably formed on inner side of the metal container 624 by dipping or spraying method in order to prevent the liquid crystal from being contaminated, as shown in FIG. 26. Generally, the fluorine resin film 625 has characteristics such as abrasion resistance, heat resistance, and chemical resistance. Thus, the fluorine resin film 625 is able to prevent the liquid crystal from being contaminated effectively.

Since the fluorine resin film 637 is preferably also formed on a surface of the needle 136 made of the metal, the contamination of the liquid crystal due to the chemical reaction between the metal and the liquid crystal can be prevented more effectively.

On the other hand, the fluorine resin film 625 or 637 provides low friction coefficient. The liquid crystal has the viscosity higher than that of general liquid. Therefore, when the needle 636 moves in the liquid crystal, and movement of the needle 636 is delayed by the friction between the liquid crystal and the surface of the needle 636. Although it is possible that the opening time of the discharging hole can be calculated by adding the delay of the needle movement as a variable, the amount of the liquid crystal contained in the liquid crystal container is reduced and accordingly the delaying time of the needle is also reduced. Therefore, it is difficult to drop exact amount of liquid crystal. However, in case that the fluorine resin film 637 is formed on the needle 636 as in the present invention, the friction between the fluorine resin film 637 and the liquid crystal is decreased by the low friction coefficient. Accordingly, the delay due to the movement of the needle may be trivial. Therefore, the opening time of the discharging hole 646 can be set to be constant and exact amount of the liquid crystal can be dropped.

At that time, although the fluorine resin film 637 may be formed only on the area where the hard metal is not formed (that is, the area except the end part of the conical shape), it is desirable that the fluorine resin film is formed on entire surface of the needle 636. It is because that the fluorine resin film has the abrasion resistance, and therefore, the fluorine resin film 637 can prevent the needle 636 from being abraded by the shock between the needle 136 and the needle sheet 643.

As described above, the liquid crystal container is preferably made of a metal such as stainless steel having pressure endurance and distortion resistance. Therefore, the structure of the liquid crystal dispensing apparatus can be simple, fabrication cost can be reduced, and the inferiority of the liquid crystal dropping caused by the distortion of the liquid crystal chamber can be prevented. Also, in accordance with the present invention, the fluorine resin film of chemical resistance is preferably formed on the inner part of the liquid crystal container and on the needle, thereby preventing the contamination of the liquid crystal due to the chemical reaction between the metal and the liquid crystal.

Figure 27A:
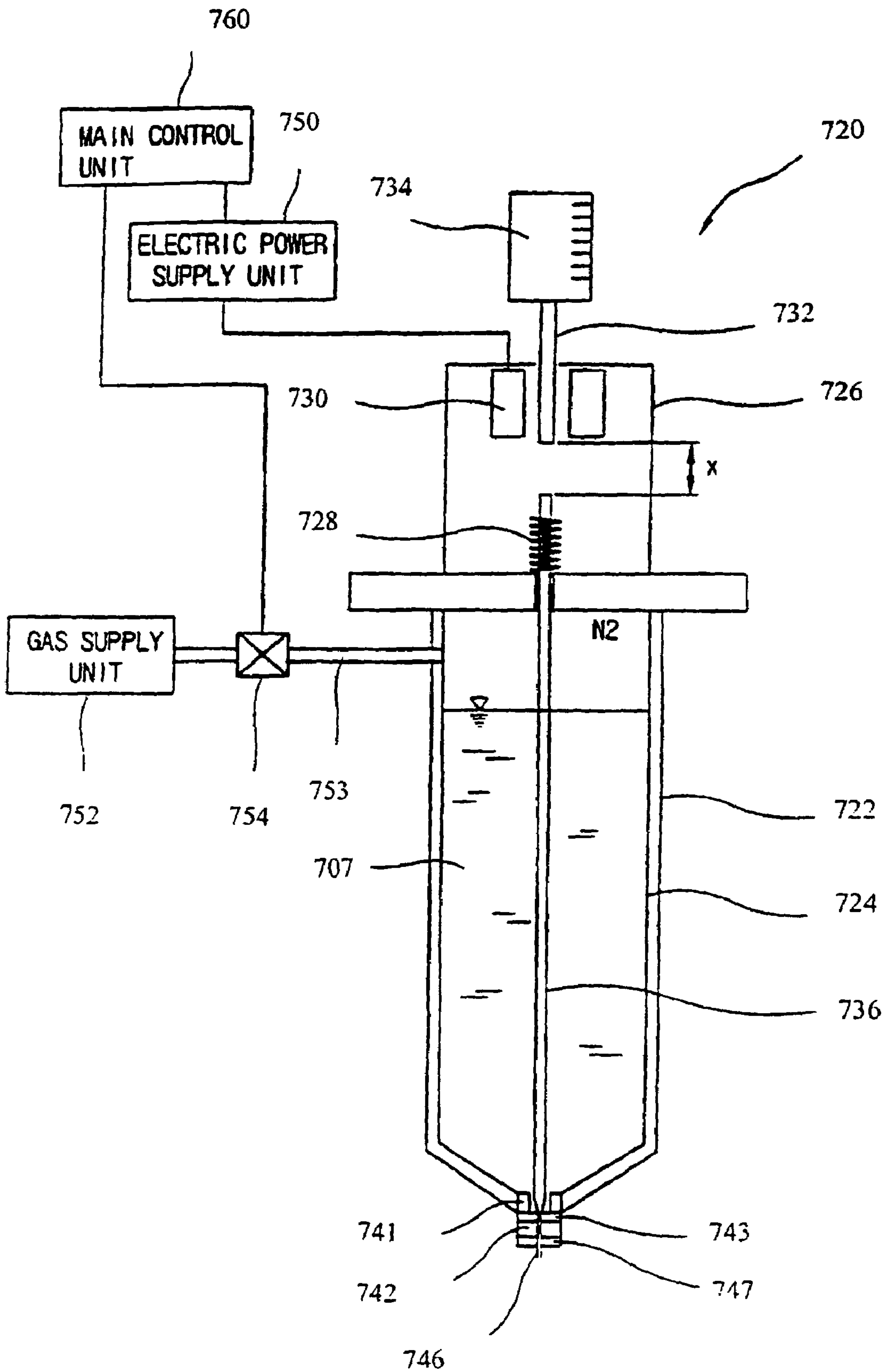
FIGS. 27A and 27B are cross-sectional views respectively showing an exemplary apparatus for dropping liquid crystal according to the present invention in a state in which the liquid crystal is not dispensed and a state in which the liquid crystal is dispensed.
Figure 27B:
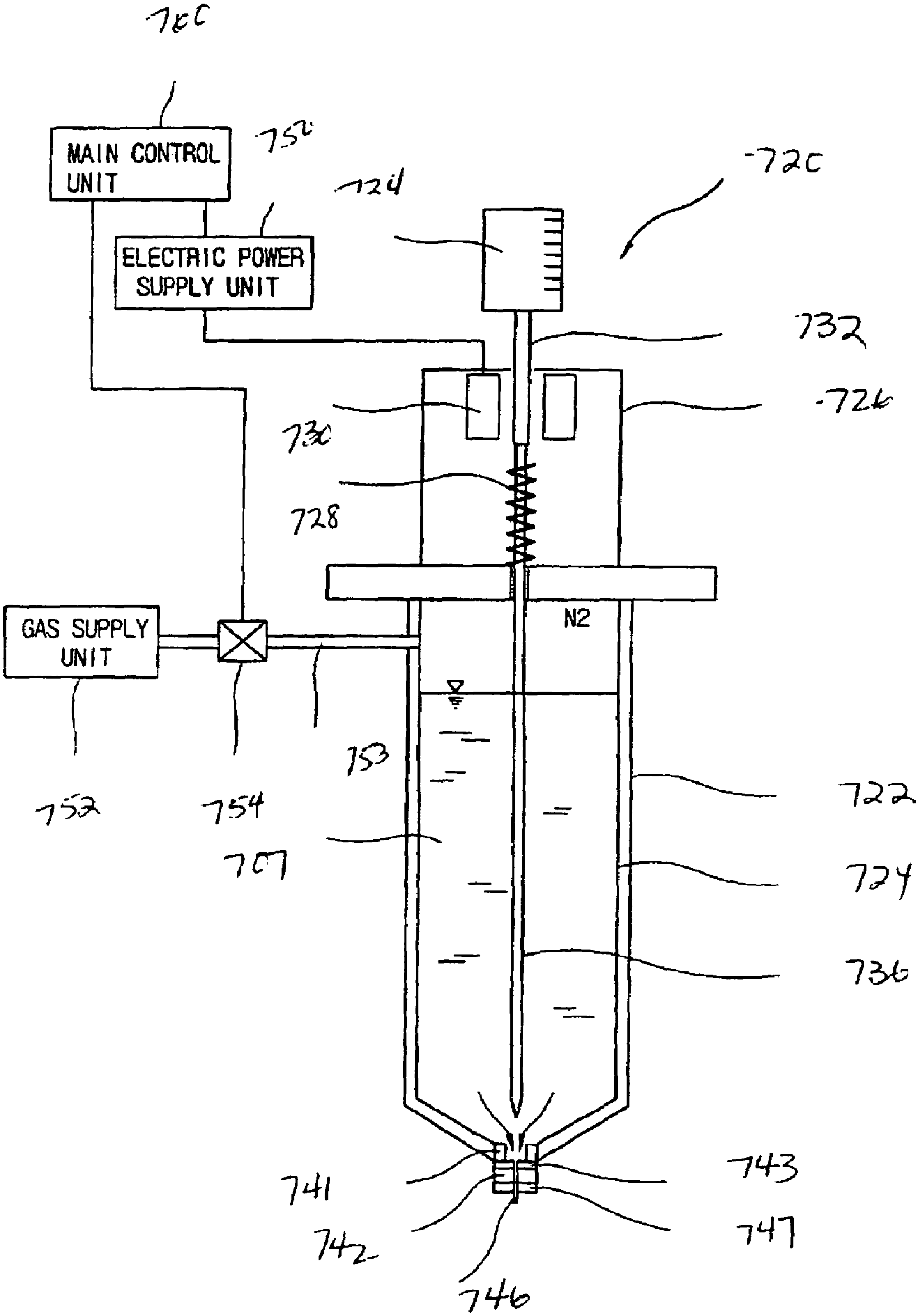
Figure 27C:
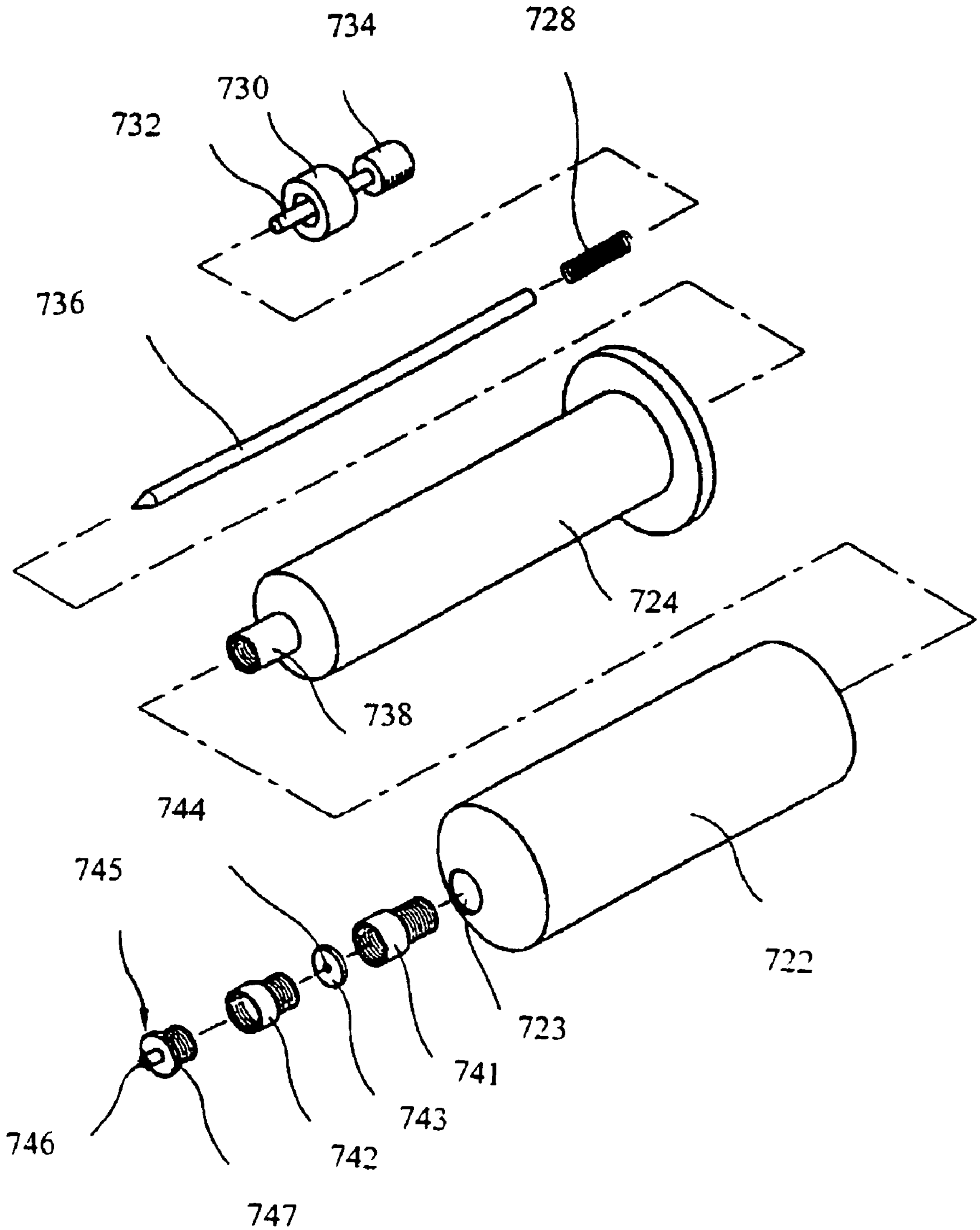
FIG. 27C is an exploded perspective view showing the apparatus of FIGS. 7A and 7B.

FIG. 27A is a cross-sectional view showing another exemplary liquid crystal dispensing apparatus when the liquid crystal is not dropped, FIG. 27B is a cross-sectional view showing the apparatus when the liquid crystal is dropped, and FIG. 27C is an exploded perspective view showing the apparatus. The liquid crystal dispensing apparatus 720 will be described in more detail with reference to drawings as follows.

As shown in FIGS. 27A-27C, a cylindrical liquid crystal container 724 is enclosed in a case 722 of the liquid crystal dispensing apparatus 720. The liquid crystal container 724 containing the liquid crystal 707 may be made of polyethylene. Further, the case 722 is made of a stainless steel to enclose the liquid crystal container 724 therein. Generally, because polyethylene has superior plasticity, it can be easily formed in the desired shape. Since polyethylene does not react with the liquid crystal 707 when the liquid crystal 707 is contained therein, polyethylene can be used for the liquid crystal container 724. However, polyethylene has a weak strength so that it can be easily distorted by external shocks or other stresses. For example, when polyethylene is used as the liquid crystal container 724, the container 724 may become distorted so that the liquid crystal 707 cannot be dropped at the exact position. Therefore, the container 724 should be enclosed in the case 722 made of the stainless steel or other material having greater strength. A gas supply tube 753 connected to an exterior gas supply unit 752 may be formed on an upper part of the liquid crystal container 724. An inert gas, such as nitrogen, is provided through the gas supply tube 753 from the gas supply unit 752 to fill the portion where the liquid crystal is not contained. Thus, the gas pressure compresses the liquid crystal 707 to be dispensed.

On the lower portion of the case 722, an opening 723 is formed. When the liquid crystal container 724 is enclosed in the case 722, a protrusion 738 formed on a lower end portion of the liquid crystal container 724 is inserted into the opening 723 so that the liquid crystal container 724 is connected to the case 722. Further, the protrusion 738 is connected to a first connecting portion 741. As shown, a nut (i.e., female threaded portion) is formed on the protrusion 738, and a bolt (i.e., male threaded portion) is formed on one side of the first connecting portion 741 so that the protrusion 738 and the first connecting portion 741 are interconnected by the nut and the bolt. Of course, it should be recognized that in this description and in the following description other connection types or configurations may be used.

A nut is formed on the other side of the first connecting portion 741 and a bolt is formed on one side of a second connection portion 742, so that the first connecting portion 741 and the second connecting portion 742 are interconnected. A needle sheet 743 is located between the first connecting portion 742 and the second connecting portion 742. The needle sheet 743 is inserted into the nut of the first connecting portion 741, and then the needle sheet 743 is combined between the first connecting portion 741 and the second connecting portion 742 when the bolt of the second connecting portion 742 is inserted and bolted. A discharging hole 744 is formed through the needle sheet 743, and the liquid crystal 707 contained in the liquid crystal container 724 is discharged through the discharging hole 744 passing through the second connecting portions 742.

A nozzle 745 is connected to the second connecting portion 742. The nozzle 745 is used to drop the liquid crystal 707 contained in the liquid crystal container 724 as much as a small amount. The nozzle 745 comprises a supporting portion 747 including a bolt connected to the nut at one end of the second connecting portion 742 to connect the nozzle 745 with the second connecting portion 742, a discharging opening 746 protruded from the supporting portion 747 to drop a small amount of liquid crystal onto the substrate as a drop.

A discharging tube extended from the discharging hole 744 of the needle sheet 743 is formed in the supporting portion 747, and the discharging tube is connected to the discharging opening 746. Generally, the discharging opening 746 of the nozzle 745 has very small diameter to finely control the liquid crystal dropping amount, and the discharging opening 746 protrudes from the supporting portion 747.

A needle 736 is inserted into the liquid crystal container 724, and one end part of the needle 736 is contacted with the needle sheet 743. Preferably, the end part of the needle 736 contacted with the needle sheet 743 is conically formed to be inserted into the discharging hole 744 of the needle sheet 743, thereby closing the discharging hole 744.

Further, a spring 728 is installed on the other end of the needle 736 located in an upper case 726 of the liquid crystal dispensing apparatus 720 to bias the needle 736 toward the needle sheet 743. A magnetic bar 732 and a gap controlling unit 734 are preferably connected above the needle 736. The magnetic bar 732 is made of magnetic material such as a ferromagnetic material or a soft magnetic material, and a solenoid coil 730 of cylindrical shape is installed on outer side of the magnetic bar 732 to be surrounded thereof. The solenoid coil 730 is connected to an electric power supplying unit 750 to supply electric power thereto, thereby generating a magnetic force on the magnetic bar 732 as the electric power is applied to the solenoid coil 730.

The needle 736 and the magnetic bar 732 are separated by a predetermined interval (x). When the electric power is applied to the solenoid coil 730 from the electric power supplying unit 750 to generate the magnetic force on the magnetic bar 732, the needle 736 contacts the magnetic bar 732 as a result of the generated magnetic force. When the electric power supplying is stopped, the needle 736 is returned to the original position by the elasticity of the spring 728. By the movement of the needle 736 in up-and-down directions, the discharging hole 744 formed on the needle sheet 743 is opened or closed. The end of the needle 736 and the needle sheet 743 repeatedly contact each other according to the supplying status of the electric power to the solenoid coil 730. Thus, the part of the needle 736 and the needle sheet 743 may be damaged by the repeated shock caused by the repeated contact. Therefore, it is desirable that the end part of the needle 736 and the needle sheet 743 are preferably formed by using a material which is strong to shock, for example, a hard metal to prevent the damage caused by the shock. Also, the needle 736 should be formed of a magnetic material in this exemplary configuration to be magnetically attracted to the magnetic bar 732.

As shown in FIG. 27B, as the discharging hole 744 of the needle sheet 743 is opened, the gas (nitrogen gas) supplied to the liquid crystal container 724 compresses the liquid crystal, thereby dropping liquid crystal 707 from the nozzle 745. At that time, the dropping amount of the liquid crystal 707 is dependant upon the opening time of the discharging hole 744 and the gas pressure applied onto the liquid crystal 707. The opening time is determined by the distance (x) between the needle 736 and the magnetic bar 732, the magnetic force of the magnetic bar 732 generated by the solenoid coil, and the tension of the spring 728 installed on the needle 736. The magnetic force of the magnetic bar 732 can be controlled according to the winding number of the solenoid coil 730 installed around the magnetic bar 732 or the magnitude of the electric power applied to the solenoid coil 730. Here, the distance x between the needle 736 and the magnetic bar 732 can be controlled by the gap controlling unit 734 installed on the end part of the magnetic bar 732.

The distance x between the needle 736 and the magnetic bar 732 as well as the tension of the spring 728 can be set by the operator. That is, the operator is able to directly set the distance x between the needle 736 and the magnetic bar 732 by operating the gap controlling unit 734, or the operator is able to set the tension of the spring 728 by operating a spring controlling means (not shown) to change the length of the spring 728.

In contrast, the amount of the electric power applied to the solenoid coil 730 or the amount of the nitrogen gas ($N_2$) supplied to the liquid crystal container 724 are controlled by the main control unit 760 through the power supply unit 750 and a flow control valve 754 installed on the gas supplying tube 753 supplying the gas into the liquid crystal container 724, respectively. That is, the amount of the electric power supply and the flow amount of the gas are not determined by the direct operation of the operator, but by the automated control of the main control unit 760. The amount of electric power supply and the flow amount of the gas are calculated according to input data.

Figure 28:
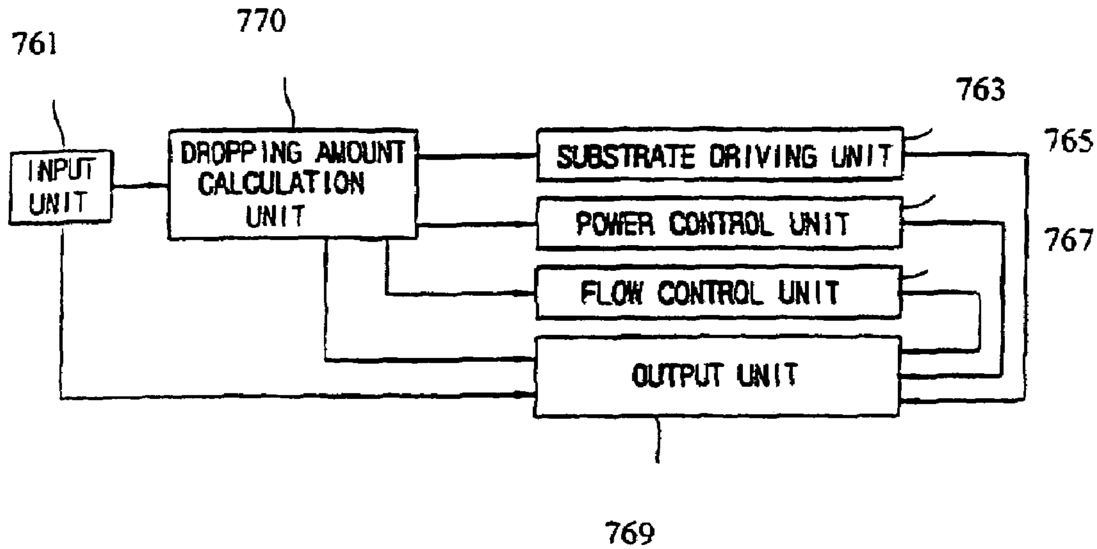
FIG. 28 is a block diagram showing an exemplary structure of a main control unit in the apparatus for dropping the liquid crystal according to the present invention.

As shown in FIG. 28, the main control unit 760 comprises a data input unit 761 for inputting various data such as the size of the liquid crystal unit panel to be fabricated, the number of liquid crystal panel areas included in the substrate, the cell gap of the liquid crystal panel (i.e., a height of a spacer), and information of the liquid crystal; a dropping amount calculation unit 770 for calculating the amount of liquid crystal to be dropped onto the substrate, the number of liquid crystal drops, a single drop amount of liquid crystal, and the dropping positions of the liquid crystal based on the input data and then outputting a signal; a substrate driving unit 763 for driving the substrate based on the dropping positions of the liquid crystal calculated by the dropping amount calculation unit 770; a power control unit 765 for supplying the electric power to the solenoid coil 730 by controlling the power supplying unit 750 based on the single dropping amount of the liquid crystal calculated by the dropping amount calculation unit 770; a flow control unit 767 for supplying the gas into the liquid crystal container 724 from the gas supplying unit 752 by controlling the flow control valve 754 based on the single dropping amount of the liquid crystal calculated by the dropping amount calculation unit 770; and an output unit 769 for outputting the inputted data, the calculated dropping amount and dropping positions, and current status of the liquid crystal dropping.

The input unit 761 inputs data using a general operating device such as a keyboard, a mouse, or a touch panel. The data such as the size of the liquid crystal unit panel to be fabricated, the size of the substrate, and the cell gap of the liquid crystal panel is input by the operator. The output unit 769 notifies the operator of various information. The output unit 769 includes a display device such as a cathode ray tube (CRT) or LCD and an output device such as a printer.

Figure 29:
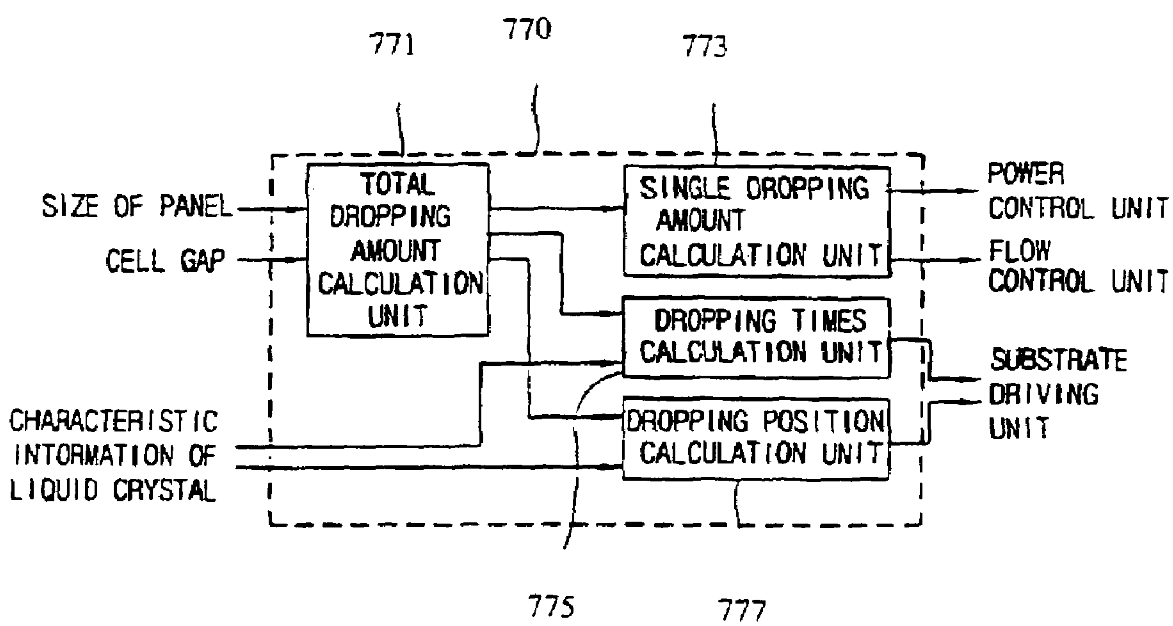
FIG. 29 is a block diagram showing an exemplary structure of a dropping amount calculation unit shown in FIG. 28.

The dropping amount calculation unit 770 calculates the total dropping amount of liquid crystal to be dropped onto the substrate having a plurality of liquid crystal unit panel areas, an amount of each dropping, the dropping positions of each liquid crystal drop and the dropping amount of the liquid crystal to be dropped on a particular liquid crystal unit panel area. As shown in FIG. 29, the dropping amount calculation unit 770 comprises a total dropping amount calculation unit 771 for calculating the total amount of the liquid crystal to be dropped on the liquid crystal unit panel area and the total amount of the liquid crystal to be dropped on the entire substrate having a plurality of liquid crystal unit panel areas based on the size of the liquid crystal unit panel and the cell gap input through the input unit 761; a dropping times calculation unit 775 for calculating the number of times the liquid crystal is dropped based on the total dropping amount data calculated by the total dropping amount calculation unit 771; a single dropping amount calculation unit 773 for calculating the single dropping amount of the liquid crystal dropped on a certain position of the substrate; and a dropping position calculation unit 777 for calculating the dropping positions on the substrate.

The total dropping amount calculation unit 771 calculates the dropping amount (Q) on the liquid crystal unit panel area according to the input size (d) of the unit panel and the cell gap (t) ($Q=d\times t$) and calculates the total dropping amount of liquid crystal to be dropped on the substrate according to the number of the unit panel areas formed on the substrate.

The dropping times calculation unit 775 calculates the number of times the liquid crystal is dropped within the unit panel area based on the input total dropping amount, the size of the unit panel, and characteristics of the liquid crystal and the substrate. Generally, in the dropping method, the liquid crystal to be dropped on the substrate spreads out on the substrate by the pressure generated when the upper and lower substrates are attached. The spreading of the liquid crystal depends on characteristics of the liquid crystal such as the viscosity of the liquid crystal and the structure of the substrate on which the liquid crystal will be dropped, for example, the distribution of the pattern. Therefore, the spreading area of the liquid crystal which is dropped once is determined by these factors. Thus, the number of drops of the liquid crystal that should be dropped is determined by considering the above spreading area. Also, the number of drops on the entire substrate is calculated from the number of drops on the respective unit panels.

Further, the single dropping amount calculation unit 773 calculates the single dropping amount of the liquid crystal based on the inputted total dropping amount. As shown in FIG. 29, the dropping times calculation unit 775 and the single dropping amount calculation unit 773 are preferably formed separately to calculate the dropping times and the single dropping amount based on the inputted total dropping amount. However, the dropping times calculation unit 775 and the single dropping amount calculation unit 773 are related closely to each other, and the dropping times and the single dropping amount are correlated. In other words, the single dropping amount should be determined according to the dropping times.

The dropping position calculation unit 777 calculates the positions at which the liquid crystal will be dropped by calculating the area where the dropped liquid crystal spreads out based on the dropping amount and the characteristics of the liquid crystal.

The dropping times, the single dropping amount, and the dropping positions calculated as above are input into the substrate driving unit 763, the power control unit 765, and the flow control unit 767 of FIG. 28. The power control unit 765 of FIG. 28 calculates the electric power based on the inputted data (for example, dropping times and the single dropping amount), and then outputs a signal to the power supplying unit 750 to supply corresponding electric power to the solenoid coil 730. The flow control unit 767 calculates the flow amount of the gas based on the inputted data, and supplies the corresponding nitrogen gas ($N_2$) by controlling the flow control valve 754 of FIGS. 27A and 27B. Further, the substrate driving unit 763 outputs a substrate driving signal based on the calculated dropping position data to operate a substrate driving motor (not shown). Therefore, the substrate is moved to align the liquid crystal dispensing apparatus at the next dropping position on the substrate.

On the other hand, the output unit 769 displays the size of the liquid crystal unit panel, the cell gap, and the characteristic information of the liquid crystal which are input by the operator through the input unit 761. The output unit 769 also displays the dropping number, the single drop amount, and the dropping positions which are calculated based on the input data, and the present dropping status such as the times, position, and the amount of the liquid crystal at present. Thus, the operator can identify the above information.

As described above, in the liquid crystal dispensing apparatus, the dropping positions, the number of drops, and the single drop amount of the liquid crystal are calculated based on the data input by the operator, and subsequently, the liquid crystal is dropped on the substrate automatically. The liquid crystal dropping method using the above liquid crystal dispensing apparatus will be described as follows.

Figure 30:
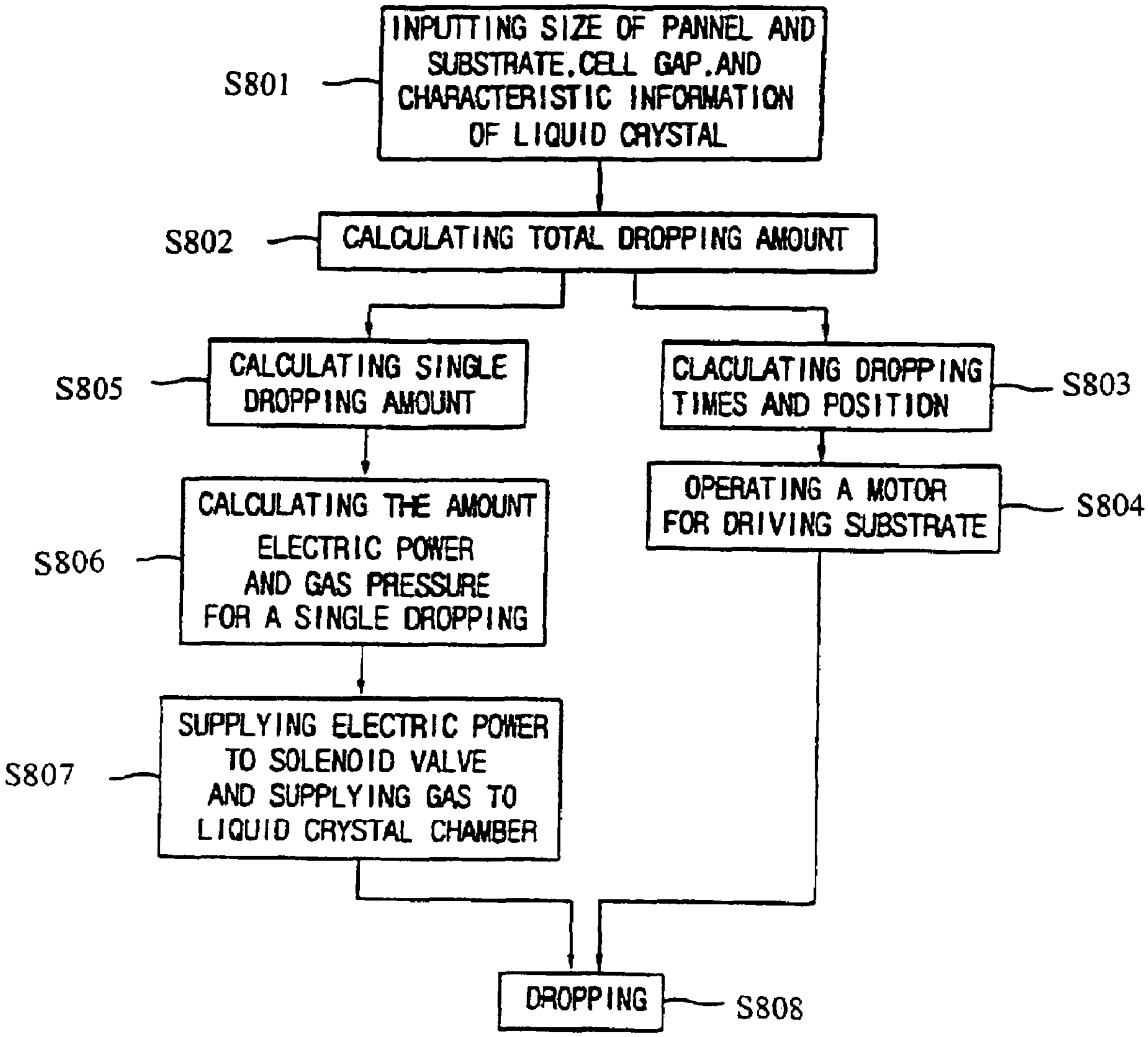
FIG. 30 is a block diagram showing an exemplary method for dropping the liquid crystal according to the present invention.

FIG. 30 is a flow chart showing an exemplary liquid crystal dropping method. As shown, when the operator inputs the size of the liquid crystal unit panel, cell gap, and the characteristic information of the liquid crystal through the input unit 761 by operating the keyboard, the mouse, or the touch panel (S801), the total dropping amount calculation unit 771 calculates the total dropping amount of the liquid crystal to be dropped on the substrate (or each unit panel area) (S802). Thereafter, the dropping time calculation unit 775, the single dropping amount calculation unit 773, and the dropping position calculation unit 777 calculate the dropping times, the dropping position, and the single dropping amount of the liquid crystal based on the calculated total dropping amount, respectively (S803 and S805).

The substrate, disposed beneath the liquid crystal dispensing apparatus 720, is moved along the x and y directions by a motor. The dropping position calculation unit 777 calculates the next position where the liquid crystal is dropped based on the input total dropping amount, the characteristic information of the liquid crystal, and the substrate information. The dropping position calculation unit then moves the substrate by operating the motor so that the liquid crystal dispensing apparatus 720 is located at the calculated dropping position (S804).

As described above, the power control unit 765 and the flow control unit 767 calculate the electric power amount and flow amount of the gas corresponding to the opening time of the discharging hole 744 for the single dropping amount based on the single dropping amount of the liquid crystal in the state that the liquid crystal dispensing apparatus 720 is located at the dropping position (S806). Subsequently, electric power is supplied to the solenoid coil 730 and the nitrogen gas ($N_2$) is supplied to the liquid crystal container 724 by controlling the power supply unit 750 and the flow control valve 754 to start the liquid crystal dropping at the calculated dropping position (S807 and S808).

As described above, the single dropping amount of the liquid crystal is determined by the amount of the electric power applied to the solenoid coil 730 and the amount of nitrogen gas ($N_2$) supplied to the liquid crystal container 724 to compress the liquid crystal. The liquid crystal dropping amount may be controlled by changing these two elements. Alternatively, the dropping amount may be controlled by fixing one element and changing another element. That is, the calculated amount of liquid crystal may be dropped on the substrate by fixing the flow amount of the nitrogen gas ($N_2$) supplied to the liquid crystal container 724 and by changing the amount of the electric power applied to the solenoid coil 730. In addition, the calculated amount of the liquid crystal may be dropped on the substrate by fixing the amount of the electric power applied to the solenoid coil 730 to be the calculated amount and by changing the flow amount of the nitrogen gas ($N_2$) supplied to the liquid crystal container 724.

Alternatively, the single drop amount of the liquid crystal dropped on the dropping position of the substrate can be determined by controlling the tension of the spring 728 or by controlling the distance x between the needle 736 and the magnetic bar 732. However, it is desirable that the tensile force of the spring 728 or the distance x are set in advance because the operator is able to control these two elements by a simple manual operation.

When the liquid crystal is dropped on the substrate, the dropping amount of the liquid crystal is very small amount, for example, in order of magnitude of milligrams. Therefore, it is very difficult to drop such fine amounts exactly, and such fine amounts can be changed easily by various facts. Therefore, in order to drop exact amount of the liquid crystal on the substrate, the dropping amount of the liquid crystal should be compensated. This compensation for the dropping amount of the liquid crystal may be achieved by a compensating control unit included in the main control unit 760 of FIG. 27A.

Figure 31:
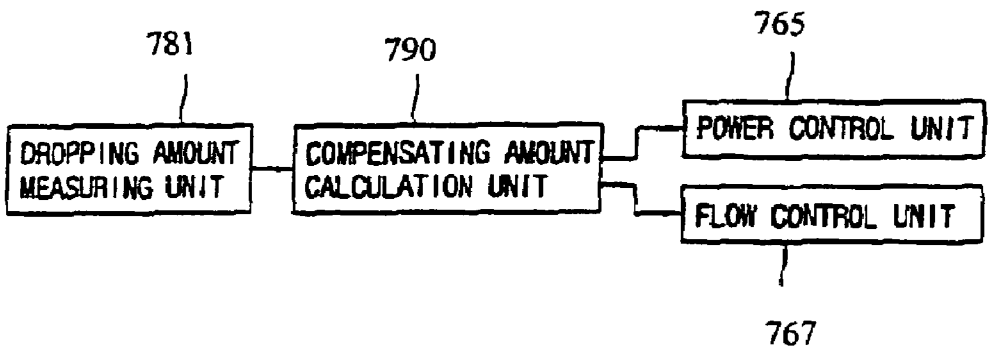
FIG. 31 is a block diagram showing an exemplary structure of the main control unit performing the compensation of single liquid crystal dropping amount.

As shown in FIG. 31, an exemplary compensating control unit comprises a dropping amount measuring unit 781 for measuring the amount of dropping liquid crystal and a compensating amount calculation unit 790 for comparing the measured dropping amount with the predetermined dropping amount to calculate compensating amount of the liquid crystal.

Although not shown, a balance for measuring the precise weight of the liquid crystal is installed on the liquid crystal dispensing apparatus (or on an outer part of the liquid crystal dispensing apparatus) to measure the weight of the liquid crystal at regular times or occasionally. Generally, the liquid crystal weighs only a few milligrams. Therefore, it is difficult to weigh a single liquid crystal drop exactly. Therefore, in the present invention, the amount of predetermined dropping times, for example, the liquid crystal amount of 10 drops, 50 drops, or 100 drops are preferably measured. Thus the single dropping amount of the liquid crystal can be determined.

Figure 32:
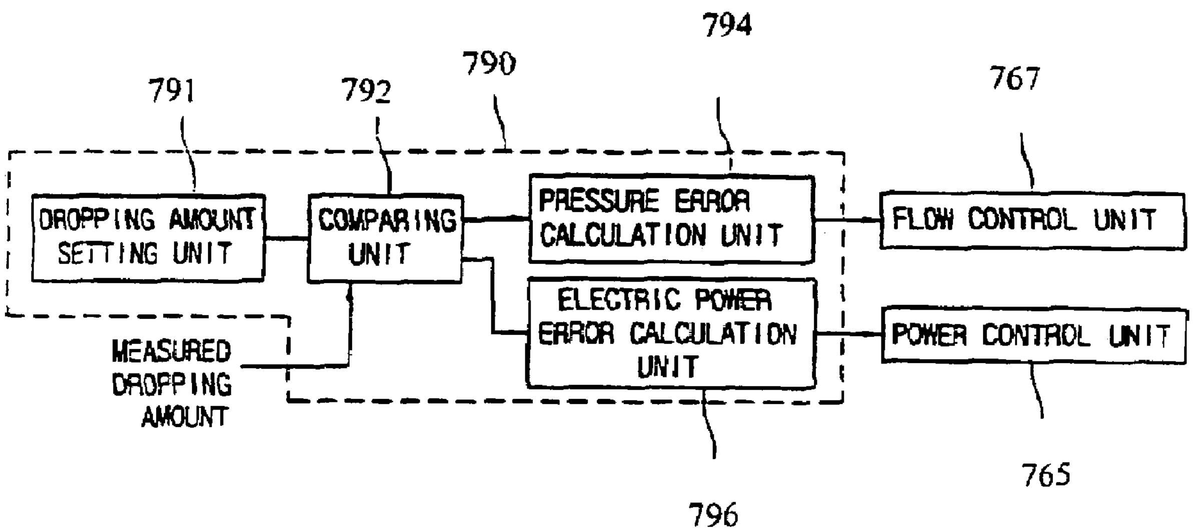
FIG. 32 is a block diagram showing an exemplary structure of a compensating amount control unit shown in FIG. 31.

As shown in FIG. 32, the compensating amount calculation unit 790 comprises a dropping amount setting unit 791 for setting the dropping amount calculated by the single dropping amount calculation unit 773 as a present dropping amount; a comparing unit 792 for comparing the set dropping amount with the dropping amount measured by the dropping amount measuring unit 781 and calculating a difference value between the amounts; a pressure error calculation unit 794 for calculating an error value of the pressure corresponding to the difference value of dropping amount calculated by the comparing unit 792; and an electric power error calculation unit 796 for calculating an error value of the electric power corresponding to the difference value of the dropping amount calculated in the comparing unit.

The pressure error calculation unit 794 outputs the error value of the pressure into the flow control unit 767. Then, the flow control unit 767 converts the error value into the supplying amount of the gas to outputs a controlling signal to the flow control valve 754 so as to increase or decrease the flow amount of the gas flowed into the liquid crystal container 724.

Further, the electric power error calculation unit 796 outputs the calculated error value of the electric power into the power control unit 765. Then, the power control unit 765 converts the inputted error value into the electric power amount to apply the increased or decreased electric power into the solenoid coil 730 so as to compensate the dropping amount of the liquid crystal.

Figure 33:
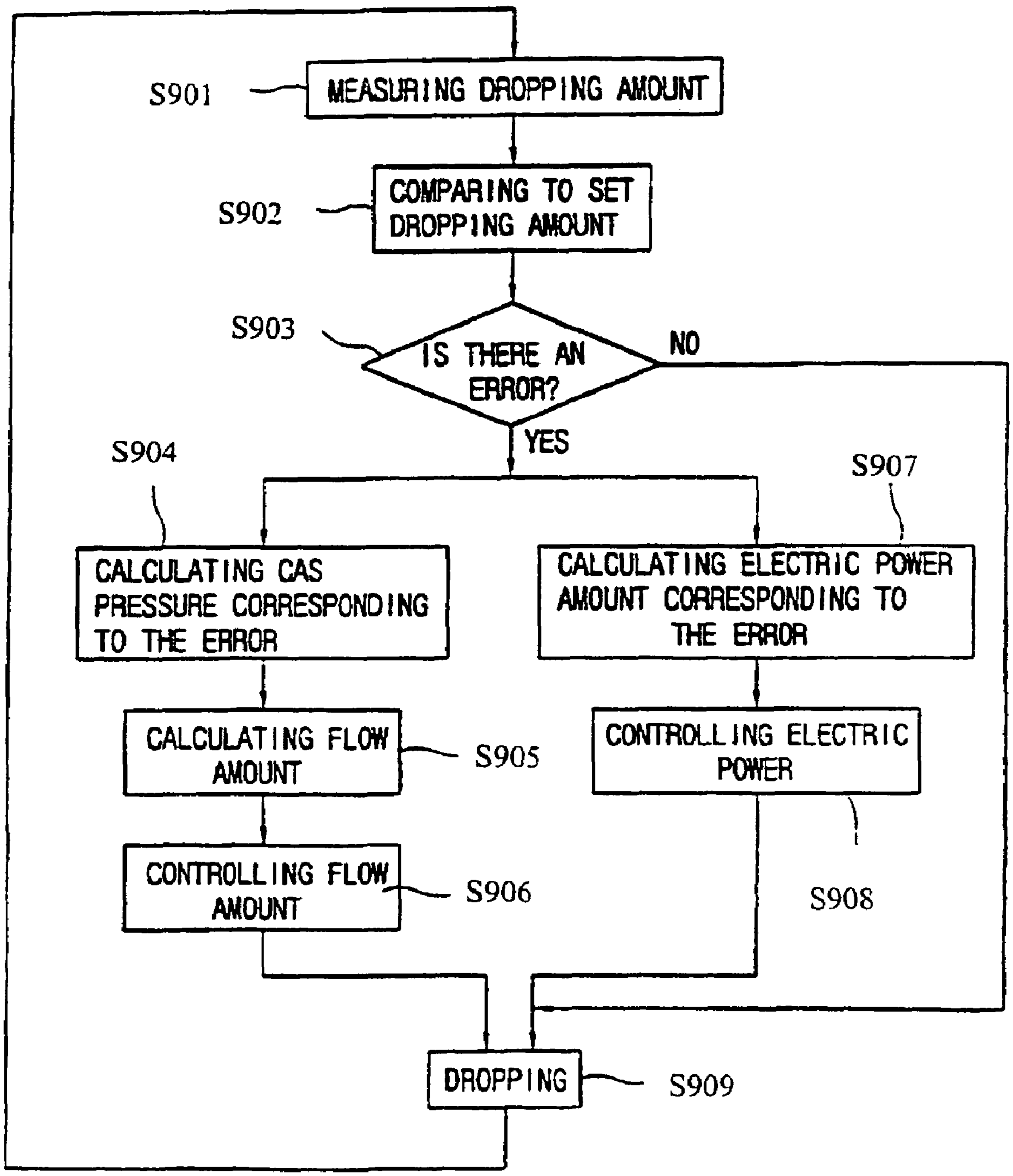
FIG. 33 is a flow chart showing an exemplary method for compensating the dropping amount of the liquid crystal according to the present invention.

FIG. 33 is a view showing an exemplary method for compensating the dropping amount of the liquid crystal. As shown, after the liquid crystal dropping of the predetermined number of times is completed, the dropping amount of the liquid crystal is measured using the balance (S901). Subsequently, the measured dropping amount is compared to the set dropping amount to determine whether or not there is an error in the dropping amount (S902 and S903).

If there is no error value, it means that the present dropping amount is same as the set dropping amount and the dropping process proceed. If there is an error value, the pressure error calculation unit 794 calculates the pressure of the nitrogen gas ($N_2$) corresponding to the error value (S904). Further, the flow control unit 767 calculates the flow amount of the nitrogen gas ($N_2$) which will be supplied to the liquid crystal container 724 based on the pressure corresponding to the error value (S905). Then, the flow control valve 754 is operated to supply the nitrogen gas ($N_2$) after increasing or decreasing to the above calculated amount from the originally calculated amount of the gas to the liquid crystal container 724, thereby compensating the amount of liquid crystal to be dropped on the substrate (S906 and S909).

Alternatively, or in addition, if there is an error in the dropping amount of the liquid crystal, the electric power error calculation unit 796 can calculate the electric power amount corresponding to the error, and applies an increased or decreased amount of electric power as compared to the calculated amount to the solenoid coil 730 by controlling the electric power supply unit 750. Accordingly, a compensated amount of liquid crystal can be dropped on the substrate (S907, S908, and S909).

The compensating processes described above may be repeated. For example, whenever a predetermined number of liquid crystal drops are completed, the compensating processes can be repeated to always drop the exact amount of the liquid crystal.

During the compensating process of the liquid crystal dropping amount, the dropping amount of the liquid crystal can be compensated by controlling the flow amount of the nitrogen supplied to the liquid crystal container 724 together with the electric power applied to the solenoid coil 730 mutually. However, the dropping amount of the liquid crystal can be compensated by fixing one element and controlling another element. Further, it is desirable that the tension of the spring 728 or the distance (x) are fixed at initially predetermined values.

As described above, the position and the amount of liquid crystal dropping on the substrate are calculated by the inputted size of the unit panel area, the cell gap, and the characteristic information of the liquid crystal. Therefore, an exact amount of liquid crystal can always be dropped on the exact position. Also, if the amount of dropping liquid crystal is different from the set dropping amount, the error can be automatically compensated. Thus, defective liquid crystal panels caused by errors in the dropping amount of the liquid crystal can be prevented.

As described above, the dropping amount of the liquid crystal to be dropped on the substrate is calculated automatically based on the size of the unit panel, the cell gap, and the characteristic information of the liquid crystal. Then, the liquid crystal is dropped as the predetermined amount on the substrate. In addition, if there is an error in the dropping amount of the liquid crystal after measuring the amount of dropping liquid crystal, the error value is compensated, thereby always maintaining an exact amount of the liquid crystal to be dropped on the substrate. Therefore, the dropping position, dropping times, and the dropping amount of the liquid crystal are automatically calculated based on the inputted data, and if there is an error after measuring the dropping amount, the error is compensated automatically.

While the above descriptions have been provided for the liquid crystal dispensing apparatus having a specified structure, or the principles described above can be applied to all liquid crystal dispensing apparatus including the function of automatically calculating the dropping position, the dropping times, and the dropping amount and the function of automatic compensating, as described herein or as appreciated by those of skill in the art.

To drop exact amounts of liquid crystal onto the substrate the amount of liquid crystal dropping must be accurately controlled, a liquid crystal dispensing apparatus may use air pressure to control the dropping amounts. Such a liquid crystal dispensing apparatus is referred to as a pneumatic liquid crystal dispensing apparatus, and is described with reference to FIG. 34.

Figure 34:
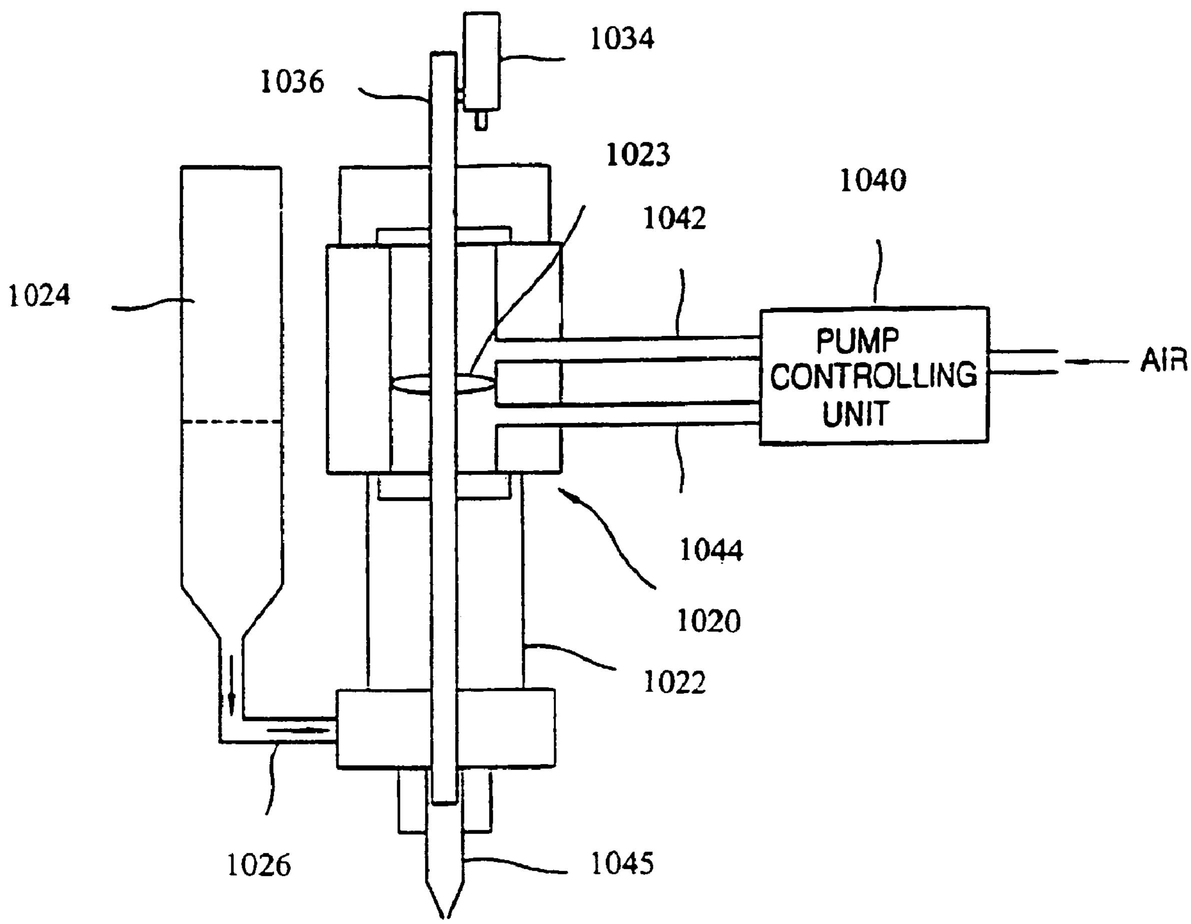
FIG. 34 is illustrates a conventional pneumatic liquid crystal dispensing apparatus.

As shown in FIG. 34, the pneumatic liquid crystal dispensing apparatus 1020 includes a cylindrical case 1022 having a center axis that is directed vertically. A movable, long, thin bar shaped piston 1036 is supported along the center axis. An end portion of the piston 1036 is installed so as to enable movement into a nozzle 1045 that is disposed on a lower end of the case 1022. On a side wall around the nozzle 1045 is an opening that enables liquid crystal in the liquid crystal container 1024 to flow into the nozzle 1045 through a supply tube 1026. The liquid crystal from the nozzle 1045 is dropped according to the motion of the nozzle 1045. However, the surface tension of the liquid crystal prevents discharge until a force is supplied.

Two air inducing holes 1042 and 1044 are formed in a side wall of an air room in the case 1022. A separating wall

1023 divides the interior of the air room into two parts defined by the piston 1036. The separating wall is installed to move the interior wall between the air inducing holes 1042 and 1044 using the piston 1036. Therefore, the separating wall is moved downward when compressed air is induced from the air inducing hole 1042 into the air room, and moved upward by compressed air induced from the air inducing hole 1044 into the air room. The piston 1036 is moves up-and-down direction a predetermined amount.

The air inducing holes 1042 and 1044 are connected to a pump controlling portion 240 that removes air from and provides air to the air inducing holes 1042 and 1044.

When operated, a predetermined amount of liquid crystal is dropped from the pneumatic liquid crystal dispensing apparatus. The dropping amount (volume) can be controlled by controlling the movement of the piston 1036 using a micro gauge 1034 that is fixed on the piston 1036 and which protrudes above the case 1022.

In the conventional pneumatic liquid crystal dispensing apparatus the liquid crystal drop size is controlled by air pressure. However, it takes a significant amount of time to supply the air room with the air. Additionally, the movement of the separating wall by the air pressure is particularly rapid. Therefore, the liquid crystal drop size is not rapidly controllable. Also, the amount of air provided to the air room through the pump should be calculated exactly. However, it is impossible to provide the air room with the exact amount of air that is required. Moreover, motion of the piston can be changed by frictional forces between the separating wall and the piston even if the exact amount of air is provided. Therefore, it is difficult to accurately move the piston in a controlled fashion.

To solve the problems of the conventional pneumatic liquid crystal dispensing apparatus, a new electronic liquid crystal dispensing apparatus will be described in detail with reference to the accompanying Figures.

Figure 35A:
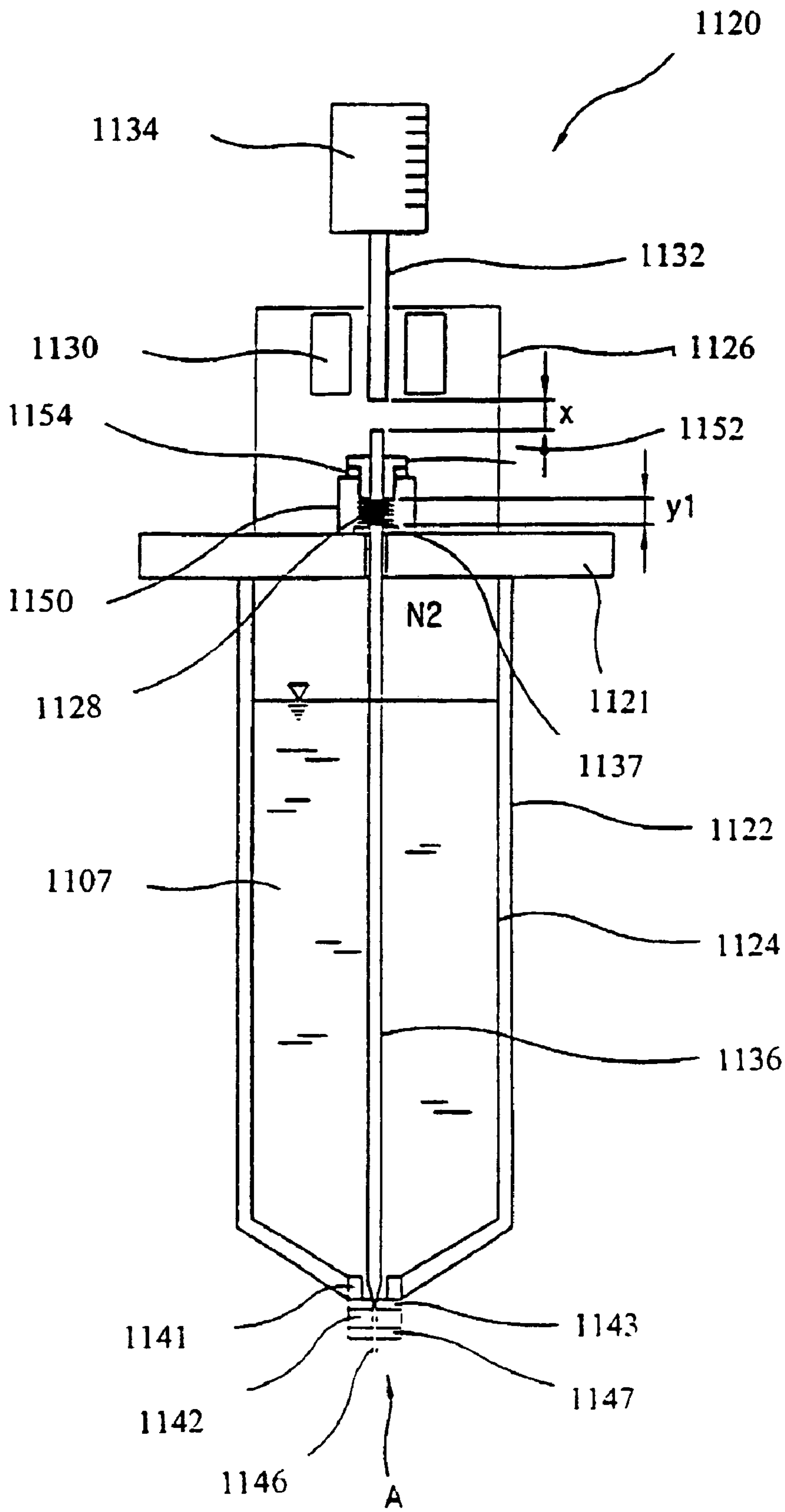
FIG. 35A illustrates a first view of a liquid crystal dispensing apparatus according to the present invention.
Figure 35B:
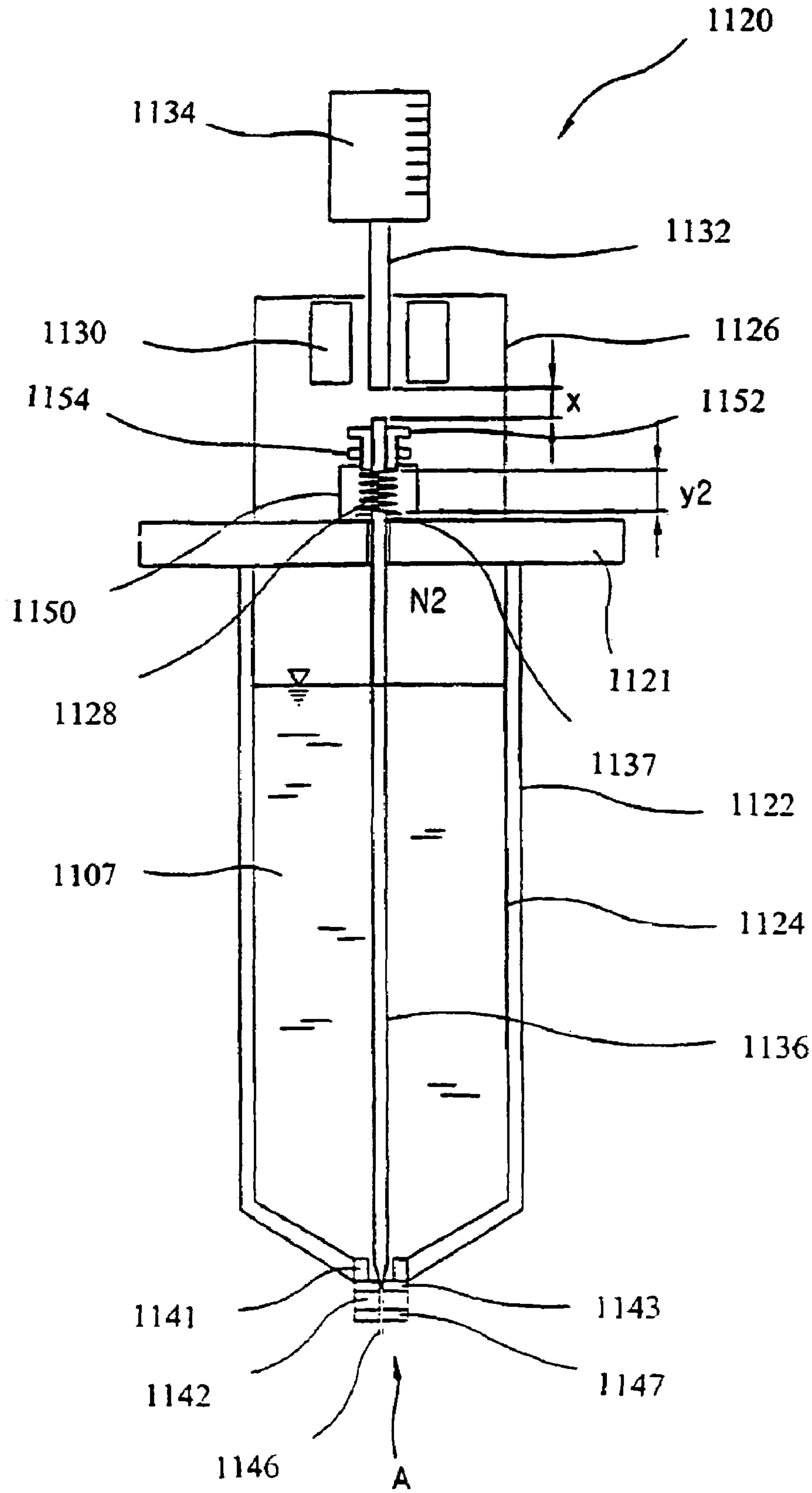
FIG. 35B illustrates a second view of a liquid crystal dispensing apparatus according to the present invention.
Figure 36:
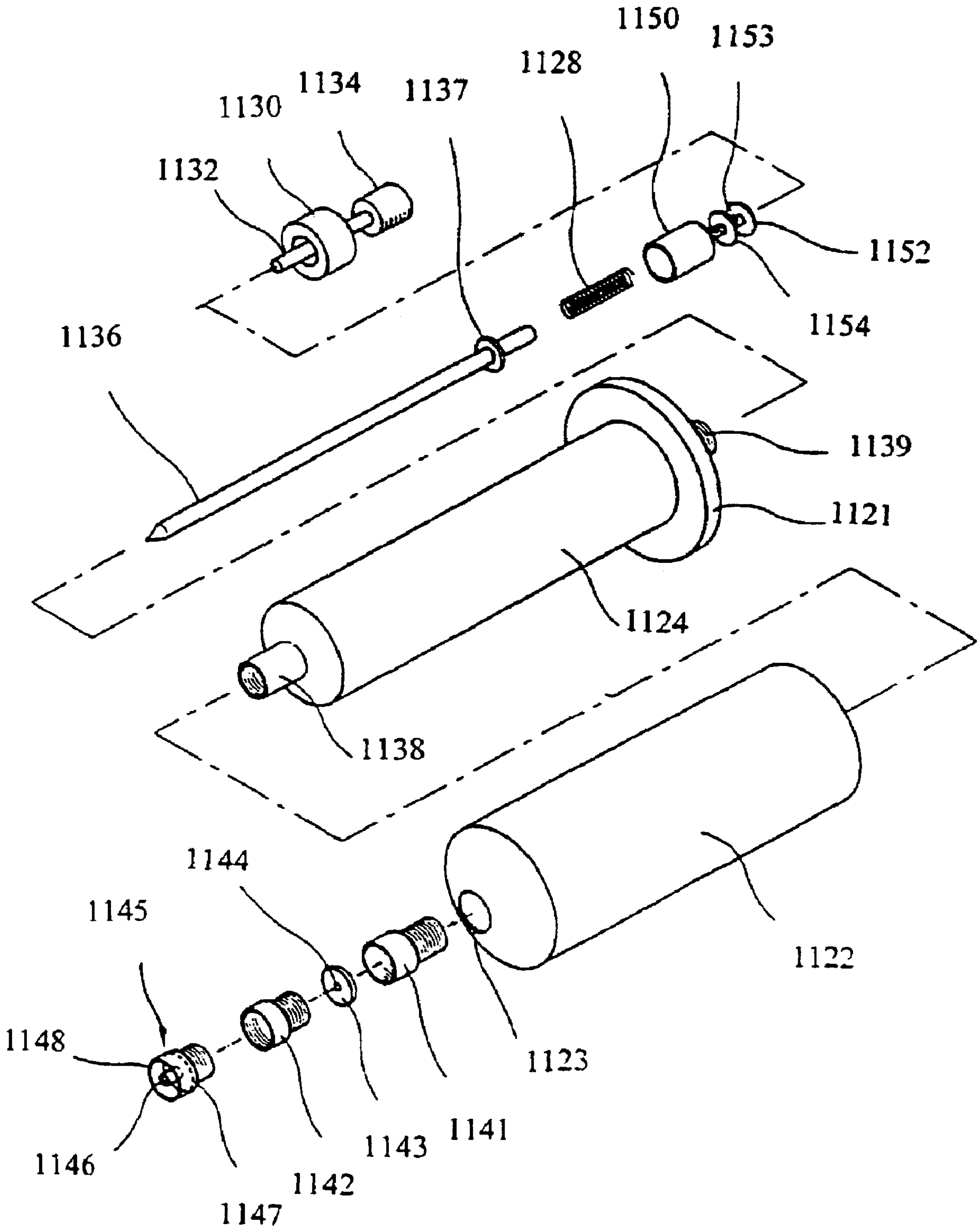
FIG. 36 is an exploded perspective view of a liquid crystal dispensing apparatus according to the present invention.

FIGS. 35A and 35B illustrate a liquid crystal dispensing apparatus 1120 according to the principles of the present invention, while FIG. 36 is an exploded perspective view of the liquid crystal dispensing apparatus 1120. As shown in FIGS. 35A, 35B and 36, liquid crystal 1107 is contained in a cylindrical liquid crystal container 1124. The liquid crystal container 1124 is beneficially comprised of polyethylene. In addition, a stainless steel case 1122 houses the liquid crystal container 1124. Polyethylene has superior plasticity, it can be formed into a desired shape easily, and polyethylene does not react with the liquid crystal 1107. However, polyethylene can be easily distorted. Such distortion could cause liquid crystal to be dropped improperly. Therefore, the liquid crystal container 1124 is housed in the case 1122, which, being made from stainless steel, suffers little distortion.

The liquid crystal container 1124 could be made from a metal such as stainless steel. The structure of the liquid crystal dispensing apparatus would be simplified and the fabrication cost could be reduced. But, Teflon should then be applied inside the liquid crystal dispensing apparatus to prevent the liquid crystal from contaminating chemical reactions with the metal.

Although not shown in the Figures, a gas supply tube on an upper part of the liquid crystal container 1124 is connected to a gas supply. The gas, beneficially nitrogen, fills the volume of the liquid crystal container 1124 that is not filled with liquid crystal. Gas pressure assists liquid crystal dropping.

Referring now to FIG. 36, an opening 1123 is formed at the lower end of the case 1122, while a protrusion 1138 is formed at the lower end of the liquid crystal container 1124.

The protrusion 1138 is inserted through the opening 1123 to enable coupling of the liquid crystal container 1124 to the case 1122. The protrusion 1138 is mated to a first connecting portion 1141. As shown in FIG. 36, threads are formed on the protrusion 1138, while receiving threads are formed on one side of the first connecting portion 1141. This enables the protrusion 1138 and the first connecting portion 1141 to be threaded together.

Additionally, the first connecting portion 1141 and a second connecting portion 1142 are threaded so as to enable matting of the first connecting portion 1141 and the second connecting portion 1142. A needle sheet 1143 is located between the first connecting portion 1141 and the second connecting portion 1142. The needle sheet 1143 is inserted into the first connecting portion 1141 and is held in place when the first connecting portion 1141 and the second connecting portion 1142 are mated. The needle sheet 1143 includes a discharging hole 1144 that enables liquid crystal 1107 in the liquid crystal container 1124 to be discharged into the second connecting portion 1142.

Also, a nozzle 1145 is connected to the second connecting portion 1142. The nozzle 1145 is for dropping liquid crystal 1107 in small amounts. The nozzle 1145 comprises a supporting portion 1147, comprised of a bolt that connects to the second connecting portion 1142, and a nozzle opening 1146 that protrudes from the supporting portion 1147 to form dispensed liquid crystal into a drop.

A discharging tube from the discharging hole 1144 to the nozzle opening 1146 is formed by the foregoing components. Generally, the nozzle opening 1146 of the nozzle 1145 has a very small diameter and protrudes from the supporting portion 1147.

Referring now to FIGS. 35A, 35B and 36, a needle 1136 is inserted into the liquid crystal container 1124 through a supporting portion 1121. One end of the needle 1136 contacts the needle sheet 1143. That end of the needle 1136 is conically shaped and fits into the discharging hole 1144 to enable closing of the discharging hole 1144.

A spring 1128 is installed on the other end of the needle 1136, which extends into an upper case 1126. The spring 1128 is received in a cylindrical spring receiving case 1150. A spring fixing portion 1137 prevents the spring from sliding down the needle 1136. As shown in FIG. 36, the supporting portion 1121 includes a protruding threaded member 1139. The spring receiving case 1150 includes mating threads that enable mating of the threaded member 1139 to the spring receiving case 1150, thus fixing the spring receiving case 1150 on the supporting portion 1121.

The spring receiving case 1150 further includes threads that mate with an elongated threaded bolt 1153 of a tension controlling unit 1152 that controls the tension of the spring 1128. The bolt 1153 is threaded onto the spring receiving case 1150. An end portion of the bolt 1153 contacts the spring 1128. Therefore, the spring is fixed between the spring fixing portion 1137 and the bolt 1153.

In FIGS. 35A, 35B and 36 the reference numeral 1154 represents a fixing plate for preventing the tension controlling unit 1152 from being moved. As shown in FIGS. 35A and 35B, the tension controlling unit 1152 can be rotated such that the bolt 1153 adjusts the length of the spring, and thus the spring's tension. When the tension is correct, the fixing plate can lock the spring length to produce a desired tension.

As described above, since the spring 1128 is installed and fixed between the spring fixing portion 1137 and the tension controlling unit 1152, the tension of the spring 1128 can be set by the length of the tension controlling unit 1152 inserted into the spring receiving case 1150. For example, when the tension controlling unit 1152 is controlled to make the length of the bolt 1153 inserted into the spring receiving case 1150 short (by make the length of the bolt outside the spring receiving case 1150 long), the length of the spring 1128 is lengthened and the tension is lowered, reference FIG. 35B. In addition, when the length of the bolt 1153 outside the spring receiving case 1150 becomes short, the tension is increased, reference FIG. 35A. The tension of the spring 1128 can be controlled to a desired level by controlling the tension controlling unit 1152.

A magnetic bar 1132 above a gap controlling unit 1134 is disposed above the needle 1136. The magnetic bar 1132 is made of magnetic material such as a ferromagnetic material or a soft magnetic material. A solenoid coil 1130 is installed around the magnetic bar. The solenoid coil 1130 is connected to an electric power supply that selectively supplies electric power to the solenoid coil 1130. This selectively produces a magnetic bar on the magnetic bar 1132.

The magnetic bar 1132 is separated by a predetermined interval (x) from the needle 1136. When the electric power is applied to the solenoid coil 1130 the resulting magnetic force causes the needle 1136 to contact the magnetic bar 1132. When the electric power is stopped, the needle 1136 returns to its stable position by the elasticity of the spring 1128. Vertical movement of the needle causes the discharging hole 1144 to selectively open and close.

The end of the needle 1136 and the needle sheet 1143 may be damaged by the shock of repeated contact. Therefore, it is desirable that the end of the needle 1136 and the needle sheet 1143 be made from a material that resists shock. For example, a hard metal such as stainless steel is suitable.

Figure 37:
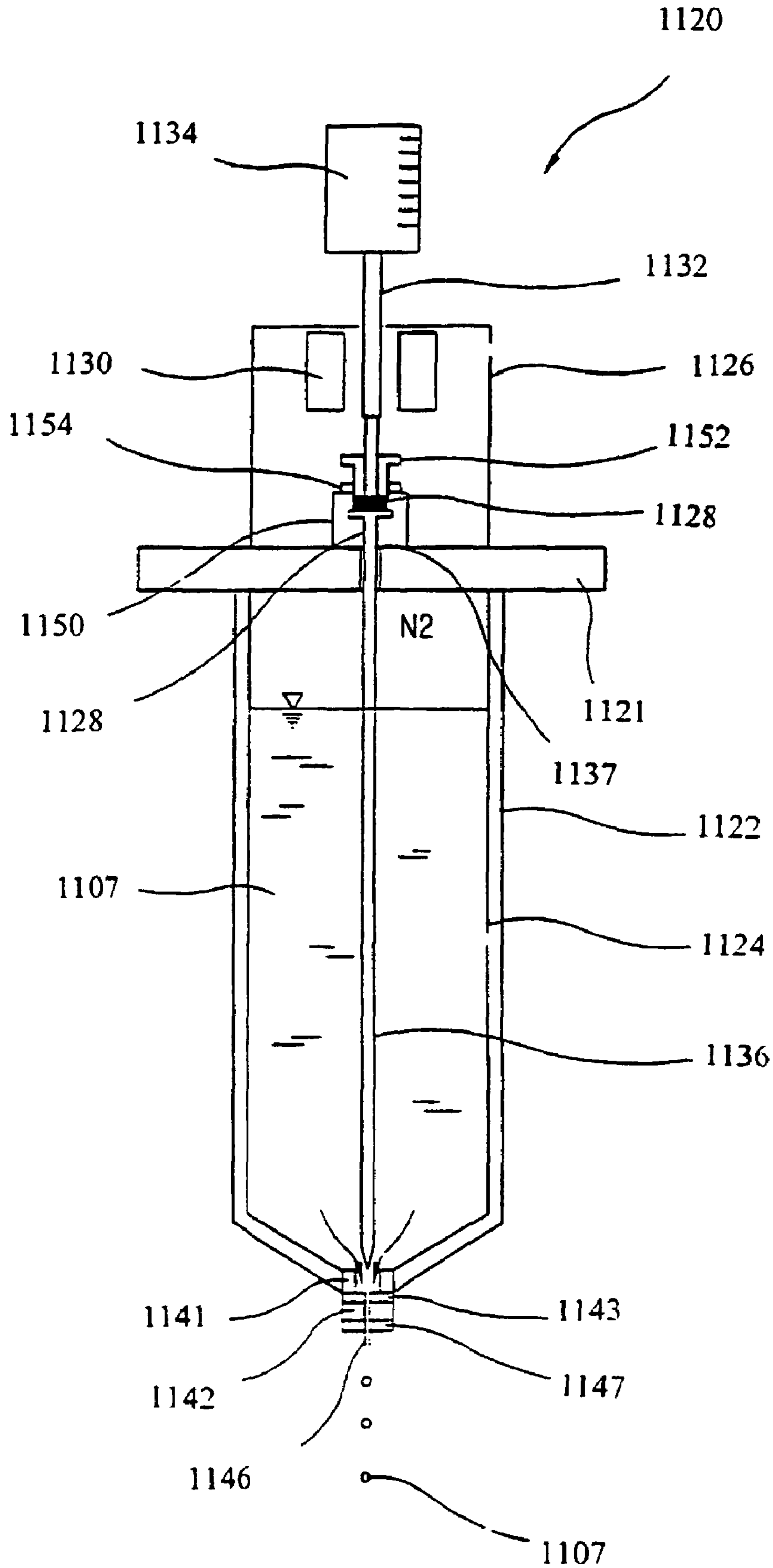
FIG. 37 illustrates the liquid crystal apparatus of FIG. 36 dispensing liquid crystal.

FIG. 37 illustrates the liquid crystal dispensing apparatus 1120 when the discharging hole 1144 is open. As shown, the electric power applied to the solenoid coil 1130 causes the needle 1136 to move upward. The nitrogen gas in the liquid crystal container 1124 forces liquid crystal through the nozzle 1145. The drop size depends on the time that discharging hole 1144 is open and on the gas pressure. The opening time is determined by the distance (x) between the needle 1136 and the magnetic bar 1132, the magnetic force of the magnetic bar 1132 and the solenoid coil 1130, and the tension of the spring 1128.

The magnetic force can be controlled by the number of windings of the solenoid coil 1130, field of the magnetic bar 1132, or by the applied electric power. The distance x can be controlled by the gap controlling unit 1134.

The tension of the spring 1128 is controlled by the tension controlling unit 1152. FIG. 35A shows the length of the spring 1128 as $y_1$ (having a high tension) while FIG. 35B shows the length of the spring $y_2$ (having a low tension). The position Y can be adjusted by the tension controlling unit 1152. Consequently, the returning speed of the needle 1136 can be adjusted by the tension controlling unit 1152, the opening time of the discharging hole 1144 can be adjusted by the tension controlling unit 1152, and the amount of liquid crystal dropped can be adjusted by the tension controlling unit 1152. Thus, the liquid crystal drop size can be accurately controlled.

Using the tension controlling unit 1152 to control the size of the liquid crystal drop has advantageous. A controller, such as a microcomputer, as well as its costs and programming, is not required. Furthermore, overall operation is simplified.

Figure 38A:
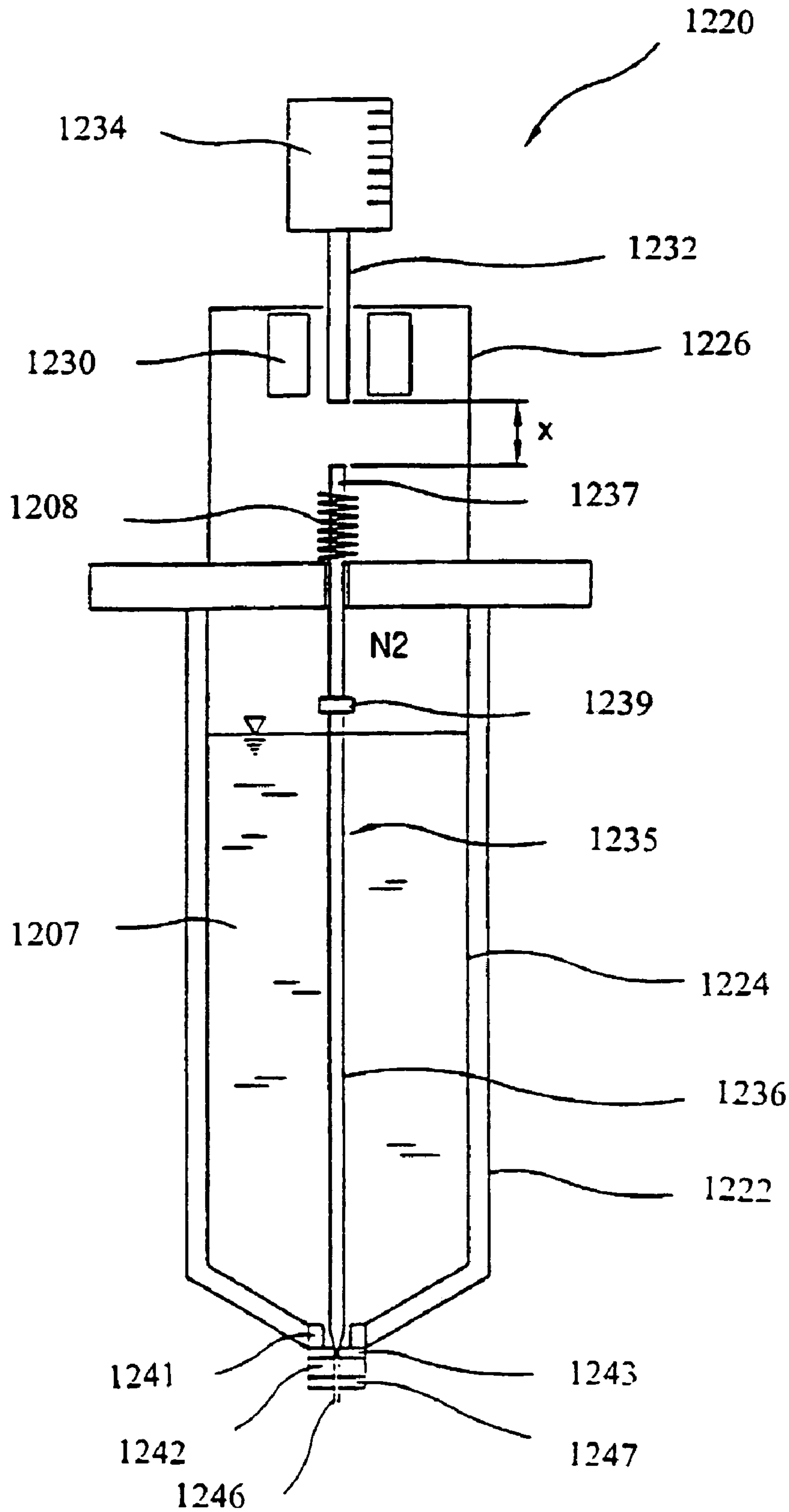
FIG. 38A illustrates a state in which liquid crystal is not dropped from a liquid crystal dropping apparatus.
Figure 38B:
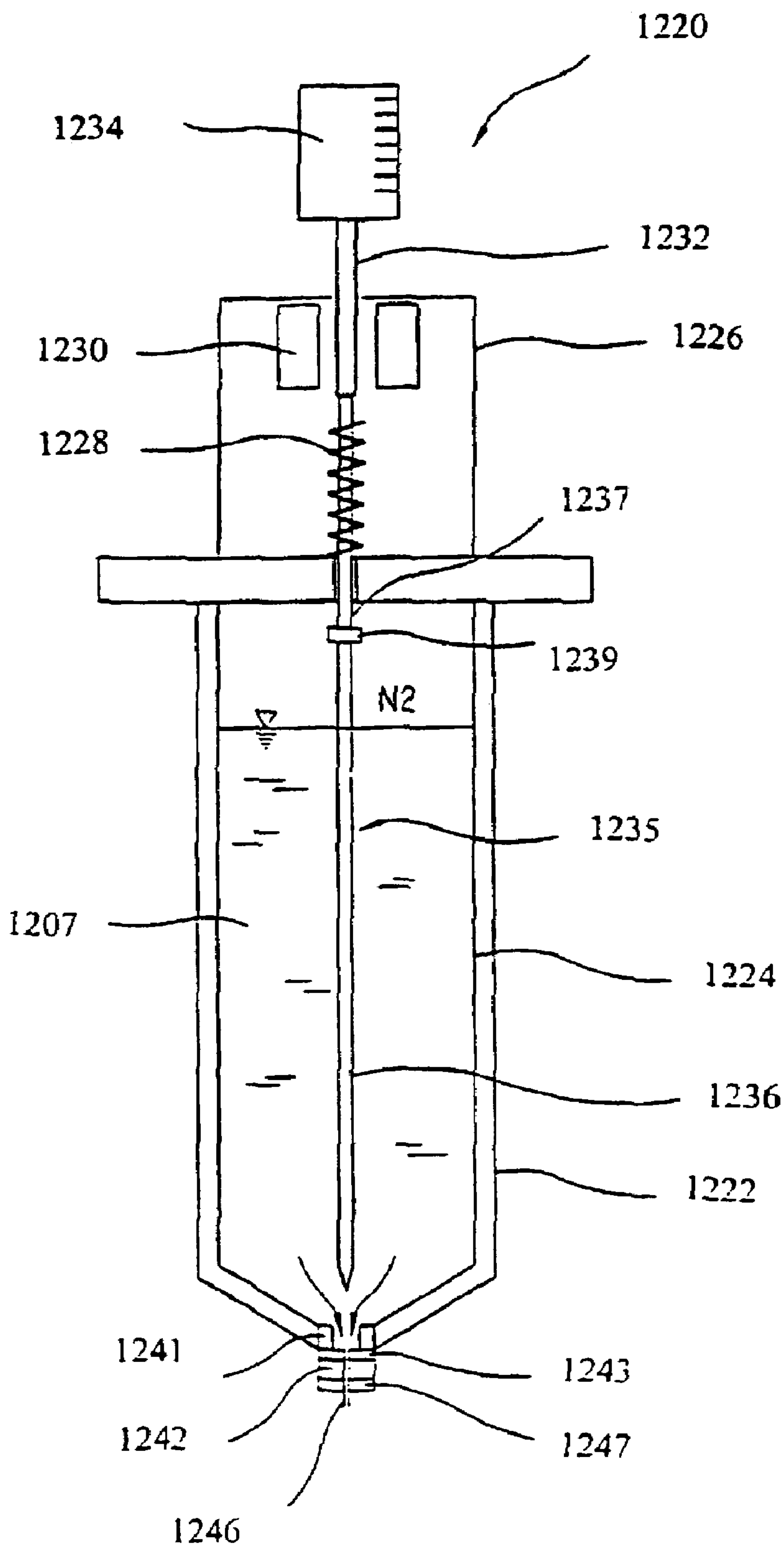
FIG. 38B illustrates a state in which liquid crystal is being dropped from a liquid crystal dropping apparatus.
Figure 39:
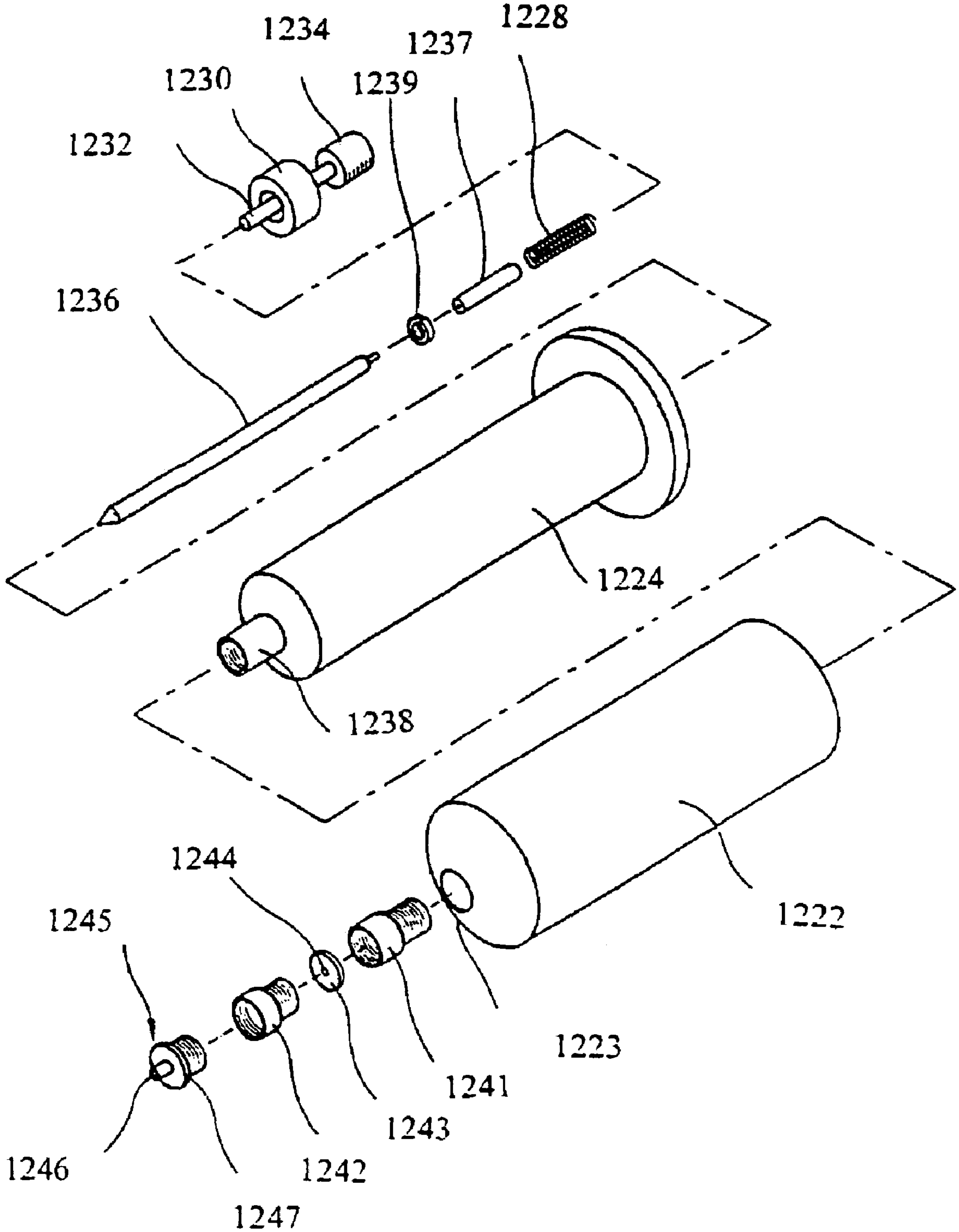
FIG. 39 is an exploded perspective view of FIGS. 38A and 38B.

FIG. 38A illustrates the liquid crystal dispensing device 1220 in a state in which liquid crystal is not being dropped. FIG. 38B illustrates the liquid crystal dispensing device 1220 in a state in which liquid crystal is being dropped. FIG. 39 is an exploded perspective view of the liquid crystal dispensing device 1220.

Referring now to FIGS. 38A, 38B and 39, as shown, the liquid crystal dispensing device 1220 includes a cylindrically shaped, polyethylene liquid crystal container 1224 that is received in a stainless steel case 1220. Generally, polyethylene has superior plasticity, it can be easily formed into a desired shape, and does not react with liquid crystal 1207. However, polyethylene is structurally weak and is thus easily distorted. Indeed, if the case was of polyethylene it could be distorted enough that liquid crystal might not be dropped at the exact position. Therefore, a polyethylene liquid crystal container 1224 is placed in a stainless steel case 1222.

A gas supplying tube (not shown) that is connected to an external gas supplying (also not shown) is beneficially connected to an upper part of the liquid crystal container 1224. A gas, such as nitrogen, is input through the gas supplying tube to fill the space without liquid crystal. The gas compresses the liquid crystal, thus tending to force liquid crystal from the liquid crystal dispensing device 1220.

An opening 1223 (see FIG. 39) is formed on a lower end portion of the case 1222. A protrusion 1238, formed on a lower end of the liquid crystal container 1224, is inserted through the opening 1223 to enable coupling of the liquid crystal container to the case 1222. The protrusion 1238 is coupled to a first connecting portion 1241. As shown in FIG. 39, the protrusion 1238 and the first connecting portion thread together.

The other end of the first connecting portion 1241 is also threaded to enable mating with a second connecting portion 1242. A needle sheet 1243 having a discharging hole 1244 is located between the first connecting portion 1241 and the second connecting portion 1242. Liquid crystal 1207 in the liquid crystal container 1224 is selectively discharged through the discharging hole 1244 to the second connecting portions 1242.

A nozzle 1245 is connected to the second connecting portion 1242. The nozzle 1245 includes a discharging opening 1246 for dropping liquid crystal 1207 as small, well-defined drops. The nozzle 1245 further comprises a supporting portion 1247 that threads into the second connecting portion 1242 to connect the nozzle 1245 to the second connecting portion 1242. A discharging tube that extends from the discharging hole 1244 to the discharging opening 1246 is thus formed. Generally, the discharging opening 1246 of the nozzle 1245 has a very small diameter in order to accurately control the liquid crystal drop.

A needle 1236, comprised of a first needle portion 1236 and a second needle portion 1237, is inserted into the liquid crystal container 1224. The first needle portion 1236 contacts with the needle sheet 1243. The end of the first needle portion 1236 that contacts the needle sheet 1243 is conically shaped to fit into the discharging hole 1244 so as to close the discharging hole 1244.

Figure 40:
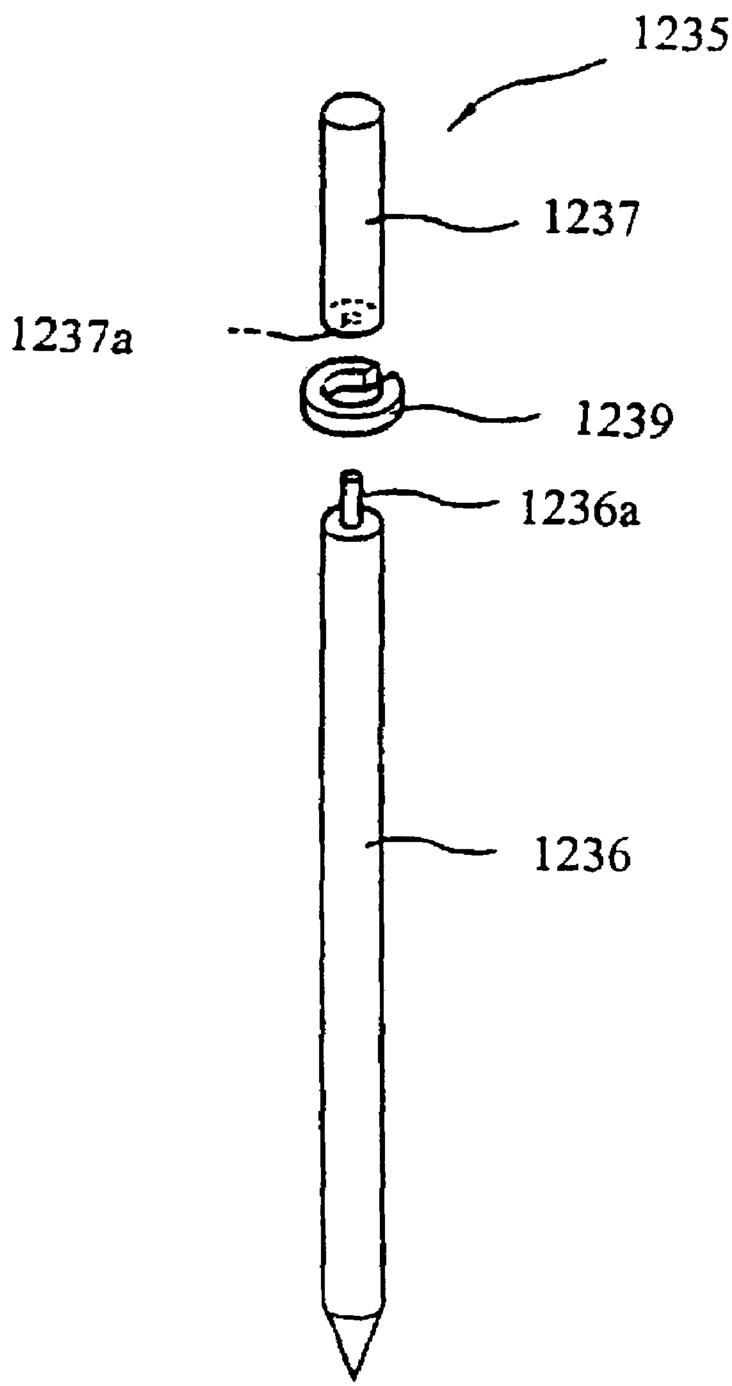
FIG. 40 is an exploded and enlarged view showing a needle.

The first needle portion 1236 and the second needle portion 1237 are constructed to be separable. As shown in FIG. 40, the first needle portion 1236 includes a conical shaped end that contacts the needle sheet 1243 and a threaded protrusion 1236*a* on the other end. Also as shown in FIG. 40, one end of the second needle portion 1237 has a threaded recess 1237*a* that mates with the protrusion 1236*a*. Disposed between the protrusion 1236*a* and the recess 1237*a* is a fixing coupler 1239 that prevents the first needle portion 1236 and the second needle portion 1237 from undesirably separating. The fixing coupler 1239 is beneficially a split lock washer.

In operation, the fixing coupler 1239 is inserted onto the protrusion 1236*a*, that protrusion is mated to the recess 1237*a*, and the first and second needle portions are firmly threaded together.

The needle 1236 is designed and constructed to be separated. The needle 1235 is a very important component in the liquid crystal dispensing apparatus 1220. In practice the first needle portion 1236 and the needle sheet 1243 form a set. If one is damaged, both are replaced. This is important because the up-and-down movement of the needle 1235 to open and close the discharging hole 1244 produces shocks. Moreover, the needle 1235 is much thinner than it is long, which means the needle 1235 is susceptible to distortion and other damage. Such damage may cause undesirable leakage from the discharging hole 1244, meaning that liquid crystal may be dropped when it should not be dropped.

The principles of the present invention provide for a first needle portion 1236 and a second needle portion 1237 that can be separated. Thus, only the damaged portion needs to be replaced, which reduces replacement costs. This is particularly advantageous when the second needle portion 1237 is damaged since the needle sheet 1243 then does not have to be replaced (since the first needle portion 1236 continues to be used). However, it should be understood that the second needle portion 1237 should be magnetic.

While a specific separable needle 1235 has been described, the principles of the present invention are not limited to that particular needle. For example, the first needle portion 1236 and the second needle portion 1237 can be coupled without the fixing coupler 1239. Also, a bolt may be formed on the first needle portion 1236 and a nut may be formed on the second needle portion 1237.

Referring once more to FIGS. 38A, 38B and 39, a spring 1228 is disposed on an end of the second needle portion 1237, which is located in an upper case 1226. A magnetic bar 1232 connected to a gap controlling unit 1234 is positioned above the end of the second needle portion 1237. The magnetic bar 1232 is made from a ferromagnetic material or from a soft magnetic material. A cylindrical solenoid coil 1230 is positioned around the magnetic bar 1232. The solenoid coil 1230 selectively receives electric power. That power produces a magnetic force that interacts with the magnetic bar 1232 to move the needle 1235 against the spring 1228, thus opening the discharging hole 1244 of the needle sheet 1243. This is why the second needle portion 1237 should be magnetic. When the electric power is stopped, the needle 1235 is returned to its static position by the elasticity of the spring 1228, thus closing the discharge hole.

The end of the first needle portion 1236 and the needle sheet 1243 repeatedly contact each other. Accordingly, the end of the first needle portion 1236 and the needle sheet 1243 may be damaged by repeated shocks from repeated contact. Therefore, it is desirable that the end of the first needle portion 1236 and the needle sheet 1243 be formed using a material which is strong with respect to shock. For example, a hard metal, such as stainless steel may be used to prevent shock damage. As a result, the first needle portion 1236 and the needle sheet 1243 are beneficially comprised of stainless steel.

As shown in FIG. 38B, when the discharging hole 1244 of the needle sheet 1243 is opened, the gas (nitrogen) supplied to the liquid crystal container 1224 pressurizes the liquid crystal force liquid crystal 1207 through the nozzle. It should be noted that the liquid crystal 1207 drop size depends on the time that the discharge hole is open and on the gas pressure. The opening time is determined by the distance (x) between the second needle portion 1237 and the magnetic bar 1232, the magnetic force produced by the solenoid coil 1230, and the tension of the spring 1228. The magnetic force can be controlled by the number of windings that form the solenoid coil 1230, or by the magnitude of the applied electric power. The distance x can be controlled by the gap controlling unit 1234.

Also, although it is not shown in Figures, the solenoid coil 1230 may be installed around the second needle portion 1237. In that case, since the second needle portion 1237 is made of a magnetic material, the second needle portion 1237 is magnetized when electric power is applied to the solenoid coil 1230. Thus needle 1235 will rise to contact the magnetic bar 1232.

As described above, the needle 1235 is comprised of two needle portions that can be separated. Therefore, the needle 1235 can be repaired, which reduces replacement cost if the needle becomes distorted or damaged. This is particularly advantageous if the second needle portion 1237 becomes distorted or damaged since only the second needle portion 1237 must be replaced. This avoids the need to replace the needle sheet 1243.

As described above, there is provided a liquid crystal dispensing apparatus including a needle which can be separated and coupled, and therefore, the needle can be replaced easily at lower price when the needle is distorted or damaged. The liquid crystal dispensing apparatus of the present invention is not limited to a specified liquid crystal dispensing apparatus, but can be applied to all apparatuses used for dropping liquid crystal.

Figure 41A:
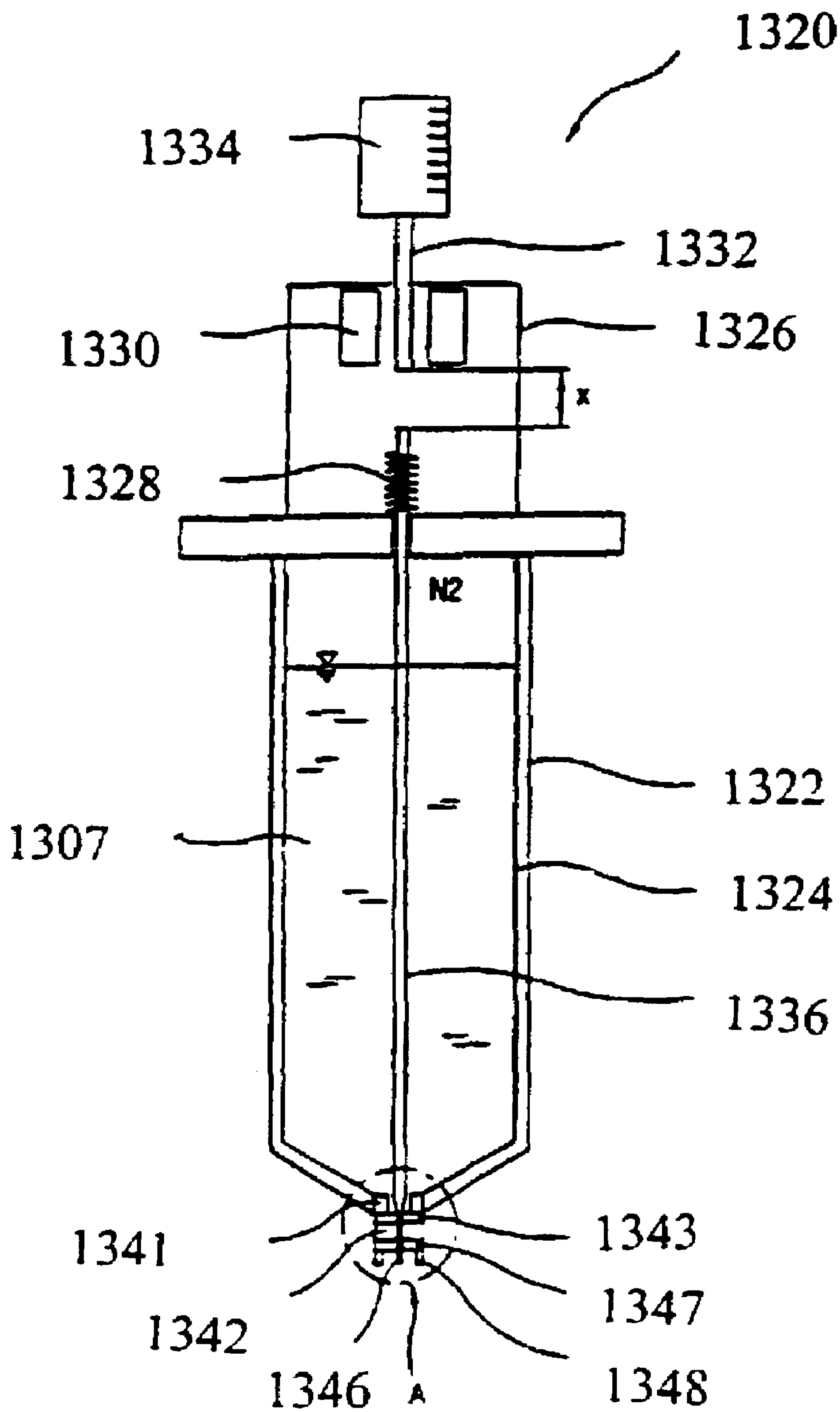
FIGS. 41A and 41B are views showing a structure of an exemplary liquid crystal dispensing apparatus according to the present invention.
Figure 41B:
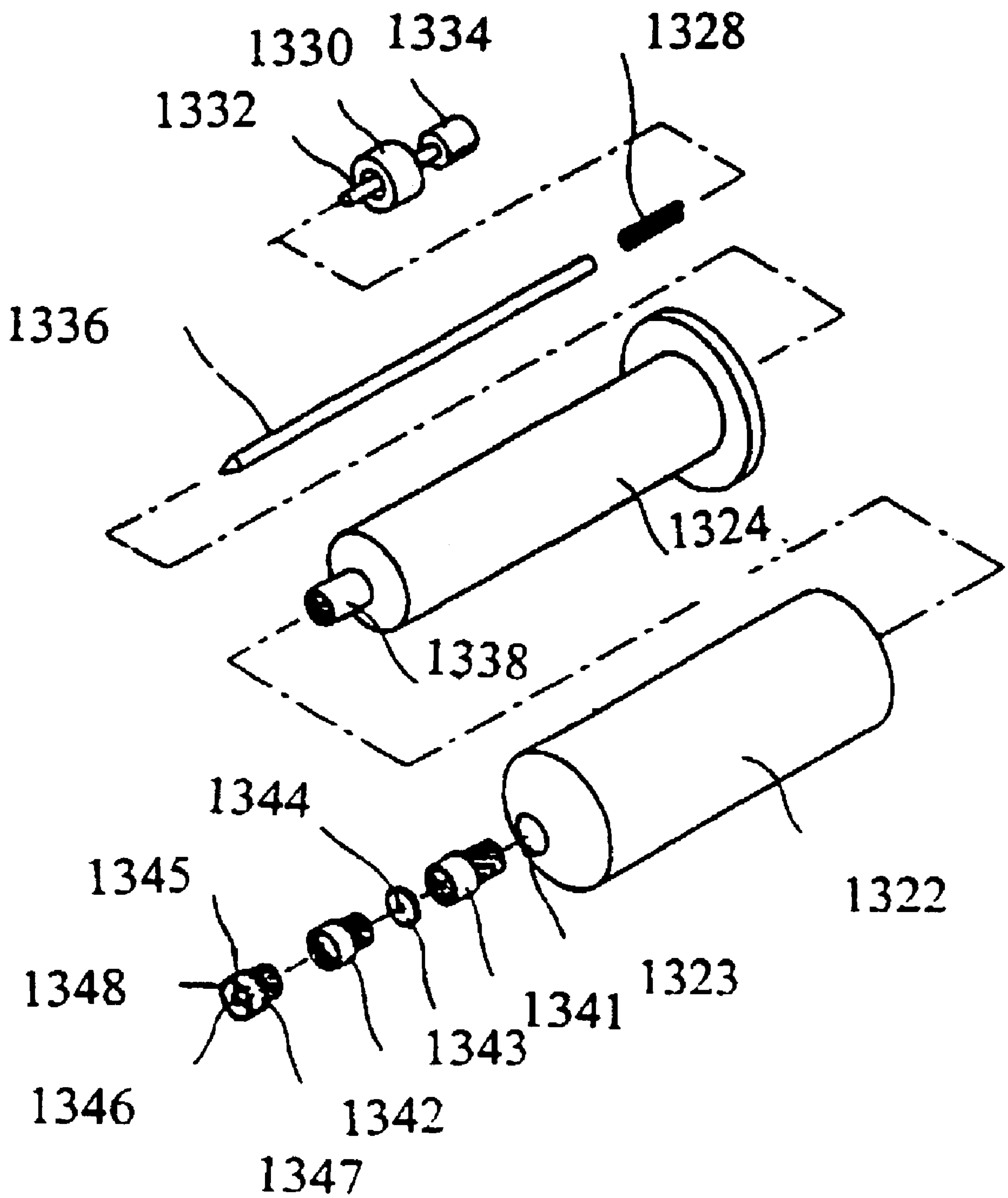

FIG. 41A is a cross-sectional view showing an exemplary liquid crystal dispensing apparatus according to the present invention, and FIG. 41B is an exploded perspective view. The liquid crystal dispensing apparatus 1320 according to the present invention will now be described in detail.

As shown, a cylindrical liquid crystal container 1324 is enclosed in a case 1322 of the liquid crystal dispensing apparatus. The liquid crystal container 1324 containing the liquid crystal 1307 may be made of polyethylene. Further, the case 1322 is made of a stainless steel to enclose the liquid crystal container 1324 therein. Generally, because the polyethylene has superior plasticity, it can be easily formed in the desired shape. Since polyethylene does not reacted with the liquid crystal 1307 when the liquid crystal 1307 is contained therein, the polyethylene can be used for the liquid crystal container 1324. However, the polyethylene has a weak strength so that it can be easily distorted by external shocks or other stresses. For example, when the polyethylene is used as the liquid crystal container 1324, the container 1324 may become distorted so that the liquid crystal 1307 cannot be dropped at the exact position. Therefore, the container 1324 should be enclosed in the case 1322 made of the stainless steel or other material having greater strength. Although not shown, a gas supply tube connected to an exterior gas supply unit may be formed on an upper part of the liquid crystal container 1324. An inert gas, such as nitrogen, is provided through the gas supply tube from the gas supply unit to fill the portion where the liquid crystal is not filled. Thus, the gas pressure compresses the liquid crystal to be dispensed.

On the lower portion of the case 1322, an opening 1323 is formed. When the liquid crystal container 1324 is enclosed in the case 1322, a protrusion 1338 formed on a lower end portion of the liquid crystal container 1324 is inserted into the opening 1323 so that the liquid crystal container 1324 is connected to the case 1322. Further, the protrusion 1338 is connected to a first connecting portion 1341. As shown, a nut (female threaded portion) is formed on the protrusion 1338, and a bolt (male threaded portion) is formed on one side of the first connecting portion 1341 so that the protrusion 1338 and the first connecting portion 1341 are interconnected by the nut and the bolt. Of course, it should be recognized that in this description and in the following description that other connection types or configurations may be used.

A nut is formed on the other side of the first connecting portion 1341 and a bolt is formed on one side of a second connecting portion 1342, so that the first connecting portion 1341 and the second connecting portion 1342 are interconnected. A needle sheet 1343 is located between the first connecting portion 1341 and the second connecting portion 1342. The needle sheet 1343 is inserted into the nut of the first coupling portion 1341, and then the needle sheet 1343 is combined between the first connecting portion 1341 and the second connecting portion 1342 when the bolt of the second connecting portion 1342 is inserted and bolted. A discharging hole 1344 is formed on the needle sheet 1343, and the liquid crystal 1307 contained in the liquid crystal container 1324 is discharged through the discharging hole 1344 passing through the second connecting portions 1342.

A nozzle 1345 is connected to the second connecting portion 1342. The nozzle 1345 is used to drop the liquid crystal 1307 contained in the liquid crystal container 1324 as a small amount. The nozzle 1345 comprises a supporting portion 1347 including a bolt connected to the nut at one end of the second connecting portion 1342 to connect the nozzle 1345 with the second connecting portion 1342, a discharging opening 1346 protruded from the supporting portion 1347 to drop a small amount of liquid crystal on the substrate as a drop, and a protecting wall 1348 formed on an outer portion of the supporting portion 1347 to protect the discharging opening 1346.

A discharging tube extended from the discharging hole 1344 of the needle sheet 1343 is formed in the supporting portion 1347, and the discharging tube is connected to the discharging opening 1346. Generally, the discharging opening 1346 of the nozzle 1345 has very small diameter to finely control the liquid crystal dropping amount, and the discharging opening 1346 protrudes from the supporting portion 1347. Therefore, the nozzle 1345 may be affected by external forces when the nozzle 1345 is connected to the second connecting portion 1342 or separated from the second connecting portion 1342. For example, if the discharging opening 1346 is distorted or damaged, when the nozzle 1345 is connected to the second connecting portion 1342, the diameter and the direction of the discharging opening 1346 is changed. As a result, the liquid crystal drops onto the glass substrate cannot be controlled precisely. In addition, the liquid crystal may be sputtered through damaged portion so that the liquid crystal is dropped unwanted position. Even the liquid crystal may not be able to be dropped at all due to a breakdown of the discharging opening 1346. Especially, if the liquid crystal drops are sputtered toward the sealing area (the area on which the sealing material is applied and the upper substrate and the lower substrate are attached thereby) by the damage of the discharging opening 1346, the sealing material is broken around the area where the liquid crystal is sputtered when both substrates are attached, thereby causing a defect on the liquid crystal panel.

The protecting wall 1348 for protecting the discharging opening 1346 prevents the discharging opening 1346 of the nozzle 1345 from being damaged. That is, as shown, the protecting wall 1348 of predetermined height is formed around the discharging opening 1346, to prevent external forces from damaging the discharging opening 1346.

A needle 1336 is inserted into the liquid crystal container 1324, and one end part of the needle 1336 is contacted with the needle sheet 1343. Especially, the end part of the needle 1336 contacted with the needle sheet 1343 is conically formed to be inserted into the discharging hole 1344 of the needle sheet 1343 to close the discharging hole 1344.

Further, a spring 1328 is installed on the other end of the needle 1336 located in an upper case 1326 of the liquid crystal dispensing apparatus 1320 to bias the needle 1336 toward the needle sheet 1343. A magnetic bar 1332 and a gap controlling unit 1334 are connected above the needle 1336. The magnetic bar 1332 is made of magnetic material such as a ferromagnetic material or a soft magnetic material, and a solenoid coil 1330 of cylindrical shape is installed on outer side of the magnetic bar 1332 to be surrounded thereof. The solenoid coil 1330 is connected to an electric power supplying unit (not shown in figure) to supply electric power thereto, thereby generating a magnetic force on the magnetic bar 1332 as the electric power is applied to the solenoid coil 1330.

The needle 1336 and the magnetic bar 1332 are separated with a predetermined interval (x). When the electric power is applied to the solenoid coil 1330 from the electric power supplying unit (not shown) to generate the magnetic force on the magnetic bar 1332, the needle 1336 contacts the magnetic bar 1332 as a result of the generated magnetic force. When the electric power supplying is stopped, the needle 1336 is returned to the original position by the elasticity of the spring 1328. By the movement of the needle in up-and-down direction, the discharging hole 1344 formed on the needle sheet 1343 is opened or closed. The end of the needle 1336 and the needle sheet 1343 repeatedly contact each other according to the supplying status of the electric power to the solenoid coil 1330. Thus, the part of the needle 1336 and the needle sheet 1343 may be damaged by the repeated shock caused by the repeated contact. Therefore, it is desirable that the end part of the needle 1336 and the needle sheet 1343 are preferably formed by using a material which is strong to shock, for example, the hard metal to prevent the damage caused by the shock. Also, the needle 1336 should be formed of a magnetic material in this exemplary configuration to be magnetically attracted to the magnetic bar 1332.

Figure 42:
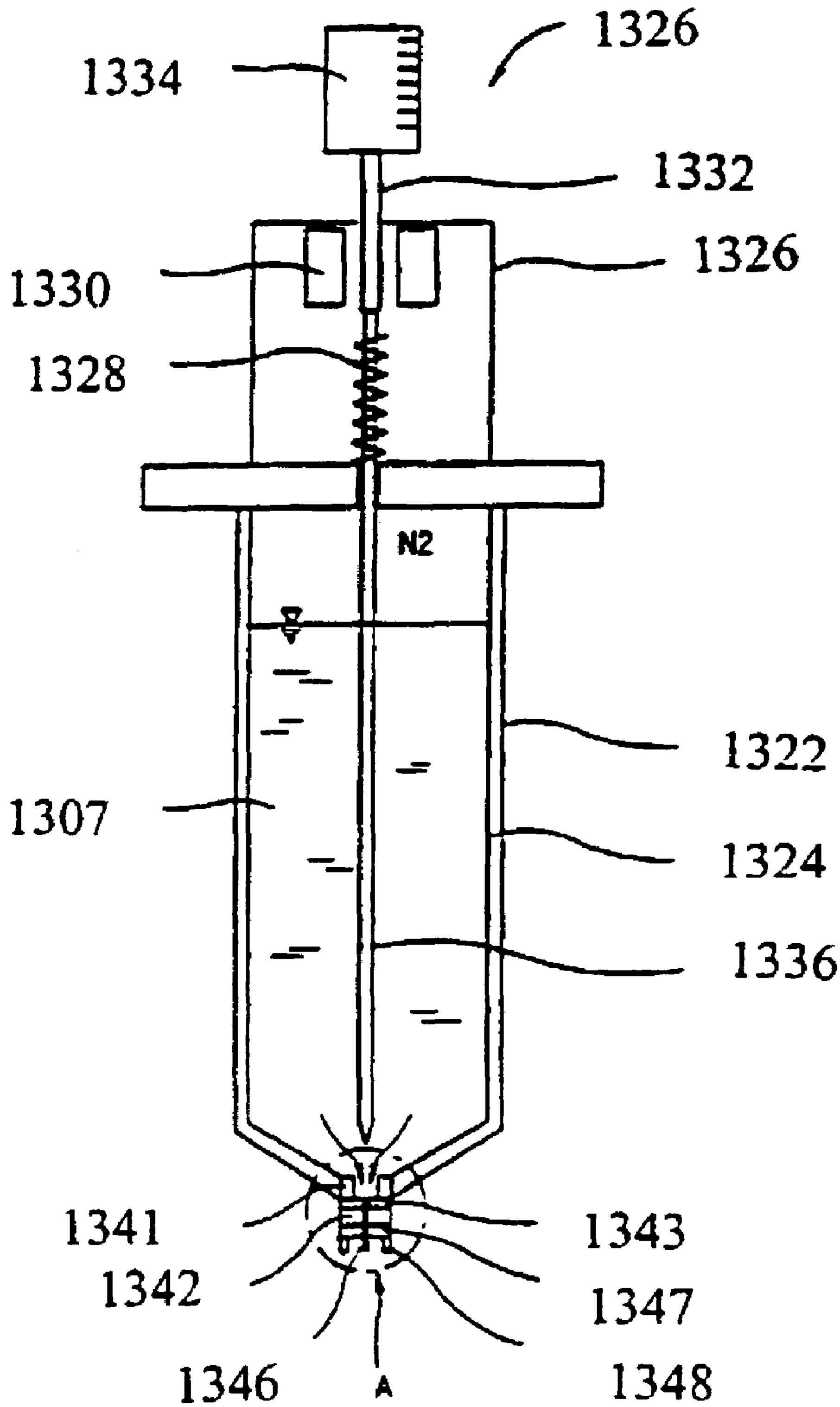
FIG. 42 is a view showing a structure of the liquid crystal dispensing apparatus of FIGS. 41A and 41B when the liquid crystal is dropping according to the present invention.

FIG. 42 shows the liquid crystal dispensing apparatus 1320 in which the discharging hole 1344 of the needle sheet 1343 is opened by the moving of the needle 1336 in the upper direction. As the discharging hole 1344 of the needle sheet 1343 is opened, the gas (preferably $N_2$ gas) supplied to the liquid crystal container 1324 compresses the liquid crystal 1307 to start the dropping of the liquid crystal 1307 through the nozzle 1345. The dropping amount of the liquid crystal 1307 is dependant upon the opening time of the discharging hole 1344 and the pressure compressed onto the liquid crystal 1307. The opening time is determined by the distance (x) between the needle 1336 and the magnetic bar 1332, the magnetic force of the magnetic bar 1332 generated by the solenoid coil, and the elastic force of the spring 1328 installed on the needle 1336. The magnetic force of the magnetic bar 1332 can be controlled according to the winding number of the solenoid coil 1330 installed around the magnetic bar 1332 or the magnitude of the electric power applied to the solenoid coil 1330. The distance x between the needle 1336 and the magnetic bar 1332 can be controlled by the gap controlling unit 1334.

Also, although not shown, the solenoid coil 1330 may be installed around the needle 1336 instead of the magnetic bar 1332. In that case, the needle 136 is made of the magnetic material, and therefore, the needle 1336 is magnetized when the electric power is applied to the solenoid coil 1330. Consequently, the needle 1336 moves in the upper direction to contact with the magnetic bar 1332 because the magnetic bar 1332 is fixed and the needle 136 moves in the up-and-down direction.

Figure 43A:
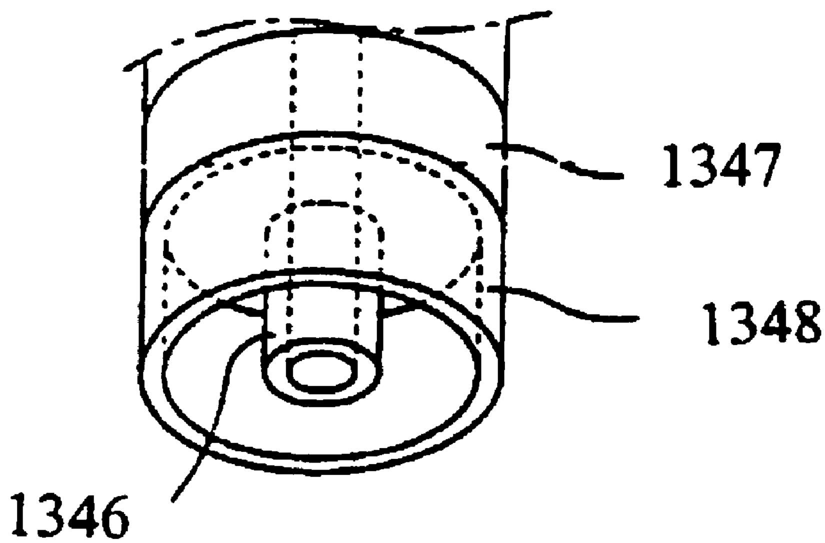
FIGS. 43A and 43B are views showing a nozzle structure for the exemplary liquid crystal dispensing apparatus of FIGS. 41A and 41B according to the present invention.
Figure 43B:
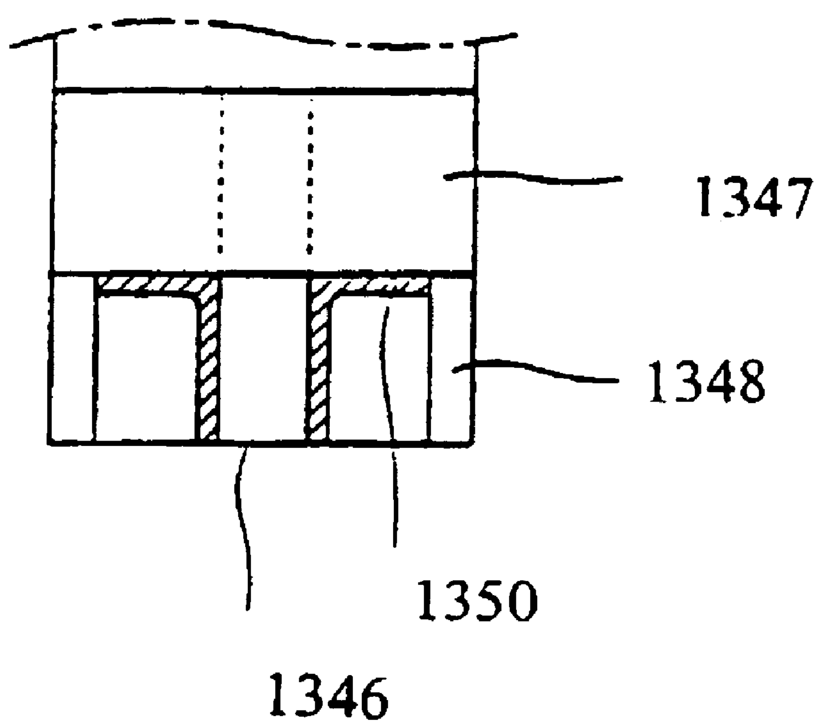

FIGS. 43A and 43B provide enlarged views of portion A in FIG. 42A. Here, FIG. 43A is a perspective view, and FIG. 43B is a cross-sectional view. As shown, the protecting wall 1348 is formed around the discharging opening 1346 of the nozzle 1345 to be the same or higher height than that of the discharging opening 1346. In an exemplary configuration, the discharge opening 1346 projects a distance of about 0.8 times the distance of the protecting wall 1348. Therefore, the distortion or damage of the discharging opening 1346 due to the devices such as a tool for connecting when the nozzle 1345 is connected or separated can be prevented.

Also, the size (diameter) of the nozzle 1345 is beneficially increased due to the large protecting wall 1348. Generally, the size of the nozzle 1345 is very small. Thus, it is very difficult to handle when the nozzle 1345 is connected to or separated from the second connecting portion 1342. However, if the size of the nozzle 1345 is increased by forming the protecting wall 1348 as in the present invention, the workability of the nozzle 1345 is improved thereby facilitating connection and separation of the nozzle, 1345.

Though the protecting wall 1348 may be formed using any material that can protect the discharging opening 1346 from the external force. However, the stainless steel or other hard metal with high strength is preferred.

Further, as shown in FIG. 43B, a material having higher contact angle for the liquid crystal such as a fluorine resin 1350 is applied around the discharging opening 1346 of the nozzle 1345. The contact angle is an angle made when liquid makes a thermodynamic balance on a surface of solid material. The contact angle is a measure representing a wettability on the surface of the solid material. The nozzle 1345 is made of the metal having the low contact angle. Therefore, the metal has high wettability (that is, high hydrophile property) and high surface energy. Thus, the liquid crystal very easily spreads out. In addition, if the liquid crystal is dropped through the nozzle 1345 made of the metal, the liquid crystal is disposed as drops (a drop shape means that the contact angle is high) at the end part of the discharging opening 1346 on the nozzle 1345, but instead spreads out on the surface of the nozzle 1345: As the liquid crystal dropping is repeated, the liquid crystal spreads onto the surface of the nozzle 1345 and lumps.

The phenomenon of the liquid crystal spreading out on the surface of the nozzle 1345 makes the exact liquid crystal dropping impossible. If the amount of liquid crystal discharged through the discharging opening 1346 of the nozzle 1345 is controlled by controlling the opening time of the discharging opening and the gas pressure compressing the liquid crystal, some of the liquid crystal spreads out onto the surface of the nozzle 1345. Therefore, the actual dropping amount of liquid crystal is smaller than the amount of the liquid crystal discharged through the discharging opening 1346. Of course, the discharged amount may be controlled considering the amount of the liquid crystal spread out on the surface. However, it is not possible to calculate the amount of the liquid crystal spread out on the surface of the nozzle 1345.

Also, since the liquid crystal lumped on the nozzle 1345 by the repeated dropping operations may later be added to the amount of the liquid crystal being discharged through the discharging opening 1346, a larger dropping amount than expected may be dropped on the substrate. That is, the dropping amount of the liquid crystal is irregular or unpredictable due to the low contact angle characteristic of the metal liquid crystal interface.

In contrast, if a fluorine resin film 1350 having higher contact angle is formed on the nozzle 1345, especially, around the discharging opening 1346 of the nozzle 1345, the liquid crystal 1307 discharged through the discharging opening 1346 makes a nearly perfect drop shape instead of being spread out on the surface of the nozzle 1345. Consequently, the liquid crystal can be dropped on the substrate precisely as amount expected.

The fluorine resin film 1350 is a teflon coating film. Three basic forms of teflons, that is, polytetrafluoro ethylene (PTFE), fluorinated ethylene prophylene (FEP), and polyfluoroalkoxy (PEA) can preferably be used. Also, an organic compound can be added to the basic forms. The fluorine resin film 1350 is formed on the surface of the nozzle 1345 by a dipping or spraying method. In FIG. 43B, the fluorine resin film 1350 is formed only around the discharging opening 1346, but it may be applied to entire nozzle 1345 including the protecting wall 1348. The fluorine resin has high contact angle, and also, has various characteristics such as abrasion resistance, heat resistance, and chemical resistance. Therefore, the application of the fluorine resin film 1350 is able to prevent the distortion and damage of the nozzle 1345 by the external forces effectively.

Figure 44:
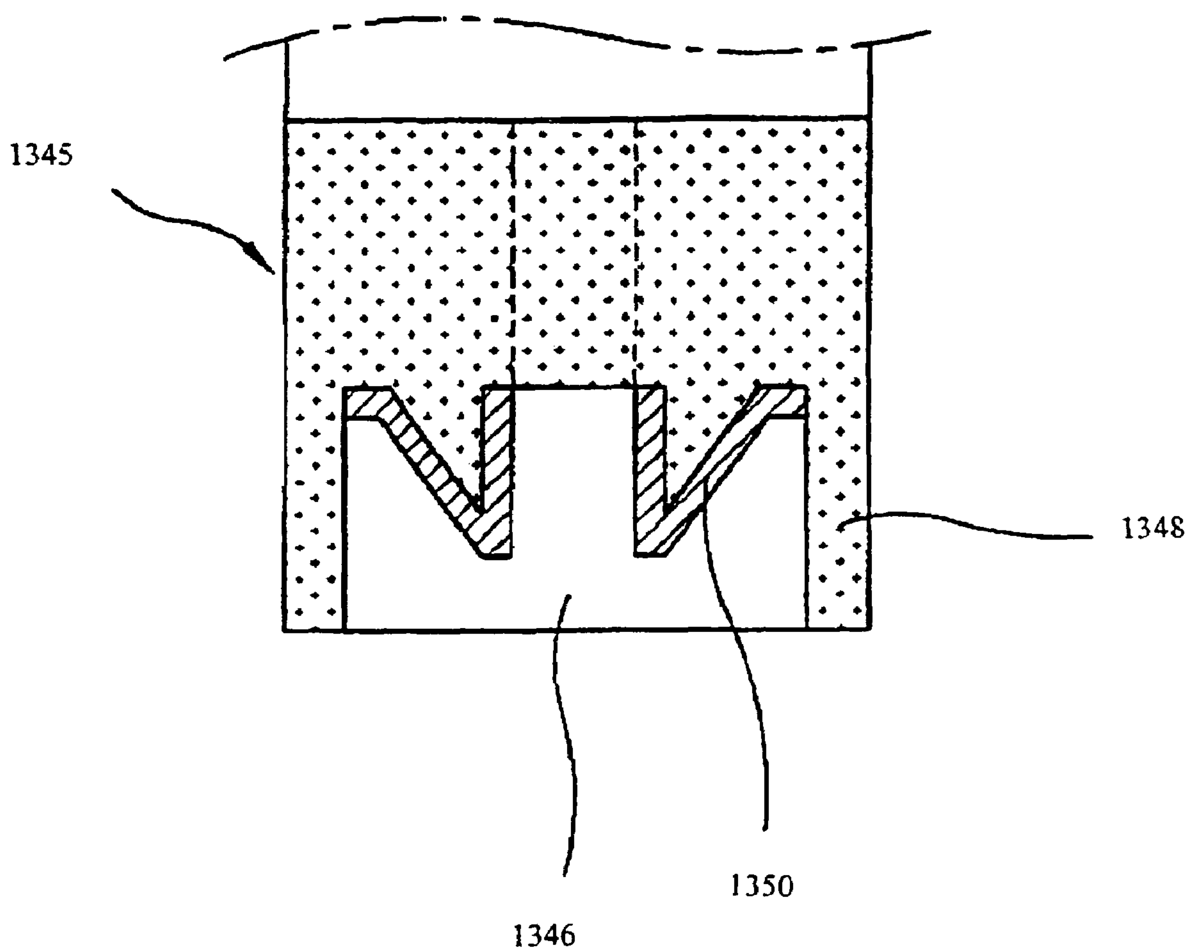
FIG. 44 is a view showing another exemplary nozzle structure for a liquid crystal dispensing apparatus according to the present invention.

Of course it should be recognized that the dispensing apparatus or nozzle configuration can be varied in accordance with the present invention. For example, a nozzle with a sloped discharge opening as shown in FIG. 44 can be used.

As described above, the protecting wall is installed and the fluorine resin film is formed on the nozzle of the liquid crystal dispensing apparatus, and therefore, following effects can be gained. First, the protecting wall is formed around the discharging opening 1346 of the nozzle 1345, and therefore the distortion and the damage of the discharging opening 1346 can be prevented when the nozzle is connected or separated. In addition, the inferiority of the liquid crystal dropping caused by the distortion or the damage of the discharging opening can be prevented. Second, the phenomena that the liquid crystal is sputtered to the sealing area by the distortion of the discharging opening and the sealing area is broken by the dropped liquid crystal when the upper substrate and the lower substrate are attached can be prevented by the protecting wall 1348. Third, the fluorine resin film 1350 is formed around the discharging opening of the nozzle, thereby permitting an exact amount of liquid crystal to be dropped on the substrate. Fourth, the fluorine resin film is formed around the discharging opening and on the entire nozzle to increase the strength of the nozzle, and thereby the nozzle is not affected by the external forces.

Figure 19:
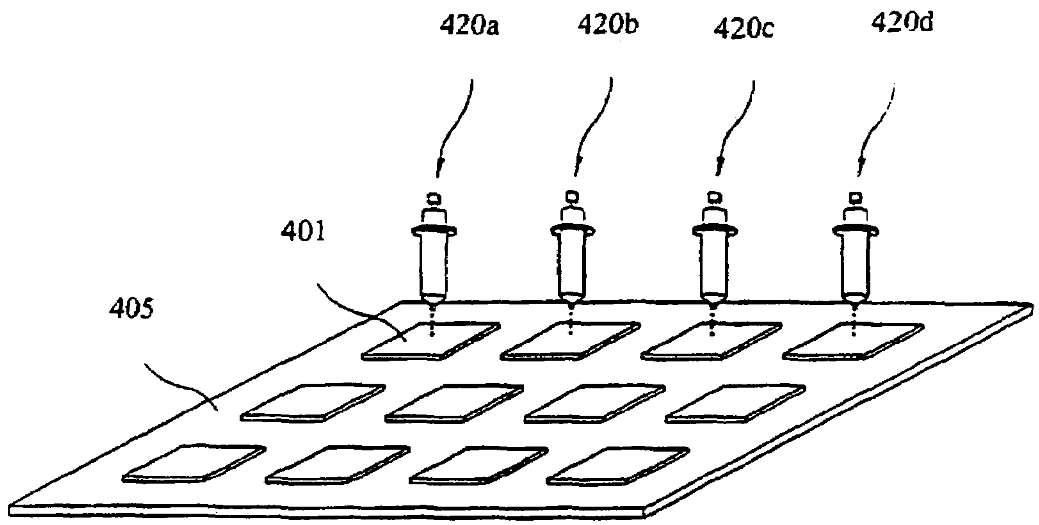
FIG. 19 illustrates dropping liquid crystal onto a substrate having 4 columns of liquid crystal panel areas using four liquid crystal dispensing devices.

FIG. 19 illustrates four liquid crystal dispensing devices 420*a*~420*d* applying liquid crystal to a substrate. As shown, that substrate 405 has twelve liquid crystal panel areas 401 that are to receive liquid crystal, with the twelve liquid crystal panel areas 401 being evenly arranged in four columns. With four liquid crystal dispensing devices 420*a*~420*d* applying liquid crystal to four columns of liquid crystal panel areas 401, rapid application of liquid crystal is possible.

Figure 20:
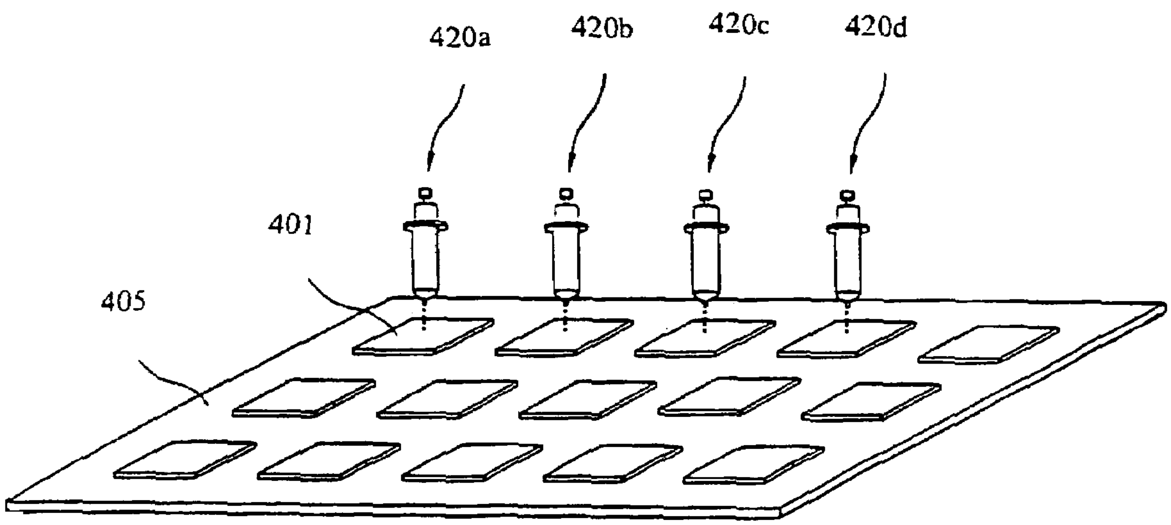
FIG. 20 illustrates dropping liquid crystal onto a substrate having 5 columns of liquid crystal panel areas using four liquid crystal dispensing devices.

However, as shown in FIG. 20, a problem occurs when the liquid crystal is to be applied to a substrate having fifteen liquid crystal panel areas arranged in five columns when using four liquid crystal dispensing devices 420*a*~420*d*. Liquid crystal can be applied quickly to four columns, but one of the four liquid crystal dispensing devices 420*a*~420*d* must apply liquid crystal to the fifth column. However, in that case one of the four liquid crystal dispensing devices 420*a*~420*d* runs out of liquid crystal faster than the other three. That is, the amount of liquid crystal in the liquid crystal dispensing device 420 that drops liquid crystal onto the fifth column is becomes than in the other liquid crystal dispensing devices 120.

Having one liquid crystal container 424 run out of liquid crystal faster than the others is a problem. Consider that each liquid crystal dispensing device 420*a*~420*d* has the same fixed capacity, which enables the liquid crystal dispensing devices to be interchangeable. When all liquid crystal in a liquid crystal container 424 has been applied, the liquid crystal container 424 is removed from the liquid crystal dispensing device (420*a*~420*d*) and cleaned. Then, the liquid crystal container 424 is re-filled. It is more efficient to clean and refill all four liquid crystal containers 424 at one time. That way, the liquid crystal dispensing devices 420*a*~420*d* can operate with the least amount of down time, and adjustments of all of the liquid crystal dispensing device 420*a*~420*d* can be done together. However, if one liquid crystal dispensing device 420*a*~420*d* runs out faster than the others, efficiency is lost.

According to the present invention, the above problem is addressed by evenly dispensing liquid crystal from all of the liquid crystal dispensing devices over time. When there are M liquid crystal panel columns and N liquid crystal dispensing devices (M>N), liquid crystal is dropped onto N columns of a first substrate using the N liquid crystal dispensing devices, and then liquid crystal is dropped onto the remaining column(s) (M−N) of the first substrate using at least a first of the liquid crystal dispensing devices. Then, liquid crystal is dropped onto N columns of liquid crystal panel areas of a second substrate using the N liquid crystal dispensing devices, and then liquid crystal is dropped onto the remaining column(s) (M−N) of the second substrate using at least a second of the N liquid crystal dispensing devices.

As described above, liquid crystal is dropped onto the liquid crystal panel columns formed on respective substrates using the N liquid crystal dispensing devices. Then, liquid crystal is dropped onto the remaining liquid crystal panel columns (M−N) of different substrates using different liquid crystal dispensing devices. The result is that the liquid crystal is, over time, dispensing from the N liquid crystal dispensing devices equally.

Figure 21A:
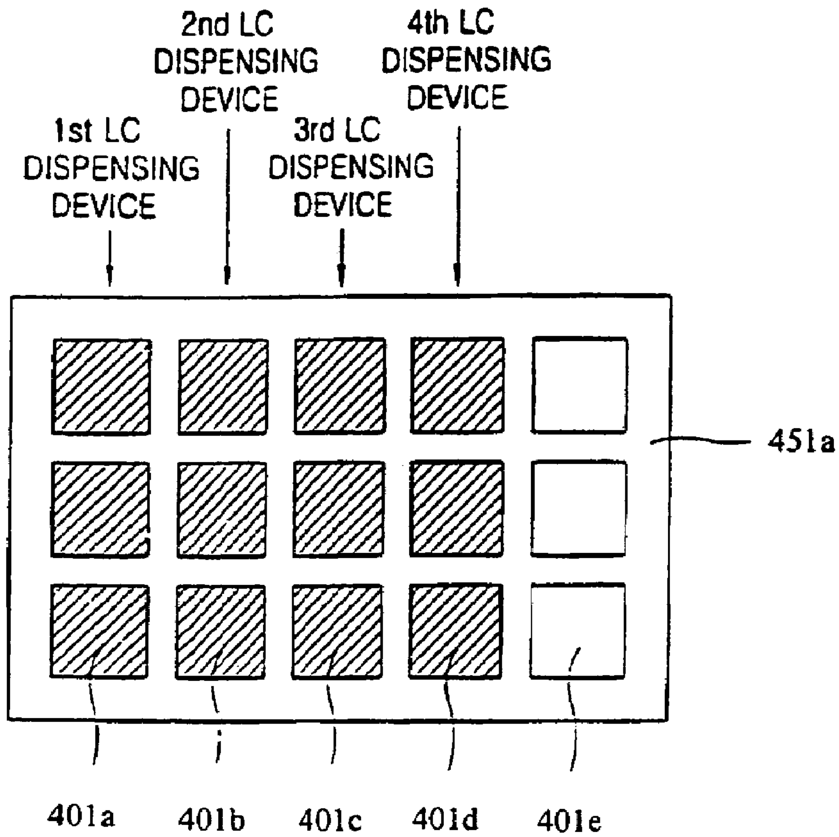
FIGS. 21A and 21B illustrate dropping liquid crystal onto the liquid crystal panel area disposed on a first substrate according to the principles of the present invention.

The present invention will be described with reference to accompanying FIGS. 18A through 20B, which illustrate dropping liquid crystal onto substrates having fifteen liquid panel areas, arranged in five columns, using four liquid crystal dispensing devices. As shown in FIG. 21A, liquid crystal is dropped onto the first to fourth columns of liquid crystal panel areas 401*a*~401*d* using the four liquid crystal dispensing devices 420*a*~420*d*. The hatched parts of the FIGS. represent the panel areas on which liquid crystal was dropped. As shown in FIG. 21A, liquid crystal is not dropped onto the fifth column (panels 401*e*).

Figure 21B:
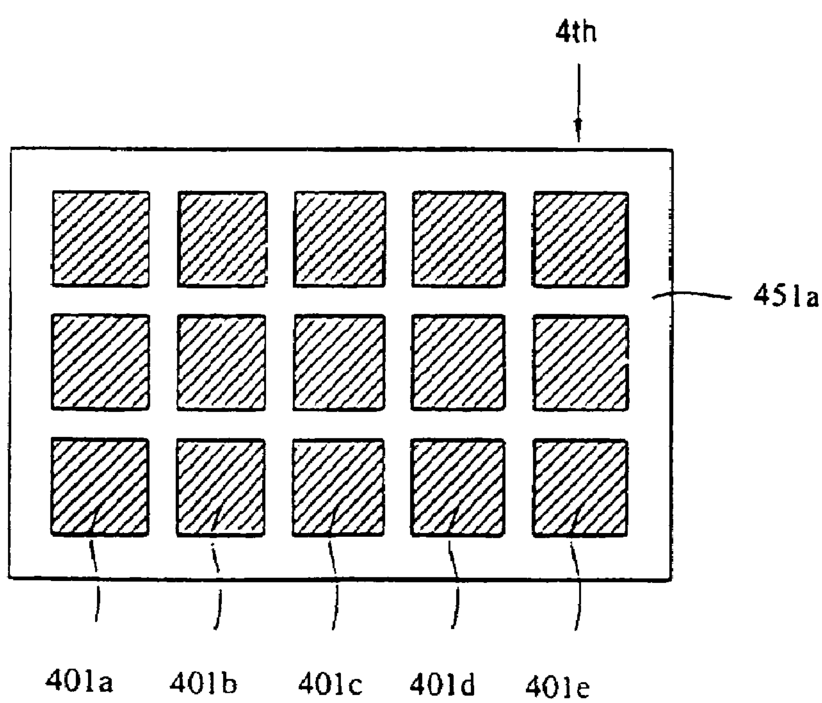

Then, as shown in FIG. 21B, liquid crystal is dropped onto the fifth column (401*e*) using the fourth liquid crystal dispensing device 420*d*. This completes the application of liquid crystal to the first substrate 451*a*. The result is that liquid crystal is dropped from the first~third liquid crystal dispensing devices 420*a* ~420*c* once, while the fourth device 420*d* is used twice.

Figure 22A:
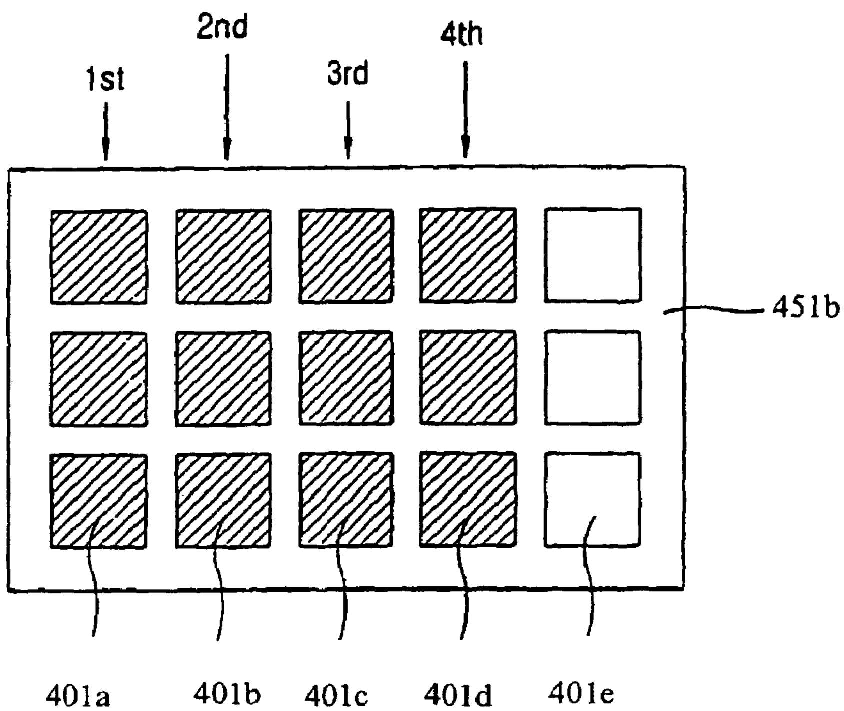
FIGS. 22A and 22B illustrate dropping liquid crystal onto the liquid crystal panel area disposed on a second substrate according to the principles of the present invention.
Figure 22B:
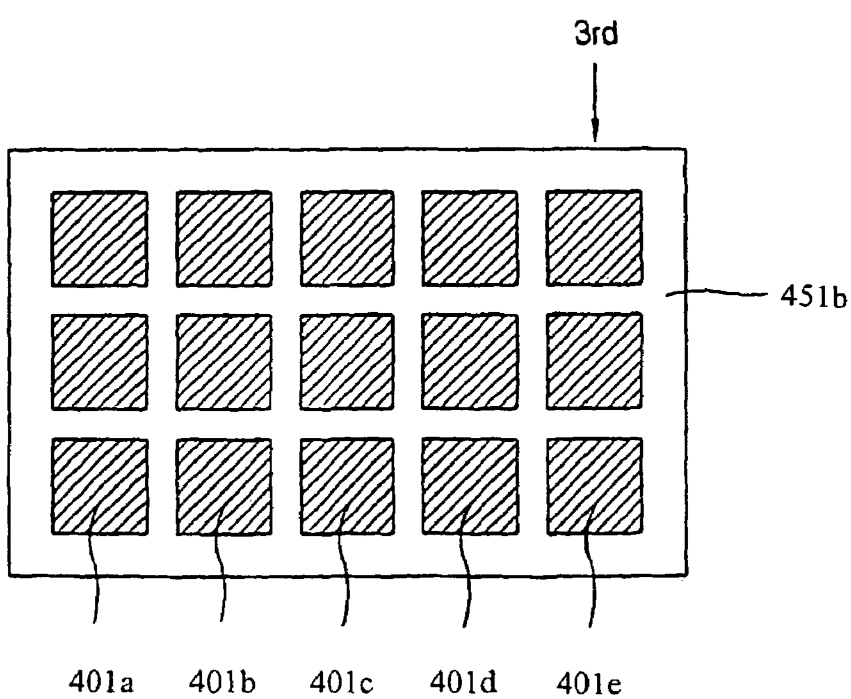

Then, as shown in FIG. 22A, liquid crystal is dropped onto the first~fourth columns 401*a*~401*d* of a second substrate 451*b* by the four liquid crystal dispensing devices 420*a*~420*d*. Liquid crystal is not dropped onto the fifth column 401*e*. Then, as shown in FIG. 22B, liquid crystal is dropped onto the fifth column 401*e* using the third liquid crystal dispensing device 420*c*. Thus, the first, second, and fourth liquid crystal dispensing devices 420*a*, 420*b*, and 420*d* are used once, and the third liquid crystal dispensing device 420*d* is used twice. Therefore, overall, the first and the second liquid crystal dispensing devices 420*a* and 420*b* have been used twice, while the third and fourth liquid crystal dispensing devices 420*c* and 420*d* have been used three times.

Figure 23A:
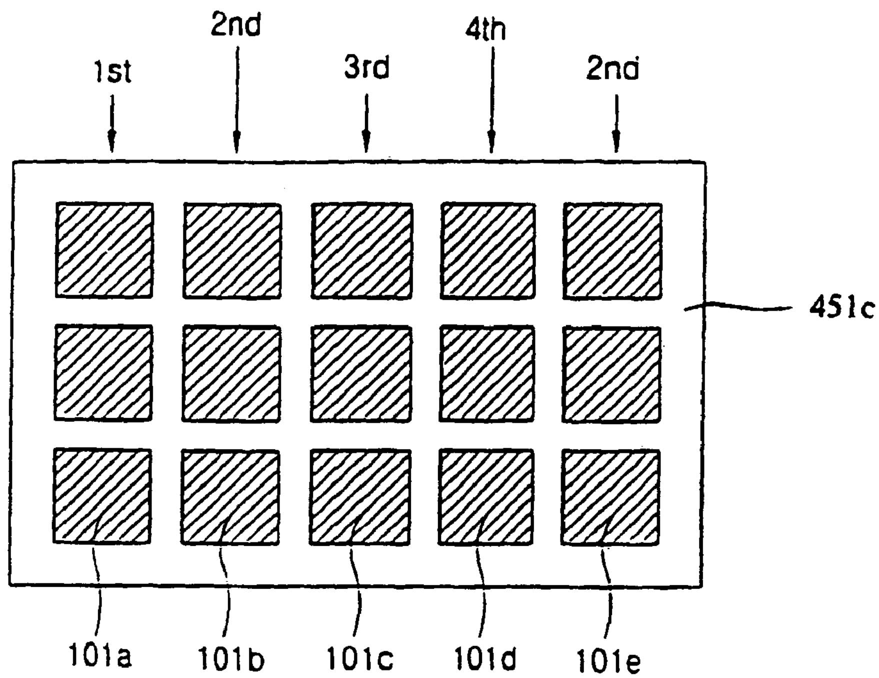
FIGS. 23A and 23B illustrate dropping liquid crystal onto the liquid crystal panel areas disposed on a third and a fourth substrate according to the principles of the present invention.

Then, as shown in FIG. 23A, liquid crystal is simultaneously dropped onto the second~fifth columns 401*b*~401*e* of a third substrate 451*c* using the four liquid crystal dispensing devices 420*a*~420*d*. Then, liquid crystal is dropped onto the liquid crystal panel area of the first column 101*a* using the second liquid crystal dispensing device 420*b*. Thus, the first, third and fourth liquid crystal dispensing devices 420*a*, 420*c*, and 420*d* are used once, and the second liquid crystal dispensing device 420*b* is used twice. Therefore, overall, the first liquid crystal dispensing devices 420*a* has been used three times, while the second, third and fourth liquid crystal dispensing devices 420*c* and 420*d* have been used four times.

Figure 23B:
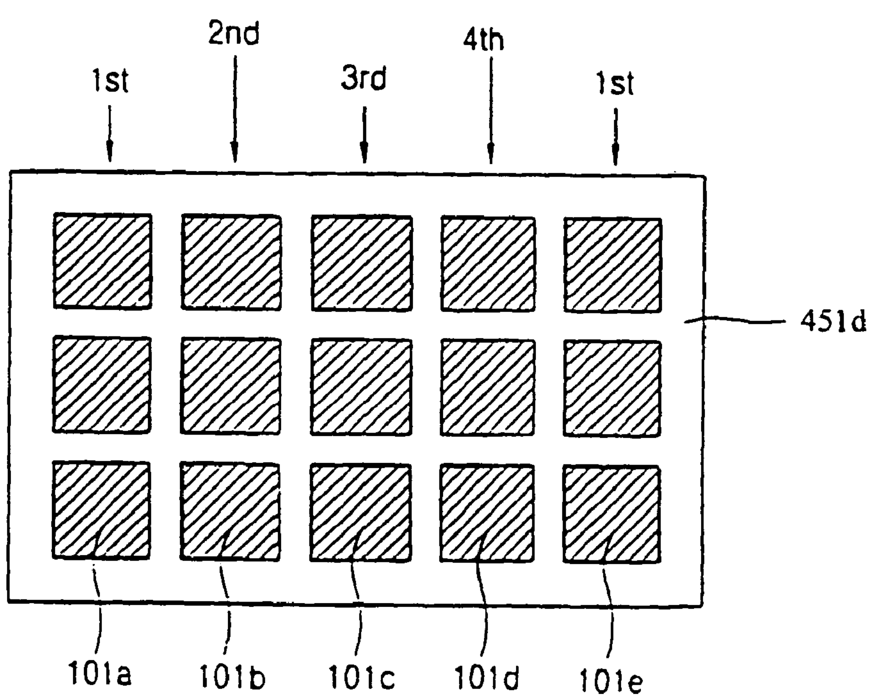

Next, as shown in FIG. 23B, liquid crystal is simultaneously dropped onto the second~fifth columns 401*b*~401*e* of a fourth substrate 451*d* using the four liquid crystal dispensing devices 420*a*~420*d*. In addition, liquid crystal is dropped onto the first column 401*a* using the first liquid crystal dispensing device 420*a*.

Therefore, overall, the all of the liquid crystal dispensing devices 420*a* have been used five times. Consequently, the remaining amount of liquid crystal in each liquid crystal container 424 is the same. Therefore, the cleaning and refilling of the liquid crystal containers can be efficiently performed at one time.

The foregoing has described a particular sequence of using four liquid crystal dispensing devices 420*a*~420*d* to apply liquid crystal to five columns of liquid crystal panel areas 401*a* ~401*e*. However, it is not necessary to follow the specific sequence described above. For example, liquid crystal could be dropped on the first~fourth columns of every substrate, and then the fifth column could have liquid crystal applied by each of the four liquid crystal dispensing devices 420*a*~420*d*. Furthermore, there might be six columns and four liquid crystal dispensing devices 420*a*~420*d*. In that case, liquid crystal could be applied to four columns of a first substrate using the four liquid crystal dispensing devices, and then liquid crystal could be applied to the two remaining columns using the last two of the four liquid crystal dispensing devices. Then, liquid crystal could be applied to four columns of a second substrate using the four liquid crystal dispensing devices, and then liquid crystal could be applied to the two remaining columns using the first two of the four liquid crystal dispensing devices.

As described above, according to the present invention, liquid crystal in N liquid crystal dispensing devices is, over time, evenly dispensed onto substrates having M liquid crystal panel columns, where M>N.

Figure 45:
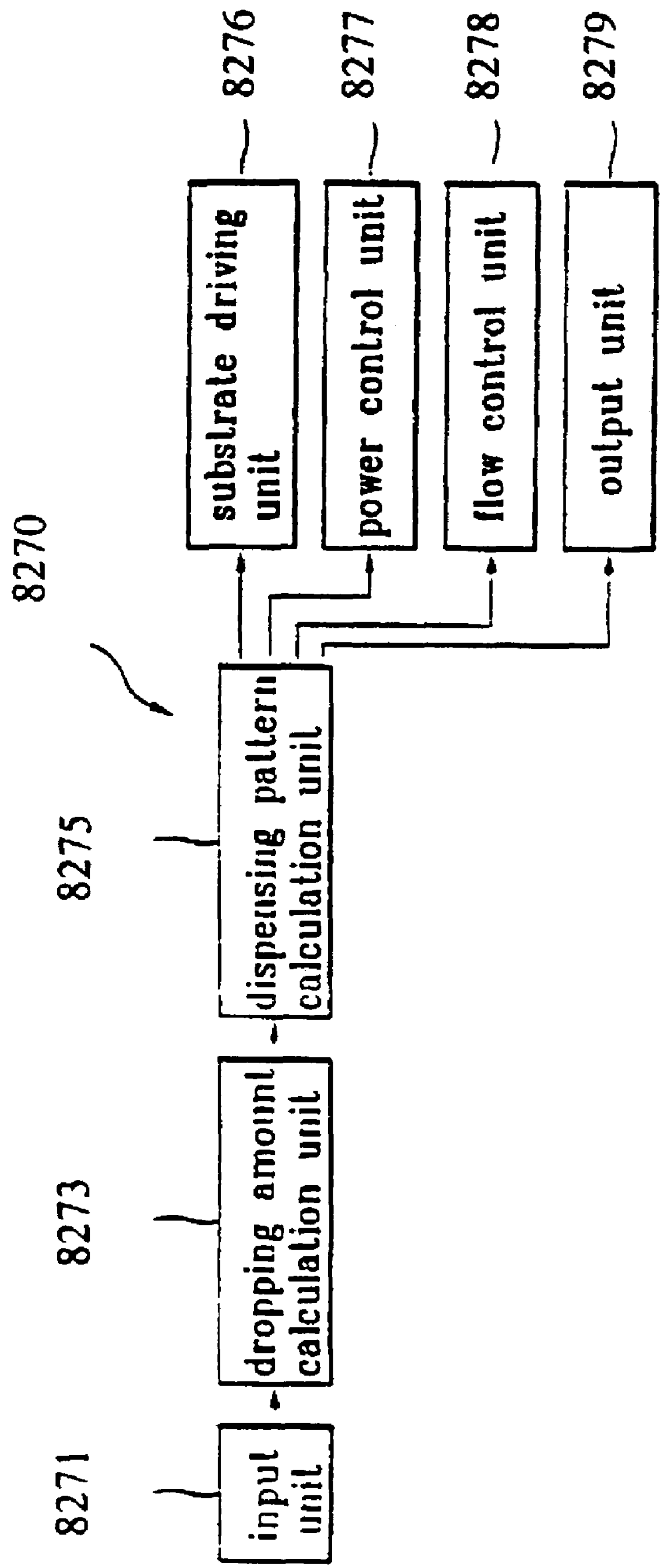
FIG. 45 illustrates an apparatus for dispensing liquid crystal onto a substrate according to the present invention.

As shown in FIG. 45, a main control unit 8270, includes an input unit 8271 inputting various kinds of information; a dropping amount calculation unit 8273 that calculates a dropping amount of liquid crystal to be applied or dropped on an entire substrate based on the input data; a dispensing pattern calculation unit 8275 that calculates a dispensing pattern of the liquid crystal based on the dropping amount of the liquid crystal calculated by the dropping amount calculation unit 8273; a substrate driving unit 8276 that drives the substrate based on the dispensing pattern calculated by the dispensing pattern calculation unit 8275; a power control unit 8277 that controls the power supply unit 8260 so as to supply the solenoid coil 8230 with power corresponding to the dropping amount of the liquid crystal to be dropped based on the dispensing pattern calculated by the dispensing pattern calculation unit 8275; a flow control unit 8278 that controls the flow control valve 8261 so as to supply the liquid crystal container 8224 with a gas in an amount corresponding to the dropping amount of the liquid crystal to be dropped from the gas supply unit 8262 based on the dispensing pattern calculated by the dispensing pattern calculation unit 8275; and an output unit 8279 that outputs the input data, the calculated dropping amount, the calculated dispensing pattern, the present status of liquid crystal dropping, and the like.

Figure 46:
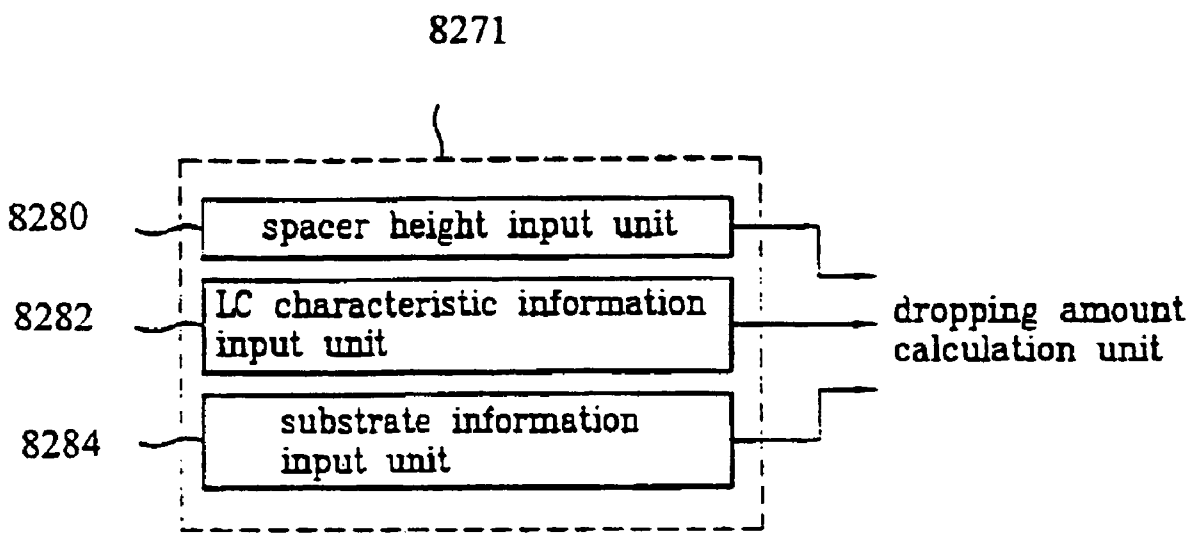
FIG. 46 illustrates functional components of an input unit illustrated in the apparatus of FIG. 45.

The input unit 8271, as shown in FIG. 46, includes a spacer height input unit 8280 that inputs a height of a spacer formed at a substrate, a liquid crystal characteristic information input unit 8282 that inputs information about characteristics of the liquid crystal such as viscosity, and a substrate information input unit 8284 that inputs a size of a liquid crystal display panel to be fabricated and various kinds of information about the substrate.

The amount of liquid crystal to be dispensed or dropped is determined by the height of a column spacer formed on the color filter substrate. However, when the height of the column spacer actually formed on a color filter substrate is different from an optimal or calculated cell gap, the amount of the liquid crystal actually filling the gap between the substrates of the fabricated liquid crystal display panel would be different from an optimal amount of liquid crystal because of the difference between generated the optimal cell gap and the height of the actually formed column spacer. If the dropping amount of the liquid crystal, which is actually dropped is smaller than the optimal dropping amount, for instance, a problem will arise in the level of black in the normally black mode or the level of white in the normally white mode.

Moreover, if the dropping amount of the liquid crystal, which is actually dropped is greater than the optimal dropping amount, a gravity failure is brought about when a liquid crystal display panel is fabricated. The gravity failure is generated because the volume of the liquid crystal layer formed inside the liquid crystal display panel increases with temperature. Thus, the cell gap of the liquid crystal display panel is expanded with the increase in liquid crystal volume. In addition, the larger volume of the liquid crystal moves downward due to gravity. Hence, the cell gap of the liquid crystal display panel becomes non-uniform, thereby degrading quality of the liquid crystal display.

In order to overcome such problems, the main control unit 8270 adjusts the dropping amount of the liquid crystal to be dropped onto the substrate in accordance with the height of the spacer formed on the substrate as well as calculates the dropping amount of the liquid crystal. In other words, the dropping amount of the liquid crystal currently calculated is compared to that calculated based on the height of the spacer, and then liquid crystal amounting to the corresponding difference is added or subtracted to be dropped on the substrate.

The height of the spacer is inputted in a spacer forming process of a TFT or color filter process. Namely, in the spacer forming process, the height of the spacer is measured and the measurement is provided to the dropping amount calculation unit 8273 through the spacer height input unit 8280. A spacer forming line is separated from a liquid crystal dropping line. Hence, the measured height of the spacer is inputted to the spacer height input unit 8280 through wire or wireless.

The liquid crystal characteristic information input unit 8282 or the substrate information input unit 8284 inputs data through a general operating mans such as a keyboard, mouse, touch panel, or the like, in which substrate information such as a size of a liquid crystal display panel to be fabricated, a substrate size, and the number of panels formed on the substrate and liquid crystal characteristic information are inputted by a user. The output unit 8279 informs the user of various information, and includes various outputting devices such as a display including cathode ray tube (CRT) and LCD and a printer.

The dropping amount calculation unit 8273 calculates a total dropping amount of the liquid crystal, which will be dropped onto an entire substrate having a plurality of liquid crystal display panels formed thereon as well as the dropping amount of the liquid crystal, which will be dropped onto each of the liquid crystal display panels of the substrate and provides the dispensing pattern calculation unit 8275 with the calculated dropping amounts.

Figure 47:
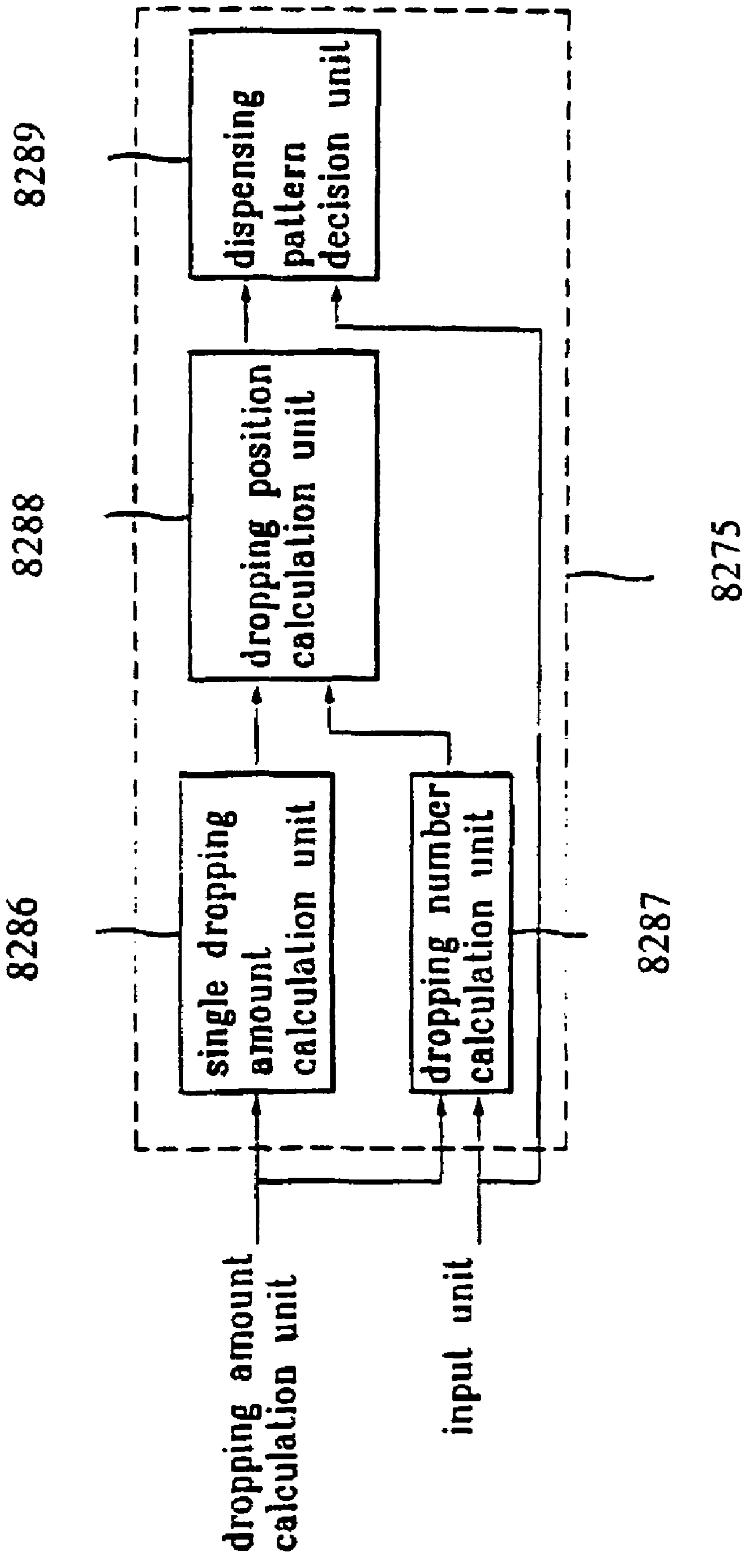
FIG. 47 illustrates functional components of a dispensing pattern calculation unit illustrated in the apparatus of FIG. 45.

The dispensing pattern calculation unit 8275, as shown in FIG. 47, includes a single dropping amount calculation unit 8286 that calculates a single liquid crystal drop amount of liquid crystal dropped on a specific position on a substrate based on the dropping amount calculated in the dropping amount calculation unit 8273; a dropping number calculation unit 8287 that calculates the number of liquid crystal drops which will be dropped on the substrate, a drop position calculation unit 8288 that calculates positions of liquid crystal drops on the substrate based on the single liquid crystal drop amount calculated in the single dropping amount calculation unit 8286 and the dropping number calculated in the dropping number calculation unit 8287; and a dispensing pattern decision unit 8289 that determines the dispensing pattern of the liquid crystal drops in accordance with the calculated dropping position and the type of liquid crystal panel to be formed.

The single dropping amount calculation unit 8286 calculates a single dropping amount of liquid crystal based on the calculated total dropping amount. In other words, the single dropping amount has a close relation to the total dropping amount as well as the dropping number.

The dropping number calculation unit 8287 calculates the number of drops to be dropped onto one liquid crystal panel based on an input of the total dropping amount, an area of the panel, and characteristics of the liquid crystal and the substrate.

In a general dropping dispensing method, the liquid crystal dropped on the substrate spreads over the substrate by the pressure applied thereto when upper and lower substrates are bonded to each other. Such a spread of the liquid crystal depends on liquid crystal characteristics such as viscosity of liquid crystal and structures of the substrate on which the liquid crystal will be dropped such as arrangement or disposition of pattern and the like. Hence, an area over which a single drop of liquid crystal spreads is determined by the above characteristics. The number of drops of liquid crystal is calculated considering such an area. Moreover, the number of drops to be dropped on the entire substrate is calculated in accordance with the number of drops for each unit panel to be formed on the entire substrate.

The dropping position calculation unit 8288 calculates a dropping position of liquid crystal based on the number of drops of liquid crystal dropped on the panel, the amount of liquid crystal in a single drop, pitch between the dropped liquid crystal drops, and a spreading characteristic of the liquid crystal. Specifically, the spreading characteristic of liquid crystal is important in judging whether the liquid crystal will reach the sealant on bonded substrates. Hence, the dropping position calculation unit 8288 considers the spreading characteristic of liquid crystal in calculating the dropping position to prevent the liquid crystal from contacting the sealant before the sealant is hardened. Generally, factors influencing the spreading characteristic of liquid crystal include a shape of panel, the pattern of devices, such as transistors and signal lines, formed on the panel, and rubbing direction (alignment direction) of an alignment layer of the panel. Thus, the dropping position calculation unit 8288 considers such factors so as to calculate the dropping position of liquid crystal.

As a liquid crystal display panel is generally rectangular, the distance to a corner of the panel is greater than a distance to any one side of the panel. As a result, the distance the liquid crystal has to travel to the corner is greater than the distance the liquid crystal has to travel to the sides of the panel. In addition, step differences (e.g., device heights) occur because of device patterns on the substrates. For example, the gate line crossing with data lines on a first substrate (TFT substrate) of a liquid crystal display panel and a color filter layer arranged along a data line direction on a second substrate (color filter layer). These step differences interrupt the spreading of the liquid crystal such the liquid crystal spreading speed in a device pattern direction is greater than in a direction perpendicular to the device pattern direction. The liquid crystal spreading speed of the first substrate on which the data and gate lines cross with each other is not affected greatly. However, the color filter layer on the color filter substrate affects the spreading speed of liquid crystal.

Another factor having influence on the dropping position of liquid crystal is alignment for aligning adjacent liquid crystal molecules in a specific direction by giving an alignment regulating force or a surface fixing force to an alignment layer. The alignment is provided by rubbing the alignment layer in a specific direction using a soft cloth or by photolithography. Minute grooves aligned in a specific (rubbing) direction are formed on the alignment layer by such a rubbing, and the liquid crystal molecules are aligned by the grooves in a specific direction. Because the spreading speed of the liquid crystal in an alignment direction is greater than that in another direction, the dropping position of liquid crystal is calculated by considering such a fact.

As mentioned in the above description, the dropping position of liquid crystal depends on a shape of a panel and pattern and alignment directions of a device formed on a liquid crystal display panel.

Figure 53A:
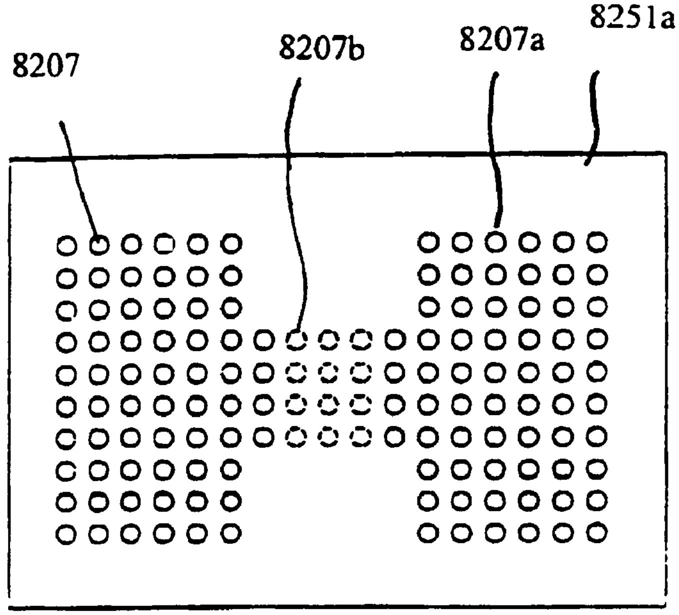
FIGS. 53A to 53F illustrate exemplary patterns for dropping liquid crystal on a substrate according to the present invention.
Figure 53B:
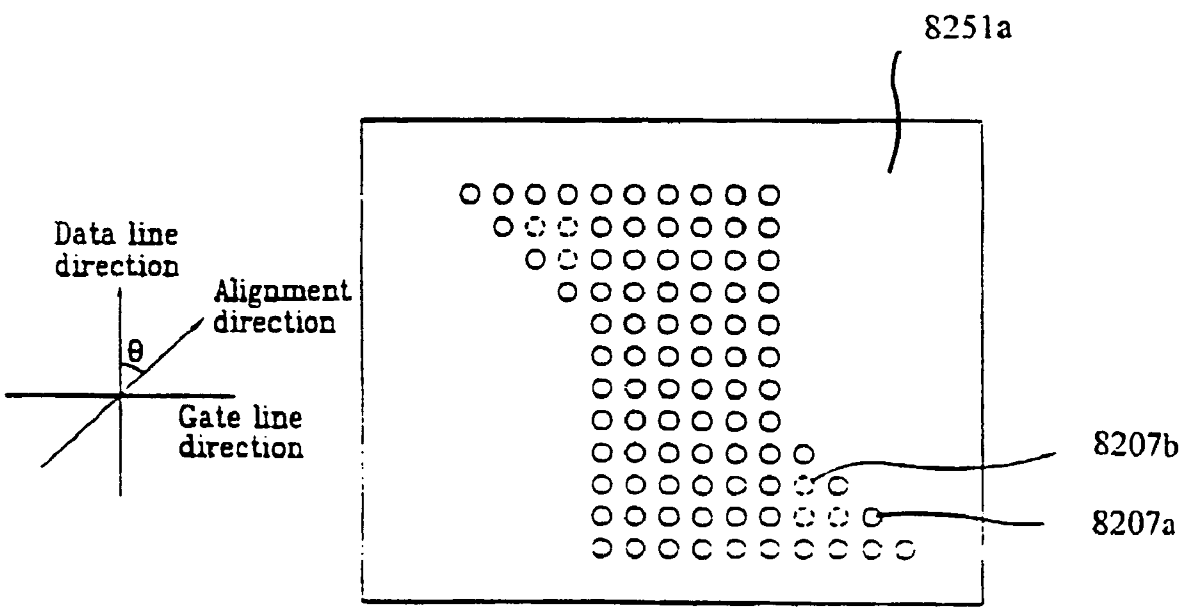
Figure 53C:
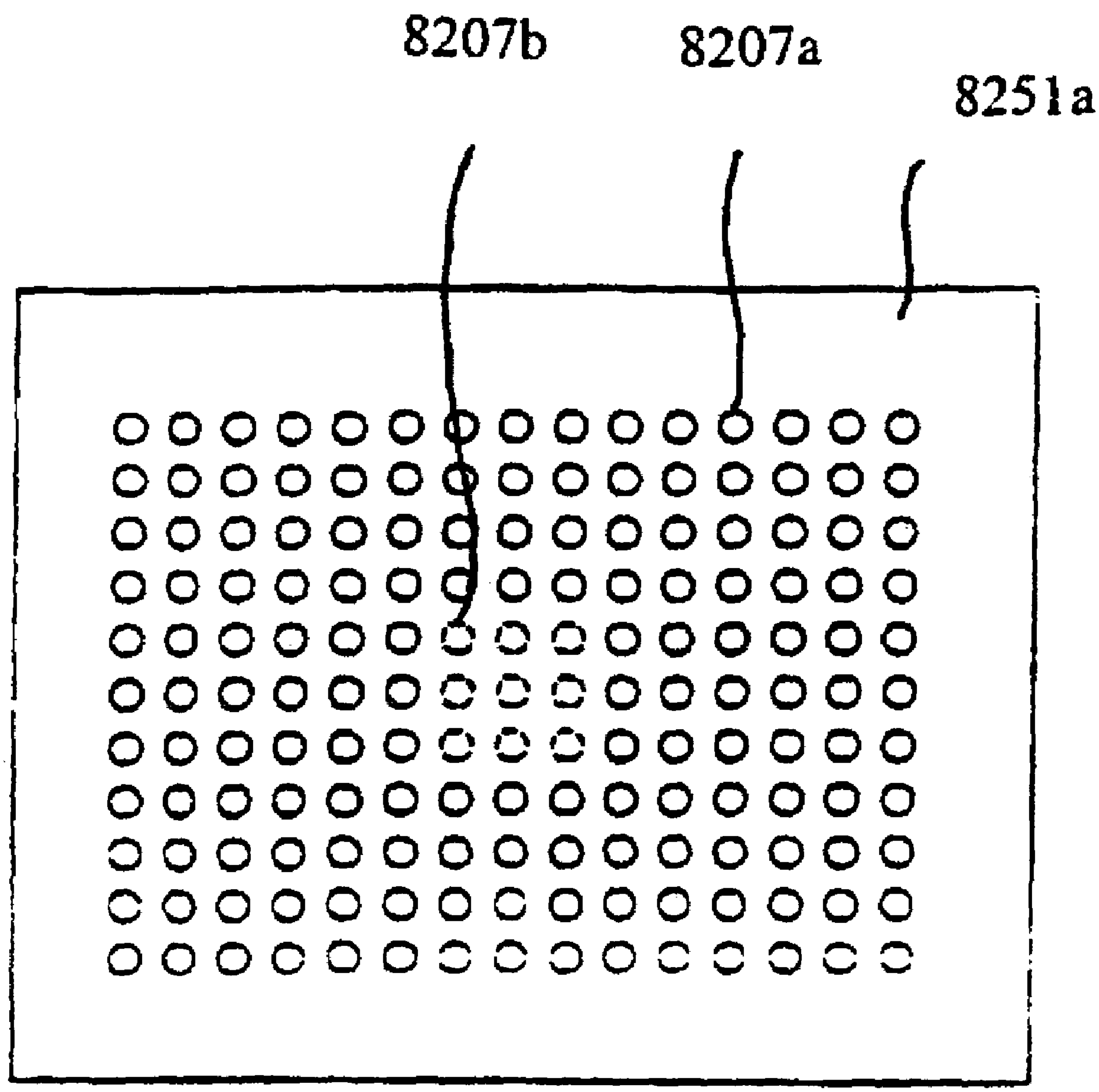

FIG. 53A to 53C illustrate layouts of LC dropping patterns determined in accordance with the dropping positions of liquid crystal calculated by the above factors. FIG. 53A illustrates a dropping pattern of liquid crystal of a TN (twisted nematic) mode liquid crystal display panel. FIG. 53B illustrates a dropping pattern of liquid crystal of an IPS (in plane switching) mode liquid crystal display panel. FIG. 53C illustrates a dropping pattern of liquid crystal of a VA (vertical alignment) mode liquid crystal display panel.

In case of a TN mode, the alignment directions of alignment layers formed on first and second substrates are perpendicular to each other. As a result when bonding the substrates, the alignment directions of the alignment layers have a minimal influence on the overall spreading rate of the liquid crystal between the substrates. The factors that affect the spreading rate of the liquid crystal are the shape of the panel and the location of devices formed on the panel. Referring to the figures, because of the rectangular shape of the panel, the distance the liquid crystal has to travel to the any corner of the panel is greater than the distance the liquid crystal has to travel to any side of the panel. Therefore, the liquid crystal 8207 should be applied to substantially cover regions near the corners of the rectangular panel 8251*a*. In other words, the liquid crystal as applied need not substantially cover the regions near the side of the panel 8251*a*, as liquid crystal will fill these regions during spreading. In addition, due to the patterns formed on the substrate (including patterns on color filter and TFT substrates), the rate at which the liquid crystal spreads in a gate line direction is slower than the rate at which the liquid crystal spreads in the data line direction. Therefore, the liquid crystal should be applied to more substantially cover the area in the gate line direction versus the area in the data line direction.

An optimal liquid crystal dropping (dispensing) pattern considering the above factors is a dumbbell shape, as shown in FIG. 53A. For example, such dispensing pattern has a predetermined width in a gate line direction in a central area of the panel 8251*a* and includes rectangular patterns on each side of the central area of the panel 8251*a*.

When liquid crystal is dropped to have the dumbbell shape, the drops of liquid crystal should be dropped at a uniform interval (dispensing or dropping pitch) with respect to each other. This is because the dropped liquid crystal on the substrate spreads a predetermined distance from its dropping point so as to come into contact with adjacent liquid crystal drops before the substrate bonding. If the liquid crystal does not contact the adjacent liquid crystal drops before the substrates are bonded, traces of liquid crystal will remain on the substrate. These traces may cause the failure of a liquid crystal display panel.

The dropping pitch of liquid crystal is not fixed, but can be varied in accordance with the amount of liquid crystal in a single drop and the spreading speed of liquid crystal. The dropping pitch of liquid crystal is about 9 to about 17 mm in a TN or VA mode liquid crystal display panel or about 8 to about 13 mm in an IPS mode liquid crystal display panel. Viscosity of the liquid crystal is about 10 to about 40 cps.

In IPS mode the alignment direction is different from both the gate line direction and the data line direction by an angle θ (see FIG. 53B). The angle θ as measured from the data line is about 10~20°. In other words, in IPS mode, the spread of liquid crystal depends greatly on the alignment directions on the alignment layers on respective substrates, as well as the shape of liquid crystal display panel and the configuration of the device patterns. Hence, it is preferable that, as shown in FIG. 53B, a lightning-like dispensing pattern is formed. Namely, a dispensing pattern having a central area and tail areas in a direction opposite to an alignment direction. In this case, the term 'lightning-like' is used for convenience of explanation and is not intended to limit a shape of the dispensing pattern of the present invention. Moreover, the 'tail area' means a portion of the dispensing pattern extending in a direction opposite to the alignment direction (e.g., substantially perpendicular to the alignment direction). Again, the term 'tail area' is used for convenience of explanation and is not intended to limit the specific shape of the dispensing pattern of the present invention.

In a vertical alignment mode the formation of an alignment direction is not necessary. Thus, the liquid crystal can be dispensed to have a generally rectangular shape at a central portion of a substrate 8251*a* or a dumbbell shape as shown in FIG. 53A. Moreover, an alignment direction may be determined according to distortion of an electric field caused by a protrusion, rib, or frame formed on a first or second substrate 8251 or 8252, or a slit formed at a common or pixel electrode, or a pattern of an auxiliary electrode formed on the first substrate 8251 or second substrate 8252. If photo-alignment is utilized instead of rubbing of an alignment layer, the alignment direction is determined by the light irradiating direction.

In the dispensing device according to the present invention, as mentioned in the above description, liquid crystal is automatically dropped on the substrate after a user calculates the dispensing pattern of liquid crystal based on various data.

The present invention considers the factors having influence on the extent that the liquid crystal drops spread. These factors include substrate shape, rubbing direction of an alignment layer, and the patterns formed on the substrate. The above-explained factors affect the dispensing of the liquid crystal.

The substrate shape, rubbing direction, and patterns formed on the substrate should be considered when calculating the dispensing pattern to utilize. When the alignment direction is formed by a method other than rubbing, the factors having influence on the liquid crystal dispensing pattern may vary. For instance, when the alignment direction is formed utilizing a photo-alignment method, the photo-irradiation direction or the polarization direction of irradiated light may be considered as being a factor having influence on the dispensing pattern.

The following explanation is for embodiments according to the present invention, to which the above factors are substantially applied so as to represent dispensing patterns of liquid crystal displays of various modes.

Figure 53D:
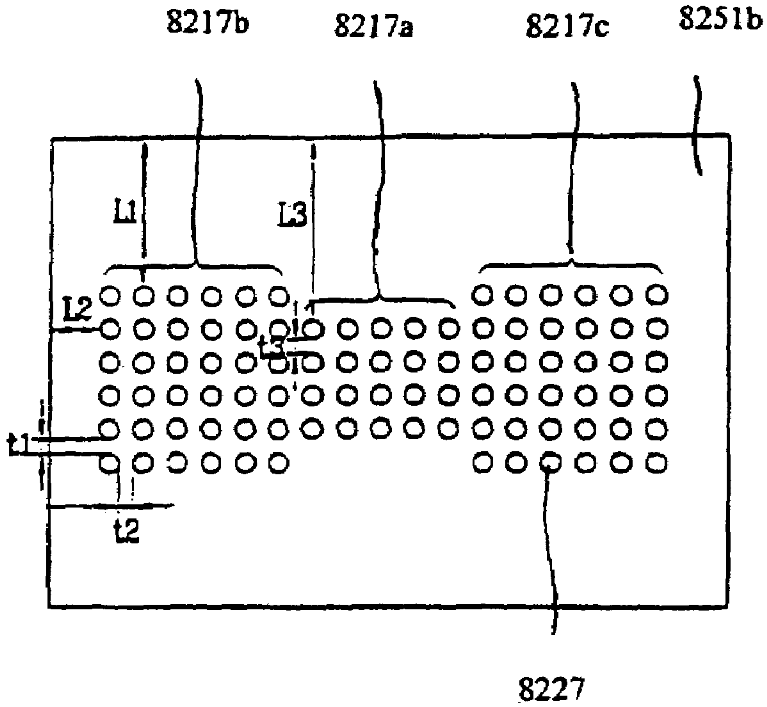
Figure 53E:
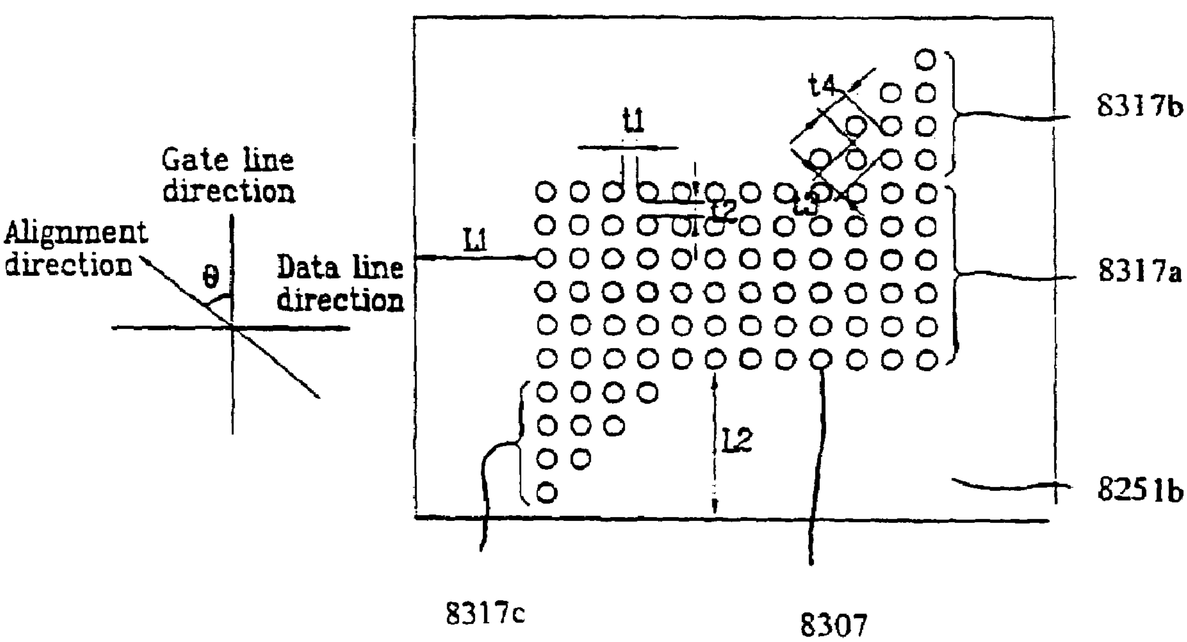
Figure 53F:
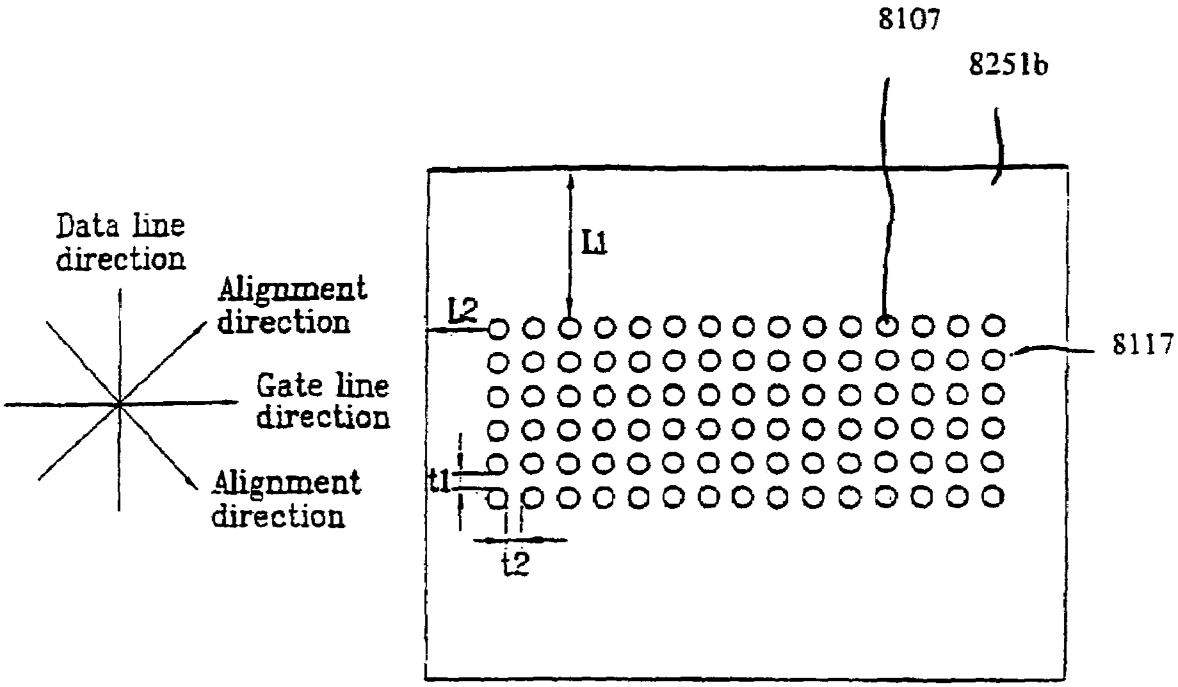

FIG. 53F generally illustrates a dispensing pattern 8117 of a TN mode liquid crystal display (LCD). In the case of a TN mode LCD, alignment directions of alignment layers formed on the first and second substrates are perpendicular to each other. As a result of this orientation the effect that the alignment direction have when bonding the substrates is minimized. Rather, the factors that significantly affect the spreading rate of the liquid crystal include the shape of the panel and the location of devices formed on the panel.

Device patterns on the substrate form step differences. For example, a color filter layer arranged along the data line creates step differences in the gate line direction. Accordingly, the color filter affects the spreading rate of the liquid crystal such that the spreading rate of liquid crystal is greater in the data line direction than in the gate line direction.

As liquid crystal panels are generally rectangular, the distance from the center to any corner of the panel is greater than the distance to any one side of the panel. Accordingly, rectangular dispensing pattern 117 may be arranged on the panels. The rectangular dispensing pattern still may not be adequate, however, because the spreading rate of the liquid crystal in the data line direction is greater than in the data line direction.

Therefore, as illustrated in FIG. 53F, the dimensions of the dispensing pattern 8117 in the data line direction may be made smaller than the dimensions of the dispensing pattern 8117 in the gate line direction in order to compensate for the aforementioned anisotropic spreading rate.

In one aspect of the present invention, the dispensing pattern 8117 may be formed such that an interval L1 between the dispensing pattern 8117 in the data line direction and a side of the liquid crystal panel 8105 is greater than the other interval L2 between the dispensing pattern in the gate line direction and the side of the liquid crystal panel 8105. That is, the distance L1 should be greater than the distance L2 (L1>L2).

The dispensing pitch is an interval between adjacent liquid crystal drops 8107 of the dispensing pattern 8117 and influences the spreading rate of the liquid crystal. Generally the liquid crystal drops 8107, arranged within the dispensing pattern 8117, spread isotropically and merge into adjacent liquid crystal drops. As a result, the liquid crystal drops 8107 merge together so as to cover the substrate prior to the bonding of the substrates. However, dropping traces occur if the liquid crystal drops arranged on the substrate do not come into contact with adjacent liquid crystal drops prior to the bonding of the substrates. Dropping traces are a significant reason for the degradation of the liquid crystal panels.

An important factor in preventing the degradation of the liquid crystal panel as well as uniformly distributing the liquid crystal drops is the dispensing pitch. The dispensing pitch of liquid crystal drops depends on the viscosity of the liquid crystal drops and more specifically, on the single dropping amount of liquid crystal drops arranged on the substrate.

For example, in the TN mode liquid crystal display of the present invention, the dispensing pitch is preferably set up as about 9-17 mm. As explained in detail above, the spreading rate of the liquid crystal drops is greater in the data line direction than in the gate line direction. Accordingly, the dispensing pitch t1 in the data line direction should be set up to be greater than t2 in the gate line direction (t1>t2).

In addition, the spreading of the liquid crystal drops 8107 arranged on the substrate may be influenced by the application of pressure to the substrates. The liquid crystal drops arranged on the substrate are spread across the substrate by pressure generated from bonding the upper and lower substrates together. Ideally when bonding the substrates pressure may be uniformly applied to the substrates. However, typically the pressure applied to the central area of the substrate is greater than the pressure applied to the circumferential area of the substrate. Therefore, the liquid crystal drops are arranged in a rectangular dispensing pattern, as shown in FIG. 53F. The liquid crystal reaches the sealant before the liquid crystal drops is hardened because the central portion of the rectangular shape spreads faster in the data line direction (by mutual effect of the speed increasing pattern and pressure).

Although the effect of the pressure differentials may be negligible, such problems should be overcome to remove the degradation of the liquid crystal display. In order to overcome these pressure problems the dispensing pattern of liquid crystal drops as shown in FIG. 53D is utilized.

Referring to the figure, the dispensing pattern 217 is formed so that a middle portion of the rectangular dispensing pattern is removed in part as shown in the data line direction. In other words, the width of the middle area (width along the data line direction) is smaller that the rest. Forming the dispensing pattern 8217 this way effectively prevents the degradation of liquid crystal display.

As shown in the figure, the dispensing pattern 8217 has a "dumbbell shape." The term "dumbbell shape" is used for convenience of explanation, and is not intended to limit the shape of the dispensing pattern in the present invention. The term "dumbbell-shaped dispensing pattern" means a shape formed by removing a partial middle portion of the dispensing pattern in the data line direction of an initial rectangular dispensing pattern, that is having a narrow width in the data line direction.

In the middle area of the dumbbell-shaped dispensing pattern 8217 is a first dispensing pattern 8217*a*, which has a width narrower in the data line direction than the widths of the second or third dispensing patterns 8217*b* or 8217*c*, respectively. The distance L3 between the first dispensing pattern 8217*a* and a side of a liquid crystal panel 8205 is greater than distance L1 of the second or third dispensing pattern 8217*b* or 8217*c* (L3>L1).

The dispensing pitches t1, t2, and t3 of the dumbbell-shaped dispensing pattern 8217 are formed such that dispensing pitch t1 of the second or third dispensing pattern 8217*b* or 8217*c* in the data line direction is longer than dispensing pitch t2 in the gate line direction and dispensing pitch t3 of the first dispensing pattern 8217*a* in the data line direction is longer than that dispensing pitch t1 of the second or third dispensing pattern 8217*b* or 8217*c*.

The rectangular dispensing pattern having a narrow width in the data line direction (dumbbell-shaped dispensing pattern) is utilized for a TN mode liquid crystal display. Thus, enabling prompt and uniform distribution of liquid crystal drops across the substrate.

As explained in detail above for TN mode liquid crystal displays the alignment directions have minimal influence on the overall spreading of the liquid crystal. Accordingly, the dispensing patterns are formed ignoring the affect of the alignment directions. Similarly, the same techniques can be utilized in the VA mode liquid crystal displays. In general VA mode liquid crystal display have no specific alignment direction. The dispensing pattern of the VA mode liquid crystal display can be formed similar to the dispensing pattern used in the TN mode liquid crystal display. That is, a rectangular or dumbbell-shaped dispensing pattern as shown in FIG. 53D or FIG. 53F can be utilized. Therefore, the corresponding explanation of the dispensing pattern of the VA mode liquid crystal display is skipped.

FIG. 53E generally illustrates a dispensing pattern 8317 of an IPS (in-plane switching) mode liquid crystal display. The alignment direction of an alignment layer in an IPS mode liquid crystal display is formed in one direction. As shown in the figure, the alignment direction is formed at an angle θ measured counter-clockwise from the gate line direction. The dispensing pattern 8317 in an IPS mode liquid crystal display depends on the shape of a liquid crystal panel, pattern shape, and the alignment direction.

The dispensing pattern 8317 of the IPS mode liquid crystal can be divided into parts. A first dispensing pattern 8317*a* in the middle of the dispensing pattern 8317 extends in along the data line direction. Because of the various patterns formed on the substrate the spreading rate of liquid crystal drops in the gate line direction is faster than that the spreading rate in the data line direction. Accordingly, the distance L1 between the dispensing pattern 8317*a* and a side of a liquid crystal panel is greater than the distance L2 between the dispensing pattern 8317*a* and the side of the liquid crystal panel (L1>L2).

The spread speed of liquid crystal drops in the data line direction in the TN or VA mode liquid crystal display shown in FIG. 53D or FIG. 53F is faster than that in the gate line direction. Yet, the spread speed of liquid crystal drops in the gate line direction in the IPS mode liquid crystal display is faster. The corresponding reason is explained as follows.

In case of a TN or VA mode liquid crystal display, a color filter layer is arranged along a data line direction and a step difference is formed along a gate line direction. Yet, in an IPS mode liquid crystal display, a color filter layer is arranged along a gate line direction and a step difference is formed along a data line direction. Hence, the dropped liquid crystal drops spread faster along the gate line direction in the IPS mode liquid crystal display. The arrangement of the color filter layer according to the mode is for using effectively a glass plate (i.e. substrate) on which a plurality of liquid crystal panels are formed. In other words, the color filter layer is formed along the gate or data line direction in accordance with the mode of the liquid crystal display in a method of fabricating a liquid crystal display using liquid crystal dropping. It is a matter of course that the arrangement direction of the color filter layer is not limited to a specific direction. More important thing is not whether a direction of a dispensing pattern established in the IPS mode liquid crystal display is an x or y direction but that the dispensing pattern extends in a direction having a slow flow speed of liquid crystal drops (or a direction of step difference of the color filter layer).

Therefore, the first dispensing pattern 8317*a* extends in the data line direction in the IPS mode liquid crystal display, which is just one of examples for an extending direction of the dispensing pattern, Instead, the first dispensing pattern 8317 can extend in any direction having a slow flow speed of liquid crystal drops.

Besides, the second dispensing patterns 8317*b* and 8317*c* extend from both ends of the first dispensing pattern 8317 in directions opposite to each other, respectively. The extending directions of the second dispensing patterns 8317*b* and 8317*c* are vertical to the alignment direction. Each of the spread speeds of liquid crystal drops in these directions is slower than the spread speed in the alignment direction, which is compensated by the second dispensing patterns 8317*b* and 8317*c*.

The factors having influence on the spread speed of liquid crystal drops in the IPS mode liquid crystal display are the shape of the pattern and the alignment direction. Hence, the two factors should be considered so as to establish the dispensing pitches.

Namely, a pitch t1 in the data line direction, a pitch t2 in the gate line direction, a pitch t3 in the alignment direction, and a pitch t4 in the direction vertical to the alignment direction should be established. Generally, the pitch of the dispensing pattern 8217 of liquid crystal drops of the IPS mode liquid crystal display is about 8-13 mm.

Considering the difference between the spread speeds of liquid crystal drops due to pattern, the pitch t1 in the gate line direction is formed grater than that t2 in the data line direction. Considering the spread speed in the alignment direction, the pitch t3 in the alignment direction should be established to be greater than that t4 in the direction vertical to the alignment direction.

The above-established dispensing pattern of liquid crystal drops has a shape like a lightning facing the data line direction. In other words, the dispensing pattern includes a middle portion on a liquid crystal panel and tail portions in directions opposite to the alignment direction of the alignment layer. In this case, the term "lightning," is used for convenience of explanation, and does not limit the scope of the shape of the dispensing pattern of the present invention.

The substrates are bonded to each other after the liquid crystal drops have been dropped along the above-established dispensing pattern from a liquid crystal dispenser. Therefore, the dropped liquid crystal drops are distributed uniformly on the entire substrate.

The above dispensing pattern is calculated before the liquid crystal drops are dropped. A nozzle is moved along the calculated dispensing pattern so as to drop the liquid crystal drops. The dispensing pattern of liquid crystal drops may be calculated by the shape of the substrate or the shape of a pattern formed on the substrate. The dispenser, although not shown in the drawing, may be connected to a control system so as to carry out the dropping of the dispensing pattern and liquid crystal drops by the control of the control system.

Various kinds of information about a substrate such as substrate area, number of panels formed on the substrate, dropping amount of liquid crystal drops, shape of substrate or panel, rubbing direction carried out on an alignment layer formed on the substrate, shape of pattern formed on the substrate, and the like are inputted to the control system. The control system calculates a total dropping amount of liquid crystal drops to be dropped on the panel or substrate, a dropping number, a single dropping amount, a dispensing pattern based on the inputted information so as to control a driving means (not shown in the drawing) for driving the liquid crystal dispenser and substrate in order to drop the liquid crystal drops on a predetermined position.

In one aspect of the present invention, the dispensing patterns illustrated in FIGS. 53D-53F may be compensated if the dropping amount in the calculated dispensing pattern is different than a dropping amount in the actual dispensing pattern. By compensating the dispensing pattern, the actual shape of the actual dispensing pattern does not change from the calculated dispensing pattern. Accordingly, compensation dispensing patterns, similar to those discussed with reference to FIGS. 53A to 53C, may be provided in the dispensing patterns illustrated in FIGS. 53D to 53F.

Additionally, while referring to FIGS. 53G to 53S, the position of liquid crystal drops is an important factor that causes fatal failure or degradation of liquid crystal panels. As previously discussed, liquid crystal panels may be fabricated by dropping liquid crystal material on upper or lower substrates and bonding the upper and lower substrates together so as to evenly distribute the liquid crystal material over the substrates. Bonding of the upper and lower substrates may be completed by hardening a sealant after the distribution of the liquid crystal layer. However, as the liquid crystal drops spread between the substrates prior to hardening of the sealant, the liquid crystal contacts the sealant. Deleteriously, the unhardened sealant may break upon contact with the liquid crystal, and thereby degrades the integrity of the liquid crystal panel. If the sealant fails to break, particles in the sealant flow into and contaminate the liquid crystal material, and thereby degrades the integrity of the liquid crystal panel.

Degradation of the liquid crystal panel integrity may also originate from a difference between a calculated dropping position and an actual dropping position or a miscalculated dropping position.

Calculation of liquid crystal dropping positions involves determining the number of liquid crystals dropped on a panel, amount of liquid crystal material in a single liquid crystal drop, a pitch between the liquid crystal drops, and a spreading characteristic of liquid crystal drops. The spreading characteristic of liquid crystal drops may be analyzed to determine whether the liquid crystals will contact the sealant when the substrates are bonded to each other. Accordingly, the liquid crystal dropping positions should be calculated considering the spreading characteristic of liquid crystals in order to prevent the liquid crystals from reaching the sealant before the hardening of the sealant.

If an area on a substrate containing liquid crystal drops is too small, liquid crystal drops may be prevented from contacting the unhardened sealant however an excess amount of time is required to allow the liquid crystal drops to evenly distribute over the entire surface of the substrate. If an area on the substrate containing liquid crystal drops is too large, liquid crystal drops undesirably contact the unhardened sealant. Accordingly, consideration of liquid crystal panel integrity and fabrication time requirements must be made in calculating the positions of liquid crystal drops.

According to the principles of the present invention, the liquid crystal drops are positioned such that they may be distributed (e.g., spread) over about 70% of the entire area of the substrate prior to hardening the sealant and distributed (e.g., spread) over about 30% of the entire area of the substrate upon thermo-hardening of the sealant. The spreading speed of liquid crystal drops may be increased during thermo-hardening of the sealant.

The spreading characteristics of liquid crystal drops relate to the viscosity of liquid crystal material. Accordingly, factors determining the spreading characteristics of liquid crystal drops in liquid crystal displays of various sizes and modes includes substrate geometry (e.g., panel shape, size, etc.), a device pattern formed on the panel, and an alignment direction (e.g., rubbing direction) of an alignment layer on the panel. According to the principles of the present invention, the aforementioned factors may be considered such a pattern of liquid crystal drops may be used to efficiently distribute liquid crystal across the substrate.

Figure 53G:
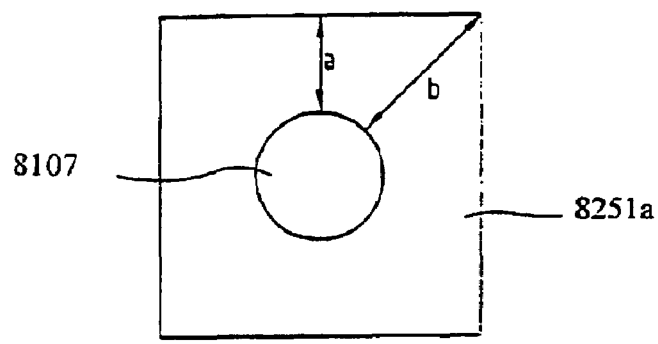
FIGS. 53G-53I illustrate exemplary diagrams for explaining a shape of a liquid crystal panel.
Figure 53H:
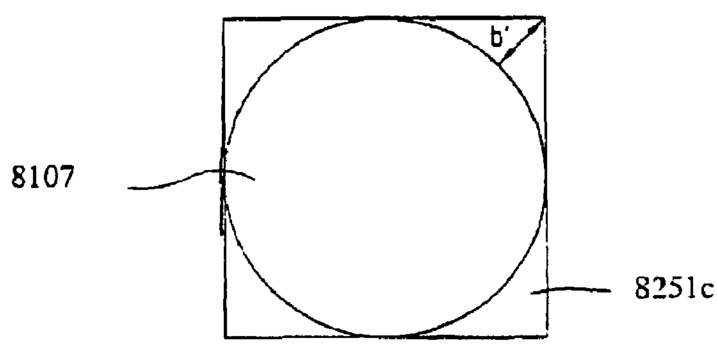
Figure 53I:
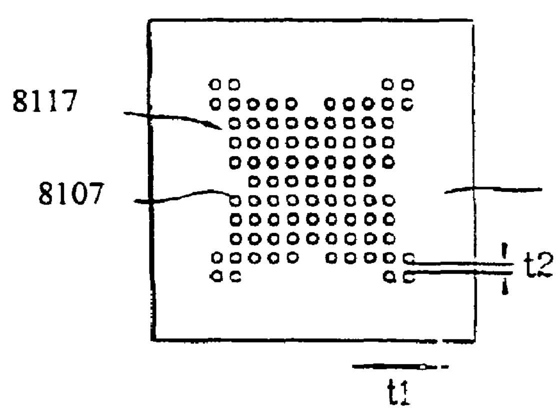
Figure 53J:
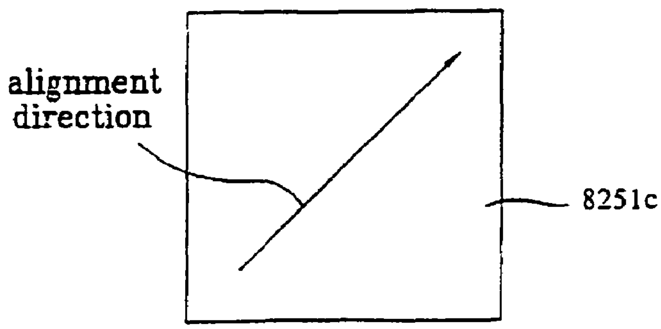
FIGS. 53J-53M illustrate exemplary dispensing patterns.

FIGS. 53G-53I illustrates the relationship between liquid crystal panel geometry and spreading characteristics of liquid crystal material. As shown in FIG. 53G, when a circular liquid crystal drop 8107 is dropped on, for example a lower substrate 8251$c$ of a square liquid crystal panel, a difference between a first distance "a" from the liquid crystal drop 8107 to a side and a second distance "b" from the liquid crystal drop 8107 to a corner is generated. As shown in FIG. 53H, assuming the spreading speed of liquid crystal drop is isotropic on the lower substrate 8251$c$, the liquid crystal 8107 reaches the side leaving a distance "b'" between the liquid crystal drop 8107 and the corner. Consequently, no liquid crystal is distributed to the area between the liquid crystal drop 8107 and the corner of the lower substrate 8251$c$.

Referring to FIG. 53I, a dispensing pattern 8117 including bubble type liquid crystal drops 8107 is shown. The liquid crystal drops 8107 may be dispensed on, for example, a lower substrate 8251$c$ of a square liquid crystal panel such that corner portions of the dispensing pattern include a rectangular extension and pitches t1 and t2 that are equal to each other in x and y directions. Assuming an isotropic liquid crystal spreading speed, the liquid crystal drops in the dispensing pattern 8117 may be evenly distributed across the lower substrate 8251$c$ upon bonding the substrates and prior to hardening the sealant. Accordingly, the liquid crystal drops, spread during a bonding process, are brought to equal distances from the corners and sides of the substrate 8251$c$.

It is, however, noted that the dispensing pattern 8117 need not necessarily be limited to any specific shape but may be modified in accordance with the shape of the substrate. For example, if the substrate is rectangular, the dispensing pattern of liquid crystals dropped on the substrate may also have a rectangular shape having that extends to corner areas such that distances between distributed liquid crystal drops and sides of a substrate and distances between distributed liquid crystal drops and corners of substrate are the same.

As mentioned above, an alignment direction of an alignment layer influences the shape of a particular dispensing pattern. Alignment layers provide an alignment regulating force or surface fixing force to align adjacent liquid crystal molecules in a specific direction. Alignment may be achieved by rubbing the alignment layer with a smooth cloth in a specific direction (e.g., rubbing direction) to produce micro grooves arranged in the rubbing direction.

Figure 53K:
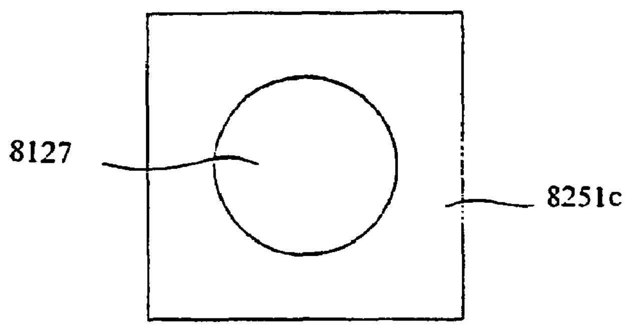
Figure 53L:
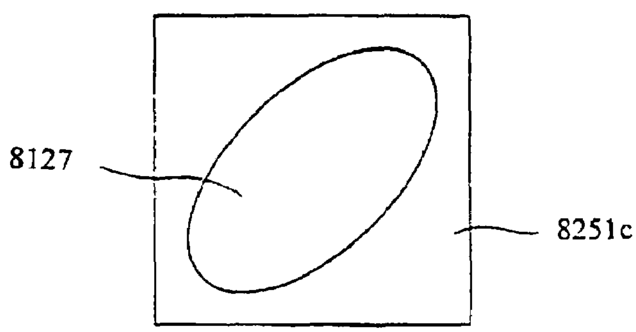

FIGS. 53J-53M illustrates the relationship between alignment direction of an alignment layer and spreading characteristics of liquid crystal material. As shown in 53J, when an alignment direction of an alignment layer is provided in the arrow direction, grooves are formed on the alignment layer along the alignment direction. Referring to FIG. 53K, when, for example, a circular liquid crystal drop 8127 are provided on a lower substrate 8251$c$ of a square liquid crystal panel, a spreading speed of the dropped liquid crystals increases in the rubbing direction because the liquid crystals spread through the grooves on the alignment layer. Accordingly, the liquid crystal drop 8127 may be distributed as an oval shape with a long axis parallel to the alignment direction.

Figure 53M:
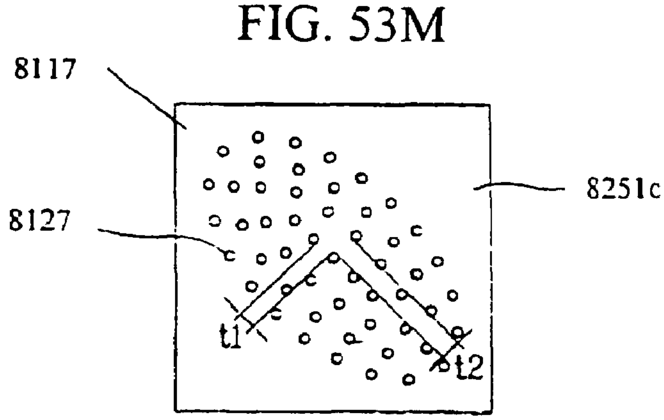

Referring to FIG. 53M, a dispensing pattern 8117 including bubble type liquid crystal drops 8107 is shown. The liquid crystal drops 8127 may be dispensed on, for example, a lower substrate 8251$c$ of a square liquid crystal panel. Liquid crystal drops 8127 may be provided in a oval shaped dispensing pattern 8117. The short axis of the oval shaped dispensing pattern 8117 is parallel with the alignment direction of the alignment layer. The long axis of the oval shaped dispensing pattern 8117 is transverse to the alignment direction of the alignment layer. In one aspect of the present invention, the oval shaped dispensing pattern 8117 has a long-axis-directional pitch t1 smaller than a short-axis-directional pitch t2. Therefore, the liquid crystal drops may be distributed uniformly across the entire substrate 8115 upon bonding the substrates together.

As mentioned above, patterns formed on a substrate influence the distribution shape of a particular dispensing pattern. Patterns generate step differences on the substrate. Step differences interrupt the flow of liquid crystal material within the liquid crystal drops in their distribution to anisotropically affect the spreading speed of liquid crystal drops.

Figure 53N:
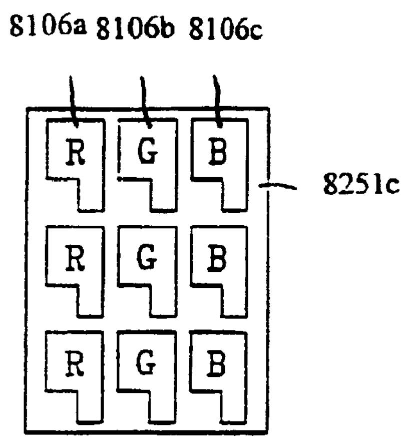
FIGS. 53N-O illustrate substrates.
Figure 53O:
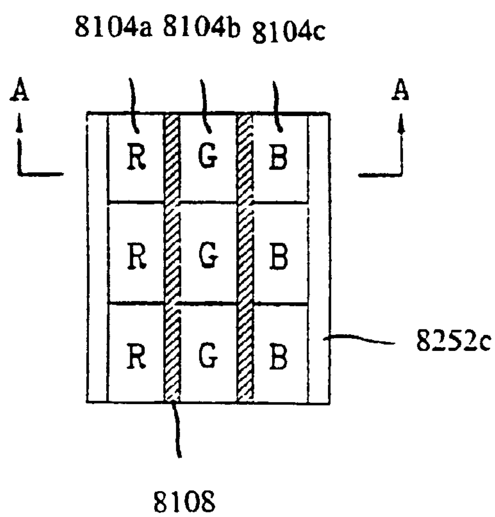

Referring to FIG. 53N, lower substrate 8251$c$ of a liquid crystal panel containing TFTs includes a plurality of red (R), green (G), blue (B) pixels, 8106$a$ to 8106$c$ arranged in a matrix. Although not shown in the drawing, the pixels 106$a$ to 106$c$ may be defined by a plurality of gate and data lines arranged horizontally and vertically. A driving device and a pixel electrode (not shown) may be formed in each of the pixels 8106$a$ to 8106$c$. Referring to FIG. 53O, R, G, B color filters 8104$a$ to 8104$c$ may be formed on an upper substrate 8103. The R, G, and B color filters 8104$a$, 8104$b$, and 8104$c$ correspond to the pixels 8106$a$ to 8106$c$ formed on the lower substrate 8155, respectively. Moreover, a black matrix 8108 may be formed between the color filters 8104$a$ to 8104$c$ of the upper substrate 8252$c$. The black matrix 8108 prevents light from leaking to a non-display area of a liquid crystal display and is arranged adjacent areas between the pixels 8106$a$ to 8106$c$ so as to prevent light from leaking through the areas.

Figure 53P:
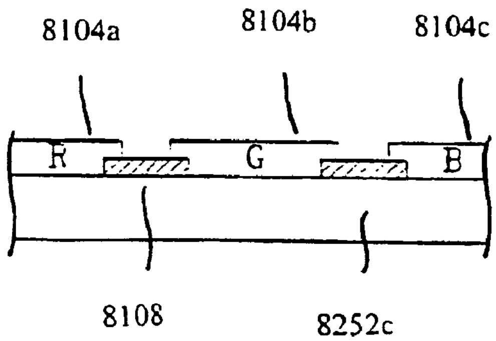
FIG. 53P illustrates a cross-sectional view along a line A-A' of FIG. 53O.

FIG. 53P illustrates a cross-sectional view along a cutting line A-A' in FIG. 53O. Referring to FIG. 53P, a plurality of black matrixes 8108 may be formed on the upper substrate 8252$c$ having a width greater than an interval between the pixels. Color filters 8104_a_ to 8104_c_ may be formed in the pixel area between the black matrixes 8108. In this case, color filters 8104_a_ to 8104_c_ may partially overlap the black matrixes 8108 but not each other. Hence, a predetermined-high step difference may be generated on the black matrixes 8108. Color filters 8104_a_ to 8104_c_ may be arranged along a data line so that step differences is generated by color filters 8104_a_ to 8104_c_.

Figure 53Q:
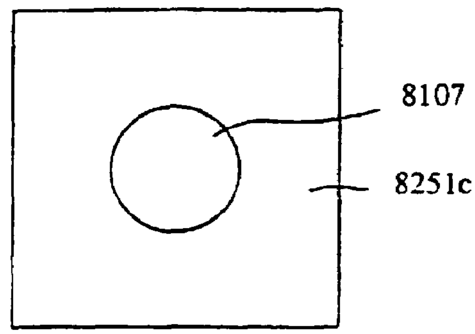
FIGS. 53Q-53R illustrates a liquid crystal drop.
Figure 53R:
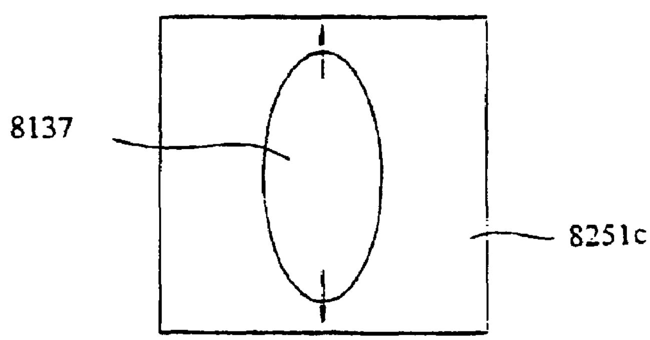

Step differences interrupt the spread of liquid crystals. Moreover, step differences provide grooves that are aligned a direction of the data line, thereby spreading of liquid crystal drops may be made smoother. When liquid crystal drops are distributed on a substrate upon pressurizing upper and lower substrates, the step difference induces anisotropic spreading speeds in directions of gate and data lines. As shown in FIG. 53Q, when a circular-shaped liquid crystal 8137 is dropped on a central area of a substrate 8251_c_, the spreading speeds in directions of the data and gate line are different from each other. For example, the spreading speed in the direction of the data line is faster than the spreading speed in the direction of the gate line because no step difference exists along the data line direction. Accordingly, the circular liquid crystal drop 8137 shown in FIG. 53Q may be transformed into an oval shaped liquid crystal drop 8137 having long and short axes in the data and gate line directions, respectively, as shown in FIG. 53R after the substrate have been bonded.

Figure 53S:
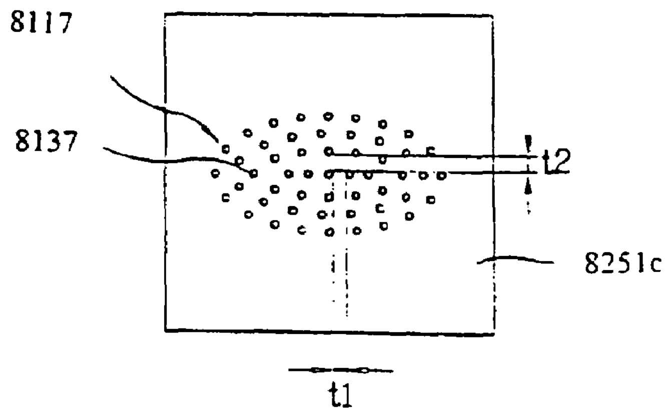
FIGS. 53S-53V illustrates exemplary dispensing patterns.

Referring to FIG. 53S, a dispensing pattern 8147 including bubble type liquid crystal drops 8251_c_ is shown. The liquid crystal drops 8137 may be dispensed on, for example, a lower substrate 8251_c_ of a square liquid crystal panel. Liquid crystal drops 8137 may be provided in an oval shaped dispensing pattern 8147. The short axis of the oval shaped dispensing pattern 8147 parallel to a data line direction. The long axis of the oval shaped dispensing pattern 8147 is parallel to the gate line direction. In one aspect of the present invention, the pitches of the oval shaped dispensing pattern 8147 has a gate-line-directional pitch t2 is greater than a data-line-directional pitch t1. Therefore, the liquid crystal drops may be distributed uniformly across the entire substrate 8251_c_ upon bonding the substrates together.

Patterns influencing the distribution shape of dispensing patterns may include the lower substrate 8251_c_ containing TFT substrate as well as the upper substrate 8103. For example, any number of gate and data lines may be formed on the lower substrate 8251_c_ of a TN (twisted nematic) mode liquid crystal display. In one example, a liquid crystal display having 600×800 pixels may includes include 600 gate lines and 800 data lines. Accordingly, the number of the step differences in a gate line direction outnumbers the number of step differences in a data line direction. Therefore, the step differences interrupt the spread of liquid crystals in the gate line direction so as to slow down the spreading speed of liquid crystals in the gate line direction. However, various insulating layers (e.g., organic or inorganic, etc.) and other device components may be formed on the lower substrate 8251_c_ to reduce the effects the step differences present. Accordingly, the step differences' effect lower substrate 8251_c_ has less influence on the distribution shape of liquid crystals than that of the color filter layers on the upper substrate 8103.

The abovementioned factors influence individual liquid crystal drops. Accordingly, substrate shape, alignment direction, and patterns formed on the substrate should be considered so as to calculate the dispensing pattern of liquid crystal drops. Factors related to the alignment direction that influence the distribution shape may include rubbing direction or a photo-irradiation and/or polarization direction of irradiated light may.

The following explanation is for embodiments according to the present invention, to which the above factors are substantially applied so as to represent dispensing patterns of liquid crystal displays of various modes.

Figure 53T:
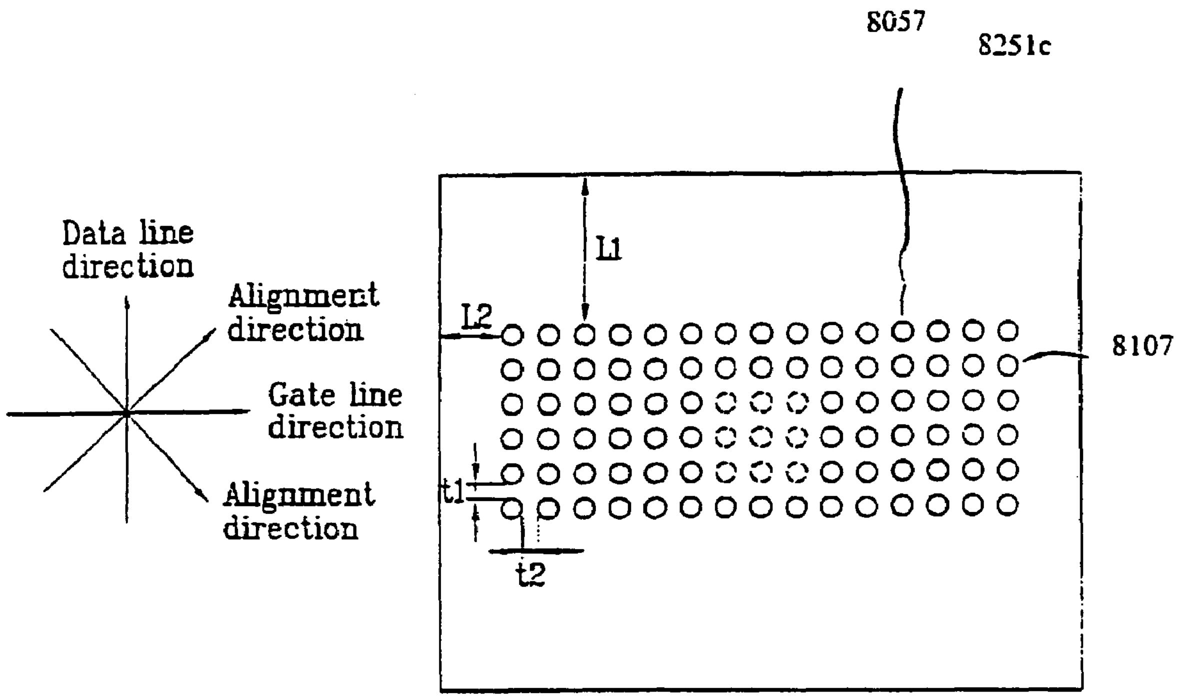

FIG. 53T generally illustrates a dispensing pattern 8157 of a TN mode liquid crystal display (LCD). In the case of a TN mode LCD, alignment directions of alignment layers formed on the first and second substrates are perpendicular to each other. As a result of this orientation the effect that the alignment direction have when bonding the substrates is minimized. Rather, the factors that significantly affect the spreading rate of the liquid crystal include the shape of the panel and the location of devices formed on the panel.

Device patterns on the substrate form step differences. For example, a color filter layer arranged along the data line creates step differences in the gate line direction. Accordingly, the color filter affects the spreading rate of the liquid crystal such that the spreading rate of liquid crystal is greater in the data line direction than in the gate line direction.

As liquid crystal panels are generally rectangular, the distance from the center to any corner of the panel is greater than the distance to any one side of the panel. Accordingly, rectangular dispensing pattern 8157 may be arranged on the panels. The rectangular dispensing pattern still may not be adequate, however, because the spreading rate of the liquid crystal in the data line direction is greater than in the data line direction.

Figure 53U:
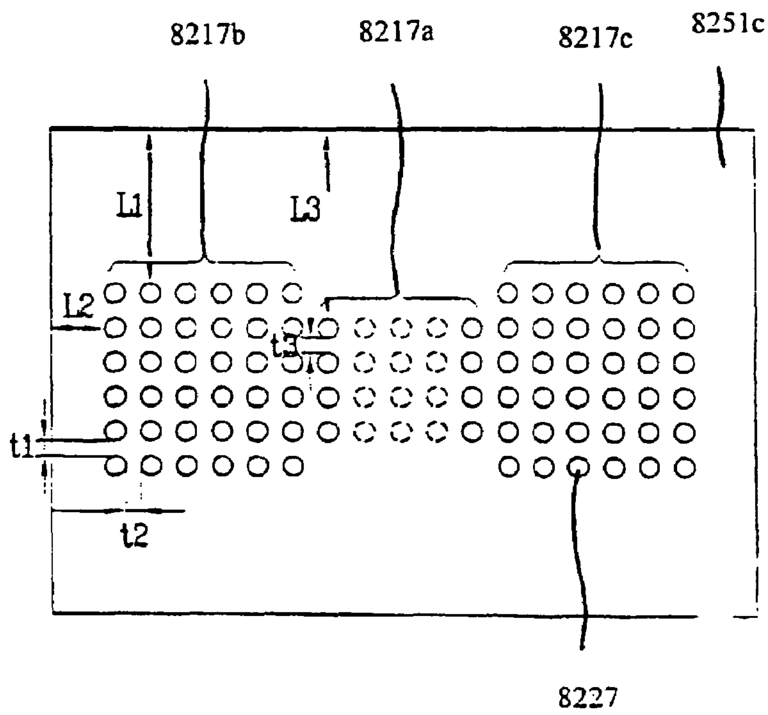

Therefore, as illustrated in FIG. 53U, the dimensions of the dispensing pattern 8217 in the data line direction may be made smaller than the dimensions of the dispensing pattern 8217 in the gate line direction in order to compensate for the aforementioned anisotropic spreading rate.

In one aspect of the present invention, the dispensing pattern 8217 may be formed such that an interval L1 between the dispensing pattern 8217_b_ in the data line direction and a side of the liquid crystal panel 8251_c_ is greater than the other interval L2 between the dispensing pattern in the gate line direction and the side of the liquid crystal panel 8251_c_. That is, the distance L1 should be greater than the distance L2 (L1>L2).

The dispensing pitch is an interval between adjacent liquid crystal drops 8207 of the dispensing pattern 8217 and influences the spreading rate of the liquid crystal. Generally the liquid crystal drops 8207, arranged within the dispensing pattern 8217, spread isotropically and merge into adjacent liquid crystal drops. As a result, the liquid crystal drops 8207 merge together so as to cover the substrate prior to the bonding of the substrates. However, dropping traces occur if the liquid crystal drops arranged on the substrate do not come into contact with adjacent liquid crystal drops prior to the bonding of the substrates. Dropping traces are a significant reason for the degradation of the liquid crystal panels.

An important factor in preventing the degradation of the liquid crystal panel as well as uniformly distributing the liquid crystal drops is the dispensing pitch. The dispensing pitch of liquid crystal drops depends on the viscosity of the liquid crystal drops and more specifically, on the single dropping amount of liquid crystal drops arranged on the substrate.

For example, in the TN mode liquid crystal display of the present invention, the dispensing pitch is preferably set up as about 9-17 mm. As explained in detail above, the spreading rate of the liquid crystal drops is greater in the data line direction than in the gate line direction. Accordingly, the dispensing pitch t1 in the data line direction should be set up to be greater than t2 in the gate line direction (t1>t2).

In addition, the spreading of the liquid crystal drops 8207 arranged on the substrate may be influenced by the application of pressure to the substrates. The liquid crystal drops arranged on the substrate are spread across the substrate by pressure generated from bonding the upper and lower substrates together. Ideally when bonding the substrates pressure may be uniformly applied to the substrates. However, typically the pressure applied to the central area of the substrate is greater than the pressure applied to the circumferential area of the substrate. Therefore, the liquid crystal drops are arranged in a rectangular dispensing pattern, as shown in FIG. 53U. The liquid crystal reaches the sealant before the liquid crystal drops is hardened because the central portion of the rectangular shape spreads faster in the data line direction (by mutual effect of the speed increasing pattern and pressure).

Although the effect of the pressure differentials may be negligible, such problems should be overcome to remove the degradation of the liquid crystal display. In order to overcome these pressure problems the dispensing pattern of liquid crystal drops as shown in FIG. 53U is utilized.

Referring to the figure, the dispensing pattern 8217 is formed so that a middle portion of the rectangular dispensing pattern is removed in part as shown in the data line direction. In other words, the width of the middle area (width along the data line direction) is smaller that the rest. Forming the dispensing pattern 8217 this way effectively prevents the degradation of liquid crystal display.

As shown in the figure, the dispensing pattern 8217 has a "dumbbell shape." The term "dumbbell shape" is used for convenience of explanation, and is not intended to limit the shape of the dispensing pattern in the present invention. The term "dumbbell-shaped dispensing pattern" means a shape formed by removing a partial middle portion of the dispensing pattern in the data line direction of an initial rectangular dispensing pattern, that is having a narrow width in the data line direction.

In the middle area of the dumbbell-shaped dispensing pattern 8217 is a first dispensing pattern 8217*a*, which has a width narrower in the data line direction than the widths of the second or third dispensing patterns 8217*b* or 8217*c*, respectively. The distance L3 between the first dispensing pattern 8217*a* and a side of a liquid crystal panel 8205 is greater than distance L1 of the second or third dispensing pattern 8217*b* or 8217*c* (L3>L1).

The dispensing pitches t1, t2, and t3 of the dumbbell-shaped dispensing pattern 8217 are formed such that dispensing pitch t1 of the second or third dispensing pattern 8217*b* or 8217*c* in the data line direction is longer than dispensing pitch t2 in the gate line direction and dispensing pitch t3 of the first dispensing pattern 8217*a* in the data line direction is longer than that dispensing pitch t1 of the second or third dispensing pattern 8217*b* or 8217*c*.

The rectangular dispensing pattern having a narrow width in the data line direction (dumbbell-shaped dispensing pattern) is utilized for a TN mode liquid crystal display. Thus, enabling prompt and uniform distribution of liquid crystal drops across the substrate.

As explained in detail above for TN mode liquid crystal displays the alignment directions have minimal influence on the overall spreading of the liquid crystal. Accordingly, the dispensing patterns are formed ignoring the affect of the alignment directions. Similarly, the same techniques can be utilized in the VA mode liquid crystal displays. In general VA mode liquid crystal display have no specific alignment direction. The dispensing pattern of the VA mode liquid crystal display can be formed similar to the dispensing pattern used in the TN mode liquid crystal display. That is, a rectangular or dumbbell-shaped dispensing pattern as shown in FIG. 53T or FIG. 53U can be utilized. Therefore, the corresponding explanation of the dispensing pattern of the VA mode liquid crystal display is skipped.

Figure 53V:
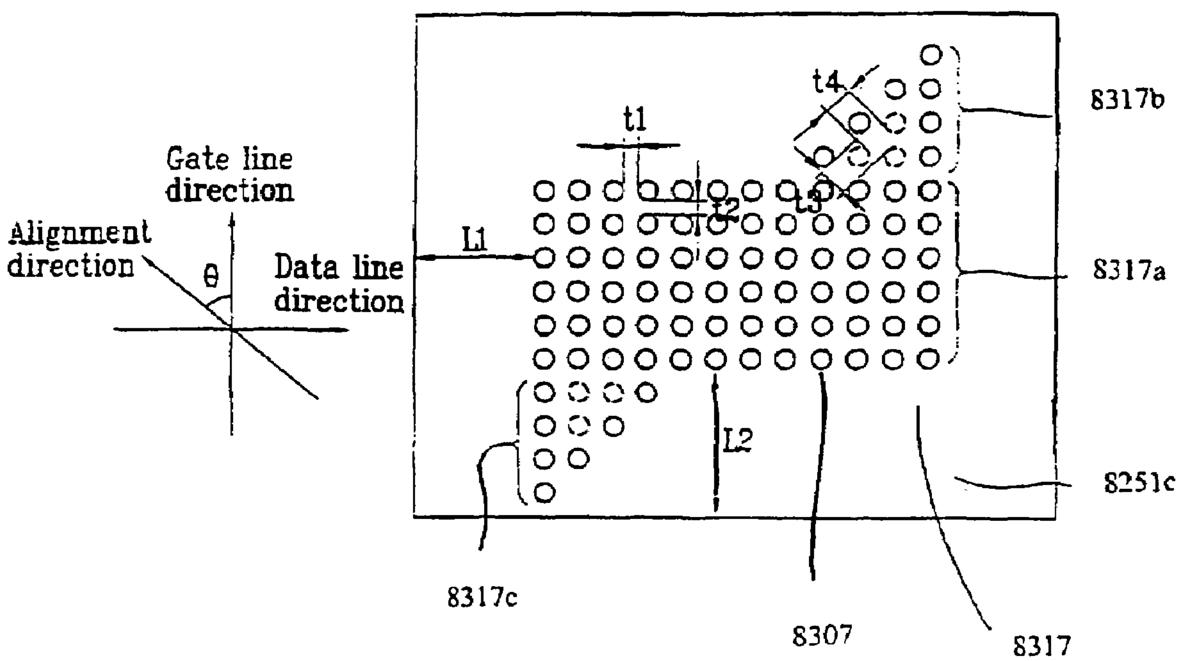

FIG. 53V generally illustrates a dispensing pattern 8317 of an IPS (in-plane switching) mode liquid crystal display. The alignment direction of an alignment layer in an IPS mode liquid crystal display is formed in one direction. As shown in the figure, the alignment direction is formed at an angle θ measured counter-clockwise from the gate line direction. The dispensing pattern 8317 in an IPS mode liquid crystal display depends on the shape of a liquid crystal panel, pattern shape, and the alignment direction.

The dispensing pattern 8317 of the IPS mode liquid crystal can be divided into parts. A first dispensing pattern 8317*a* in the middle of the dispensing pattern 8317 extends in along the data line direction. Because of the various patterns formed on the substrate the spreading rate of liquid crystal drops in the gate line direction is faster than that the spreading rate in the data line direction. Accordingly, the distance L1 between the dispensing pattern 8317*a* and a side of a liquid crystal panel is greater than the distance L2 between the dispensing pattern 8317*a* and the side of the liquid crystal panel (L1>L2).

The spread speed of liquid crystal drops in the data line direction in the TN or VA mode liquid crystal display shown in FIG. 53T or FIG. 53U is faster than that in the gate line direction. Yet, the spread speed of liquid crystal drops in the gate line direction in the IPS mode liquid crystal display is faster. The corresponding reason is explained as follows.

In case of a TN or VA mode liquid crystal display, a color filter layer is arranged along a data line direction and a step difference is formed along a gate line direction. Yet, in an IPS mode liquid crystal display, a color filter layer is arranged along a gate line direction and a step difference is formed along a data line direction. Hence, the dropped liquid crystal drops spread faster along the gate line direction in the IPS mode liquid crystal display. The arrangement of the color filter layer according to the mode is for using effectively a glass plate (i.e. substrate) on which a plurality of liquid crystal panels are formed. In other words, the color filter layer is formed along the gate or data line direction in accordance with the mode of the liquid crystal display in a method of fabricating a liquid crystal display using liquid crystal dropping. It is a matter of course that the arrangement direction of the color filter layer is not limited to a specific direction. More important thing is not whether a direction of a dispensing pattern established in the IPS mode liquid crystal display is an x or y direction but that the dispensing pattern extends in a direction having a slow flow speed of liquid crystal drops (or a direction of step difference of the color filter layer).

Therefore, the first dispensing pattern 8317*a* extends in the data line direction in the IPS mode liquid crystal display, which is just one of examples for an extending direction of the dispensing pattern, Instead, the first dispensing pattern 8317 can extend in any direction having a slow flow speed of liquid crystal drops.

Besides, the second dispensing patterns 8317*b* and 8317*c* extend from both ends of the first dispensing pattern 8317 in directions opposite to each other, respectively. The extending directions of the second dispensing patterns 8317*b* and 8317*c* are vertical to the alignment direction. Each of the spread speeds of liquid crystal drops in these directions is slower than the spread speed in the alignment direction, which is compensated by the second dispensing patterns 8317*b* and 8317*c*.

The factors having influence on the spread speed of liquid crystal drops in the IPS mode liquid crystal display are the shape of the pattern and the alignment direction. Hence, the two factors should be considered so as to establish the dispensing pitches.

Namely, a pitch t1 in the data line direction, a pitch t2 in the gate line direction, a pitch t3 in the alignment direction, and a pitch t4 in the direction vertical to the alignment direction should be established. Generally, the pitch of the dispensing pattern 8317 of liquid crystal drops of the IPS mode liquid crystal display is about 8-13 mm.

Considering the difference between the spread speeds of liquid crystal drops due to pattern, the pitch t1 in the gate line direction is formed grater than that t2 in the data line direction. Considering the spread speed in the alignment direction, the pitch t3 in the alignment direction should be established to be greater than that t4 in the direction vertical to the alignment direction.

The above-established dispensing pattern of liquid crystal drops has a shape like a lightning facing the data line direction. In other words, the dispensing pattern includes a middle portion on a liquid crystal panel and tail portions in directions opposite to the alignment direction of the alignment layer. In this case, the term "lightning," is used for convenience of explanation, and does not limit the scope of the shape of the dispensing pattern of the present invention.

The substrates are bonded to each other after the liquid crystal drops have been dropped along the above-established dispensing pattern from a liquid crystal dispenser. Therefore, the dropped liquid crystal drops are distributed uniformly on the entire substrate.

The above dispensing pattern is calculated before the liquid crystal drops are dropped. A nozzle is moved along the calculated dispensing pattern so as to drop the liquid crystal drops. The dispensing pattern of liquid crystal drops may be calculated by the shape of the substrate or the shape of a pattern formed on the substrate. The dispenser, although not shown in the drawing, may be connected to a control system so as to carry out the dropping of the dispensing pattern and liquid crystal drops by the control of the control system.

Various kinds of information about a substrate such as substrate area, number of panels formed on the substrate, dropping amount of liquid crystal drops, shape of substrate or panel, rubbing direction carried out on an alignment layer formed on the substrate, shape of pattern formed on the substrate, and the like are inputted to the control system. The control system calculates a total dropping amount of liquid crystal drops to be dropped on the panel or substrate, a dropping number, a single dropping amount, a dispensing pattern based on the inputted information so as to control a driving means (not shown in the drawing) for driving the liquid crystal dispenser and substrate in order to drop the liquid crystal drops on a predetermined position.

Figure 48:
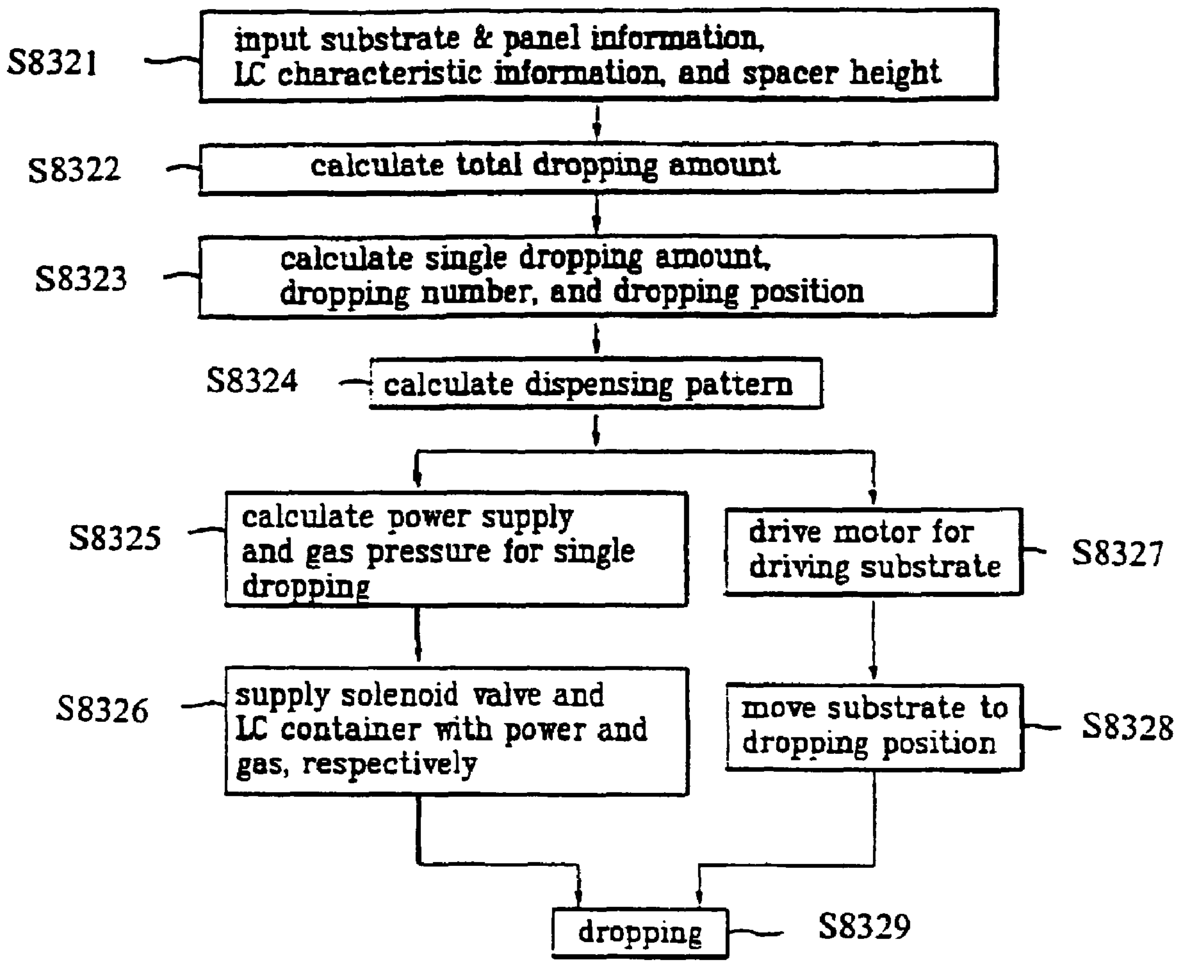
FIG. 48 illustrates a flowchart of an exemplary liquid crystal dropping method according to the present invention.

FIG. 48 illustrates a flowchart of an exemplary liquid crystal dropping method according to the present invention. If a user operates a keyboard, mouse, or touch panel so as to input information, such as liquid crystal display panel information, other characteristic information of the liquid crystal display panel, and a height (i.e. cell gap) of a spacer measured in a previous process (S8321), through the input unit 8271, the dropping amount calculation unit 8273 calculates a total dropping amount of liquid crystal that will be dropped onto a substrate (or panel) (S8322). Subsequently, the single dropping amount calculation unit 8286 and dropping number calculation unit 8287 calculate a single liquid crystal drop amount and a number of liquid crystal drops to be applied, respectively. The dropping position calculation unit 8288 then calculates a dropping position of liquid crystal based on the single drop amount and dropping number so as to calculate a dispensing pattern of liquid crystal (S8323, S8324).

A substrate disposed under the dispensing device as described above is moved in x and y directions by a motor. The dispensing pattern calculation unit 8275 calculates a position on which the liquid crystal will be dropped based on the inputted dropping amount, characteristic information of liquid crystal, and substrate information, and then moves the substrate so that the dispensing device is disposed at a determined dropping position by actuating the motor based on the calculated position on which the liquid crystal will be dropped (S8327, S8328).

When the substrate is moved, the electric power control unit and flow control unit calculate a power and a gas pressure corresponding to an open time of the discharging hole of the dispensing apparatus and the single drop amount of liquid crystal based on the calculated single drop amount of liquid crystal (S8325) and then control the power supply unit and flow control valve so as to supply the solenoid coil with the power and the liquid crystal container with nitrogen corresponding to the calculated gas pressure. Thus, dispensing of the liquid crystal is begun at the predetermined position (S8326, S8329).

The single drop amount is determined by the amount of power applied to the solenoid coil and the supply quantity of nitrogen applied to the liquid crystal container to pressurize the liquid crystal. The dropping amount of liquid crystal can be adjusted by varying the above two factors. Instead, the dropping amount can be controlled by fixing one of the two factors and varying the other as well. In other words, only the amount of power applied to the solenoid coil may be varied, while a flow of nitrogen supplied to the liquid crystal container 8224 is fixed as a setup amount, so as to drop a demanded amount of the liquid crystal on the substrate. On the other hand, the amount of power applied to the solenoid coil may be fixed to be a setup value, while a flow of nitrogen supplied to the liquid crystal container is varied, so as to drop a demanded amount of the liquid crystal on the substrate.

Meanwhile, the single drop amount of liquid crystal dropped on a specific position of a substrate can be varied as described above with respect to the dispensing apparatus.

The amount of liquid crystal dropped onto a substrate is a very minute amount, in the range of several milligrams. It is very difficult to drop the minute amount precisely. Besides, the predetermined amount to be dropped may easily changed by various factors. Hence, it is necessary to compensate the amount of liquid crystal to be dropped so as to drop the exact amount of liquid crystal onto the substrate all the times. Such a compensation is carried out by a compensation control unit included in the main control unit 8270.

Figure 49:
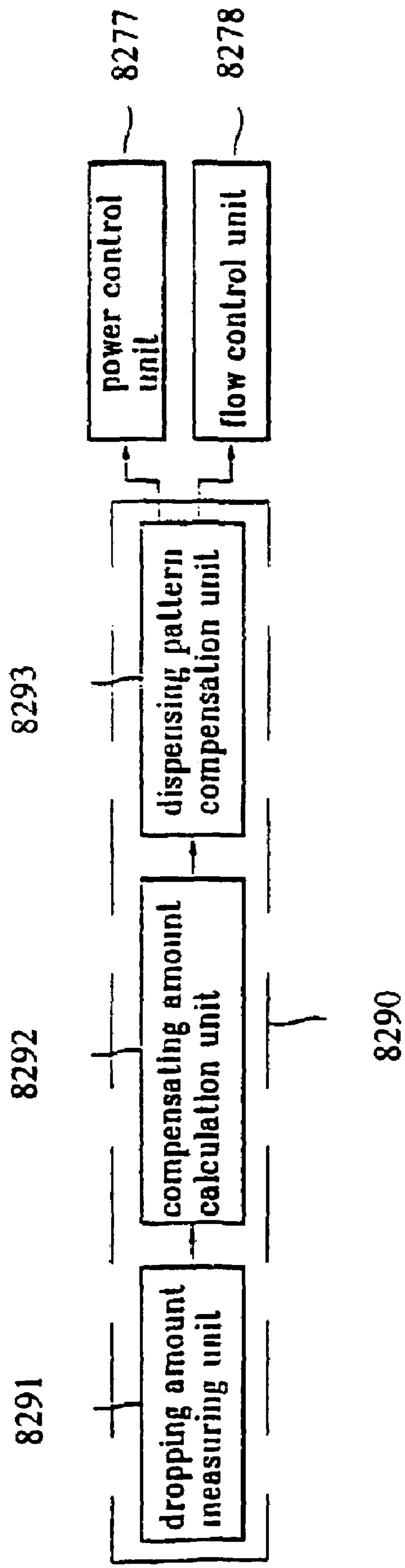
FIG. 49 illustrates a functional components of an apparatus for calculating a compensation amount in dispensing liquid crystal onto a substrate.

The compensation control unit 8290, as shown in FIG. 49, includes a dropping amount measuring unit 8291 that measures the dropping amount liquid crystal, a compensating amount calculation unit 8292 that calculates a compensation amount of liquid crystal by comparing the measured dropping amount to a predetermined dropping amount, and a dispensing pattern compensation unit 8293 that calculates a new dispensing pattern by compensating an initially calculated dispensing pattern by the compensating amount calculated by the compensating amount calculation unit 8292.

Although not shown in the drawing, a scale for measuring the weight of the liquid crystal periodically or non-periodically is installed at (or outside) the dispensing device. As a minute amount of liquid crystal can weigh only several milligrams (mg), there is limit to accurately measuring these minute amounts. Accordingly, a fixed number of drops (e.g., 10, 50, or 100) can be measured and extrapolated to calculate a total dropping amount.

Figure 50:
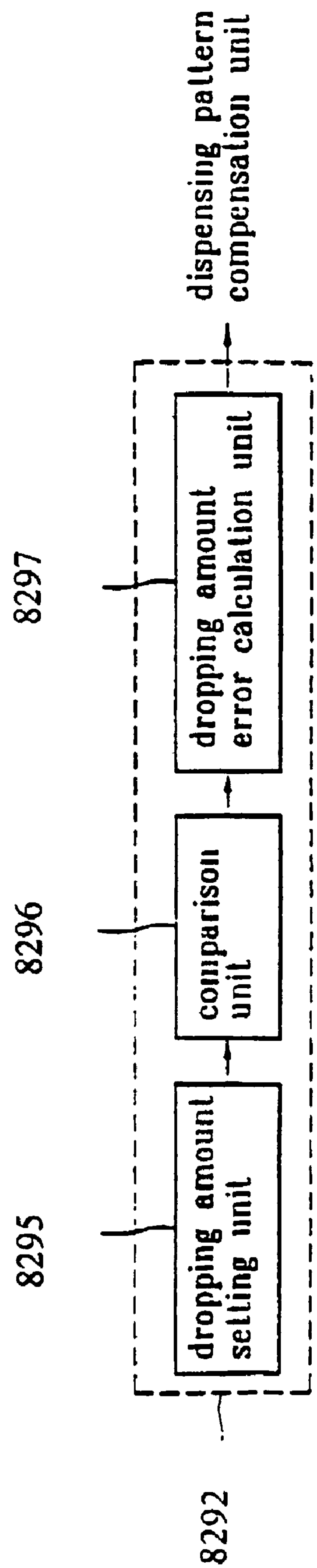
FIG. 50 illustrates a compensation amount calculation unit according to the present invention.

Referring to FIG. 50, the compensating amount calculation unit 8292 includes a dropping amount setting unit 8295 that sets the dropping amount calculated by the single dropping amount calculation unit 8286 in FIG. 47 as a current dropping amount; a comparison unit 8296 that compares the set dropping amount to a dropping amount measured by the dropping amount measuring unit 8291 in FIG. 49 to calculate a difference value therebetween; and a dropping amount error calculation unit 8297 that calculates an error value of the dropping amount of liquid crystal corresponding to the amount compared by the comparison unit 8296.

Figure 51:
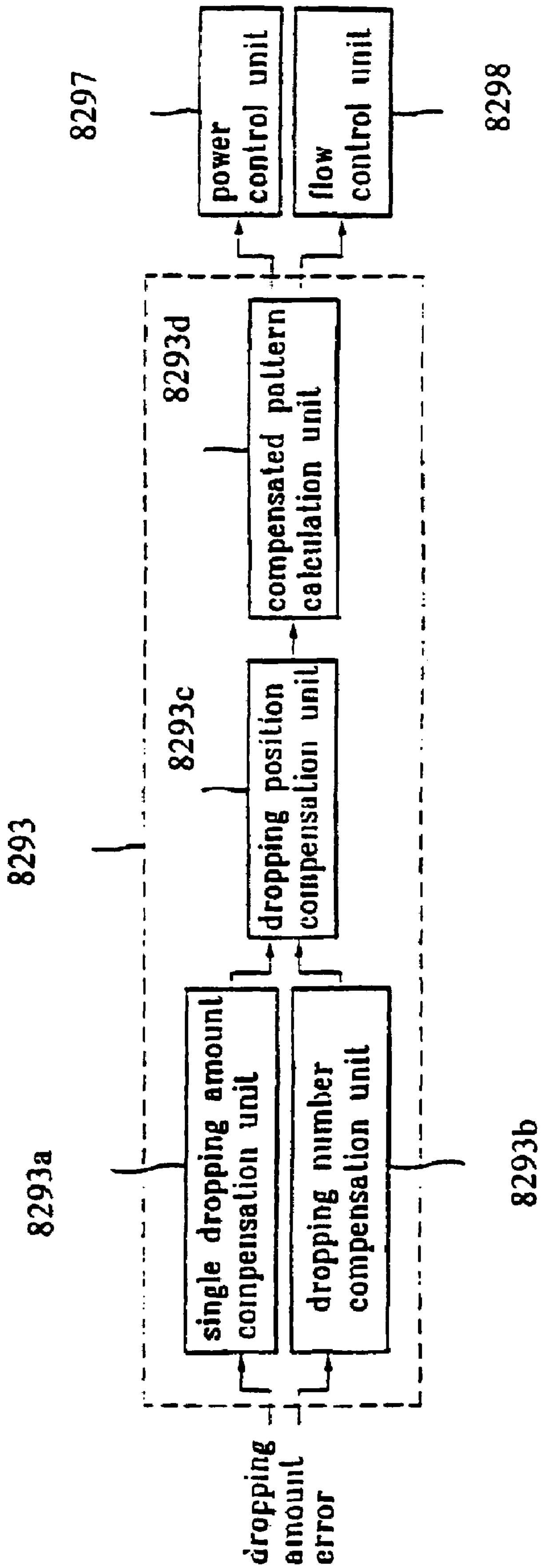
FIG. 51 illustrates a dispensing pattern compensation unit according to the present invention.

The dispensing pattern compensation unit 8293, as shown in FIG. 51, includes a single dropping amount compensation unit 8293*a* that calculates a single compensating amount based on the dropping amount error calculated by the compensating amount calculation unit 8292 in FIG. 49; a dropping number compensation unit 8293*b* that calculates a compensated dropping number based on the dropping amount error; a dropping position compensation unit 8293*c* that calculates the dropping position; and a compensated pattern calculation unit 8293*d* that calculates a compensated dispensing pattern of liquid crystal based on the single compensating amount and the compensated dropping number calculated in the single dropping number compensation unit 8293*a*, the dropping amount compensation unit 8293*b*, and the dropping position compensation unit 8293*c*.

The compensated dispensing pattern calculated by the compensated dispensing pattern calculation unit 8293*d* includes the compensated single dropping amount and compensated dropping number. Hence, the power control unit 8297 calculates an electric power corresponding to the compensated dropping amount to output a signal corresponding to the calculated electric power to the power supply unit 8260, and the power supply unit 8260 supplies the solenoid coil (not shown) with the electric power corresponding to the dropping amount compensated in accordance with the signal. Moreover, the flow control unit 8298 calculates a pressure corresponding to the compensated dropping amount to output a corresponding signal to the flow control valve (not shown), and the flow control valve supplies the dispensing device 8220 with a gas flow corresponding to the dropping amount compensated in accordance with the inputted signal.

Figure 52:
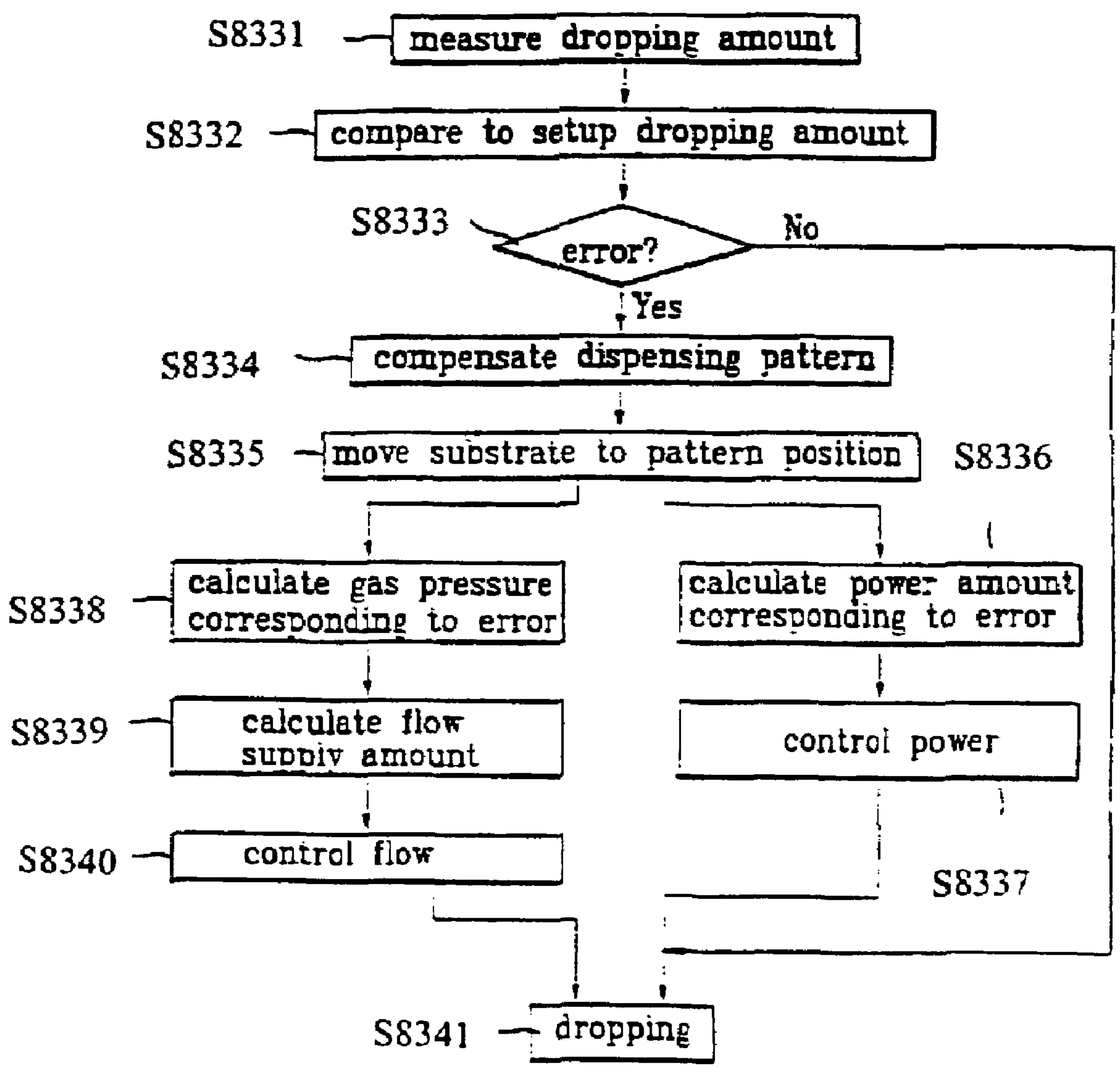
FIG. 52 illustrates a flowchart of a method of compensating the liquid crystal dropping amount according to the present invention.

FIG. 52 illustrates a flowchart of a method of compensating the liquid crystal dropping amount according to the present invention. Referring to FIG. 52, after the predetermined number of liquid crystal drops have been carried dispensed, the amount of liquid crystal dropped is measured using a scale (S8331). Subsequently, the measured dropping amount is compared to the predetermined measuring amount to determine whether the correct amount of liquid crystal has been dispensed, i.e., whether or not there is an error value of dropped liquid crystal (S8332, S8333).

If there is no error value, it is judged that the amount of liquid crystal that has been dropped is equal to the predetermined amount. If there is an error value, the error is calculated to compensate the dispensing pattern and the dispensing pattern compensation unit 8293 calculates a new dispensing pattern (S8334). After the substrate has been moved to a dropping position determined by the compensated dispensing pattern (S8335), a power amount error corresponding to the dropping amount error is calculated to calculate a compensated power amount, and the power control unit 8297 is controlled to supply the solenoid coil with the calculated power amount from the power supply unit 8260 to drop the compensated amount of liquid crystal on the dropping position (S8336, S8337, S8341).

Moreover, the compensated pattern calculation unit 8293*d* calculates a gas pressure error corresponding to the dropping amount error (S8338). Thereafter, a flow supply amount corresponding to the gas pressure error is calculated to provide a compensated flow supply amount. A corresponding amount of gas is supplied from the gas supply unit 8262 to the liquid crystal container 8224 to control the flow control valve 8261 to drop the compensated amount of liquid crystal on the compensated dropping position (S8339, S8340, S8341).

The above-described processes for compensating the dropping amount of liquid crystal are repeated. Whenever the liquid crystal droppings of the predetermined number have been applied, the above compensation process is repeated so as to drop the exact amount of liquid crystal on the substrate.

Generally, the compensation of the dropping amount of liquid crystal, as mentioned in the forgoing description, is achieved by compensating the single dropping amount by controlling the power supply unit 8260 and flow control valve. Since the single dropping amount of liquid crystal is very minute, it is very difficult to adjust the single dropping amount precisely. It is a matter of course that both of the single dropping amount and the dropping number should be compensated in order to compensate the dropping amount of liquid crystal exactly, which is more difficult. Therefore, for a simpler compensation of the dropping amount, the dropping amount of liquid crystal can be compensated by compensating the number of drops of liquid crystal only. 'Compensating the number of drops of liquid crystal' means that the dispensing pattern is compensated by calculating a new dropping position for the predetermined dispensing pattern.

When the dispensing pattern is compensated by adjusting the number of liquid crystal drops, the basic dispensing patterns described above are not modified. Because the calculated (or predetermined) dispensing pattern includes all the factors required for the liquid crystal dropping, the calculation of new dispensing pattern is difficult as well. Therefore, when the dropping amount of liquid crystal is adjusted in the present invention, the dropping amount is applied using the previously calculated dispensing pattern. When liquid crystal is initially applied, liquid crystal is not applied to certain areas of the dispensing patterns. As shown in FIG. 53A, FIG. 53B, and FIG. 53C, certain portions of dispensing patterns 8207*a* are reserved for adjusting the amount of liquid crystal applied. For example, the portions of the patterns indicated by the solid lines in FIG. 53A, FIG. 53B, and FIG. 53C are the actual dispensing patterns, while additional dropping patterns 8207*b* as indicated by dotted lines are compensation dispensing patterns. Namely, when the actual amount of liquid crystal dropped is smaller than the predetermined dropping amount (i.e., the liquid crystal amount should actually be increased), liquid crystal may also be dropped in the compensation dispensing pattern to provide for additional liquid crystal on the panel. That is, the amount of liquid crystal actually dropped on the panel is increased to be the predetermined dropping amount. Moreover, when the measured dropping amount exceeds the predetermined dropping amount, no liquid crystal is applied in the compensation dispensing pattern 8207*b*.

In the above description, the liquid crystal 8207 is dropped on the first substrate 8251 as a TFT array substrate, while the Ag dots and sealant are coated on the second substrate (not shown in FIG. 53) as a color filter array substrate. Yet, in accordance with a mode of liquid crystal display, the liquid crystal 8207 can be dropped on the second substrate (not shown in FIG. 53) as a color filter array substrate, while the Ag dots and sealant are formed on the first substrate 8251 as a TFT array substrate.

FIGS. 54A to 54D are perspective views illustrating a method of manufacturing an LCD device according to the present invention;

Although the drawings illustrate only one unit cell, a plurality of unit cells may be formed depending upon the size of the substrate.

Figure 54A:
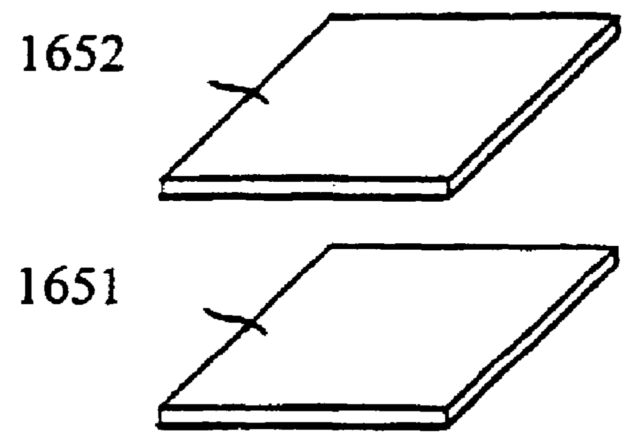
FIGS. 54A to 54D are perspective views illustrating a method of manufacturing an LCD device according to an embodiment of the present invention.
Figure 54B:
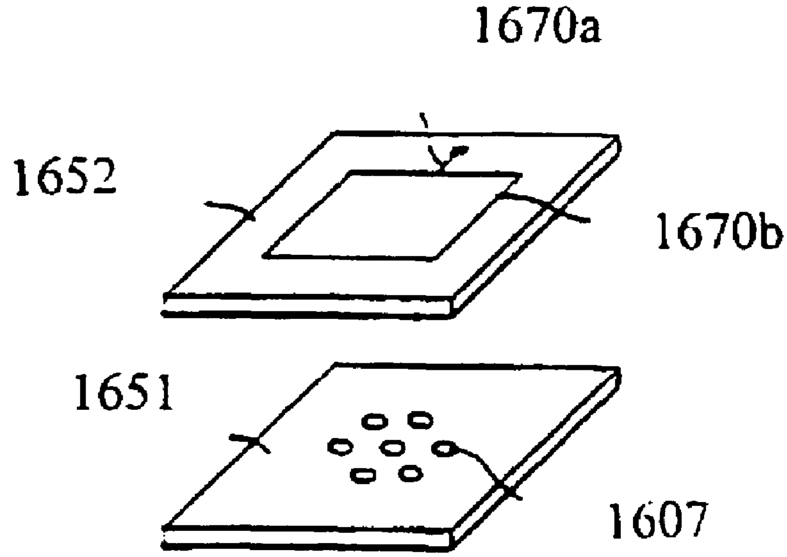

As shown in FIG. 54A, a lower substrate 1651 and an upper substrate 1652 are prepared for the process. A plurality of gate and data lines (not shown) are formed on the lower substrate 1651. The gate lines cross the data lines to define a pixel region. A thin film transistor (not shown) having a gate electrode, a gate insulating layer, a semiconductor layer, an ohmic contact layer, source/drain electrodes, and a protection layer is formed at each crossing point of the gate lines and the data lines. A pixel electrode (not shown) connected with the thin film transistor is formed in the pixel region.

An alignment film (not shown) is formed on the pixel electrode to initially align the molecules of liquid crystal. The alignment film may be formed of polyamide or polyimide based compound, polyvinylalcohol (PVA), and polyamic acid by rubbing. Alternatively, the alignment film may be formed of a photosensitive material, such as polyvinvylcinnamate (PVCN), polysilioxanecinnamate (PSCN) or cellulosecinnamate (CelCN) based compound, by using a photo-alignment method.

A light-shielding layer (not shown) is formed on the upper substrate 1652 to shield light leakage from the gate lines, the data lines, and the thin film transistor regions. A color filter layer (not shown) of R, G, and B is formed on the light-shielding layer. A common electrode (not shown) is formed on the color filter layer. Additionally, an overcoat layer (not shown) may be formed between the color filter layer and the common electrode. The alignment film is formed on the common electrode.

Silver (Ag) dots are formed outside the lower substrate 1651 to apply a voltage to the common electrode on the upper substrate 1652 after the lower and upper substrates 1651 and 1652 are attached to each other. Alternatively, the silver dots may be formed on the upper substrate 1652.

For an in plane switching (IPS) mode LCD, the common electrode is formed on the lower substrate like the pixel electrode, and so that an electric field can be horizontally induced between the common electrode and the pixel electrode. The silver dots are not formed on the substrate.

As shown in FIG. 54, a liquid crystal 1607 is applied onto the lower substrate 1651 to form a liquid crystal layer in accordance with the liquid crystal application principles described herein.

An auxiliary UV curable sealant 1670*a* is formed in a dummy area at a corner region of the upper substrate 1652, subsequently, a main UV curable sealant 1670*b* having no injection hole is formed, using a dispensing method.

The auxiliary UV sealant 1670*a* is prevents any problem that may occur due to a sealant concentrated upon the end of a nozzle of a dispensing device. Therefore, it does not matter where the auxiliary UV sealant 1670*a* is formed in the dummy area of the substrate, i.e., any blob of sealant will be formed away from the active region of the liquid crystal display device and away from a region where the liquid crystal panel will be cut away from the mother substrate assembly. Formation of the main UV sealant 1670*b* is preceded by the formation of the auxiliary UV sealant 1670*a*. The auxiliary UV sealant 1670*a* may be formed in a straight line as shown. Alternatively, the auxiliary UV sealant 1670*a* may be formed in a curved line or other shape as long as it is formed in a dummy region.

Monomers or oligomers each having both ends coupled to the acrylic group, mixed with an initiator are used as the UV sealants 1670*a* and 1670*b*. Alternatively, monomers or oligomers each having one end coupled to the acrylic group and the other end coupled to the epoxy group, mixed with an initiator are used as the UV sealants 1670*a* and 1670*b*.

Also, the liquid crystal 1607 may be contaminated if it comes into contact with the main UV sealant 1670*b* before the main UV sealant 1670*b* is hardened. Accordingly, the liquid crystal 1607 may preferably be applied on the central part of the lower substrate 1651. In this case, the liquid crystal 1607 is gradually spread even after the main UV sealant 1670*b* is hardened. Thus, the liquid crystal 1607 is uniformly distributed on the substrate.

The liquid crystal 1607 may be formed on the upper substrate 1652 while the UV sealants 1670*a* and 1670*b* may be formed on the lower substrate 1651. Alternatively, the liquid crystal 1607 and the UV sealants 1670*a* and 1670*b* may be formed on one substrate. In this case, there is an imbalance between the processing times of the substrate with the liquid crystal and the sealants and the substrate without the liquid crystal and the sealants in the manufacturing process. For this reason, the total manufacturing process time increases. Also, when the liquid crystal and the sealants are formed on one substrate, the substrate may not be cleaned even if the sealant contaminates the panel before the substrates are attached to each other.

Accordingly, a cleaning process for cleaning the upper substrate 1652 may additionally be provided before the attaching process after the UV sealants 1670*a* and 1670*b* are formed on the upper substrate 1652.

Meanwhile, spacers may be formed on either of the two substrates 1651 and 1652 to maintain a cell gap. Preferably, the spacers may be formed on the upper substrate 1652.

Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to the gate lines or data lines. Preferably, column spacers may be used for the large sized substrate since the ball spacers may cause an uneven cell gap for the large sized substrate. The column spacers may be formed of a photosensitive organic resin.

Figure 54C:
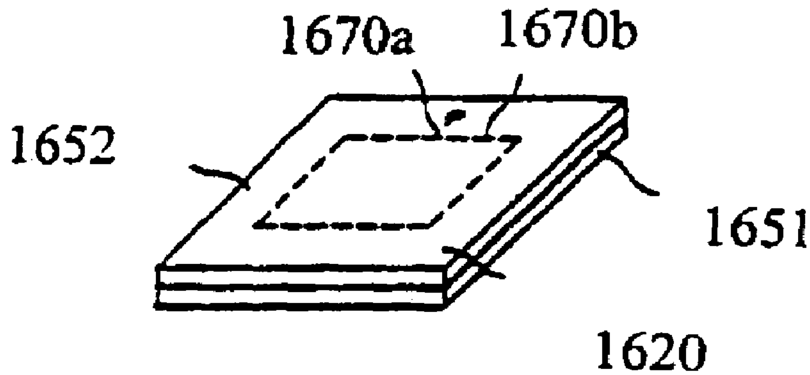

As shown in FIG. 54C, the lower substrate 1651 and the upper substrate 1652 are attached to each other by the following processes which are described herein in detail. First, one of the substrates having the liquid crystal dropped thereon is placed at the lower side. The other substrate is placed at the upper side by turning by 180 degrees so that its portion having layers faces into the substrate at the lower side. Thereafter, the substrate at the upper side is pressed, so that both substrates are attached to each other. Alternatively, the space between the substrates may be maintained under the vacuum state so that both substrates are attached to each other by releasing the vacuum state.

Figure 54D:
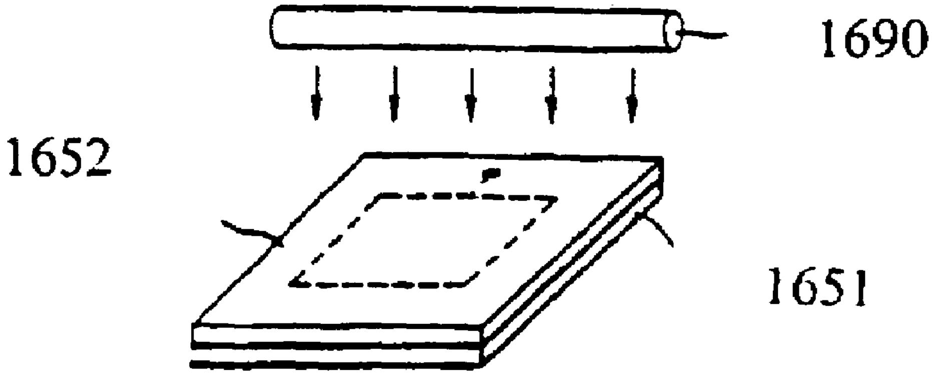

Then, as shown in FIG. 54D, UV light is irradiated upon the attached substrates through a UV irradiating device 1690.

Upon irradiating the UV light, monomers or oligomers activated by an initiator constituting the UV sealants are polymerized and hardened, thereby bonding the lower substrate 1651 to the upper substrate 1652.

If monomers or oligomers each having one end coupled to the acrylic group and the other end coupled to the epoxy group, mixed with an initiator are used as the UV sealants, the epoxy group is not completely polymerized by the application of UV light. Therefore, the sealants may have to be additionally heated at about 120° C. for one hour after the UV irradiation, thereby hardening the sealants completely.

Afterwards, although not shown, the bonded substrates are cut into a unit cells and final test processes are performed.

In the cutting process, a scribing process is performed by forming a cutting line on surfaces of the substrates with a pen or wheel of a material having hardness greater than that of glass, such as diamond, and then the substrates are cut along the cutting line by mechanical impact (breaking process). Alternatively, the scribing process and the breaking process may simultaneously be performed using a pen or wheel of a diamond or other hard material.

The cutting line of the cutting process is formed between the start point of the auxiliary sealant 1670*a*, which may be a blob A of sealant, and a main UV sealant 1670*b* across the initially formed auxiliary UV sealant 1670*a*. Consequently, a substantial portion of the excessively distributed auxiliary UV sealant 1670*a* is removed.

FIGS. 55A to 55D are perspective views illustrating a process of irradiating UV light in the method of manufacturing an LCD device according to the another embodiment of the present invention. This embodiment is similar to the previous embodiment except for the UV irradiation process. In this embodiment, a region where the sealants are not formed is covered with a mask before the UV light is irradiated. Since the other elements of the second embodiment are the same as those of the first embodiment, the same reference numerals will be given to the same elements and their detailed description will be omitted.

If the UV light is irradiated upon the entire surface of the attached substrates, the UV light may deteriorate characteristics of devices such as a thin film transistor on the substrate and may change a pre-tilt angle of an alignment film formed for the initial alignment of the liquid crystal.

Therefore, in the second embodiment of the present invention, the UV light is irradiated when the area where no sealant is formed is covered with a mask.

Figure 55A:
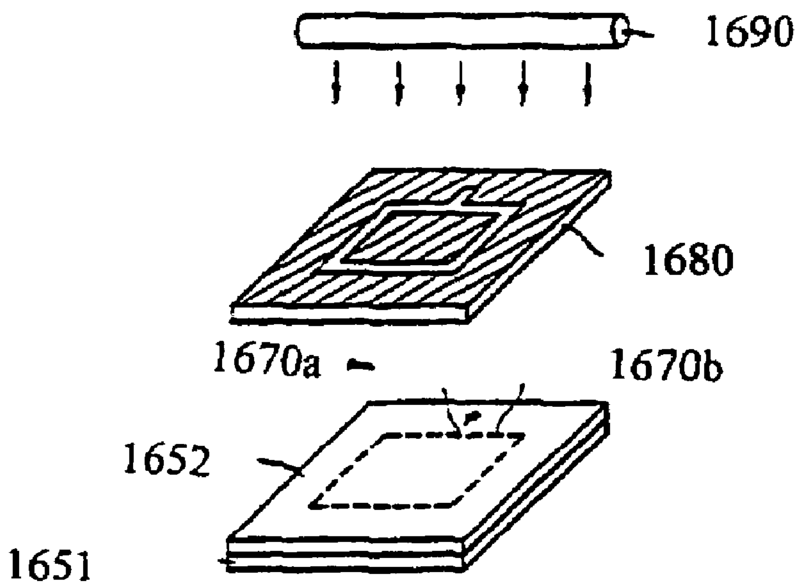
FIGS. 55A to 55D are perspective views illustrating a process of forming a UV sealant in manufacturing an LCD device according to another embodiment of the present invention of the present invention.

Referring to FIG. 55A, a region where the auxiliary UV sealant 1670*a* and the main UV sealant 1670*b* are formed is covered with a mask 1680. The mask 1680 is placed at an upper side of the attached substrates, and the UV light is irradiated.

Also, the mask 1680 may be placed at a lower side of the attached substrates. Also, although the UV light is irradiated upon the upper substrate 1652 of the attached substrates as shown, the UV light may be irradiated upon the lower substrate 1651 by turning the attached substrates.

If the UV light from a UV irradiating device 1690 is reflected and irradiated upon an opposite side, it may deteriorate characteristics of devices, such as the thin film transistor on the substrate and the alignment film, as described above. Therefore, masks are preferably formed at lower and upper sides of the attached substrates.

Figure 55B:
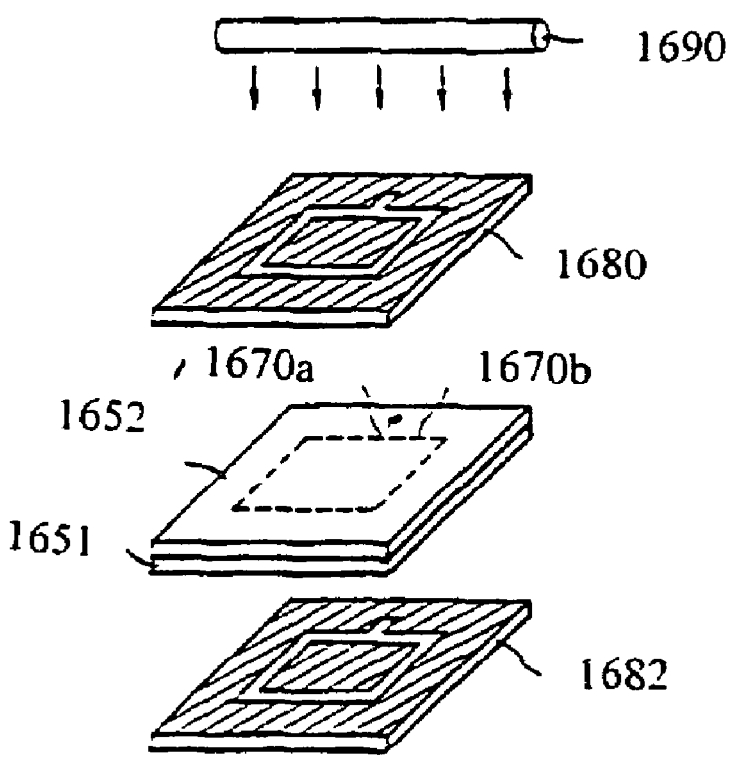

That is, as shown in FIG. 55B, masks 1680 and 1682 that cover the region where the sealants 1670*a* and 1670*b* are not formed are placed are at upper and lower sides of the attached substrates. The UV light is then irradiated thereupon.

Meanwhile, since the auxiliary UV sealant 1670*a* does not act as a sealant, it does not require hardening. Also, since the region of the auxiliary UV sealant 1670*a* overlaps the cell cutting line during the later cell cutting process, it is more desirable for the cell cutting process that the auxiliary UV sealant 1670*a* is not hardened.

Figure 55C:
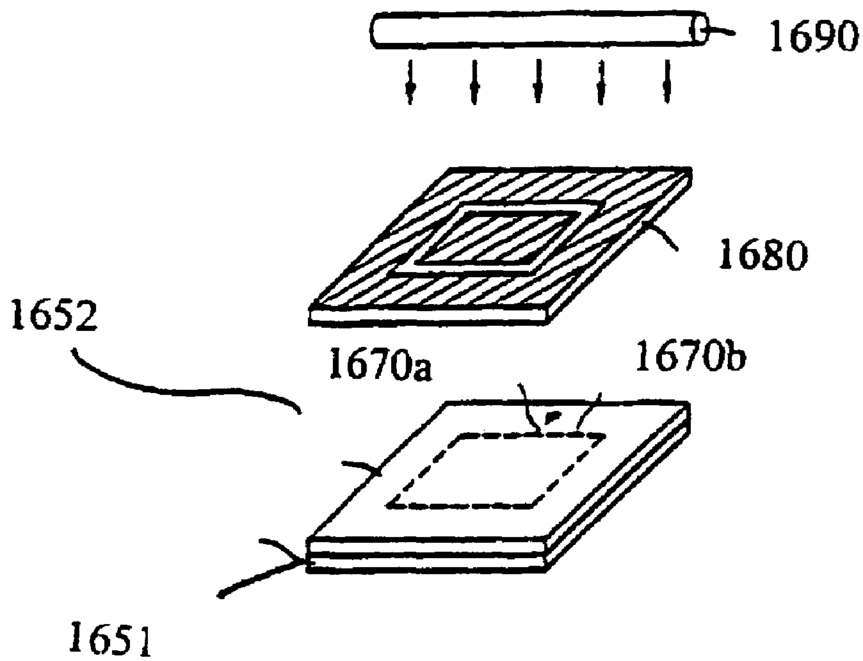
Figure 55D:
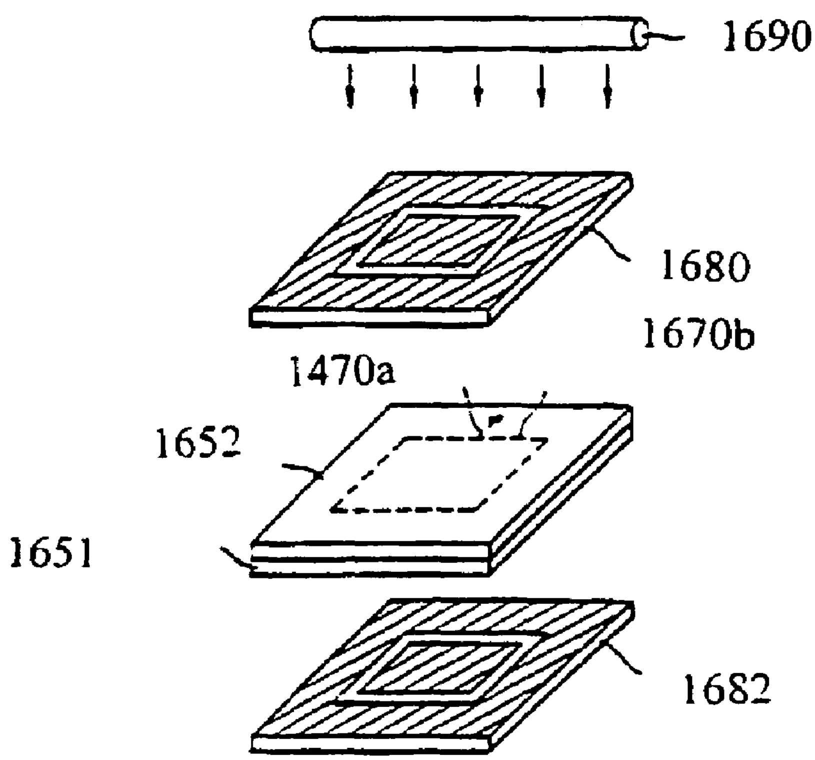

Referring to FIGS. 55C and 55D, the auxiliary UV sealant 1670*a* is not hardened by irradiating the UV light when only the area where the main UV sealant 1670*b* is not formed is covered with the mask, i.e., the auxiliary sealant 1670*a* is also covered by a mask.

In this case, in FIG. 55C, the UV light is irradiated with the mask 1680 in place at a lower or upper side of the attached substrates. In FIG. 55D, the UV light is irradiated when the mask 1680 is respectively placed at lower and upper sides of the attached substrates.

Figure 56A:
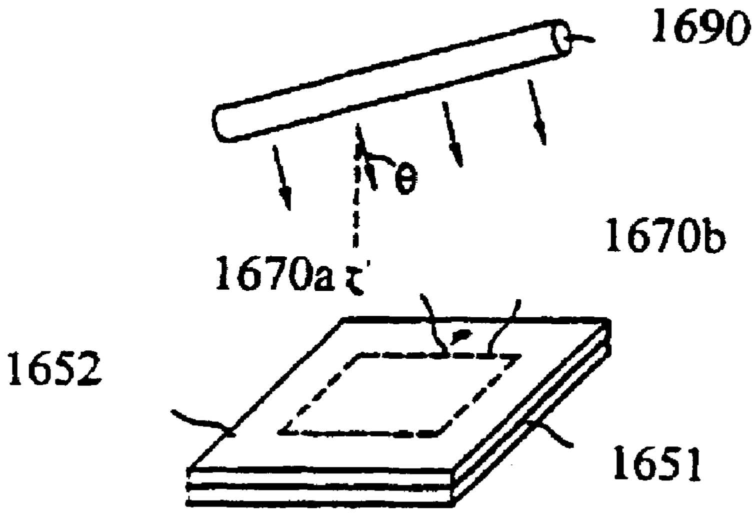
FIGS. 56A and 56B are perspective views illustrating a process of forming a UV sealant in a method of manufacturing an LCD device according to another embodiment of the present invention of the present invention.
Figure 56B:
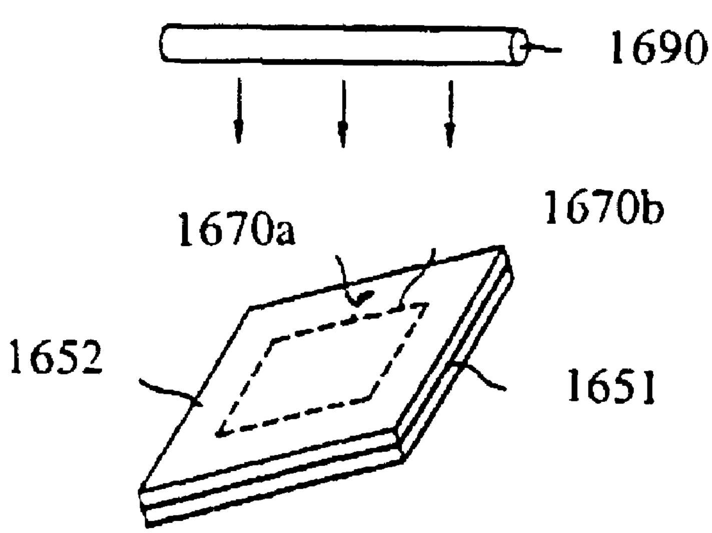

FIGS. 56A and 56B are perspective views illustrating a process of forming a UV sealant in a method of manufacturing an LCD device according to the third embodiment of the present invention of the present invention.

Another embodiment is identical to the previous embodiment except for the UV irradiation process. In the third embodiment, the UV light is irradiated at a tilt angle. Since the other elements of the this embodiment are identical to those of the previous embodiment, the same reference numerals will be given to the same elements and their detailed description will be omitted.

If a light-shielding layer and a metal line such as gate and data lines are formed on a region where the UV sealant 1670 is formed, the UV light is not irradiated upon the region, thereby failing to harden the sealant. For this reason, adherence between the lower and upper substrates is reduced.

Therefore, in the this embodiment of the present invention, the UV light is irradiated at a tilt angle upon the substrate where the UV sealant is formed, so that the UV sealant is hardened even if the light-shielding layer or the metal line layer is formed between the UV irradiating surface and the sealant.

To irradiate the UV light at a tilt angle, as shown in FIG. 56A, the attached substrates are horizontally arranged and a UV irradiating device 1690 is arranged at a tilt angle of θ. Alternatively, as shown in FIG. 56B, the attached substrates may be arranged at a tilt angle and the UV irradiating device 1690 may horizontally be arranged.

Also, the UV light may be irradiated at a tilt angle when the area where the sealant is not formed is covered with the mask as shown in FIGS. 44A to 44D.

Figure 57:
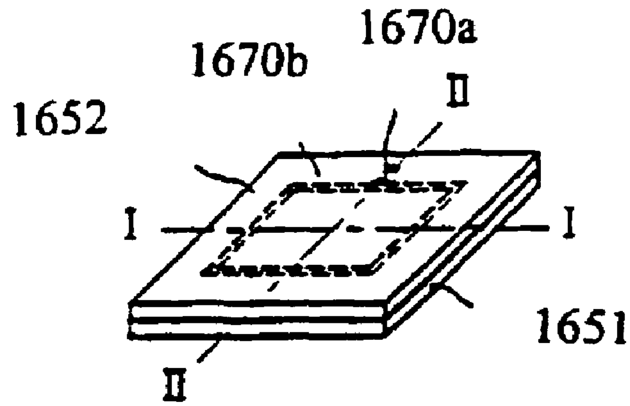
FIG. 57 is a perspective view illustrating an LCD device according to another embodiment of the present invention.

FIG. 57 is a perspective view illustrating an LCD device according to another embodiment of the present invention, and FIGS. 47A and 47B are sectional views taken along lines I-I and II-II of FIG. 57.

Figure 58A:
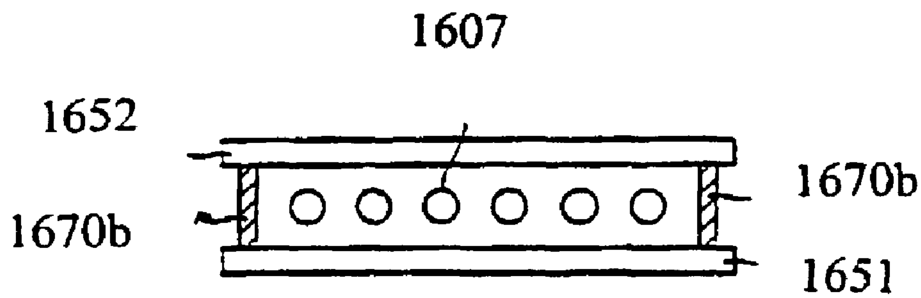
FIGS. 58A and 58B are sectional views taken along lines I-I and II-II of FIG. 57.
Figure 58B:
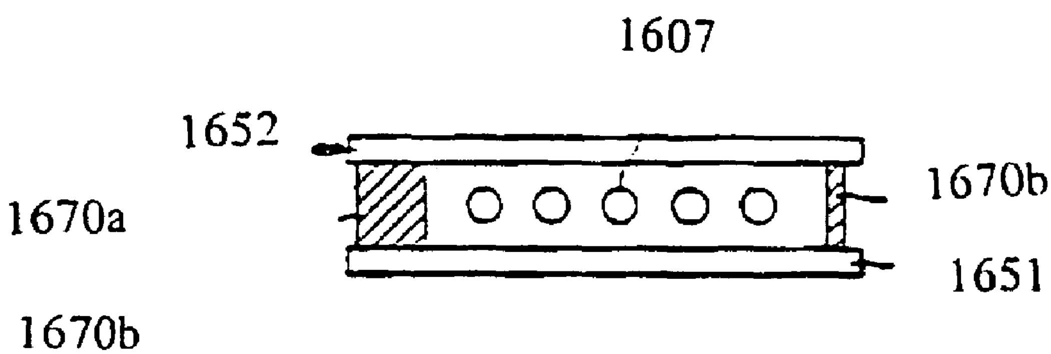

As shown in FIGS. 57 and 58, an LCD device according to the present invention includes lower and upper substrates 1651 and 1652, a UV sealant between the lower and upper substrates 1651 and 1652, having an auxiliary UV sealant 1670*a* in a dummy area and a perimeter of main UV sealant 1670*b* connected to the auxiliary UV sealant 1670*a*, and a liquid crystal layer 1607 between the lower and upper substrates 1651 and 1652.

At this time, although not shown, a thin film transistor, a pixel electrode, and an alignment film are formed on the lower substrate 1651. A black matrix layer (not shown), a color filter layer (not shown), a common electrode (not shown) and an alignment film (not shown) are formed on the upper substrate 1652. Also, spacers are formed between the lower and upper substrates 1651 and 1652 to maintain a cell gap between the substrates.

As aforementioned, the LCD device and the method of manufacturing the same according to the present invention have the following advantages.

Since the sealant concentrated upon the end of the nozzle of the dispensing device is formed in the dummy area on the substrate, the liquid crystal layer is not contaminated by the attaching process of the substrates and the cell cutting process is easily performed.

Furthermore, if the UV light is irradiated upon the substrate when the mask is formed at the lower and/or upper side of the attached substrates, the UV light is irradiated upon only the region where the UV sealant is formed. In this case, the alignment film formed on the substrate is not damaged and the characteristics of the devices, such as the thin film transistor, are not deteriorated.

Finally, if the UV light is irradiated at a tilt angle, the sealant can be hardened even if the light-shielding layer or the metal line is formed on the sealant, thereby avoiding reducing adherence between the lower and upper substrates.

Figure 59A:
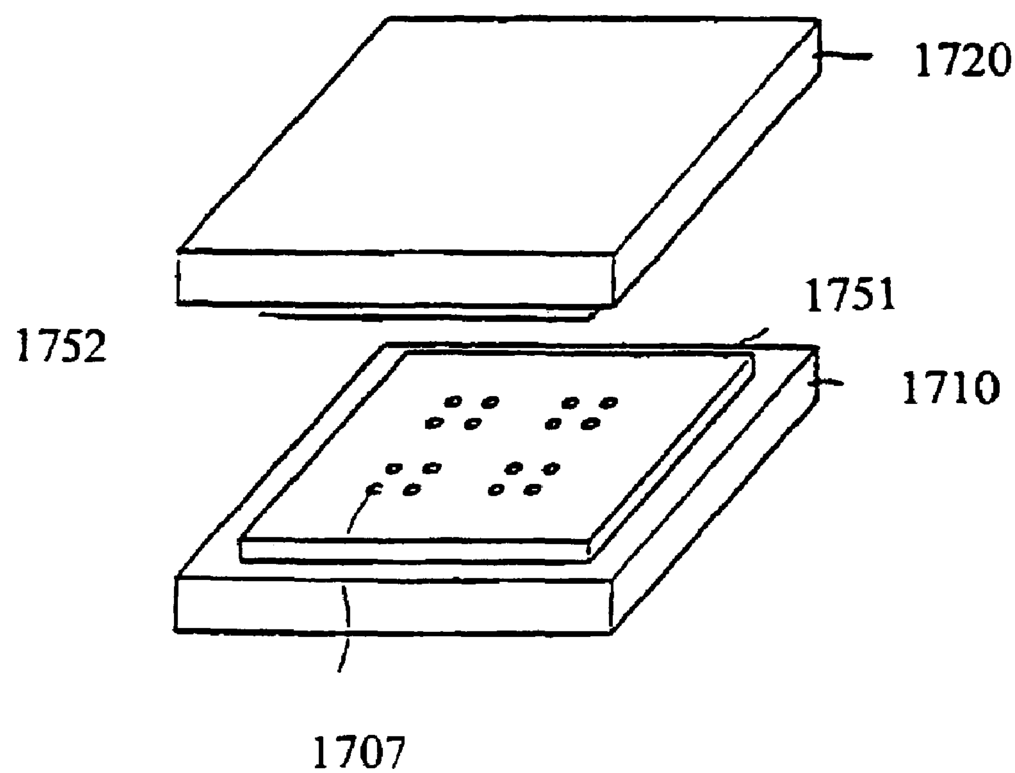
FIGS. 59A to 59C illustrate perspective views showing a bonding method in accordance with another embodiment of the present invention.
Figure 59B:
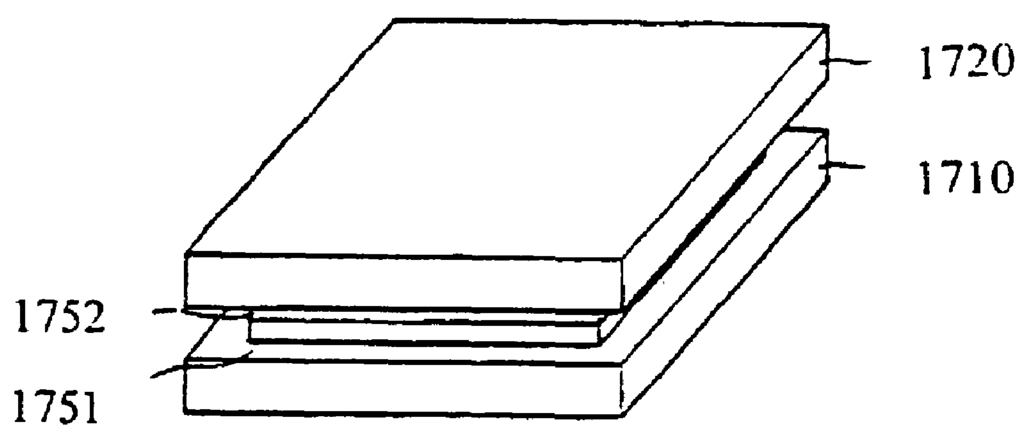
Figure 59C:
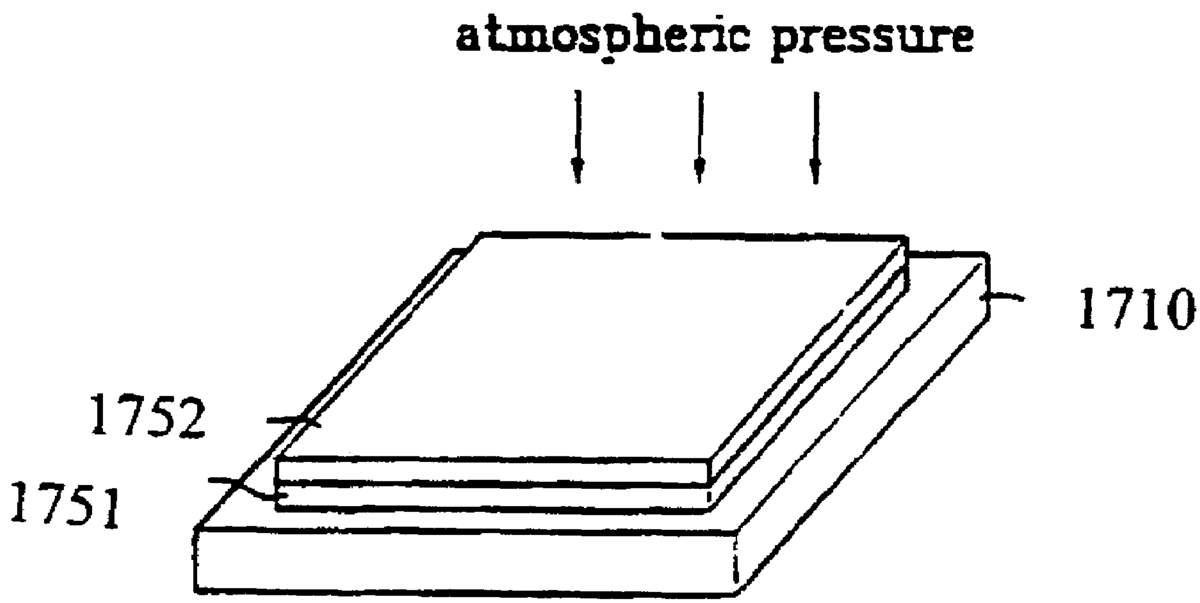

FIGS. 59A to 59C illustrate perspective views showing a bonding method in accordance with the present invention.

Referring to FIG. 59A, a lower substrate 1751 having a liquid crystal 1707 formed thereon is loaded on a lower bonding stage 1710, and an upper substrate 1752 is loaded on an upper pre-bonding stage 1720 such that the surface of the upper substrate 1752 having the liquid crystal formed thereon faces into the lower substrate 1751.

Then, referring to FIG. 59B, the lower substrate 1751 and the upper substrate 1752 are attached under vacuum, and the vacuum is released to apply the atmospheric pressure thereto, thereby completing the attaching process.

Since the attached substrates in the above process have a substantial weight due to the liquid crystal, it will be difficult to move the attached substrates to the later process step by using a vacuum gripping method.

Figure 60A:
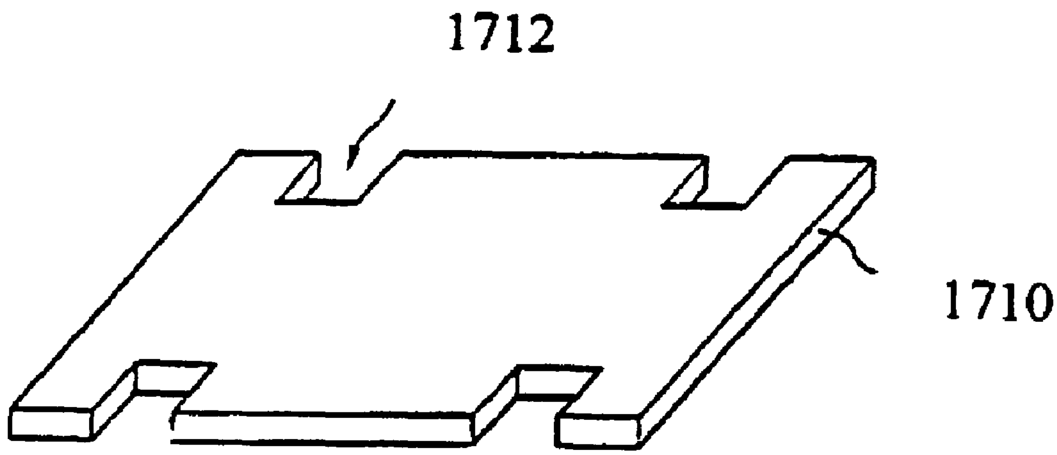
FIG. 60A illustrates a perspective view of a lower bonding stage in accordance with the same embodiment of the present invention.

Consequently, as shown in FIG. 60A, in order to unload the attached substrates from the alignment device, the lower bonding stage 1710 has holes 1712, and a lifter (not shown) is placed under the lower bonding stage 1710. The lifter is capable of moving in up and down directions of the lower bonding stage 1710 through the holes 1712.

Accordingly, upon completion of the attaching process, the lifter moves up through the holes 1712 to lift the attached substrates over the lower bonding stage 1710 leaving a gap between the attached substrates and the lower bonding stage 1710, through which robot arms move in and lift the attached substrates and transfer the attached substrates to a UV irradiating device.

Figure 60B:
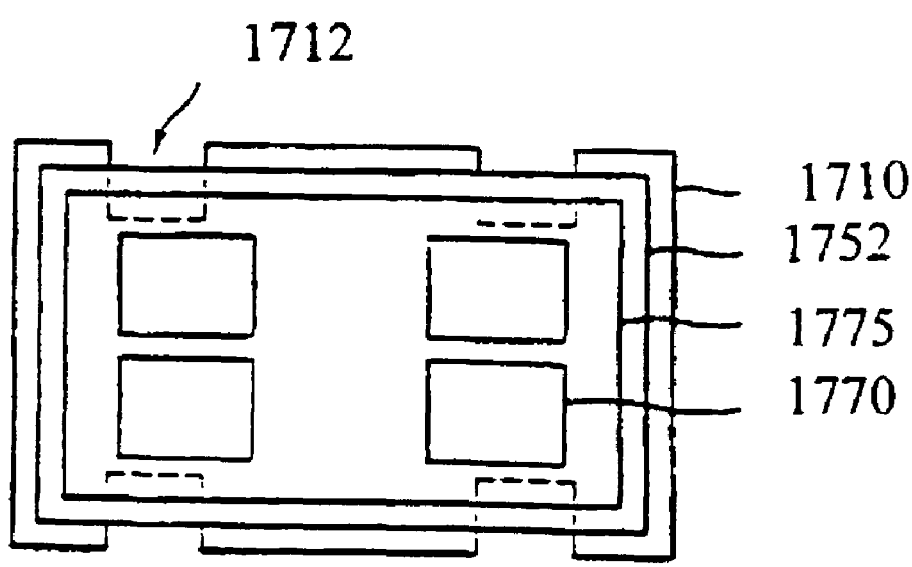
FIG. 60B illustrates an upper substrate placed on the lower bonding stage in FIG. 60A.

FIG. 60B illustrates a plane view of the attached substrates placed on the lower bonding stage 1710 having the holes 1712. Especially, a main UV sealant 1770 and a dummy UV sealant 1775 are formed on the upper substrate 1752 that is placed on the lower bonding stage 1710. A part of the dummy sealant 1775 on the upper substrate 1752 is located over the holes 1712 in the lower bonding stage 1710.

Consequently, bonding of the dummy sealant 1775 over the holes 1712 becomes poor, and results in deformation of the main sealant 1770 pattern at the inside of the dummy sealant 1775 that is not bonded perfectly. This is because air infiltrates through the deformed sealant when the vacuum is released to apply the atmospheric pressure to the attached substrates for bonding the substrates during the attaching process. Therefore, the present invention suggests forming a dual dummy UV sealant outside the main UV sealant to eliminate the foregoing problem.

Figure 61A:
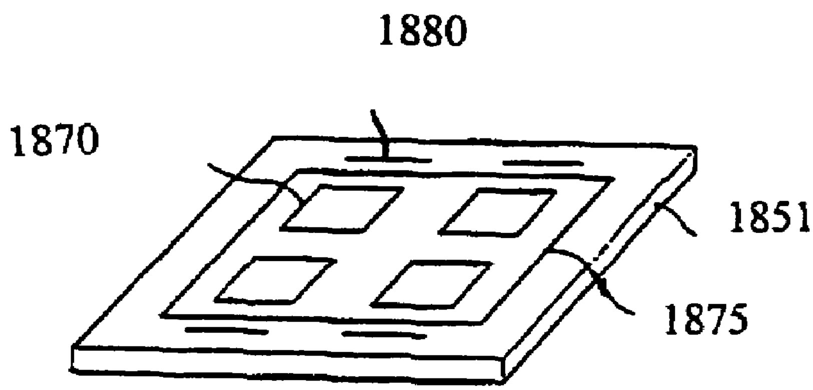
FIGS. 61A to 61C illustrate perspective views of a substrate for a liquid crystal display panel in accordance with the same embodiment of the present invention.
Figure 61B:
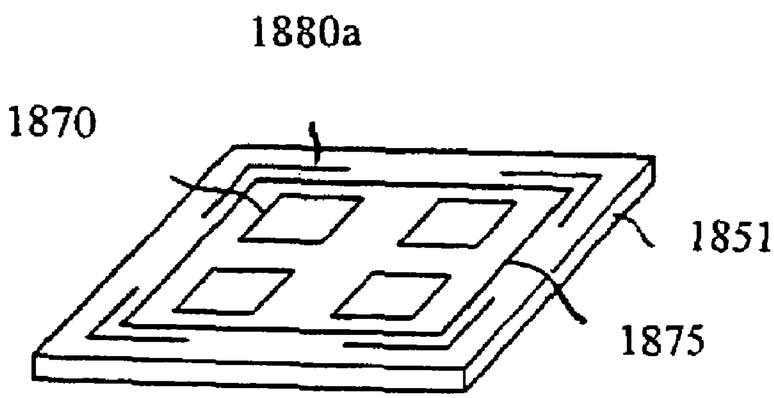
Figure 61C:
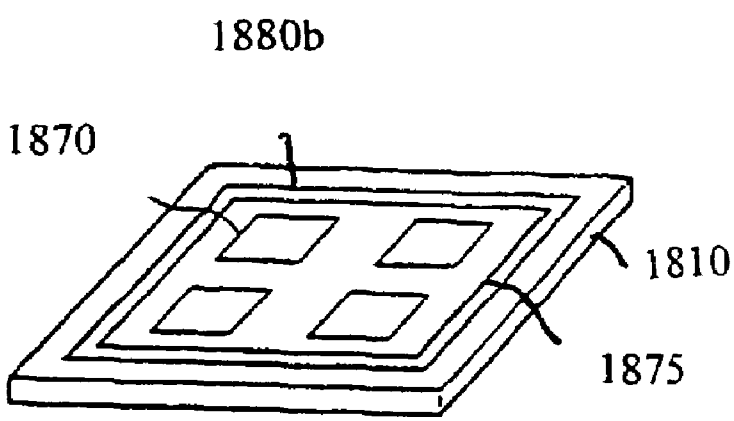

FIGS. 61A to 61C illustrate perspective views of a substrate for a liquid crystal display panel in accordance with the first embodiment of the present invention. As an example, four unit cells are illustrated on the mother substrate in the drawings. However, the number of unit cells may be varied.

Referring to FIGS. 61A to 61C, there are a main UV sealant 1870 formed on a substrate 1851 in a closed line without an injection hole, and a first dummy UV sealant 1875 formed at the dummy region in the outside of the main UV sealant 1870 in a closed line without an injection hole. Also, there may be a second dummy UV sealant 1880, 1880*a*, or 1880*b* at the outside of the first dummy UV sealant 1875.

As shown in FIG. 61A, the second dummy UV sealant 1880 covers at least the area of the lift pin holes of the attaching device, which may be formed in discontinued straight lines at the outside of one side of the first dummy UV sealant 1875.

In general, since the lift pin holes of the attaching device is formed at the longer sides of the substrate for lifting the substrate to prevent bending of the substrate, the second dummy UV sealant 1880 will be formed at the outside of the longer side of the corners at the first dummy UV sealant 1875.

In the meantime, as shown in FIG. 61A, the second dummy UV sealant 1880 is formed in discontinued straight lines on one side of the corner of the first dummy UV sealant 1875. In this embodiment, there may be a possibility that air infiltrates through the other side of the corner where no second dummy UV sealant is formed, thereby deforming the main UV sealant 1870.

As shown in FIG. 61B, the second dummy UV sealant 1880*a* is formed in a 'ㄱ' form as an example at the outside of both sides of the corners of the first dummy UV sealant 1875. The specific shape of the second dummy UV sealant 1880*a* is not required as long as it covers each corner of the outside of the first dummy UV sealant 1875.

Referring to FIG. 61C, the dummy UV sealant 1880*b* may also be formed at the outside of the first dummy UV sealant 1875 in a single closed continued line.

The main, first, and second dummy UV sealants 1870, 1875, 1880, 1880*a*, and 1880*b* are formed of one of monomer and oligomer having both ends coupled with an acryl group mixed with an initiator. Alternatively, one of monomer and oligomer has one end coupled with an acryl group and the other end coupled with an epoxy group mixed with an initiator.

The liquid crystal display panel includes a lower substrate, an upper substrate, and a liquid crystal between the two substrates. A sealant may be formed on either one of the substrates.

When the substrate of the LCD shown in one of FIGS. 61A to 61C is a lower substrate, the substrate 1851 has a plurality of gate lines, data lines, thin film transistors, and pixel electrodes. When the substrate is an upper substrate, the substrate 1851 has a black matrix, a color filter layer, and a common electrode.

Moreover, a plurality of column spacers may be formed on one of the substrates for maintaining a cell gap. The column spacers may be formed at the region opposite to the region of the gate lines or the data lines. For example, the column spacers may be formed of photosensitive organic resin.

FIGS. 62A to 62E illustrate perspective views of a method for fabricating a liquid crystal display panel in accordance with the present invention. As an example, four unit cells are shown in the drawings. However, the number of unit cells may be varied.

Figure 62A:
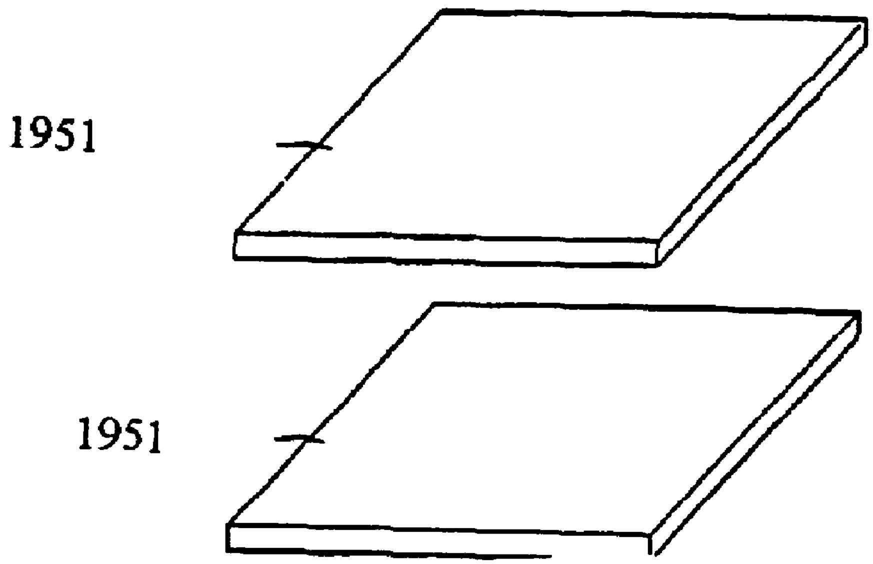
FIGS. 62A to 62E illustrate perspective views of a method for fabricating a liquid crystal display panel in accordance with the same embodiment of the present invention.

Referring to FIG. 62A, a lower substrate 1951 and an upper substrate 1952 are prepared for further processes. A plurality of gate lines and data lines (both not shown) are formed on the lower substrate 1951 to cross one another defining a plurality of pixel regions, a thin film transistor having a gate electrode, a gate insulating film, a semiconductor layer, an ohmic contact layer, and source/drain electrodes. A protection layer is formed at each crossed points of the gate lines and the data lines. A plurality of pixel electrodes are formed to be connected to the thin film transistors at the pixel regions.

An orientation film is formed on the pixel electrodes for an initial orientation of the liquid crystal. The orientation film may be formed of one of polyamide or polyimide group compound, polyvinylalcohol (PVA), and polyamic acid by rubbing orientation. Alternatively, a photosensitive material, such as polyvinvylcinnamate (PVCN), polysilioxanecinnamate (PSCN), and cellulosecinnamate (CelCN) group compound may be selected for the orientation film by using photo orientation.

A black matrix is formed on the upper substrate 1952 for shielding the light leakage from the gate lines, the data lines, and regions of the thin film transistor regions. A color filter layer of red, green, and blue is formed thereon. A common electrode is formed on the color filter layer. An overcoat layer may be formed between the color filter layer and the common electrode, additionally. The orientation film is formed on the common electrode.

Silver (Ag) dots are formed on the outer periphery of the lower substrate 1951 for applying a voltage to the common electrode on the upper substrate 1952 after the two substrates 1951 and 1952 are attached to each other. The silver dots may be formed on the upper substrate 1952.

In an in-plane switching (IPS) mode LCD, a lateral field is induced by the common electrode formed on the lower substrate. The pixel electrode is also formed on the lower substrate, and the silver dots are not formed.

Figure 62B:
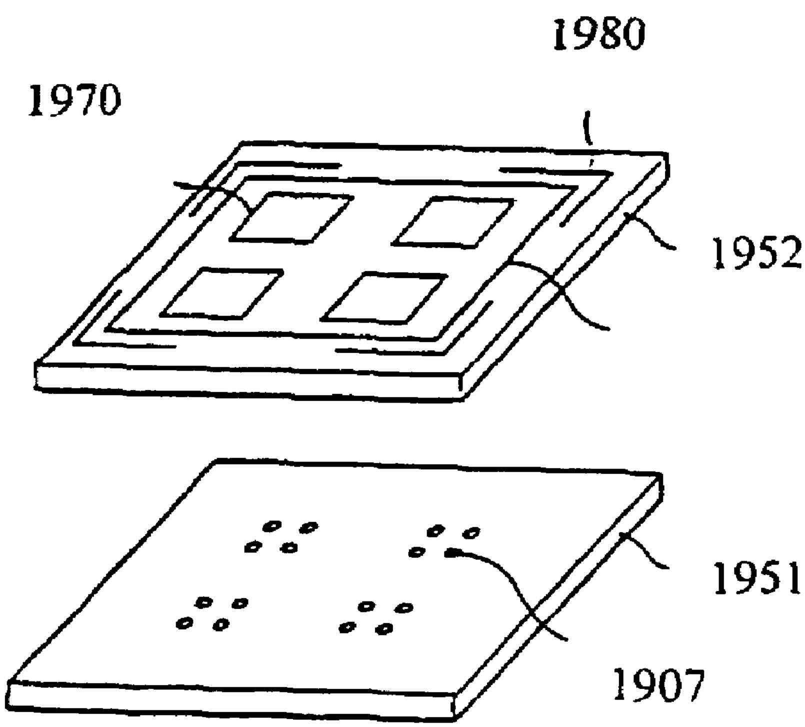
Figure 62C:
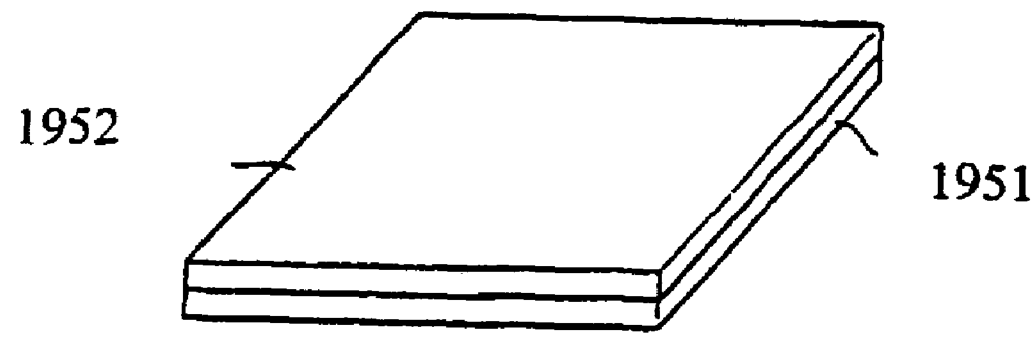

Referring to FIG. 62C, a main UV sealant 1970 is coated on the upper substrate 1952 in a closed line. A first dummy UV sealant 1975 is also formed in a closed line at the dummy region outside of the main UV sealant 1970.

Although FIG. 62B illustrates that the second dummy UV sealant 1980 is formed at the outside of each corner of the first dummy UV sealant 1975 in a ㄱ-form, the second dummy UV sealant 1980 may be formed at the outside of one side of the first dummy UV sealant 1975 in a discontinuous straight line. Alternatively, it may also be formed at the outside of the first dummy UV sealant 1975 in a continued closed line. Detailed patterns of the foregoing second dummy UV sealant 1980 are similar to those of FIGS. 61A to 61C.

The sealant may be formed by using one of screen printing and dispensing method. When the sealant is coated by the screen printing method, it may damage the orientation film formed on the substrate. This is because the screen comes into contact with the substrate. In addition, it is not economically feasible because a large amount of the sealant may be wasted in the screen printing method when the substrate is large.

The main, first, and second dummy UV sealant 1970, 1975, and 1980 are formed of one of monomer and oligomer having both ends coupled with an acryl group mixed with an initiator. Alternatively, one of monomer and oligomer has one end coupled with an acryl group and the other end coupled with an epoxy group mixed with an initiator.

A liquid crystal 1907 is then dropped onto the lower substrate 1951 to form the liquid crystal layer.

The liquid crystal 1907 may be contaminated when the liquid crystal contacts the main sealant 1970 before the main sealant 1970 is hardened. Therefore, the liquid crystal may have to be dropped onto the central part of the lower substrate 1951 to avoid this problem. The liquid crystal 1907 dropped onto the central part spreads slowly even after the main sealant 1970 is hardened, so that the liquid crystal is distributed throughout the entire substrate with the same concentration.

The drawing illustrates that the liquid crystal 1907 is dropped and the sealants 1970, 1975, and 1980 are formed on the lower substrate 1951. However, the liquid crystal 1907 may be formed on the upper substrate 1952, and the UV sealant 1970, 1975, and 1980 may be coated on the lower substrate 1951.

Moreover, the liquid crystal 1907 and the UV sealant 1970, 1975, and 1980 may be formed on the same substrate. However, when the liquid crystal and the sealants are formed on different substrates, a fabrication time may be shortened. When the liquid crystal and the sealants are formed on the same substrate, there occurs an unbalance in processes between the substrate having the liquid crystal and the sealant and the substrate without the liquid crystal and the sealant. As a result, the substrate cannot be cleaned when the sealant is contaminated even before attaching the substrates.

Therefore, after the UV sealants 1970, 1975, and 1980 are coated on the upper substrate 1952, a cleaning process may be added for cleaning the upper substrate 1952 before the attaching process.

Moreover, a plurality of spacers (not shown) may be formed on either of the two substrates 1951 or 1952 for maintaining a cell gap. A plurality of ball spacers mixed with a solution at an appropriate concentration may be sprayed at a high pressure onto the substrate from a spray nozzle. Alternatively, a plurality of column spacers may be formed on the substrate opposite to the regions of the gate lines or data lines. The column spacers may be used for the large sized substrate since the ball spacers may form an uneven cell gap in the large sized substrate. The column spacers may be formed of photosensitive organic resin.

Referring to FIG. 62C, the lower substrate 1951 and the upper substrate 1952 are attached to each other. The lower substrate 1951 and the upper substrate 1952 may be attached, by placing the lower substrate 1951 with the dropped liquid crystal on the lower part, rotating the upper substrate 1952 by 180 degrees such that the side of the upper substrate having the liquid crystal faces into the upper surface of the lower substrate 1951, and pressing the upper substrate 1952, or by evacuating the space between the two substrates 1951 and 1952 into vacuum and releasing the vacuum, thereby attaching the two substrates 1951 and 1952.

Figure 62D:
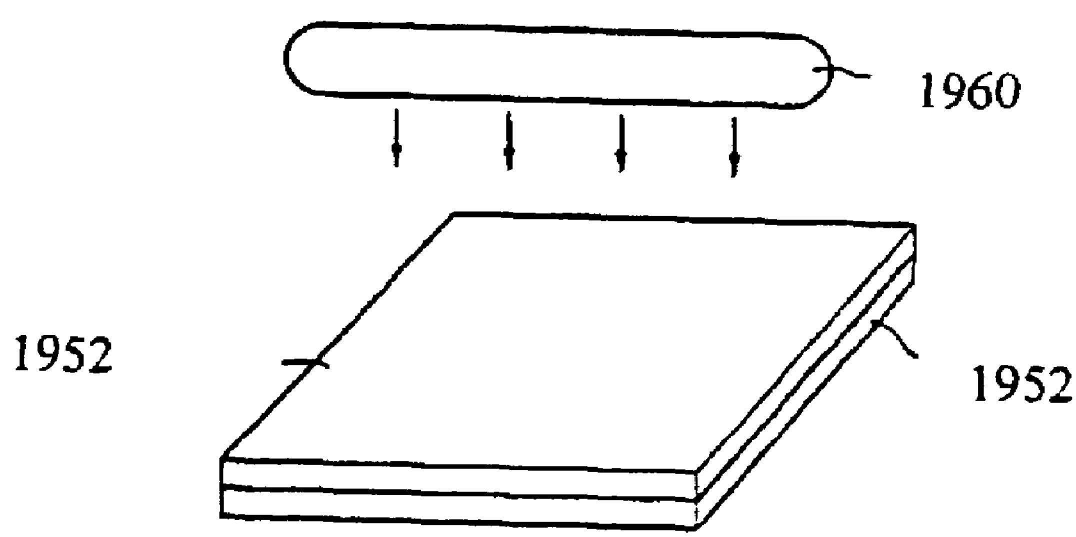
Figure 62E:
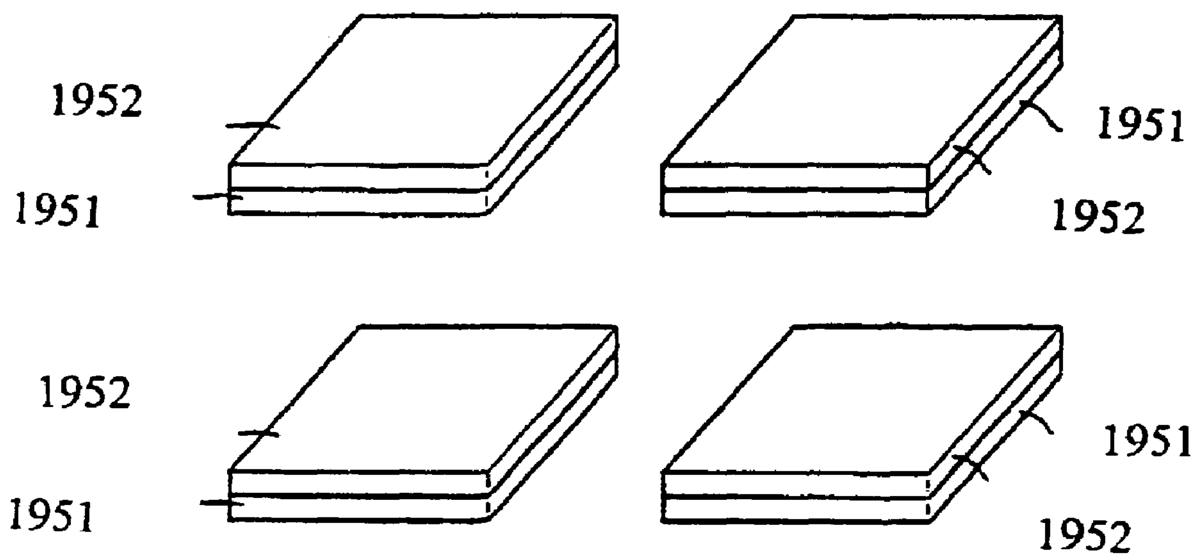

Referring to FIG. 62D, a UV ray is irradiated to the attached substrates 1951 and 1952 by using a UV irradiating device 1990. Upon irradiation of the UV ray thereto, one of monomer and oligomer in the UV sealants 1970, 1975, and 1980 activated by an initiator is polymerized and hardened, thereby bonding the lower substrate 1951 and the upper substrate 1952.

When monomer or oligomer each having one end coupled with an acrylic group and the other end coupled with an epoxy group mixed with an initiator is used as the UV sealant 1970, 1975 and 1980, the epoxy group is not reactive with the UV ray. Thus, the sealant has to be heated at about 120° C. for one hour in addition to the UV ray irradiation for hardening the sealant.

In the UV irradiation, if the UV ray is irradiated onto the entire surface of the bonded substrates, the UV ray may affect the device characteristics of the thin film transistors, and the like on the substrates. As a result, a pretilt angle of the orientation film for the initial orientation of the liquid crystal may be changed due to the UV irradiation.

Figure 63:
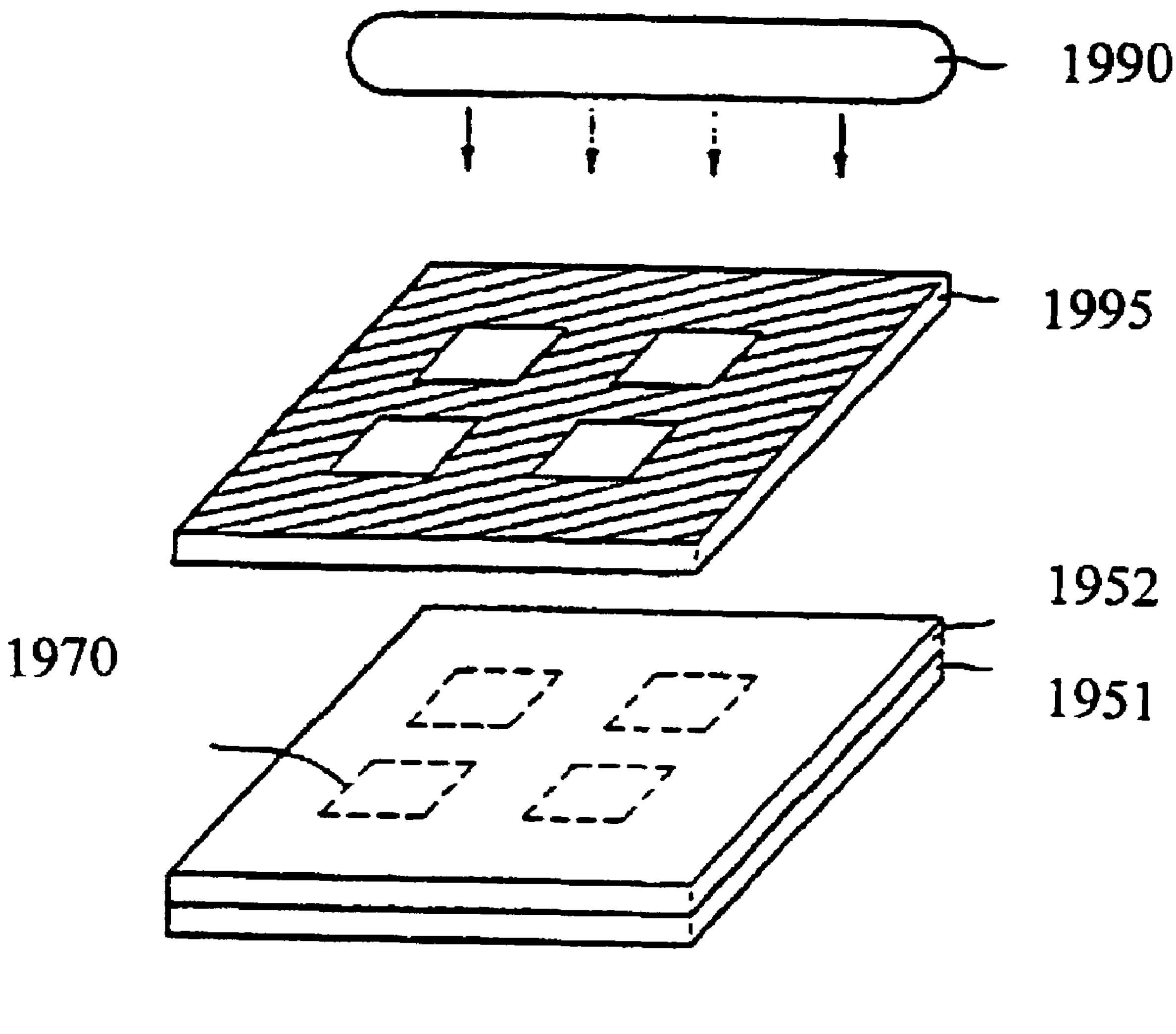
FIG. 63 is a perspective view to illustrate a UV irradiation process in a method for fabricating a liquid crystal display panel in accordance with a different embodiment of the present invention.

Therefore, as shown in FIG. 63, the UV ray is irradiated with a mask 1995 placed between the bonded substrates 1951 and 1952 and the UV irradiating device 1990 for masking the active region in the main UV sealant 1970.

Referring back to FIG. 62E, the bonded substrates are cut into a plurality of unit cells after the UV irradiation. After scribing the surface of the bonded substrates by a scriber, such as a diamond pen having a hardness higher than glass, a material of the substrates (scribing process), a mechanical impact is given along the scribing line (breaking process), thereby obtaining a plurality of unit cells. Alternatively, a cutting apparatus having a toothed wheel may be used to carry out the scribing process and the breaking process at the same time.

When the cutting apparatus is used for cutting and breaking at the same time, an equipment space and a cutting time period may be reduced.

The scribing lines (not shown) for cutting the cells are formed between the main UV sealant 1970 and the first dummy UV sealant 1975. Therefore, after the cell cutting process, the unit cell has no first and second dummy UV sealants 1975 and 1980.

A final inspection (not shown) is carried out after the cell cutting process. The final inspection determines whether there are defects before the substrates cut into the unit cells are assembled for a module. The examination is performed by operating pixels with an applied voltage thereto.

Figure 64:
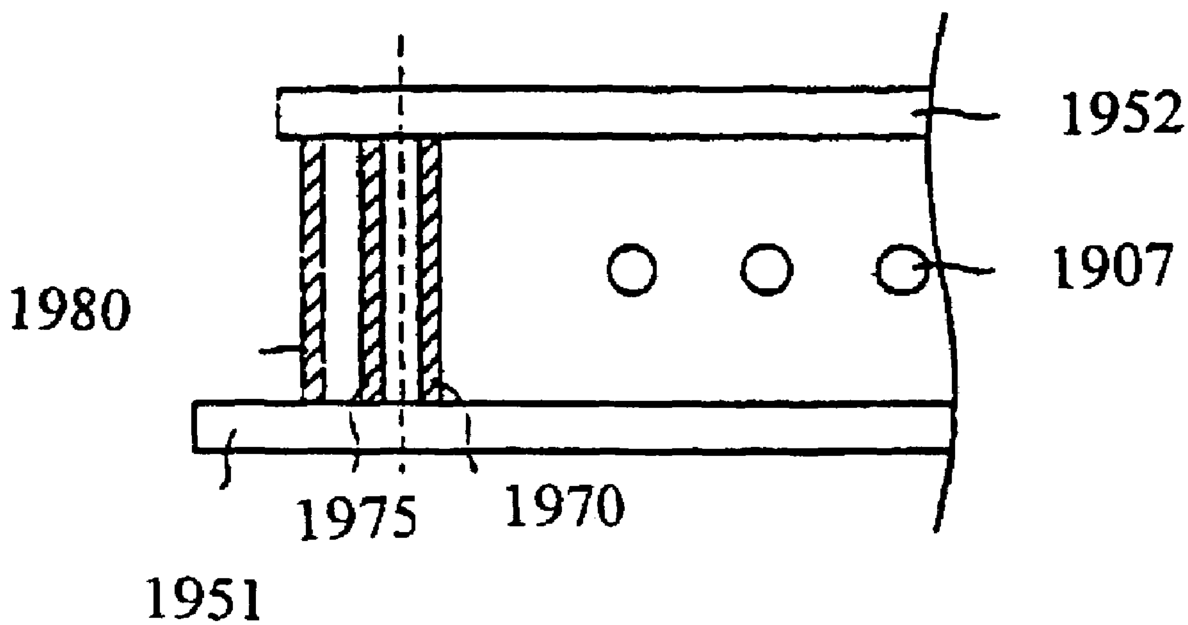
FIG. 64 illustrates a partial cross-sectional view of a liquid crystal display panel in accordance with the previous embodiment of the present invention.

FIG. 64 is a partial cross-sectional view of an LCD panel in accordance with the first embodiment of the present invention, illustrating a part of the LCD panel before the cell cutting process.

In FIG. 64, the LCD panel includes a lower substrate 1951 and an upper substrate 1952, arranged to be spaced apart from each other.

The lower substrate 1951 has a plurality of gate lines, data lines, thin film transistors, and pixel electrodes. The upper substrate 1952 has a black matrix, a color filter layer, and a common electrode. An IPS mode LCD panel has the common electrode formed on the lower substrate 1951.

There are a plurality of spacers between the two substrates 1951 and 1952 for maintaining a cell gap. The spacers may be ball spacers spread on the substrate, or column spacers formed on the substrate. The column spacers may be formed on the upper substrate 1952.

There are a main UV sealant 1970 in a closed line between the two substrates 1951 and 1952, a first dummy UV sealant 1975 in a closed line at the outside of the main UV sealant 1970, and a second dummy UV sealant 1980 at the outside of the first dummy UV sealant 1975.

As explained, the second dummy UV sealant may have different patterns.

There is a liquid crystal layer 1907 within the boundary of the main UV sealant 1970 between the two substrates 1951 and 1952.

As has been explained, the LCD panel and the method for fabricating the same of the present invention have the following advantage.

A dual dummy UV sealant provided for protecting the main UV sealant prevents deformation of the main UV sealant.

Figure 65A:
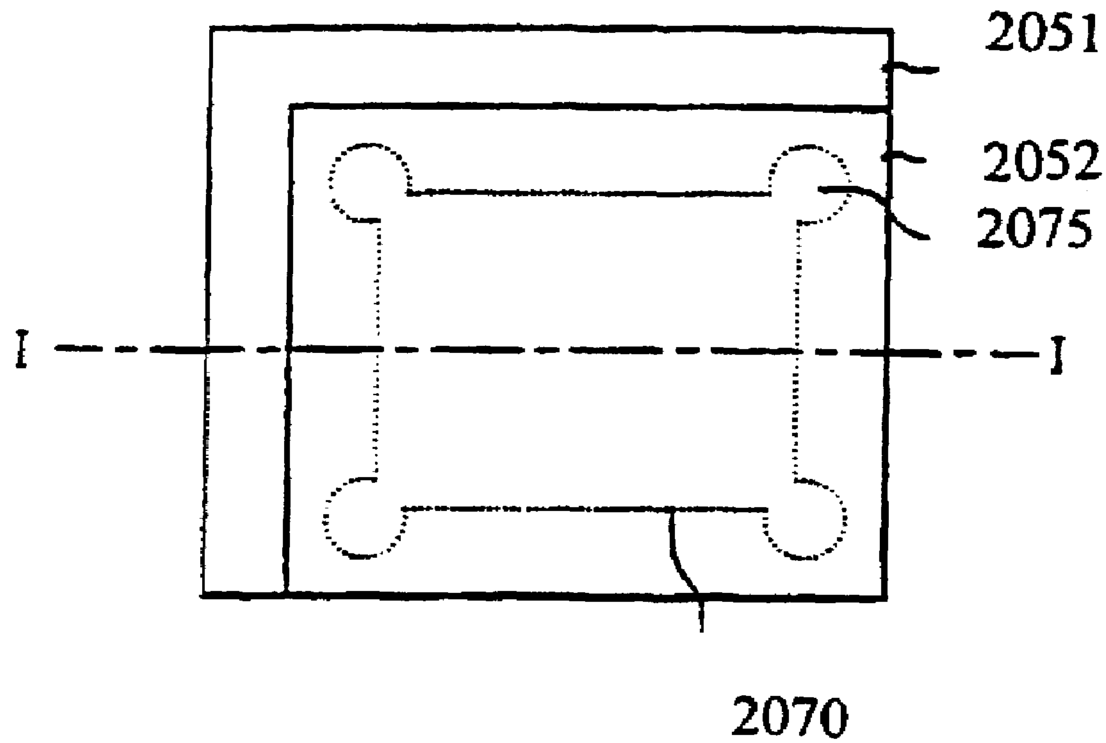
FIG. 65A is a plan view of an LCD device according to the previous embodiment of the present invention.
Figure 65B:
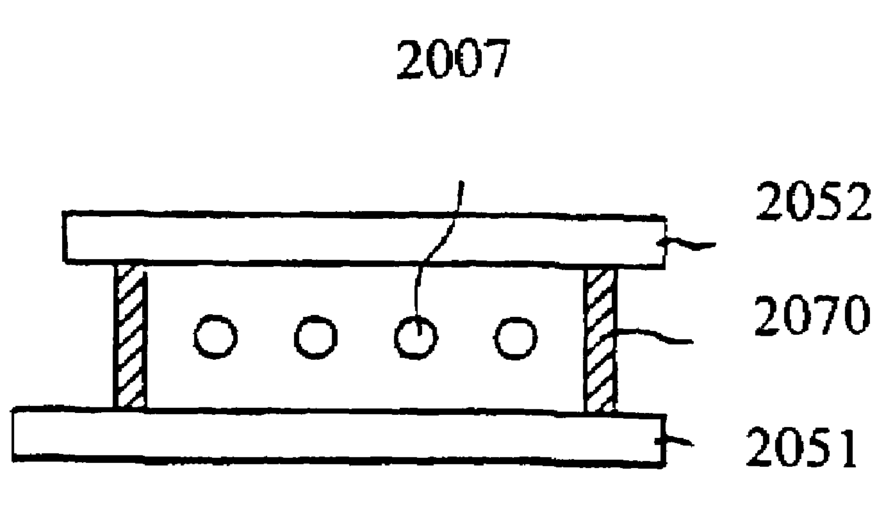
FIG. 65B is a sectional view taken along line I-I of FIG. 54A.

FIG. 65A is a plan view of an LCD device according to an embodiment of the present invention, and FIG. 65B is a sectional view taken along line I-I of FIG. 65A.

As shown in FIGS. 65A and 65B, an LCD device according to the first embodiment of the present invention includes a lower substrate 2051, an upper substrate 2052, a sealant 2070 that is at least partially curable by ultraviolet (UV) light formed between the lower and upper substrates 2051 and 2052, and a liquid crystal layer 2007 formed within a volume formed by the UV sealant 2070 between the lower and upper substrates 2051 and 2052.

The UV sealant 2070 is patterned to form a part 2075 for controlling a liquid crystal flow at four corner regions. The part 2075 is formed to receive excess liquid crystal from an active region of the LCD device, such as a cavity, reservoir or well. Therefore, if the liquid crystal is applied excessively, i.e., overfilled, the excess liquid crystal enters into the part 2075 away from an active region.

Also, even if the liquid crystal expands during a heating process, the excess liquid crystal enters into the part 2075 so that overfilling of the liquid crystal in the active region does not occur. If the expanded liquid crystal shrinks, the liquid crystal filled in the part 2075 moves to the active region.

The size of the part 2075 can appropriately be adjusted and may have various shapes such as a round, triangular, rectangular, polygonal, or any other shape as would be appreciated by one of skill in the art.

Although not shown, a thin film transistor and a pixel electrode are formed on the lower substrate 2051. The thin film transistor includes a gate electrode, a gate insulating layer, a semiconductor layer, an ohmic contact layer, and source/drain electrodes.

Although not shown, a light-shielding layer, a color filter layer, and a common electrode are formed on the upper substrate 2052. The light-shielding layer shields light leakage from a region other than the pixel electrode. Additionally, an overcoat layer (not shown) may be formed on the color filter layer. In an In-Plane Switching (IPS) mode LCD device, the common electrode is formed on the lower substrate 2051.

The part 2075 formed by a pattern of the UV sealant 2070 corresponds to a region where the light-shielding layer is formed. Therefore, picture quality characteristics are not deteriorated even if the liquid crystal 2007 is filled imperfectly in the part 2075.

Spacers may be formed between the substrates 2051 and 2052 to maintain a cell gap. Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to gate lines or data lines. Preferably, the column spacers may be formed of a photosensitive organic resin.

FIGS. 66A to 66D are perspective views illustrating a method of manufacturing an LCD device according to the second embodiment of the present invention.

Although the drawings illustrate only one unit cell, a plurality of unit cells may be formed depending upon the size of the substrate.

Figure 66A:
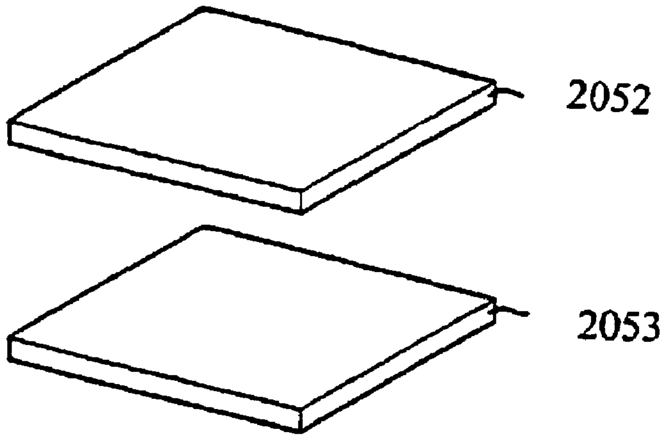
FIGS. 66A to 66D are perspective views illustrating a method of manufacturing an LCD device according to one of the embodiments of the present invention.

Referring to FIG. 66A, a lower substrate 2051 and an upper substrate 2052 are prepared. A plurality of gate and data lines (not shown) are formed on the lower substrate 2051. The gate lines cross the data lines to define a pixel region. A thin film transistor having a gate electrode, a gate insulating layer, a semiconductor layer, an ohmic contact layer, source/drain electrodes, and a protection layer is formed at each crossing point of the gate lines and the data lines. A pixel electrode connected with the thin film transistor is formed in the pixel region.

An alignment film (not shown) is formed on the pixel electrode to initially align the liquid crystal. The alignment film may be formed of polyamide or polyimide based compound, polyvinylalcohol (PVA), and polyamic acid by rubbing. Alternatively, the alignment film may be formed of a photosensitive material, such as polyvinvylcinnamate (PVCN), polysilioxanecinnamate (PSCN) or cellulosecinnamate (CelCN) based compound, by using a photo-alignment method.

A light-shielding layer (not shown) is formed on the upper substrate 2052 to shield light leakage from the gate lines, the data lines, and the thin film transistor regions. A color filter layer (not shown) of R, G, and B is formed on the light-shielding layer. A common electrode (not shown) is formed on the color filter layer. Additionally, an overcoat layer (not shown) may be formed between the color filter layer and the common electrode. The alignment film is formed on the common electrode.

Silver (Ag) dots (not shown) are formed outside the lower substrate 2051 to apply a voltage to the common electrode on the upper substrate 2052 after the lower and upper substrates 2051 and 2052 are bonded to each other. Alternatively, the silver dots may be formed on the upper substrate 2052.

In an in plane switching (IPS) mode LCD, the common electrode is formed on the lower substrate like the pixel electrode, and, in operation, an electric field is horizontally induced between the common electrode and the pixel electrode. The silver dots are not formed on the substrates.

A sealant 2070 that is at least partially curable by UV light is formed on the upper substrate 2052 to have a part 2075 for controlling a liquid crystal flow at four corner regions.

The part 2075 may have various shapes such as a round, triangular, rectangular, polygonal shape or any other shape as would be appreciated by one of skill in the art with a size may appropriately adjusted according factors such as the level of liquid crystal applied and the size of the substrate.

The UV sealant is formed by a screen printing method or a dispensing method. In the screen printing method, because a screen comes into contact with the substrate, the alignment film formed on the substrate may be damaged. Also, if the substrate has a large area, loss of the sealant increases. In these respects, the dispensing method is preferably used.

Monomers or oligomers each having both ends coupled to the acrylic group, mixed with an initiator are used as the UV sealant 2070. Alternatively, monomers or oligomers each having one end coupled to the acrylic group and the other end coupled to the epoxy group, mixed with an initiator are used as the UV sealant 2070.

Also, the liquid crystal 2007 is applied onto the lower substrate 2051 to form a liquid crystal layer. At this time, the amount of the liquid crystal 2007 is determined by considering the size of the substrate and a cell gap. Preferably, the liquid crystal 2007 is substantially applied in an amount greater than the minimum level sufficient to fill the cell gap.

The liquid crystal 2007 may be contaminated if it comes into contact with the UV sealant 2070 before the UV sealant 2070 is hardened. Accordingly, the liquid crystal 2007 may preferably be applied on the central part of the lower substrate 2051. In this case, the liquid crystal 2007 is gradually spread evenly after the UV sealant 2070 is hardened. If the liquid crystal 2007 is applied excessively, the liquid crystal 2007 enters into the part 2075. Thus, the liquid crystal 2007 is uniformly distributed in the active region of the substrate, thereby maintaining a uniform cell gap.

Also, if the liquid crystal is applied in an amount (application amount) more than a minimum amount required to fill the cell gap in the active region (minimum amount), it takes a short time to spread the liquid crystal to the corner regions so that the liquid crystal is spread to the active region before the final test process. A principle of the method for applying liquid crystal onto a substrate before attaching a second substrate is described herein.

Figure 66B:
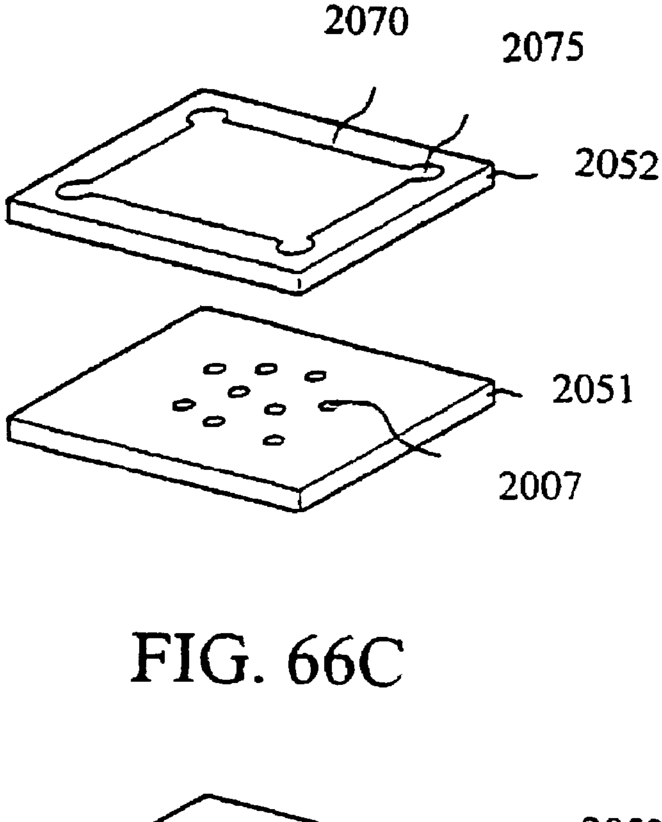

Meanwhile, although FIG. 66B illustrates the process of applying the liquid crystal 2007 on the lower substrate 2051 and forming the UV sealant 2070 on the upper substrate 2052, the liquid crystal 2007 may be formed on the upper substrate 2052 while the UV sealant 2070 may be formed on the lower substrate 2051.

Alternatively, both the liquid crystal 2007 and the UV sealant 2070 may be formed on one substrate. In this case, an imbalance occurs between the processing times of the substrate with the liquid crystal and the sealant and the substrate without the liquid crystal and the sealant. For this reason, the manufacturing process time increases. Also, when the liquid crystal and the sealant are formed on one substrate, the substrate may not be cleaned even if the sealant is contaminated before the substrates are attached to each other.

Accordingly, a cleaning process for cleaning the upper substrate 2052 may additionally be provided after the UV sealant 2070 is formed on the upper substrate 2052.

Meanwhile, spacers may be formed on either of the two substrates 2051 and 2052 to maintain a cell gap. Preferably, the spacers may be formed on the upper substrate 2052.

Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to the gate lines or data lines. Preferably, the column spacers may be used for the large sized substrate since the ball spacers may cause an uneven cell gap for the large sized substrate. The column spacers may be formed of a photosensitive organic resin.

Figure 66C:
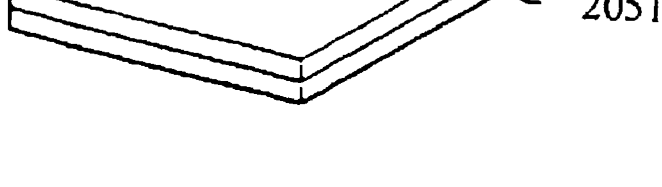

Referring to FIG. 66C, the lower substrate 2051 and the upper substrate 2052 are attached to each other by the following processes. First, one of the substrates having the liquid crystal applied thereon is placed at the lower side. The other substrate is placed at the upper side by turning by 180 degrees so that its portion having certain layers faces into the surface of the lower substrate having certain layers. Thereafter, the substrate at the upper side is pressed, so that both substrates are attached to each other. Alternatively, the space between the substrates may be maintained under the vacuum state so that both substrates are attached to each other by releasing the vacuum state.

Figure 66D:
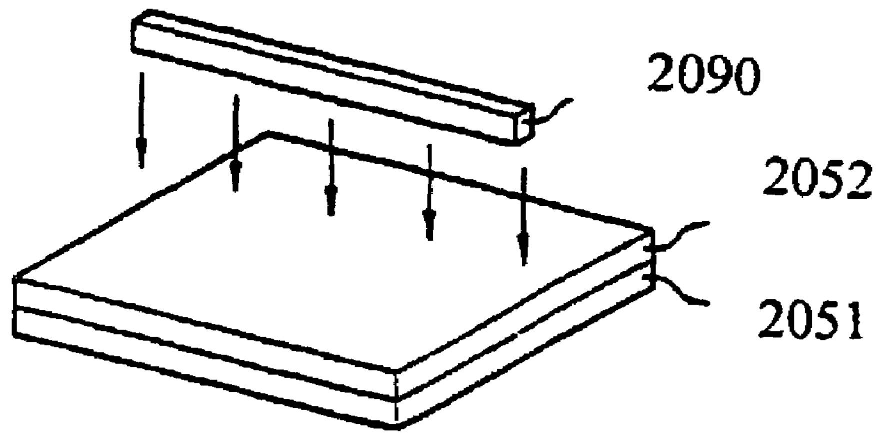

Then, as shown in FIG. 66D, UV light is irradiated upon the attached substrates through a UV irradiating device 2090. Upon irradiating the UV, monomers or oligomers activated by an initiator constituting the UV sealant 2070 are polymerized and hardened, thereby bonding the lower substrate 2051 to the upper substrate 2052.

If monomers or oligomers each having one end coupled to the acrylic group and the other end coupled to the epoxy group, mixed with an initiator are used as the UV sealant 2070, the epoxy group is not completely polymerized. Therefore, the sealant may have to be additionally heated at about 120° C. for one hour after the UV irradiation, thereby hardening the sealant completely.

In the UV irradiation, if the UV light is irradiated upon the entire surface of the attached substrates, the UV light may deteriorate characteristics of devices such as a thin film transistor on the substrate and change a pre-tilt angle of an alignment film formed for the initial alignment of the liquid crystal.

Figure 67:
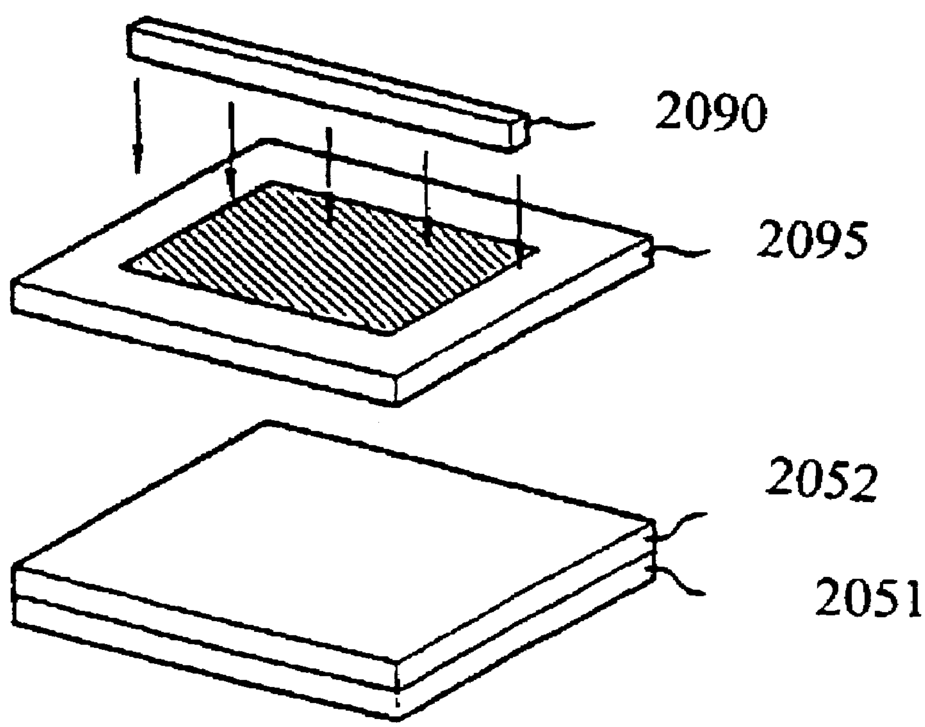
FIG. 67 is a perspective view illustrating a process of irradiating UV in the method of manufacturing an LCD device according to the present invention.

Therefore, as shown in FIG. 67, the UV light is irradiated in a state that an active region in the UV sealant 2070 is covered with a mask 2095.

Although not shown, the bonded substrates are cut into a unit cell.

In the cutting process, a cutting line is formed on a surface of the substrates with a pen or cutting wheel of a material that has a hardness greater than that of glass, e.g., diamond, and then the substrate is cut along the cutting line by mechanical impact or breaking process. Thus, a plurality of unit cells can be obtained simultaneously.

Alternatively, the scribing process and the breaking process may simultaneously be performed using a pen or cutting wheel of a material that has a hardness greater than that of glass, thereby obtaining a unit cell. In this case, space occupied by cutting equipment that cuts the glass is reduced over the space occupied by equipment required to scribe and break the glass and the overall cutting process time is also reduced over the combined scribe and break process.

As aforementioned, the LCD and the method of manufacturing the same according to the present invention have the following advantages.

Since the liquid crystal the level of liquid crystal applied to the substrate can be greater than the amount required to cover the active area of the LCD panel and the sealant is formed to have the part for controlling a liquid crystal flow, the liquid crystal is filled appropriately without any imperfections caused by an overfill in the active area. Thus, a uniform cell gap can be maintained.

Furthermore, even if the liquid crystal expands or shrinks, for example, during the heating process, the liquid crystal exits or enters the part for controlling a liquid crystal flow, thereby avoiding any defect in a cell gap that may occur.

Reference will now be made in detail to the illustrated embodiments of the present invention, examples of which are illustrated in the accompanying drawings. Wherever possible, the same reference numbers will be used throughout the drawings to refer to the same or like parts.

FIG. 687 illustrates a plan view of an LCD panel in accordance with an embodiment of the present invention.

Figure 68:
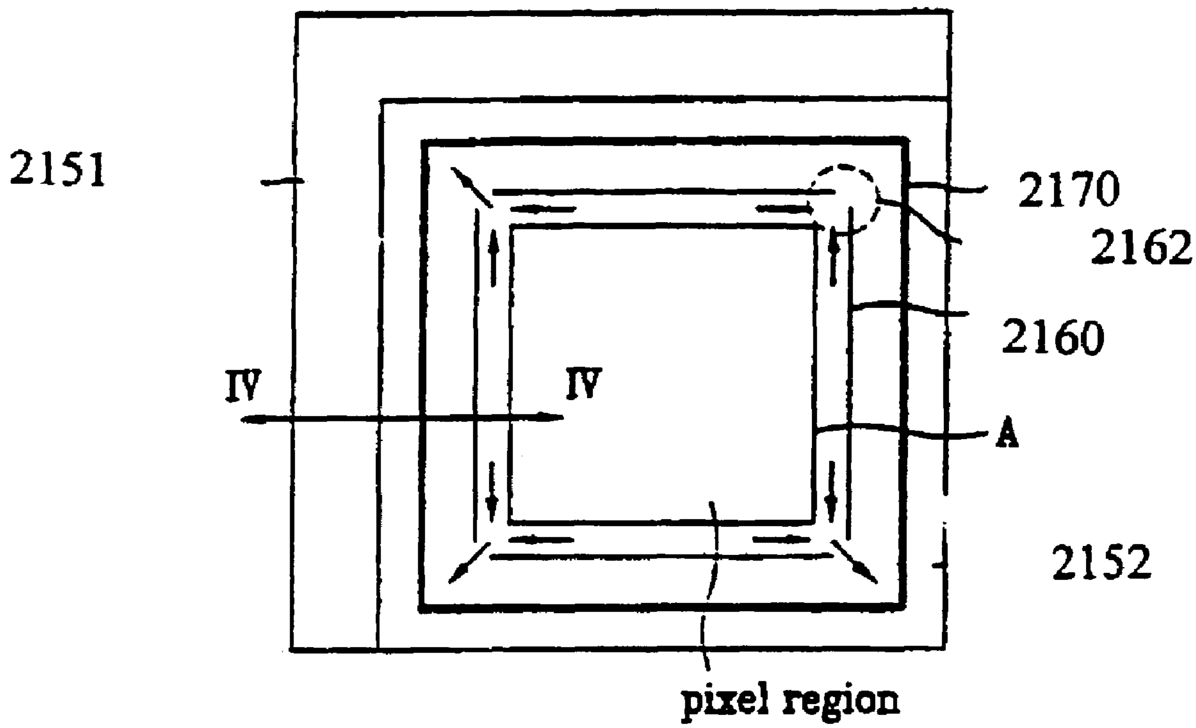
FIG. 68 illustrates a plane view of an LCD panel in accordance with another embodiment of the present invention.

Referring to FIG. 68, the LCD panel includes a lower substrate 2151, an upper substrate 2152, and a UV sealant 2170 between the substrates 2151 and 2152. Column spacers (not shown) are formed in a pixel region (a line 'A' represents an imaginary line for indicating a pixel region), and a dummy column spacer 2160 is formed inside the UV sealant 2170 in the dummy region to regulate a liquid crystal flow. A liquid crystal layer (not shown) is formed between the lower and upper substrates 2151 and 2152. The column spacer serves to maintain a cell gap between the lower substrate 2151 and the upper substrate 2152.

More specifically, the dummy column spacer 2160 has a height the same as the column spacer, and an opened portion 2162 in at least one of the corner-regions. Although the drawing shows that the opened portion 2162 is formed at all four corners, the number of the opened portion 2162 may be varied. Alternatively, the opened portion 2160 may not be formed at all. The dummy column spacer 2162 serves as a liquid crystal flow passage, thereby uniformly filling the liquid crystal throughout the cell, and preventing the liquid crystal from being contaminated by the UV sealant 2170. That is, as shown in arrows in the drawing, since the liquid crystal flows along the dummy column spacer 2160, and to the corner-region of the substrate through the opened portion 2162, the liquid crystal in the corner-regions of the substrates is uniformly spread throughout the substrate. Moreover, the dummy column spacer 2160 without the opened portion 2162 serves as a dam for preventing the liquid crystal from contacting the UV sealant and being contaminated by the UV sealant.

Variations of the embodiments of the present invention will be explained with reference to FIGS. 69A to 69C, which are cross-sectional views taken along line IV-IV of FIG. 57 (a region having no opened portion 2162 is formed in the dummy column spacer 2160) illustrating other embodiments.

Figure 69A:
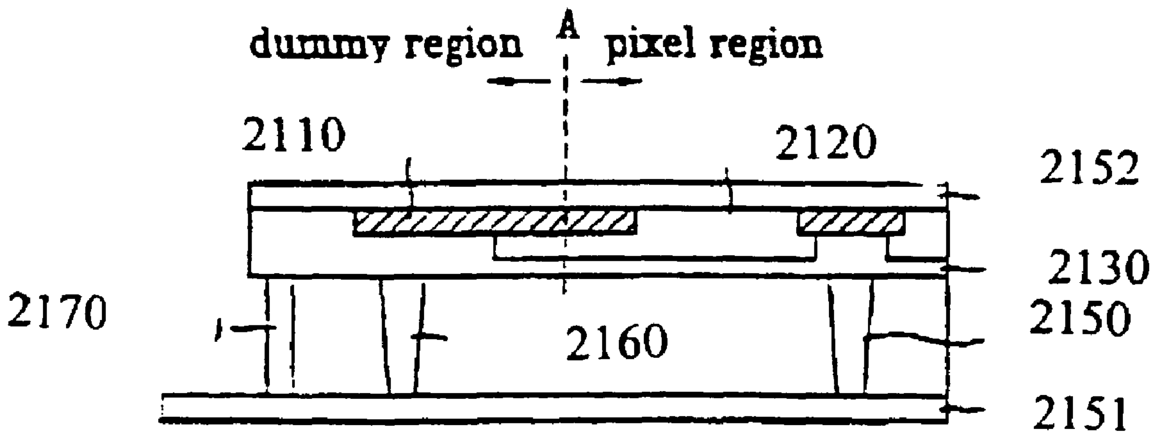
FIGS. 69A to 69C are cross-sectional views taken along line IV-IV of FIG. 68.

Referring to FIG. 69A, a black matrix 2110, a color filter layer 2120, and a common electrode 2130 are formed on the upper substrate 2152 in this order. Gate lines, data lines, thin film transistors, and pixel electrodes (all not shown) are formed on the lower substrate 2151. A plurality of column spacers 2150 are formed in the pixel region on the upper substrate 2152 each having a height of the cell gap. Since the column spacers 2150 are formed in regions of the gate lines and the data lines, the column spacers 2150 are formed on the common electrode 2130 over the black matrix 2110 on the upper substrate 2152. A dummy column spacer 2160 is formed in the dummy region on the upper substrate 2152 with a height the same as the column spacer 2150. The dummy column spacer may be formed in any region except for the pixel region as far as the region is within the dummy region on the inner side of the UV sealant 2170. Although the drawing shows that the dummy column spacer 2160 is formed on the common electrodes 2130 without an underlying color filter layer 2120, the dummy column spacer 2160 may be formed on the common electrodes 2130 with the underlying color filter layer 2120. For example, the column spacer 2150 and the dummy column spacer 2160 may be formed of a photosensitive resin.

In the meantime, an overcoat layer may be additionally formed between the color filter layer 2120 and the common electrode 2130 on the upper substrate 2152, and alignment layers may be formed on the upper substrate 2152 inclusive of the column spacers 2160 and the lower substrate 2151, respectively.

Figure 69B:
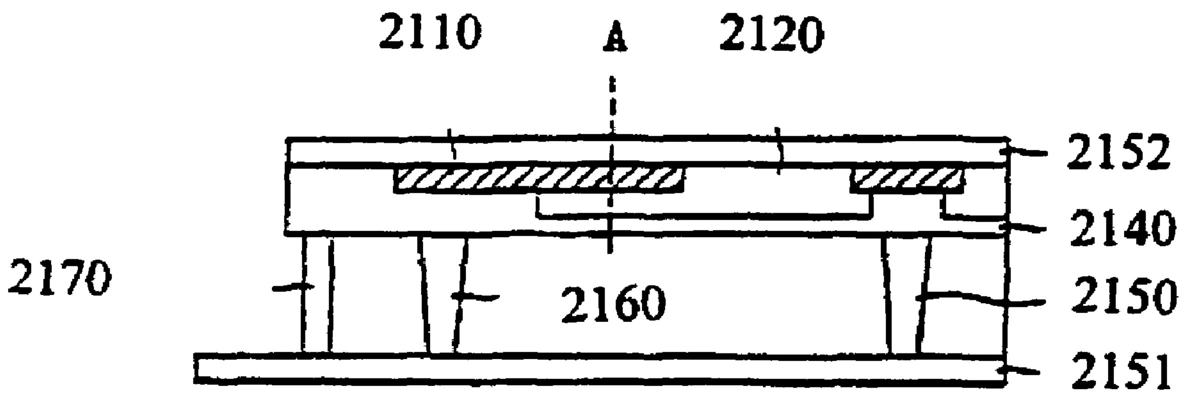

FIG. 69B illustrates a cross-sectional view of an LCD panel in accordance with another variation of the first embodiment of the present invention. In this embodiment, instead of the common electrode 2130, the overcoat layer 2140 is formed on the upper substrate 2152 in the foregoing LCD panel, shown in FIG. 69A.

The LCD panel in FIG. 69B is called an in-plane switching (IPS) mode LCD panel, and has a common electrode formed on the lower substrate 2151. Therefore, the IPS mode LCD panel is the same as the LCD panel in FIG. 69A, except for that the column spacer 2150 and the dummy column spacer 2160 are formed on the overcoat layer 2140.

Figure 69C:
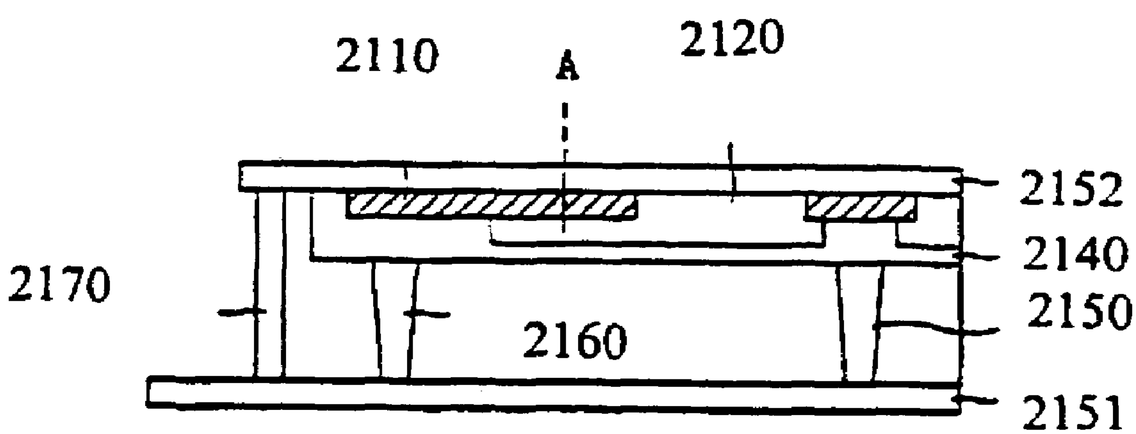

FIG. 69C illustrates a cross-sectional view of an LCD panel in accordance with another embodiment of the present invention. In the LCD panel in FIG. 69B, the overcoat layer 2140 is patterned such that it is formed on the black matrix 2110 and not on the sealant 2170. The others are similar to the LCD panel in FIG. 69B.

Figure 70:
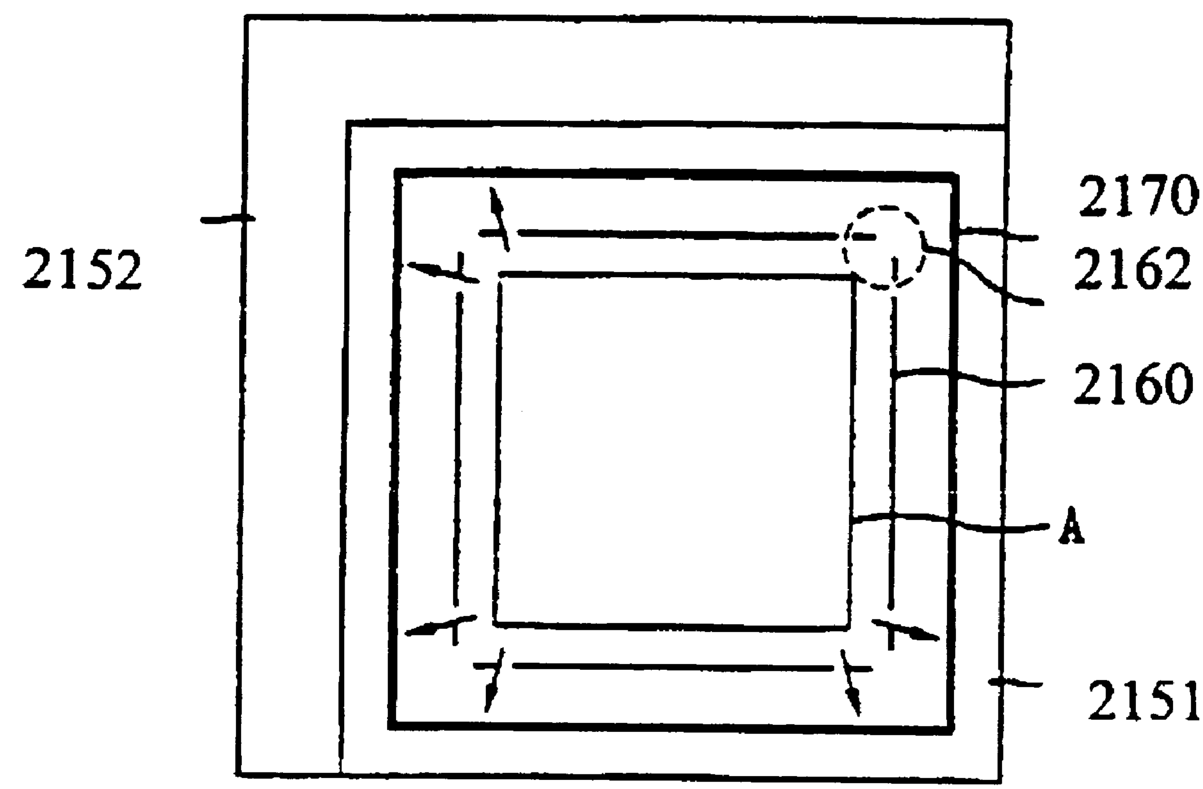
FIG. 70 illustrates a plane view of an LCD panel in accordance with another embodiment of the present invention.

FIG. 70 illustrates a plan view of an LCD panel in accordance with another embodiment of the present invention.

Referring to FIG. 70, the LCD panel according to this embodiment includes a dummy column spacer 2160 having an opened portion 2162. The opened portion 2162 includes a plurality of openings in each corner-region of the substrate.

The opened portion 2162 including a plurality of openings permits a liquid crystal to easily flow to the corners of the substrate, and allows a uniform filling of the liquid crystal. The opened portion 2162 may be formed in at least one of the corner-regions. A plurality of openings may be formed at either a constant interval or an irregular interval. The others are similar to the first embodiment.

Figure 71:
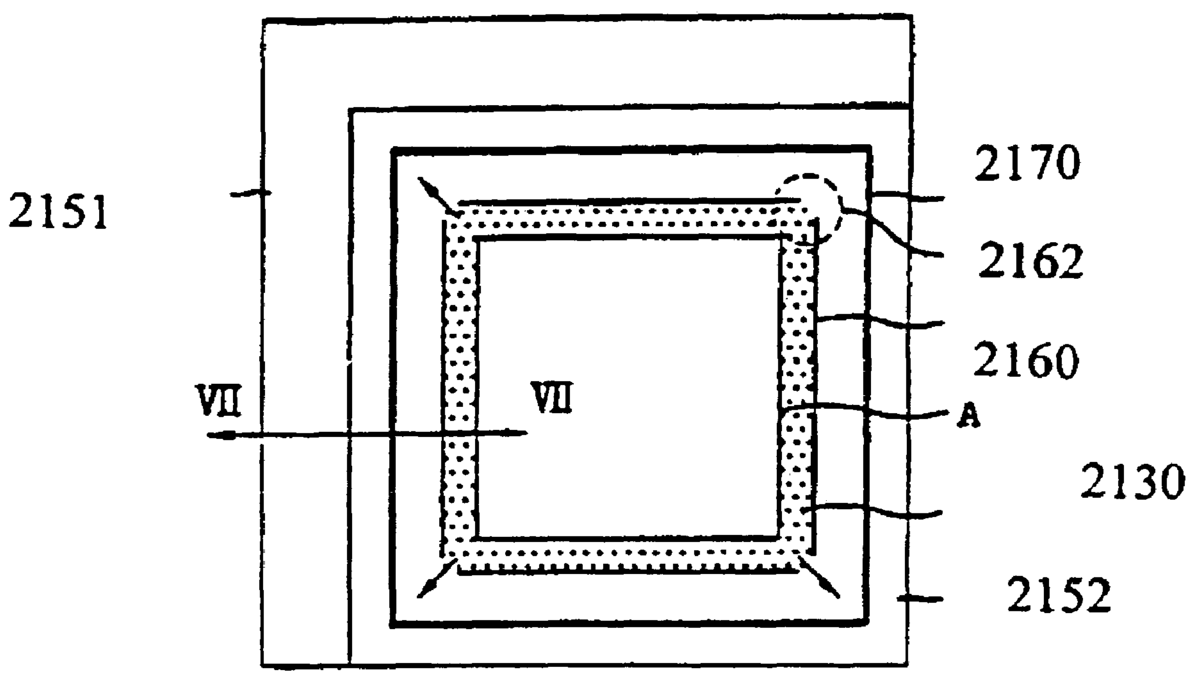
FIG. 71 illustrates a plane view of an LCD panel in accordance with another embodiment of the present invention.

FIG. 71 illustrates a plan view of an LCD panel in accordance with a third embodiment of the present invention.

Referring to FIG. 71, the LCD panel includes a lower substrate 2151, an upper substrate 2152, and a UV sealant 2170 between the lower and upper substrates 2151 and 2152. A plurality of column spacers (not shown) are formed in a pixel region (a line ‘A’ represents an imaginary line for indicating the pixel region), and a dummy column spacer 2160 is formed on inside the UV sealant 2170 in the dummy region to regulate a liquid crystal flow. The dummy column spacer 2160 is formed at a height the same as the column spacer and has an opened portion 2162 in at least one of the corner-regions. The opened portion 2162 may not be formed at all. Also, a dotted line type dummy column spacer 2180 may be additionally formed at the inner dummy region of the dummy column spacer 2160 for assisting the regulation of the liquid crystal flow. A liquid crystal layer (not shown) is formed between the substrates 2151 and 2152.

The additional dotted line type dummy column spacer 2180 inside the dummy column spacer 2160 facilitates more smooth regulation of the liquid crystal flow because the liquid crystal flows along spaces of not only the dummy column spacer 2160, but also the dotted line type dummy column spacer 2180.

Variations of this embodiment of the present invention will be explained in detail with reference to FIGS. 72A to 72C, which are cross-sectional views taken along line VII-VII of FIG. 6 (a region having no opened portion 2162 in the dummy column spacer 2160).

Figure 72A:
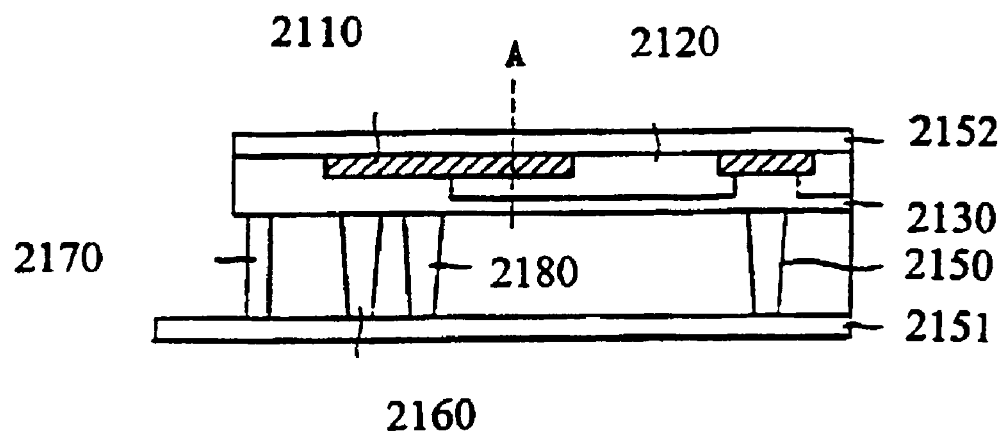
FIGS. 72A to 72C are cross-sectional views taken along line VII-VII of FIG. 71.

Referring to FIG. 72A, a black matrix 2110, a color filter layer 2120, and a common electrode 2130 are formed on the upper substrate 2152 in this order. A plurality of gate lines, data lines, thin film transistors, and pixel electrodes (all not shown) are formed on the lower substrate 2151. Column spacers 2150 are formed in the pixel region on the upper substrate 2152 each having a height of the cell gap. The dummy column spacer 2160 is formed in the dummy region on the upper substrate 2152 with a height the same as the column spacer 2150. The dotted line type dummy column spacer 2180 is formed in the dummy region inside the dummy column spacer 2160 with a height the same as the column spacer 2150. Although only one dotted line type dummy column spacer 2170 is shown in FIG. 72A, there may be a plurality of the dotted line type column spacers 2180. The dotted line type dummy column spacer 2180 may be formed in any region as far as the region is within the dummy region. For example, the column spacer 2150, the dummy column spacer 2160, and the dotted line type dummy column spacer 2180 may be formed of a photosensitive resin.

In the meantime, an overcoat layer may be additionally formed between the color filter layer 2120 and the common electrode 2130 on the upper substrate 2152, and alignment films (not shown) are formed on the upper substrate 2152 inclusive of the column spacers 2160 and the dotted line type dummy column spacer 2180, and the lower substrate 2151, respectively.

Figure 72B:
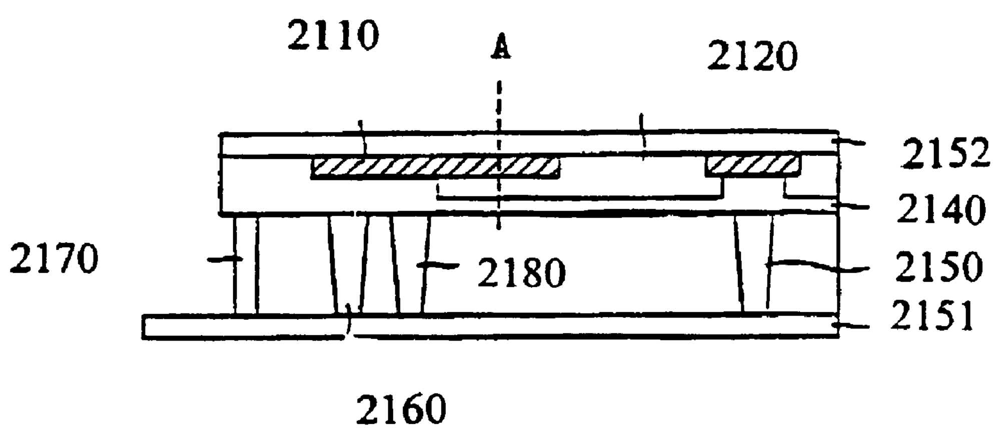

FIG. 72B illustrates a cross-sectional view of an LCD panel in accordance with another variation of the previous embodiment of the present invention, wherein, in the foregoing LCD panel in FIG. 72A, not the common electrode 2130, but the overcoat layer 2140, is formed on the upper substrate 2152. The LCD panel in FIG. 72B is an IPS mode LCD panel, and has the common electrode formed on the lower substrate 2151. Therefore, the IPS mode LCD panel is similar to the LCD panel in FIG. 72A, except for that the column spacer 2150, the dummy column spacer 2160, and the dotted line type dummy column spacer 2180 are formed on the overcoat layer 2140.

Figure 72C:
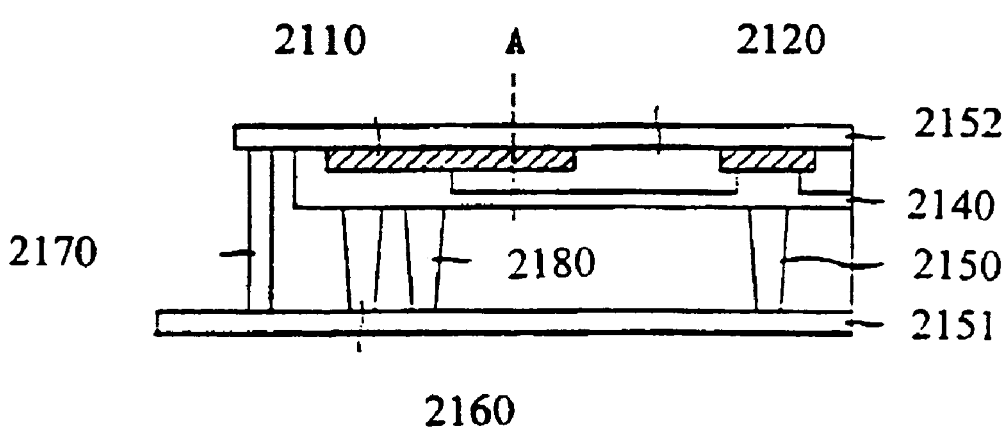

FIG. 72C illustrates a cross-sectional view of an LCD panel in accordance with another variation of the previous embodiment of the present invention. In this embodiment, the overcoat layer 2140 is patterned such that the sealant 2170 is formed directly on the upper substrate 2152. Others are similar to the LCD panel in FIG. 72B.

Figure 73:
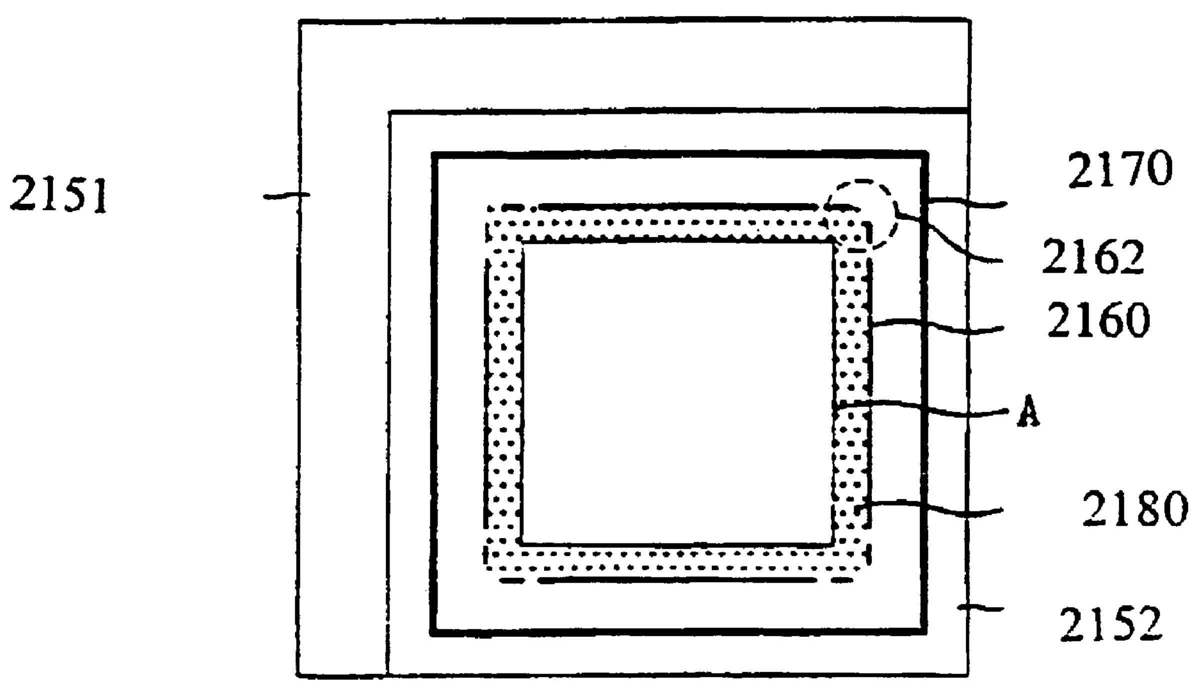
FIG. 73 illustrates a plane view of an LCD panel in accordance with another embodiment of the present invention.

FIG. 73 illustrates a plane view of an LCD panel in accordance with a another embodiment of the present invention.

Referring to FIG. 73, the LCD panel according to this embodiment of the present invention includes a dummy column spacer 2160 having an opened portion 2162. The opened portion 2162 includes a plurality of openings in the corner-region of the substrate.

The opened portion 2162 may be formed in at least one of the corner-regions. A plurality of openings may be formed at either a constant interval or an irregular interval. The others are similar to the third embodiment.

Figure 74:
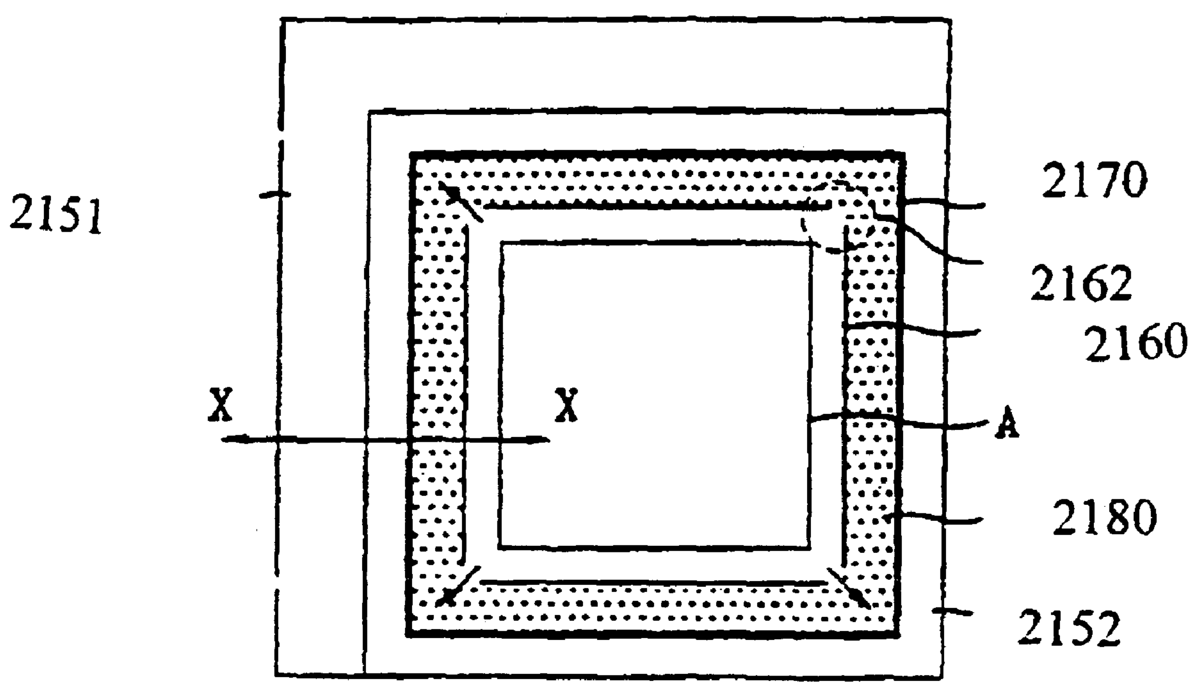
FIG. 74 illustrates a plane view of an LCD panel in accordance with another embodiment of the present invention.
Figure 75A:
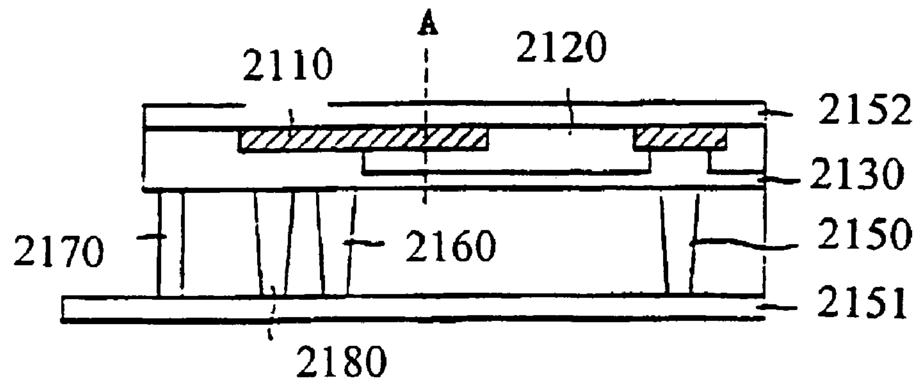
FIGS. 75A to 75C are cross-sectional views taken along line X-X of FIG. 74.
Figure 75B:
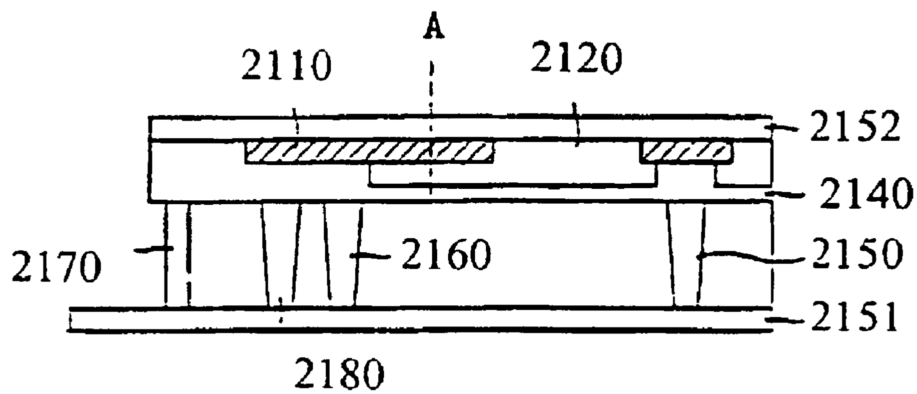
Figure 75C:
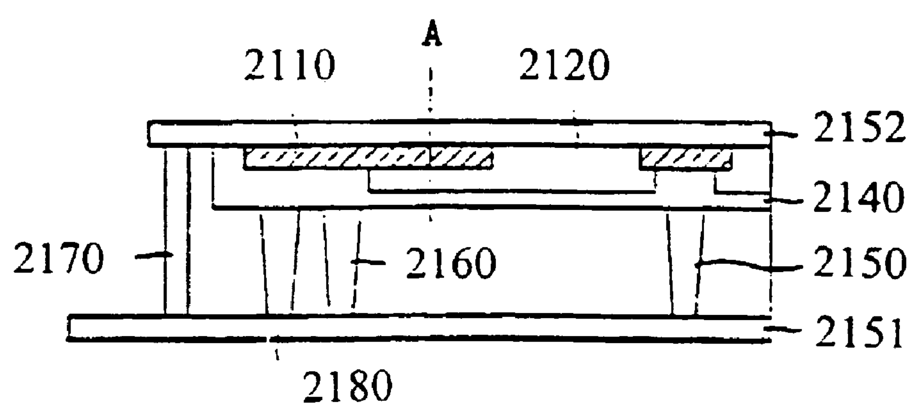

FIG. 74 illustrates a plane view of an LCD panel in accordance with another embodiment of the present invention. In this embodiment, a dotted line type dummy column spacer 2180 is formed outside the dummy column spacer 2160. Since the others are similar to the third embodiment, detailed descriptions are omitted for simplicity. FIGS. 75A to 75C illustrate cross-sectional views taken along line X-X of FIG. 74 for variations.

Figure 76:
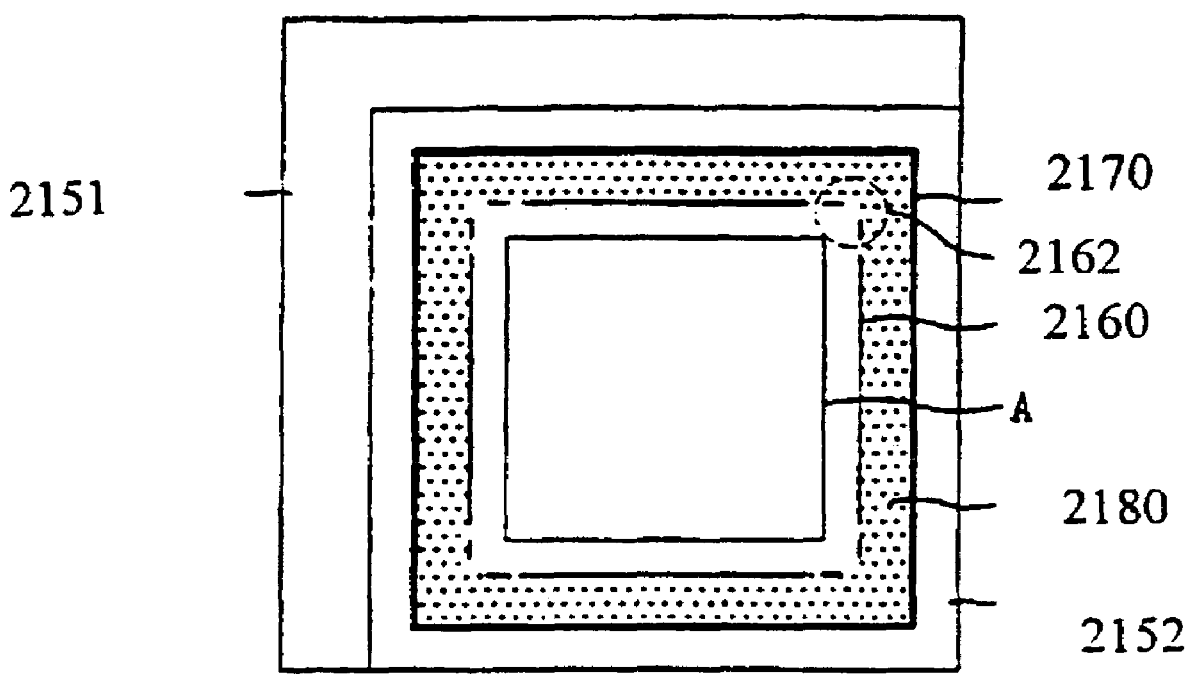
FIG. 76 illustrates a plane view of an LCD panel in accordance with another embodiment of the present invention.

FIG. 76 illustrates a plan view of an LCD in accordance with another embodiment of the present invention.

Referring to FIG. 76, the LCD panel includes a dummy column spacer 2160 having an opened portion 2162. The opened portion 2162 includes a plurality of openings in the corner-regions of the substrate. The opened portion 2162 may be formed in at least one of the corner-regions. A plurality of openings may be formed at either a constant interval or an irregular interval. The others are similar to the fifth embodiment.

Figure 77A:
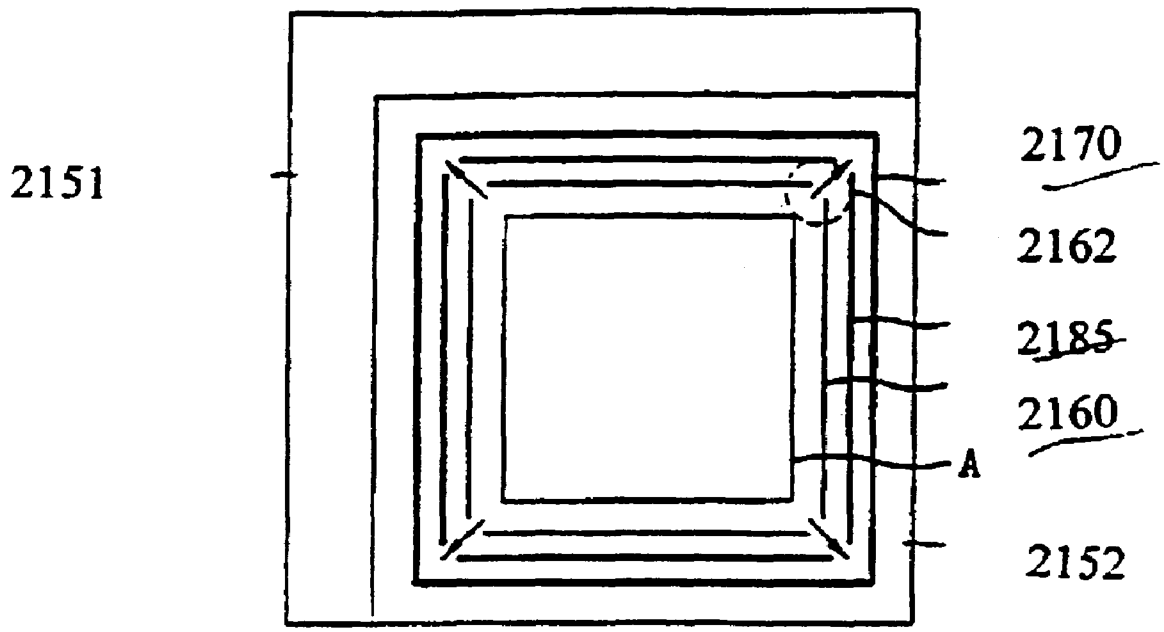
FIGS. 77A and 77B are plane views of an LCD panel in accordance with another embodiment of the present invention.
Figure 77B:
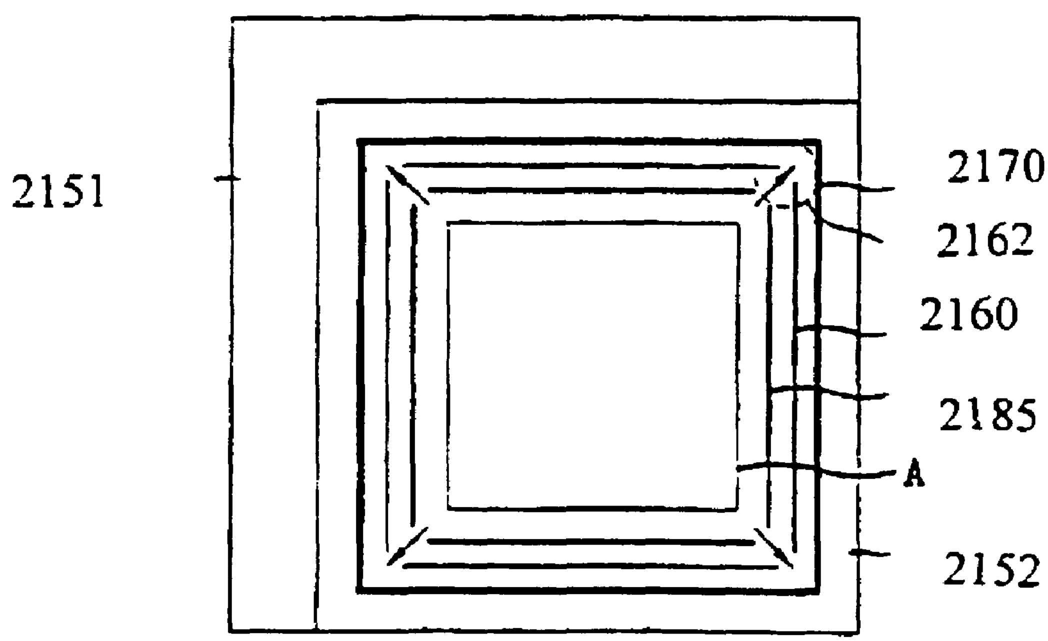

FIGS. 77A and 77B illustrate plan views of LCDs in accordance with another embodiment of the present invention, wherein a second dummy column spacer 2185 is additionally formed inside or outside a first dummy column spacer 2160.

The dummy column spacer is duplicated for a better regulation of the liquid crystal flow. The first dummy column spacer 2160 and/or the second dummy column spacer 2185 may have the opened portion 2162 in at least one of the corner-regions. The opened portion 2162 may include a plurality of openings formed at either a constant interval or an irregular interval. The first dummy column spacer 2160 and the second dummy column spacer 2185 may be varied similar to the foregoing dummy column spacer 2160 and the dotted line type dummy column spacer 2180.

FIGS. 78A to 78D are perspective views illustrating a method for fabricating an LCD panel in accordance with another embodiment of the present invention. Although the drawing illustrates only one unit cell, there may be more than one unit cell.

Figure 78A:
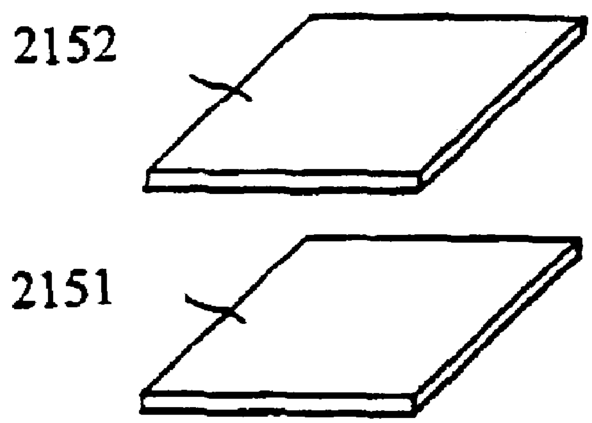
FIGS. 78A to 78D are perspective views illustrating a method for fabricating an LCD panel in accordance with another embodiment of the present invention.

Referring to FIG. 78A, a lower substrate 2151 and an upper substrate 2152 are prepared for the process. A plurality of gate lines and data lines (both not shown) are formed on the lower substrate 2151 to cross each other defining pixel regions. A thin film transistor having a gate electrode, a gate insulating film, a semiconductor layer, an ohmic contact layer, source/drain electrodes, and a protection film, is formed at every crossed point of the gate lines and the data lines. A pixel electrode is formed at each of the pixel regions connected to the thin film transistor.

An alignment film is formed on the pixel electrode for an initial orientation of the liquid crystal. The alignment film may be formed of one of polyimide, polyamide group compound, polyvinylalcohol (PVA), and polyamic acid by rubbing, or a photosensitive material, such as polyvinylcinnamate (PVCN), polysilioxanecinnamate (PSCN), or cellulosecinnamate (CelCN) group compound by photo-alignment.

A black matrix is formed on the upper substrate 2152 for shielding a light leakage from the gate lines, the data lines, and the thin film transistors. A color filter layer of red, green, and blue is formed thereon. A common electrode is formed thereon. An overcoat layer may be additionally formed between the color filter layer and the common electrode.

Silver (Ag) dots are formed on the lower substrate 2151, for applying a voltage to the common electrode on the upper substrate 2152 after the two substrates 2151 and 2152 are bonded with each other. Alternatively, the silver dots may be formed on the upper substrate 2152.

In an in-plane switching mode LCD panel, a lateral field is induced by the common electrode formed on the lower substrate the same as the pixel electrode. Thus, the silver dots may not be formed on the substrates. As shown in the first to eighth embodiments, the column spacer, the dummy column spacer, the dotted line type dummy column spacer, and the second dummy column spacer are formed on the various locations of the upper substrate 2152. The column spacer and the dummy column spacer, the column spacer, the dummy column spacer, and the dotted line type dummy column spacer, or the column spacer, the dummy column spacer, and the second dummy column spacer may be formed of photosensitive resin at the same time with the same height (i.e., at the height of a cell gap). The foregoing alignment film is formed on the upper substrate 2152.

Figure 78B:
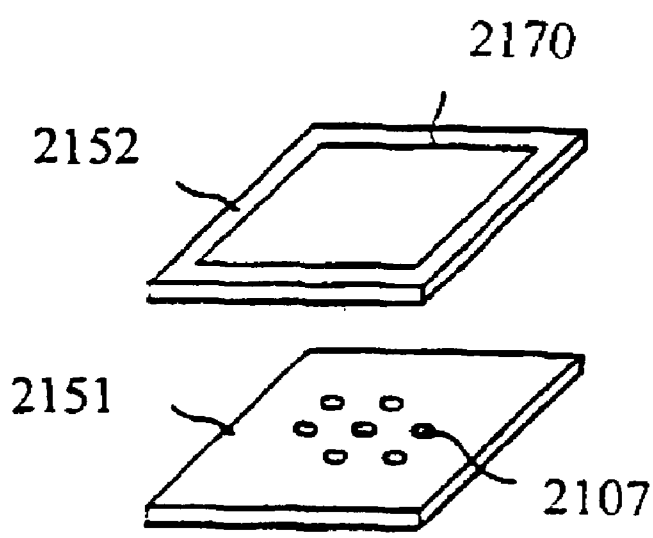

Referring to FIG. 78B, a UV sealant 2170 is coated on the upper substrate 2152. The sealant may be coated by using a dispensing method or a screen printing method. However, the screen printing method may damage the alignment film formed on the substrate since the screen directly contacts the substrate. Also, the screen printing method may not be economically feasible due to a large amount of the sealant loss for a large substrate.

For example, monomers or oligomers each having both ends coupled with an acrylic group mixed with an initiator, or monomers or oligomers each having one end coupled with an acrylic group and the other end coupled with an epoxy group mixed with an initiator is used as the UV sealant 2170.

Then, a liquid crystal 2107 is dispensed onto the lower substrate 2151 to form a liquid crystal layer. A dispensed amount of the liquid crystal is determined with a substrate size and a cell gap. Generally, the liquid crystal is dispensed more than the determined amount.

The liquid crystal is contaminated once the liquid crystal contacts the sealant 2170 before the sealant 2170 is hardened. Therefore, the liquid crystal 2107 is dispensed onto the central part of the lower substrate 2151. A flow speed of liquid crystal 2151 dispensed onto the central part is appropriately regulated by the dummy column spacer and the dotted line type dummy column spacer, thereby uniformly speeding the liquid crystal 2107 inside of the UV sealant 2170.

FIG. 78B illustrates that the liquid crystal 2107 is dispensed on the lower substrate 2151, and the UV sealant 2170 is coated on the upper substrate 2152. Alternatively, the liquid crystal 2107 may be dispensed on the upper substrate 2152, and the UV sealant 2170 may be coated on the lower substrate 2151.

Moreover, the liquid crystal 2107 and the UV sealant 2170 may be formed on the same substrate. The liquid crystal and the sealant may be formed on different substrates in order to shorten the fabrication time period. When the liquid crystal 2107 and the UV sealant 2170 are formed on the same substrate, there occurs unbalance in the fabricating processes between the substrate with the liquid crystal and the sealant and the substrate without the liquid crystal and the sealant. In addition, the substrate cannot be cleaned when the sealant is contaminated before the substrates are attached to each other since the liquid crystal and the sealant are formed on the same substrate. Therefore, after coating the UV sealant, a substrate cleaning step may be added.

Figure 78C:
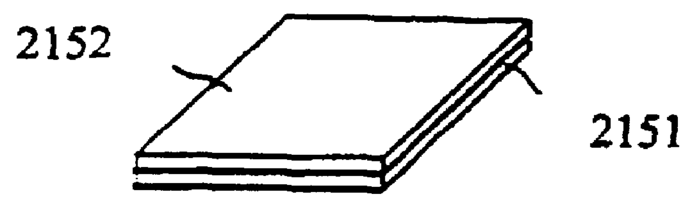

Referring to FIG. 78C, the lower substrate 2151 and the upper substrate 2152 are attached to each other. The lower substrate 2151 and the upper substrate 2152 may be bonded by the following processes. First, a liquid crystal is dispensed on one of the substrates. The other substrate is turned by 180 degrees so that the side of the substrate at the upper side having the liquid crystal layers faces into the upper surface of the substrate at the lower side. Thereafter, the substrate at the upper side is pressed, or the space between the substrates is evacuated, and releasing the vacuum, thereby attaching the two substrates.

Figure 78D:
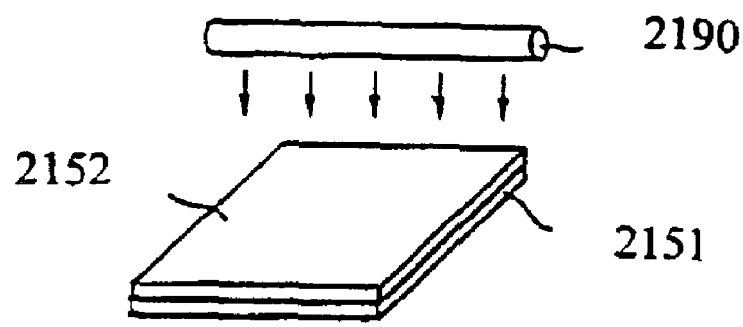

Then, referring to FIG. 78D, a UV ray is irradiated on the attached substrates by using a UV irradiating device 2190. Upon irradiating the UV ray, monomers or oligomers are polymerized by the initiator in the UV sealant, thereby bonding the lower substrate 2151 and the upper substrate 2152.

Monomers or oligomers each having one end coupled to an acrylic group and the other end coupled to an epoxy group mixed with an initiator are used as the UV sealant 2170. Since the epoxy group is not reactive with the UV irradiation, the sealant may have to be heated at about 120° C. for one hour after the UV irradiation for hardening the sealant.

In the meantime, the irradiation of the UV ray to the entire surface of the attached substrates may affect characteristics of devices, such as thin film transistors formed on the substrate, and alter a pre-tilt angle of the alignment film formed for an initial orientation of the liquid crystal.

Figure 79:
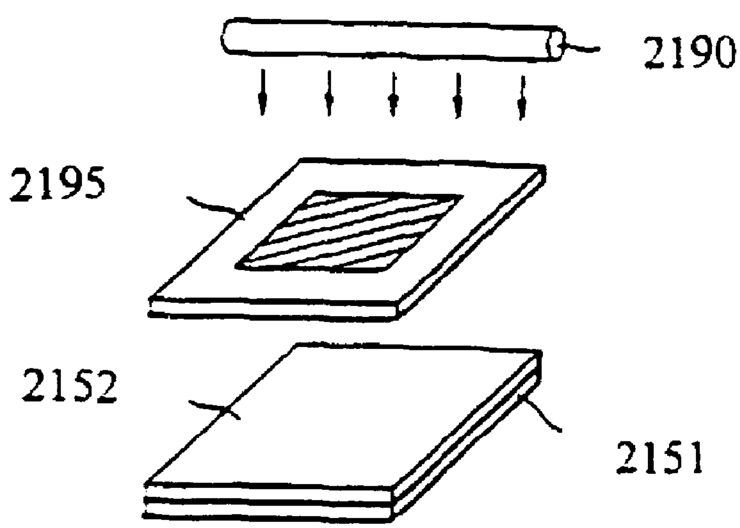
FIG. 79 is a perspective view illustrating irradiating a UV ray in a method for fabricating an LCD panel in accordance with the present invention.

Therefore, as shown in FIG. 79, the UV irradiation is carried out with masking the pixel regions inside the UV sealant 2170 by a mask 2195. Then, the bonded substrates are cut into unit cells. In the cutting step, after forming a scribing line (scribing process) on the surface of the bonded substrates by a scriber, such as a diamond pen with a hardness higher than the substrate, a mechanical impact is applied thereto along the scribing line by using a breaker (a break process), to obtain a plurality of unit cells at the same time.

Alternatively, a pen or wheel of diamond may be used to carry out the scribing and the breaking in one step, to obtain a unit cell one by one. A cutting device carrying out the scribing/breaking at the same time may be used in considering an occupied space of the cutting device and a required cutting time period.

Then, a final inspection is carried out after the cutting. In the final inspection, presence of defects is verified before the substrates cut into cell units are assembled into a module, by examining a proper operation of the pixels when a voltage applied thereto is turned on/off.

As explained previously, the LCD panel and the method for fabricating the same of the present invention have the following advantages.

The dummy column spacer and the dotted line type dummy column spacer, both having openings in the dummy region, control the liquid crystal flow, thereby maintaining a uniform cell gap and improving a picture quality.

The dummy column spacer and the dotted line type dummy column spacer serve as dams and prevent the liquid crystal from contacting the UV sealant.

Figure 80:
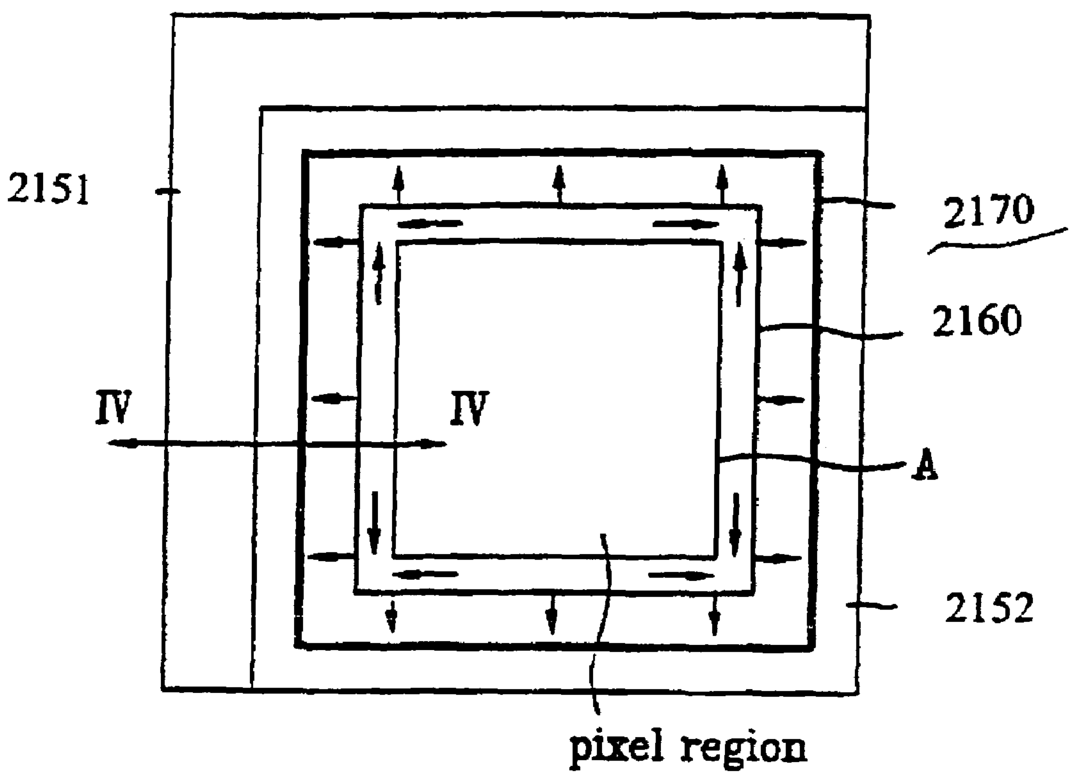
FIG. 80 illustrates a plane view of an LCD panel in accordance with an embodiment of the present invention.

FIG. 80 illustrates a plane view of an LCD in accordance with an embodiment of the present invention.

Referring to FIG. 80, the LCD panel includes a lower substrate 2151, an upper substrate 2152, and a UV sealant 2170 between the substrates 2151 and 2152. Column spacers (not shown) are formed in a pixel region (a line 'A' represents an imaginary line for indicating a pixel region), and a dummy column spacer 2160 is formed inside the UV sealant 2170 in the dummy region to regulate a liquid crystal flow. A liquid crystal layer (not shown) is formed between the lower and upper substrates 2151 and 2152. The column spacer serves to maintain a cell gap between the lower substrate 2151 and the upper substrate 2152.

The dummy column spacer 2160 has a height the same as the column spacer. The dummy column spacer 2160 may be formed at various locations to provide a gap with the lower substrate 2151, thereby regulating a liquid crystal flow through the gap. Also, the dummy column spacer 2160 may serve as a path for the liquid crystal flow, thereby facilitating the liquid crystal flow at the corner regions of the substrates.

That is, as shown in arrows in the drawing, since the liquid crystal flows along the dummy column spacer 2160, the liquid crystal reaches to the corner regions of the substrates without difficulty. And, since the liquid crystal flows through the gap between the dummy column spacer 2160 and the lower substrate 2151, the gap regulates the liquid crystal flow according to an amount of the liquid crystal.

The dummy column spacer 2160 formed at the various locations for adjusting a required gap to the lower substrate 2151 will be explained with reference to FIGS. 81A to 81C which are cross-sectional views taken along line IV-IV of FIG. 80 illustrating other embodiments.

Figure 81A:
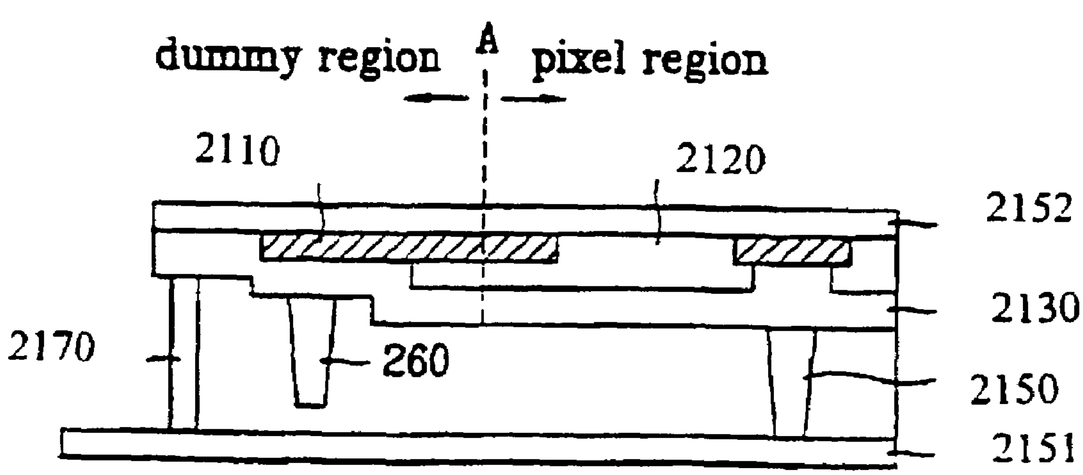
FIGS. 81A to 81C are cross-sectional views taken along line IV-IV of FIG. 80.

Referring to FIG. 81A, a black matrix 2110, a color filter layer 2120, and a common electrode 2130 are formed on the upper substrate 2152 in this order. A plurality of gate lines, data lines, thin film transistors, and pixel electrodes (all not shown) are formed on the lower substrate 2151. A plurality of column spacers 2150 are formed in the pixel region on the upper substrate 2152 each having a height of the cell gap. Since the column spacers 2150 are formed in regions of the gate lines and the data lines, the column spacers 2150 are formed on the common electrode 2130 over the black matrix 2110 on the upper substrate 2152. A dummy column spacer 2160 is formed in the dummy region on the upper substrate 2152 with a height the same as the column spacer 2150.

More specifically, since the dummy column spacer 2160 is formed on the common electrode 2130 over the black matrix 2110 in the dummy region, the dummy column spacer 2160 is spaced apart from the lower substrate 2151 as much as the height of the color filter layer 2120. For example, the column spacer 2150 and the dummy column spacer 2160 may be formed of a photosensitive resin.

In the meantime, an overcoat layer may be additionally formed between the color filter layer 2120 and the common electrode 2130 on the upper substrate 2152, and alignment layers may be formed on the upper substrate 2152 inclusive of the column spacers 2160 and the lower substrate 2151, respectively.

Figure 81B:
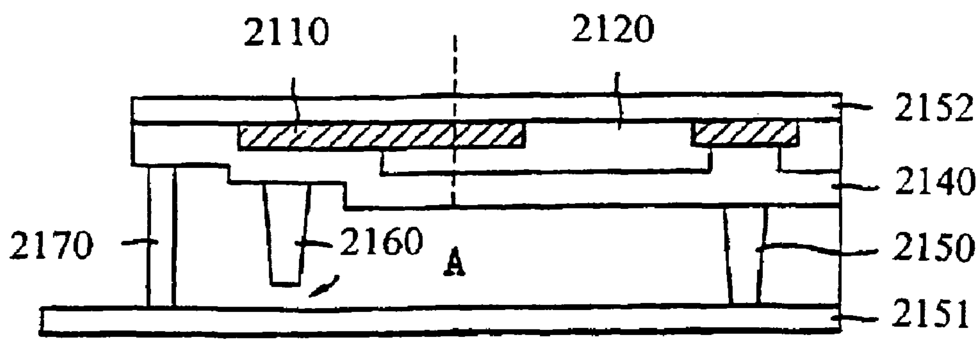

FIG. 81B illustrates a cross-sectional view of an LCD in accordance with another variation of the first embodiment of the present invention. In this embodiment, instead of the common electrode 2130, the overcoat layer 2140 is formed on the upper substrate 2152 in the foregoing LCD panel, as shown in FIG. 81A.

The LCD panel in FIG. 81B is an in-plane switching (IPS) mode LCD panel, and has a common electrode formed on the lower substrate 2151. The other elements are similar to the structures shown in FIG. 81A. Also, the dummy column spacer 2160 formed on the overcoat layer 2140 is spaced apart from the lower substrate 2151.

Figure 81C:
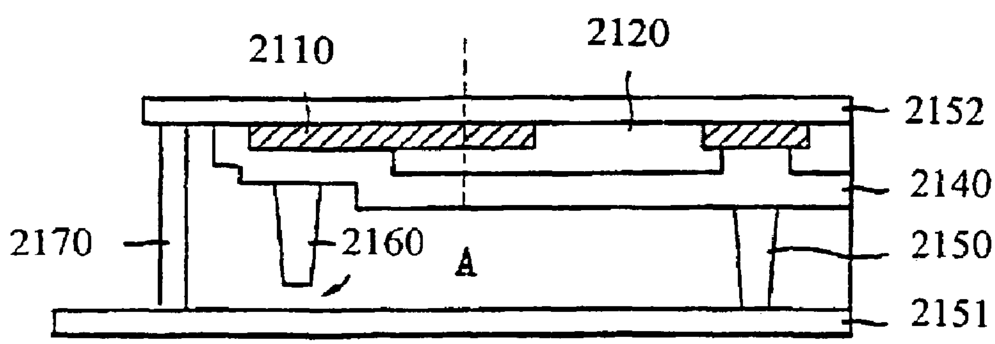

FIG. 81C illustrates a cross-sectional view of an LCD panel in accordance with another embodiment of the present invention. In the LCD panel in FIG. 81C, the overcoat layer 2140 is patterned such that it is formed on the black matrix 2110, not on the sealant 2170. The others are similar to the LCD panel in FIG. 81B.

Figure 81D:
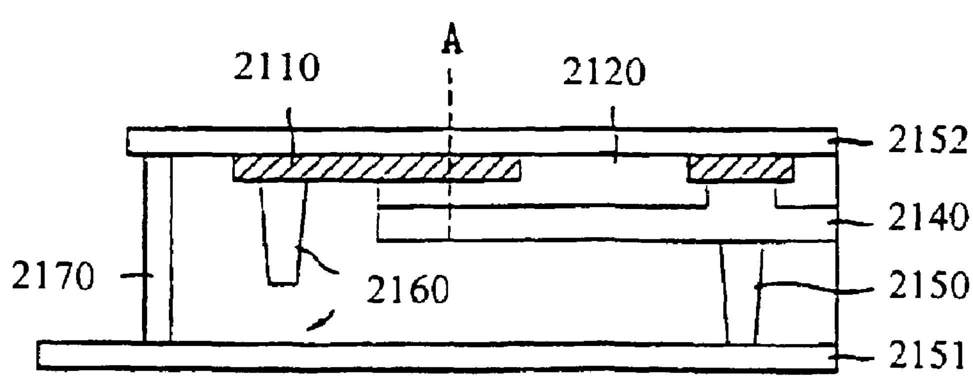

FIG. 81D illustrates a cross-sectional view of an LCD panel in accordance with another embodiment of the present invention. In the LCD in FIG. 81B, the overcoat layer 2140 is patterned such that it is not formed on the black matrix 2110. At the end, since the dummy column spacer 2160 is formed on the black matrix 2110, a gap to the lower substrate 2151 becomes greater. Although the overcoat layer 2140 is patterned to be formed only on the color filter layer 2120 in the drawing, it may be formed on the black matrix 2110 without the dummy column spacers 2160.

Figure 82A:
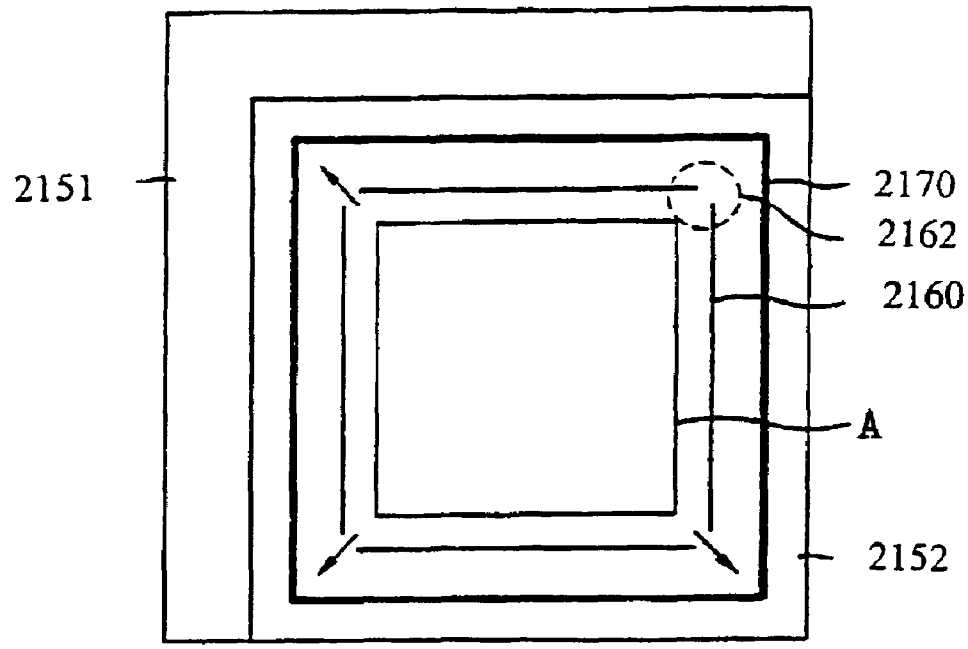
FIGS. 82A and 82B illustrate plane views of an LCD panel in accordance with another embodiment of the present invention.
Figure 82B:
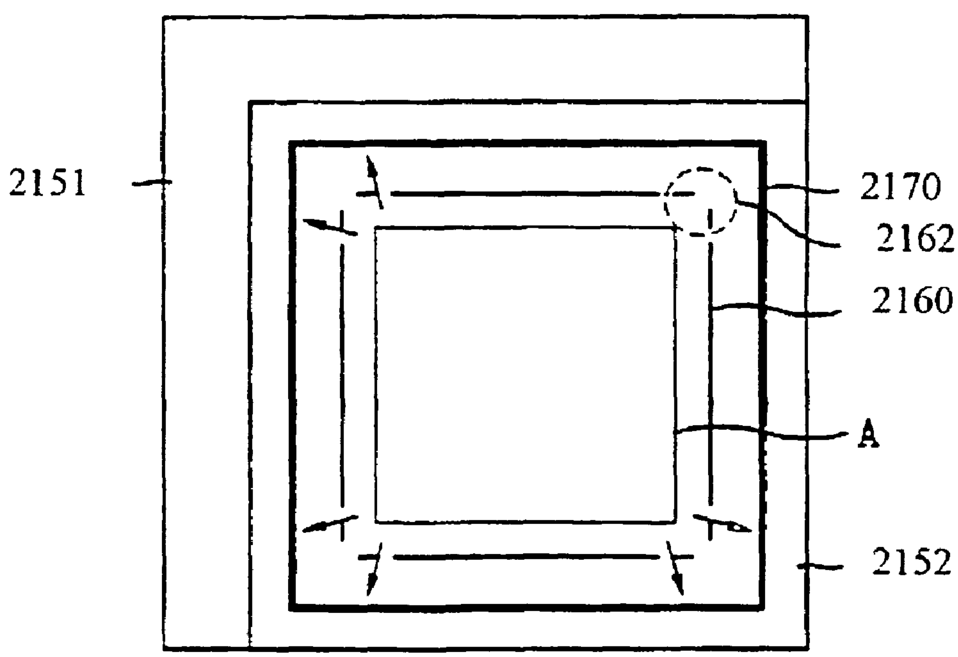

FIGS. 82A and 82B illustrate plan views of an LCD panel in accordance with another embodiment of the present invention.

Referring to FIG. 82A, the LCD panel according to the second embodiment of the present invention includes a dummy column spacer 2160 having an opened portion 2162 in each corner region of a substrate. Accordingly, the liquid crystal moves to the corner regions of the substrate more easily through the opened portion 2162, thereby facilitating a uniform filling of the liquid crystal. The opened portion 2162 may be formed in at least one corner region of the substrates. Other elements, such as the dummy column spacer 2160, may be formed at different locations so as to be spaced apart from the lower substrate 2151.

Referring to FIG. 82B, the opened portion 2162 formed in the corner region of the substrate includes a plurality of openings for maximizing a liquid crystal flow. A plurality of openings may be formed at either a constant interval or an irregular interval.

Figure 83:
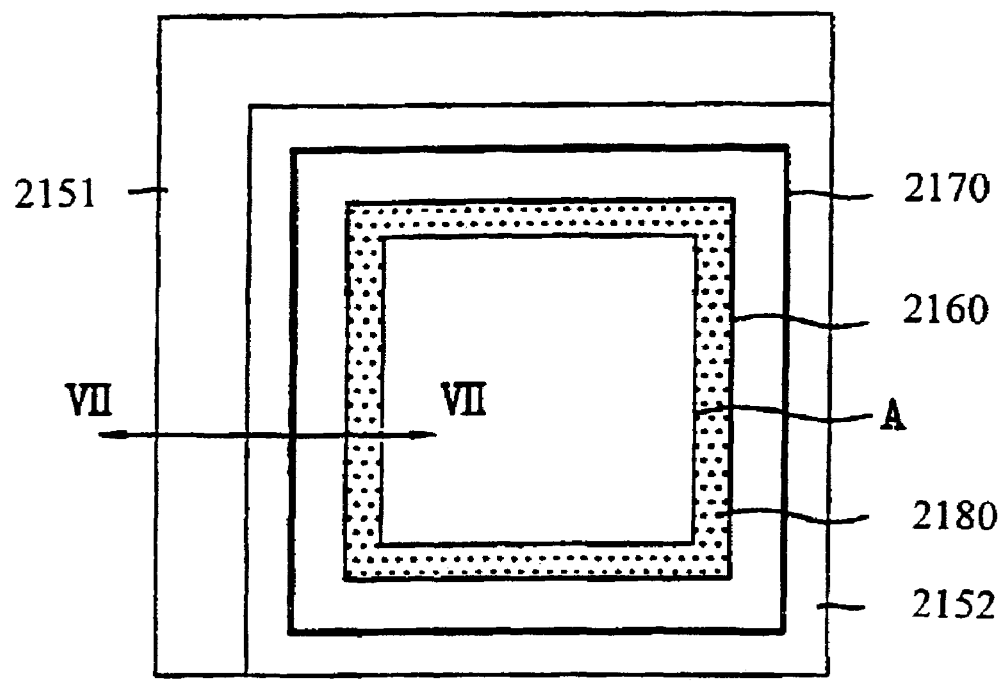
FIG. 83 illustrates a plane view of an LCD panel in accordance with another embodiment of the present invention.

FIG. 83 illustrates a plane view of an LCD panel in accordance with another embodiment of the present invention.

Referring to FIG. 83, the LCD panel includes a lower substrate 2151, an upper substrate 2152, and a UV sealant 2170 between the substrates 2151 and 2152. A plurality of column spacers (not shown) are formed in a pixel region (a line 'A' represents an imaginary line for indicating the pixel region), and a dummy column spacer 2160 is formed inside the UV sealant 2170 in the dummy region to regulate a liquid crystal flow. Also, a dotted line type dummy column spacer 2180 may be additionally formed at the inner dummy region of the dummy column spacer 2160 for assisting the regulation of the liquid crystal flow. A liquid crystal layer (not shown) is formed between the substrates 2151 and 2152.

The dummy column spacer 2160 is spaced apart from the lower substrate 2151 to regulate the liquid crystal flow by the gap. When a liquid crystal is excessively dispensed on the substrate, the liquid crystal may pass through the dummy column spacer 2160 and contact the UV sealant 2170. Thus, the liquid crystal may be contaminated by the UV sealant 2170.

To solve the problem, in the third embodiment of the present invention, a dotted line type dummy column spacer 2180 is additionally formed inside the dummy column spacer 2160, thereby regulating the excessively dispensed liquid crystal. The dotted line type dummy column spacer 2180 may be formed on the lower substrate 2151.

The dummy column spacer 2160 and the dotted line type dummy column spacer 2180 formed at various locations will be explained with reference to FIGS. 84A to 84F, which are cross-sectional views taken along line VII-VII of FIG. 83.

Figure 84A:
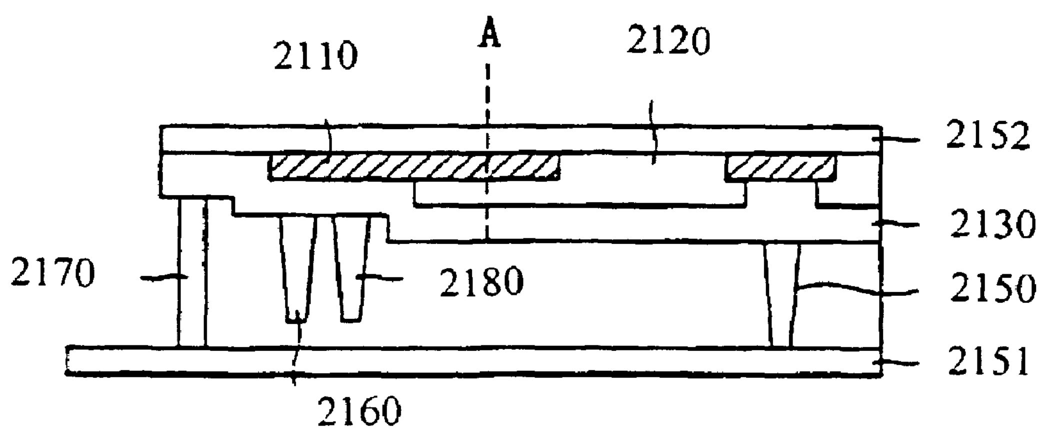
FIGS. 84A to 84H are cross-sectional views taken along line VII-VII of FIG. 83.

Referring to FIG. 84A, a black matrix 2110, a color filter layer 2120, and a common electrode 2130 are formed on the upper substrate 2152 in this order. A plurality of gate lines, data lines, thin film transistors, and pixel electrodes (all not shown) are formed on the lower substrate 2151. Column spacers 2150 are formed in the pixel region on the upper substrate 2152 each having a height of the cell gap. The dummy column spacer 2160 is formed in the dummy region on the upper substrate 2152, in more detail, on the common electrode 2130 over the black matrix 2110, with a height the same as the column spacer 2150. The dotted line type dummy column spacer 2180 is formed in the dummy region inside the dummy column spacer 2160, more specifically, on the common electrode 2130 over the black matrix 2110, with a height the same as the column spacer 2150. Although only one dotted line type dummy column spacer 2180 is shown in FIG. 84A, there may be more than one dotted line type column spacers 2180. Both the dummy column spacer 2160 and the dotted line type dummy column spacer 2180 may be spaced apart from the lower substrate 2151 as much as the height of the color filter layer 2120.

Figure 84B:
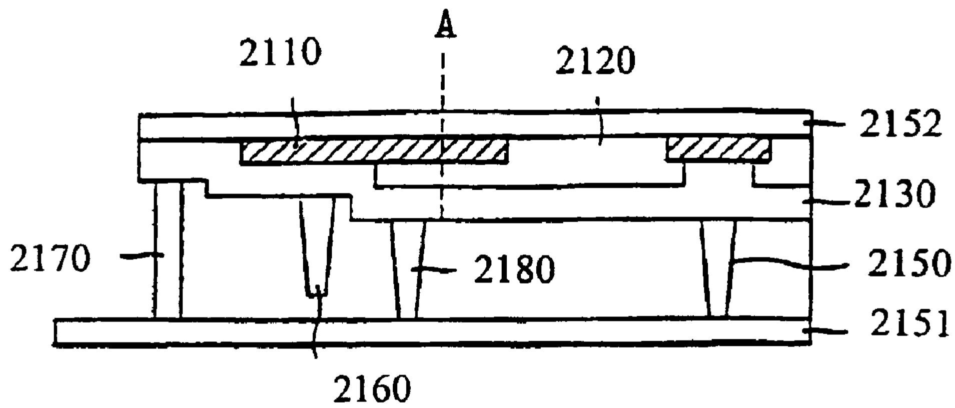

FIG. 84B illustrates a cross-sectional view of an LCD in accordance with another variation of the third embodiment of the present invention, wherein the dotted line type dummy column spacer 2180 is formed on the common electrode 2130 over the color filter layer 2120 instead of being formed on the common electrode 2130 over the black matrix 2110.

At the end, since the dotted line type dummy column spacer 2180 comes into contact with the lower substrate 2151, the liquid crystal can flow between the dotted line type dummy column spacers 2180.

Figure 84C:
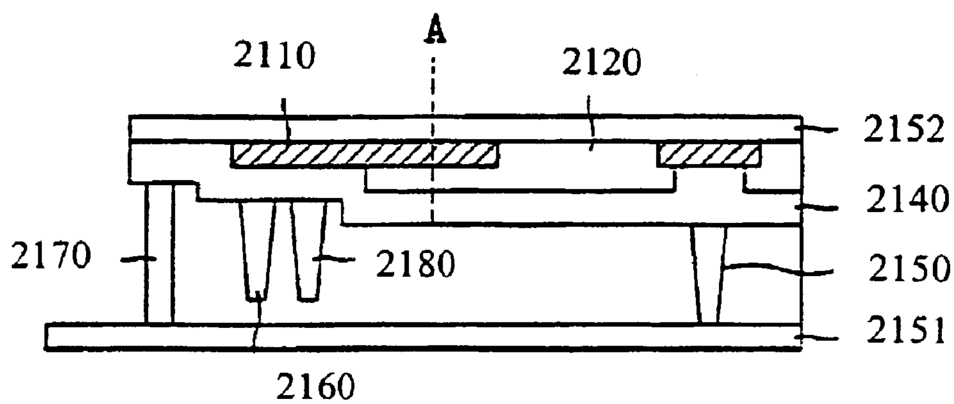
Figure 84D:
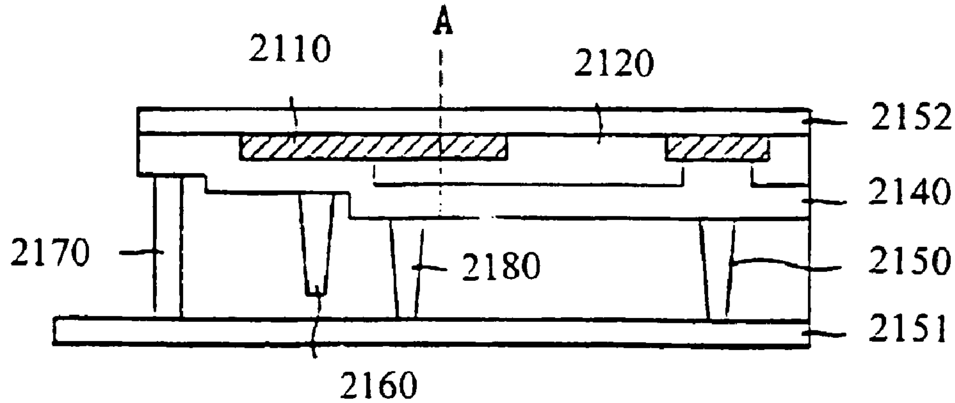

FIGS. 84C and 84D illustrate cross-sectional views each showing an LCD panel in accordance with other variations of the previous embodiment of the present invention, wherein the overcoat layer 2140 is formed on the upper substrate 2152 instead of the common electrode 2130. That is, it is an in-plane switching (IPS) mode LCD panel, with the common electrode formed on the lower substrate.

Figure 84E:
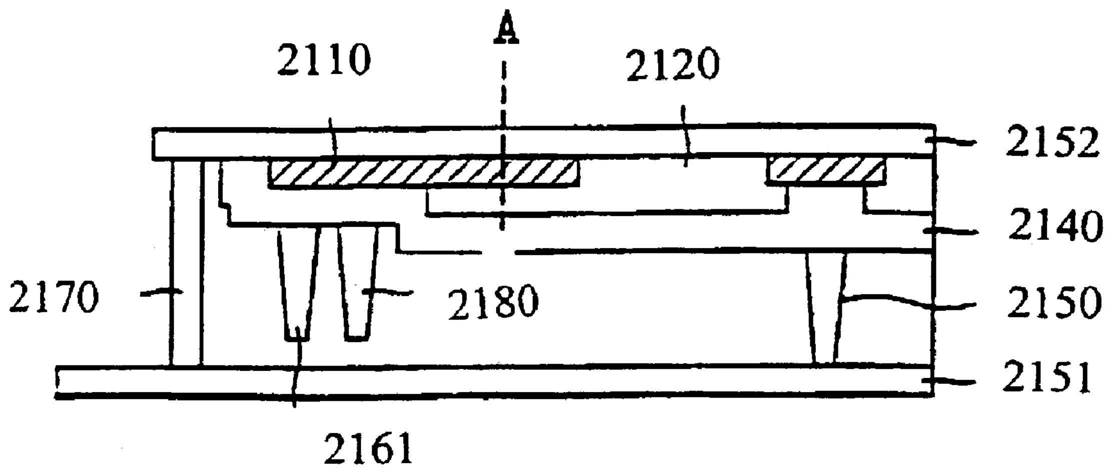
Figure 84F:
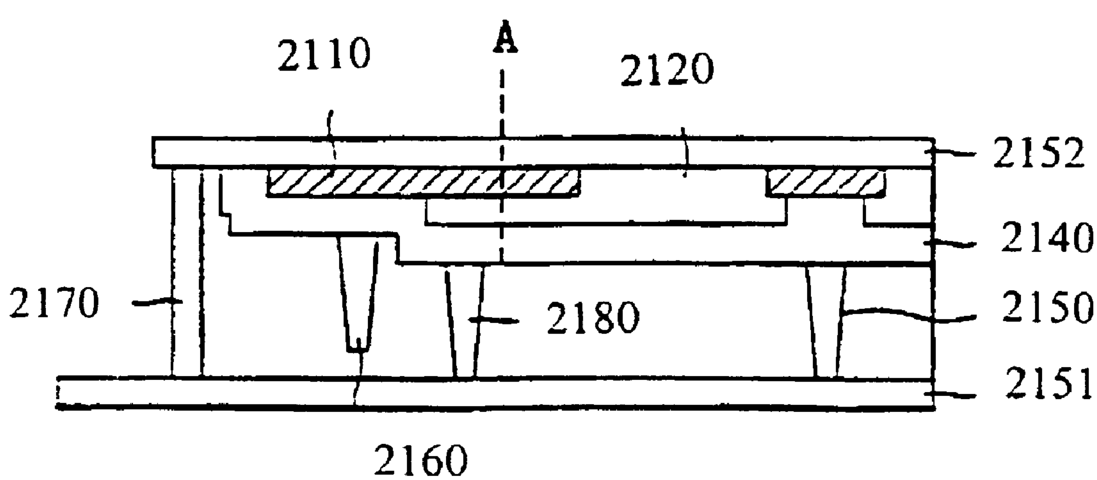

FIGS. 84E and 84F illustrate cross-sectional views each showing an LCD panel in accordance with other variations of the previous embodiment of the present invention, wherein the overcoat layer 2140 is patterned to be formed on the black matrix 2110 rather than on the sealant 2170.

Figure 84G:
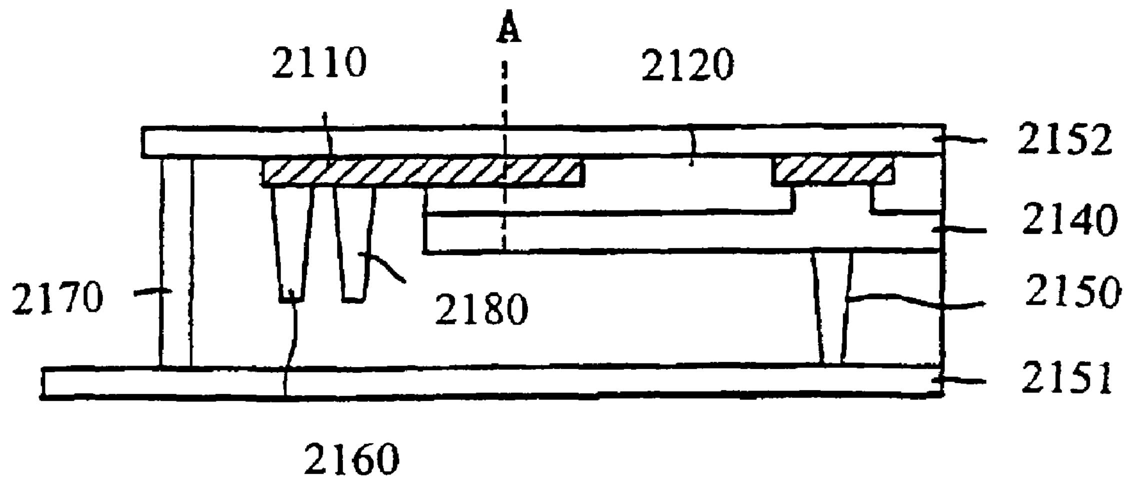
Figure 84H:
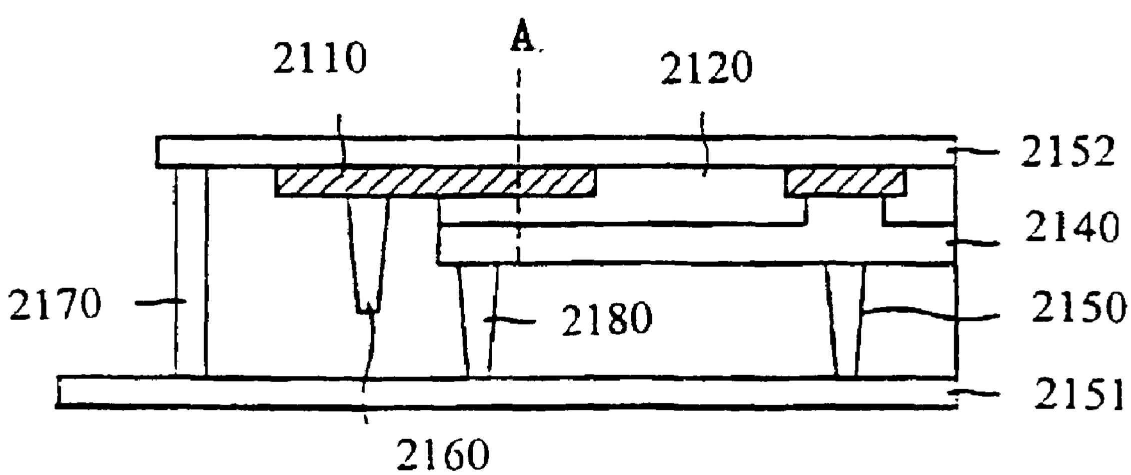

FIGS. 84G and 84H illustrate cross-sectional views each showing an LCD panel in accordance with other variations of the previous embodiment of the present invention, wherein the overcoat layer 2140 is patterned so that it is not formed on the black matrix 2110. Since the dummy column spacer 2160 and/or the dotted line dummy column spacer 2180 is formed on the black matrix 2110 rather than on the overcoat layer 2140, the gap to the lower substrate 2152 becomes greater.

Figure 85A:
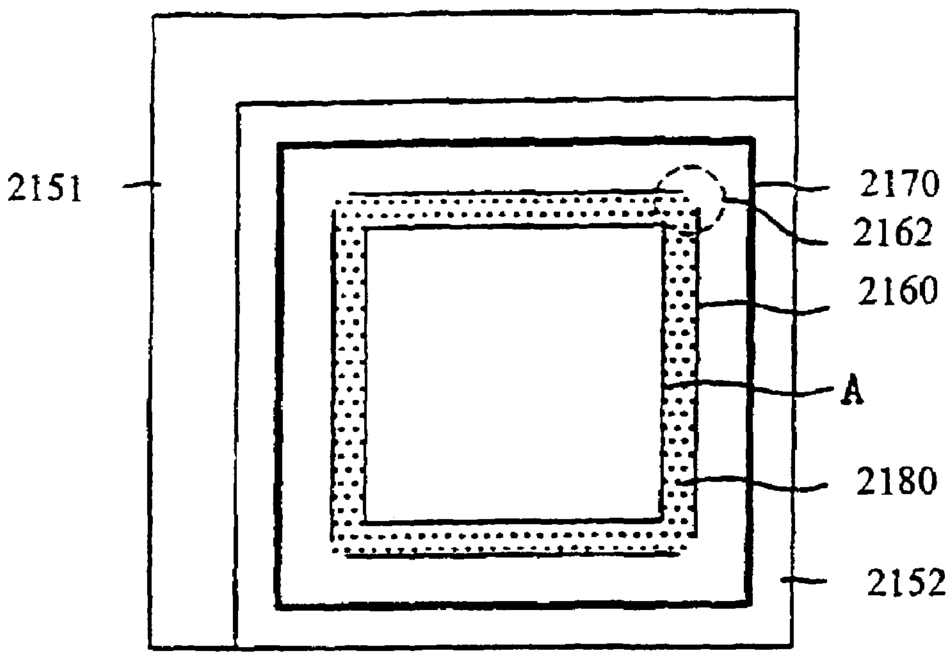
FIGS. 85A and 85B illustrate plane views of an LCD panel in accordance with another embodiment of the present invention.
Figure 85B:
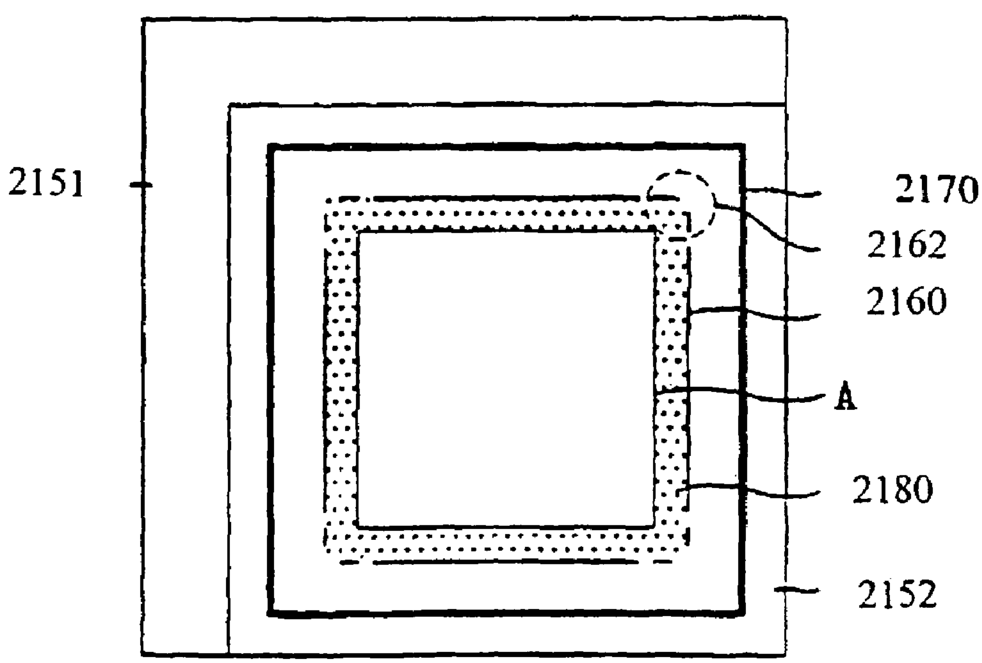

FIGS. 85A and 85B illustrate plane views of an LCD panel in accordance with another embodiment of the present invention. The fourth embodiment is similar to the third embodiment, except for that an opened portion 2162 is formed in a dummy column spacer 2160 at the corner regions of the substrate. The opened portion 2162 formed in the corner region of the substrate includes more than one opening for maximizing a liquid crystal flow, as shown in FIG. 85B. The openings may be formed at either a constant interval or an irregular interval.

Figure 86:
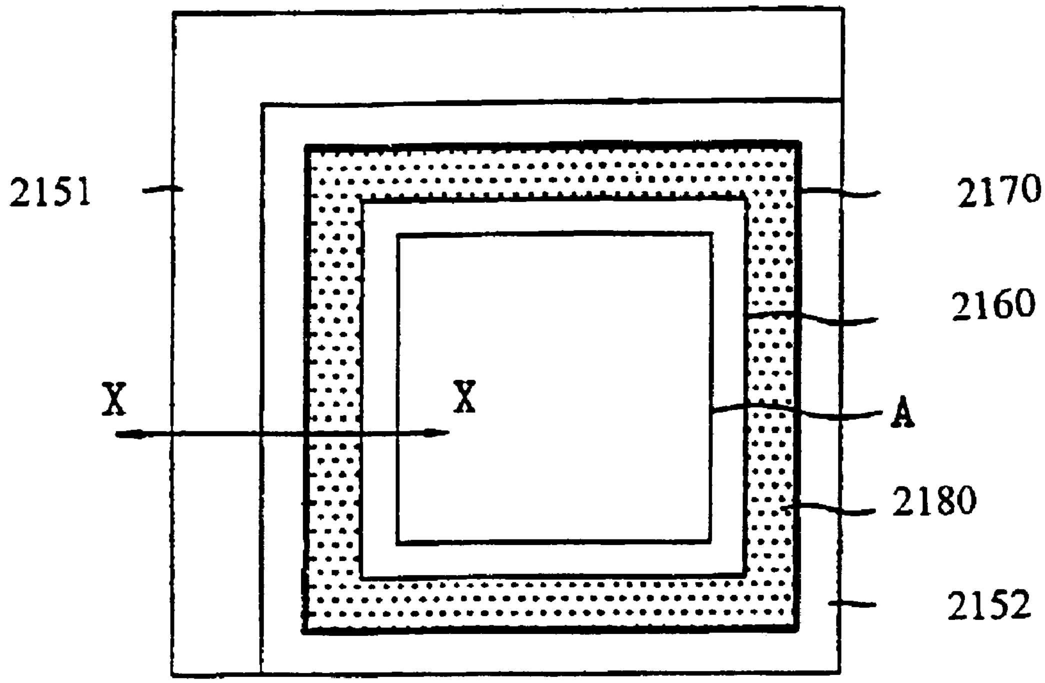
FIG. 86 illustrates a plane view of an LCD panel in accordance with another embodiment of the present invention.

FIG. 86 illustrates a plan view of an LCD panel in accordance with another embodiment of the present invention, wherein a dotted line type dummy column spacer 2180 is formed outside the dummy column spacer 2160.

Figure 87A:
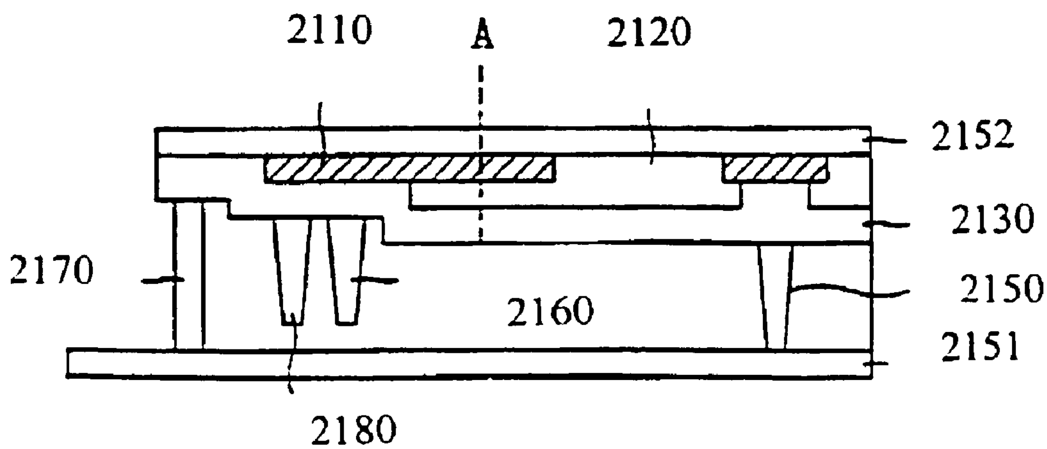
FIGS. 87A to 87D are cross-sectional views taken along line X-X of FIG. 86.
Figure 87B:
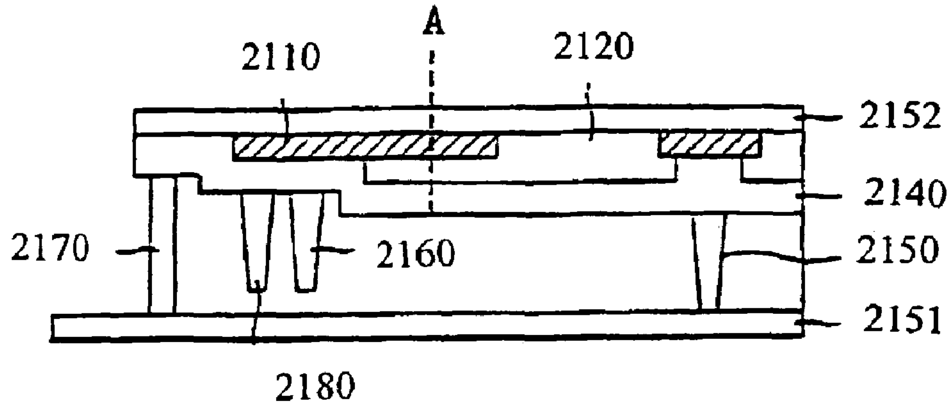
Figure 87C:
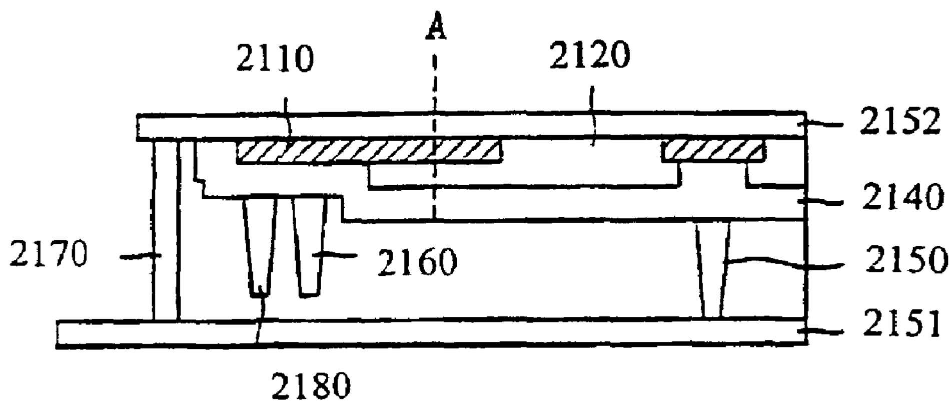
Figure 87D:
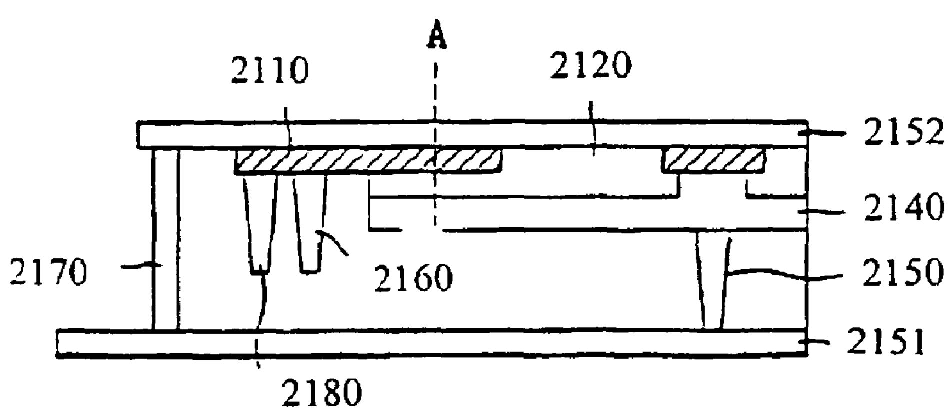

Locations of the dummy column spacer 2160 and the dotted line type dummy column spacer 2180 are shown in FIGS. 87A, 87B, and 87C. That is, both of the dummy column spacer 2160 and the dotted line type dummy column spacer 2180 are formed on the common electrode 2130 over the black matrix 2110 in the dummy region, as shown in FIG. 87A. Alternatively, they may be formed on the overcoat layer 2140 over the black matrix 2110 in the dummy region, as shown in FIGS. 87B and 87C. They may be formed on the black matrix 2110 in the dummy region, as shown in FIG. 87D.

Figure 88A:
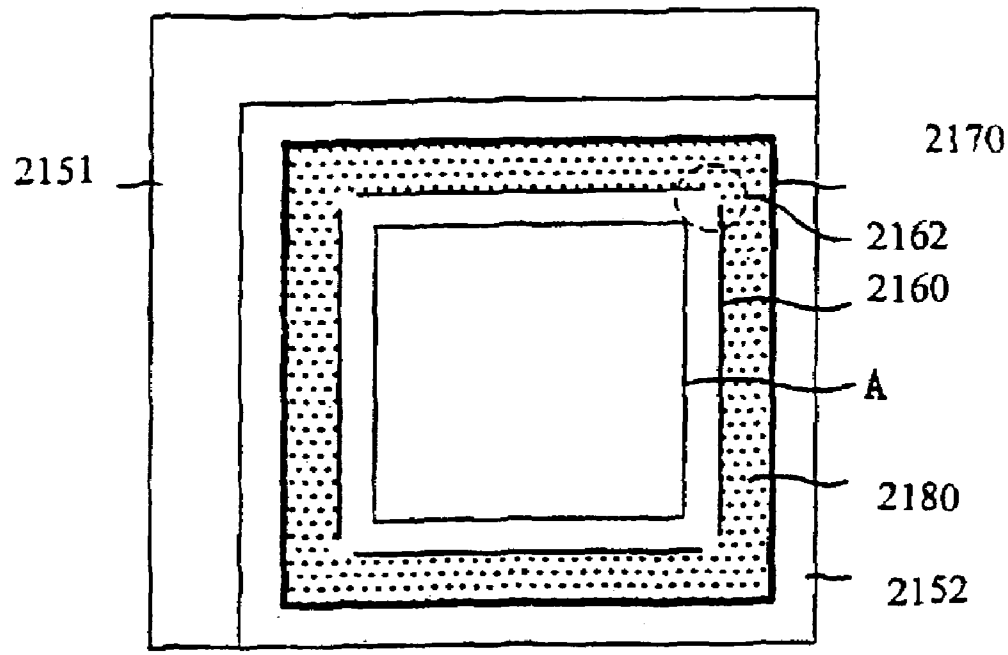
FIGS. 88A and 88B illustrate plane views of an LCD panel in accordance with another embodiment of the present invention.
Figure 88B:
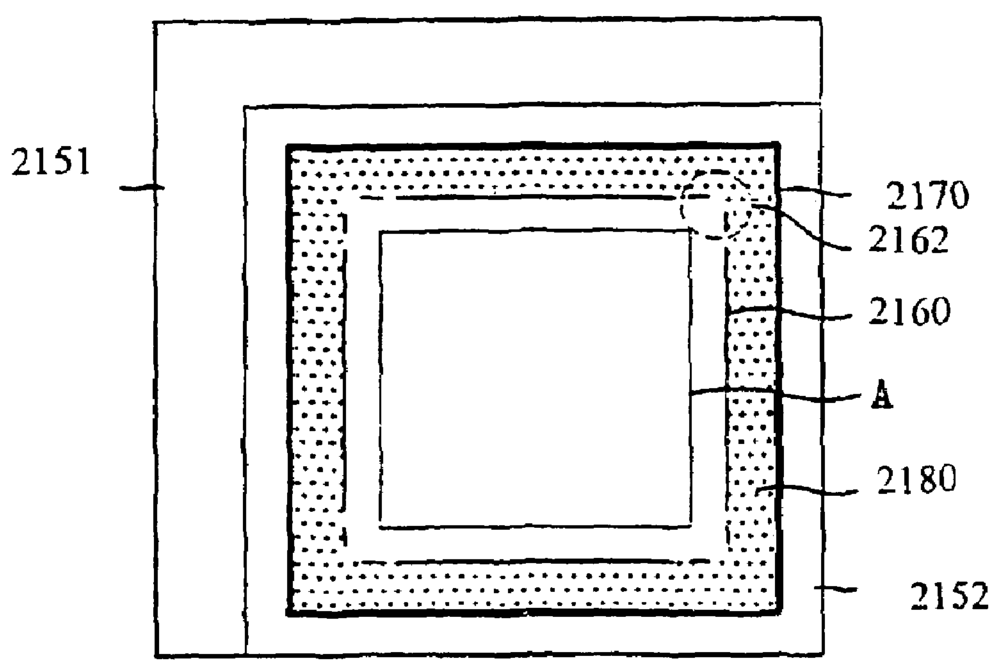

FIGS. 88A and 88B illustrate plan views of an LCD panel in accordance with another embodiment of the present invention. This embodiment is similar to the previous embodiment of the present invention except for that an opened portion 2162 is formed in the dummy column spacer 2160 in the corner regions of the substrate. More than one opened portion 2162 may be formed in the corner region of the substrate for maximizing a liquid crystal flow. The openings may be formed at either a constant interval or an irregular interval.

FIGS. 89A to 89D illustrate plan views of an LCD panel in accordance with another embodiment of the present invention, wherein a second dummy column spacer 2185 is additionally formed inside or outside a first dummy column spacer 2160.

Figure 89A:
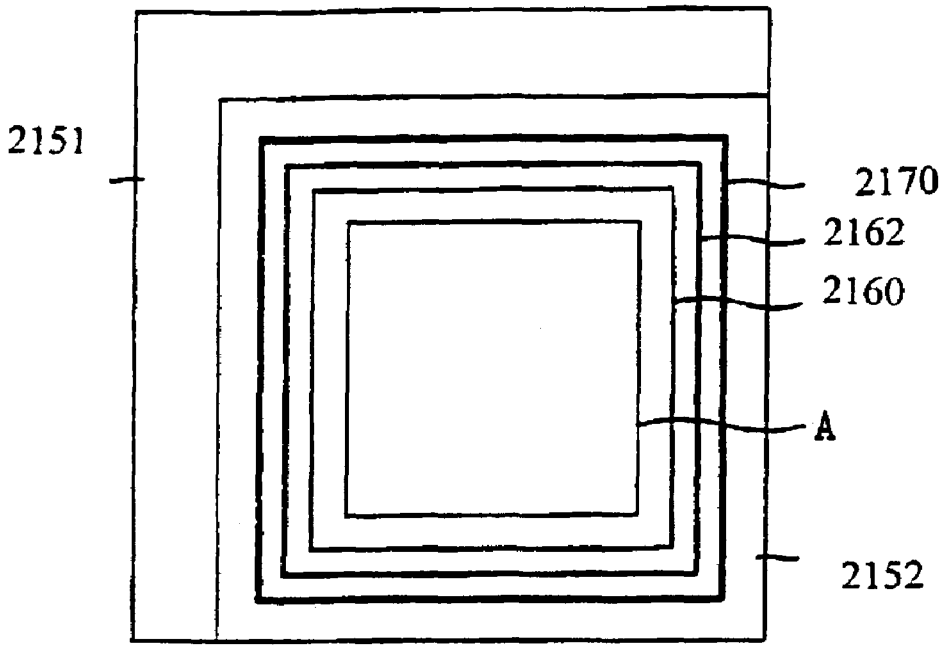
FIGS. 89A to 89D are plane views of an LCD panel in accordance with another embodiment of the present invention.
Figure 89B:
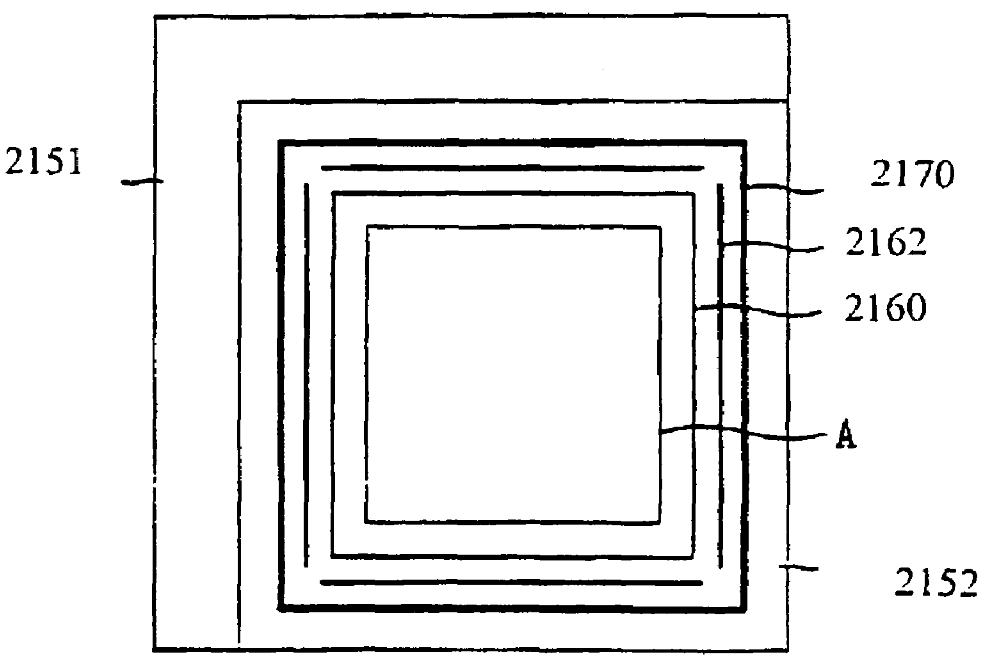
Figure 89C:
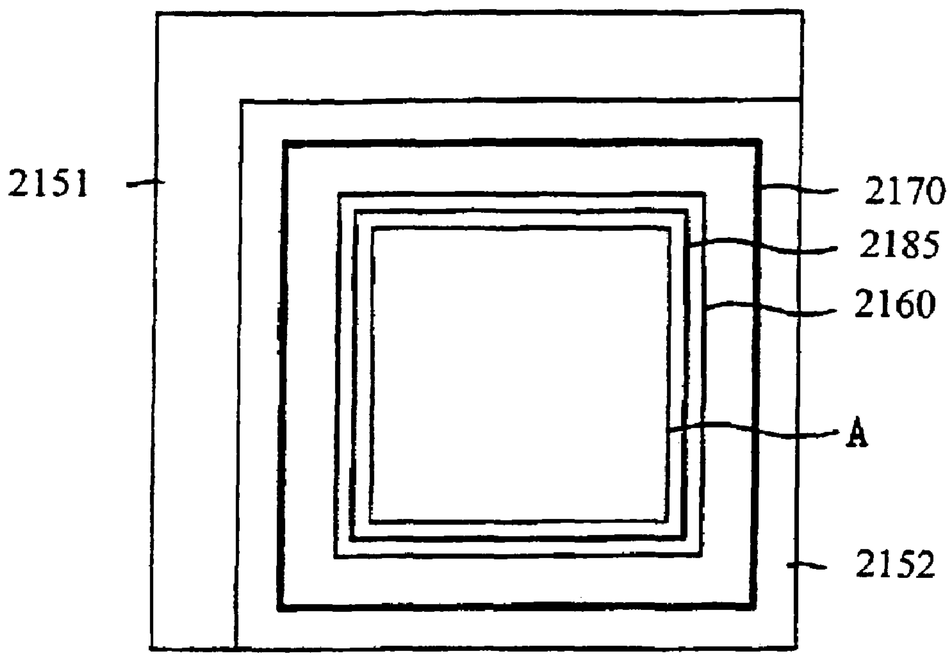
Figure 89D:
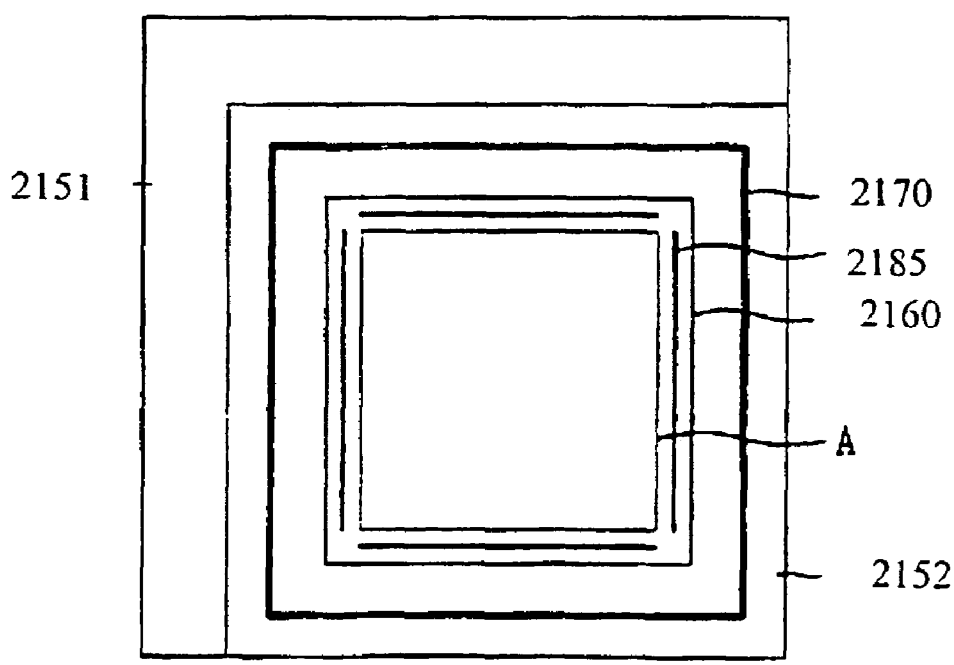

FIGS. 89A and 89B illustrate an LCD panel each having the second dummy column spacer 2185 formed outside the first dummy column spacer 2160, and FIGS. 89A and 89D illustrate an LCD panel each having the second dummy column spacer 2185 formed inside the first dummy column spacer 2160.

FIGS. 89B and 89C illustrate LCD panels each having the second dummy column spacer 2185 with an opened portion in at least one of the corner regions of the substrate. More than one opened portion may be formed at either a constant interval or an irregular interval. The first dummy column spacer 2160 may also have an opened portion formed in at least one of the corners of the substrate. Thus, the first dummy column spacer 2160 and the second dummy column spacer 2185 may be formed at various locations.

FIGS. 90A to 90D are perspective views illustrating a method for fabricating an LCD panel in accordance with another embodiment of the present invention. Although the drawing illustrates only one unit cell, there may be more than one unit cell.

Figure 90A:
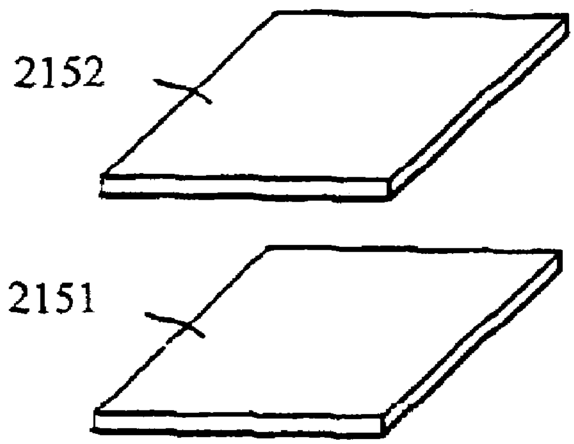
FIGS. 90A to 90D are perspective views illustrating a method for fabricating an LCD panel in accordance with another embodiment of the present invention.

Referring to FIG. 90A, a lower substrate 2151 and an upper substrate 2152 are prepared to form a dummy region and a pixel region. The dummy region has a portion spaced apart from the lower substrate 2151.

A plurality of gate lines and data lines (both not shown) are formed on the lower substrate 2151 to cross each other defining pixel regions. A thin film transistor having a gate electrode, a gate insulating film, a semiconductor layer, an ohmic contact layer, source/drain electrodes, and protection film, is formed at every crossed point of the gate lines and the data lines. A pixel electrode is formed at each of the pixel regions connected to the thin film transistor.

An alignment layer is formed on the pixel electrode for an initial orientation of the liquid crystal. The alignment layer may be formed of one of polyimide, polyamide group compound, polyvinylalcohol (PVA), and polyamic acid by rubbing, or a photosensitive material, such as polyvinvylcinnamate (PVCN), polysilioxanecinnamate (PSCN), or cellulosecinnamate (CelCN) group compound by photo-alignment.

A black matrix is formed on the upper substrate 2152 for shielding a light leakage from the gate lines, the data lines, and the thin film transistors. A color filter layer of red, green, and blue, is formed thereon. A common electrode is formed thereon. An overcoat layer may be additionally formed between the color filter layer and the common electrode.

Silver (Ag) dots are formed on the lower substrate 2151, for applying a voltage to the common electrode on the upper substrate 2152 after the two substrates 2151 and 2152 are bonded with each other. Alternatively, the silver dots may be formed on the upper substrate 2152.

In an in-plane switching mode LCD panel, a lateral field is induced by the common electrode formed on the lower substrate the same as the pixel electrode. Thus, the silver dots may not be formed on the substrates. As shown in the first to eighth embodiments, the column spacer, the dummy column spacer, the dotted line type dummy column spacer, the second dummy column spacer may be formed on the various locations of the upper substrate 2152. The column spacer and the dummy column spacer, the column spacer, the dummy column spacer, and the dotted line type dummy column spacer, or the column spacer, the dummy column spacer, and the second dummy column spacer may be formed of photosensitive resin at the same time with the same height (i.e., at the height of a cell gap). The foregoing alignment layer is formed on the upper substrate 2152.

Figure 90B:
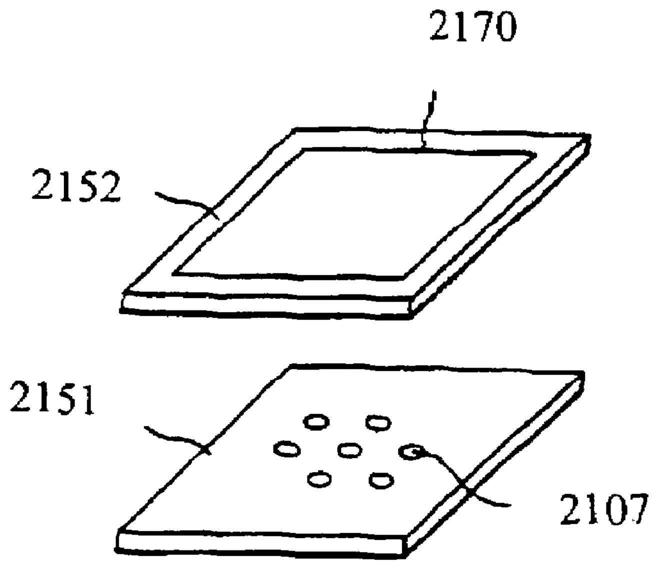

Referring to FIG. 90B, a UV sealant is coated on the upper substrate 2152. The sealant may be coated by using a dispensing method or a screen printing method. However, the screen printing method may damage the alignment layer formed on the substrate since the screen directly contacts the substrate. Also, the screen printing method may not be economically feasible due to a large amount of the sealant loss for a large substrate.

For example, monomers or oligomers each having both ends coupled with an acrylic group mixed with an initiator, or monomers or oligomers each having one end coupled with an acrylic group and the other end coupled with an epoxy group mixed with an initiator is used as the UV sealant 2170.

Then, a liquid crystal 2107 is dispensed onto the lower substrate 2151 to form a liquid crystal layer. A dispensed amount of the liquid crystal is determined by a substrate size and a cell gap. Generally, the liquid crystal is dispensed more than the determined amount.

The liquid crystal is contaminated once the liquid crystal contacts the sealant 2170 before the sealant 2170 is hardened. Therefore, the liquid crystal 2107 is dispensed onto the central part of the lower substrate 2151. A flow speed of the liquid crystal 2107 dispensed onto the central part is appropriately regulated by the dummy column spacer and the dotted line type dummy column spacer, thereby uniformly spreading the liquid crystal 2107 inside the UV sealant 2170.

FIG. 90B illustrates that the liquid crystal 2107 is dispensed on the lower substrate 2151 and the UV sealant 2170 are coated on the upper substrate 2152. Alternatively, the liquid crystal 2107 may be dispensed on the upper substrate 2152, and the UV sealant 300 may be coated on the lower substrate 2151.

Moreover, the liquid crystal 2107 and the UV sealant 2170 may be formed on the same substrate. The liquid crystal and the sealant may be formed on the different substrates in order to shorten the fabrication time period. When the liquid crystal 2107 and the UV sealant 2170 are formed on the same substrate, there occurs unbalance in the fabricating processes between the substrate with the liquid crystal and the sealant and the substrate without the liquid crystal and the sealant. In addition, the substrate cannot be cleaned when the sealant is contaminated before the substrates are attached to each other since the liquid crystal and the sealant are formed on the same substrate. Therefore, after coating the UV sealant a substrate cleaning step may be added.

Figure 90C:
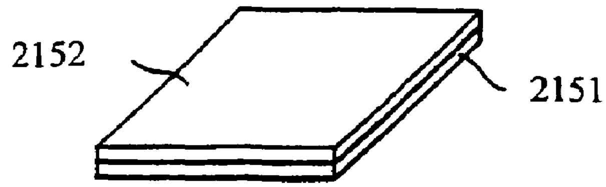

Referring to FIG. 90C, the lower substrate 2151 and the upper substrate 2152 are attached to each other. The lower substrate 2151 and the upper substrate 2152 may be bonded by the following processes. First, a liquid crystal is dispensed on one of the substrates. The other substrate is turned by 180 degrees so that the side of the substrate at the upper side having the liquid crystal faces into the upper surface of the substrate at the lower side. Thereafter, the substrate at the upper side is pressed, or the space between the substrates is evacuated, and releasing the vacuum, thereby attaching the two substrates.

Figure 90D:
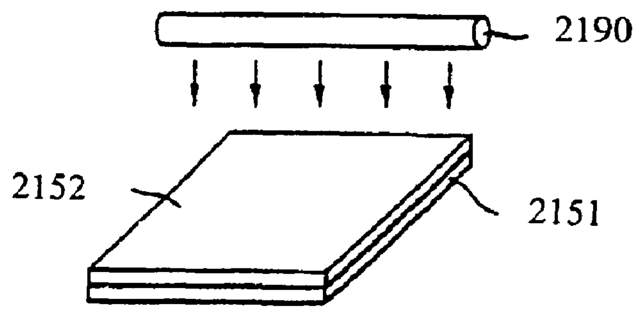

Then, referring to FIG. 90D, a UV ray is irradiated on the attached substrates by using a UV irradiating device 2190. Upon irradiating the UV ray, monomers or oligomers are polymerized by the initiator in the UV sealant, thereby bonding the lower substrate 2151 and the upper substrate 2152.

Monomers or oligomers each having one end coupled to an acrylic group and the other end coupled to an epoxy group mixed with an initiator are used as the UV sealant 2170. Since the epoxy group is not reactive with the UV irradiation, the sealant may have to be heated at about 120° C. for one hour after the UV irradiation for hardening the sealant.

In the meantime, the irradiation of the UV ray to the entire surface of the attached substrates may affect characteristics of devices, such as thin film transistors formed on the substrate, and alter a pre-tilt angle of the alignment layer formed for an initial orientation of the liquid crystal.

Figure 91:
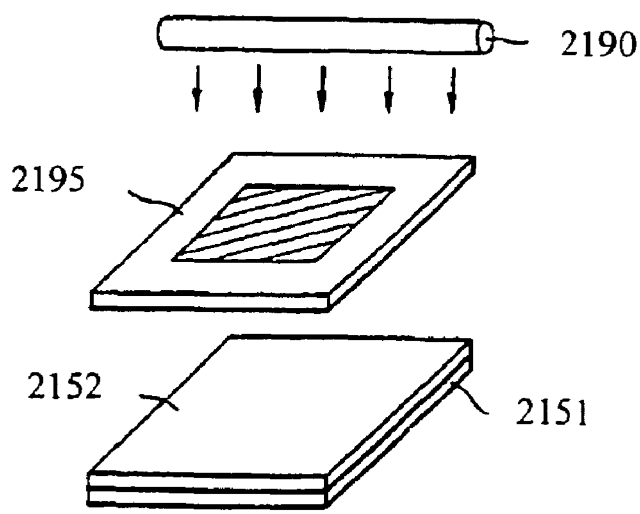
FIG. 91 is a perspective view illustrating irradiating a UV ray in a method for fabricating an LCD panel in accordance with the present invention.

Therefore, as shown in FIG. 91, the UV irradiation is carried out with masking the pixel regions inside the UV sealant 2170 by a mask 2195. Then, the bonded substrates are cut into unit cells. In the cutting step, after forming a scribing line (scribing process) on the surface of the bonded substrates by a scriber, such as a diamond pen with a hardness higher than the substrate, a mechanical impact is applied thereto along the scribing line by using a breaker (a break process), to obtain a plurality of unit cells at the same time.

Alternatively, a pen or wheel of diamond may be used to carry out the scribing and the breaking in one step, to obtain a unit cell one by one. A cutting device carrying out the scribing/breaking at the same time may be used in view of an occupied space of the cutting device and a required cutting time period.

Then, a final inspection is carried out after the cutting. In the final inspection, presence of defects is verified before the substrates cut into cell units are assembled into a module, by examining a proper operation of the pixels when a voltage applied thereto is turned on/off.

As explained above, the LCD panel and the method for fabricating the same of the present invention have the following advantages.

The dummy column spacer and the dotted line type dummy column spacer in the dummy region facilitate the liquid crystal flow on the substrate, thereby maintaining a uniform cell gap and improving a picture quality.

Also, the dummy column spacer and the dotted line type dummy column spacer prevent the liquid crystal from contacting the UV sealant.

Figure 92:
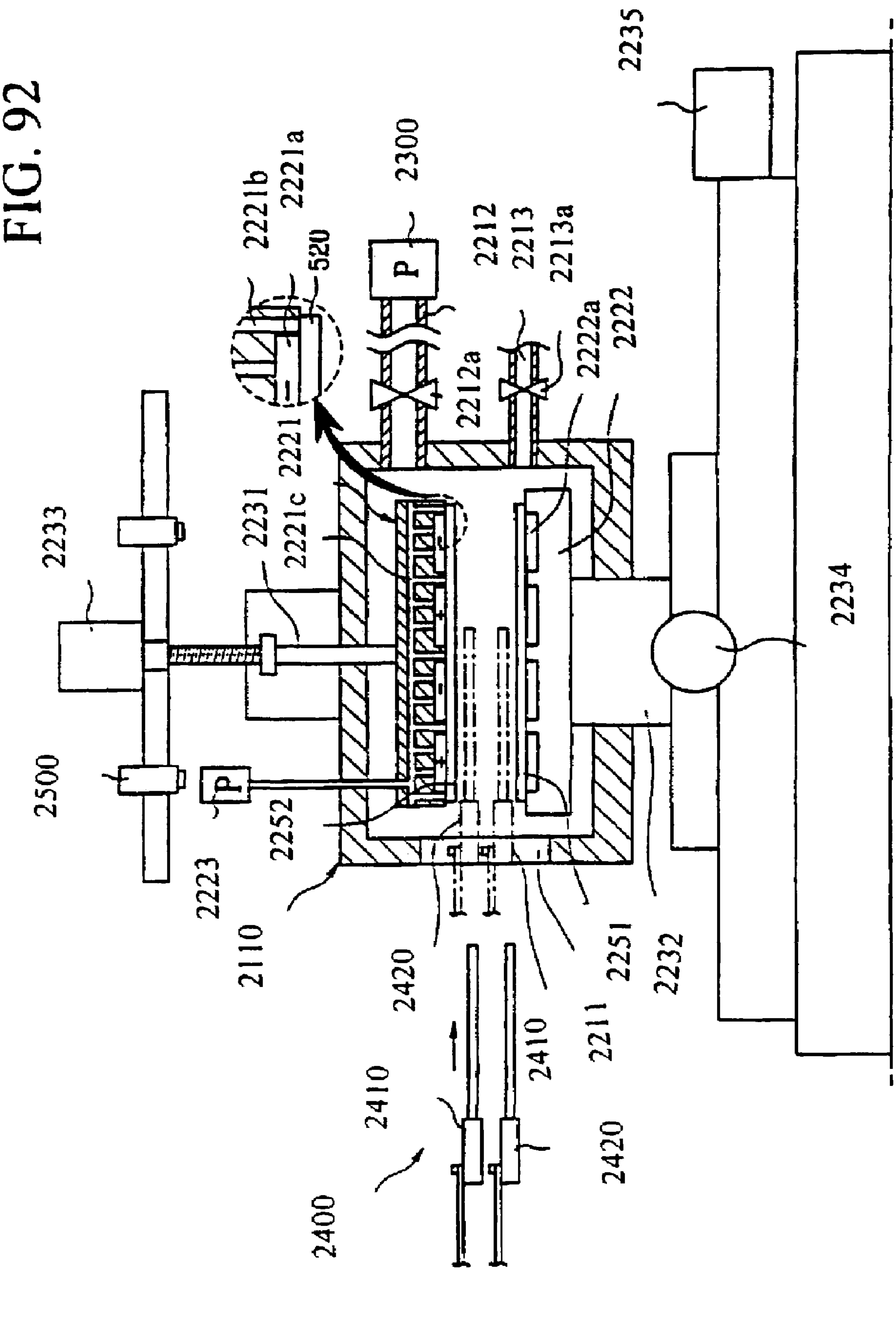
FIG. 92 shows an exemplary apparatus for manufacturing a liquid crystal display device during a loading process according to the present invention.

FIG. 92 shows an exemplary apparatus for manufacturing a liquid crystal display device during a loading process according to the present invention. In FIG. 92, the apparatus may include a vacuum processing chamber 2210, an upper stage 2221, a lower stage 2222, an upper stage moving axis 2231, a lower stage rotational axis 2232, an upper stage driving motor 2233, a lower stage driving motor 2234, a vacuum generating system 2300, and a loader part 2400.

The vacuum processing chamber 2210 may be connected to the vacuum generating system 2300 by an air outlet 2212 via an air outlet valve 2212*a* for reducing a pressure of an interior of the vacuum processing chamber 2210. The vacuum processing chamber may include a vent pipe 2213 for increasing the pressure of the interior of the vacuum processing chamber 2210 via introduction of air or gas through a vent pipe valve 2213*a*. Accordingly, the vacuum processing chamber may include a vacuum processing chamber entrance 2211 to allow for introduction and extraction of a first substrate 2251 and a second substrate 2252 by the loader part 2400.

The upper and lower stages parts 2221 and 2222 may be provided at upper and lower portions of the vacuum processing chamber 2210, respectively. The upper and lower stages 2221 and 2222 may include an electrostatic chuck (ESC) 2221*a* and 2222*a* provided at a opposing surfaces of the upper and lower stages 2221 and 2222, respectively. Accordingly, the upper electrostatic chuck 2221*a* electrostatically attaches the substrate 2252 to the upper stage 2221, and the lower electrostatic chuck 2222*a* electrostatically attaches the substrate 2251 to the lower stage 2222. In addition, the upper stage 2221 may include a plurality of vacuum holes 2221*b* formed through the upper stage 2221, thereby attaching the substrate 2252 to the upper stage 2221 by forming a vacuum within the plurality of vacuum holes 2221*b*. The upper and lower electrostatic chucks 2221*a* and 2222*a* may be provided with at least one pair of electrostatic plates having different polarities to apply serial power having different polarities. Alternatively, the upper and lower electrostatic chucks 2221*a* and 2222*a* may be provided with electrostatic plates simultaneously having two identical polarities.

The plurality of the vacuum holes 2221*b* may be formed in a center portion and along a circumference of the upper electrostatic chuck 2221*a*, and may be connected to a single or multiple pipes 2221*c* to transmit a vacuum force generated by a vacuum pump 2223 connected to the upper stage 2221. Alternatively, even though the upper electrostatic chuck 2221*a* and the plurality of vacuum holes 2221*b* may be formed to have a shape similar to the upper stage 2221, it may preferable to arrange the upper electrostatic chuck 2221*a* and the plurality of vacuum holes 2221*b* based upon a geometry of the substrate 2252 or upon a geometry of a region upon which liquid crystal material is disposed.

The upper stage moving axis 2231 drives the upper stage 2221, the lower stage rotational axis 2232 drives the lower stage 2222, and the upper and lower stage driving motors 2233 and 2234 drive the upper and lower stages 2221 and 2222, respectively, at inner and outer sides of the vacuum processing chamber 2210. A driving system 2235 may be provided driving the lower stage 2222 during an alignment process for aligning the first and second substrates 2251 and 2252.

The vacuum generating system 2300 may transmit a suction force to generate a vacuum state inside the vacuum processing chamber 2210, and may include a suction pump driven to generate a general vacuum force. In addition, the vacuum generating system 2300 may be interconnected to the air outlet 2212 of the vacuum processing chamber 2210.

The loader part 2400 may be a mechanical device separate from the vacuum processing chamber 2210, and may be provided at the outer side of the vacuum processing chamber 2210. The loader part 2400 may receive one of the first substrate 2251 and the second substrate 2252 upon which at least the liquid crystal material is disposed. In addition, the first substrate 2251 may include both the liquid crystal material and the sealant. Moreover, the first substrate 2251 may include one of a TFT array substrate and a color filter (C/F) substrate, and the second substrate 2252 may include another one of the TFT array substrate and the C/F substrate. Then, the loader part 2400 may selectively load both of the first and second substrates 2251 and 2252 into the vacuum processing chamber 2210. The loader part 2400 may include a first arm 2410 to carry the first substrate 2251 upon which at least the liquid crystal material is disposed, and a second arm 2420 to carry the second substrate 2252. During the loading of the first and second substrates 2251 and 2252, the first arm 2410 may be placed over the second arm 2420.

An alignment system 2500 may be further included to certify an alignment state of the first and second substrates 2251 and 2252. The alignment system 2500 may be provided to at least one of the inner and outer sides of the vacuum processing chamber 2210. Since movement of the lower stage 2222 may be limited, an alignment state between the first and second substrates 2251 and 2252 may be accurately and quickly achieved.

Hereinafter, a bonding process of the first and second substrates 2251 and 2252 using the apparatus for manufacturing a liquid crystal display device according to the present invention will now be explained.

In FIG. 92, the loader part 2400 receives one of the first substrate 2251 and the second substrate 2252 upon which at least a liquid crystal material is disposed at the first arm 2410, and an other of the first substrate 2251 and the second substrate 2252 at the second arm 2420. The second arm 2420 loads the substrate 2252 onto a lower surface of the upper stage 2221, and the first arm 2410 loads the substrate 2251 upon which at least the liquid crystal material is disposed onto an upper surface of the lower stage 2222. The substrate 2252 may be loaded onto the lower surface of the upper stage 2222 before the substrate 2251 upon which at least the liquid crystal material is disposed in order to prevent any particles from being deposited upon the substrate 2251. During the loading process of the substrate 2251, the particles can fall on the substrate 2251 on which a liquid crystal material is disposed.

The second arm 2420 carries the substrate 2252 under the upper stage, and then a vacuum pump 2223 is enabled to transmit a vacuum force to each of the plurality of vacuum holes 2221*b* at the upper stage 2221. The first arm 2410 carries the substrate 2251 above the lower stage 2222 to affix the substrate 2252 to the upper stage 2221 from the second arm 2420 and a vacuum pump (not shown) is enabled to transmit a vacuum force to each of the plurality of vacuum holes (not shown) at the lower stage 2222 to affix the substrate 2251 to the lower stage 2222 from the first arm 2410.

After the loading of the substrates 2251 and 2252 is completed, shielding door 2214 (FIG. 93) disposed at the vacuum processing chamber entrance 2211 is enabled, thereby sealing the vacuum processing chamber entrance 2211.

Figure 93:
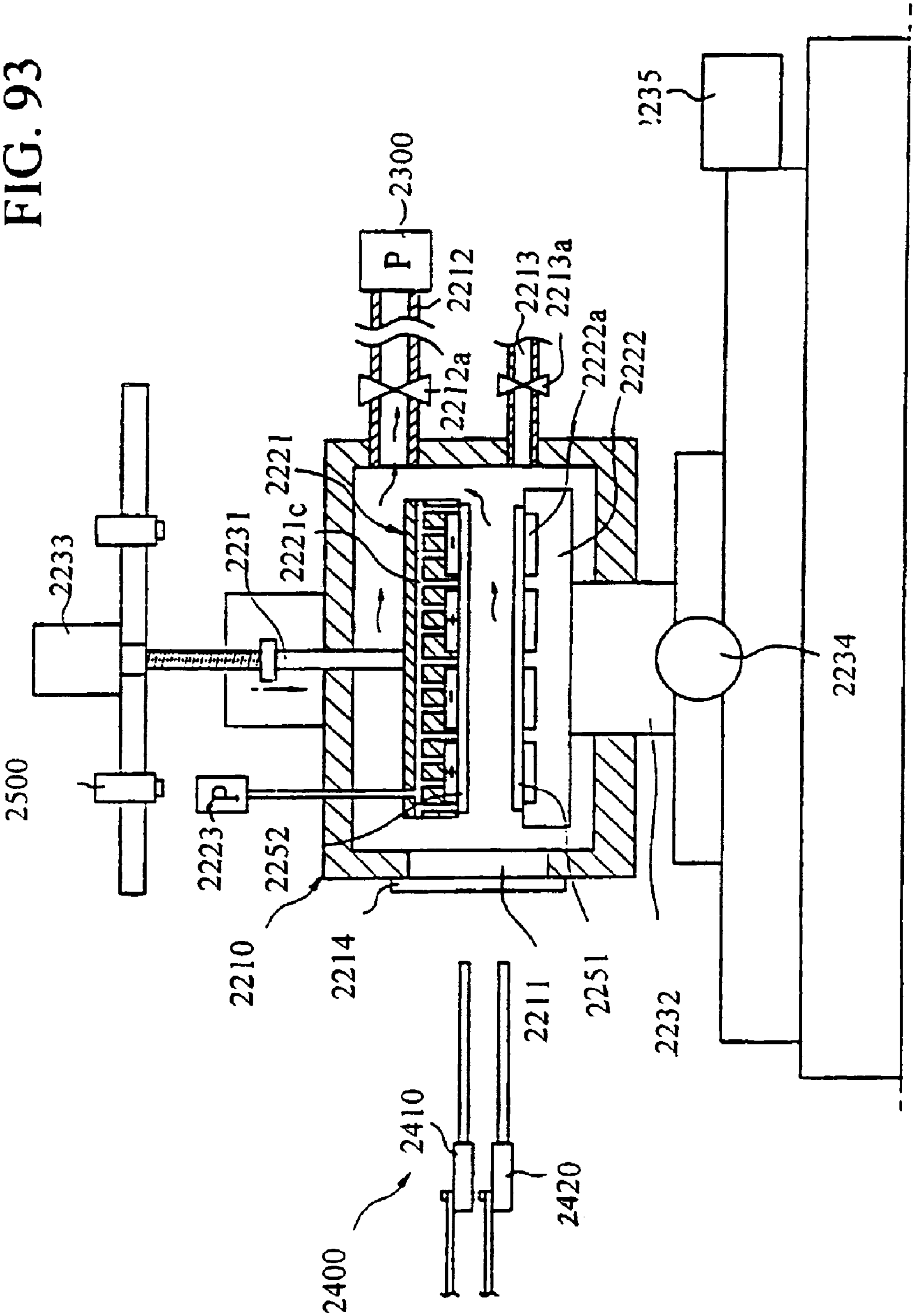
FIG. 93 shows the exemplary apparatus for manufacturing a liquid crystal display device during a vacuum process according to the present invention.

FIG. 93 shows the exemplary apparatus for manufacturing a liquid crystal display device during a vacuum process according to the present invention. In FIG. 93, the vacuum generating system 2300 is enabled, and the air outlet valve 2212*a* is opened, thereby evacuating the interior of the vacuum processing chamber 2210. Once the interior of the vacuum processing chamber 2210 is successfully evacuated to a desired pressure, the vacuum generating system 2300 may be disabled, and the air outlet valve 2212*a* may be closed. Accordingly, power may be applied to the upper and lower electrostatic chucks 2221*a* and 2222*a*, thereby affixing the substrates 2251 and 2252 to the upper and lower stages 2221 and 2222 by an electrostatic force.

Figure 94:
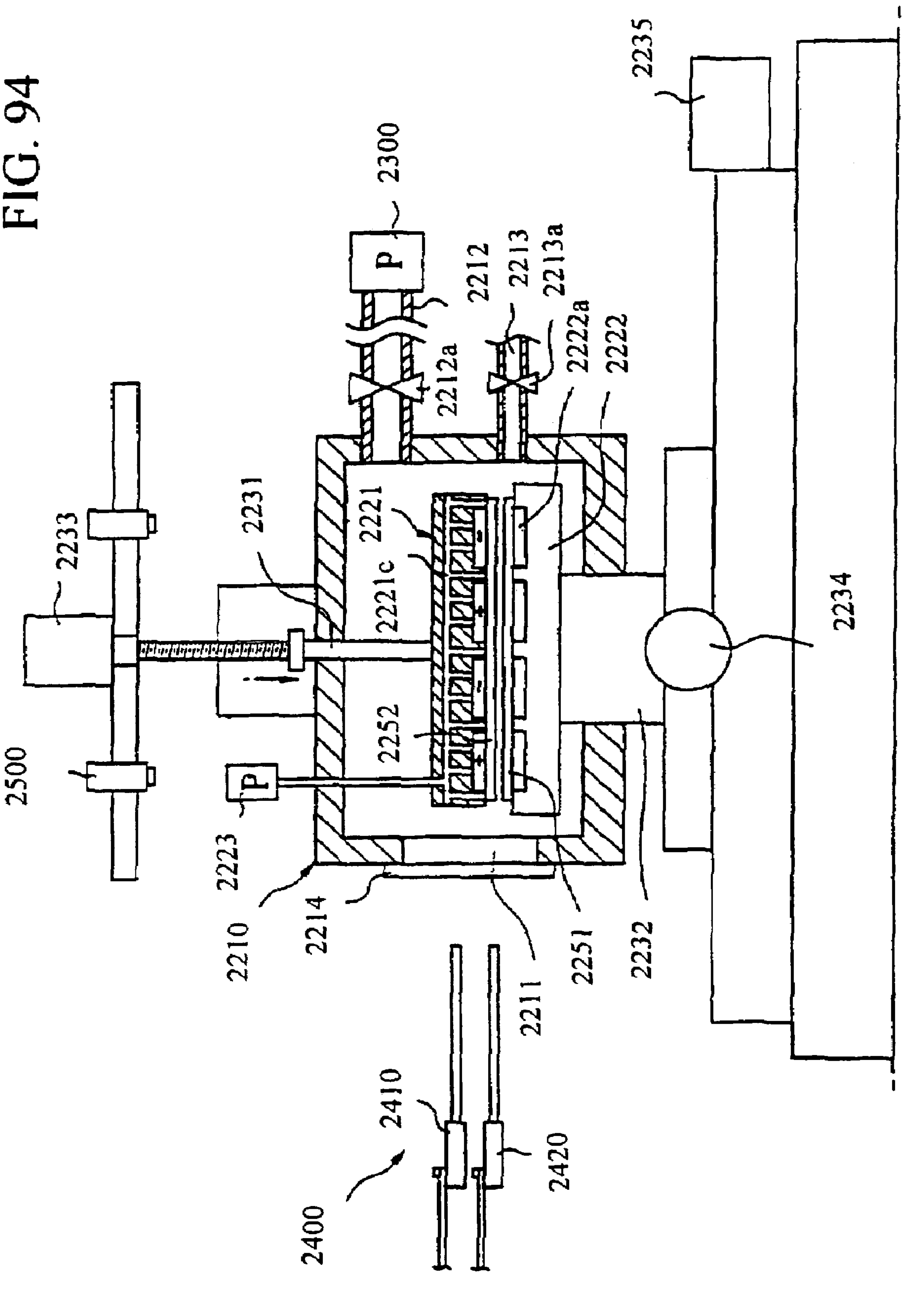
FIG. 94 shows the exemplary apparatus for manufacturing a liquid crystal display device during a location alignment process between substrates according to the present invention.

FIG. 94 shows the exemplary apparatus for manufacturing a liquid crystal display device during a location alignment process between substrates according to the present invention. In FIG. 94, the upper stage driving motor 2233 moves the upper stage 2221 toward the lower stage 2222, so that the upper stage 2221 is placed adjacent to the lower stage 2222. Then, the alignment system 2500 certifies the alignment state of the first and second substrates 2251 and 2252 that are attached to the upper and lower stages 2221 and 2222, respectively. The alignment system 2500 transmits a control signal to the upper stage moving axis and to the lower stage rotational axis 2232, thereby aligning the first and second substrates 2251 and 2252.

Figure 95:
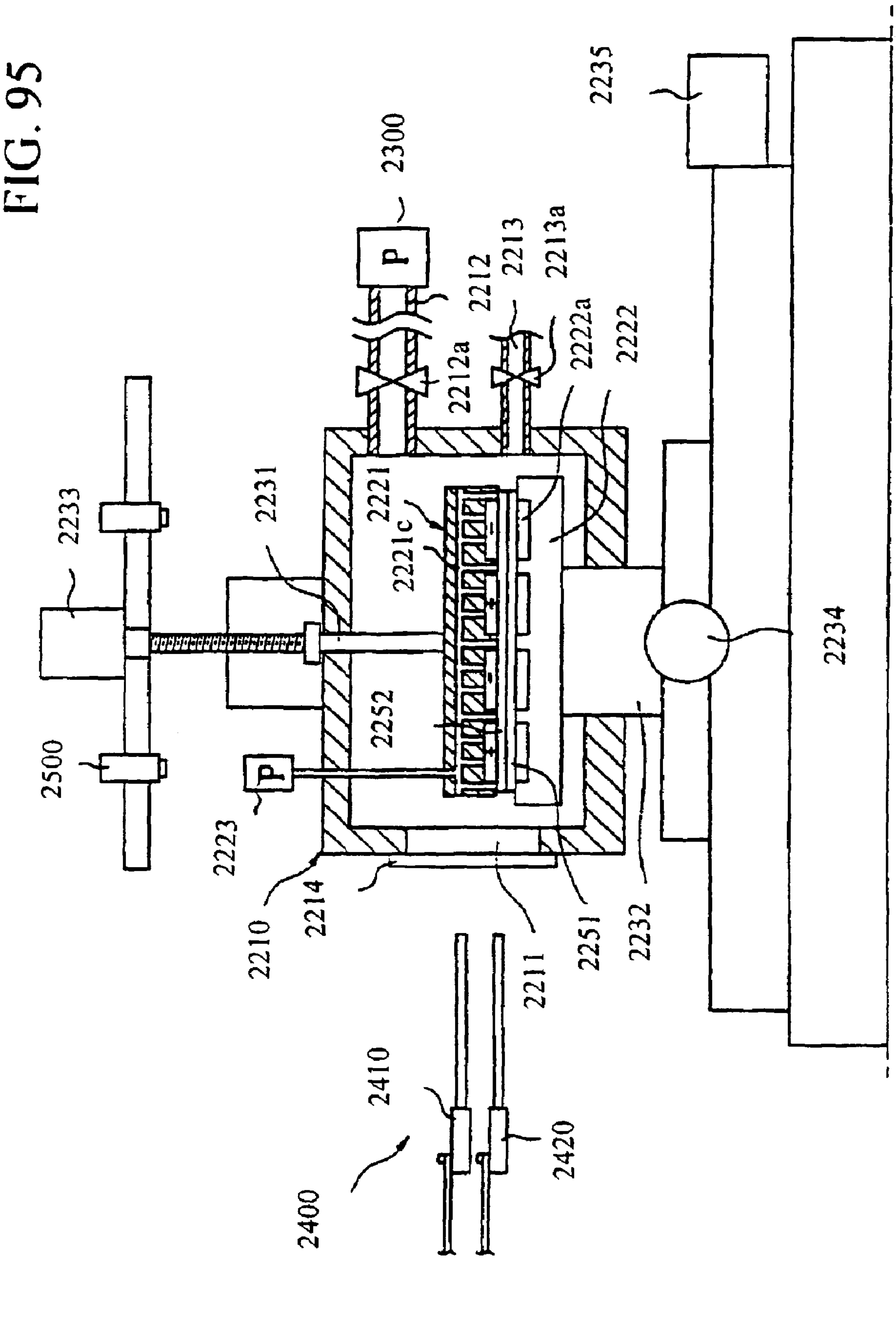
FIG. 95 shows the exemplary apparatus for manufacturing a liquid crystal display device during a bonding process of the substrates according to the present invention.

FIG. 95 shows the exemplary apparatus for manufacturing a liquid crystal display device during a bonding process of the substrates according to the present invention. In FIG. 95, the upper stage moving axis 2231 is driven in response to a drive signal received from the alignment system 2500, and performs a first bonding process to bond the substrates 2251 and 2252. However, the first bonding process may not necessarily completely bond the substrates 2251 and 2252. The first bonding process loosely bonds the substrates 2251 and 2252 such that air is not to be introduced between the bonded substrates when the pressure of the vacuum processing chamber is increased to atmospheric pressure.

Figure 96:
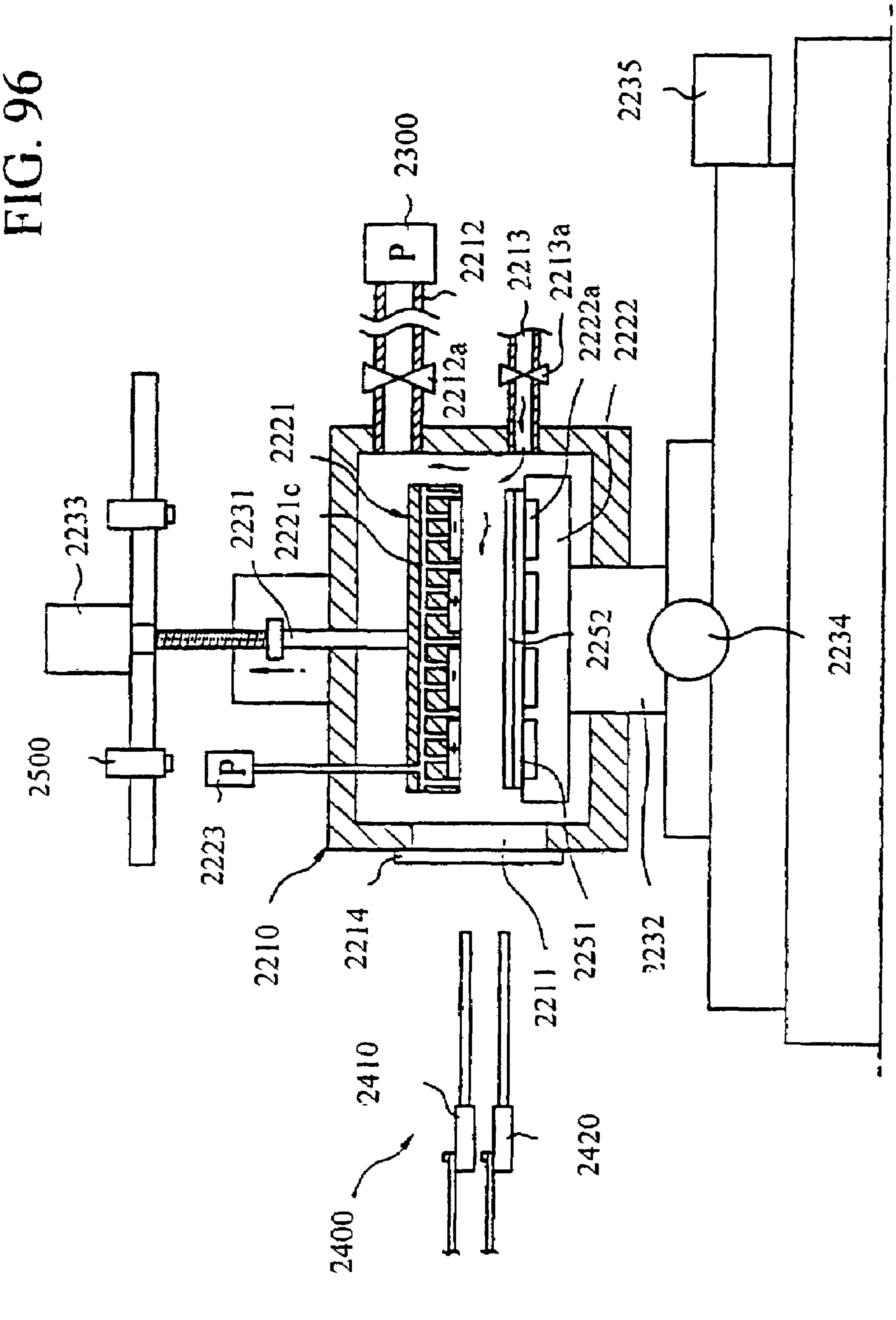
FIG. 96 shows the exemplary apparatus for manufacturing a liquid crystal display device during a further bonding process according to the present invention.

FIG. 96 shows the exemplary apparatus for manufacturing a liquid crystal display device during a further bonding process according to the present invention. In FIG. 96, the vent pipe valve 2213*a* is enabled, thereby allowing the pressure of the interior of the vacuum processing chamber 2210 to reach atmospheric pressure. Accordingly, the bonded substrates are further compressed due to the pressure difference between the evacuated interior between the bonded substrates and the atmospheric pressure of the vacuum processing chamber 2210.

According to this, more complete bonding process is performed, and if the bonding process is completed, the shielding door 2214 of the vacuum processing chamber 2210 is operative, so that the entrance 2211 closed by the shielding door is opened.

Figure 97:
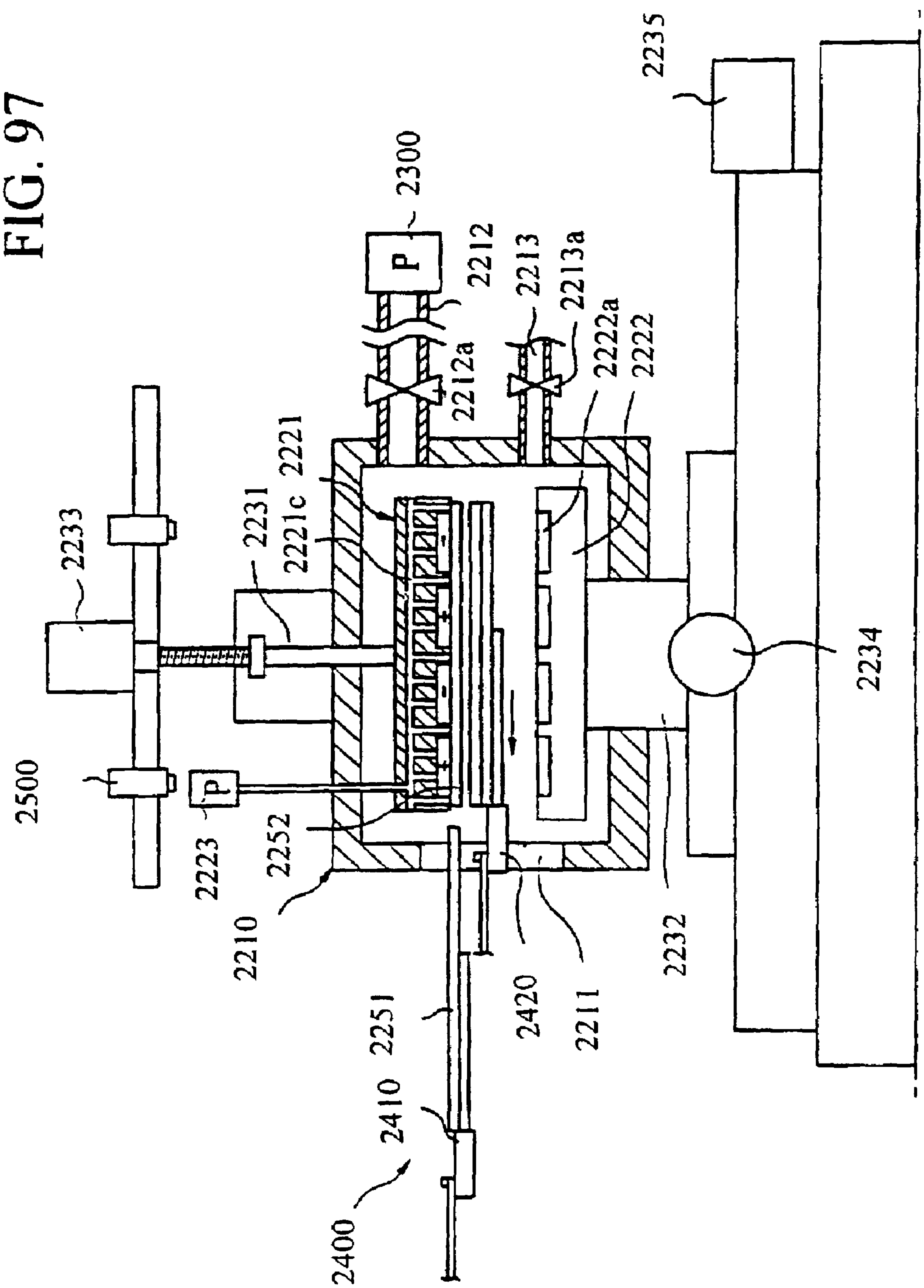
FIG. 97 shows the exemplary apparatus for manufacturing a liquid crystal display device during an unloading process according to the present invention.
Figure 98A:
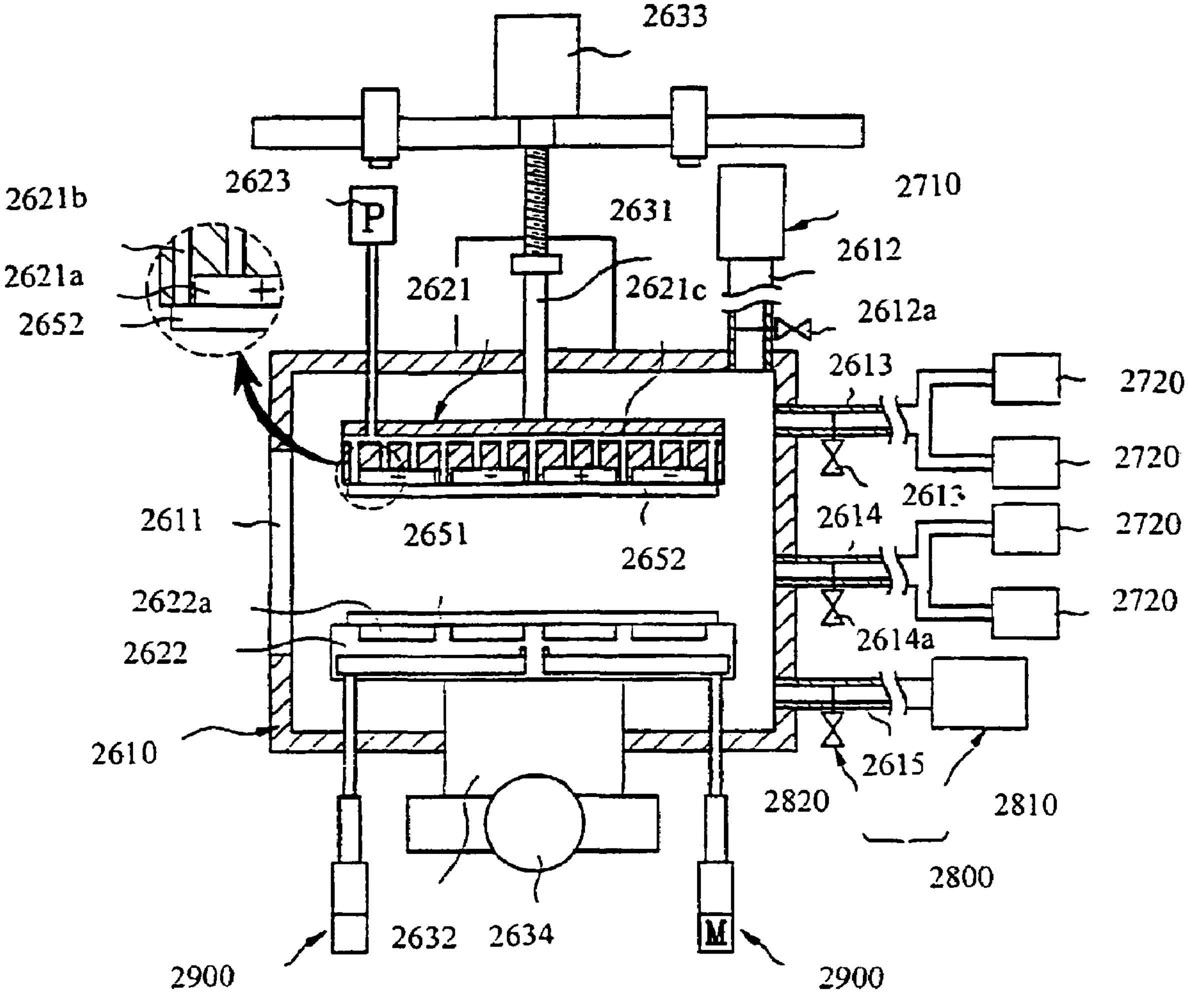
FIGS. 98A and 98B illustrate states of operation of a bonding machine of the present invention, in which loading of substrates are finished.
Figure 98B:
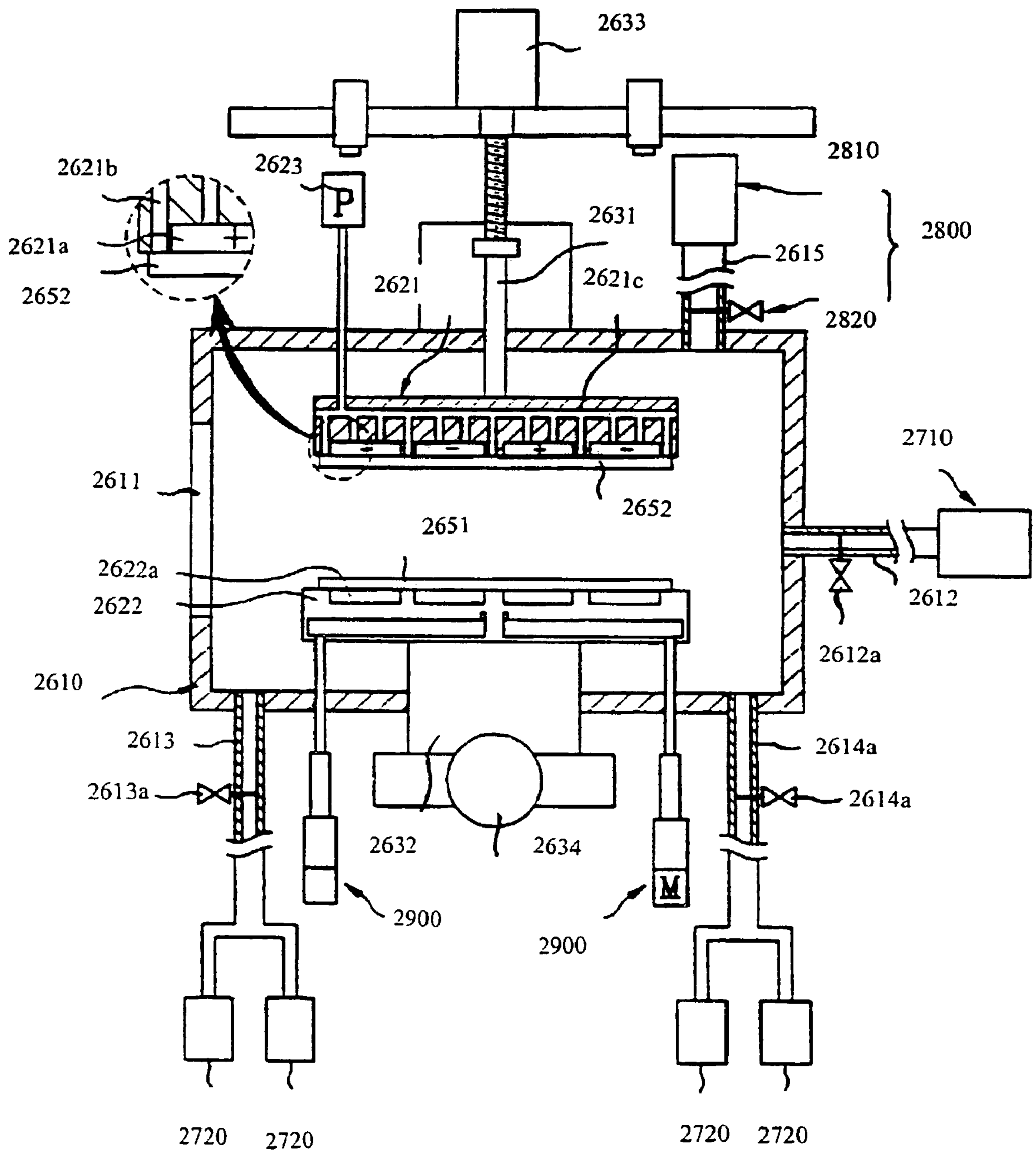

FIG. 97 shows the exemplary apparatus for manufacturing a liquid crystal display device during an unloading process according to the present invention. In FIG. 97, unloading of the bonded substrates is performed by the second arm 2420 of the loader part 2400.

FIGS. 98A-103B illustrate sections of liquid crystal display (LCD) vacuum bonding machines for performing the liquid crystal dispensing method of the present invention. The figures illustrate the method in an order of a process.

As noted in the aforementioned drawings, the bonding machines of the present invention include a bonding chamber 2610, a stage part, a stage moving device, and vacuum means.

The bonding chamber 2610 is designed as a one piece unit and has an interior designed to selectively be in a vacuum state or an atmospheric pressure state. The bonding chamber 2610 also includes a bonding chamber entrance 2611 to allow for ingress and egress of a first substrate 2651 and a second substrate 2652, into or out of the bonding chamber 2610.

The bonding chamber 2610 may also include at least one air outlet 2612, 2613, and 2614 connected to one side thereof for extracting air from the interior of the bonding chamber 2610 by a vacuum means; and a vent pipe 2615 connected to one side thereof for introducing air or any suitable gas into the bonding chamber 2610 for sustaining the bonding chamber 2610 at atmospheric pressure.

The air outlets 2612, 2613, and 2614 include electronically controlled valves 2612*a*, 2613*a*, and 2614*a*, respectively, for selective opening and shutting of tube lines.

The bonding chamber entrance 2611 may include a door 2611*a* (not shown) for sealing the bonding chamber entrance 2611. The door 2611*a* may be a general sliding or rotating type door, or suitable type of device that can close an opening. In one aspect of the present invention, the sliding or rotating type door may include a sealing member for sealing a gap between the door 2611*a* and the bonding chamber entrance 2611, thereby allowing an appropriate vacuum state the detail of which is not shown in the drawing.

The stage parts may be provided in the upper and lower spaces of the bonding chamber 2610. They may face each other and include an upper stage 2621 and a lower stage 2622 for securing the substrates 2651 and 2652 introduced into the bonding chamber 2610.

The upper and lower stages 2621 and 2622, respectively, may include at least one electrostatic chuck (ESC) 2621*a* provided at opposing surfaces of the upper and lower stages.

The upper electrostatic chuck 2621*a* electrostatically holds the second substrate 2652 to the upper stage 2621, and the lower electrostatic chuck 2622*a* electrostatically holds the first substrate 2652 to the lower stage 2622. In addition, the upper and lower stages 2621 and 2622 may also include a plurality of vacuum channels 2621*b* formed therethrough. The vacuum channels enable the substrates 2651 and 2652 to be arranged on the upper stage 2621 and the lower stage 2622, respectively.

Although the present embodiment suggests that at least two electrostatic chucks 2621*a* may be utilized, pairs of electrostatic chucks having DC voltages of opposite polarities may also be formed to electrostatically hold the substrates to their respective stages. Alternatively, single electrostatic chucks having DC voltages of opposite polarities applied thereto may also provide the electrostatic charge to provide required holding power.

In one aspect of the present invention, the plurality of vacuum channels 2621*b* may be formed in a center portion and/or along the circumference of the electrostatic chucks 2621*a* and may be connected to single or multiple tubes 2621*c*. The vacuum channels 2621*b* transmit a vacuum force generated by a vacuum pump 2623 connected to the upper stage 2621.

The lower stage 2622 may include at least one electrostatic chucks 2622*a* on a top surface of the lower stage to provide electrostatic power for holding the substrate, and at least one vacuum channel (not shown) for holding the substrate by vacuum.

The electrostatic chuck and the vacuum channel may or may not be identical to the vacuum channels of the upper stage 2621. The arrangement of the electrostatic chuck and the vacuum channels be determined by taking into account the overall fabrication processes of the substrates and/or each liquid crystal coating regions.

The stage moving device includes a moving shaft 2631 for selective up and down movement of the upper stage 2621, a rotating shaft 2631 for selective left and right rotation of the lower stage 2622, and driving motors 2633 and 2634 fitted to the interior or exterior of the chamber 2610, that are coupled to the stages 2621 and 2622 via shafts, respectively.

The stage moving device is not limited to a system in which the upper stage 2621 is movable only in the up and down directions, and the lower stage 2622 is rotatable only in the left and right directions. Rather, the upper stage 2621 may be made to be rotatable in left and right directions, and the lower stage may be made to be movable in up and down directions when the upper stage 2621 is provided with a separate rotating shaft (riot shown). In addition, the upper stage and lower stage 2622 are provided with a separate moving shaft (not shown) for rotation of the upper stage and lower stage 2622 and for up and down directional movement of the lower stage 2622.

The vacuum means is connected to the air outlets 2612-2614 on the bonding chamber 2610 for extracting air from the interior of the bonding chamber 2610, and includes at least more than two units, and preferably five units.

At least one of the vacuum means is a Turbo Molecular Pump (TMP) 2710 that has a higher air suction capability compared to other vacuum means, and the rest of the vacuum means are dry pumps 2720. In particular, there may be one TMP 2710 and four dry pumps 2720.

Of the three air outlets 2612, 2613, and 2614 in total connected to the bonding chamber 2610, one air outlet ("a first air outlet") 2612 is connected to the TMP 2710, and the remaining two air outlets 2613 ("a second air outlet") and 2614 ("a third air outlet") are connected to two pairs of the dry pumps, respectively.

Moreover, there may be five air outlets so that one of the air outlets is connected to the TMP 2710 and the other four outlets are connected to the other four dry pumps, respectively.

Along with this, the present invention suggests making a system by connecting gas supplying means 2800 that regulates the amount of air or gas supplied to the vent pipe 2615 and is connected to the bonding chamber 2610.

The gas supplying means 2800 includes a gas charge part 2810, having air or gas storage therein, to sustain the atmospheric pressure in the bonding chamber 2610, and a valve 2820 for selective opening and shutting of the vent pipe 2615 as required.

Moreover, the present invention can make a system inclusive of a pump for forced pumping of the air or gas charged in the gas charge part 2810 to the vent tube 2615 by a selective pressure. That is, the system for sustaining the interior of the bonding chamber at the atmospheric pressure is not limited to the valve, only.

However, since the air or gas can infiltrate into the bonding chamber 2610 by itself through a minute gap as the interior of bonding chamber 2610 is at a vacuum, the forced pumping may not be necessarily used. According, the present invention suggests a system with the valve 2820 applied thereto for selectively opening and shutting the vent tube 2615 as much as required instead of the pump.

Moreover, if the vacuum of the bonding chamber becomes greater than the vacuum applied to the stages during evacuation of the bonding chamber 2610, when the stages 2621 and 2622, respectively have the first and second glass substrates held respectively thereto, the stages to lose vacuum holding power and the second glass substrate can fall off the upper stage and drop onto the first glass substrate. To prevent this event from occurring, a substrate receiving means 2900 is provided to the bonding chamber for supporting the substrate to the upper stage 2621. In this instance, the substrate receiving means 2900 supports a central part of the substrate of the non-active region, rather than supporting only the corner parts of the substrate.

It is noted that FIGS. 98A, 99A, 100A, 101A, 102A and 103A show one embodiment and FIGS. 98B, 99B, 100B, 101B, 102B and 103B show another embodiment. In particular, the vent 2800, the dry pumps 2720 and the TMP 270 are in different locations in FIGS. 98B, 99B, 100B, 101B, 102B and 103B to show that different locations can be used for such elements. For example, FIGS. 98B, 99B, 100B, 101B, 102B and 103B show the vent 2800 at the top of the bonding chamber 2610, the dry pumps 2720 at the bottom of the bonding chamber 2610, and the TMP 2710 at the side of the bonding chamber 2610, whereas FIGS. 98A, 99A, 100A, 101A, 102A and 103A show the vent 2800 at the side of the bonding chamber 2610, the dry pumps 2720 at the side of the bonding chamber 2610, and the TMP 2710 at the top of the bonding chamber 2610. Other permutations of different suitable locations for these elements are contemplated in the present invention.

For example, FIGS. 209 and 210 show multiple vent holes 2615*a* at the top of the bonding chamber while FIGS. 211 and 212 show multiple vent holes 2615*a* at all sides of the bonding chamber. The plurality of vent holes may be formed at the top of the bonding chamber. The plurality of vent holes may be formed at the top, bottom and sides of the bonding chamber. At least two of said vent holes may be formed at the top of the bonding chamber, at least one of the vent holes may be formed at least at one side of the bonding chamber, and at least two of the vent holes may be formed at the bottom of the bonding chamber. The plurality of vent holes may be formed at the top surface and the side surface of the bonding chamber. The plurality of vent holes may be formed at the top surface and the bottom surface of the bonding chamber. The top surface may have at least two vent holes and the side surface may have at least two vent holes.

FIGS. 104A-104E illustrate sections showing the steps of a method for fabricating an LCD in accordance with an embodiment of the present invention. FIG. 105 illustrates a flow chart showing the steps of a method for fabricating LCDs having the liquid crystal dispensing method applied thereto in accordance with an embodiment of the present invention. Next, the method for fabricating LCDs by using the bonding machines of the foregoing present invention will be explained, with reference to FIGS. 104A-104E, and 98A-103B.

The method for fabricating LCDs includes the steps of loading the two substrates into the vacuum bonding chamber, evacuating the bonding chamber, bonding the two substrates, venting the bonding chamber for uniform application of pressure to the bonded substrates, and unloading the pressed two substrates from the vacuum bonding chamber.

Figure 104A:
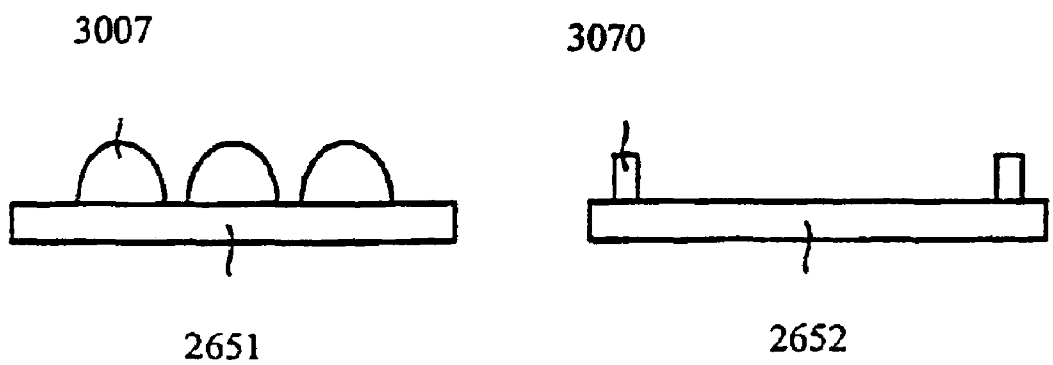
FIGS. 104A-104E illustrate sections showing the steps of a method for fabricating an LCD having a liquid crystal dropping method applied thereto in accordance with an embodiment of the present invention, schematically.
Figure 104B:
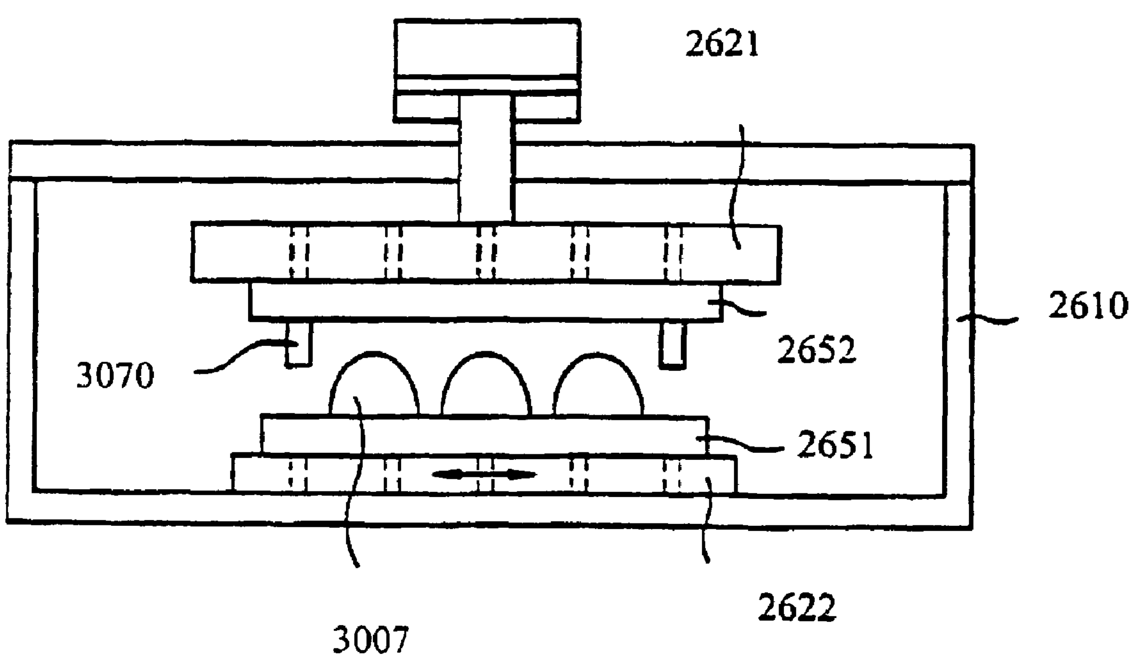
Figure 104C:
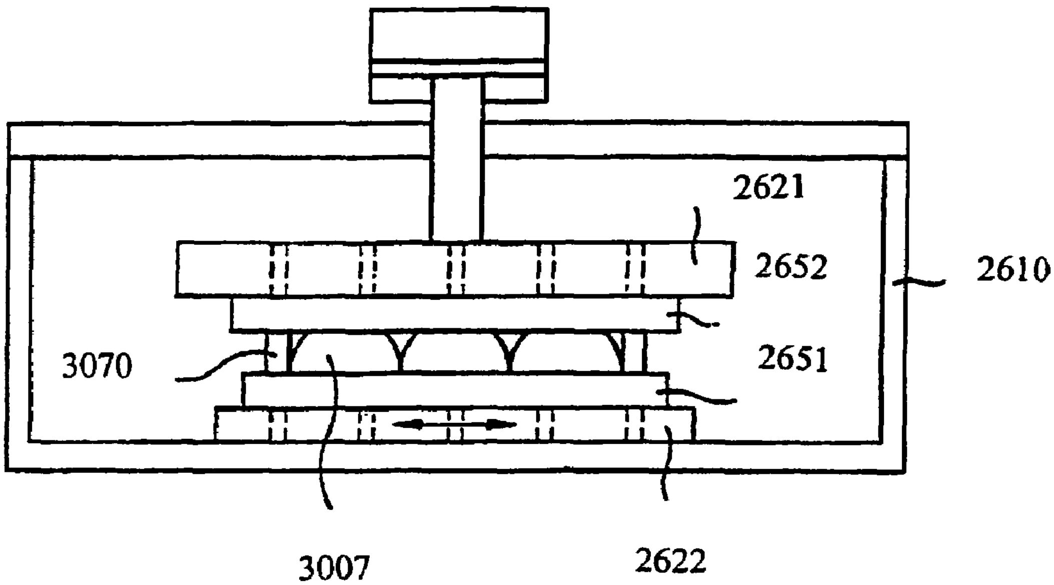
Figure 104D:
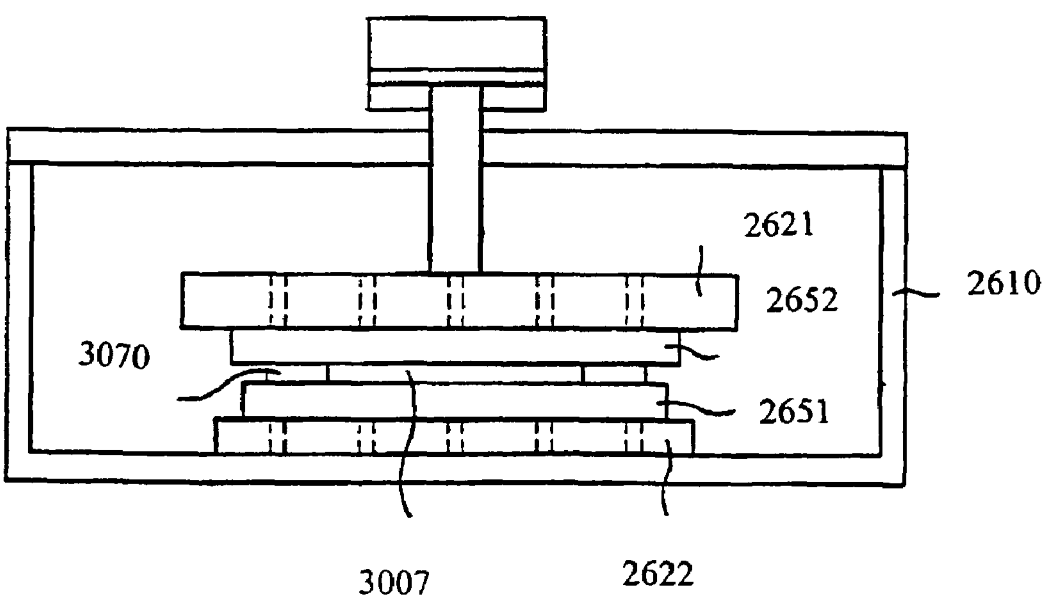
Figure 105:
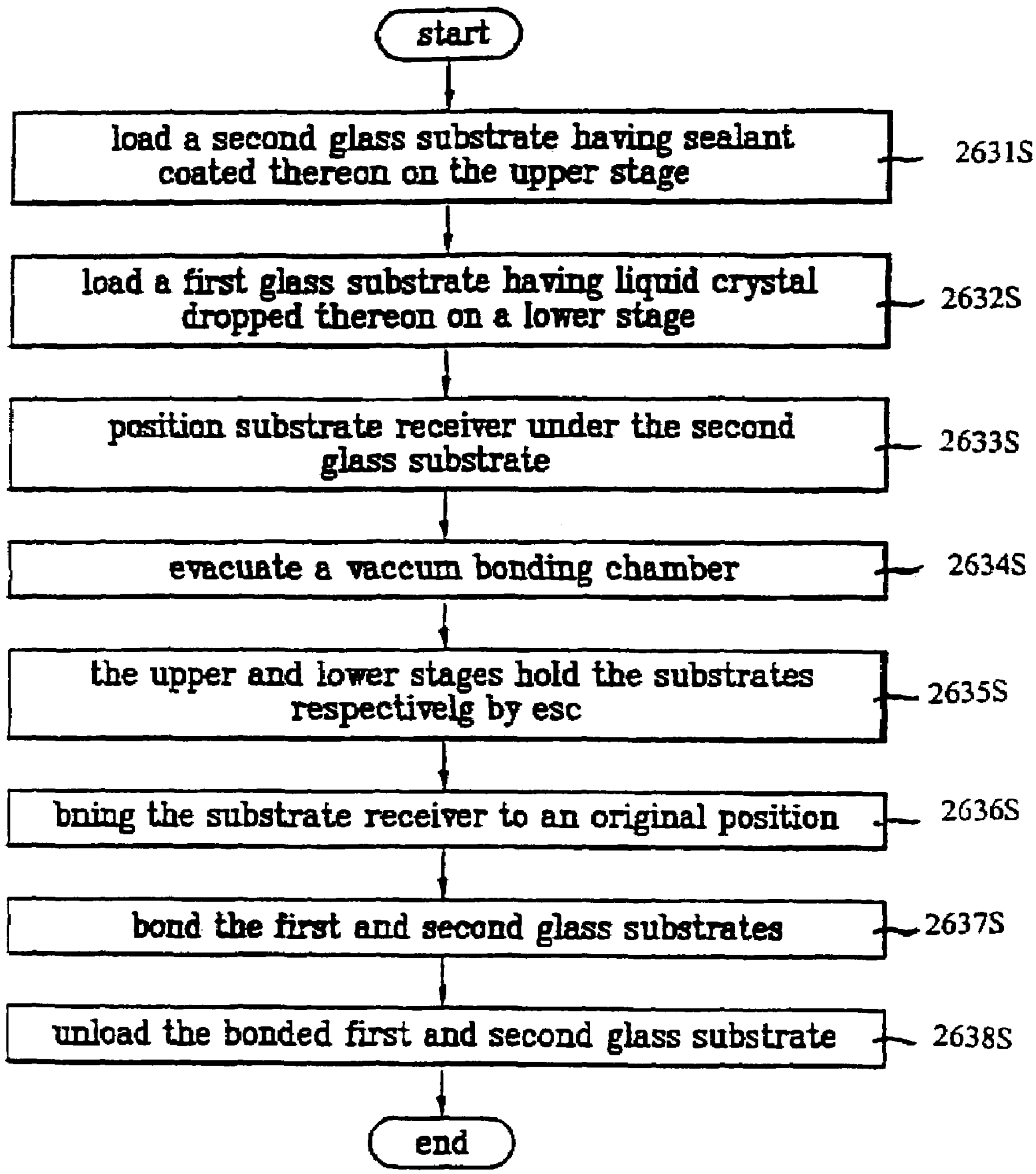
FIG. 105 illustrates a flow chart showing the steps of a method for fabricating an LCD in accordance with an embodiment of the present invention.

Referring to FIG. 104A, liquid crystal 3007 is dropped onto a first glass substrate 2651 and sealant 3070 is coated on a second substrate 2652. Before loading the substrates into the bonding chamber, the second glass substrate 2652 having the sealant 3070 coated thereon may be cleaned by Ultra Sonic Cleaner (USC), thereby enabling the removal particles formed during the previous processes. The USC is possible as the second glass substrate 2652 has no liquid crystal dropped thereon.

One of the first and second substrates is a substrate having the thin film transistor arrays formed thereon, and the other substrate is a substrate having the color filter layers formed thereon. In this invention, the liquid crystal dropping and the sealant coating may be made applied to only one of the first and second substrates. Only positioning of the substrate having the liquid crystal dropped thereon on the lower stage, and the other substrate on the upper stage is required.

Referring to FIGS. 98A, 98B, 104B, or 105 schematically illustrating the loading step, the second glass substrate 2652 having the sealant 3070 coated thereon is held to the upper stage 2621 by vacuum. The second glass substrate 2652 with sealant coated thereon is positioned faced down (2631S) on the upper stage 2621. The first glass substrate 2651 having the liquid crystal 3007 dispensed thereon is held to the lower stage 2622 by vacuum (2632S). At this time the vacuum bonding chamber 2610 is at an atmospheric pressure state.

The second glass substrate 2652 having the sealant 3070 coated thereon is held by a loader of a robot (not shown) with the face on which the sealant 3070 is coated facing down and brought into the vacuum bonding chamber 2610. In this state, the upper stage 2621 in the vacuum bonding chamber 2610 is moved down, and the lower stage holding the second glass substrate 2652 may be moved up. In addition, instead of a vacuum holding the upper and lower substrates, the electrostatic chuck may be used for one substrate or both simultaneously.

Next, the loader of the robot is moved out of the vacuum bonding chamber 2610, and the first glass substrate 2651 having the liquid crystal 3007 dropped thereon is placed over the lower stage 2622 in the vacuum bonding chamber 2610 by the loader of the robot, so that the lower stage 2622 vacuum channels hold the first substrate 2651. When respective loading of the substrates 2651 and 2652 on the stages 2621 and 2622 are finished, the door in the bonding chamber entrance 2611 is closed in order to seal the interior of the bonding chamber 2610. It is preferable that the second substrate 2652 having the sealant coated thereon be loaded on the upper stage 2621 first and that the first substrate 2651 having the liquid crystal dropped thereon loaded on the lower stage 2622 second. This is because if the first substrate 2651 is loaded first and the second substrate 2652 is loaded second, foreign matter may fall onto the first substrate 2651 when the second substrate 2652 is loaded.

The evacuation step is progressed in two stages. That is, after the substrates 2651 and 2652 are held to the upper and lower stages 2621 and 2622, respectively, and the chamber door is closed a first evacuation is started. After bringing the substrate receiver 2900 below the upper stage 2621 and placing down the second substrate 2652 held to the upper stage 2621 on the substrate receiver 2900, or bringing the upper stage 2621 and the substrate receiver 2900 to be at a certain distance from the upper stage 2621 holds the substrate. Next, a second evacuation of the vacuum bonding chamber is conducted. In this instance, the second evacuation is made faster than the first evacuation, and the first evacuation is made such that the vacuum in the vacuum bonding chamber is not higher than the vacuum channel force of the upper stage.

Without dividing the evacuation into first and second stages, the evacuation of the bonding chamber 2610 may be started at a fixed rate, and the substrate receiver 2900 may be brought below the upper stage during the evacuation. It is required that the substrate receiver 2900 is brought below the upper stage 2621 before the vacuum in the vacuum bonding chamber becomes higher than the vacuum holding force in upper stage 2621.

That is, dry pumps 2720 in the vacuum means are put into operation for evacuation of the bonding chamber 2610 through the second and third air outlets 2613 and 2614 and are operated at 10-30 Kl/min (preferably, 23 Kl/min). For example, the valves 2613*a* and 2614*a* on the second and third air outlets 2613 and 2614 are opened during the first evacuation.

It should be noted that if the vacuum force in the bonding chamber 2610 becomes higher than the vacuum force that holds the substrate 2651 to the upper stage 2621 (i.e., the interior of the bonding chamber 2610 reaches a higher vacuum force than in the vacuum channels), then the substrate 2652 held to the upper stage 2652 may drop from the upper stage 2621.

Figure 99A:
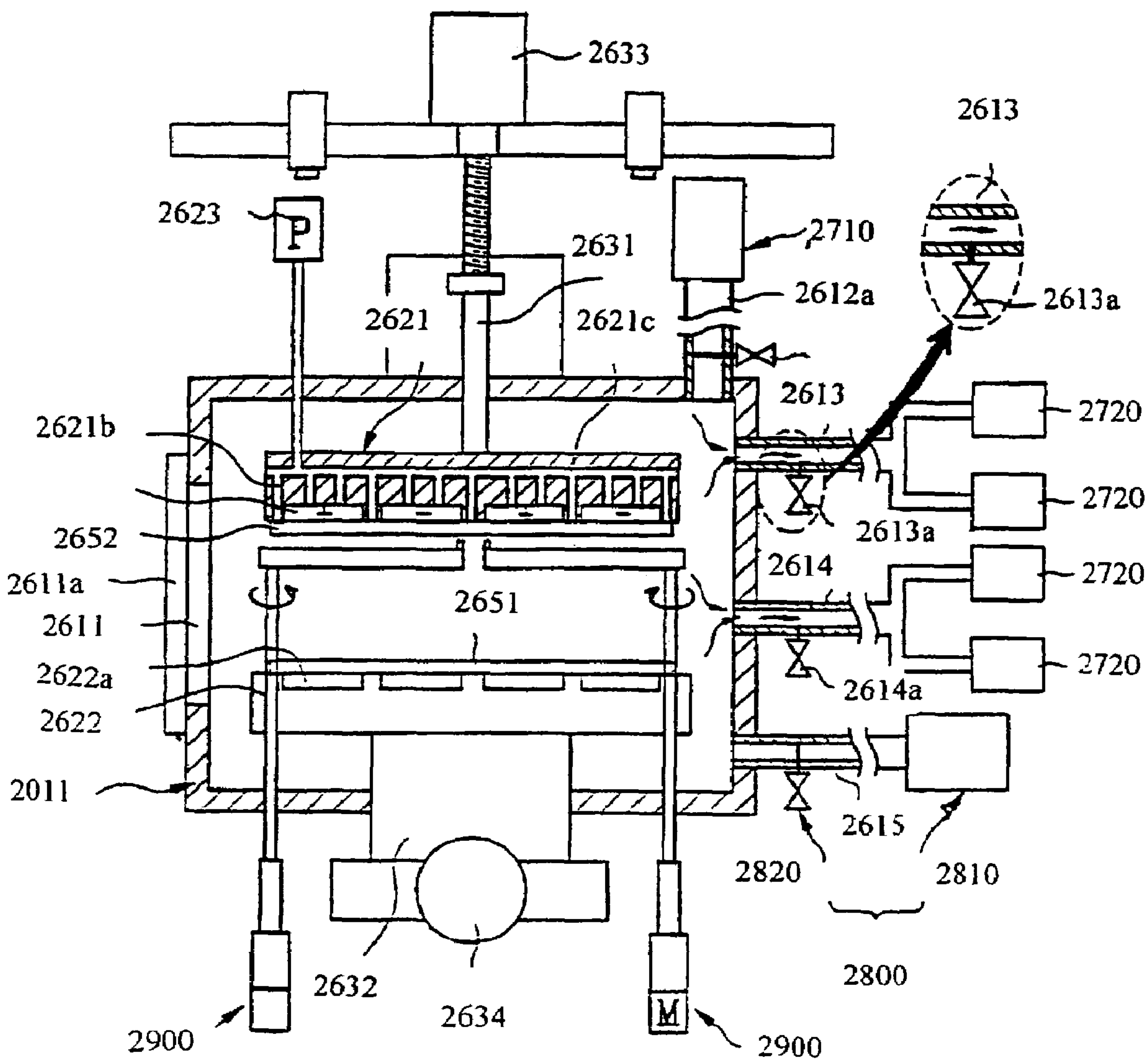
FIGS. 99A and 99B illustrate states of operation of a bonding machine of the present invention, in which a low vacuum pump evacuates interior of a bonding chamber to turn the bonding chamber into a vacuum state.
Figure 99B:
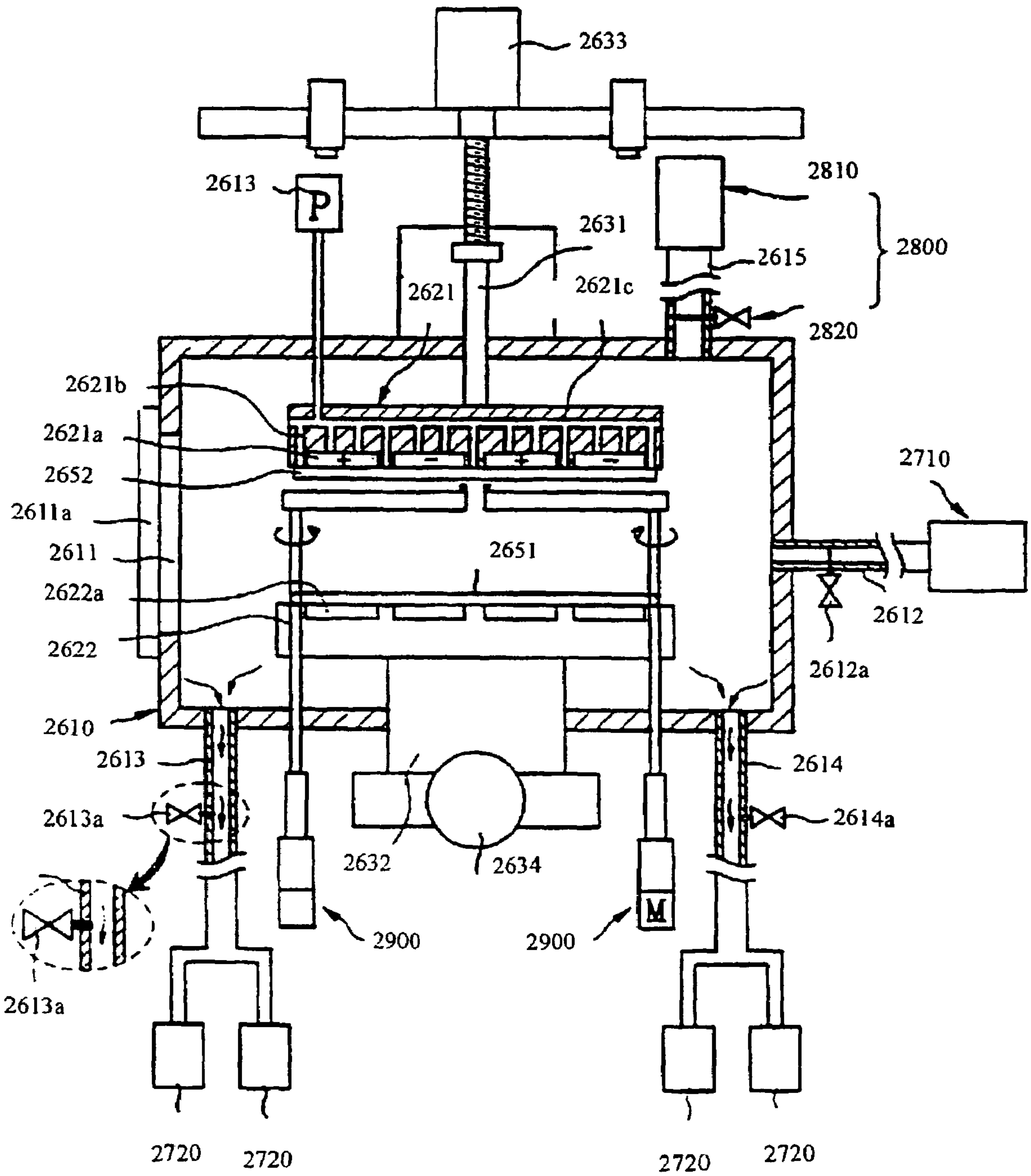

Referring to FIGS. 99A and 99B, in order to prevent the substrate 2652 from dropping and/or being broken, a substrate receiving means 2900 temporarily receives the substrate 2652 held to the upper stage 2621 (2633S). The substrate receiving means 2900 moves during the slow evacuation before the bonding chamber 2610 reaches to a high vacuum. The substrate receiver 2900 is contacted with the second substrate 2652 by the following method.

For example, after the second substrate 2652 and the substrate receiver 2900 are brought closer together by either moving the upper stage 2621 down or moving the substrate receiver 2900 up or both, the second substrate 2652 is placed down on the substrate receiving means 2900 by releasing the vacuum channel force of the upper stage 2621.

Thus, the second glass substrate 2652 held to the upper stage may be arranged on the substrate receiver 2900 before evacuating the vacuum bonding chamber, or the upper stage having the second glass substrate held thereto and the substrate receiver may be brought to be at a certain distance so that the second glass substrate 2652 is arranged on the substrate receiver 2900 from the upper stage 2621 during the evacuation of the chamber. Moreover, other means for fastening the substrates may additionally be provided as there may be an occurrence of airflow in the chamber at the initial stage, which can shake the substrates when the evacuation of the vacuum bonding chamber is started.

The step of evacuating the bonding chamber 2610 is not necessarily carried out after the bonding chamber entrance 2611 is closed by the door 2611*a*.

Considering an initial evacuation that is slow, the bonding chamber entrance 2611 may be closed during the evacuation.

Moreover, the movement of the substrate receiving means 2900 to a location for receiving the second substrate 2652 is not necessarily required until the bonding chamber 2610 reaches a high vacuum, but the movement of the substrate receiving means 2900 can made before the evacuation of the bonding chamber. However, for enhancing the fabrication process efficiency, it is preferable that the substrate receiving means 2900 is moved during the evacuation of the bonding chamber 2610.

Figure 100A:
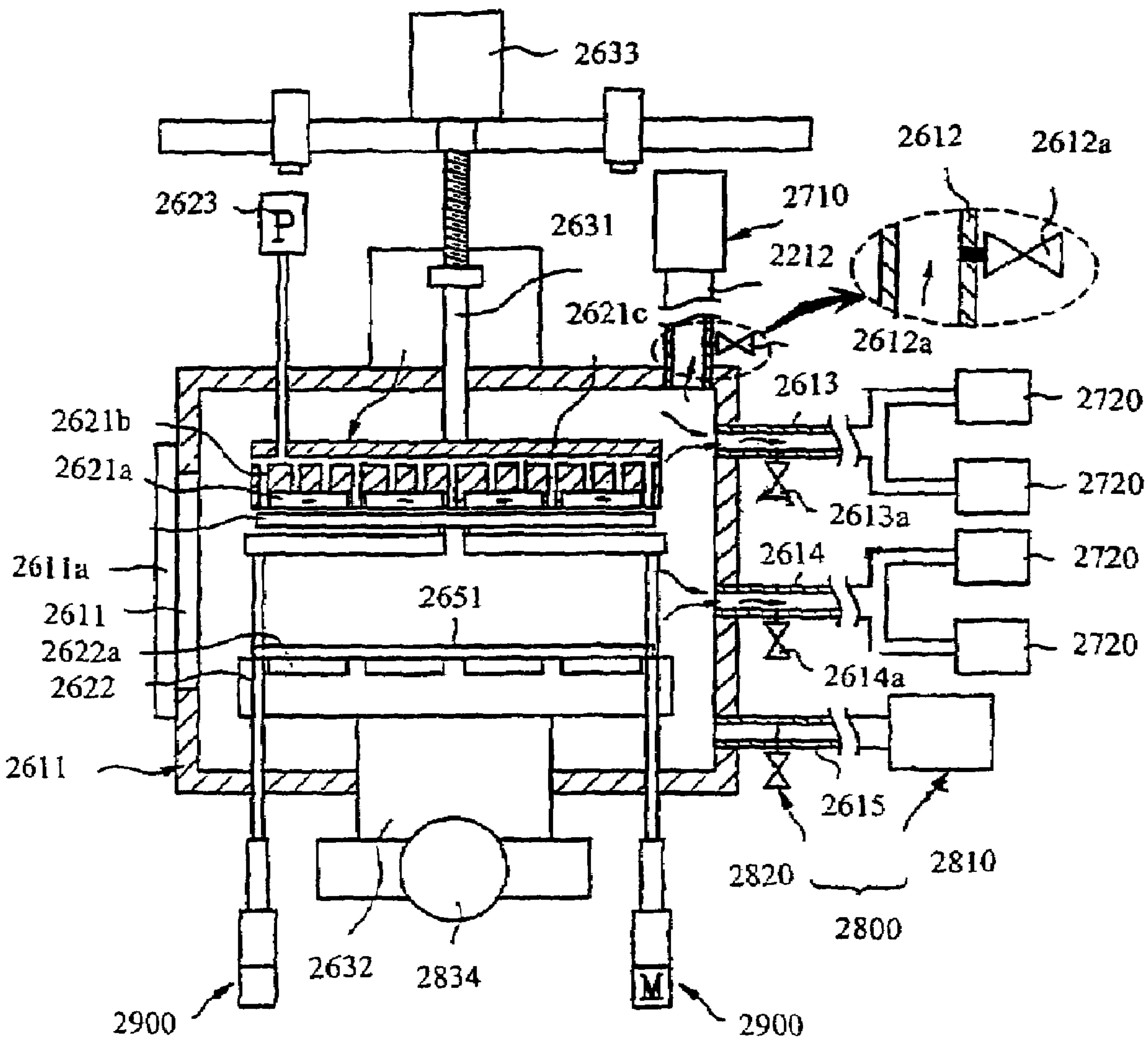
FIGS. 100A and 100B illustrate states of operation of a bonding machine of the present invention, in which a high vacuum pump evacuates interior of a bonding chamber to turn the bonding chamber into a vacuum state.
Figure 100B:
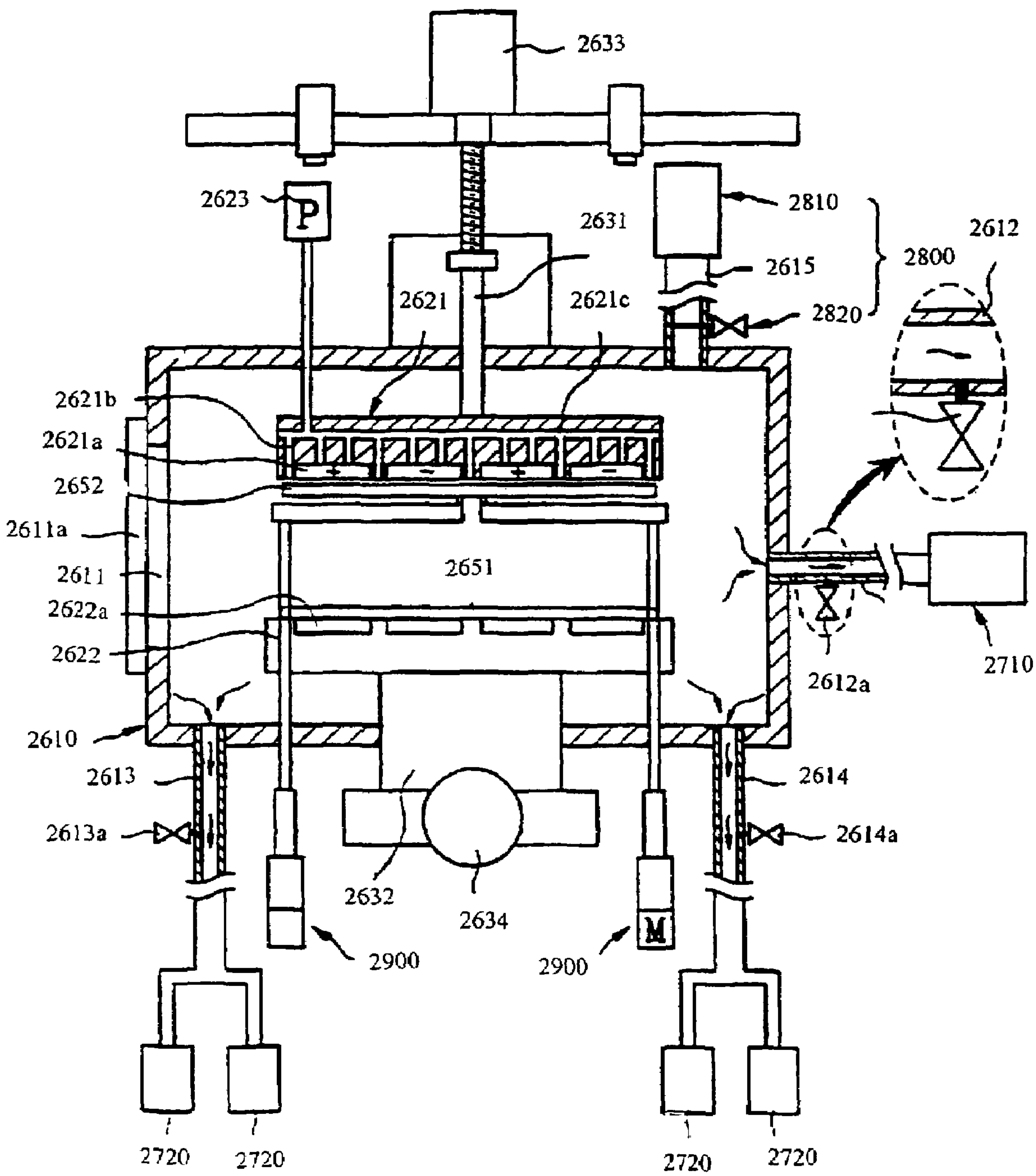
Figure 101A:
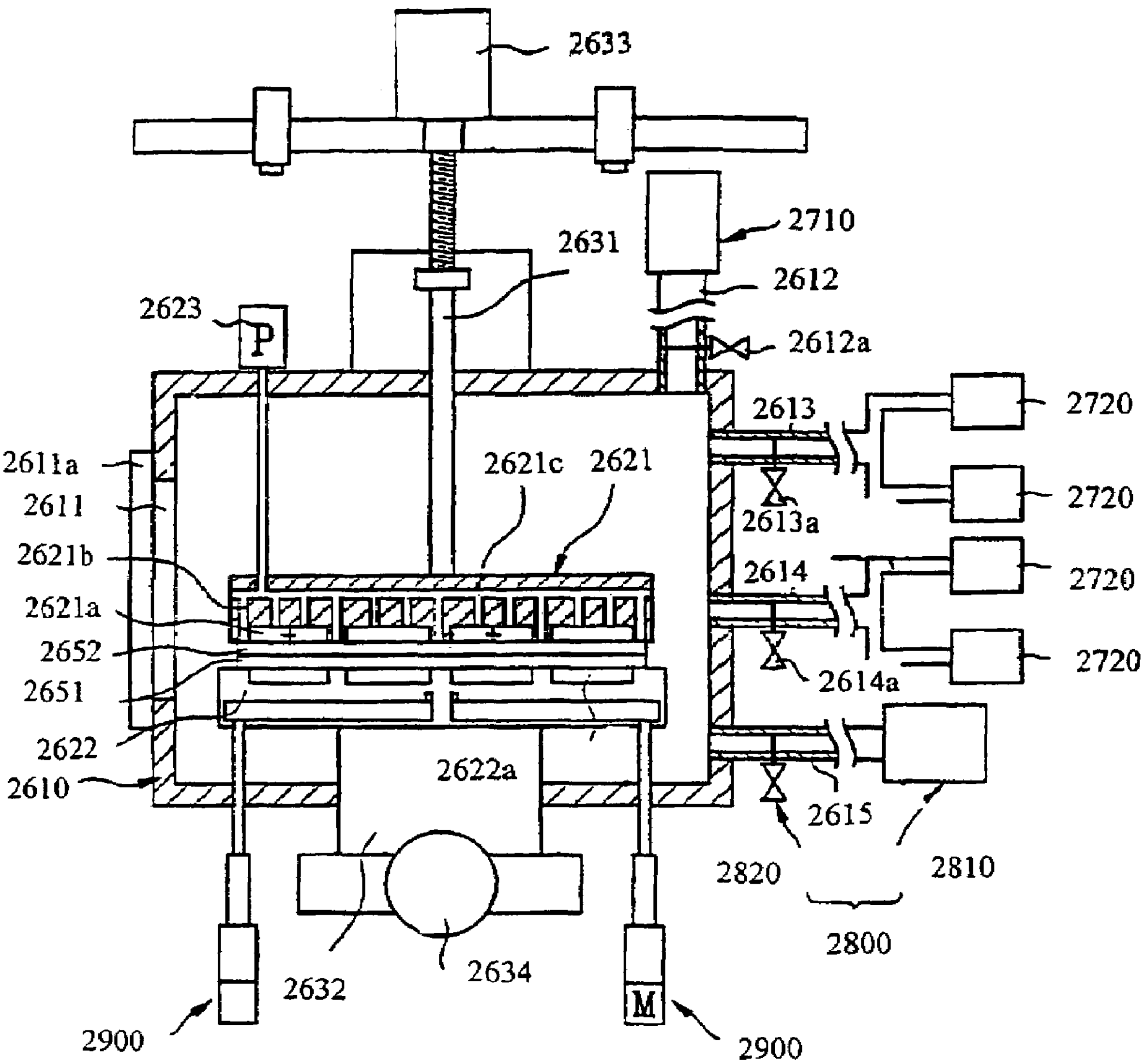
FIGS. 101A and 101B illustrate states of operation of a bonding machine of the present invention, in which a pressure is applied to substrates to bond the substrates.
Figure 101B:
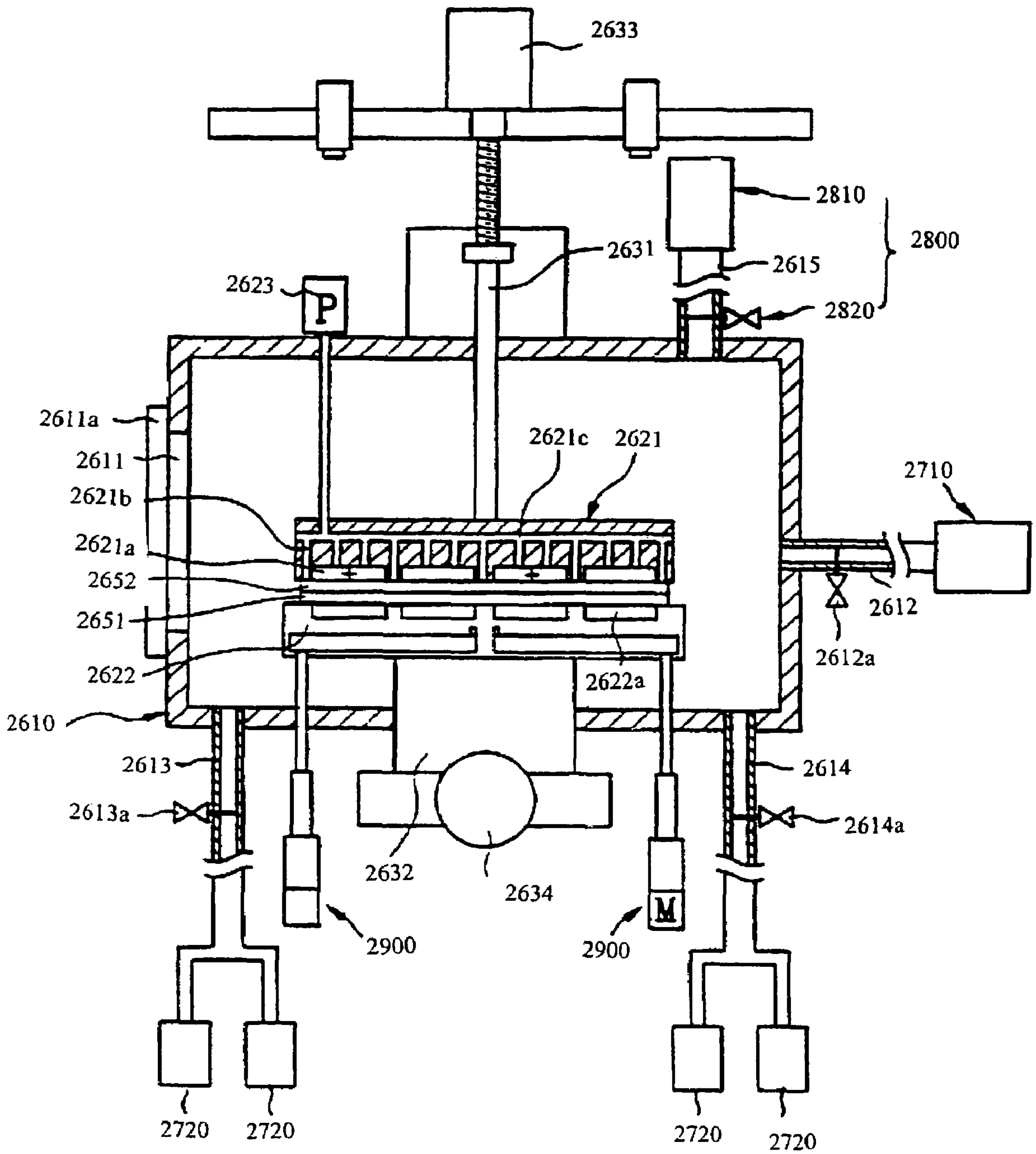

Then, referring to FIGS. 100A and 100B, when the vacuum of the bonding chamber 2610 reaches a pressure of approximately 50 Pa (preferably below 13 Pa) by the continuous evacuation of the dry pumps 2720, the substrate 2652 is held to the upper stage 2621 and is supported on the substrate receiving means 2900. Next, the valve 2612*a* is opened to open the first air extraction tube 2612 and the TMP 2710 is put into operation, for the second evacuation (2634S).

In this instance, the TMP 2710 evacuates the bonding chamber 2610 through the first air extraction tube 2612 rapidly at a rate of approx. 0.1-5 Kl/min (preferably, 1.1 Kl/min).

However, the operation of TMP 2710 and the dry pumps 2720 is not limited to performing the rapid evacuation of the chamber at a particular time. For example, it is not limited to the time when the substrate 2652 held to the upper stage 2621 and supported on the substrate receiving means 2900. That is, a driving control may be utilized to reach the high vacuum by selective regulation of the valves 2612*a*, 2613*a*, and 2614*a*, fitted on the air outlets 2612, 2613, and 2614.

When the vacuum of the bonding chamber 2610 reaches a desired pressure range, the foregoing steps are conducted. For example, when the vacuum of the bonding chamber 2610 reaches a pressure below 0.01 Pa (preferably, 0.67 Pa), the operation of the TMP is stopped. In this instance, the valve 2612*a* fitted to the first air outlet 2612 closes the first air outlet 2612.

The vacuum within the vacuum bonding chamber 2610 may have a pressure in a range of about $1.0\times10^{-3}$ Pa to 1 Pa for in-plane switching (IPS) mode liquid crystal display devices, and about $1.1\times10^{-3}$ Pa to $10^{2}$ Pa for twisted nematic (TN) mode liquid crystal display devices.

Evacuation of the vacuum bonding chamber may be carried out in two stages, thereby preventing deformation or shaking of the substrates in the vacuum bonding chamber that may be caused by rapid evacuation of the vacuum bonding chamber.

Once the vacuum bonding chamber 2610 is evacuated to a preset vacuum pressure, the upper and lower stages 2621 and 2622 bias the first and second glass substrates 2651 and 2652, respectively by electrostatic chuck (2635S) and the substrate receiver 2900 is brought to the home position (2636S). That is, the second substrate 2652 is temporarily supported on the substrate receiving means 2900 and is held at the upper stage 2621, and the first substrate 2651 on the lower stage 2622 is held at the lower stage 2622.

Using electrostatic charge, the first and second substrates may be fixed to their respective stages by applying negative/positive DC voltages to two or more plate electrodes formed at the stages. When the negative/positive voltages are applied to the plate electrodes, a coulomb force is generated between the conductive layer (e.g., transparent electrodes, common electrodes, pixel electrodes, etc.) formed on the substrate and the stage. When the conductive layer formed on the substrate faces the stage, approximately 0.1-1 KV is applied to the plate electrodes. When the substrate contains no conductive layer formed facing the stage, approximately 3-4 KV is applied to the plate electrodes. An elastic sheet may be optionally provided to the upper stage.

Referring to FIGS. 104C, 104D, 101A and 101B, after the two glass substrates 2651 and 2652 are held by their respective stages 2621 and 2622 by electrostatic charge, the two stages are moved into proximity such that the two glass substrates may be bonded (2637S). The first and second glass substrates are pressed by moving either the upper stage 2621 or the lower stage 2622 in a vertical direction, while varying speeds and pressures at different stage locations. Until the time the liquid crystal 3007 on the first glass substrate 2651 and the second glass substrate 2652 come into contact, or until the time the first glass substrate 2651 and the sealant 3070 on the second glass substrate 2652 come into contact, the stages may be moved at a fixed speed or fixed pressure and the pressure may be incrementally increased from the time of contact to a final pressure. After the load cell fitted to a shaft of the movable stages senses contact, the glass substrates are pressed together with increasing pressures. For example, at contact the substrates are pressed at a pressure of about 0.1 ton; at an intermediate stage they are pressed to a pressure of about 0.3 ton; at an end stage they are pressed to a pressure of about 0.4 ton at an end stage; and finally they are pressed to a pressure of about pressure of 0.5 ton at the final stage (see FIG. 104D).

Although it is illustrated that the upper stage presses down onto the substrate by means of one shaft, a plurality of shafts may independently apply and control pressure using an individual load cell. If the lower stage and the upper stage are not leveled or fail to press down uniformly, any number of predetermined shafts may be pressed at a lower or higher pressure in order to obtain a uniform bonding of the seal.

Figure 104E:
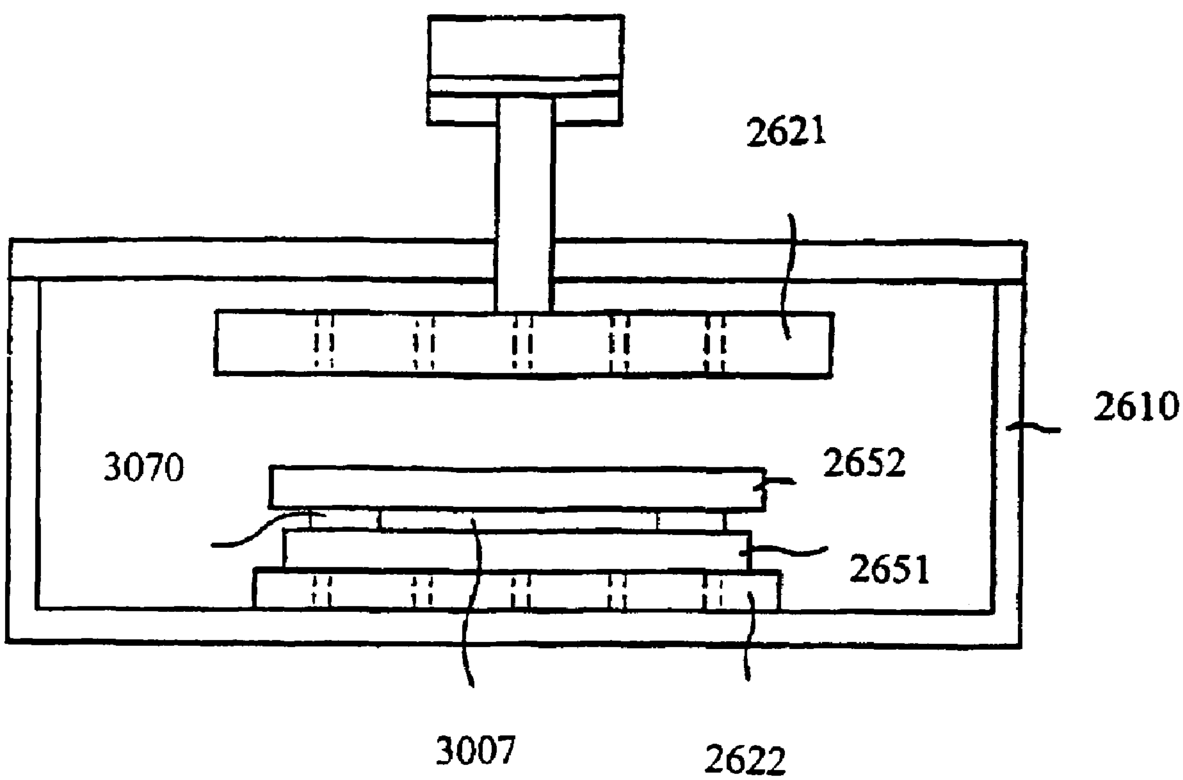

Referring to FIG. 104E, after the foregoing process bonds the two substrates and after the electrostatic charge has been turned off to the upper and lower stages, the upper stage 2621 is moved up in order to separate the upper stage 2621 from the bonded two glass substrates 2651 and 2652.

Figure 102A:
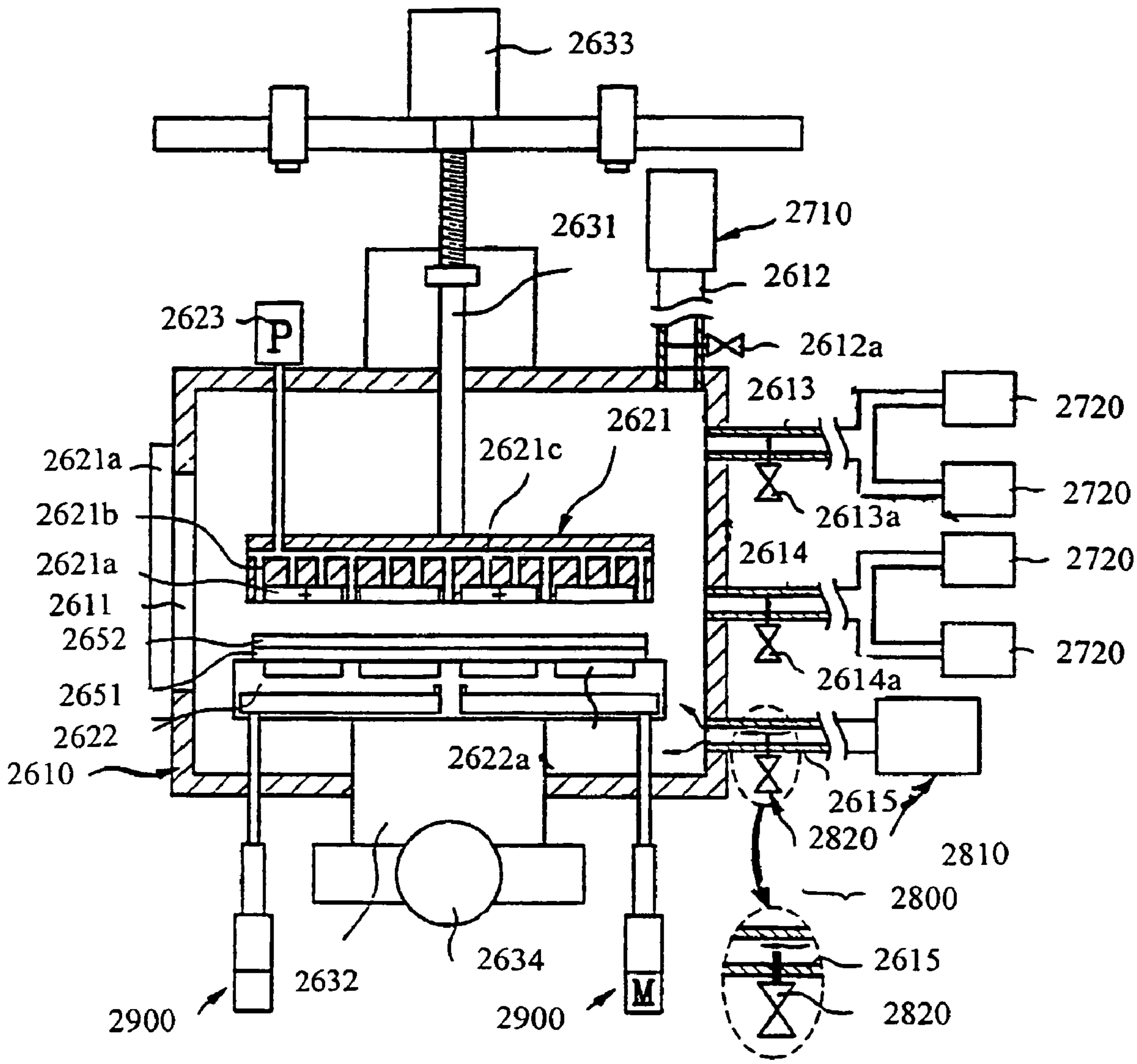
FIGS. 102A and 102B illustrate states of operation of a bonding machine of the present invention, in which an interior of a bonding chamber is slowly turned into an atmospheric pressure state.
Figure 102B:
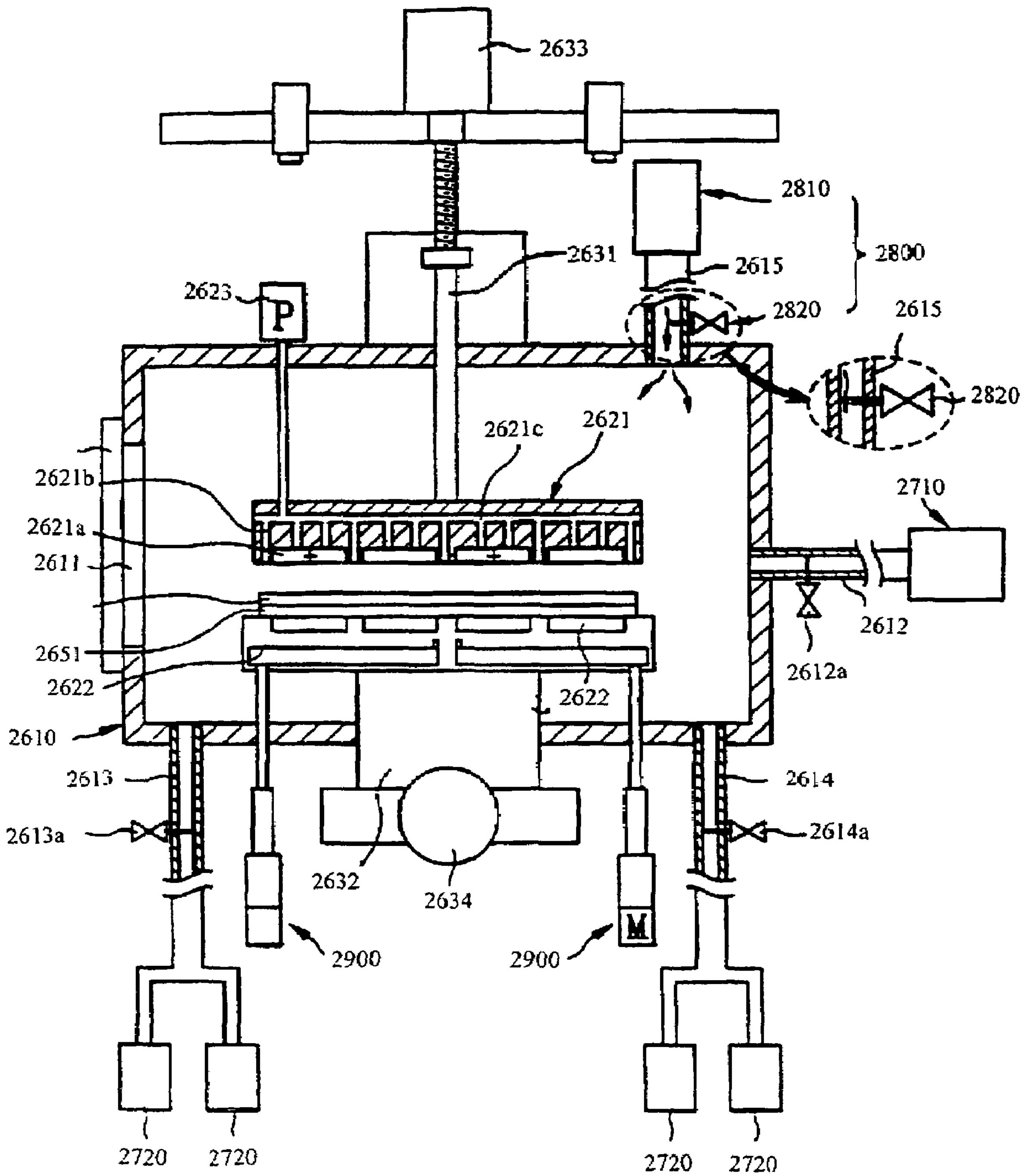
Figure 103A:
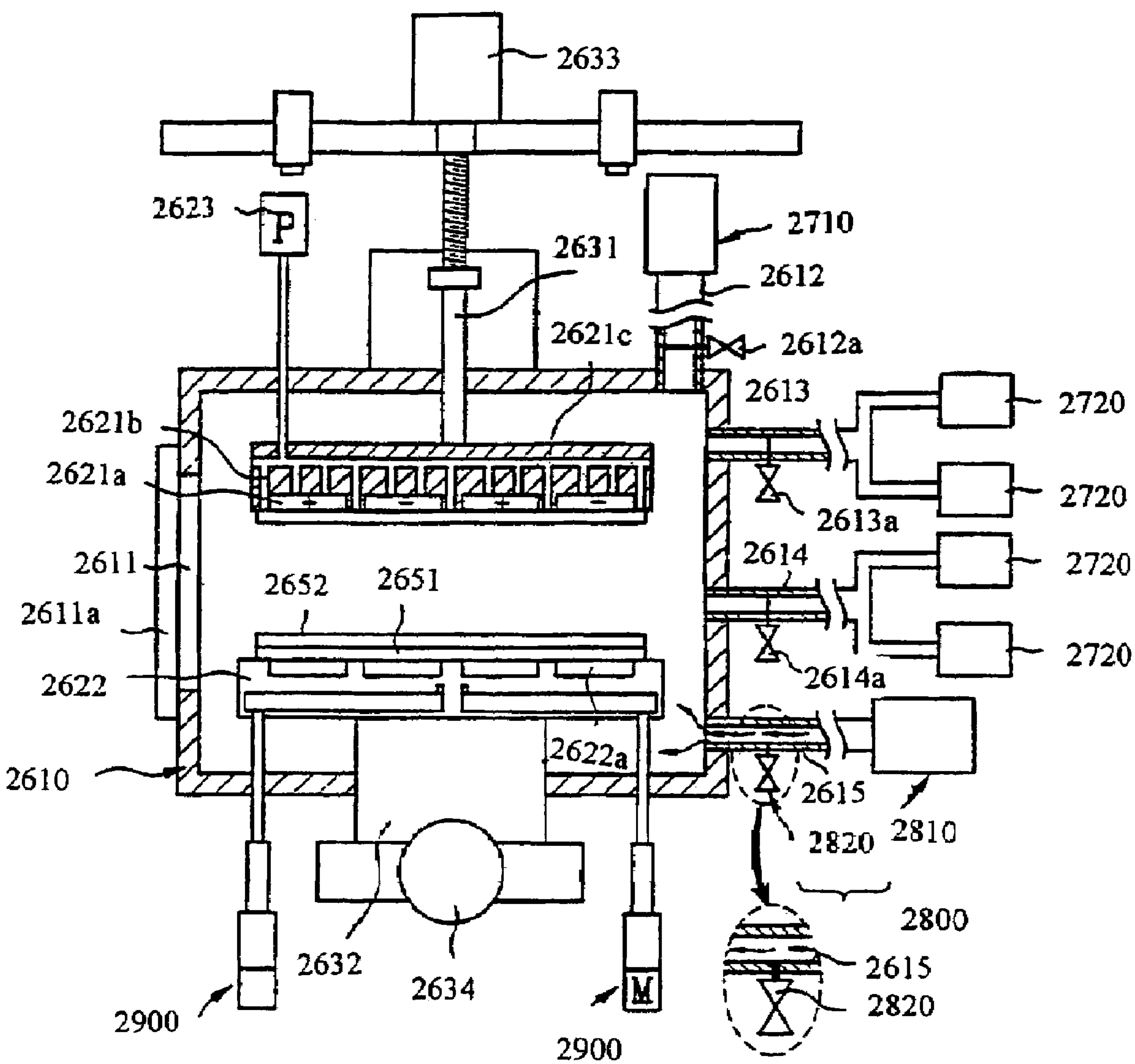
FIGS. 103A and 103B illustrate states of operation of a bonding machine of the present invention, in which an interior of a bonding chamber is turned into an atmospheric pressure state, fully.
Figure 103B:
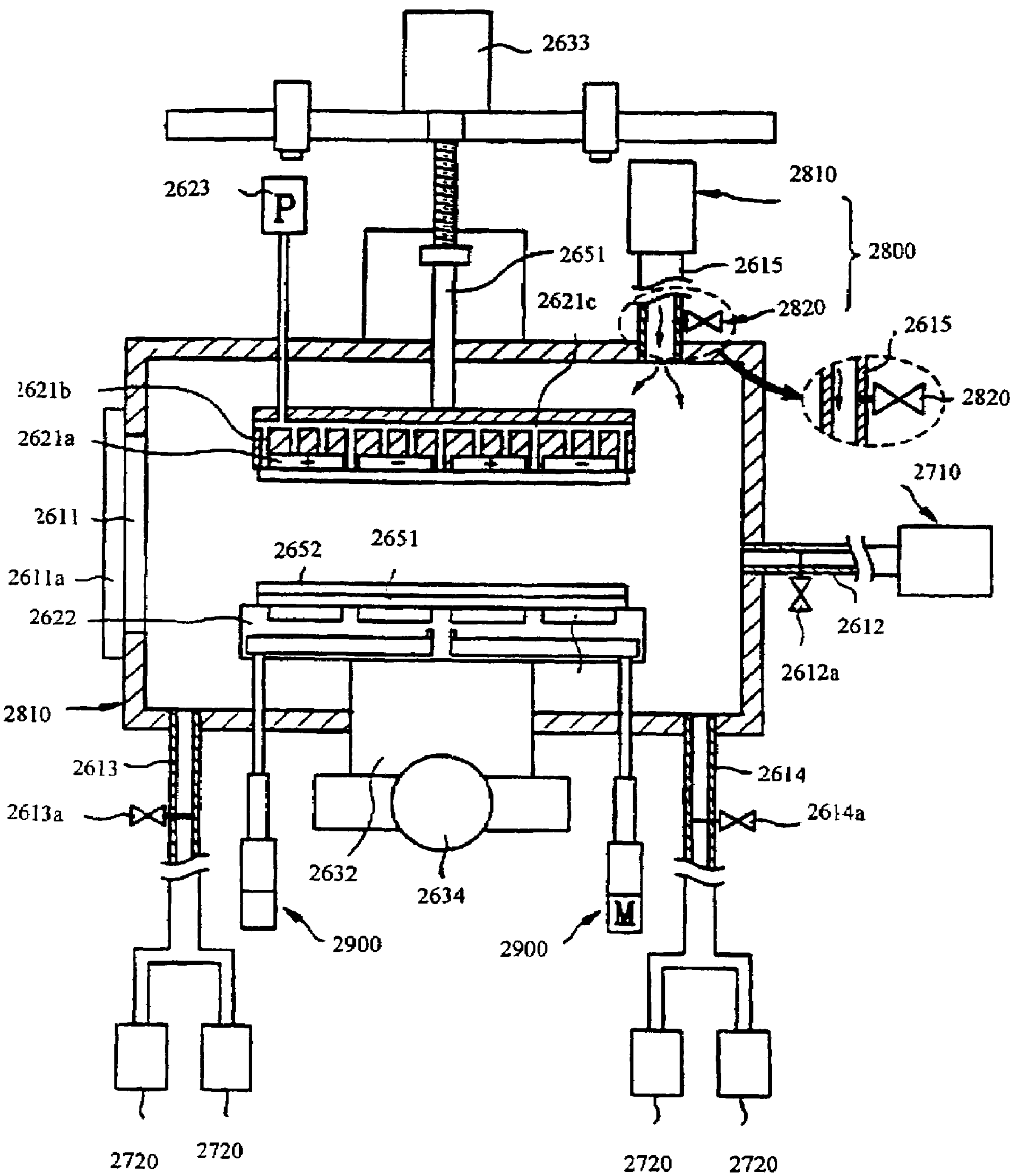

Next, referring to FIGS. 102A and 102B, the vent pipe 2615 is opened to the required degree via the valve 2820 at an initial stage. Then, referring to FIGS. 103A and 103B, the vent pipe 2615 is opened fully in order to pressurize the bonding chamber 2610 slowly. The pressure difference in the bonding chamber 2610 during the slow pressurization of the bonding chamber causes a pressure to be applied to the two substrates. Since the chamber is at the atmospheric pressure and the space between the bonded substrates is at a vacuum, thus the two substrates are subjected to a uniform application of pressure.

Although only one vent 2800 is shown, multiple vents, for example, may positioned at any location on the chamber. For example, referring to FIG. 102B, the vent may be positioned at the top of the chamber.

Then, the bonded substrates are unloaded (2638S). That is, after the door 2611*a* in the bonding chamber 2610 is operated to open the bonding chamber entrance 2611, the bonded first and second glass substrates 2651 and 2652 are unloaded by using the loader on the robot directly, or after the upper stage holds and moves up the first and second stages 2621.

To shorten the fabrication time period, one of the first and second glass substrates to be bonded in the next bonding process may be loaded onto an empty stage while the fixed first and second glass substrates are unloaded. For example, after the second glass substrate 2652 to be bonded in the next bonding process is brought to the upper stage 2621 via the loader and held to the upper stage by vacuum, the bonded first and second glass substrates on the lower stage 2622 may be unloaded. Alternatively, after the upper stage 2621 lifts the bonded first and second glass substrates, the loader may load the first glass substrate 2651 to be bonded on the lower stage and the bonded first and second glass substrates may be unloaded.

A liquid crystal spreading process may optionally be added before the process of unloading the bonded substrates in which the liquid crystal between the fixed substrates may be spread toward the sealant. Alternatively, a liquid crystal spreading process may be carried out to evenly spread the liquid crystal toward the sealant when the liquid crystal does not adequately spread after the unloading. The liquid crystal spreading process may be carried out for more than 10 minutes under atmospheric pressure or in a vacuum.

As has been explained the LCD bonding machines and the method for fabricating LCDs have the following advantages.

First, the LCD bonding machines of the present invention includes at least two different vacuum pumps, which have different vacuum powers. For example, a TMP and dry pumps that allow a smooth evacuation of the bonding chamber thereby preventing damage to the liquid crystal panel.

Second, the step by step evacuation of the bonding chamber permits operation of other parts required during the steps of evacuation are made at the same time, thereby improving efficiencies in the fabrication process.

Third, the availability of two staged evacuations from a low vacuum pressure to a high vacuum pressure without generating excessive air suction pressures prevents deformation caused by rapid evacuation and defective distribution of the liquid crystal in the substrates.

Fourth, the availability of gradual introduction of air or gas into the bonding chamber for sustaining the atmospheric pressure in the process of turning the bonding chamber into the atmospheric pressure prevents defective bonding of the substrates.

Fifth, the one-piece bonding chamber is favorable for obtaining a high vacuum in the bonding chamber. That is, it minimizes or eliminates leaks that may be present in the two-piece bonding chamber.

Sixth, the dispensing the liquid crystal on the first substrate and coating of the sealant on the second substrate reduces the fabrication time.

Seventh, dispensing liquid crystal onto the first substrate and coating sealant on the second substrate permits a balanced progression of the fabrication processes to the first and second substrates, thereby making effective use of the production line.

Eighth, not dropping liquid crystal on the second substrate permits the sealant minimizes contamination of particles on the second substrate because it can be cleaned by USC just prior to bonding.

Ninth, since the bonding chamber is evacuated after the substrate receiving means supports a central portion of the substrate prevents falling and breakage of the substrate even if the substrate is of large size.

Tenth, sensing the time during which the two substrates come into contact and varying the pressure in bonding the two substrates minimizes damage made by the liquid crystal to the orientation film.

Eleventh, since the upper stage presses the substrate down by means of a plurality of shafts, each of which is capable of applying pressure independently, uniform bonding of the sealant can be achieved by independently applying a lower or higher pressure by predetermined shafts when the lower stage and the upper stage are not level or fail to bond to the sealant uniformly.

Twelfth, simultaneous loading and unloading of the glass substrates shortens the fabrication time.

Thirteenth, inclusion of a liquid crystal spreading process shortens the LCD fabrication time.

Figure 106:
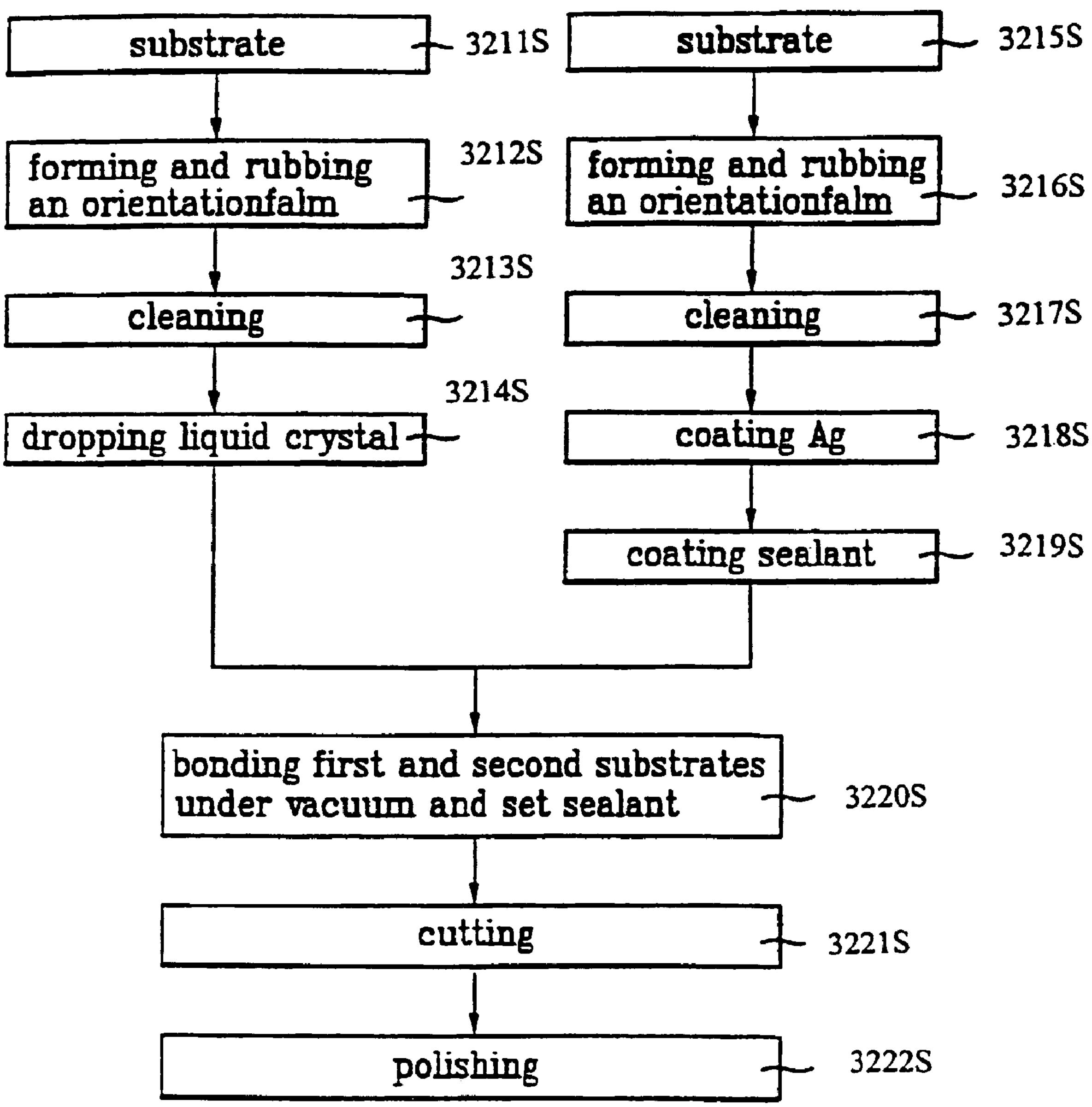
FIG. 106 illustrates a flowchart showing the method steps for fabricating an LCD in accordance with an embodiment of the present invention.

FIG. 106 illustrates a flowchart showing method steps for fabricating an LCD in accordance with a preferred embodiment of the present invention, and FIGS. 107A-107E illustrate method steps for fabricating an LCD in accordance with a preferred embodiment of the present invention.

Referring to FIG. 106, a plurality of panels are designed on a first glass substrate 2651 and a thin film transistor array is formed on each panel (3211S), and a first orientation or alignment film is formed on an entire surface of the first glass substrate 2251. Then, a rubbing process (3212S) is performed. Instead of the rubbing process, a UV alignment process may be performed.

It should be noted that in a single glass substrate, multiple panels may be formed or one large panel may be formed. For example, in a 1.0 meter×1.2 meter glass substrate, 15 panels of about 15 inches each may be formed simultaneously. Many other panel sizes may be formed but the number of panels will differ. For example, in the same size glass substrate (1.0 m×1.2 m), 6 panels of 18 inches may be formed. Even a large panel size of 40 inches or more may be formed on the 1.0 m×1.2 m glass substrate.

A plurality of panels are designed on a second glass substrate 2252 corresponding to the panels on the first glass substrate 2252, to form a color filter array on each panel (3215S). The color filter array includes such elements as a black matrix layer, a color filter layer, and a common electrode. A second orientation or alignment film is formed on an entire surface of the second substrate 2252 and the second orientation film undergoes a rubbing process (3216S) similar to the first orientation film. A UV alignment process may replace the rubbing process.

The first and second glass substrates 2251 and 2252 thus formed are cleaned, respectively (3213S and 3217S).

Figure 107A:
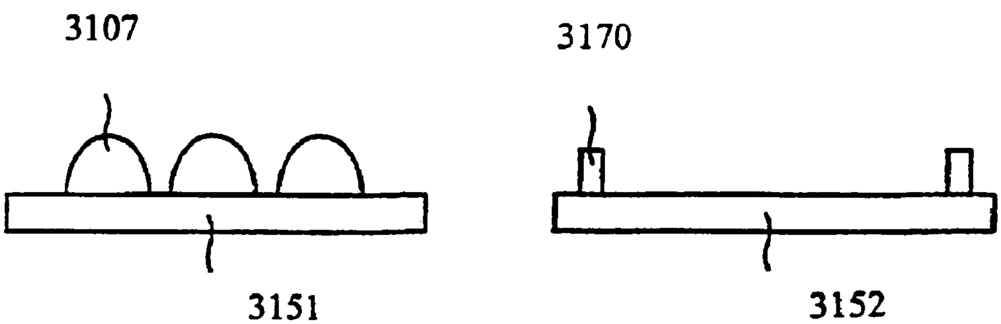
FIGS. 107A-107E illustrate steps of a method for fabricating an LCD in accordance with an embodiment of the present invention.

Referring to FIG. 107A, liquid crystal 3107 is dropped or applied on the first glass substrate 3151 which has been cleaned (3214S). Silver (Ag) dots are formed on the cleaned second glass substrate 3152 (3218S), as well as a sealant 3170 (3219S).

The first and second glass substrates 3151 and 3152 are loaded in a vacuum bonding chamber 3110, and bonded to spread the applied liquid crystal between the first and second substrates uniformly. Then, the sealant is hardened (3220S).

Figure 108:
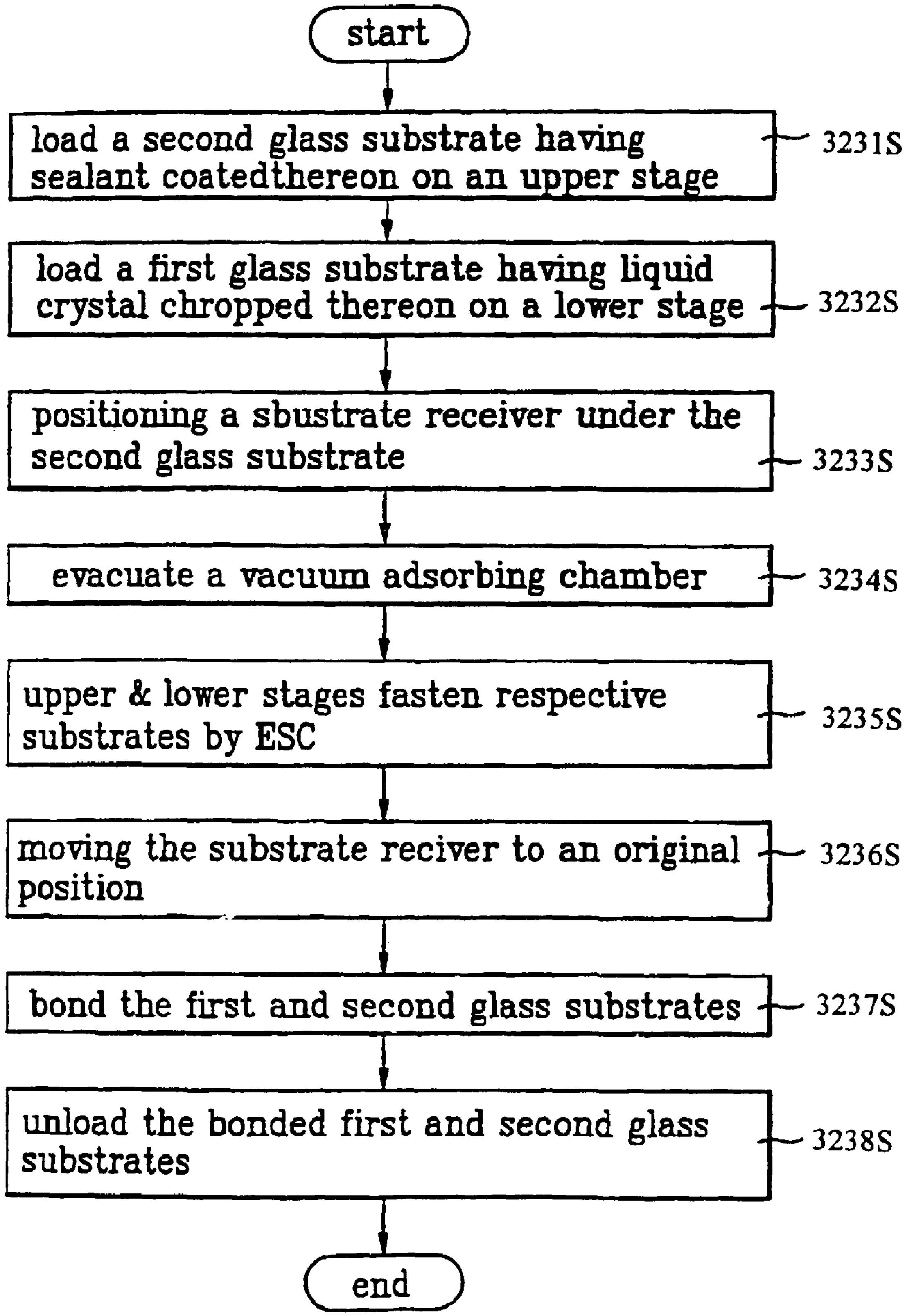
FIG. 108 illustrates a flowchart showing the bonding steps of the present invention.

The bonded first and second glass substrates 3151 and 3152 are cut into individual panels (3221S). Each panel is polished and inspected (3222S). The bonding process will be explained in more detail. FIG. 108 illustrates a flowchart showing the bonding steps of the present invention.

The bonding process includes the step of loading the two substrates in the vacuum bonding chamber, bonding the two substrates, and unloading the bonded substrates from the vacuum bonding chamber.

Although a plurality of panels may be formed for a single glass substrate, a single panel may also be formed to maximize the size of the display, as explained earlier.

Before loading the substrates, the second glass substrate 3152 having the sealant 3170 coated thereon maybe cleaned using the ultra sonic cleaner (USC), for example, for removing undesired particles formed during fabrication. Since the second glass substrate 3152 has the sealant and the Ag dots coated thereon and no liquid crystal applied thereon, the second glass substrate 3152 can be cleaned.

Figure 107B:
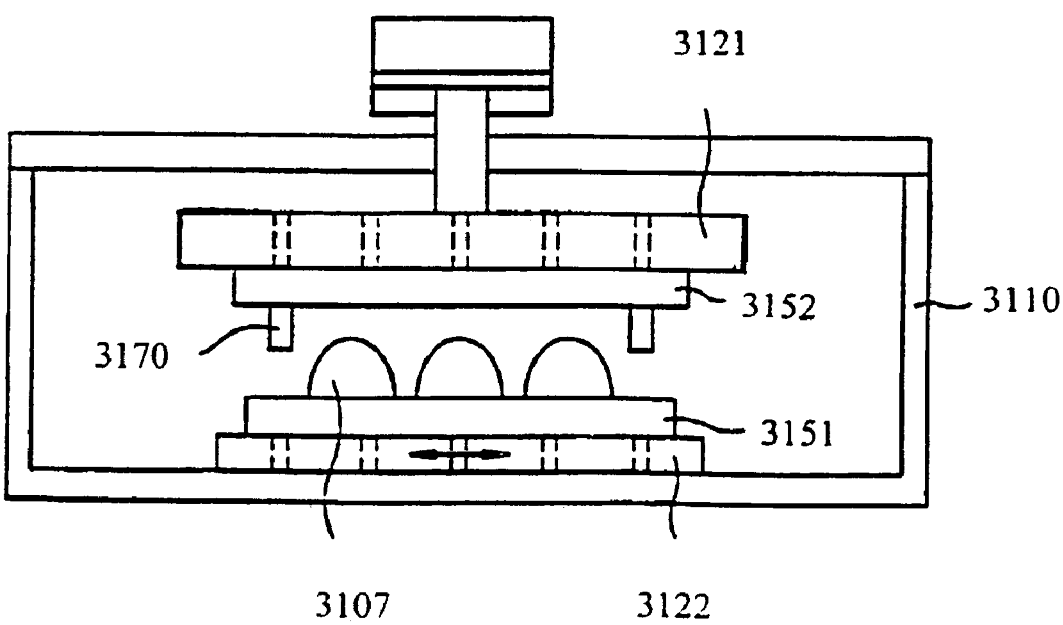

Referring to FIG. 107B, in the loading step, the second glass substrate 3152 having the sealant 3170 coated thereon is held by an upper stage 3121 by a vacuum chuck, for example, in the vacuum bonding chamber 3110 with the coated sealant facing downward (3231S). Before the second glass substrate 3152 is loaded in the bonding chamber 3110, the substrate 3152 is flipped over so that the surface with the sealant 3170 will face downward. The first and second substrates may be held by the lower and upper substrates, respectively, by several suitable mechanisms including a vacuum chuck and electrostatic charge (ESC).

The second glass substrate 3152 has sealant 3170 coated thereon and is held by a loader portion of a robot (not shown) and the sealant 3170 coating faces downward as it is brought in the vacuum bonding chamber 3110. Next, the upper stage 3121 in the vacuum bonding chamber 3110 is moved vertically downward or the second glass substrate 3152 may be moved vertically upward by the lower stage 3122, for example. In addition, utilizing the vacuum chuck or electrostatic charge (ESC) the first and second substrates are held by the lower and upper stages. Other suitable mechanisms may be used to hold the substrates by the stages.

The robot loader is then moved out of the vacuum bonding chamber 3110 and the first glass substrate 3151 is arranged over the lower stage 3122 by the robot loader.

Although it has been explained that the liquid crystal 3170 is dispensed on the first glass substrate 3151 having the thin film transistor array, and the sealant is coated on the second glass substrate 3152, having the color filter array, the sealant may be coated on the first glass substrate 3151 and the liquid crystal may be dispensed on the second substrate 3152. In the alternative, the sealant may be applied to both substrates, or the liquid crystal dropping and the sealant coating may be made on either of the two glass substrates, as long as the substrate with the liquid crystal material is located at the lower stage and the other substrate is located at the upper stage.

After the first and second substrates are held by a vacuum chuck, for example, to the lower and upper stages, the first and second substrates may be aligned with each other.

Next, a substrate receiver (not shown) for holding the second glass substrate is positioned to contact the surface of the second glass substrate 3152 (3233S) that is facing down by placing the substrate receiver under the second glass substrate 3152 and moving either the upper stage down, the substrate receiver up, or both, until the downward facing surface of the second glass substrate 3152 contacts the substrate receiver.

The substrate receiver is positioned below the second glass substrate 3152, to prevent the second glass substrate held by the upper stage from becoming detached from the upper stage when the bonding chamber 3110 is under vacuum. In particular, when the bonding chamber 3110 is under vacuum, the vacuum force holding the second substrate onto the upper stage by the vacuum chuck loses its strength. Thus, the second substrate can no longer be held by the vacuum chuck of the upper stage. Before the second substrate 3152 is dropped, however, the substrate receiver temporarily supports the second substrate.

Accordingly, the second glass substrate 3152, held by the upper stage may be arranged on the substrate receiver before or during the formation of vacuum in the bonding chamber. The upper stage, which holds the second glass substrate, and the substrate receiver may be brought within a predetermined distance of each other so that the second glass substrate 3152 may be safely placed on the substrate receiver from the upper stage when the bonding chamber is evacuated. Moreover, suitable mechanisms for further fastening the substrates onto the stages may be provided additionally as air flow in the chamber may shake the substrates when evacuation of the vacuum bonding chamber is initiated.

Referring to FIG. 108, once all the elements are in place as explained above, the vacuum bonding chamber 3110 is evacuated (3234S). The vacuum within the vacuum bonding chamber 3110 may have a pressure in a first range of about $1.0\times10^{-3}$ Pa to 1 Pa or a second range of about $1.1\times10^{-3}$ Pa to $10^2$ Pa. The first range may be especially applicable for an in-plane switching (IPS) mode LCD and the second range may be especially useful for a twisted nematic (TN) mode LCD. Another type of LCD called a vertical alignment (VA) mode LCD may also use these ranges.

Evacuation of the vacuum bonding chamber 3110 may be carried out in two stages as follows. After the substrates are held to their respective stages, the bonding chamber door is closed and the bonding chamber 3110 undergoes evacuation for the first time. After positioning the substrate receiver below the upper stage and placing the second substrate on the substrate receiver or after positioning the upper stage and the substrate receiver to within a predetermined distance where the second substrate held by the upper stage can be safely placed on the substrate receiver, the vacuum bonding chamber is further evacuated for a second time. The second evacuation is faster than the first evacuation. The vacuum force created by the first evacuation is not higher than the vacuum force needed to hold the second glass substrate onto the upper stage.

The aforementioned two stage evacuation process may minimize moving or shaking of the substrates when the vacuum bonding chamber is rapidly evacuated.

Alternatively, after the substrates are held to their respective stages and the bonding chamber door is closed, the evacuation may be implemented in a single step at a fixed rate. In addition, the substrate receiver may be arranged below the second substrate 3152 prior to or at initiation of the evacuation. Before the vacuum pressure in the vacuum bonding chamber becomes higher than the vacuum needed to hold the second substrate onto the upper stage, the substrate receiver should be placed below the second glass substrate 3152 to prevent the second glass substrate from falling to the lower stage if a vacuum chuck is used to hold the substrate onto the stages on the bonding chamber.

Once the vacuum bonding chamber 3110 is evacuated to a preset vacuum, the upper and lower stages 3121 and 3122 reattach to the first and second glass substrates 3151 and 3152 respectively using an electrostatic charge (ESC) (3235S) and the substrate receiver is removed to its original position (3236S).

Using ESC the first and second glass substrates are held to their respective lower and upper stages by applying negative/positive DC voltages to two or more plate electrodes (not shown) formed within the stages. When the negative/positive voltages are applied to the plate electrodes, a force is generated between a conductive layer (e.g., transparent electrodes, common electrodes, pixel electrodes, etc.) formed on the substrates and the stages. When the conductive layer formed on the substrate faces the stage or is adjacent the stage surface, about 0.1-1KV is applied to the plate electrodes. When the conductive layer does not face the stage or is not adjacent to the stage surface, about 3-4KV is applied to the plate electrodes. An elastic sheet may be optionally provided to the upper stage.

Figure 107C:
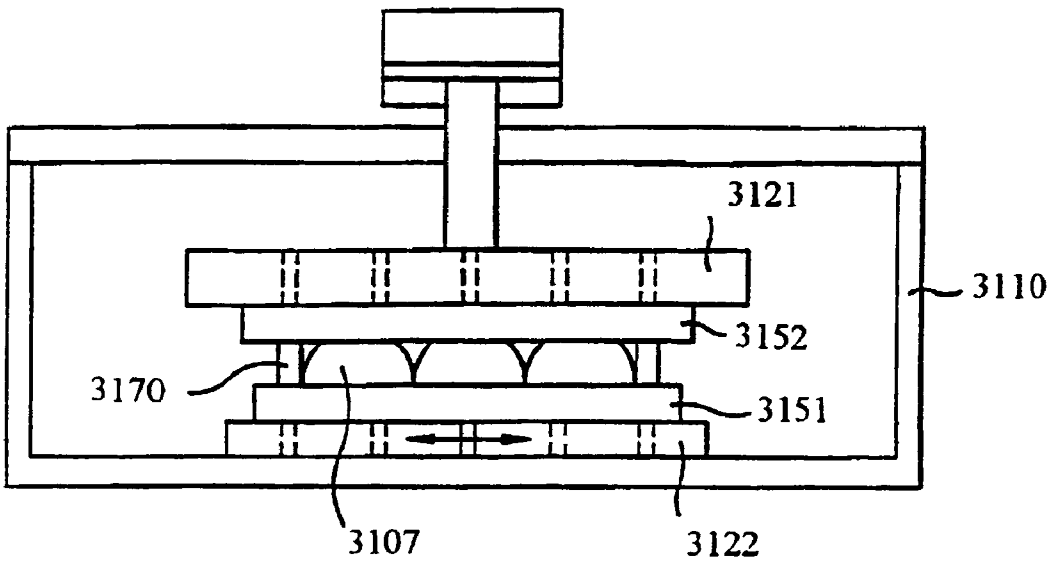
Figure 107D:
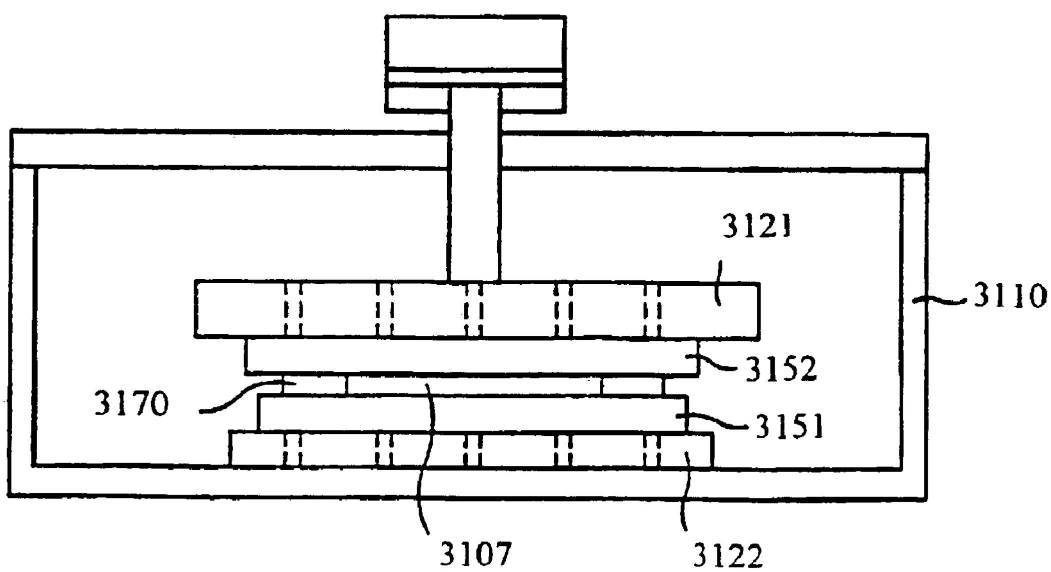

Referring to FIG. 107C, after the two glass substrates 3151 and 3152 are loaded on their respective stages, the two substrates are aligned and held into position by ESC for bonding of the two substrates 3151 and 3152 (3237S). The first and second glass substrates 3151 and 3152 are pressed together by moving either the upper stage 3121 or the lower stage 3122 or both in a vertical direction, while varying speeds and the pressures at different stage locations. For example, until the time the liquid crystal 3107 on the first glass substrate 3151 and the seal on the second glass substrate 3152 come into contact, the stages are moved at a fix speed or fixed pressure, and the pressure is increased step by step from the time of contact to a final pressure. That is, a load cell fitted to a shaft of the movable stage senses the time of contact. The two glass substrates 3151 and 3152 may, for example, be pressed at a pressure of 0.1 ton at the time of contact, a pressure of 0.3 ton at an intermediate stage, a pressure of 0.4 ton at an ending stage, and a pressure of 0.5 ton at a final stage (see FIG. 107D).

Although it is illustrated in the figures that the upper stage presses down toward the lower stage by means of one shaft, a plurality of shafts may independently apply and control pressure using an individual load cell. If the lower stage and the upper stage are not leveled or fail to be pressed uniformly, predetermined number of shafts may be selectively pressed using lower or higher pressures to provide uniform bonding of the seal.

Figure 107E:
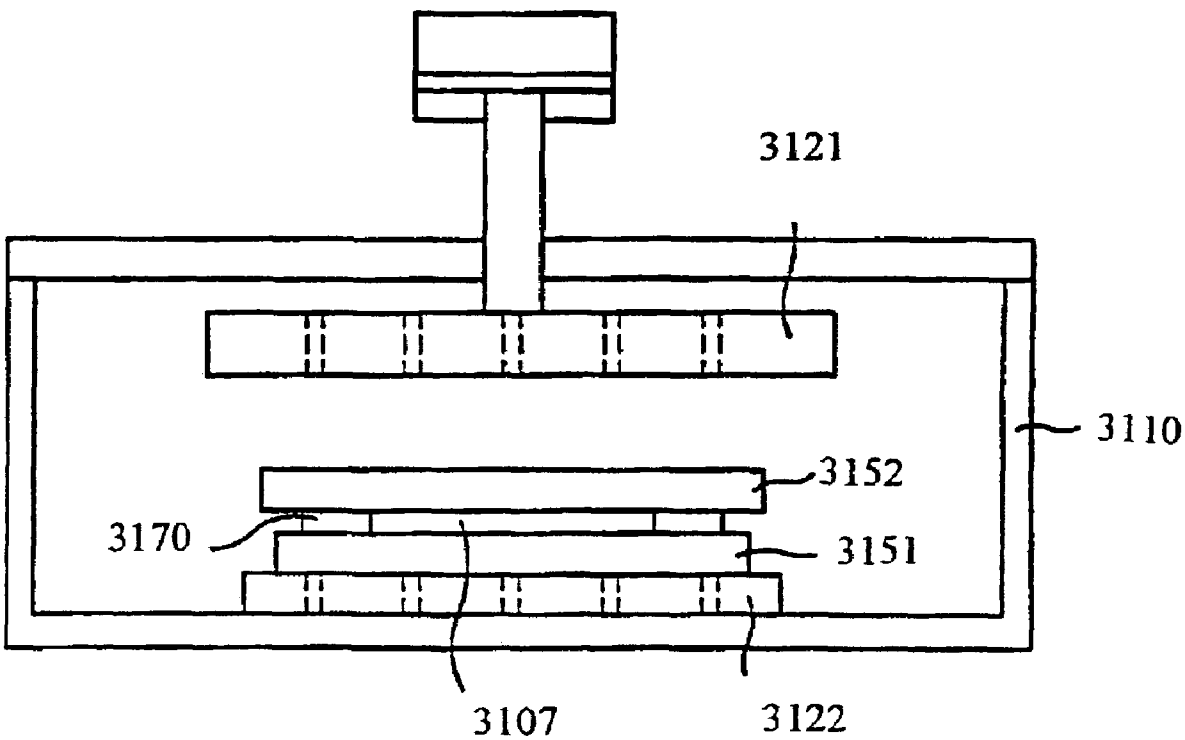

Referring to FIG. 107E, after the two substrates have been bonded, the ESC is turned off and the upper stage 3121 is moved up in order to separate the upper stage 3121 from the bonded substrates. Then, the bonded substrates are unloaded (3238S).

As has been explained, the method for fabricating LCDs of the present invention has the following advantages.

First, applying the liquid crystal on the first substrate and coating the seal on the second substrate shorten the fabrication time prior to bonding the two substrates together.

Second, applying the liquid crystal on the first substrate and coating the seal on the second substrate permits a balanced progression of the fabrication processes for the first and second substrates, thereby making efficient use of the production line.

Third, by applying the liquid crystal on the first substrate and not applying liquid crystal on the second substrate, contamination is reduced as the substrate having the sealant coated thereon can be cleaned by USC prior to bonding.

Fourth, positioning the substrate receiver under the substrate and evacuation of the vacuum bonding chamber permits the substrate held by the upper stage from falling and breaking.

Fifth, sensing the time during which the two substrates come into contact and varying the pressure when bonding the two substrates minimizes damage made by the liquid crystal to the orientation film.

Sixth, since the upper stage presses the substrate down by means of a plurality of shafts, each of which is capable of applying pressure independently, uniform bonding of the sealant can be achieved by independently applying lower or higher pressures by predetermined shafts when the lower stage and the upper stage are not level or fail to bond to the sealant uniformly.

Seventh, the two staged evacuation of the vacuum bonding chamber minimizes moving or shaking of the substrates from the air flow in the chamber caused by a sudden pressure change.

Figure 109:
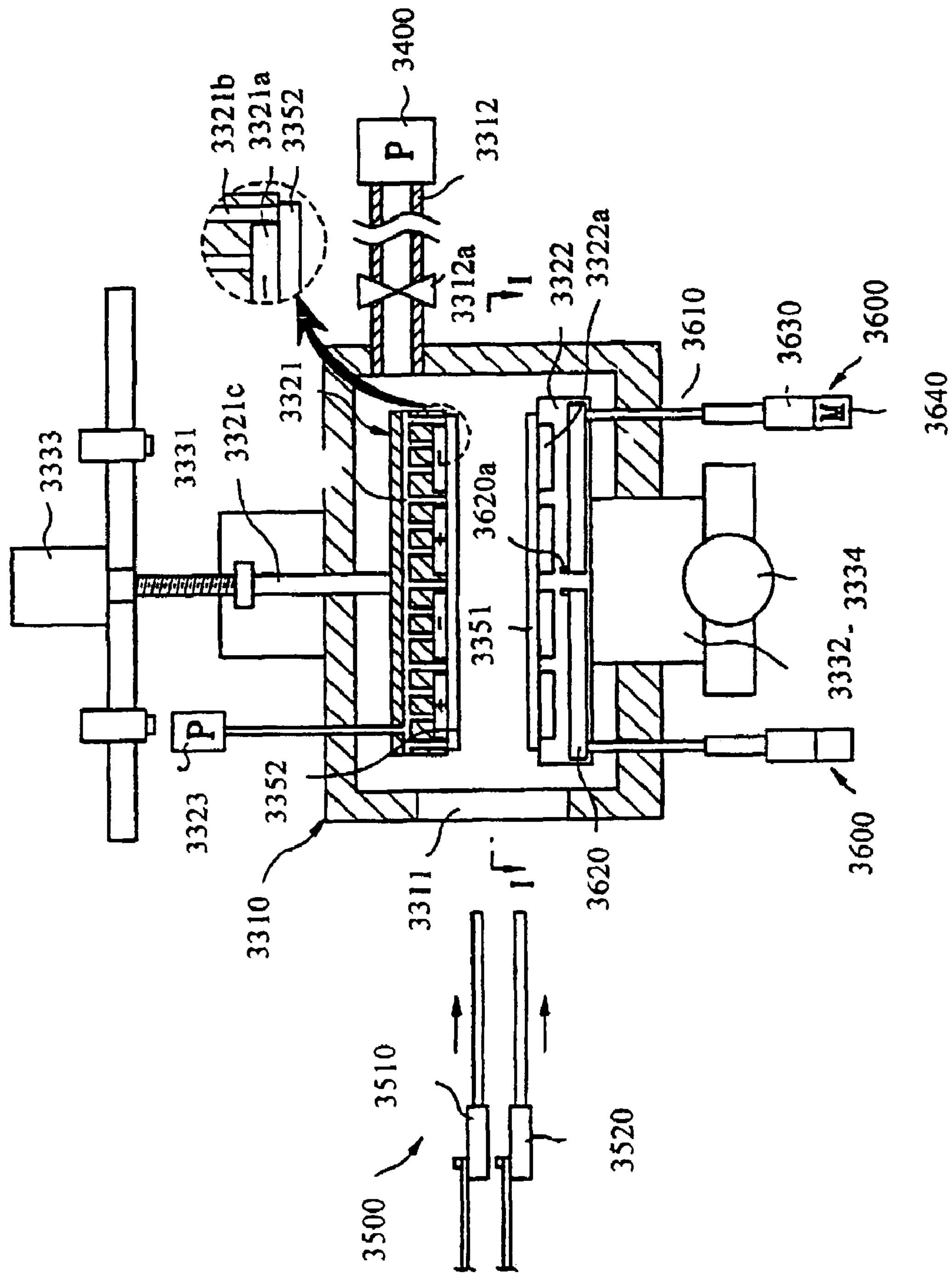
FIG. 109 is a cross-sectional view of an exemplary apparatus to which an exemplary substrate receiving system is applied according to the present invention.

FIGS. 109, 110A, 110B, 111A, and 111B illustrate an exemplary apparatus for vacuum bonding a liquid crystal display (LCD) device according to an embodiment of the present invention. In FIG. 109, the apparatus may include a vacuum processing chamber 3310, upper and lower stages 3321 and 3322, a stage moving device, a vacuum device 3400, a loader part 3500, and a substrate receiving system 3600.

The vacuum processing chamber 3310 may be formed such that bonding between upper and lower substrates is selectively carried out in one of a vacuum pressure state and an atmospheric pressure state within the vacuum processing chamber 3310. To switch to the vacuum pressure state from an atmospheric pressure state, an air outlet 3312 transfers a vacuum force to an inner space of the vacuum processing chamber 3310 via an air outlet valve 3312*a*.

The upper and lower stages 3321 and 3322 may be provided at upper and lower spaces within the vacuum processing chamber 3310, respectively. The upper and lower stages 3321 and 3322 may receive first and second substrates 3351 and 3352 that are loaded into the vacuum processing chamber 3310 via the loading part 3500. The upper and lower stages 3221 and 3322 may each include an electrostatic chuck 3321*a* and 3322*a* for affixing the second and first substrates 3352 and 3351, respectively, onto opposing surfaces of the upper and lower stages 3321 and 3322. The upper stage 3321 may also include a plurality of vacuum holes 3321*b* formed along at least a circumference of the upper stage 3321, and interconnected via pipelines 3321*c* to transmit a vacuum force generated by a vacuum pump 3323 to affix the second substrate 3352 to a lower surface of the upper stage 3321. The plurality of vacuum holes 3321*b* may also be formed at a central portion of the upper substrate. Moreover, the lower stage 3322 may also include a plurality of vacuum holes (not shown) formed along at least a circumference of the lower stage 3322, and interconnected via pipelines (not shown) to transmit a vacuum force generated by a vacuum pump (not shown) to affix the first substrate 3352 to an upper surface of the lower stage 3322.

The electrostatic chucks 3321*a* and 3322*a* may include at least one pair of electrostatic plates of opposing polarities to which a direct voltage having the different polarities is applied respectively so as to enable the substrate to adhere thereto by an electrostatic force. Alternatively, the electrostatic force generated from the electrostatic chucks 3321*a* and 3322*a* may include at least one pair of electrostatic plates of similar polarities. In addition, the electrostatic chuck 3322*a* may be mounted at a top surface of the lower stage 3322, and may include at least one vacuum hole (not shown) provided along a circumference of the electrostatic chuck 3322*a*. Moreover, the electrostatic chuck 3322*a* and the at least one vacuum hole formed at the top surface of the lower stage 3322 is not limited to the same construction of the upper stage 3321. Preferably, the electrostatic chuck 3322*a* and the at least one vacuum hole at the top surface of the lower stage 3322 are arranged so as to consider the overall shape of a target substrate, and the respective liquid crystal dispensing areas.

The stage moving device includes a moving axis 3331 selectively driven to move the upper stage 3321, a rotational axis 3332 selectively driven to rotate the lower stage 3322, and driving motors 3333 and 3334 coupled axially with the upper and lower stages 3321 and 3322, respectively, at one of the exterior and interior of the vacuum processing chamber 3310 to drive the axes, respectively. Accordingly, the stage moving device is not limited to the device moving the upper stage 3321 up and down or the lower stage 3322 right and left. Preferably, the stage moving device enables movement of the upper stage 3321 along a horizontal direction, and movement of the lower stage 3322 along a vertical direction. In addition, a subsidiary rotational axis (not shown) may be incorporated into the upper stage 3321 to enable rotation of the upper stages 3321, and a subsidiary moving axis (not shown) may be incorporated into the lower stage 3322 to enable the vertical movement.

The loader part 3500 may be arranged at the exterior of the vacuum processing chamber 3310 separately from various elements provided inside the vacuum processing chamber 3310. The loader part 3500 may include a first arm 3510 to carry the first substrate 3351 upon which at least the liquid crystal material is disposed into the vacuum processing chamber 3310, and a second arm 3520 to carry the second substrate 3352 into the vacuum processing chamber 3310. Alternatively, the first substrate 3351 may have both the liquid crystal material and the sealant disposed on a surface thereof, wherein the first substrate may be one of a TFT array substrate and a color filter (C/F) substrate. The first arm 3510 is disposed over the second arm 3520 so that contaminating particles from the second substrate 3352 will not fall upon the first substrate 3351.

The substrate receiving system 3600 may contact a portion of the second substrate 3352 at dummy areas particularly located between cell areas formed on the second substrate 3352. Each of the substrate receiving system 3600 may include a rotational axis 3610, a support 3620, a support protrusion, and a driving part 3630. The substrate receiving system 3600 may be provided at an interior bottom portion of the vacuum processing chamber 3310 adjacent to sides of the lower stage 3322. Accordingly, a total number of the substrate receiving system 3600 may be about 2 to 10.

Figure 110A:
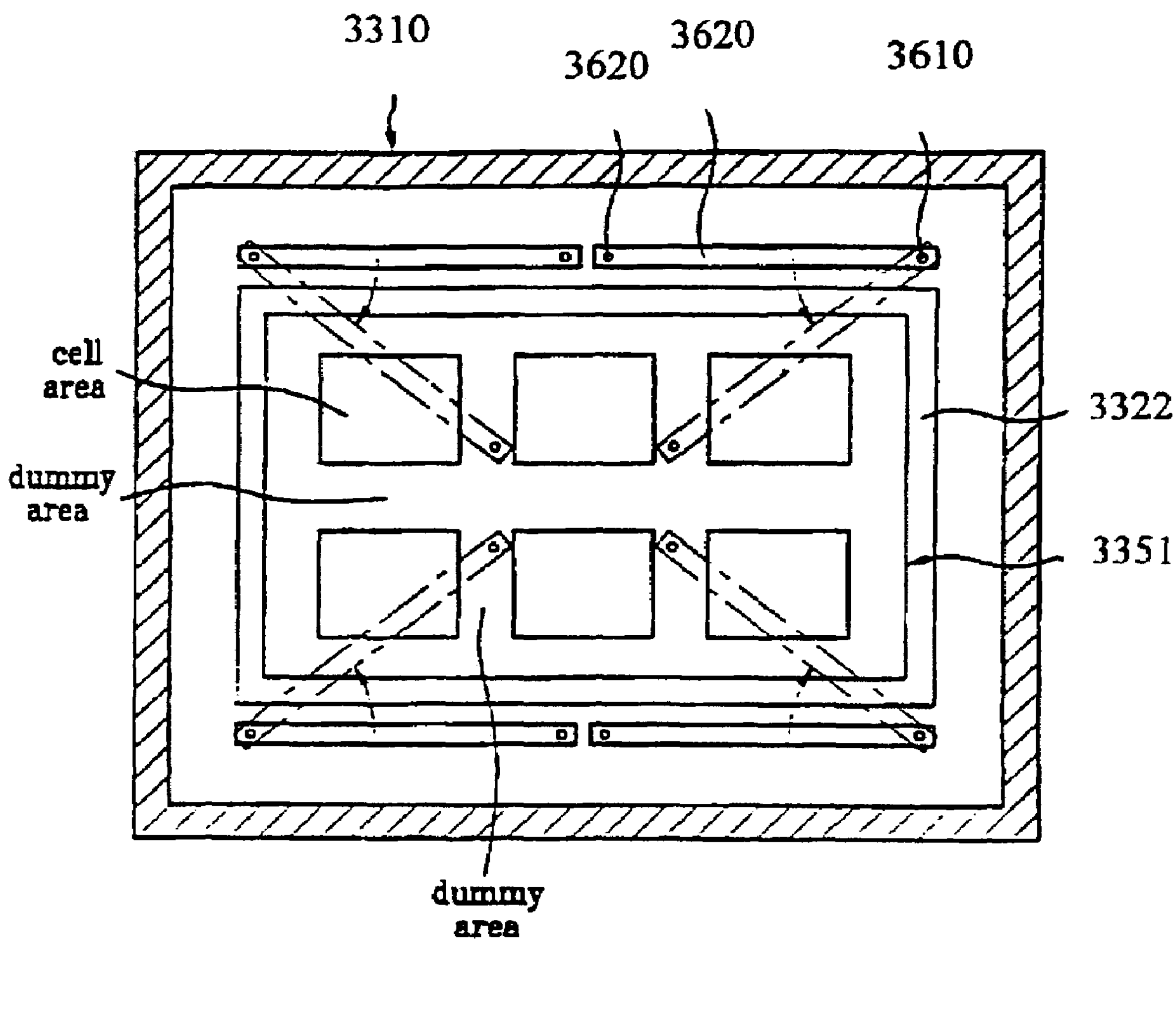
Figure 110B:
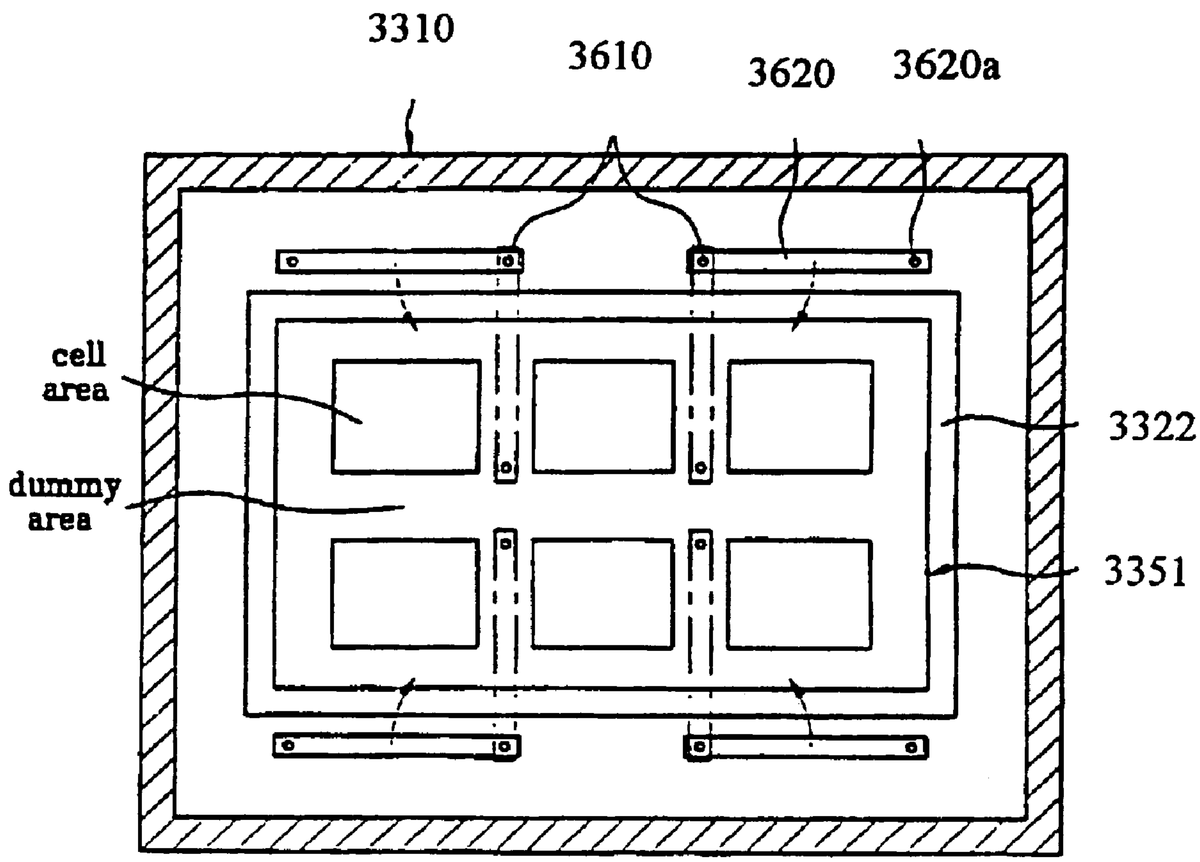

FIGS. 110A and 110B are a plan views of the exemplary substrate receiving system along line I-I of FIG. 109 according to the present invention. In FIG. 110A, one end of the support 3620 to which the rotational axis 3610 is coupled may be placed at the interior bottom portion of the vacuum processing chamber 3310, which corresponds to a corner portion of one of a long side and a short side of each of the upper and lower stages 3321 and 3322. Specifically, the substrate receiving system 3600 may be provided at a vicinity of one corner portion or both corner portions of one side of the lower stage 3322 or at a vicinity of one corner portion or both corner portions of the other side of the lower stage 3322. In FIG. 110B, one end of the support 3620 to which the rotational axis 3610 is coupled may be placed at the interior bottom portion of the vacuum processing chamber 3310, which corresponds to a middle portion of one of a long side and a short side of each of the upper and lower stages 3321 and 3322. Specifically, the substrate receiving system 3600 may be provided at a vicinity of a central portion of one or the other side of the lower stage 3322, or may be provided at each corner and central portions simultaneously. When the substrate receiving system 3600 is provided at the vicinity of the central portion of one side or the other side of the lower stage 3322, it is also possible to provide a plurality of substrate receiving system 3600.

In FIG. 110A, the supports 3620 may be constructed of individual bodies each having a first end attached at the rotational axis 3610 corresponding to a corner region of the lower stage 3322, and a second end having a support protrusion **3620*a* corresponding to a central region of the lower stage 3322. The supports 3620 may be formed at a first position along a direction parallel to the long side of the upper and lower stages 3321 and 3322. During extension of the supports 3620, each of the rotational axis 3610 rotate the supports 3620 from the first position to a second position in which each of the support protrusions 3620*a* are disposed at a region corresponding to one of the dummy areas. Alternatively, the supports 3620 may be formed along a direction parallel to the short side of the upper and lower stages 3321 and 3322. However, it may be preferable to provide the substrate receiving system 3600 along the direction parallel to the long side of the upper and lower stages 3321 and 3322** in order to provide sufficient margin space.

Each of the support protrusions **3620*a* may be formed at top portions of the supports 3620 to reduce a contact area between the supports 3620 and the second substrate 3352. The support protrusions 3620*a* are disposed along the supports 3620 such that when the support 3620 is positioned under the upper stage 3321, the support protrusions 3620 contact the dummy areas of the second substrate 3352. Each of the support protrusions 3620*a* may have a same protruding height, or each of the support protrusions 3620*a* may have different relative heights. Moreover, each of the support protrusions 3620*a* may have individually adjustable heights and each support 3620 may have a plurality of at least one support protrusion 3620*a*. When at least two support protrusions 3620*a* are formed at a top surface of the support 3620, an interval between the at least two support protrusions 3620*a* may be selected to prevent a displacement of the second substrate 3352. In addition, the interval between the at least two support protrusions 3620*a* may be less than a corresponding distance between adjacent cell areas such that the at least two support protrusions 3620*a*** contact the second substrate with the dummy area.

Each of the driving parts 3630 of the substrate receiving system 3600 may include a cylinder to provide a vertical movement of the rotational axis 3610 and a rotational motor 3640 that rotates the rotational axis 3610. The cylinder may operate using a one, or both of hydraulic or pneumatic control. Alternatively, the driving part 3630 may include both the cylinder and the rotational motor 3640, wherein the cylinder moves the rotational axis 3610 along a vertical plane and the rotational motor 3640 rotates the rotational axis 3610 along a horizontal plane. Moreover, the cylinder may rotate the rotational axis 3610 along the horizontal plane, and the rotational motor 3640 may move the rotational axis 3610 along the vertical plane.

During deployment of the substrate receiving system 3600, the supports 3620 may be elevated from a home position to a first position along the vertical direction above an upper surface of the lower stage, and thus above an upper surface of the first substrate 3351, via one of the cylinder and rotational motor 3640. Once the supports 3620 have been elevated above the upper surface of the first substrate 3351, the rotational motor 3640 rotates the supports 3620 about the rotational axis 3610 to a second position in which the support protrusions **3620*a* are disposed adjacent to the dummy areas of the second substrate 3352**. Consideration must be given regarding the home position of the supports 3620. Specifically, the home position of the support 3620 should be determined such that an upper surface of each of the support protrusions 3620*a* should be lower than a top surface of the lower stage 3322 to prevent any possible interference with a lower surface of the first substrate 3351. Furthermore, consideration should be given to the first and second arms 3510 and 3520 of the loader part 3500 such that the substrate receiving system 3600 does not interfere with loading and unloading of the first and second substrates 3351 and 3352.

Each of the driving parts 3630 may be disposed at the exterior of the vacuum processing chamber 3310. Specifically, the rotational axis 3610 may be provided to penetrate the bottom portion of the vacuum processing chamber 3310, and a sealing system (not shown) may be provided to prevent air from entering into the vacuum processing chamber 3310 during a vacuum pressure state.

A process for using the apparatus to bond substrates according to the present invention will now be explained with reference to FIGS. 109, 111A, and 111B.

In FIG. 109, a loading process is conducted wherein the loader part 3500 controls the first and second arms 3510 and 3520 to receive the first and second substrates 3351 and 3352. The first substrate 3351 includes at least the liquid crystal material disposed on a first surface of the first substrate 3351. As previously explained, the first substrate 3351 may include both the liquid crystal material and the sealant, and the first substrate 3351 may include one of the TFT array substrate and the C/F substrate. Once the first and second arms 3510 and 3520 retrieve the first and second substrates 3351 and 3352, respectively. The loader part 3500 controls the second arm 3520 to provide the second substrate 3352 onto the lower surface of the upper stage 3321. Accordingly, the vacuum pump 3323 provides the necessary vacuum force to the upper stage 3321 to transfer the second substrate 3352 from the second arm 3520 to the lower surface of the upper stage 3321. Thus, the second substrate 3352 provided by the second arm 3520 is affixed to the upper stage 3321 by the vacuum force generated by the vacuum pump 3323.

During the loading process, if a bonding process of the first and second substrates 3351 and 3352 has been previously performed, then the bonded substrates remain on the lower stage. Accordingly, the second arm 3520 may unload the bonded substrates remaining on the lower stage 3322 after loading the second substrate 3352 onto the upper stage 3321. Then, the bonded substrates may be removed from the vacuum processing chamber 3310, and transferred to another processing step by the second arm 3520, thereby shorten process time of the bonded substrates.

After the second arm 3520 has transferred the bonded substrates, the loader part 3500 controls the first arm 3510 to provide the first substrate 3351 upon which at least the liquid crystal material is disposed onto an upper surface of the lower stage 3322. Accordingly, the vacuum pump (not shown) associated with the lower stage 3322 provides the necessary vacuum force to the lower stage 3322 to transfer the first substrate 3351 from the first arm 3351 to the upper surface of the lower stage 3322. Thus, the first substrate 3351 provided by first arm 3510 is affixed to the lower stage 3322 by the vacuum force generated by the vacuum pump (not shown) that is associated with the lower stage 3322. After loading the first substrate 3351 onto the lower stage 3322, the first arm 3510 of the loader part 3500 exits the vacuum processing chamber 3310. Thus, the loading process is finished.

Once both of the first and second substrates 3351 and 3352 have been loaded onto the upper and lower stages 3321 and 3322, respectively, the shield door 3314 (FIG. 111A) provided at the entrance 3311 of the vacuum processing chamber 3310 close the entrance 3311. The shield door 3314 provides for a vacuum tight seal with the vacuum processing chamber 3310.

Next, a vacuum process is started where the vacuum device 3400 is actuated to generate a vacuum force while the switch valve 3312*a* provided at the air outlet 3312 of the vacuum processing chamber 3310 keeps the air outlet 3312 open. The vacuum force generated by the vacuum device 3400 is transferred to the interior of the vacuum processing chamber 3310, thereby gradually reducing the pressure at the interior of the vacuum processing chamber 3310.

Figure 111A:
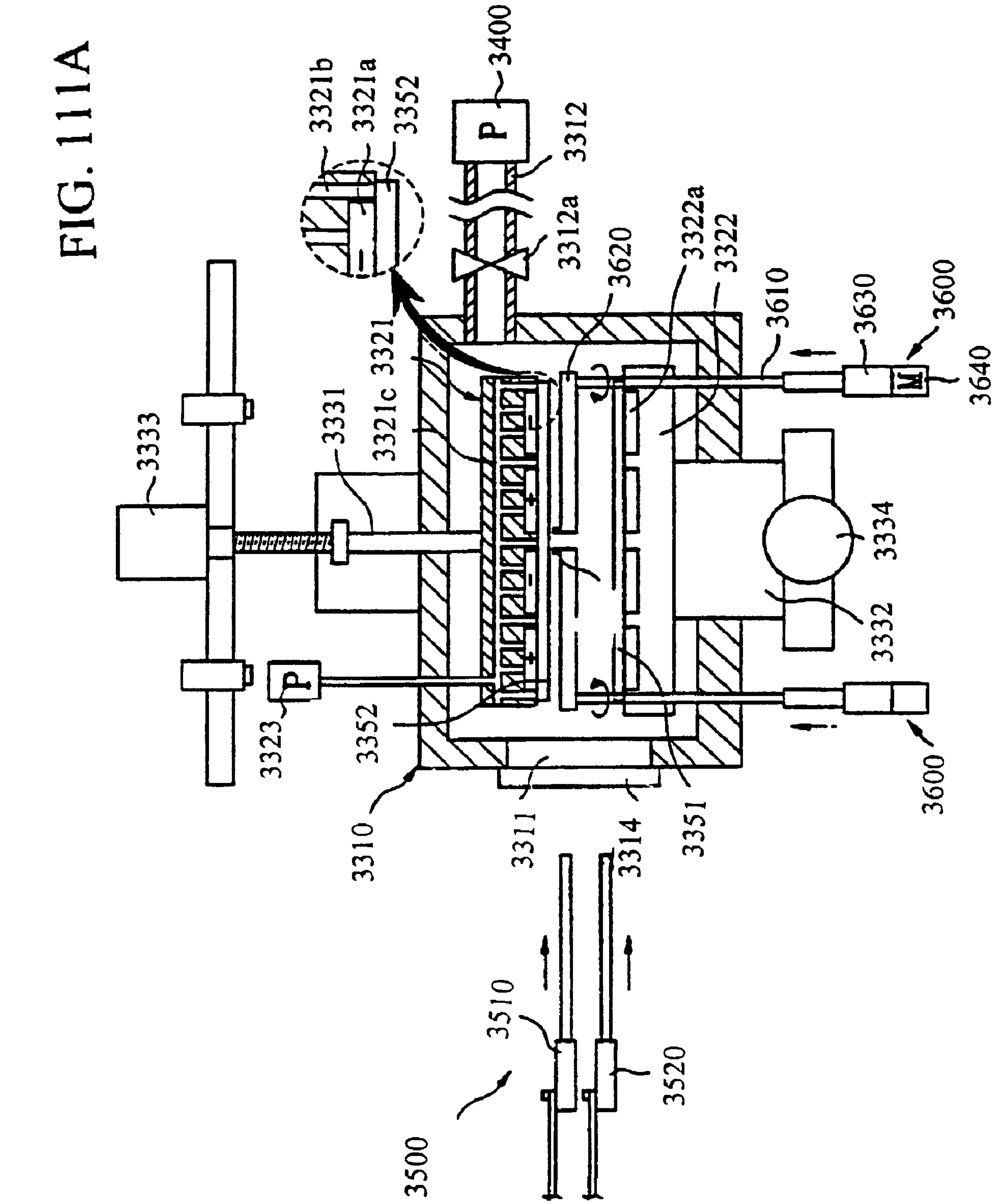
Figure 111B:
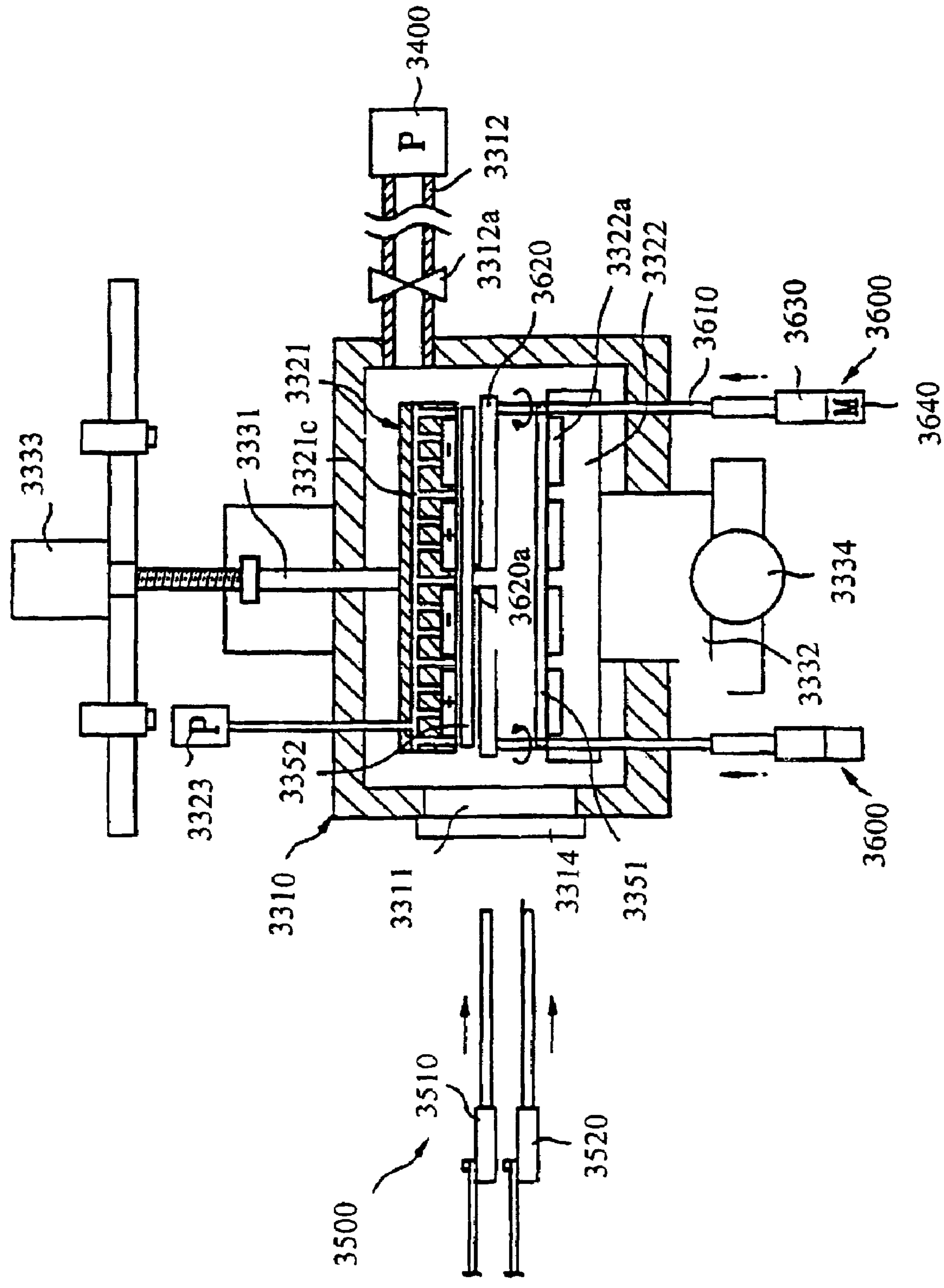

During the vacuum process, a substrate receiving process is performed wherein the substrate receiving system 3600 activates the cylinders and rotational motors 3640 to position the supports 3620 beneath the lower surface of the second substrate 3320, as shown in FIG. 111A. Specifically, the support protrusions 3620*a* of each of the supports 3620 are positioned adjacent to the dummy areas of the second substrate 3352. Then, the vacuum pump 3323 is disabled, thereby removing the vacuum force from the upper stage 3321. Accordingly, the second substrate 3352 falls from the upper stage 3321 by release of the vacuum force, as shown in FIG. 11B, and the lower surface of the second substrate 3352 contacts each of the support protrusions 3620*a* of each of the supports 3620. Alternatively, the supports 3620 may be positioned such that the support protrusions 3620*a* abut the lower surface of the second substrate 3352. Accordingly, when the vacuum force is removed from the upper stage 3321, the second substrate 3352 does not necessary fall from the upper stage 3321, thereby preventing any damage to the second substrate 3352 by contact to the support protrusions 3620*a*.

Meanwhile, once the vacuum pressure at the interior of the vacuum processing chamber 3310 has been attained, the air outlet valve 3312*a* is enabled to close the air outlet 3312, and the vacuum device 3400 is stopped. However, the substrate receiving process may to be executed after the vacuum process is completed, or prior to a start of the vacuum process. Alternatively, the substrate receiving process may be performed prior to the sealing of the vacuum processing chamber 3310 by the shield door 3314. Moreover, the substrate receiving process may begin once the second substrate 3352 has been transferred onto the upper stage 3321.

Once the vacuum process has been competed, an electrostatic process may begin wherein the upper and lower stages 3321 and 3322 may apply an electric power to the electrostatic chucks 3321*a* and 3322*a*, respectively, thereby electrostatically affixing the second and first substrates 3352 and 3351 to the upper and lower stages 3321 and 3322, respectively. Then, the substrate receiving system 3600 may be enabled to return the supports 3620 to the home position.

Once the substrate receiving system 3600 have returned to the home position, an alignment process may be performed to align the first and second substrates 3351 and 3352. The alignment process may include an alignment system, wherein lateral and rotational adjustments of one or both of the upper and lower stages 3321 and 3322 may be performed. Once the alignment process is completed, a bonding process wherein the upper and lower drive motors 3333 and 3334 may move one or both of the upper and lower stages 3321 and 3322 to bonding the first and second substrates 3351 and 3352 together may be performed.

After completion of the bonding process, the vacuum pressure at the interior of the vacuum processing chamber 3310 may be decreased by a vacuum release valve (not shown) that may be attached to the vacuum processing chamber 3310. Then, once the pressure at the interior of the vacuum processing chamber 3310 attains ambient atmospheric pressure, the shield door 3314 of the vacuum processing chamber 3310 may be driven to open the entrance 3311. Finally, the bonded substrates may be unloaded by the second arm 3520 of the loader part 3500, and the loading process is started again.

Figure 112:
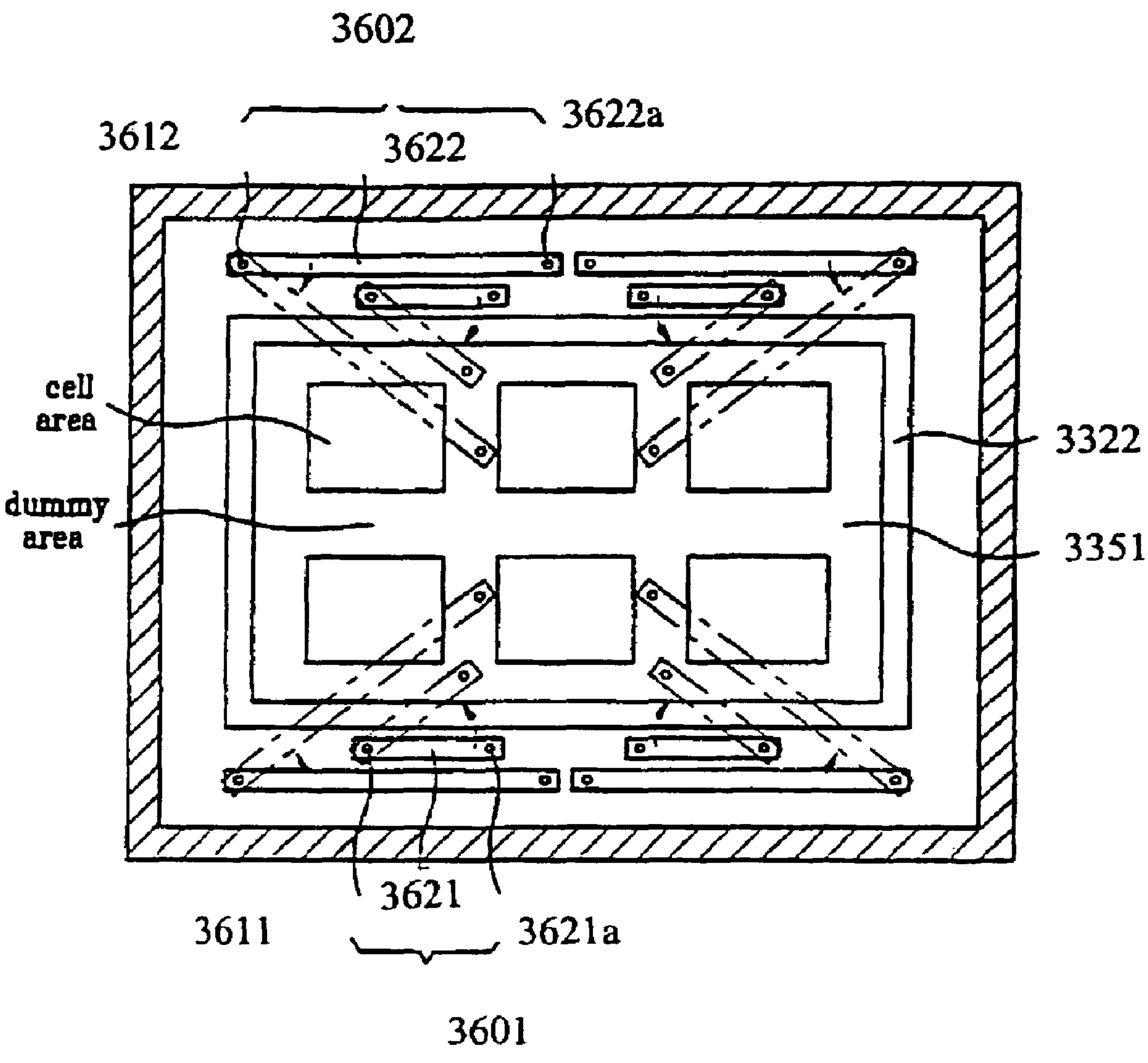
Figure 113:
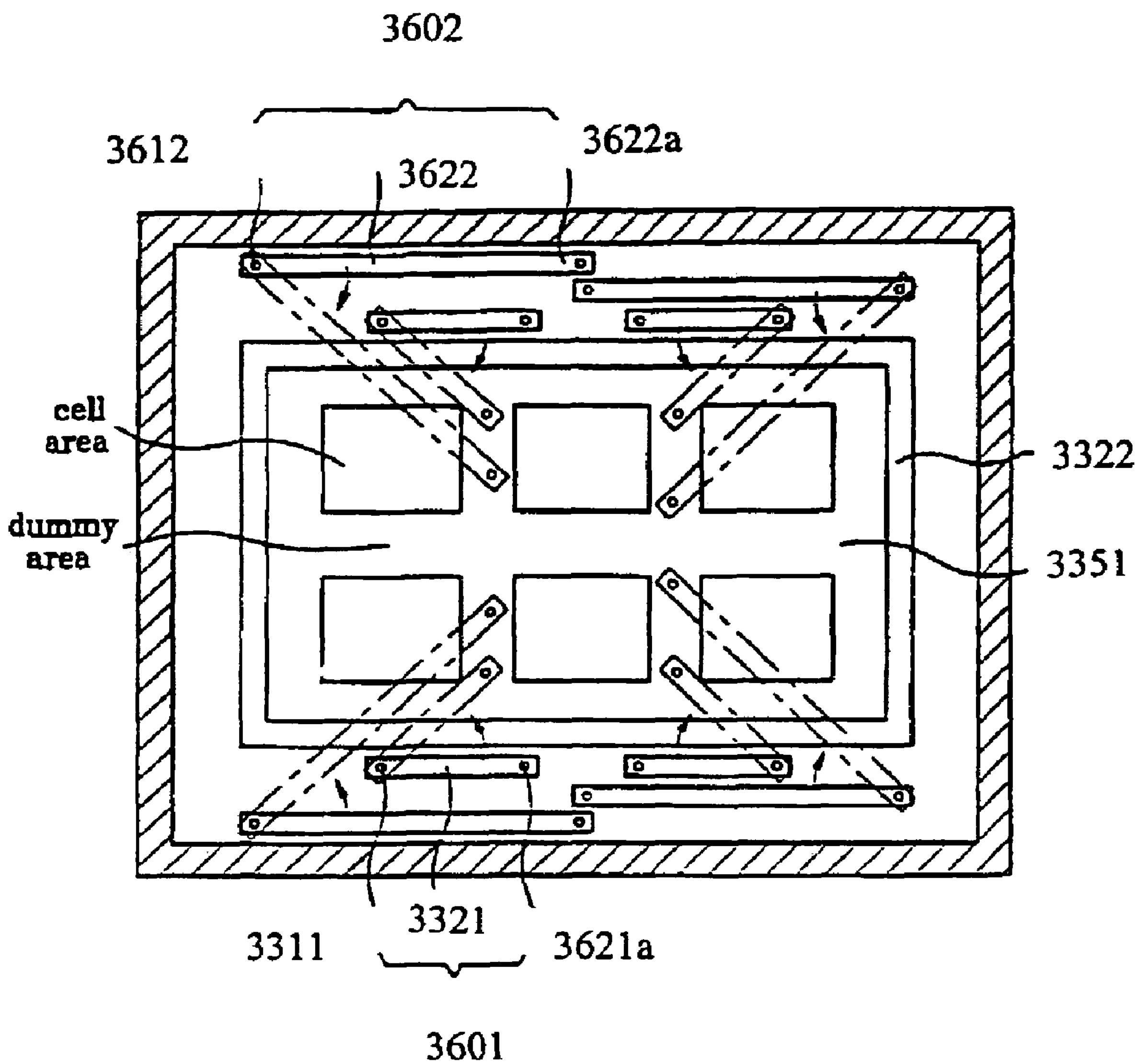

FIGS. 112 and 113 are plan views of exemplary substrate receiving systems according to the present invention. In FIG. 112, a first substrate receiving system 3601 and a second substrate receiving system 3602 may be incorporated into the apparatus according to the present invention. The first substrate receiving system 3601 may include a first rotational axis 3611, a first support 3621, and a first support protrusion 3621*a*. The second substrate receiving system 3602 may include a second rotational axis 3612, a second support 3622, and a second support protrusion 3622*a*. The first support 3621 of the first substrate receiving system 3601 may be provided near a middle portion or corner portion of the lower stage 3321, and may be formed to be shorter than the second support 3622 of the second substrate receiving system 3602. The first substrate receiving system 3601 may be provided closer to the lower stage 3322 than the second substrate receiving system 3602. Accordingly, the first supports 3621 of adjacent first substrate receiving systems 3601 are arranged along a first line, and the second supports 3622 of adjacent second substrate receiving systems 3602 are arranged along a second line parallel to the first line. Moreover, each of the adjacent first substrate receiving systems 3601 and each of the adjacent second substrate systems 3602 are symmetrically disposed about the lower stage 3621.

In FIG. 113, the first supports 3621 at a first side of the lower stage 3322 are arranged along a first line, and the second supports 3622 at the first side of the lower stage 3322 are not arranged along a second line. Specifically, the second supports 3622 at the first side of the lower stage 3322 are offset.

In FIGS. 112 and 113, the first rotational axis 3611 of the first substrate receiving system 3601 may be formed to be reciprocally offset to the second rotational axis 3612 of the second substrate receiving system 3602. In addition, the second rotational axis 3612 may be formed to be closer to a short side of the lower stage 3322 than the first rotational axis 3611, whereby the first and second rotational axes 3611 and 3612 enable a reciprocal crossing operation. Accordingly, the reciprocal offset prevents reciprocal interference by the rotation of the first support 3621 of the first substrate receiving system 3601 and the second support 3622 of the second substrate receiving system 3602. Moreover, a timing sequence of the first and second substrate receiving systems 3601 and 3602 are different, thereby further preventing the reciprocal interference.

The first and second substrate receiving systems 3601 and 3602 are arranged at each corner of each long side of the lower stage 3322 in a direction of the long side of the lower stage 3322 so as to confront each other. Accordingly, the first and second substrate receiving systems 3601 and 3602 may be formed to cross each other. Furthermore, the first and second substrate receiving systems 3601 and 3602 may support the second substrate so as not to pass the cell areas but to traverse the dummy area in a straight line. The first and second substrate receiving systems 3601 and 3602 may be provided at the long sides of the lower stage 3322, since the short sides of the lower stage 3322 fail to provide sufficient margin space. Thus, the first and second substrate receiving systems 3601 and 3602 are provided at a vicinity of the long sides of the lower stage 3322.

During the substrate receiving process, four of the second substrate receiving systems 3602 operate to move to a work position, thereby enabling support of a specific portion of the second substrate 3352. Specifically, the second rotational axes of the four second substrate receiving systems 3602 move along an upward direction, and then rotate in clockwise and counterclockwise directions to place each of the second supports 3622 beneath the second substrate 3352. Accordingly, the second support protrusions 3622*a* are positioned beneath the second substrate 3352 within the dummy areas of the second substrate 3352. However, the substrate receiving process for the substrate receiving system of FIG. 113 must be performed in a slightly different sequence. In FIG. 113, the second rotational axes 3612 at a first end of the lower stage 3322 must first be rotated in clockwise and counterclockwise directions, and the second rotational axes at a second end of the lower stage 3322 must be rotated next in clockwise and counterclockwise directions. Thus, the second supports 3622 at the first end of the lower stage 3322 do not interfere with the second supports 3622 at the second end of the lower stage 3322. Likewise, the sequence must be reversed when moving the second substrate receiving system 3602 into the home position.

Then, the first rotational axes 3611 of the four first substrate receiving systems 3601 move upward, and rotate in a similar direction to the second substrate receiving system 3602 to position the second supports 3622 to a work position, thereby enabling support of a specific portion of the second substrate 3352. Specifically, the first rotational axes 3611 of the four first substrate receiving systems 3601 move along an upward direction, and then rotate in clockwise and counterclockwise directions to place each of the first supports 3621 beneath the second substrate 3352. Accordingly, the first support protrusions 3621*a* are positioned beneath the second substrate 3352 within the dummy areas of the second substrate 3352.

During the previously described substrate receiving process, the vacuum force transferred through the vacuum holes 3321*b* of the upper stage 3321 is released. Alternatively, the vacuum pressure at the interior of the vacuum processing chamber 3310 may become higher than the vacuum force transferred through the vacuum holes 3321*b* of the upper stage 3321. Accordingly, the second substrate 3352 affixed to the upper stage 3321 falls along a gravitational direction to be placed on the first and second support protrusions 3621*a* and 3622*a* of the first and second substrate receiving systems 3601 and 3602, respectively. Alternatively, the first and second support protrusions 3621*a* and 3622*a* may be placed to contact the lower surface of the second substrate 3352 such that the second substrate 3352 does not fall after the vacuum force applied by the upper stage 3321 is released. Accordingly, any damage to the second substrate 3352 may be prevented.

Once the vacuum process has been competed, an electrostatic process may begin wherein the upper and lower stages 3321 and 3322 may apply an electric power to the electrostatic chucks 3321*a* and 3322*a*, respectively, thereby electrostatically affixing the second and first substrates 3352 and 3351 to the upper and lower stages 3321 and 3322, respectively. Then, the first and substrate receiving systems 3601 and 3602 may be enabled to return the first and second supports 3621 and 3622 to the home position. Then, the alignment process and bonding process may be carried out.

Figure 114:
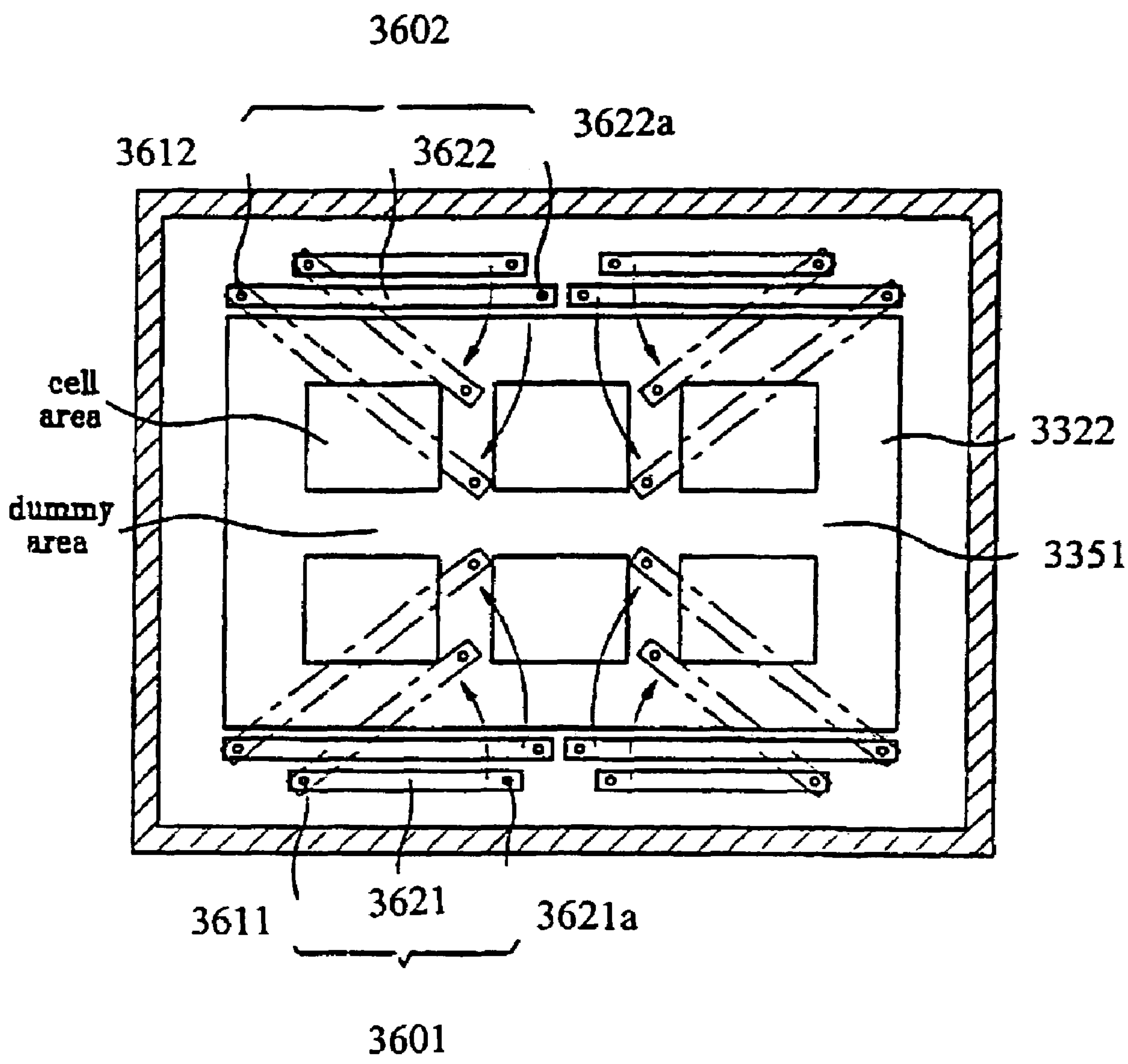

FIG. 114 is a plan view of an apparatus having another exemplary substrate receiving system. In FIG. 114, the second substrate receiving system 3602 may be positioned closer to a central portion inside the vacuum processing chamber 3310 (i.e., farther from an inner wall of the vacuum processing chamber 3310) than the first substrate receiving system 3601.

As illustrated in FIGS. 112, 113, and 114 lengths of the second supports 3622 of the second substrate receiving system 3602 may be about 500~1200 mm, and the first supports 3621 of the first substrate receiving system 3601 may be 100~500 mm. Preferably, the second supports 3622 of the second substrate receiving system 3602 is about 600 mm, and the first supports 3621 of the first substrate receiving system 3601 is about 400 mm. In general, the second supports 3622 of the second substrate receiving system 3602 may be at least longer than one-third of a long side of the second substrate 3352, and the first supports 3621 of the first substrate receiving system 3601 may be at least longer than one-fifth of the long side of the second substrate 3352. Accordingly, even if reciprocal operation between the first and second substrate receiving systems 3601 and 3602 are carried out simultaneously, reciprocal interference fails to occur. Thus, a transit time of the first and second substrate receiving systems 3601 and 3602 is reduced and overall processing time is reduced.

Figure 115:
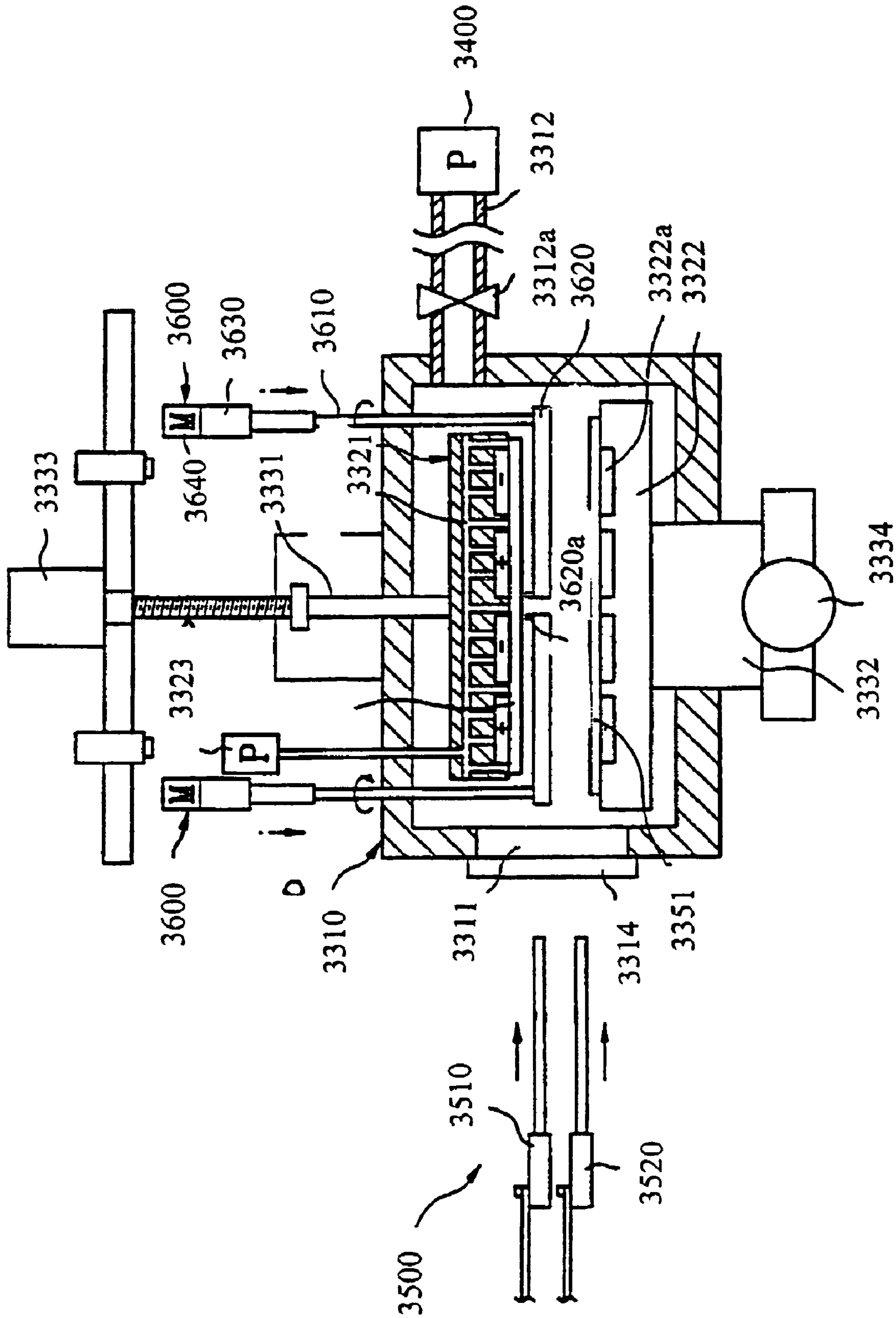

The present invention is not limited to the first and second substrate receiving systems 3601 and 3602 being disposed at the interior bottom portion of the vacuum processing chamber 3310. FIG. 115 is a cross sectional view of another exemplary substrate receiving system according to the present invention, and FIG. 116 is a plan view of another exemplary substrate receiving system according to the present invention.

Figure 116:
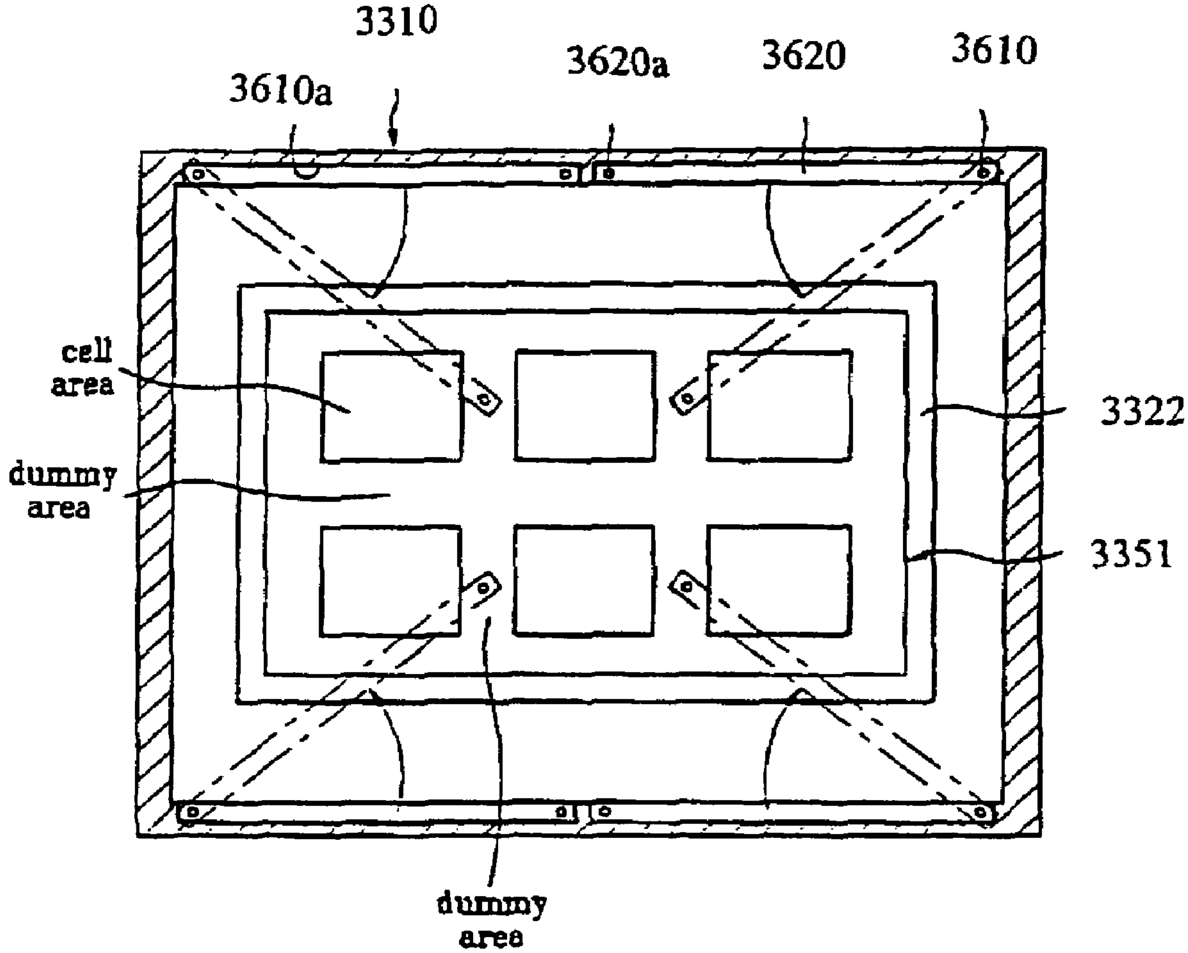

In FIG. 115, an exemplary respective substrate receiving system may be provided at an interior top portion of the vacuum processing chamber 3310 as well as an inner wall of the vacuum processing chamber 3310, as shown in FIG. 116. Accordingly, if the substrate receiving system 3600 according to the present invention is provided at the interior top portion of the vacuum processing chamber 3310, an overall construction (i.e., positions of the rotational axes 3610 and supports 3620 at the interior of the vacuum processing chamber 3310) is similar of exemplary substrate receiving systems of FIGS. 112, 113, and 114. However, locations of the driving parts of the substrate receiving system 3600, locations of the rotational axes 3610 coupled axially with the driving parts, and the downward movements of the rotational axes 3610 are inverted. Moreover, if the substrate receiving system 3600 is provided at the inner wall of the vacuum processing chamber 3310, recesses 3310*a* corresponding to the respective supports may be formed at the interior wall of the vacuum processing chamber 3310. The recesses 3610*a* allow the supports 3620 to be inserted into the interior wall of the vacuum processing chamber 3310, and the rotational axes 3610 penetrate into the interior wall of the vacuum processing chamber 3310 so a to be coupled axially with the driving part provided at an exterior of the vacuum processing chamber 3310.

Figure 117:
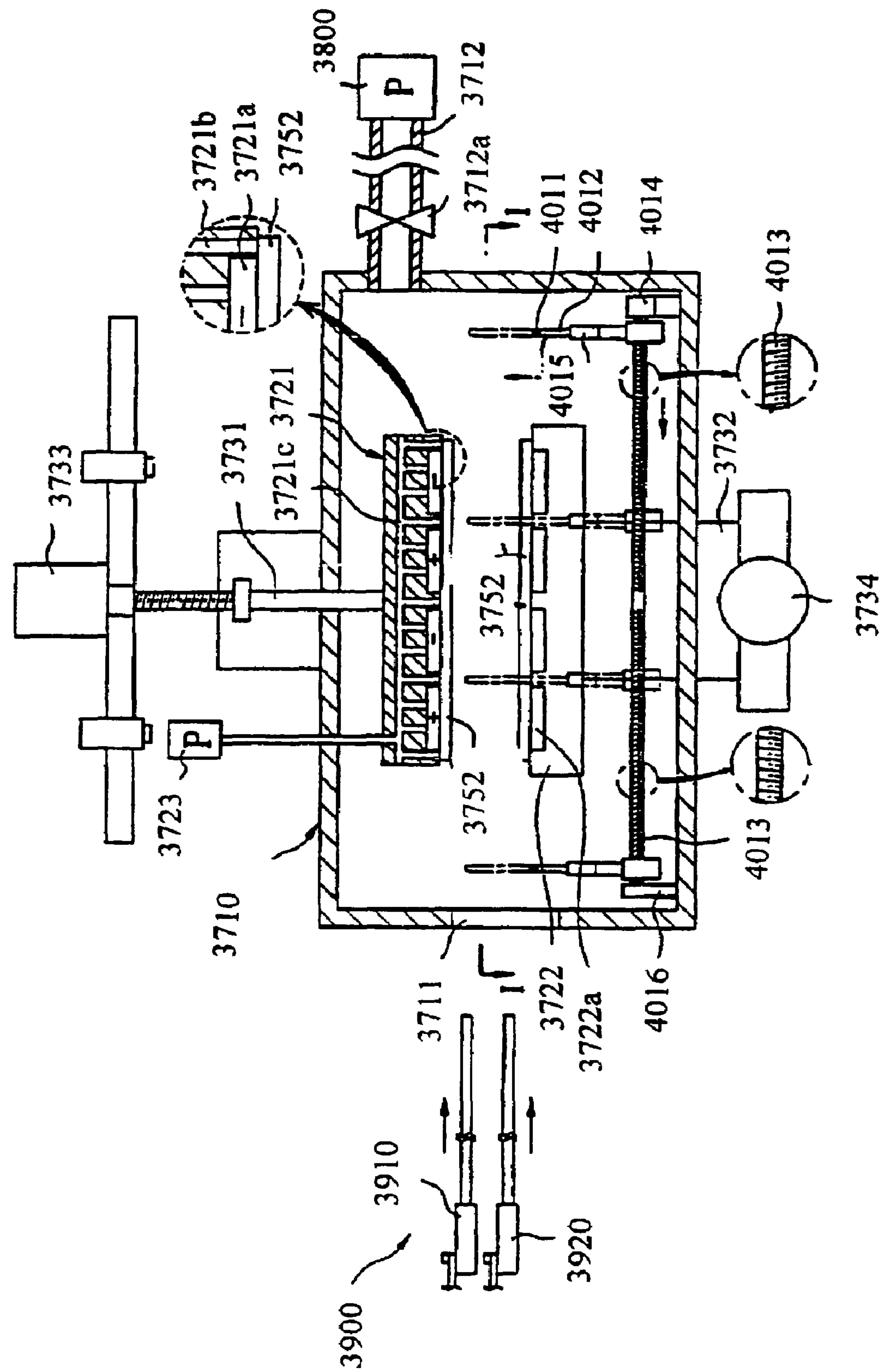
Figure 118:
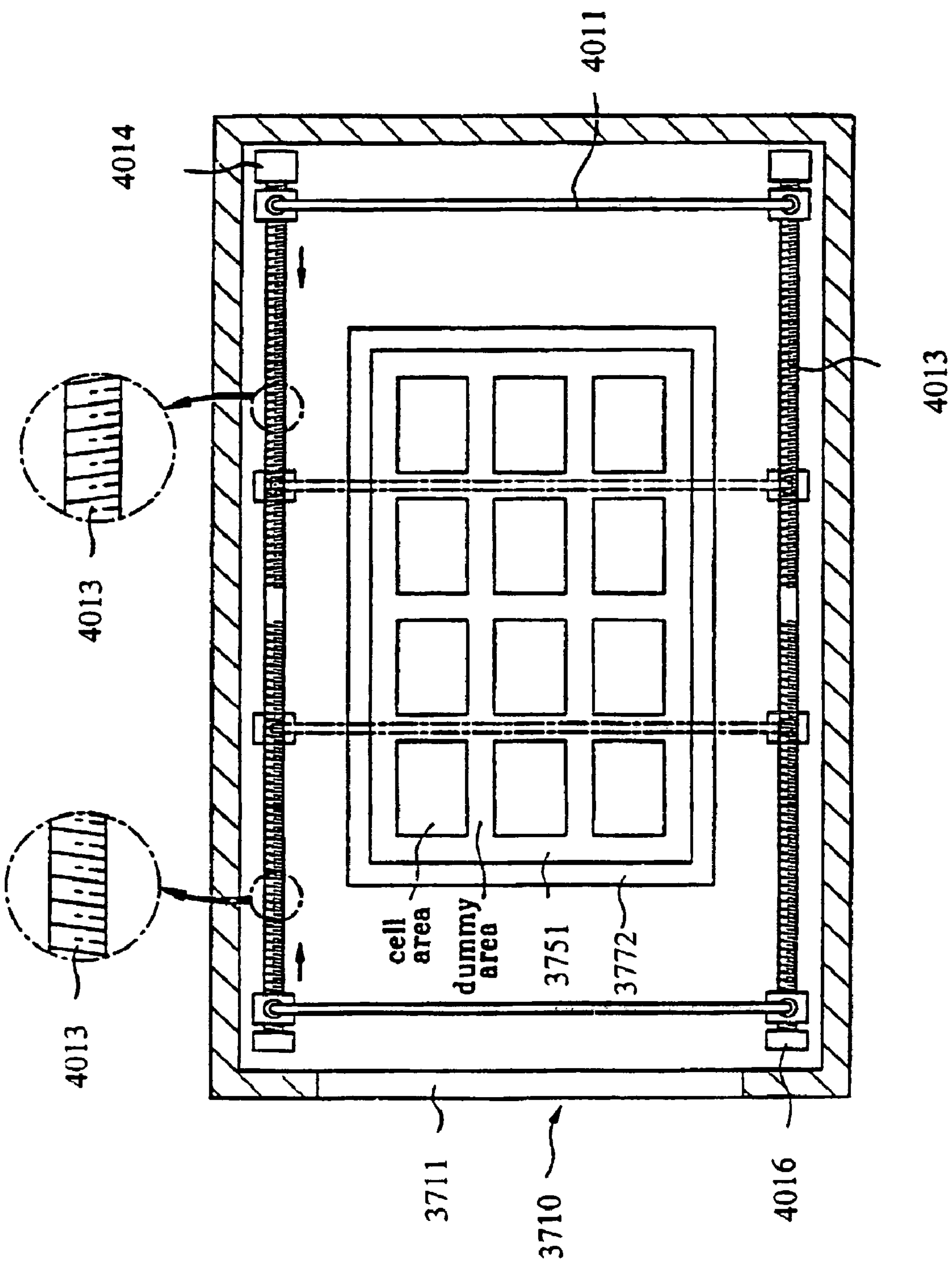
Figure 119:
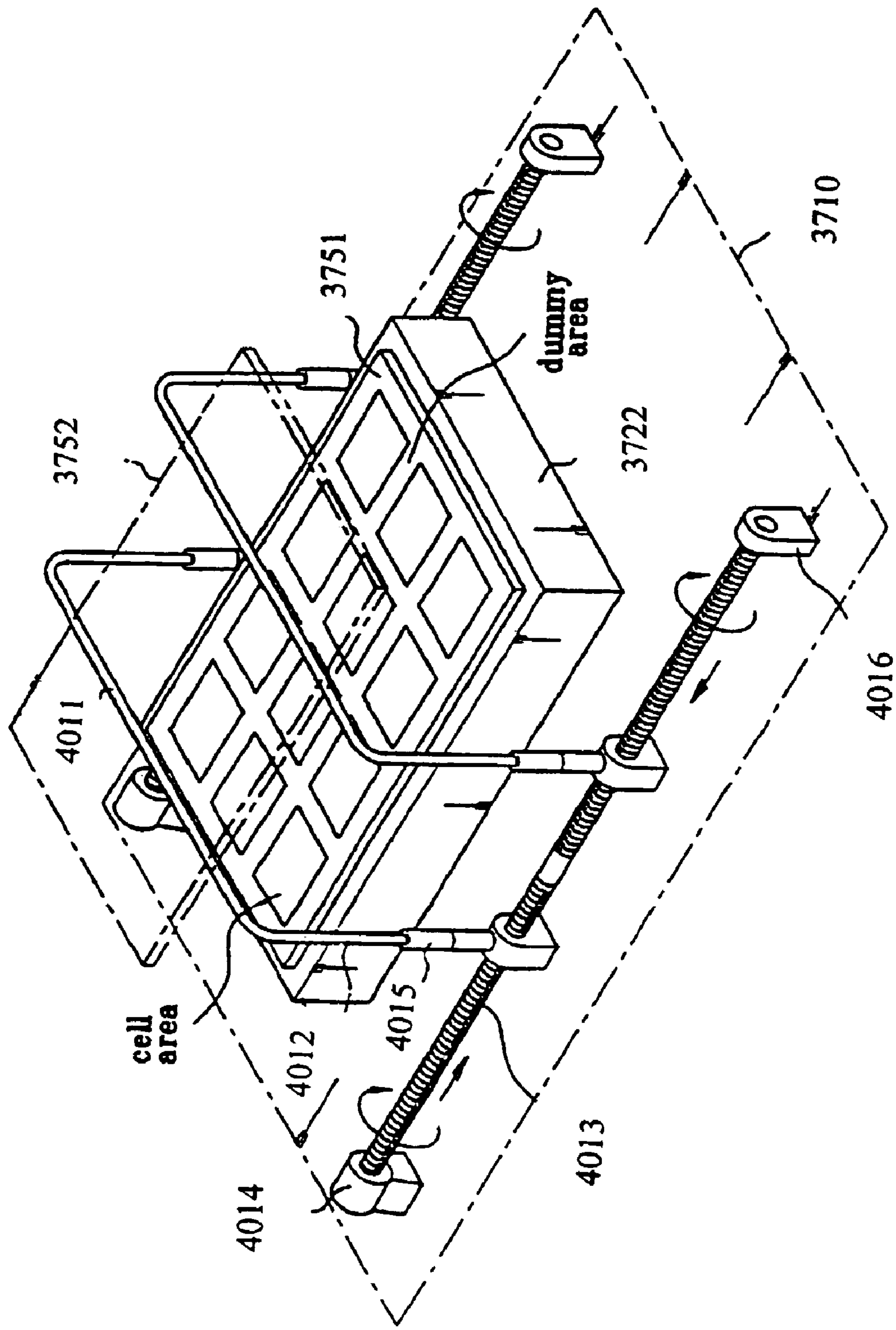

FIGS. 117 to 119 illustrate an exemplary apparatus for a liquid crystal display (LCD) device according to the first embodiment of the present invention. In FIGS. 117 to 119, the apparatus may include a vacuum processing chamber 3710, an upper stage 3721, a lower stage 3722, a stage moving device, a vacuum device 3800, a loader part 3900, and a substrate receiving system.

The vacuum processing chamber 3710 has an interior that may be placed under a vacuum pressure or atmospheric state so that bonding work between substrates may be performed. An air outlet 3712 transfers a vacuum force generated by the vacuum device 3800 the vacuum processing chamber 3710 via a air outlet valve 3712*a*.

The upper and lower stages 3721 and 3722 may be provided at upper and lower spaces inside the vacuum processing chamber 3710, respectively, so as to oppose each other. The upper and lower stages 3721 and 3722 affix first and second substrates 3751 and 3752, which are carried into the vacuum processing chamber 3710, by a vacuum or electrostatic force. The upper and lower stages 3721 and 3722 travel in a vertical direction to bond the first and second substrates 3751 and 3752. Accordingly, a lower surface of the upper stage 3721 may be provided with at least one electrostatic chuck (ESC) 3721*a* to fix the first and second substrates 3751 and 3752 to the upper and lower stages 3721 and 3722, respectively, by a plurality of electrostatic plates.

In addition to the electrostatic chuck 3721*a*, at plurality of vacuum holes 3721*b* may be further provided at the lower surface of the upper stage 3721 to apply a vacuum force to the second substrate 3752, thereby affixing the second substrate 3752 by a vacuum force. The plurality of vacuum holes 3721*b* may be arranged along a circumference of the electrostatic chuck 3721*a*. The plurality of vacuum holes 3721*b* may be connected to each other through at least one or a plurality of pipe lines 3721*c* so as to receive a vacuum force generated by a vacuum pump 3723 that is connected to the upper stage 3721. In addition, at least one electrostatic chuck 3722*a* may also be provided at a upper surface of the lower stage 3722, and at least one vacuum hole (not shown) may be provided along a circumference of the electrostatic chuck 3722*a*.

However, the construction of the electrostatic chuck 3722*a* and the plurality of vacuum holes (not shown) at the upper surface of the lower stage 3722 may not be limited to a configuration of the upper stage 3721. Moreover, the electrostatic chuck 3722*a* and the plurality of vacuum holes (not shown) at the upper surface of the lower stage 3722 may be arranged to consider an overall shape of a target substrate.

The stage moving device includes a upper stage moving axis 3731 connected to the upper stage 3721 to move the upper stage 3721 along a vertical direction, a lower stage rotational axis 3732 connected to the lower stage 3722 to rotate the lower stage 3722 clockwise or counterclockwise, an upper driving motor 3733 axially coupled to the upper stage 3721, and a lower driving motor 3734 axially coupled to the lower stage 3722 at an exterior or interior of the vacuum processing chamber 3710. Accordingly, the stage moving device may not be limited to a configuration that moves the upper stage 3721 along the vertical direction and rotates the lower stage 3722 clockwise or counterclockwise. The stage moving device may enable the upper stage 3721 to rotate clockwise or counterclockwise, and move the lower stage 3722 along the vertical direction. In this case, a subsidiary rotational axis (not shown) may be added to the upper stage 3721 to enable its rotation, and a subsidiary moving axis (not shown) may be added to the lower stage 3722 to enable movement in the vertical direction.

The vacuum device 3800 transfers a vacuum force to enable a vacuum state inside the vacuum processing chamber 3710, and may include a vacuum pump driven to generate a general vacuum force.

The loader part 3900 may be arranged outside of the vacuum processing chamber 3710 separately from various elements provided inside the vacuum processing chamber 3710. The loader part 3900 may include a first arm 3910 and a second arm 3920. The first arm 3910 loads the first substrate 3751 upon which liquid crystal material is dropped, into the vacuum processing chamber 3710. The second arm 3920 loads the second substrate 3752 upon which a sealant is dispensed, into the vacuum processing chamber 3710. Alternatively, the liquid crystal material may be deposited (e.g., dropped, dispensed, etc.) on the first substrate 3751, which may be a TFT array substrate, and the sealant may be deposited on the second substrate 3752, which may be a color filter (C/F) substrate. Moreover, both the liquid crystal material and the sealant may be deposited on the first substrate 3751, which may be a TFT array substrate, and the second substrate 3752, which may be a C/F substrate, may not have either of the liquid crystal material or the sealant deposited thereon. Furthermore, both the liquid crystal material and the sealant may be deposited on the first substrate 3751, which may be a C/F substrate, and the second substrate 3752, which may be a TFT array substrate, may not have either of the liquid crystal material or the sealant deposited thereon. The first substrate 3751 may include one of a TFT array substrate and a C/F substrate, and the second substrate 3752 may include another one of the TFT substrate and the C/F substrate.

If the liquid crystal material and the sealant may be deposited on one of the first and second substrates, the first arm 3910 loads the target substrate while the second arm 3920 loads the other substrate.

During the loading of the first and second substrates 3751 and 3752, the first arm 3910 may be placed over the second arm 3920. Thus, the liquid crystal material is dropped on the first substrate 3751. In other words, if the second arm 3920 is placed over the first arm 3910, various particles generated from the motion of the second arm 3920 may be caused to fall onto the liquid crystal material dropped on the first substrate 3751 mounted on the first arm 3910 so as to cause damage thereupon. Thus, the first arm 3910 is placed over the second arm 3920, thereby avoiding the damage by contamination.

The substrate receiving system may be constructed to receive the second substrate 3752 that is to be affixed to the upper stage 3721 while moving along the loading/unloading direction of the substrate. The substrate receiving system may include a lifting part and a moving part. The lifting part may include a lift-bar 4011 and a support 4012. The lift bar 4011 may be longitudinally formed along a width direction of the second substrate 3752 to support the lower surface of the second substrate 3752 affixed to the upper stage 3721. Alternatively, the lift-bar 4011, as shown in FIG. 120A, may be constructed to support the second substrate 3752 by an area contact with the second substrate 3752. Furthermore, the lift-bar 4011 may have at least one protrusion 4011*a* which is in contact with the lower surface of the second substrate 3752 at a upper surface of the lift-bar 4011 so that the protrusion 4011*a* can support the second substrate 3752 by dot contact with the second substrate 3752. The protrusion 4011*a* may be formed as shown in FIG. 120B or FIG. 120C.

The support 4012 has one end connected to one end of the lift-bar 4011 and the other end connected to the moving part to support the lift-bar 4011. In addition, at least two or more lifting parts may be provided to simultaneously support each part of the second substrate 3752, thereby preventing the second substrate 3752 from drooping. In particular, the lifting part may be constructed to selectively support a dummy area among respective portions of the second substrate 3752, thereby preventing damage due to contact with a cell area from occurring and preventing the second substrate 3752 from bowing or curving.

The moving part may include a screw axis 4013 and a driving motor 4014 to move the lifting part along a horizontal direction. Accordingly, as shown in FIGS. 117 to 119, the screw axis 4013 may be longitudinally provided along the longitudinal side of the lower stage 3722 within the vacuum processing chamber 3710. The driving motor 4014 may be axially fixed into the screw axis 4013. Accordingly, the screw direction of the screw axis 4013 may be formed so that both sides around the center are directed in different directions. That is, one side of the screw axis 4013 is provided with a right-hand screw while the other side of the screw axis 4013 may be provided with a left-hand screw. In addition, the lifting parts may be provided at both sides of the screw axis 4013 so as to move to the center of the screw axis 4013 if the driving motor 4014 is driven. In particular, the screw axis 4013 may be provided at both sides of the longitudinal side of the lower stage 3722. The support 4012 has one end screwed into the screw axis 4013 to move along the screw axis 4013, and the other end of the support 4012 is fixed to both ends of the lift-bar 4011. If two supports 4012 support one lift-bar 4011, drooping of the lift-bar 4011 may be prevented. Thus, in the preferred embodiment of the present invention, one lifting part includes two supports 4012 and one lift-bar 4011.

Furthermore, the driving motor 4014 may be connected with the screw axes 4013, or any one of the screw axes 4013. Accordingly, the screw axis 4013 which is not connected with the driving motor 4014 may not have a screw thread. The lifting part may be arranged to be lower than the upper surface of the upper stage 3722 when it is not driven. Moreover, a driving means 4015 may be further provided, which moves the support 4012 along the vertical direction. Accordingly, either a hydraulic cylinder that can move the support 4012 along the vertical direction using pneumatic pressure or hydraulic pressure, or move the support 4012 using a step motor that can move the support 4012 along the vertical direction using a rotational moving force is used as the driving means 4015. A shape of the support 4012 may depend on the driving means 4015. One end 4016 of the screw axis 4013 may be a fixed part that prevents an opposite side of a side fixed to the driving motor 4014 from drooping and moving.

The substrate bonding process using the aforementioned bonding device for an LCD according to the present invention will now be described. The loader part 3900 controls the first and second arms 3910 and 3920 so that the second substrate 3752 to be loaded to the upper stage 3721 and the first substrate 3751 to be loaded to the lower stage 3722 are respectively fed thereto. Accordingly, the loader part 3900 controls the second arm 3920 so that the second substrate 3752 is carried into the upper stage 3721 in the vacuum processing chamber 3710, through an opened vacuum chamber entrance 3711 of the vacuum processing chamber 3710.

A vacuum pump 3723 may be connected to the upper stage 3721 to transfer a vacuum force to each of the plurality of vacuum holes 3721*b* formed in the upper stage 3721 so that the second substrate 3752 is affixed to the lower surface of the upper stage 3721 by vacuum absorption. The second arm 3920 may unload the bonded substrates. Thereafter, if the second arm 3920 moves out of the vacuum processing chamber 3710, the loader part 3900 controls the first arm 3910 so that the first substrate 3751 may be carried into the lower stage 3722 provided at a lower space in the vacuum processing chamber 3710. Then, a vacuum pump (not shown) connected to the lower stage 3722 may transfer a vacuum force to each of the plurality of vacuum holes (not shown) formed in the lower stage 3722 so that the first substrate 3751 is affixed to the lower stage 3722 by vacuum absorption. Once the first arm 3910 moves out of the vacuum processing chamber 3710, loading of the first and second substrates 3751 and 3752 is completed.

During the process, loading of the second substrate 3752 on which a sealant is dispensed is carried out earlier than loading of the first substrate 3751. This prevents any dust and the like that may be present in the process of loading the second substrate 3752 from falling onto the first substrate 3751 upon which the liquid crystal material is dropped. Once loading of the first and second substrates 3751 and 3752 is completed, an vacuum chamber entrance 3711 of the vacuum processing chamber 3710 is closed so that a closed state is maintained inside the vacuum processing chamber 3710. Afterwards, the vacuum device 3800 is enabled to generate a vacuum pressure within the interior of the vacuum processing chamber 3710. Accordingly, the air outlet valve 3712*a* provided with the air outlet 3712 of the vacuum processing chamber 3710 opens the air outlet 3712 to transfer the vacuum force into the vacuum processing chamber 3710, thereby gradually creating a vacuum pressure inside the vacuum processing chamber 3710.

The driving means 4015 operates to move each support 4012 along an upward direction. At the same time a pair of driving motors 4014 constructing the moving part are driven to rotate a pair of screw axes 4013. Thus, a pair of lifting parts fixed to both ends of each screw axis 4013 move toward the center of each screw axis 4013 to correspond to a direction of each screw axis 4013. In other words, a pair of supports 4012 constructing each lifting part move to the center of the screw axis 4013 by a horizontal moving force due to rotation of the screw axis 4013, thereby moving the lift-bar 4011. Accordingly, once each lifting part moves by a set distance, each driving motor 4014 is not driven, thereby resulting in that the lifting part stops. The position of each lifting part is controlled by controlling driving time or driving degree of each driving motor 4014. Preferably, each lifting part stops below the dummy area of the second substrate 3752.

Once the above process is completed, the operation of the vacuum pump 3723 is disabled, thereby cutting off the vacuum force that affixes the second substrate 3752 to the lower surface of the upper stage 3721. Thus, the second substrate 3752 affixed at the lower surface of the upper stage 3721 drops, and is then placed on an upper surface of each lift-bar 4011. Accordingly, the process of placing the second substrate onto each lift-bar 4011 may be carried out to release the vacuum force after the second substrate 3752 is in contact with each lift-bar 4011 by downwardly moving the upper stage 3721 or by upwardly moving lift-bar 4011. In this case, it may be possible to avoid any damage that may occur due to impact between the second substrate 3752 and each lift-bar 4011 when the second substrate 3752 is dropped.

Afterwards, once the complete vacuum state is achieved in the vacuum processing chamber 3710 by driving the vacuum device 3800 for a certain time period, driving of the vacuum device 3800 stops and at the same time the air outlet valve 3712*a* of the air outlet 3712 operates, so that the air outlet 3712 is maintained in a closed state.

The power is applied to the electrostatic chucks 3721*a* and 3722*a* of the upper and lower stages 3721 and 3722 so that the respective substrates 3751 and 3752 are electrostatically affixed onto the first and second stages 3721 and 3722, respectively. Once the electrostatically affixation is completed, the substrate receiving system returns the respective lift-bars 4011 and the respective supports 4012 to their original position. Afterwards, the stage moving system selectively move the upper and lower stages 3721 and 3722 along the vertical direction so that the first and second substrates 3751 and 3752 electrostatically affixed onto the first and second stages 3721 and 3722 are bonded to each other.

Meanwhile, the driving of the substrate receiving system may not be limited to the aforementioned construction that drives the substrate receiving system in the process of generating the vacuum pressure inside the vacuum processing chamber 3710. That is, the substrate receiving system may be driven before the vacuum pressure is attained inside the vacuum processing chamber 3710 after loading of the first and second substrates 3751 and 3752.

FIGS. 121 and 122 are plan views showing internal structures of exemplary apparatus' having a substrate receiving system according to the present invention. The substrate receiving system according to the second embodiment of the present invention may include two or more pair of screw axes so that three or four lifting parts selectively move, since the number of lifting parts depends on a model or size of the substrate.

In FIG. 121, if there are three lifting parts, a pair of first screw axis 4021 provided nearest to the lower stage 3722 are formed so that the screw directions at both sides around the center are directed in different directions. That is, one side of the first screw axis 4021 is provided with a right-hand screw while the other side of the first screw axis 4021 is provided with a left-hand screw. In addition, a first lifting part 4022 and a second lifting part 4023 may be provided at both ends of the first screw axis 4021 to correspond to each other. A pair of second screw axis 4024 may be provided more outwardly as compared to the first screw axis 4021 are formed in one screw direction. A third lifting part 4025 may be provided at one end of the second screw axis 4024. Accordingly, the first and second screw axes 4021 and 4024 may be axially fixed to corresponding driving motors 4026. Thus, once each driving motor 4026 is driven to rotate the respective screw axes 4021 and 4024, the first lifting part 4022 and the second lifting part 4023 respectively move to the center of the first screw axis 4021 while the third lifting part 4025 moves to the center of the second screw axis 4024, thereby resulting in that the lifting parts stop on preset positions.

In the above construction, the first screw axis 4021 may be formed in one direction, and the second screw axis 4024 may be formed so that both sides around the center are directed in different directions. In this case, the first lifting part 4022 and the second lifting part 4023 may be provided at both ends of the second screw axis 4024 while the third lifting part 4025 may be provided at any one end of the first screw axis 4021.

In FIG. 122, four lifting parts are required depending on a model of the substrate, and the second screw axis 4024 has a similar shape as a shape of the first screw axis 4021 while the third lifting part 4025 and a fourth lifting part 4027 are provided at both ends of the second screw axis 4024. Thus, once each driving motor 4026 is driven to rotate the respective screw axes 4021 and 4024, the first lifting part 4022 and the second lifting part 4023 respectively move to the center of the first screw axis 4021 while the third lifting part 4025 and the fourth lifting part 4027 respectively move to the center of the second screw axis 4024, thereby resulting in that the lifting parts stop on preset positions.

FIGS. 123 and 124 illustrate an exemplary substrate receiving system according to the third embodiment of the present invention. The substrate receiving system according to the third embodiment of the present invention is constructed such that the moving part selectively controls and moves a plurality of lifting parts.

In FIG. 123, the moving part may include a moving system 4032 and operates to move the lifting parts 4033 along the horizontal direction. The moving system 4032 may be directly connected with the moving axis 4031 and the lifting parts 4033 and may be driven to move the lifting part along the moving axis 4031. The lifting parts 4033 may be connected with the moving axis 4031. In particular, a typical guide rail may be used as the moving axis 4031, and a linear motor may be used as the moving system 4032. Accordingly, the moving system 4032 may be connected with a connection portion between the lifting parts 4033 and the moving axis 4031 so that the lifting parts 4033 move along the moving axis 4031. All of the lifting parts 4033 may be positioned at any one end of the moving axis 4031. Alternatively, the lifting parts 4033 may be positioned respectively at both ends of the moving axis 4031.

As described above, if the respective lifting parts 4033 are separately controlled, as shown in FIG. 125 and FIG. 126, three or more lifting parts 4033 may be provided. Thus, the substrate receiving system can receive the second substrate 3752 in a more stable manner. Although not shown, rack, gear, or chain drive mechanisms may be used as the moving axis 4031 and a motor axially fixed to pinion, gear, or sprocket wheel may be used as the moving system 4032. Alternatively, a rail may be used as the moving axis 4031 and a cylinder using hydraulic or pneumatic pressure may be used as the moving system 4032.

Meanwhile, FIGS. 127 to 130 illustrate the substrate receiving system according to the fourth embodiment of the present invention. The substrate receiving system according to the fourth embodiment of the present invention is constructed such that one lift-bar 4042 of the lifting part 4041 may be supported by one support 4043 only. In other words, the lift-bars 4042 may be separated from each other around the center to oppose each other, so that the respective supports 4043 connected to the respective moving axes 4045 are separately controlled. Thus, any operational error due to operational error of the respective moving part may be prevented from occurring.

Figure 127:
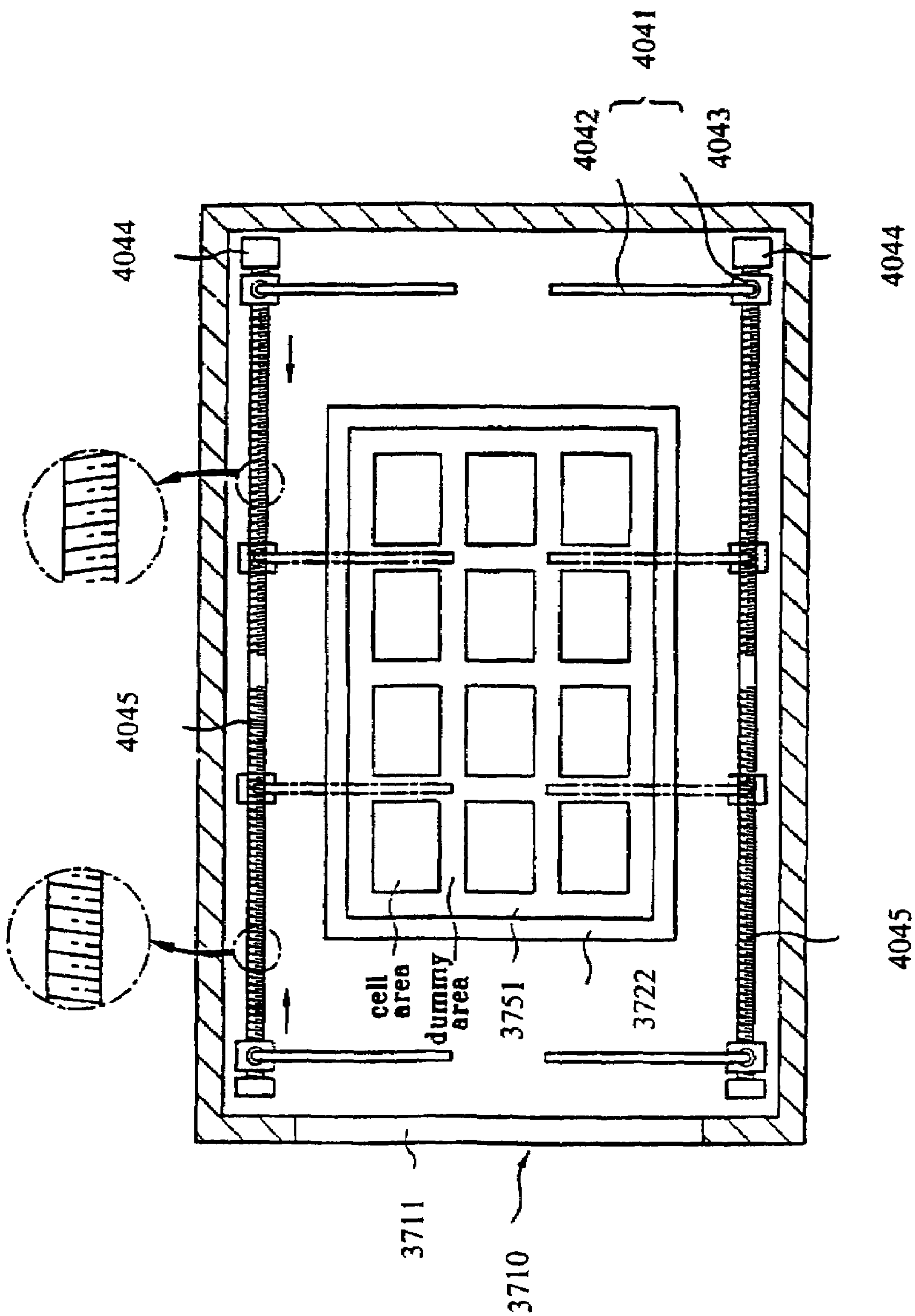
Figure 128:
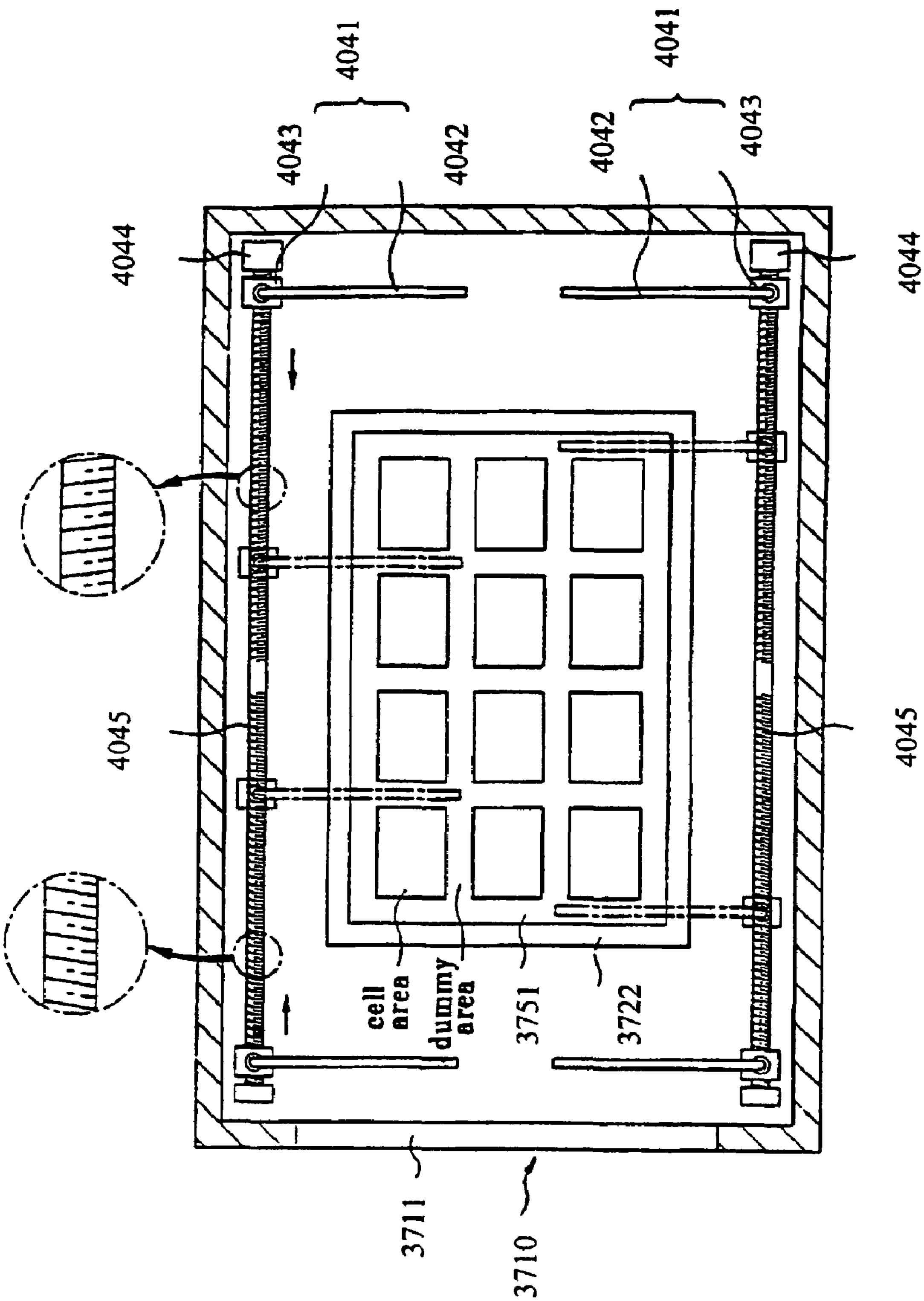
Figure 129:
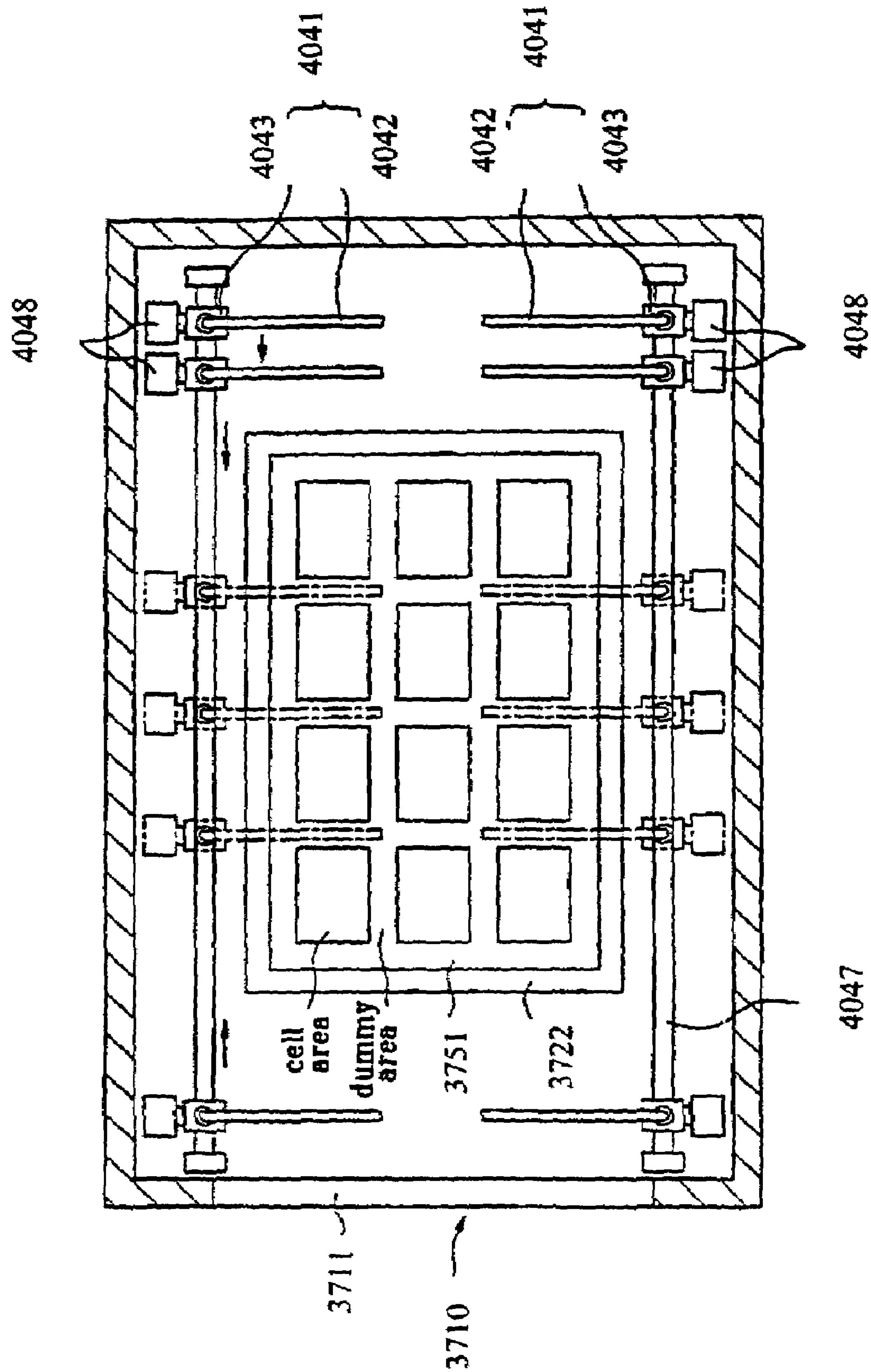

As shown in FIGS. 127 and 128, the moving part may be used as the screw axis 4045 and the driving motor 4044 according to the present invention. Moreover, as shown in FIGS. 129 and 130, the moving part may be used as the moving axis 4047 and the moving system 4048 according to the present invention.

Figure 130:
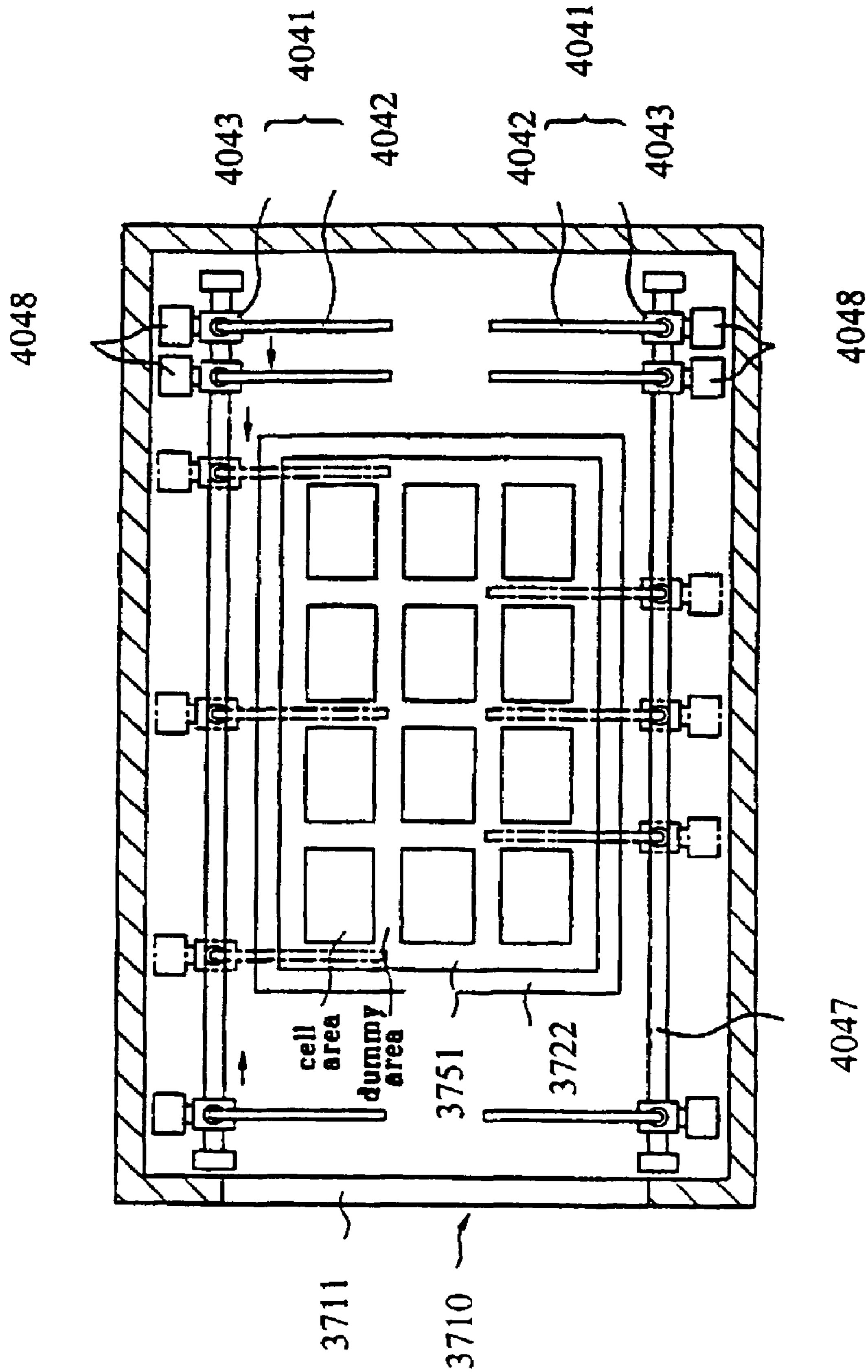

Particularly, as shown in FIGS. 128 and 130, when viewing an inner part of the vacuum processing chamber 3710 from the plane, the respective lift-bars 4042 may be arranged to cross each other so that the substrate receiving system may receive the second substrate 3752 in a more stable manner.

FIGS. 131 and 132 illustrate the substrate receiving system according to the present invention. In this embodiment of the present invention, two substrate receiving system may be formed to oppose each other at a portion adjacent to the lower stage 3722. In FIG. 132, a first substrate receiving system 4051 of the two substrate receiving system may be provided at a portion where the vacuum chamber entrance 3711 is formed in the vacuum processing chamber 3710, and a second substrate receiving system 4052 may be provided at a portion opposite to the first substrate receiving system 4051.

In this embodiment of the present invention, screws of screw axes 4051*a*, 4051*b*, 4052*a*, and 4052*b* may be directed along one direction, and the screw axes 4051*a*, 4051*b*, 4052*a*, and 4052*b* may be controlled by driving motors 4051*c*, 4051*d*, 4052*c*, and 4052*d*, thereby enabling more precise movement. Meanwhile, in the construction of this embodiment, there is no element that can receive the dummy area at the middle part of the second substrate 3752. Therefore, in the sixth embodiment of the present invention, as shown in FIGS. 133 and 134, a rotational substrate receiving system 4053 may be further provided, which receives the middle part of the second substrate 3752 while moving upwardly or rotating clockwise or counterclockwise between the substrate receiving system 4051 and 4052. In this case, the rotational substrate receiving system 4053 may include a support 4053*a*, which is in contact with the second substrate 3752, a connecting axis 4053*b* connected with the support 4053*a*, and a driving means 4053*c* that provides a driving force to move the connecting axis 4053*b* along the vertical direction and rotate the same clockwise or counterclockwise. At least any one of a cylinder using a hydraulic or pneumatic pressure and a motor may be used as the driving means 4053*c*. In other words, when the substrate receiving system 4051 and 4052 move, the rotational substrate receiving system 4053 moves along the vertical direction and rotates clockwise or counterclockwise so that the support 4053*a* is placed below the dummy area at the middle part of the second substrate 3752.

The substrate receiving system according to the present invention may not be limited to the construction that receives the lower surface of the second substrate 3752 in a width direction while moving along a loading/unloading direction of the substrate. For example, as shown in FIG. 135 according to the seventh embodiment of the present invention, the substrate receiving system may be constructed to receive the lower surface of the second substrate 3752, particularly the dummy area of the second substrate 3752, in a length direction while moving in a direction vertical to the loading/unloading direction of the second substrate 3752. Accordingly, a lift-bar 4071 of the substrate receiving system may be longitudinally formed along a length direction of the second substrate 3752, and one or two supports 4072 are formed to support one lift-bar 4071. Moreover, the moving part of the substrate receiving system according to the present invention may not be limited to the construction that is provided at a lower part in the vacuum processing chamber 3710.

For example, as shown in FIG. 136 according to the eighth embodiment of the present invention, the moving part may be provided at an upper part in the vacuum processing chamber 3710. That is, each moving part according to the first to seventh embodiments of the present invention may be provided at an upper part in the vacuum processing chamber.

Figure 137A:
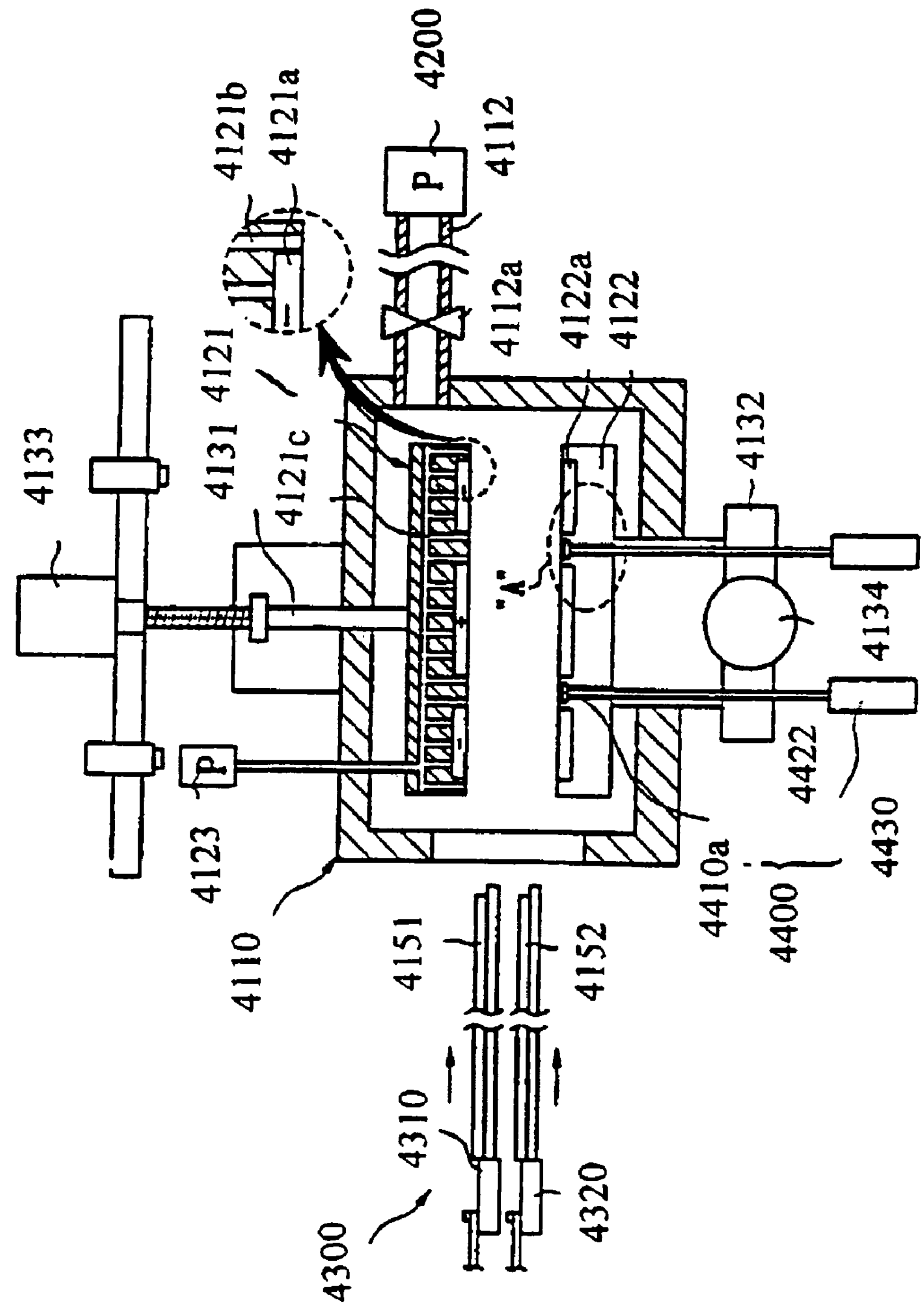
Figure 137B:
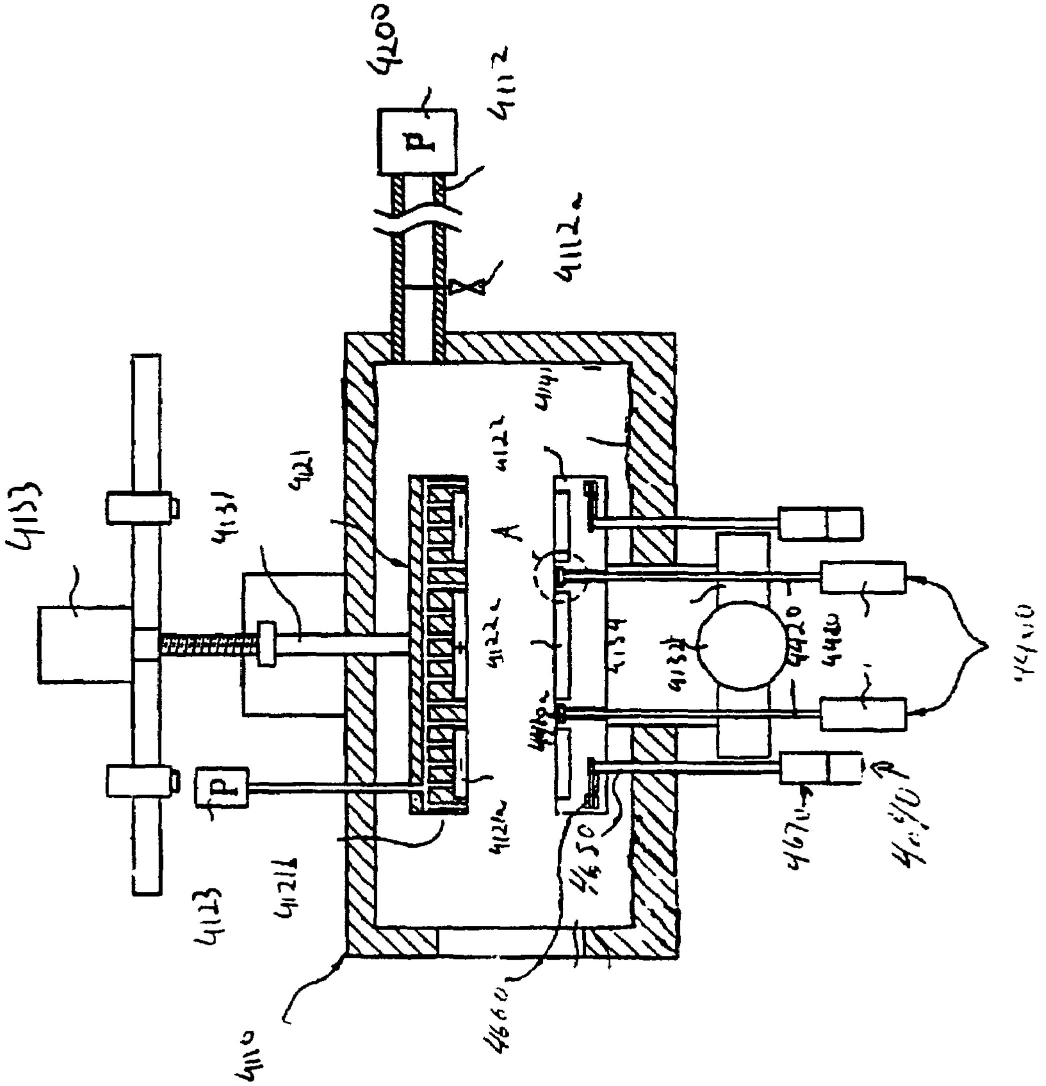

FIGS. 137A and 137B illustrate cross sectional views of an two exemplary apparatuses including a substrate lifting system according to the present invention.

In FIGS. 137A and 137B, the apparatus may include a vacuum processing chamber 4110, an upper stage 4121, a lower stage 4122, an upper stage moving system 4131 and 4133, a lower stage moving system 4132 and 4134, a vacuum device 4200, a loader part 4300, and a first substrate lifting system 4400.

Referring to FIGS. 137A and 137B, the vacuum processing chamber 4110 may include a primary air outlet 4112 transferring a vacuum force to decrease a pressure at an interior of the vacuum processing chamber 4110. The upper and lower stages 4121 and 4122 may be provided at upper and lower spaces at an interior of the vacuum processing chamber 4110, respectively. In addition, the upper and lower stages 4121 and 4122 receive first and second substrates 4151 and 4152, which are loaded into an interior of the vacuum processing chamber 4110 by first and second arms 4310 and 4320 of the loader part 4300. The first and second substrates 4151 and 4152 may be affixed to the lower and upper stages 4122 and 4121, respectively, by an electrostatic force that is generated by the upper and lower stages 4121 and 4122. In addition, the first and second substrates 4151 and 4152 may be affixed to the lower and upper stages 4122 and 4121, respectively, by a vacuum force that is generated the upper and lower stages 4121 and 4122. The first and second substrates 4151 and 4152 are maintained to be affixed to the upper and lower stages 4121 and 4122 during a bonding process. Accordingly, the upper and lower stages 4121 and 4122 enable a selective movement to perform the bonding process between the first and second substrates 4151 and 4152.

A lower surface of the upper stage 4121 may be provided an electrostatic chuck 4121*a* having a plurality of electrostatic plates buried therein for affixing the second substrate 4152 to the upper stage 4121. In addition, the upper stage 4121 may include a plurality of vacuum holes 4121*b* formed along a circumference of the electrostatic chuck 4121*a*. Each of the vacuum holes 4121*b* may be connected to a vacuum pump 4123 by a plurality of pipe lines 4121*c*. The electrostatic chuck 4121*a* may be constructed with at least one pair of the electrostatic plates each having opposite polarities. Alternatively, the electrostatic chuck 4121*a* may be constructed with at least one pair of electrostatic plates each having similar polarities.

An upper surface of the lower stage 4122 may be provided an electrostatic chuck 4122*a* having a plurality of electrostatic plates buried therein for affixing the first substrate 4151 to the lower stage 4122. In addition, the lower stage 4122 may include a plurality of vacuum holes (4122*b* in FIGS. 138 and 139A) formed along a circumference of the electrostatic chuck 4122*a*. Like the upper stage 4121, each of the plurality of vacuum holes (4122*b* in FIGS. 138 and 139A) may be connected to a vacuum pump (not shown) by a plurality of pipe lines 4121*c*. The electrostatic chuck 4122*a* may be constructed with at least one pair of the electrostatic plates each having opposite polarities. Alternatively, the electrostatic chuck 4122*a* may be constructed with at least one pair of electrostatic plates each having similar polarities.

Alternatively, an arrangement of the electrostatic chuck 4122*a* and the plurality of vacuum holes (4122*b* in FIGS. 138 and 139A) formed at the upper surface of the lower stage 4122 may not be limited to the arrangement of the electrostatic chuck 4121*a* and the plurality of vacuum holes 4121*b* formed at the lower surface of the upper stage 121. The electrostatic chuck 4122*a* and the plurality of vacuum holes (4122*b* in FIGS. 138 and 139A) arranged at the upper surface of the lower stage 4122 may be changed to accommodate a geometry of a target substrate and corresponding liquid crystal dispensing areas. However, the plurality of vacuum holes (4122*b* in FIGS. 138 and 139A) formed at the upper surface of the lower stage 4122 may not be necessary.

FIG. 138 shows a schematic layout of a lower stage of an exemplary substrate lifting system according to the present invention. In FIG. 138, at least one a first receiving part 4122*d* may be formed at a first portion of the upper surface of the lower stage 4122 that corresponds to a dummy area of a first substrate (not shown) that may be placed on the upper surface of the lower stage 4122. The location of the first receiving part 4122*d* may be positioned at other portions of the upper surface of the lower stage 4122 to prevent displacement of the first substrate (not shown). For example, the first receiving part 4122*d* may be formed at a portion corresponding to a bottom region of the dummy area located between adjacent cell areas formed on an upper surface of the first substrate. Alternatively, the first receiving part 4122*d* may have a geometry corresponding to a recess or a penetrating hole formed through the lower stage 4122. In addition, the first receiving part 4122*d* may be constructed as a recessed slot having a penetrating hole formed only at specific portions of the recessed slot.

In FIGS. 137A and 137B, the upper stage moving system may include an upper driving motor 4133 axially coupled with the upper stage 4121 by a moving axis 4131. The lower stage moving system may include a lower driving motor 4134 axially coupled with the lower stage 4122 by a rotational axis 4132. The upper and lower driving motors 4133 and 4134 may be arranged at an exterior or an interior of the vacuum processing chamber 4110.

The loader part 4300 may be arranged as a separate system from the vacuum processing chamber 4110. The loader part 4300 may include a first arm 4310 to convey a first substrate 4151 upon which a liquid crystal material is dropped, and a second arm 4320 to convey a second substrate 4152 upon which a sealant is dispensed. Alternatively, although the liquid crystal material may be deposited (i.e., dropped, dispensed) on the first substrate 4151, which may be a TFT array substrate, and the sealant may be deposited on the second substrate 4152, which may be a color filter (C/F) substrate. Moreover, both the liquid crystal material and the sealant may be deposited on the first substrate 4151, which may be a TFT array substrate, and the second substrate 4152, which may be a C/F substrate, may not have either of the liquid crystal material or the sealant deposited thereon. Furthermore, both the liquid crystal material and the sealant may be deposited on the first substrate 4151, which may be a C/F substrate, and the second substrate 4152, which may be a TFT array substrate, may not have either of the liquid crystal material or the sealant deposited thereon. The first substrate 4151 may include one of a TFT array substrate and a C/F substrate, and the second substrate 4152 may include another one of the TFT substrate and the C/F substrate.

In FIG. 138, the first substrate lifting system 4400 may be arranged at the interior of the vacuum processing chamber 4110. Alternatively, first substrate lifting system 4400 may be arranged at both the exterior and interior of the vacuum processing chamber 4110. The first substrate lifting system 4400 may include first support parts 4410*a* and second support parts 4410*b* supporting the first substrate 4151, a first elevating axis 4420 connected to the first support part 4410*a* and extending through the first receiving part 4122*d* from the lower stage 4122, and a first driving part 4430 to drive the first and second support parts 4410*a* and 4410*b* via the first elevating axis 4420. The first support parts 4410*a* may be arranged along a first direction parallel to a loading direction of the first substrate 4151, and second support parts 4410*b* arranged along a second direction perpendicular to the loading direction of the first substrate 4151.

An arrangement of the first substrate lifting system 4400 may be dependent upon a configuration of the lower stage 4122, which is also dependent upon the configuration of the first substrate 4151. For example, in FIG. 138, the lower stage 4122 supports the first substrate 4151 that has a 3×3 matrix array of individual regions. Accordingly, the first support parts 4410*a* are arranged to contact each of the dummy areas of the first substrate 4151 along the loading direction, and the second support parts 4410*b* are arranged to contact each of the dummy areas of the first substrate 4151 along a direction perpendicular to the loading direction, thereby forming a pattern such as a "#".

Alternatively, a first set of the first support parts 4410*a* may be provided to extend along the loading direction to support the first substrate 4151. For example, a first set of two first support parts 4410*a* may contact the first substrate 4151 along each of the two dummy areas of the first substrate 4151 that extend along the loading direction, thereby forming a pattern of "=". Moreover, a second set of second support parts 4410*b* may be provided to extend along the second direction, which is perpendicular to the loading direction of the first substrate 4151, to support the first substrate 4151. For example, a second set of two second support parts 4410*b* may contact the first substrate 4151 along each of the two dummy areas of the first substrate 4451 that extend along the second direction, thereby forming a pattern of "||".

The arrangement of the first substrate lifting system 4400 may include a single first support part 4410*a* contacting a single dummy region of the first substrate 4151 that extends along the loading direction, and a single second support part 4410*b* contacting a single dummy region of the first substrate 4151 that extends along the second direction, thereby forming a pattern such as +.

The arrangement of the first substrate lifting system 4400 may include a first set of three first support parts 4410*a* contacting three dummy regions of the first substrate 4451 that extends along the loading direction, thereby forming a pattern of "≡". Alternatively, the arrangement of the first substrate lifting system 4400 may include a second set of second support parts 4410*b* contacting three dummy regions of the first substrate 4151 that extends along the second direction, thereby forming a pattern such as "|||". Moreover, the arrangement of the first substrate lifting system 4400 may include a combination of the first set of first support parts 4410*a* and the second set of second support parts 4410*b*.

The first substrate 4151 may have a configuration in which a single individual region is provided. Accordingly, the arrangement of the first substrate lifting system 4400 may include a first set of two first support parts 4410*a* contacting dummy regions of an outermost perimeter of the first substrate 4151 that extends along the loading direction, and second set of two second support parts 4410*b* contacting dummy regions of an outermost perimeter of the first substrate 4151 that extends along the second direction, thereby forming a pattern of "□".

The first and second support parts 4410*a* and 4410*b* may include a plurality of protrusions (not shown) that may be formed on upper portions of the first and second support parts 4410*a* and 4410*b* to minimize a contact area between the first substrate 4151 and the first and second support parts 4410*a* and 4410*b*. The plurality of protrusions (or the first and second supports 4410*a* and 4410*b*) may include Teflon™ or PEEK, for example, to prevent damage to surface portions of the first substrate 4151 that contact the plurality of protrusions, and electrically conductive materials to dissipate any static electricity generated on the first substrate 4151.

In FIG. 138, a distance between the first support parts 4410*a* that are arranged along the loading direction of the first substrate 4151 is determined to not interfere with a moving path of finger portions of the first arm 4310. For example, the first arm 4310 is formed to have three finger portions 4311 mutually separated by an interval S. Accordingly, each of the first support parts 4410*a* are separated by the interval S, thereby preventing interference with motion of the first arm 4310.

FIG. 139B shows an exemplary substrate lifting system according to the present invention. In FIG. 139B, central portions of the second support parts 4410*b* that are provided along the second direction are offset along a downward direction to prevent the interference with the finger portions 4311 of the first arm 4310. In addition, side portions of the second support parts 4410*b* that contact the first elevating axis 4420 are formed having a length so as to not contact outermost finger portions 4311 of the first arm 4310.

FIG. 140 is a perspective view of an exemplary substrate lifting system according to the present invention. In FIG. 140, at least two of the first elevating axis 4420 axially coupled with the first substrate lifting system 4400 and the first driving part 4430 may be provided at each of the first and second support parts 4410*a* and 4410*b*. For example, each of the first elevating axis 4420 may be connected to corresponding first driving parts 4430 that are provided at a crossing portion between the first and second support parts 4410*a* and 4410*b*. Alternatively, a single first driving part 4430 may be used to drive the first and second support parts 4410*a* and 4410*b*. Moreover, instead of using the plurality of protrusions (not shown), faces of the first and second support parts 4410*a* and 4410*b* that contact the surface portions of the first substrate 4151 may be coated with materials such as Teflon™ or PEEK, for example, to prevent damage caused by the contact between the first and second support parts 4410*a* and 4410*b* and the first substrate 4151, and electrically conductive materials to dissipate any static electricity generated on the first substrate 4151. The first and second support parts 4410*a* and 4410*b* may have various cross sectional geometries including square, round, and polygonal, for example. Furthermore, the first and second support parts 4410*a* and 4410*b* may be of a solid material or of a hollow material.

In FIG. 137A, the first driving part 4430 of the first substrate lifting system 4400 may include at least a step motor and a cylinder. The step motor may move the cylinder vertically along the direction of the first elevating axis 4420 using a pneumatic or hydraulic system. The first driving part 4430 may be fixed to a lower space at the interior of the vacuum processing chamber 4110, the first driving part 4430 may penetrate a bottom of the vacuum processing chamber 4110 to be fixed at a location at the exterior of the vacuum processing chamber 4110. Thus, interference between the various driving parts may be avoided, and may provide easy installation of each of the driving parts.

A process of loading/unloading substrates using the apparatus according to the present invention is explained schematically with respect to FIGS. 137A, 137B, 141A, and 141B.

Then, the loader part 4300 controls the second arm 4320 to load the second substrate 4152, which may include the sealant, onto the lower surface of the upper stage 4121, and controls the first arm 4310 to load the first substrate 4151, which has at least the liquid crystal material, onto the upper surface of the lower stage 4122.

A substrate loading process includes applying a vacuum force to the plurality of vacuum holes 4121*b* of the upper stage 4121. During the substrate loading process, the vacuum pump 4123, which is connected to the upper stage

4121, produces the vacuum force to the upper stage 4121, thereby transferring the second substrate 4152 from the second arm 4320 and affixing the second substrate 4152 to the lower surface of the upper stage 4121. The loader part 4300 controls the first arm 4310 so that the first substrate 4151 upon which the liquid crystal material is dropped is loaded onto the upper surface of the lower stage 4122.

In FIG. 141A, after the substrate loading process, a substrate elevating process includes enabling the first substrate system 4400 to move the first elevating axes 4420 along an upward direction. The first and second support parts 4410*a* and 4410*b* that are connected to the first elevating axes 4420 begin to travel in the upward direction from the first receiving part 4122*d* formed at the upper surface of the lower stage 4122, as shown in FIG. 142. Accordingly, the first and second support parts 4410*a* and 4410*b* contact a bottom surface of the first substrate 4151 positioned on the first arm 4310. The first elevating axes 4420 together with the first and second support parts 4410*a* and 4410*b* continue to travel in the upward direction until the first substrate 4151 is removed from the first arm 4310. Then, the first elevating axes 4420 stops the upward direction travel after elevation of a predetermined height.

When the first substrate 4151 contacts the upper surfaces of the first and second support parts 4410*a* and 4410*b*, a weight of the first substrate 4151 may be distributed and internal stress of the first substrate 4151 may be alleviated. Thus, the first substrate 4151 is fully supported and any displacement or droop of the first substrate 4151 is avoided. Accordingly, the contacts between the first substrate 4151 and the upper surfaces of the first and second support parts 4410*a* and 4410*b* may include one of face contacts, line contacts, and point contacts. Alternatively, the contacts between the first substrate 4151 and the upper surfaces of the first and second support parts 4410*a* and 4410*b* may include a combination of face contacts, line contacts, and point contacts.

The first and second support parts 4410*a* and 4410*b* may be coated with a material such Teflon™ or PEEK, for example, to prevent damage to the bottom surface of the first substrate 4151 and an electrically conducting material to discharge any static electricity generated on the first substrate 4151.

In FIG. 141B, after the substrate elevating process, an extraction process includes extracting the first arm 4310 out of the vacuum processing chamber 4110 by control of the loader part 4300, and a withdrawal process includes enabling the first driving parts 4430 to withdrawal the first elevating axes 4420 in a downward direction to be placed into the first receiving part 4122*d* of the lower stage 4122. Accordingly, the bottom surface of the first substrate 4151 contact the upper surface of the lower stage 4122.

After the extraction process and the withdrawal process, a substrate transfer process includes enabling the vacuum pump (not shown) that is connected to the lower stage 4122 to transfer a vacuum force to the plurality of vacuum holes (4122*b* in FIG. 142). Accordingly, the bottom surface of the first substrate 4151 is affixed to the upper surface of the lower stage 4122 by the vacuum force generated by the vacuum pump 4123. Alternatively, the substrate transfer process may include applying a potential to the electrostatic plates of the electrostatic chuck 4122*a* of the lower stage 4122, thereby affixing the bottom surface of the first substrate 4151 to the upper surface of the lower stage 4122.

After the substrate transfer process, a vacuum processing chamber process includes enabling the vacuum device 4200 to reduce a pressure of the interior of the vacuum processing chamber 4110. Then, once a desired vacuum pressure is attained, a bonding process of the first and second substrates 4151 and 4152 is performed by enabling the upper drive motor 4133 to move the upper stage 4121 in the downward direction, or by enabling the lower drive motor 4134 to move the lower stage 4122 in the upward direction. Alternatively, both the upper and lower drive motors 4133 and 4134 may be enabled, thereby moving the upper and lower stages 4121 and 4122 in the downward and upward direction, respectively.

Alternatively, an alignment process may be performed prior to the bonding process. The alignment process may include a certification procedure that the upper and lower substrates 4151 and 4152 are aligned with each other, and may include optical and computer systems. If the first and second substrate 4151 and 4152 are not certified as being aligned, adjustment systems may be enabled to move the upper stage 4121 along an X-Y plane, and rotate the rotational axis 4132 of the lower stage 4122. Alternatively, both the upper and lower stages 4121 and 4122 may be moved along an X-Y plane in addition to the rotation of the lower stage 4122.

Once the first and second substrates 4151 and 4152 have been bonded, a detachment process and an unloading process may be performed, wherein one of the first arm 4310 and the second arm 4320, may unload the bonded first and second substrates 4151 and 4152 now residing upon the upper surface of the lower stage 4122.

The detaching process includes removing the vacuum force from the plurality of vacuum holes (4122*b* in FIG. 142), or removing the potential from the electrostatic plates of the electrostatic chuck 4122*a*. The lower stage unloading process may include driving the first substrate lifting system 4400 using the driving parts 4430 to move the first elevating axes 4420 and the first and second support parts 4410*a* and 4410*b* in the upward direction. Accordingly, the bonded substrates are removed from the upper surface of the lower stage 4122, and the driving parts 4430 continue to move the first elevating axes 4420 and the first and second support parts 4410*a* and 4410*b* until the bonded substrates are elevated above the upper surface of the lower stage 4122 by a predetermined amount. As previously described, the driving parts 4430 may be replaced by a single driving part (not shown).

Once the detaching and lower stage unloading processes have been completed, a bonded substrate unloading process includes the loader part 4300 controlling one of the first arm 4310 and the second arm 4320 to place the second substrate 4152 into the interior of the vacuum processing chamber 4110. Then, a loading position of the second arm 4320 is arranged under the bonded substrates that have been previously moved along the upward direction by the first substrate lifting system 4400. Accordingly, the first driving parts 4430 of the first substrate lifting system 4400 are driven to move the first elevation axes 4420 and the first and second support parts 4410*a* and 4410*b* along a downward direction. Thus, the bonded substrates that were placed on the first and second support parts 4410*a* and 4410*b* are now placed on the second arm 4320, and the first and second support parts 4410*a* and 4410*b* continue to move along the downward direction to be received into the first receiving part 4122*d* of the lower stage 4122.

Once the bonded substrates unloading process has been completed, a bonded substrates extraction process includes the second arm 4320 being withdrawn from the interior of the vacuum processing chamber 4110 by control of the loader part 4300. After completion of the bonded substrates unloading process, the loading process of the first substrate 4151 by the first arm 4310 and first substrate lifting system 4400 may begin, as described above.

FIG. 143 shows a perspective view of an exemplary substrate lifting system according to the present invention. In FIG. 143, at least one a second receiving part 4122*e* may be formed at opposing edge portions along an upper circumference of the lower stage 4122 in a direction perpendicular to the loading/unloading direction of the first substrate 4151. The second receiving parts 4122*e* may be formed of a concave recess or a penetrating form. In addition, a second substrate lifting system 4600 may be received by the second receiving parts 4122*e* to support circumferential edge portions of the first substrate 4151 during the substrate loading process or support circumferential edge portions of the bonded substrates during the bonded substrates unloading process. Accordingly, the displacement or droop of the first substrate or bonded substrate is further prevented.

The second substrate lifting system 4600 may be received inside the second receiving part 4122*e* while being positioned initially at both sides of the lower stage 4122. In addition, the second substrate lifting system may include at least second support part 4610 that supports a corresponding bottom edge portion of the first substrate 4151, a second elevating axis 4620 built into one body of the second support part 4610 to move the second support part 4610 along the vertical direction, and a second driving part 4630 connected to the second elevating axis 4620 to move the second elevating axis 4620 along the vertical direction. Accordingly, the second receiving part 4122*e* may be formed to have a predetermined length along a portion corresponding to the dummy area of the first substrate 4151 when placed along the corresponding circumferential upper edge portions of the lower stage 4122. Furthermore, the second support part 4610 may be formed to have a length corresponding to a shape of the second receiving part 4122*e* to support a circumference of the first substrate 4151. Specifically, the second support part 4610 may be formed having a bent shape along a first face to provide support to the bottom of the first substrate 4151 and a second face supporting a side of the first substrate 4151. In addition, a previously described above, a face contacting the first substrate 4151 may be coated with a coating material to prevent the substrate damage caused by the contact between the second support part 4610 and the first substrate 4151. The coating material may be the same as the first and second support parts 4410*a* and 4410*b*, Teflon□ or PEEK□, for example, and an electrically conductive material to discharge any static electricity generated on the first substrate 4151.

The second elevating axis 4620 and second driving part 4630 may be formed to have the first elevating axis 4420 and the first driving part 4430. Moreover, the second support part 4610 may include a single body formed to engage an entire circumference of the lower stage 4122. The plurality of the second support parts 4610 may be provided and separated from each by a predetermined interval, wherein the interval is sufficient to prevent the first substrate from exceeding a minimum displacement or droop limit. Accordingly, ends of the second support parts 4610 may include a single body with at least one second elevating axis 4620 and second driving part 4630 being are provided at the ends of the second support parts 4610, thereby enabling a smooth operation of the respective second support parts 4610.

An operational sequence of the second substrate lifting system 4600 will now be explained with respect to the first substrate lifting system 4400. The second driving part 4630 of the second substrate lifting system 4600 operates simultaneously in connection with the operation of the first driving part 4430 of the first substrate lifting system 4400, thereby moving the second elevating axis 4620 and second support part 4610 along the vertical direction. The simultaneous operation of the second driving part 4630 and the first driving part 4430 enables support of the circumferential portions of the first substrate 4151, as well as the bonded substrates when the first substrate 4151 and the bonded substrates are loaded and unloaded, respectively.

An exemplary method of loading the first substrate 4151 by the simultaneous operation of the first and second substrate lifting systems 4400 and 4600 are described as follows. First, the first lifting system 4400 is enabled to carry out the loading process of the first substrate 4151, much like the above described process. Sequentially, the upward movement of the first substrate lifting system 4400 is performed, the first substrate 4151 to be loaded onto the upper surface of the lower stage 4122 is placed on the first substrate lifting system 4400, and the first substrate lifting system 4400 moves downward to place the first substrate 4151 on the upper surface of the lower stage 4122.

Second, the first and second substrate lifting system 4400 and 4600 are simultaneously moved in the upward direction, the first substrate 4151 to be loaded onto the upper surface of the lower stage 4122 is placed on the first and second substrate lifting systems 4400 and 4600, and the downward movements of the first and second substrate lifting systems 4400 and 4600 are simultaneously moved in the downward direction to place the first substrate 4151 on the upper surface of the lower stage 4122. The process of loading the first substrate 4151 may be performed while the central and circumferential portions of the first substrate 4151 are simultaneously supported, thereby preventing the displacement or droop of the first substrate 4151.

Third, the second substrate lifting system 4600 is moved along the upward direction, the first substrate 4151 to be loaded onto the upper surface of the lower stage 4122 is placed on the second substrate lifting system 4600, the first substrate lifting system 4400 continues moving along the upward direction to support the first substrate 4151 on the second substrate lifting system 4600, and the downward direction movement of the first and second substrate lifting system 4400 and 4600 are preformed to place the first substrate 4151 on the upper surface of the lower stage 4122. Accordingly, after supporting the first substrate 4151 by the second substrate lifting system 4600 and before the unloading process of the first arm 4310, the first substrate lifting system 4400 moves along the upward direction to support the first substrate 4151 together with the second lifting system 4600. In addition, after the first substrate 4151 is unloaded by the first arm 4310 and supported by the second substrate lifting system 4600, the first substrate support system 4400 moves along the upward direction to support the first substrate 4151 together with the second substrate lifting system 4600. The process prevents interference between the first and second support parts 4410*a* and 4410*b* and the first arm 4310 during the loading process of the first substrate 4151, as well as avoiding the bending portions of the first support parts 4410*a* and 4410*b*.

Fourth, movement along the upward direction of the first substrate lifting system 4400 is performed, the first substrate 4151 to be loaded onto the upper surface of the lower stage 4122 is placed on the first and second substrate lifting systems 4400 and 4600 moves along the upward direction to support the first substrate 4151 together with the first substrate lifting system 4400, the first and second substrate lifting system 4400 and 4600 are simultaneously moved along the downward direction to place the first substrate 4151 onto the upper surface of the lower stage 4122.

The above process of loading the first substrate 4151 using the first and second substrate lifting system 4400 and 4600 according to the present invention may not be limited to the above-mentioned description, but can be achieved various methods as well. Accordingly, the substrate lifting system of the apparatus according to the present invention has the following advantages and effects.

Referring now to FIG. 137B, the apparatus may further include an auxiliary process means 4640 for securing bonded first and second substrates when the vacuum within the vacuum chamber 4110 is released or for holding the second substrate 4152 to the upper stage 4121 when a vacuum within the vacuum chamber is higher than a vacuum formed within the upper stage.

Figure 137C:
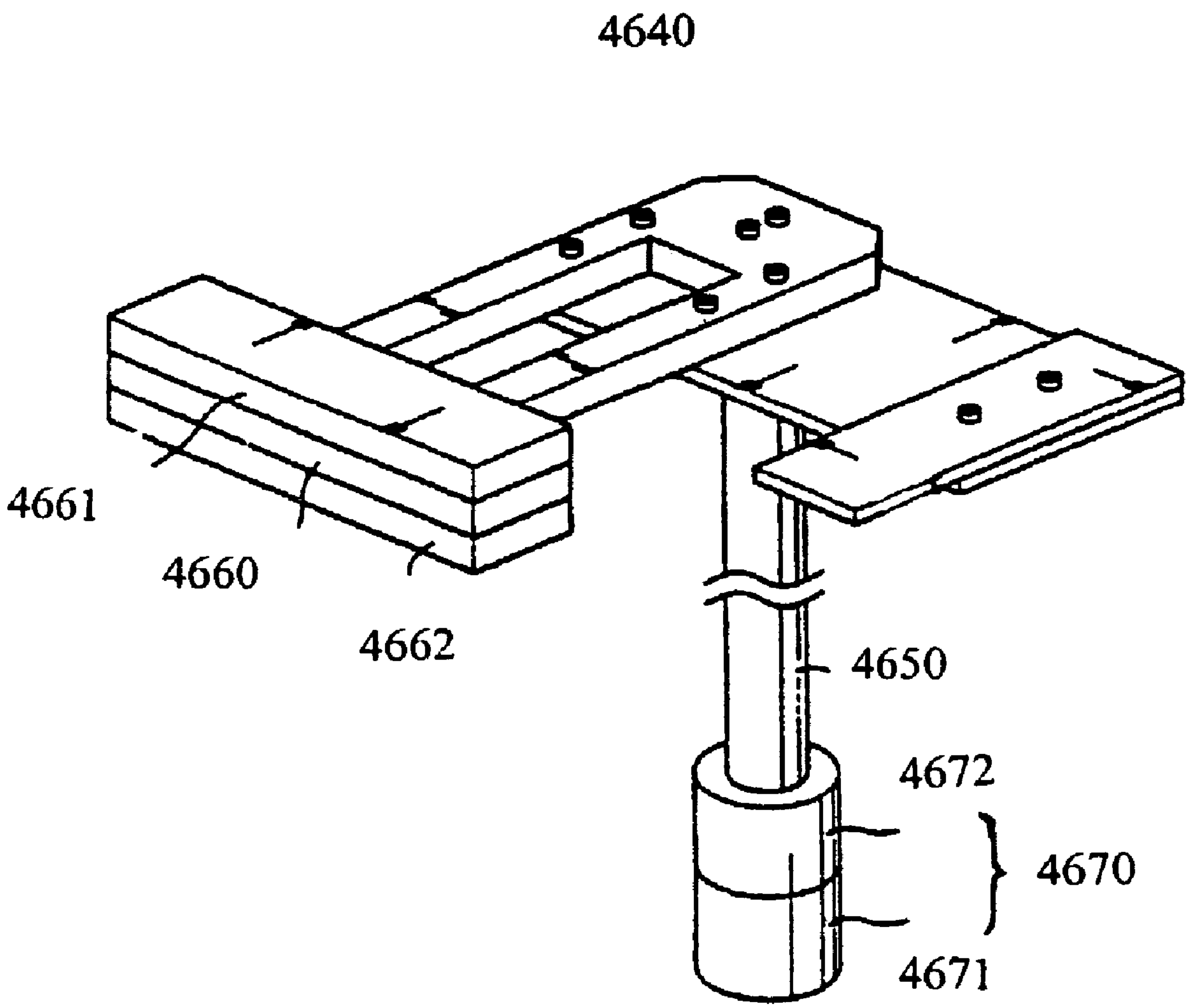

Referring now to FIG. 137C, the auxiliary process means 4640 may include a rotational axis 4650, a support portion 4660, and a driving part 4670. The rotational axis 4650 may be placed at a position allowing the support portion 4660 to be raised and rotated within the vacuum chamber 4110 and to be selectively rotated by the driving part 4670 such that the support portion 4660 at a peripheral portion of the lower stage 4122.

The support portion 4660 may be arranged at one end of the rotational axis 610 within the vacuum chamber such that the support portion contacts predetermined portions of the second substrate 4152, first and second arms 4310 and 4320, and the bonded substrates. Accordingly, first and second contact portions 4661 and 4662, respectively, of the support portion 4660 may contact first and second substrates 4151 and 4152, respectively. First and second contact portions may be provided as material that will not scratch the first and second substrates, e.g., Teflon™ or PEEK. Alternatively, the first and second contact portions may be replaced by coating corresponding contact faces of the support portion with a material that will not scratch the substrates.

As illustrated in FIG. 137C, the support portion 4660 may have a cubic shape, a columnar shape, a polyhedral shape, etc. In one aspect of the present invention, the support portion 4660 may have a rectangular parallelepiped shape, thereby providing a wide contact area contacting the first and second substrates.

The driving part 4670 includes a rotational motor 4671 installed externally or within the vacuum chamber 4110. The rotational motor 4671, or any other suitable assembly, may be used to rotate the support portion 4660 about the rotational axis 4650. An elevating cylinder 4672, or any other suitable assembly, may be used to selectively and hydraulically elevate the support portion 4660.

The range within which the support portion 4660 may be elevated may include any elevation required to secure the bonded substrates during the release of the vacuum within the vacuum chamber 4110, any elevation required to hold the second substrate 4152 to the upper stage 4121 when a vacuum within the vacuum chamber is higher than a vacuum formed within the upper stage, and any elevation required to support the ends of the finger portions of the first and second arms.

In one aspect of the present invention, the driving part 4670 illustrated in FIG. 137C may be arranged outside a lower side of the vacuum chamber 4110 such that the rotational axis 4650 may be arranged within the vacuum chamber 4110 via a hole provided within a wall of the vacuum chamber and sealed by a coupling portion 4671.

Figure 137D:
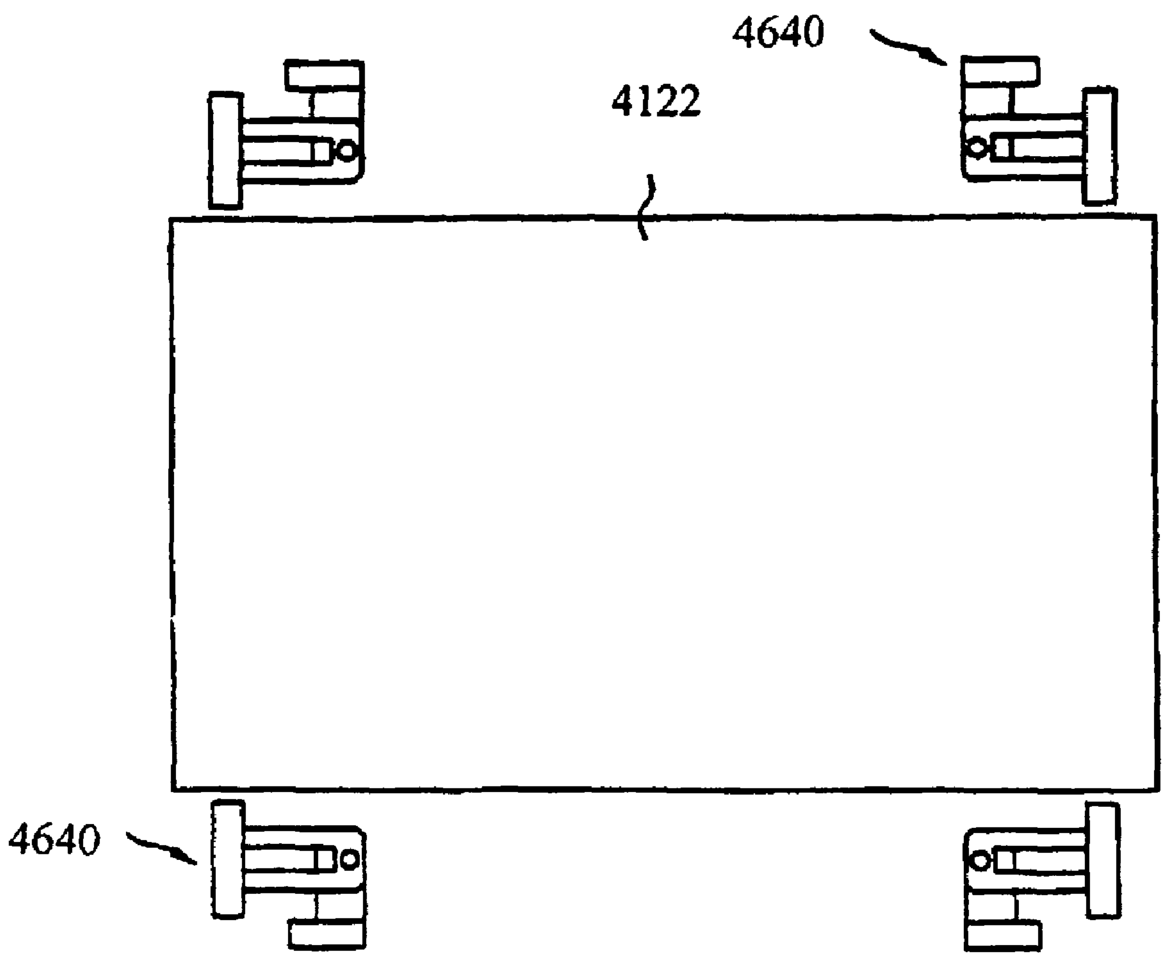

As illustrated in FIG. 137D, the auxiliary process means 4640 may be arranged at positions adjacent the corners and/or side portions (e.g., central, etc.) of the lower stage 4122.

FIG. 144 schematically illustrates a flow chart showing the steps of a method for fabricating an LCD in accordance with an embodiment of the present invention while FIGS. 145A-145G schematically illustrate steps of a method for fabricating an LCD in accordance with an embodiment of the present invention.

Referring to FIG. 144, a plurality of panels may be designed on a first glass substrate 11 and a thin film transistor array is formed on each panel (4711S), and a first orientation or alignment film is formed on an entire surface of the first glass substrate 4851. Then a rubbing process (4712S) is performed. Instead of the rubbing process, a UV alignment process may be performed.

A plurality of panels are designed on a second glass substrate 4852 corresponding to the panels on the first glass substrate 4851, to form a color filter array on each panel (4715S). The color filter array includes such elements as a black matrix layer, a color filter layer, and a common electrode. A second orientation or alignment film is formed on an entire surface of the second substrate 4852 and the second orientation film undergoes a rubbing process (4716S) similar to the first orientation film.

The first and second glass substrates 4851 and 4852 thus formed are cleaned, respectively (4713S and 4717S).

Figure 145A:
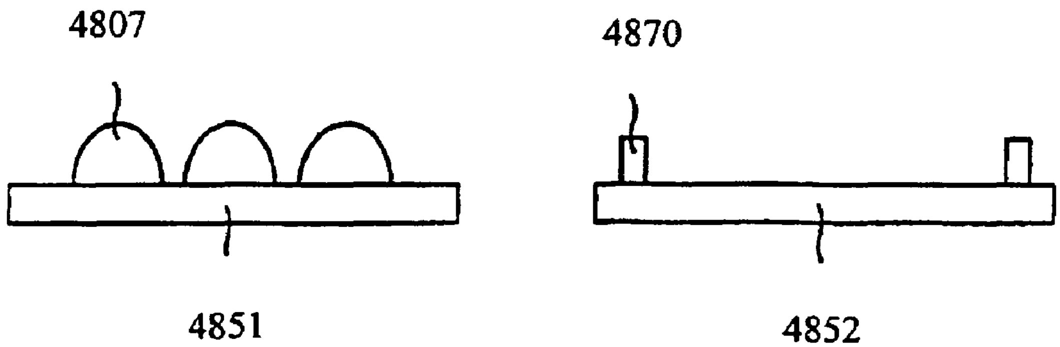

Referring to FIG. 145A, liquid crystal 4807 is dispensed or applied to the first glass substrate 4851 which has been cleaned (4714S). Silver (Ag) dots are formed on the cleaned second glass substrate 4852 (4718S), and a sealant 4870 is coated thereon (4719S).

The first and second glass substrates 4851 and 4852 are loaded in a vacuum bonding chamber 4810, and bonded to spread the applied liquid crystal between the first and second substrates uniformly, and then, the sealant is hardened (4720S).

The bonded first and second glass substrates 4851 and 4852 are cut into a plurality of individual panels (4721S). Although a plurality of individual panels may be cut from any glass substrate, a single panel may also be formed to maximize the size of the display. Subsequently, each panel is then polished and inspected (4722S).

The bonding process will be explained in more detail. FIG. 146 illustrates a flowchart showing the bonding steps of the present invention.

The bonding process may include the steps of loading the two substrates into the vacuum bonding chamber, bonding the two substrates together, and unloading the bonded substrates from the vacuum bonding chamber.

Before loading the substrates, the second glass substrate 4852 having the sealant 4870 coated thereon may be cleaned using, for example, an ultra sonic cleaner (USC) to remove undesirable contaminant particles formed during fabrication. Since the second glass substrate 4852 is coated by the sealant and the Ag dots, and no liquid crystal has been dispensed thereon, the second glass substrate 4852 may be cleaned.

Figure 145B:
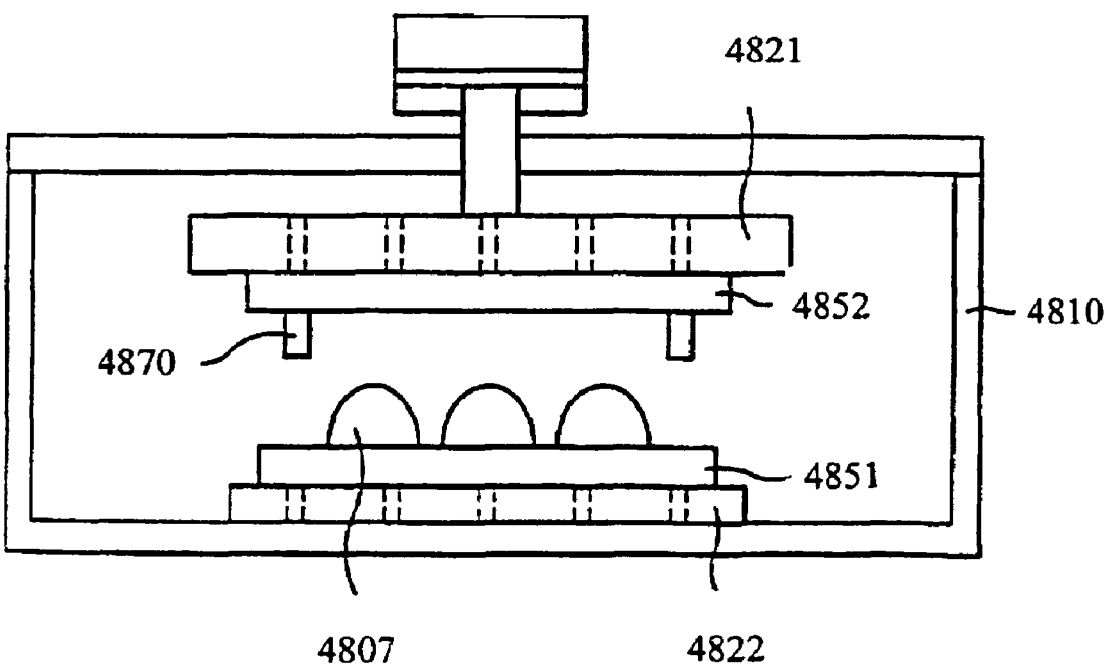

Referring to FIG. 145B, in the loading step, the second glass substrate 4852 having the sealant 4870 coated thereon and facing in a downward direction, is held to an upper stage 4821 by, for example, a vacuum or electrostatic chuck provided in the vacuum bonding chamber 4810 (4731S). Before the second glass substrate 4852 is loaded in the bonding chamber 4810, the second glass substrate 4852 may be flipped over so that the surface with the sealant 4870 will face in a downward direction, as will be explained in greater detail below.

In flipping over the second glass substrate 4852, having the sealant 4870 coated thereon, a loader of a robot (not shown) may hold the substrate such that the sealant 4870 is facing in a downward direction as it is brought in the vacuum bonding chamber 4810. Next, the upper stage 4821 in the vacuum bonding chamber 4810 may be moved vertically downward to contact and hold the second glass substrate 4852, and then may be moved vertically upward. In one aspect of the present invention, the second glass substrate 4852 may be held to the upper stage 4821 using a vacuum chuck, electrostatic charge (ESC), or any other suitable holding technique.

The loader of the robot is then moved out of the vacuum bonding chamber 4810 and the first glass substrate 4851 is arranged over the lower stage 4822 by the loader of the robot.

Although it has been explained that the liquid crystal 4807 is dispensed on the first glass substrate 4851 having the thin film transistor array and the sealant is coated on the second glass substrate 4852, the sealant may alternatively be coated on the first glass substrate 4851 while the liquid crystal may alternatively be dispensed on the second substrate. Moreover, the sealant may be applied to both substrates. Further, the liquid crystal may be dispensed, or the sealant coated, on either of the two glass substrates as long as the substrate with the liquid crystal material dispensed thereon is located on the lower stage and the other substrate is located on the upper stage.

After the first and second substrates are held by vacuum to the lower and upper stage, the first and second substrates may be aligned.

Next, a substrate receiver (not shown) is contacted with a bottom surface of the second glass substrate 4852 (4733S) by positioning the substrate receiver under the second glass substrate 4852 and moving the upper stage down, or the substrate receiver up, or both, until the second glass substrate 4852 contacts the substrate receiver.

The substrate receiver is positioned below the second glass substrate 4852, to prevent the second glass substrate held to the upper stage from becoming detached from the upper stage due to a reduction in a vacuum force present within the upper stage when the vacuum pressure in the bonding chamber becomes higher than the vacuum force within the upper and lower stages.

Accordingly, the second glass substrate 4852, held to the upper stage may be arranged on the substrate receiver before or during the creation of a vacuum in the vacuum bonding chamber. Alternatively, the upper stage holding the second glass substrate and the substrate receiver may be brought within a predetermined distance of each other so that the second glass substrate 4852 may be safely arranged on the substrate receiver from the upper stage when the chamber is evacuated. Moreover, means for fastening the substrates may be provided additionally as air flow in the chamber, capable of shaking the substrates, may occur when evacuation of the vacuum bonding chamber is initiated.

The vacuum within the vacuum bonding chamber 4810 may have a pressure in a first range of about $1.0\times10^{-3}$ Pa to 1 Pa or a second range of about $1.1\times10^{-3}$ Pa to $10^2$ Pa. The first range may be especially applicable for an in-plane switching (IPS) mode LCD and the second range may be especially useful for a twisted nematic (TN) mode LCD. Another type of LCD called a vertical alignment (VA) mode LCD may also use these ranges.

Evacuation of the vacuum bonding chamber 4810 may be carried out in two stages. After the substrates are held to their respective stages, a chamber door is closed and the vacuum chamber is evacuated a first time. After positioning the substrate receiver under the upper stage and placing the substrate on the substrate receiver or after positioning the upper stage and the substrate receiver to within the predetermined distance when the upper stage holds the substrate, the vacuum bonding chamber is evacuated a second time. The second evacuation is faster than the first evacuation and the vacuum pressure created by the first evacuation is not greater than the vacuum pressure created within the upper stage.

The aforementioned two stage evacuation process may prevent deformation or shaking of the substrates when the vacuum bonding chamber is rapidly evacuated.

Alternatively, after the substrates are held to their respective stages and the chamber door is closed, the evacuation may be implemented in a single step at a fixed rate. In addition, the substrate receiver may be positioned below the second substrate 4852 held to the upper stage 4821 during the evacuation. Before the vacuum pressure in the vacuum bonding chamber becomes higher than the vacuum holding force of the upper stage it is required that the substrate receiver be in contact with the second glass substrate 4852.

Once the vacuum bonding chamber 4810 is evacuated to a final vacuum pressure, the first and second glass substrates 4851 and 4852, respectively, are electrostatically secured to their respective stages using an electrostatic chuck (ESC) (4735S) and the substrate receiver may be brought to its original position (4736S). Accordingly, the loading process is completed.

Using ESC the first and second glass substrates may be held to their respective stages by applying negative/positive DC voltages to two or more plate electrodes (not shown) formed within the stages. When the negative/positive voltages are applied to the plate electrodes, a coulombic force is generated between a conductive layer (e.g., transparent electrodes, common electrodes, pixel electrodes, etc.) formed on the substrate and the stage. When conductive layer formed on the substrate faces the stage, about 0.1-1KV may be applied to the plate electrodes. When the substrate contains no conductive layer, about 3-4KV may be applied to the plate electrodes. An elastic sheet may be optionally be provided to the upper stage.

After the upper stage 4821 is moved down to bring the second glass substrate 4852 closer to the first glass substrate 4851, the first and second glass substrate 4851 and 4852 are aligned (4737S) in an alignment method, as will be explained in greater detail below.

FIGS. 147A-147C illustrate an exemplary rough mark alignment method in accordance with an embodiment of the present invention, FIGS. 148A-148C illustrate a fine mark alignment method in accordance with an embodiment of the present invention, and FIG. 149 illustrates a camera focusing position used in an alignment method in accordance with an embodiment of the present invention.

Referring to FIGS. 147A-147B and 148A-148B, the first glass substrate 4851 and the second glass substrate 4852 include rough alignment marks measuring approximately 3 μm in size (FIGS. 147A-147C) and fine alignment marks measuring approximately 0.3 μm in size (FIGS. 148A-148C). The first glass substrate 4851 includes a least one rough alignment mark as shown in FIG. 147A and at least one fine alignment mark as shown in FIG. 148A. The second glass substrate 4852 includes at least one rough alignment mark as shown in FIG. 147B and at least one fine alignment mark as shown in FIG. 148B.

In one aspect of the present invention, different cameras may be used to align the rough marks and the fine marks. Alternatively, a single camera may be used to align both the rough marks and the fine marks.

Referring to FIG. 149, the cameras used to align the rough and fine marks may be focused on a central part between the first glass substrate 4851 and the second glass substrate 4852.

Figure 145C:
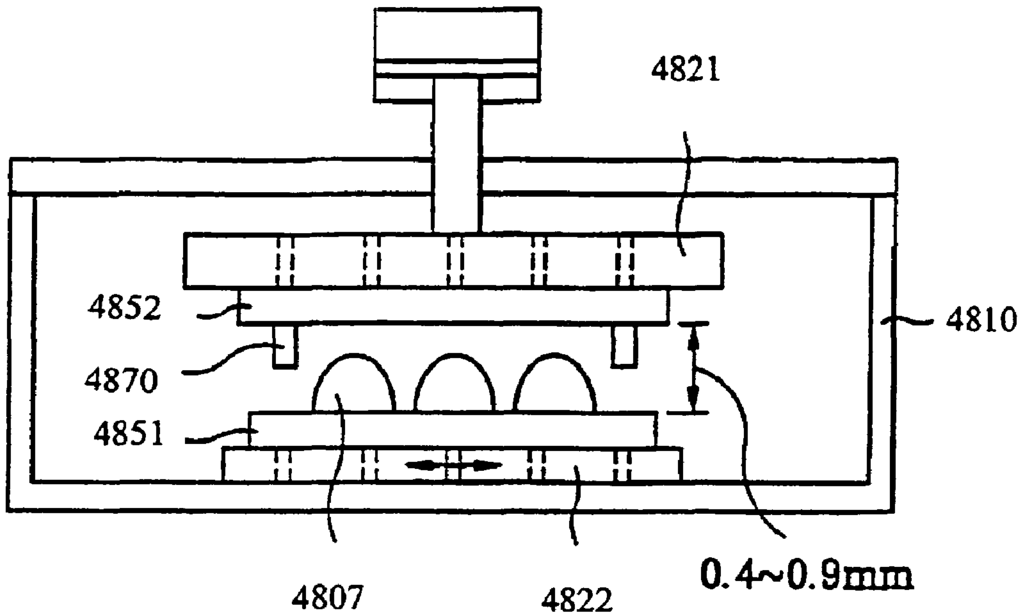

Referring to FIG. 145C, the upper stage 4821 is moved down a first time such that the second glass substrate 4852 does not touch the liquid crystal dispensed on the first glass substrate and a gap between the first glass substrate 4851 and the second glass substrate 4852 is in a range of 0.4 mm-0.9 mm, for example 0.6 mm. Subsequently, the first glass substrate 4851 is roughly aligned with the second glass substrate 4852 such that the rough marks on the second glass substrate 4852 may be located within the rough marks on the first glass substrate 4851. In performing the rough alignment an area of approximately 3.0 mm may be searched in order to determine the positions of the rough and fine alignment marks.

Figure 145D:
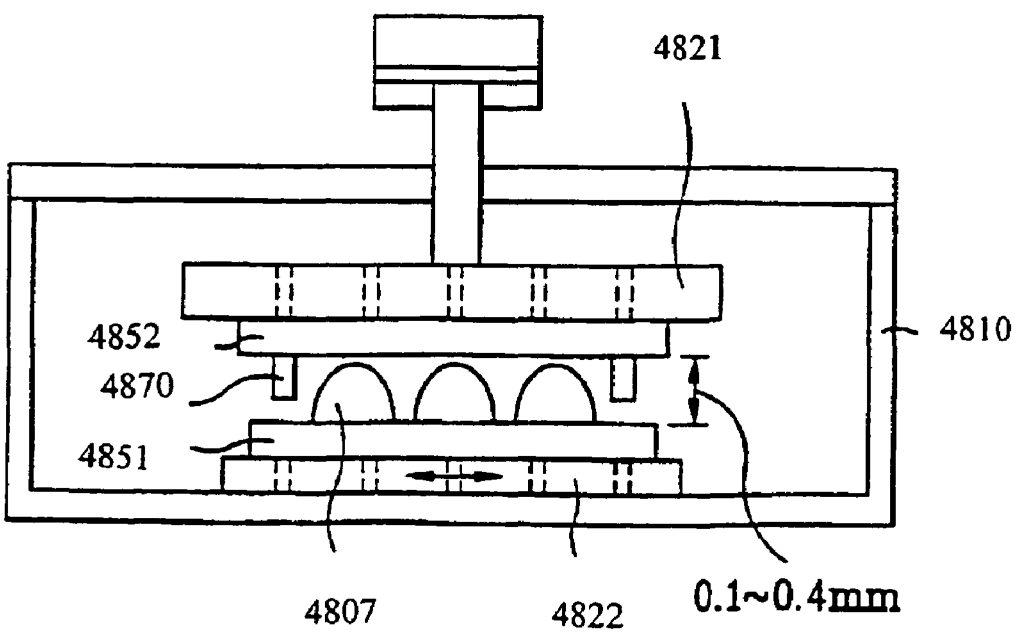

Referring to FIG. 145D, the upper stage 4821 is moved down a second time such that a gap between the first glass substrate 4851 and the second glass substrate 4852 is in a range of 0.1 mm-0.4 mm, for example, 0.2 mm. Subsequently, the first glass substrate 4851 is finely aligned with the second glass substrate 4852 such that the fine mark on the second glass substrate 4852 is accurately located within the fine mark on the first glass substrate 4851. In performing the fine alignment an area of approximately 0.2 mm may be searched in order to determine the positions of the rough and fine alignment marks. Further, an alignment tolerance of approximately 0.1 μm may be achieved as a result of aligning the first and second substrates. During the step of finely aligning the first and second glass substrates, the liquid crystal 4807 dispensed on the first glass substrate 4851 may contact the second glass substrate 4852.

Since the upper stage 4821 is movable in vertical, e.g., up and down, directions and the lower stage is movable in horizontal, e.g., X, and Y, directions, the lower stage 4822 may be moved horizontally to align the two substrates.

During alignment of the rough and fine marks, the cameras may be provided above or below the upper or lower surfaces of the first or second substrates. In one aspect of the present invention, the cameras used to locate the alignment marks may be positioned outside the vacuum bonding chamber. Accordingly, the cameras may be used to view rough and fine alignment marks on the first and second substrates through one or more windows provided in top and bottom walls of the vacuum chamber, as required.

In another aspect of the present invention, the windows, through which the alignment marks are viewed by the cameras, may be provided within recessed cavities formed in the top and bottom walls of the vacuum chamber. Accordingly, in the present aspect of the invention, a single camera may be used to view alignment marks formed on the upper and lower substrates by moving the cameras up and down within their respective cavities. Alternately, a single, stationary camera may be used to view alignment marks on a single substrate. Accordingly, movement of the cameras is not required.

In a first exemplary aligning process, a central part between the alignment marks on the second glass substrate 4852 and the alignment marks on the first glass substrate 4851 may be focused on using the cameras. In a second example, a focal point of the cameras may be adjusted to focus on alignment marks formed on the on the second glass substrate 4852 and then to focus on alignment marks formed on the first glass substrate 4851, thereby improving an alignment accuracy over that of the aforementioned first example.

FIG. 150 illustrates an exemplary layout of rough and fine marks used in an alignment method in accordance with an embodiment of the present invention.

Referring to FIG. 150, at least four rough and fine marks may be formed on the first and second glass substrates 4851 and 4852. Alignment marks on one substrate correspond in location to alignment marks formed on another substrate. To improve alignment accuracy, the number of alignment marks may be increased as the size of the glass substrate increases. The rough marks and the fine marks may be formed in regions between panels which are to be cut, or in a periphery region of the substrate outside of where the plurality of panels are formed.

FIGS. 147C and 148C illustrate the alignment of rough marks and fine marks, when the first glass substrate 4851 are aligned with the second glass substrate 4852 by employing different cameras in alignment of the rough marks and the fine marks, the alignment can be made more faster and accurately.

Figure 145E:
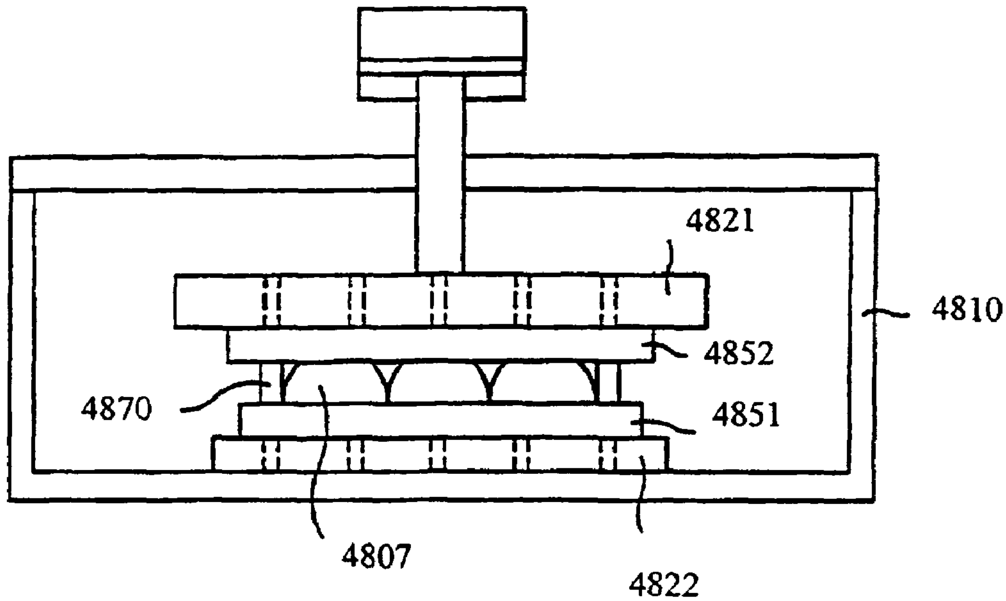
Figure 145F:
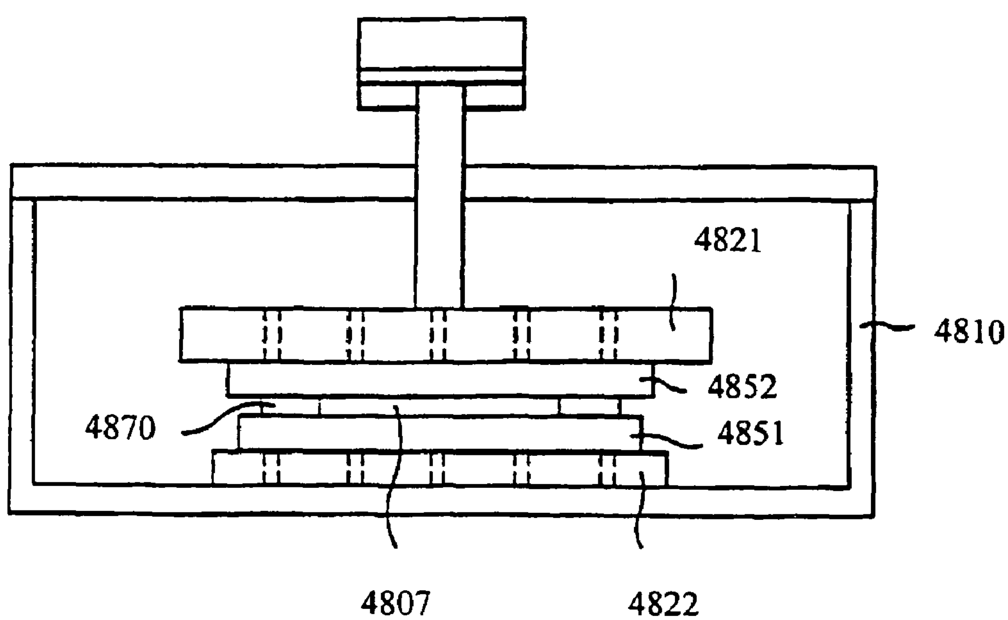

Referring to FIGS. 145E and 145F, after the two substrates are aligned, the upper stage 4821 is moved down and a pressure is applied to the first and second glass substrates 4851 and 4852, thereby bonding the two substrates together (4738S). The first and second glass substrates 4851 and 4852 are bonded together by moving either the upper stage 4821 or the lower stage 4822 in a vertical direction, while varying speeds and the pressures of the upper and lower stages. Until the time when the liquid crystal 4807 on the first glass substrate 4851 comes into initial contact with the second glass substrate 4852 or when the seal on the second glass substrate 4852 come into initial contact with the first glass substrate 4851, the stages are moved at a fixed speed or fixed pressure. After the time of initial contact, the pressure is increased gradually from the fixed pressure to a final pressure. Accordingly the time of initial contact is sensed by a load cell fitted to a shaft of the upper or lower stages. The two glass substrates 4851 and 4852 may, for example, be pressed at a first pressure of 0.1 ton at the initial time of contact, a second pressure of 0.3 ton at a first intermediate stage, a third pressure of 0.4 ton at a second intermediate stage, and a fourth pressure of 0.5 ton at a final stage (see FIG. 145F).

Although it is illustrated that the upper stage presses down onto the substrates by means of one shaft, a plurality of shafts may independently apply and control pressure using individual load cells fitted thereto. If the lower stage and the upper stage are not level or fail to be pressed uniformly, a predetermined number of shafts may be selectively activated to apply lower or higher pressures to the substrates, thereby providing uniform bonding of the sealant.

Figure 145G:
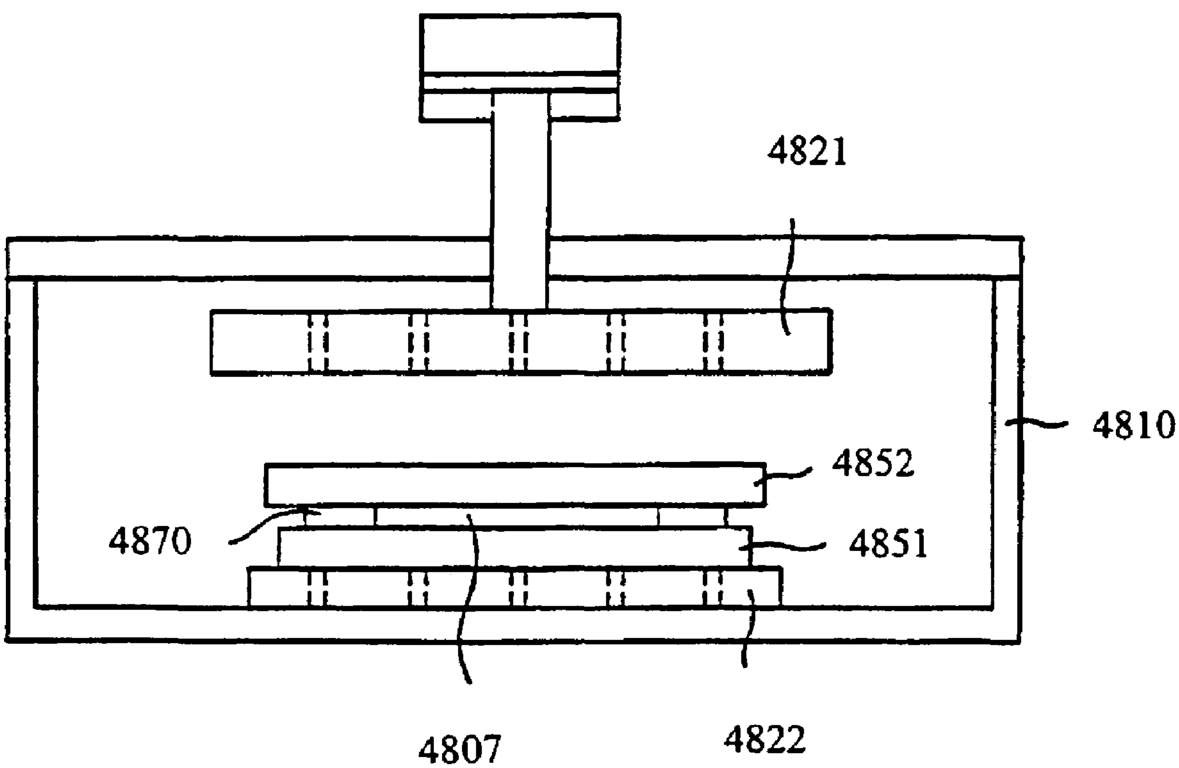

Referring to FIG. 145G, after reaching the final stage, applying the fourth pressure, and bonding the two substrates, the ESC is turned off and the upper stage 4821 is raised upward and separates from the bonded glass substrates 4851 and 4852.

Next, the bonded substrates are unloaded (4738S). Accordingly, after the upper stage is raised to a final raised position, the bonded glass substrates may be unloaded using the loader of the robot. Alternatively, the bonded glass substrates may be held by the upper stage during its ascent to its final raised position wherein the loader of the robot unloads the first and second glass substrates 4851 and 4852 from the upper stage 4821. The bonded substrates may be held to the upper stage by a vacuum or an electrostatic charge.

In order to shorten the fabrication time period, an unbonded first glass substrate 4851 or second glass substrate 4852 may be loaded onto a stage while the bonded substrates are unloaded from a stage. Accordingly, an unbonded second glass substrate 4852 may be brought to the upper stage 4821 by means of the loader of the robot and held to the upper stage by a vacuum or an electrostatic charge while the bonded first and second glass substrates may be unloaded from the lower stage 4822. Alternatively, an unbonded first glass substrate 4851 may be brought to the lower stage 4822 by means of the loader robot while the bonded first and second glass substrates held by the upper stage 4821 may be unloaded.

A liquid crystal spreading process may be provided before or after the bonded substrates are unloaded. Accordingly, the liquid crystal spreading process spreads the liquid crystal in the gap between the bonded substrates toward the sealant in the event the liquid crystal does not spread sufficiently toward the sealant before unloading. The liquid crystal spreading process may be carried out for at least 10 minutes under the atmospheric or a vacuum pressure.

As has been explained, the method for fabricating LCDs of the present invention has the following advantages.

First, applying the liquid crystal on the first substrate and coating the seal on the second substrate shorten a fabrication time prior to bonding the two substrates together.

Second, applying the liquid crystal on the first substrate and coating the seal on the second substrate permits a balanced progression of the fabrication processes to the first and second substrates, thereby making efficient use of a production line.

Third, dispensing liquid crystal on the first substrate and coating the sealant and the Ag dots on the second substrate prevents the sealant from becoming contaminated with particles as the substrate coated by the sealant may be cleaned by a USC just prior to bonding.

Fourth, positioning the substrate receiver under the substrate and evacuation of the vacuum bonding chamber permits the substrate held to the upper stage from falling and thereby breaking.

Fifth, adjustment of the gap between the first and second glass substrates and the use of cameras during the alignment of rough and fine marks permit fast and accurate alignment of the first and second substrates.

Sixth, sensing the time when the two substrates initially contact each other and varying the pressure applied in bonding the two substrates together minimizes damage to the orientation film caused by the liquid crystal.

Sixth, since the upper stage presses the substrate down by means of a plurality of shafts, each of which capable of applying pressure independently, uniform bonding of the sealant can be achieved by independently applying a lower or higher pressures by predetermined shafts when the lower stage and the upper stage are not level or fail to bond to the sealant uniformly.

Eighth, the simultaneous loading and unloading of unbonded and bonded substrates shortens a fabrication time of the LCD.

Ninth, the two staged evacuation of the vacuum bonding chamber prevents deformation of the substrate and air flow in the chamber caused by sudden pressure changes.

Tenth, the liquid crystal spreading process shortens a fabrication time period of the LCD.

FIGS. 151A-151F schematically illustrate steps of a method for fabricating an LCD in accordance with an embodiment of the present invention.

Figure 151A:
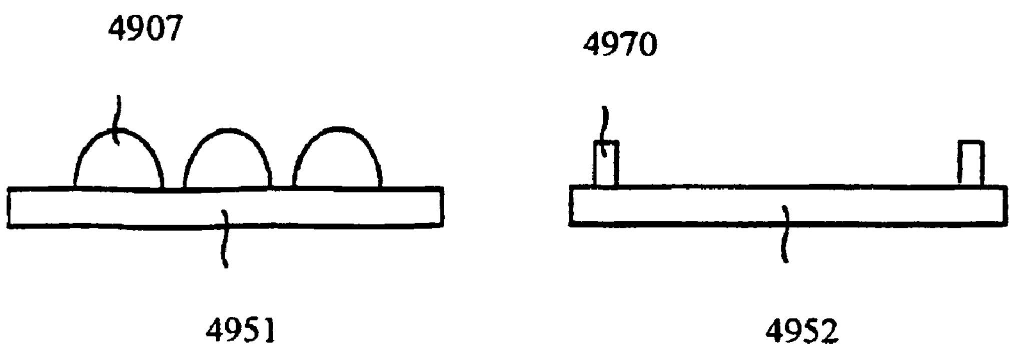

Referring to FIG. 151A, liquid crystal 4907 may be applied to a first glass substrate 4951, and a seal 4970 may be formed on a second glass substrate 4952. A plurality of corresponding areas designated for panels may be provided in first and second glass substrates 4951 and 4952, and thin film transistor arrays may be formed on each of the panels within the first glass substrate 4951 while color filter arrays, black matrix layers, a color filter layers, common electrodes, etc., may be formed on each of the panels of the second glass substrate 4952. Liquid crystal material 4907 may be applied onto the first glass substrate 4951 and a seal 4970 may be coated onto the second glass substrate 4952. Alternatively, the seal 4970 may be coated on the first glass substrate 4951 and the liquid crystal material 4907 may be dropped on the second glass substrate 4952 or both the liquid crystal material 4907 and the seal 4970 may be dropped and coated on either of the two glass substrates. In any case, however, when placed into the vacuum bonding chamber to be bonded with another substrate, the glass substrate having the liquid crystal dropped thereon must be placed on a lower stage, as will be discussed in greater detail below.

Referring now to FIG. 152, a bonding process in accordance with an embodiment of the present invention may be explained.

Generally, the bonding process includes steps of loading the two substrates into a vacuum bonding chamber, bonding the two substrates, setting the seal of the bonded substrates to fix the bonded substrates together, and unloading the bonded two substrates from the vacuum bonding chamber.

Before loading the first and second substrates 4951 and 4952 into the vacuum bonding chamber, a seal is formed on the second glass substrate 4952. Subsequently, particles formed during various fabrication processes are removed from the second glass substrate in a USC (Ultra Sonic Cleaner). Since no liquid crystal applied onto the second glass substrate 4952, coated by the seal, the second glass substrate 4952 can be cleaned.

Figure 151B:
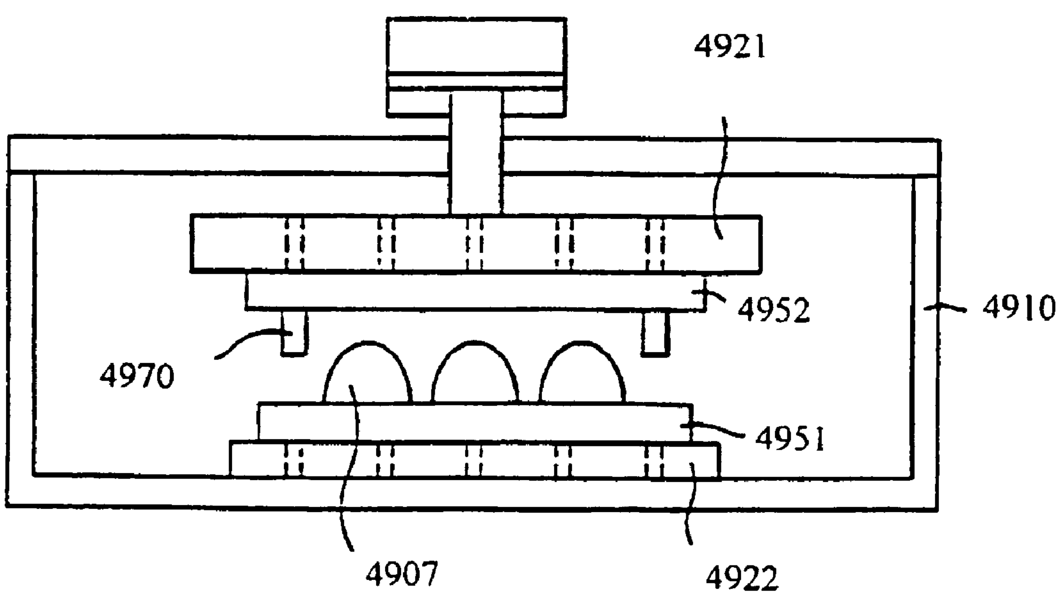

Referring generally to FIG. 151B, the second glass substrate 4952 is held to an upper stage 4921 in the vacuum bonding chamber 4910, wherein the seal 4970 faces down (5031S), and the first glass substrate 4951 is held to a lower stage 4922 in the vacuum bonding chamber 4910 (5032S), wherein the liquid crystal material 4907 faces up. The vacuum bonding chamber 4910 is hereby in a standby state.

More specifically, the second glass substrate 4952 with the seal 4970 facing down is held by a loader of a robot (not shown), and is brought into the vacuum bonding chamber 4910. The upper stage 4921 in the vacuum bonding chamber 4910 is moved down to meet and hold the second glass substrate 4952, and is then moved back up. The second glass substrate 4952 may be held to the upper stage 4921 with the use of a vacuum force or with an electrostatic force.

Then, the loader is moved out of the vacuum bonding chamber 4910 and places the first glass substrate 4951 over the lower stage 4922 in the vacuum bonding chamber 4910.

Next, the second glass substrate 4952 is placed on a substrate receiver (not shown) by placing the substrate receiver under the second glass substrate 4952 and moving the upper stage down, or the substrate receiver up, or both, until the second glass substrate 4952 contacts the substrate receiver (5033S). After the second glass substrate 4952 and the substrate receiver are brought into contact, the second glass substrate 4952 is held to the upper stage.

The substrate receiver contacts an under side of the second glass substrate 4952, to prevent the second glass substrate held to the upper stage from becoming detached from the upper stage due to a reduction in a vacuum force present within the upper stage when a vacuum in the bonding chamber becomes higher than the vacuum force within the upper and lower stages.

Accordingly, the second glass substrate 4952, held to the upper stage, may be placed on the substrate receiver before or during the creation of a vacuum in the vacuum bonding chamber. Alternatively, the upper stage holding the second glass substrate and the substrate receiver may be brought to within a predetermined distance of each other so that the second glass substrate 4952 may be safely placed on the substrate receiver from the upper stage when the chamber is evacuated. Moreover, means for securing the substrates may be provided additionally as air flow in the chamber, capable of shaking the substrates, may occur when evacuation of the vacuum bonding chamber is initiated (5034S).

The vacuum within the vacuum bonding chamber 4910 may have a pressure in a range of about $1.0\times10^{-3}$ Pa to about 1 Pa for IPS mode LCDs, and about $1.1\times10^{-3}$ Pa to about $10^2$ Pa for TN mode LCDs.

Evacuation of the vacuum bonding chamber 4910 may be carried out in two stages. After the substrates are held to their respective stages, a chamber door is closed and the vacuum chamber is evacuated a first time. After positioning the substrate receiver under the upper stage and placing the substrate on the substrate receiver or after positioning the upper stage and the substrate receiver to within the predetermined distance when the upper stage biases the substrate, the vacuum bonding chamber is evacuated for a second time. The second evacuation is faster than the first evacuation. The vacuum force created by the first evacuation is not higher than the vacuum force within the upper stage.

The aforementioned two stage evacuation process may prevent deformation or shaking of the substrates in the vacuum bonding chamber that conventionally occurs when the vacuum boning chamber is rapidly evacuated.

Alternatively, evacuation of the bonding chamber may be carried out in a single stage. Accordingly, after the substrates are held to their respective stages and the chamber door is closed, the evacuation may be started and the substrate receiver may be brought to the underside of the upper stage during the evacuation. The substrate receiver must be brought to the underside of the upper stage before the vacuum force within the vacuum bonding chamber becomes higher than the vacuum force within the upper stage.

Once the vacuum bonding chamber 4910 is evacuated to a preset vacuum, the upper and lower stages 4921 and 4922 bias and fix the first and second glass substrates 4951 and 4952 respectively using an ESC (Electro Static Charge) (5035S) and the substrate receiver is brought to its original position (5036S) out from under the upper plate.

Using ESC the first and second glass substrates may be held to their respective stages by applying negative/positive DC voltages to two or more plate electrodes (not shown) formed within the stages. When the negative/positive voltages are applied to the plate electrodes, a coulombic force is generated between a conductive layer (e.g., transparent electrodes, common electrodes, pixel electrodes, etc.) formed on the substrate and the stage. When conductive layer formed on the substrate faces the stage, about 0.1-1KV is applied to the plate electrodes. When the substrate contains no conductive layer, about 3-4KV is applied to the plate electrodes. An elastic sheet may be optionally be provided to the upper stage.

Figure 151C:
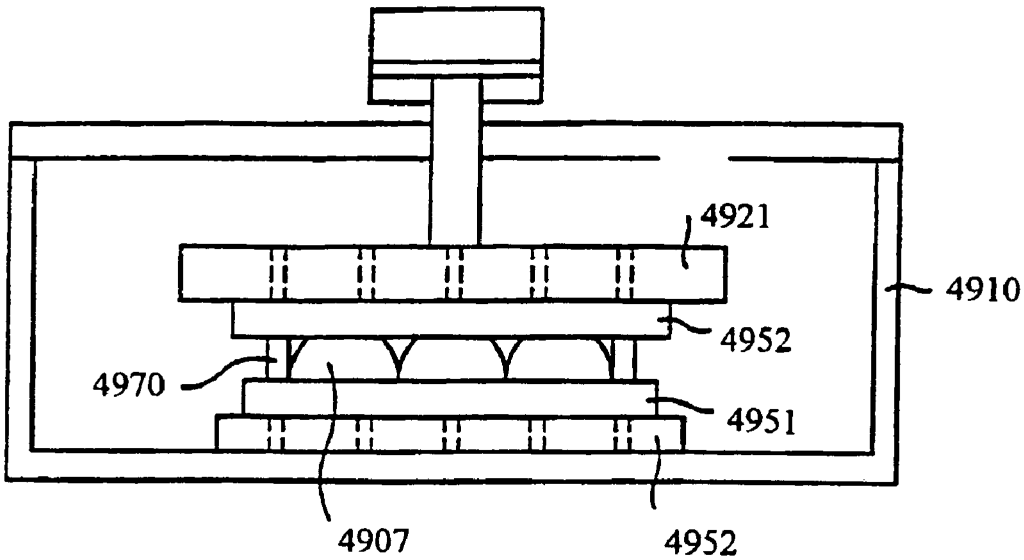
Figure 151D:
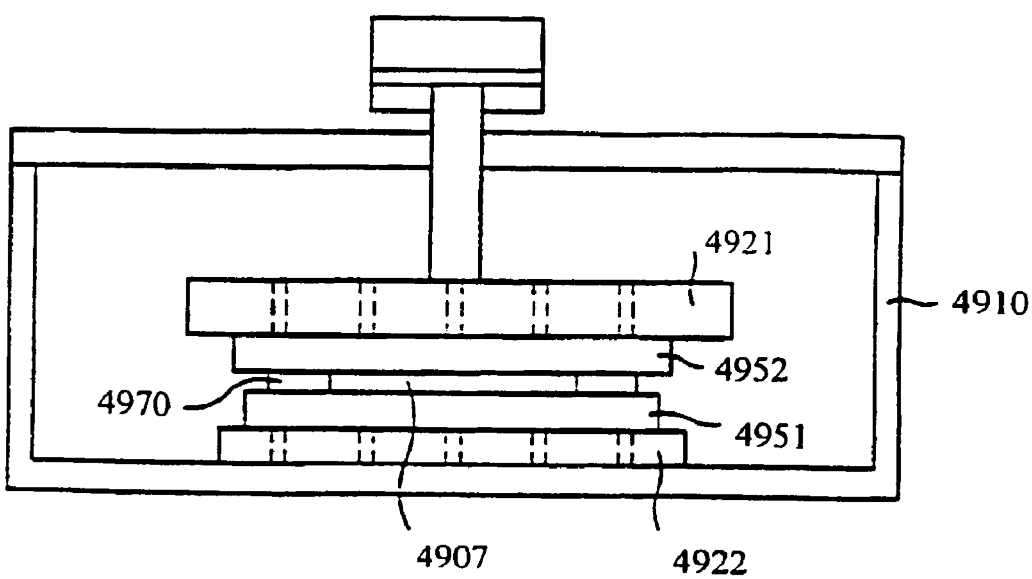

Referring to FIGS. 151C and 151D, after the two glass substrates 4951 and 4952 are aligned and held to their respective stages by ESC, the two stages are moved into proximity such that the two glass substrates may be bonded together (5037S). The first and second glass substrates 4951 and 4952 are pressed together by moving either the upper stage 4921 or the lower stage 4922 in a vertical direction, while varying speeds and pressures at different stage locations. Until the time the liquid crystal 4907 on the first glass substrate 4951 and the second glass substrate 4952 come into contact, or until the time the first glass substrate 4951 and the seal on the second glass substrate 4952 come into contact, the stages are moved at a fix speed or fixed pressure, and the pressure is boosted up step by step from the time of contact to a final pressure. That is, the time of contact may be sensed by a load cell fitted to a shaft of the movable stage. The two glass substrates 4951 and 4952 may, for example, be pressed at a pressure of 0.1 ton at the time of contact, a pressure of 0.3 ton at an intermediate time period, a pressure of 0.4 ton at a full contact stage, and a pressure of 0.5 ton at a final stage (see FIG. 151D).

Though it is illustrated that the upper stage presses down onto the substrate by means of one shaft, a plurality of shafts may independently apply and control pressure using an individual load cell. If the lower stage and the upper stage are not leveled or fail to be pressed uniformly, predetermined shafts may be selectively pressed using lower or higher pressures to provide uniform bonding of the seal.

Figure 151E:
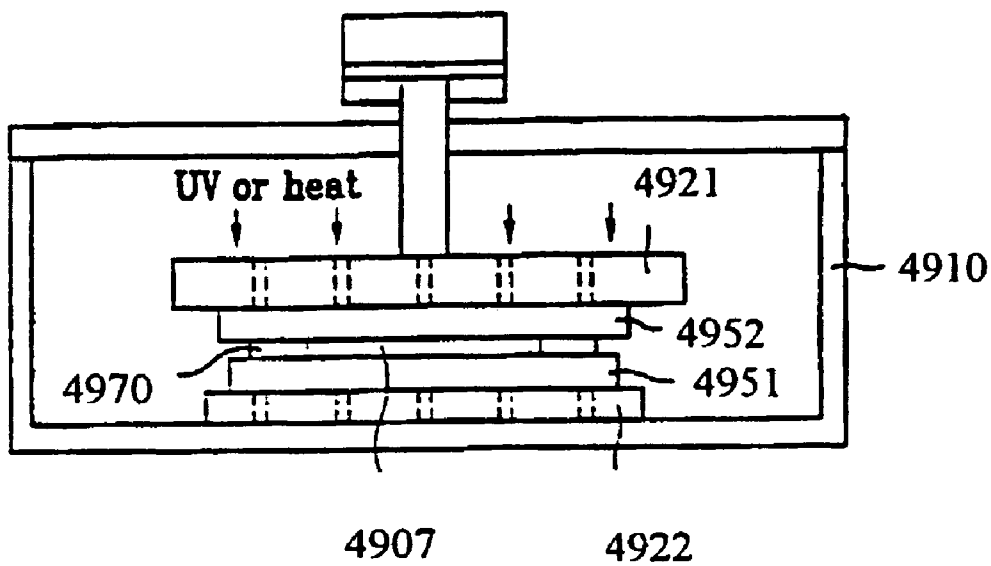

Referring to FIG. 151E, after the two substrates are bonded, a UV ray may be directed, and/or heat may be applied, to the seal in order to cure or harden and fix the first and second glass substrates 4951 and 4952 together (5038S). Because the substrates are large (e.g., 1.0 m×1.2 m), and the two substrates are bonded after the liquid crystal is applied, misalignment of the two substrates may occur during subsequent processes or during transfer after the bonding step. Therefore, the fixing is made for prevention of the misalignment of the bonded two substrates and maintaining a bonded state during the next process or transfer after the bonding.

The method of fixing the two substrates to each other will be explained in more detail.

Fixing the two substrates occurs within the bonding chamber under a vacuum or atmospheric pressure. Though it is preferable that the fixing is carried out after the bonding, the fixing may be carried out before the bonding is finished. For simplification of the process, though it is preferable that material of the fixing seal is the same as that of the main seal, material of fixing seal may be different from the main seal to improve efficiency in the fixing process. The fixing seal may, for example, be a photosetting resin, a thermosetting resin, a UV-thermosetting resin, a pressure setting resin, or any other material with a high adhesive force. Fixing conditions used with the photosetting resin may, for example, a UV ray having a power of 50-500 mW (e.g., 200 mW) directed for about 5-40 seconds (e.g., about 14 seconds). Fixing conditions used with the thermosetting resin may be dependent on a material of the fixing seal and may, for example, include a setting temperature in a range of about 50-200° C. applied to the seal for more than about 10 seconds. Accordingly, the bonded substrate may be fixed by any one of light, heat, light and heat, and pressure. The fixing seal may or may not be coated on the same substrate as the main seal.

FIG. 153 illustrates a seal layout pattern in accordance with a first embodiment of the present invention, and FIG. 159 illustrates a section across a line I-I' in FIG. 153 showing upper and lower stages and substrates.

Referring to FIG. 153, a method for fixing bonded substrates in accordance with a first embodiment of the present invention includes coating any of the aforementioned resins, forming a plurality of main seals 4970*a* on a periphery of each panel for bonding and sealing the liquid crystal between the two substrates, forming a dummy seal 4970*b* to surround a plurality of panels for protecting the main seals 4970*a* on an inner side thereof during bonding and pressing, and forming a plurality of fixing seals 4970*c* on an outer periphery of the dummy seal 4970*b* (an outer periphery of the substrate) at fixed intervals for fixing the two substrates preliminarily, which are removed during cutting, on the second glass substrate 4952 in the foregoing seal 4970 coating.

The bonded two substrates may then be fixed by forming the fixing seals 4970*c*, bonding the two substrates, directing a light (UV) to, and/or heating, the fixing seals 4970*c* thereby setting the fixing seals 4970*c*. When the fixing seals 4970*c* are formed from a the light (UV) setting resin, light (UV) may be directed to the fixing seals 4970*c* to fix the substrates. When the fixing seals 4970*c* are formed of a thermosetting resin, heat may be applied to the fixing seals 4970*c* for setting the fixing seals 4970*c*.

Referring to FIG. 159, the upper stage 4921 and/or the lower stage 4922 includes a plurality of holes 4917 for directing the light (UV) or applying heat. Before the aligned substrates are bonded, it may be assumed that the fixing seals 4970*c* and the holes 4917 are aligned. Accordingly, upon directing a light (UV) or applying heat to the fixing seals 4970*c* from an upper stage side or a lower stage side through the holes 4917, the fixing seals 4970*c* are set, and the two substrates are fixed together. The light (UV) having a power of about 50-500 mW (e.g., 200 mW) is emitted from a light (UV) emitting pin (4918*a* or 4918*b*) for about 5-40 seconds (e.g., about 14 seconds) that moves down from an upper side of the bonding chamber or moves up from a lower side of the bonding chamber. When setting the fixing seals 4970*c* using heat, a heating device 4918*a* or 4918*b* may be moved down from the upper side of the bonding chamber or moved up from the lower side of the bonding chamber to come into contact with a part of the first or second substrates 4951 or 4952 the fixing seals 4970*c* formed thereon through the holes 4917, and heats the fixing seals 4970*c*. The fixing seals 4970*c* may be heated at a temperature of about 50-200° C. for about 10 seconds to selectively setting the fixing seals 4970*c*. Optionally, light (UV) direction and the heat application may be carried out simultaneously.

In one aspect of the invention, the main seals 4970*a*, the dummy seal 4970*b*, and the fixing seals 4970*c* may all be formed on the second glass substrate. In another aspect of the present invention, the dummy seal 4970*b* and/or the fixing seals 4970*c* may be formed on the first glass substrate 4951 and/or the fixing seals 4970*c* may be formed of a material different from the main seals 4970*a*. In another aspect of the present invention, either the main seals 4970*a* may be formed on the first substrate 4951 while the dummy seal 4970*b* and/or the fixing seals 4970*c* may be formed on the second glass substrate, or the main seals 4970*a* may be formed on the second substrate 4952 and the dummy seal 4970*b* and/or the fixing seals 4970*c* may be formed on the first glass substrate 4951. In another aspect of the present invention, the main seals 4970*a*, the dummy seal 4970*b*, and the fixing seals 4970*c* may all be formed on the first glass substrate 4951.

FIG. 154 illustrates a seal layout pattern in accordance with a second embodiment of the present invention.

Referring to FIG. 154, a method for fixing bonded substrates in accordance with a second embodiment of the present invention includes coating a resin selected from aforementioned materials (e.g., photosetting resin, a thermosetting resin, a UV-thermosetting resin, and a pressure setting resin), forming a plurality of main seals 4970*a* on a periphery of the second substrate for surrounding all the panels for bonding the two substrates and for sealing the liquid crystal between the two substrates, forming a dummy seal 4970*b* to surround a plurality of panels for protecting the main seals 4970*a* on an inner side thereof during bonding, and directing light (UV), and/or applying heat, to parts of the dummy seal 4970*b* for fixing the two substrates.

In accordance with the present embodiment, the dummy seal 4970*b* may be coated in the same region where the fixing seals are intended. Subsequently, light (UV) is directed, and/or heat is applied, to fix portions of the dummy seal 4970*b* corresponding to fixing seal locations. The conditions of light (UV) direction and/or heat application are the same as in the first embodiment. Reference numeral 4970*d* denotes the regions in the dummy seal 4970*b* where the light (UV) is directed and/or the heat is applied. Accordingly, the dummy seal 4970*b* may be used to form fixing seals equivalent to those found in the first embodiment.

FIG. 155 illustrates a seal layout pattern in accordance with a third embodiment of the present invention.

Referring to FIG. 155, a method for fixing bonded substrates in accordance with a third preferred embodiment of the present invention includes omitting formation of the dummy seal. Accordingly, the two substrates may be fixed together by forming only the main seals 4970*a* and the fixing seals 4970*c* in a periphery of the substrate and directing a light (UV), applying heat, and/or pressure, to the fixing seals 4970*c* as similarly described in the first embodiment of the present invention. Further, the fixing seals 4970*c* may have a closed form, as with the dummy seal in the previous embodiments.

FIG. 156 illustrates a seal layout pattern in accordance with a fourth embodiment of the present invention.

Referring to FIG. 156, a method for fixing bonded substrates in accordance with a fourth embodiment of the present invention fixes the two bonded substrates by forming the fixing seals 4970*c* in a periphery region of the substrate and also at fixed intervals in cutting regions between panels. Light (UV) may be directed and/or heat or pressure may be applied to the fixing seals 4970*c* as with the third embodiment of the present invention. Other conditions are the same with the first embodiment.

FIG. 157 illustrates a seal layout pattern in accordance with a fifth embodiment of the present invention.

Referring to FIG. 157, a method for fixing bonded substrates in accordance with a fifth embodiment of the present invention fixes the two bonded substrates by forming a plurality of dummy seals that surround each of panels (main seals), forming the fixing seals 4970*c* in a periphery of the substrate, and directing a light (UV) and/or applying heat or pressure to the fixing seals 4970*c* as previously described with reference to the first embodiment of the present invention. Other conditions are the same with the first embodiment.

FIG. 158 illustrates a seal layout pattern in accordance with a sixth embodiment of the present invention.

Referring to FIG. 158, a method for fixing bonded substrates in accordance with a sixth embodiment of the present invention fixes the two bonded substrates by selectively directing light (UV) and/or applying heat to portions of a plurality of dummy seals 4970*b* formed on each panel. Light and/or heat may be selectively directed/applied to the dummy seals 4970*b* in accordance with the fifth embodiment of the present invention. Other conditions are the same with the first embodiment.

In each of the foregoing embodiments, the main seals 4970*a*, the dummy seals 4970*b*, and the fixing seals 4970*c* may or may not be formed on the same substrate, and the main seals or the dummy seals may be formed on the substrate having the liquid crystal applied thereto.

Though not shown in the FIGS, a method for fixing bonded substrates in accordance with a seventh embodiment of the present invention fixes the two bonded substrates, not by forming separate dummy seals or fixing seals, but by selectively directing light (UV) and/or applying heat to portions of the main seals, wherein the main seals may be formed of a light (UV) setting resin, a thermosetting resin, or a light (UV) and thermosetting resin.

Also, though not shown in the FIGS, a method for fixing bonded substrates in accordance with an eighth embodiment of the present invention fixes the two bonded substrates by applying an adhesive, having a setting property better than that of the seals, to parts the fixing seals 4970*c* in the first, third, fourth, or fifth embodiment, and bonding the first and second glass substrates using the adhesive.

Once fixing of the two bonded substrates are finished, misalignment of the bonded first and second glass substrates may be prevented during transfer of the substrates for subsequent fabrication processes.

Figure 151F:
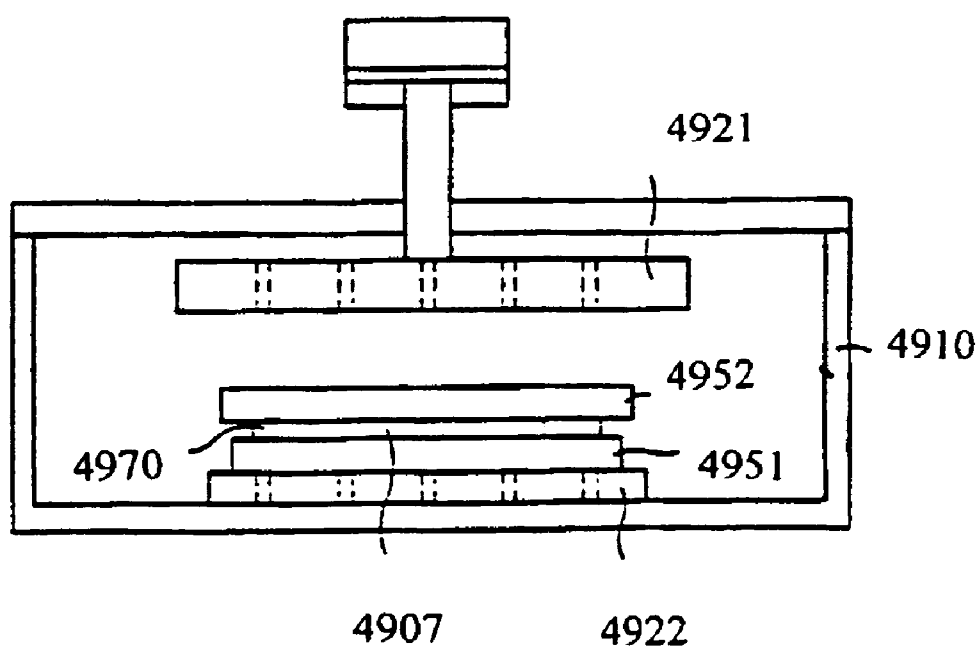

Referring to FIG. 151F, when fixing of the two bonded substrates is finished, the ESC is turned off and the upper stage 4921 is moved up. Accordingly, the upper stage 4921 is separated from the fixed two glass substrates 4951 and 4952. Next, the substrates are unloaded in an unloading step (5038S) using the loader. Alternatively, the ESC may be left on only in the upper stage and the fixed first and second glass substrates 4951 and 4952 are lifted by the upper stage. Next, the loader unloads the first and second glass substrates 4951 and 4952 from the upper stage 4921.

In order to shorten the fabrication time for the LCD, one of the first and second glass substrates to be bonded in a next bonding process may be loaded onto an empty stage while the fixed first and second glass substrates are unloaded. For example, after the second glass substrate 4952 to be bonded in a next bonding process is brought to the upper stage 4921 via the loader and held to the upper stage, the fixed first and second glass substrates on the lower stage 4922 may be unloaded. Alternatively, after the upper stage 4921 lifts the fixed first and second glass substrates 4951 and 4952, the loader may load a first glass substrate 4951 to be bonded in a next bonding process onto the lower stage, and the fixed first and second glass substrates may be unloaded.

A liquid crystal spreading process may optionally be added before the process of unloading the bonded substrates where the liquid crystal between the fixed substrates may be spread, for example, toward the seal. Alternatively, a liquid crystal spreading process may be carried out to evenly spread the liquid crystal toward the seal when the liquid crystal does not adequately spread after the unloading. The liquid crystal spreading process may be carried out for more than 10 min. under atmospheric pressure or in a vacuum.

As has been explained, the method for fabricating an LCD according to the present invention has the following advantages.

First, applying the liquid crystal on the first substrate and coating the seal on the second substrate shorten a fabrication time prior to bonding the two substrates together.

Second, applying the liquid crystal on the first substrate and coating the seal on the second substrate permits a balanced progression of the fabrication processes to the first and second substrates, thereby making efficient use of a production line.

Third, applying the liquid crystal on the first substrate and coating the seal and Ag dots on the second substrate minimizes contamination of the seal from particles because the substrate having the seal coated thereon may be cleaned just prior to bonding.

Fourth, positioning the substrate receiver under the substrate and evacuation of the vacuum bonding chamber permits the substrate affixed to the upper stage from falling down and breaking.

Fifth, sensing the time during which the two substrates come into contact and the varying the pressure in bonding the two substrates minimizes damage made by the liquid crystal to the orientation film.

Sixth, since the upper stage presses the substrate down by means of a plurality of shafts, each of which capable of applying pressure independently, uniform bonding of the seal can be achieved by independently applying a lower or higher pressures by predetermined shafts when the lower stage and the upper stage are not level or fail to bond to the seal uniformly.

Seventh, the two staged evacuation of the vacuum bonding chamber prevents deformation of the substrate and air flow in the chamber caused by a sudden vacuum.

Eighth, misalignment of the fixed substrates is minimized during progression to the next bonding processes or transfer of fixed substrates.

Ninth, simultaneous loading and unloading of glass substrates shortens fabrication times.

Tenth, inclusion of a liquid crystal spreading process shortens the LCD fabrication time.

FIGS. 160A-160G schematically illustrate the steps of a method for fabricating an LCD in accordance with an embodiment of the present invention.

Figure 160A:
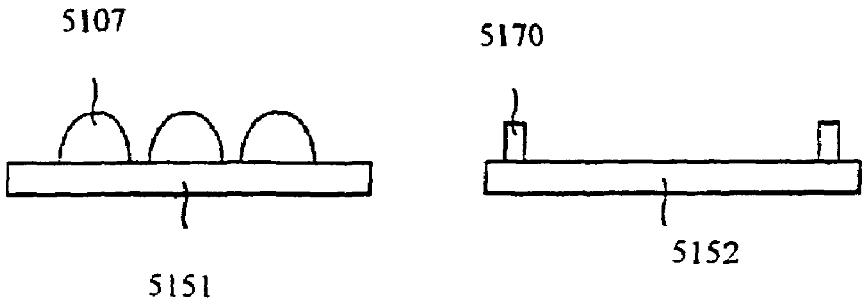

Referring to FIG. 160A, liquid crystal 5107 may be applied to a first glass substrate 5151, and seal 5170 may be coated on a second substrate 5152. A plurality of corresponding areas designated for panels may be provided in first and second glass substrates 5151 and 5152, and thin film transistor arrays may be formed on each of the panels within the first glass substrate 5151 while color filter arrays, black matrix layers, a color filter layers, common electrodes, etc., may be formed on each of the panels of the second glass substrate 5152. Liquid crystal material 5107 may be applied onto the first glass substrate 5151 and a seal 5170 may be coated onto the second glass substrate 5152. Alternatively, the seal 5170 may be coated on the first glass substrate 5151 and the liquid crystal material 5107 may be dropped on the second glass substrate 5152 or both the liquid crystal material 5152 and the seal 5170 may be dropped and coated on either of the two glass substrates. In any case, however, when placed into the vacuum bonding chamber to be bonded with another substrate, the glass substrate having the liquid crystal dropped thereon must be placed on a lower stage, as will be discussed in greater detail below.

With reference to FIG. 161, the bonding process will be explained in more detail.

FIG. 161 illustrates a flow chart showing the steps of bonding of the present invention. Generally, the bonding process includes a step of loading the two substrates into a vacuum bonding chamber, bonding the two substrates, venting the vacuum bonding chamber to apply a pressure to the bonded substrates, and unloading the bonded substrates from the vacuum bonding chamber.

Before loading the first and second substrates 5151 and 5152 into the vacuum bonding chamber, a seal is formed on the second glass substrate 5152. Subsequently, particles formed during various fabrication processes are removed from the second glass substrate in a USC (Ultra Sonic Cleaner). Since no liquid crystal applied onto the second glass substrate 5152, coated by the seal, the second glass substrate 5152 can be cleaned.

Figure 160B:
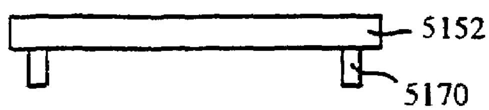

Referring to FIG. 160B, since both a part of the first glass substrate 5151 having the liquid crystal dropped thereon and a part of the second glass substrate 5152 having the seal 5170 coated thereon face upward, it is required that one of the two substrates is turned upside down, for bonding the two substrates 5151 and 5152. However, the first glass substrate 5151 cannot be turned upside down, the second glass substrate 5152 having the seal coated thereon is turned upside down such that the part of the second glass substrate the seal 5170 coated thereon faces down (5232S).

The second glass substrate 5152 is turned upside down by loading the second substrate onto a table of a turner then pre-aligning and securing the second substrate. Next, the table is turned upside down, and the turned substrate is carried to the vacuum bonding chamber.

Figure 160C:
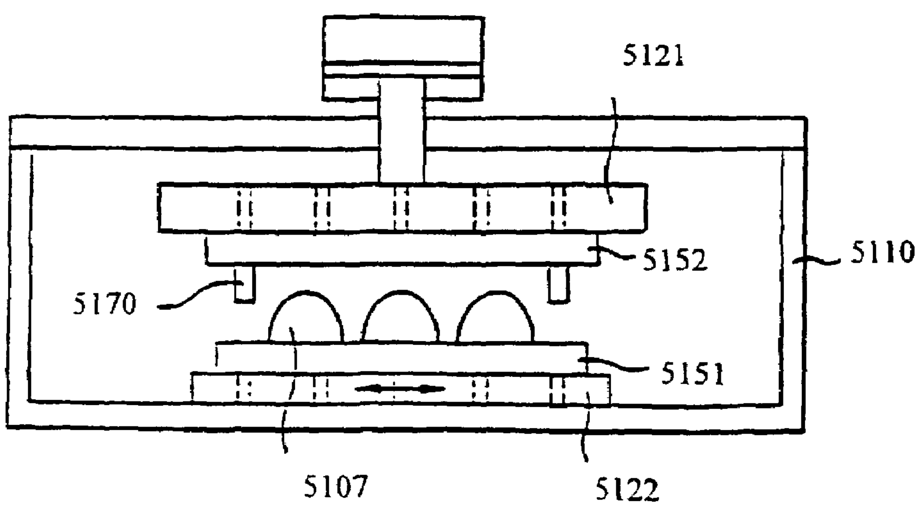

Referring generally to FIG. 160C, in the loading step, the second glass substrate 5152 is held to an upper stage 5121 in the vacuum bonding chamber 5110, wherein the seal 5170 faces down (5233S), and the first glass substrate 5151 is held to a lower stage 5122 in the vacuum bonding chamber 5110 (5234S), wherein the liquid crystal material 5107 faces up. The vacuum bonding chamber 5110 is hereby in a standby state.

More specifically, the second glass substrate 5152 with the seal 5170 facing down is held by a loader of a robot (not shown), and is brought into the vacuum bonding chamber 5110. The upper stage 5121 in the vacuum bonding chamber 5110 is moved down to meet and hold the second glass substrate 5152, and is then moved back up. The second glass substrate 5152 may be held to the upper stage 5121 with the use of a vacuum force or with an electrostatic force.

Then, the loader is moved out of the vacuum bonding chamber 5110 and places the first glass substrate 5151 over the lower stage 5122 in the vacuum bonding chamber 5110.

Next, the second glass substrate 5152 is placed on a substrate receiver (not shown) by placing the substrate receiver under the second glass substrate 5152 and moving the upper stage down, or the substrate receiver up, or both, until the second glass substrate 5152 contacts the substrate receiver (5235S). After the second glass substrate 5152 and the substrate receiver are brought into contact the second glass substrate 5152 is held to the upper stage.

The substrate receiver contacts an under side of the second glass substrate 5152, to prevent the second glass substrate held to the upper stage from becoming detached from the upper stage due to a reduction in a vacuum force present within the upper stage when a vacuum in the bonding chamber becomes higher than the vacuum force within the upper and lower stages.

Accordingly, the second glass substrate 5152, held to the upper stage, may be placed on the substrate receiver before or during the creation of a vacuum in the vacuum bonding chamber. Alternatively, the upper stage holding the second glass substrate and the substrate receiver may be brought to within a predetermined distance of each other so that the second glass substrate 5152 may be safely placed on the substrate receiver from the upper stage when the chamber is evacuated. Moreover, means for securing the substrates may be provided additionally as air flow in the chamber, capable of shaking the substrates, may occur when evacuation of the vacuum bonding chamber is initiated.

The vacuum bonding chamber 5110 is evacuated (5236S). The vacuum within the vacuum bonding chamber 5110 may have a pressure in a range of about $1.0\times10^{-3}$ Pa to about 1 Pa for IPS mode LCDs, and about $1.1\times10^{-3}$ Pa to about $10^{2}$ Pa for TN mode LCDs.

Evacuation of the vacuum bonding chamber 5110 may be carried out in two stages. After the substrates are held to their respective stages, a chamber door is closed and the vacuum chamber is evacuated a first time. After positioning the substrate receiver under the upper stage and placing the substrate on the substrate receiver or after positioning the upper stage and the substrate receiver to within the predetermined distance when the upper stage biases the substrate, the vacuum bonding chamber is evacuated for a second time. The second evacuation is faster than the first evacuation. The vacuum force created by the first evacuation is not higher than the vacuum force within the upper stage.

The aforementioned two stage evacuation process may prevent deformation or shaking of the substrates in the vacuum bonding chamber that conventionally occurs when the vacuum bonding chamber is rapidly evacuated.

Alternatively, evacuation of the bonding chamber may be carried out in a single stage. Accordingly, after the substrates are held to their respective stages and the chamber door is closed, the evacuation may be started and the substrate receiver may be brought to the underside of the upper stage during the evacuation. The substrate receiver must be brought to the underside of the upper stage before the vacuum force within the vacuum bonding chamber becomes higher than the vacuum force within the upper stage.

Once the vacuum bonding chamber 5110 is evacuated to a preset vacuum, the upper and lower stages 5121 and 5122 bias and fix the first and second glass substrates 5151 and 5152 respectively using an ESC (Electro Static Charge) (5237S) and the substrate receiver is brought to its original position (5238S) out from under the upper plate.

Using ESC the first and second glass substrates may be held to their respective stages by applying negative/positive DC voltages to two or more plate electrodes (not shown) formed within the stages. When the negative/positive voltages are applied to the plate electrodes, a coulombic force is generated between a conductive layer (e.g., transparent electrodes, common electrodes, pixel electrodes, etc.) formed on the substrate and the stage. When conductive layer formed on the substrate faces the stage, about 0.1-1 KV is applied to the plate electrodes. When the substrate contains no conductive layer, about 3-4 KV is applied to the plate electrodes. An elastic sheet may be optionally be provided to the upper stage.

Figure 160D:
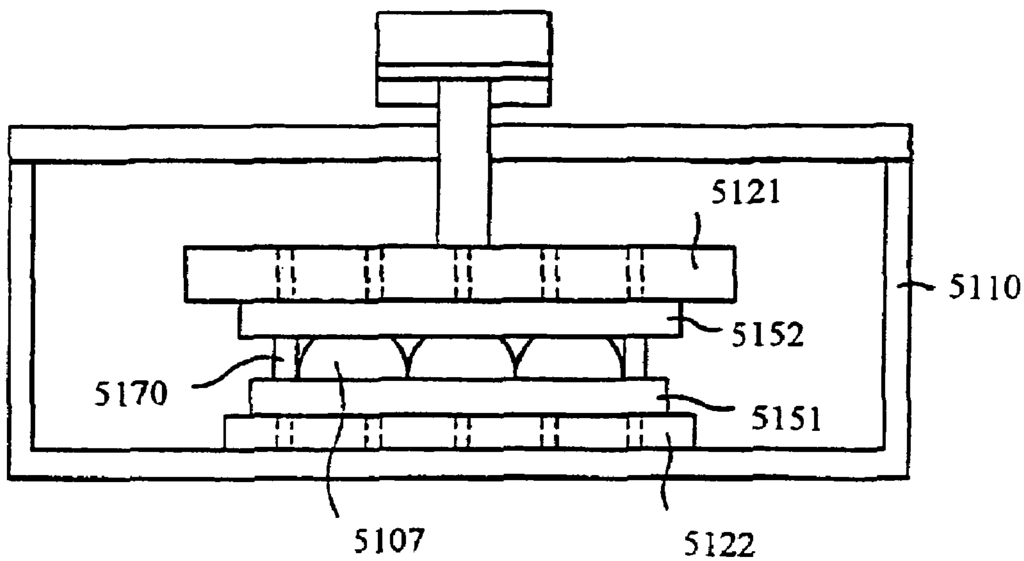
Figure 160E:
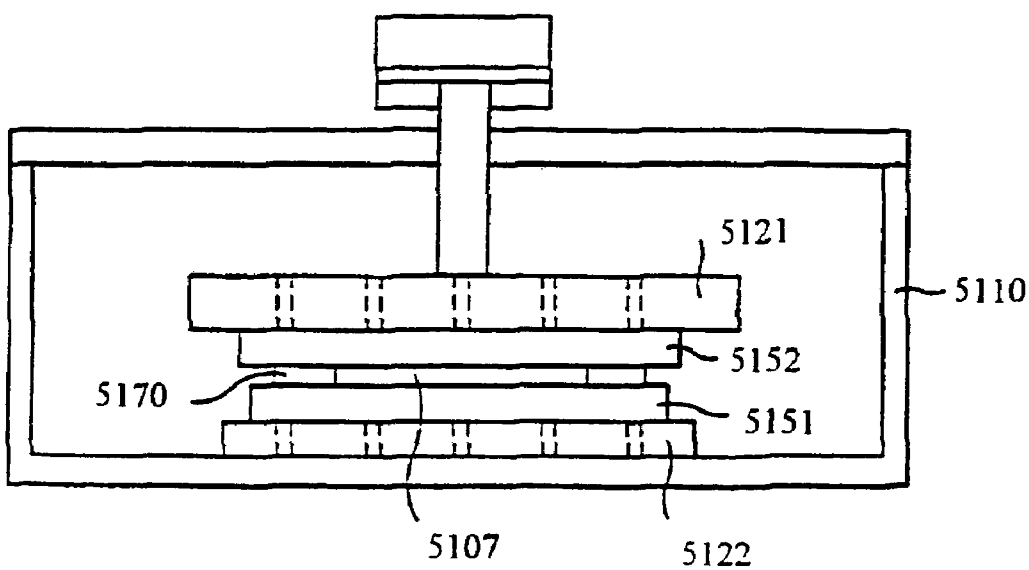

Referring to FIGS. 160D and 160E, after the two glass substrates 5151 and 5152 are aligned and held to their respective stages by ESC, the two stages are moved into proximity such that the two glass substrates may be bonded together (a first pressure application 5239S). The first and second glass substrates 5151 and 5152 are pressed together by moving either the upper stage 5121 or the lower stage 5122 in a vertical direction, while varying speeds and pressures at different stage locations. Until the time the liquid crystal 5107 on the first glass substrate 5151 and the second glass substrate 5152 come into contact, or until the time the first glass substrate 5151 and the seal on the second glass substrate 5152 come into contact, the stages are moved at a fix speed or fixed pressure, and the pressure is boosted up step by step from the time of contact to a final pressure. That is, the time of contact may be sensed by a load cell fitted to a shaft of the movable stage. The two glass substrates 5151 and 5152 may, for example, be pressed at a pressure of 0.1 ton at the time of contact, a pressure of 0.3 ton at an intermediate time period, a pressure of 0.4 ton at a full contact stage, and a pressure of 0.5 ton at a final stage (see FIG. 160E).

Though it is illustrated that the upper stage presses down onto the substrate by means of one shaft, a plurality of shafts may independently apply and control pressure using an individual load cell. If the lower stage and the upper stage are not leveled or fail to be pressed uniformly, predetermined shafts may be selectively pressed using lower or higher pressures to provide uniform bonding of the seal.

Figure 160F:
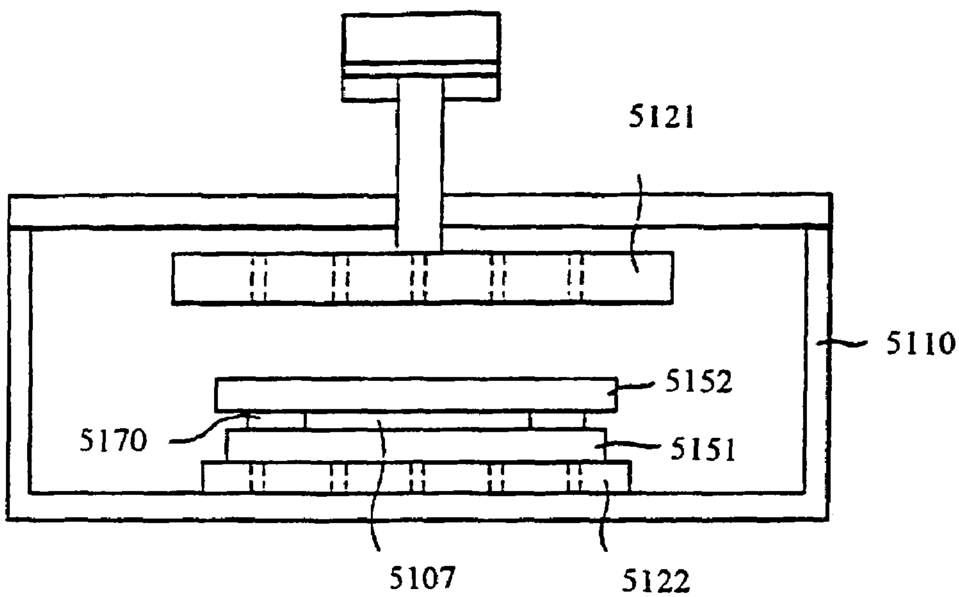

Referring to FIG. 160F, after the two substrates have been bonded, the ESC is turned off and the upper stage 5121 is moved up to separate the upper stage 5121 from the bonded two glass substrates 5151 and 5152.

Figure 160G:
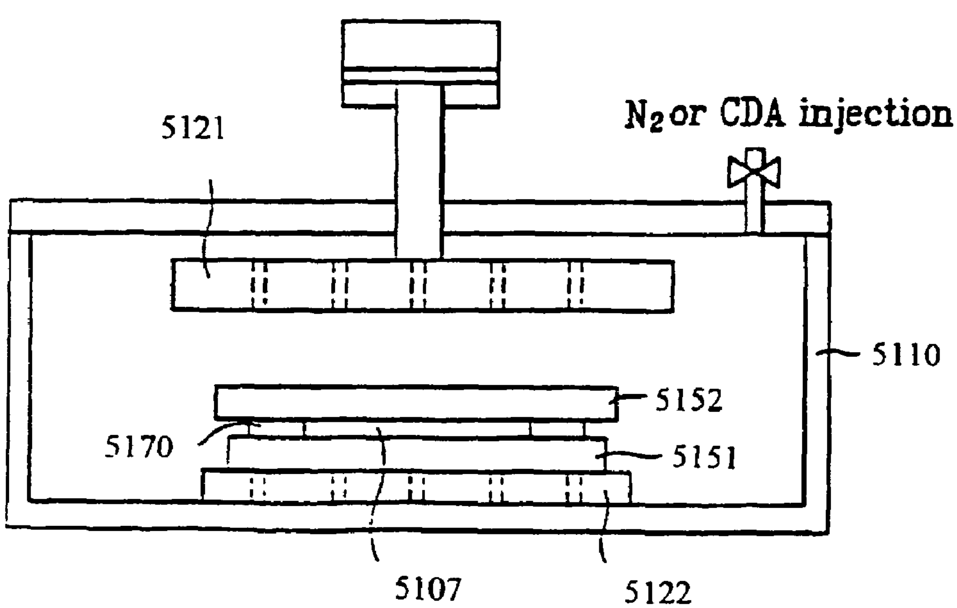

Referring to FIG. 160G, a gas, such as $N^2$, or clean dry air is subsequently introduced into the bonding chamber 5110, to vent the vacuum bonding chamber (5240S). Venting the vacuum bonding chamber 5110 returns the pressure within the chamber from a vacuum state to an atmospheric state providing uniform pressure application to the bonded substrates.

Thus upon venting the vacuum chamber, a vacuum is created in the space between the first and the second glass substrates newly bonded by the seal 5170 and atmospheric pressure within the chamber provided after venting presses the space between the first and second glass substrates 5151 and 5152 in the vacuum state is pressed uniformly. Accordingly, an even gap is maintained. It should be noted, however, that the bonded substrates 5151 and 5152 are pressed not only by the ambient pressure of the venting gas within the chamber after venting is complete, but also by the venting gas as it is introduced during the venting process.

Uniform application of a pressure to every part of the substrate is required for formation of a seal having a fixed height between the two substrates and uniform distribution of the liquid crystal to thereby prevent breakage of the seal or imperfect filling of the liquid crystal. To ensure uniform pressure application to the substrate while the chamber is vented, the direction a gas is being vented may be monitored and controlled.

A plurality of gas injection tubes may be provided within top, bottom, and side portions of the chamber. The plurality of gas injection tubes within the top, bottom, and side portions of the chamber are capable of injecting gas into the chamber. In one aspect of the invention, the gas may be injected into the chamber from the top. Further, the venting direction of the gas may be determined based on the size of the substrate and the position of the stages within the chamber. In one aspect of the present invention, depending on the size of the substrates being bonded and the size of the chamber, the number of gas injection tubes within any portion of the chamber may be at least 2 (e.g., 8).

As mentioned above, the two substrates 5151 and 5152 are pressed, not only by the atmospheric pressure, but also by a pressure caused by injection of the venting gas. Though the pressure applied to the two substrates are atmospheric $10^5$ Pa, a pressure ranging 0.4-3.0 Kg/cm2 is appropriate, and a pressure at 1.0 $Kg/cm^2$ is preferable.

Since a rapid venting of the chamber may cause shaking of the substrate, that causes misalignment of the bonded substrates, fastening means for preventing the substrates from shaking, may also be provided. Alternately, shaking may be prevented by venting the chamber in a series of progressive steps. Further, a slow valve may also be provided to slow venting of the gas into the chamber.

Venting of the chamber may be started and finished in a single venting step. Alternatively, venting of the chamber may be started slowly at a first rate, to prevent the substrate from shaking, and after a preset time is reached, the venting of the chamber may be carried out at a second rate, higher than the first rate, to quickly reach atmospheric pressure.

Because the bonded substrates on the stage may be shaken or misaligned while the chamber is venting, the amount of time required to inject the gas into the chamber may be monitored and controlled. For purposes of discussion, the venting time is initiated when the space between the two substrates exists in a vacuum, as alignment is complete, and the pressure within the chamber is progressed for the first time. A venting method will now be explained in greater detail.

Generally, in one aspect of the present invention, venting may be started at the same time the upper stage begins its ascent to its final raised position. Venting may be alternatively be started after the substrates have been bonded but prior to any movement of any of the stages. In another aspect of the present invention, the upper stage may be moved either before or after the venting of the chamber is finished.

In one aspect of the present invention, the chamber may be pressurized by a venting process. Accordingly venting of the chamber may be started after the upper stage is moved up to its final raised position. Alternatively, the upper stage may be raised to a predetermined distance to prevent any lifting of the substrates upon initiation of the venting. In another aspect of the present invention, the fabrication time for the LCD may be reduced by starting the venting process before the upper stage is moved up to its final raised position but after the upper stage begins its ascent.

In another aspect of the invention, the chamber may be pressurized by a venting process wherein gas (e.g., $N_2$, etc.) or clean dry air is also blown through vacuum channels formed in the upper stage. The additional gas or clean dry air may be blown because the upper stage may not be easily separated from the bonded substrates leading to the possibility that the substrates may be shaken and/or fall below the upper stage.

Accordingly, in the present aspect, the venting may be started, then gas or clean dry air may be blown through the upper stage, and then the upper stage may be raised to is final position. Alternately, after the venting begins the gas or the clean dry air may be blown simultaneously with the raising of the upper stage. Alternately still, the venting may begin simultaneously with the blowing of the gas or clean dry air through the upper stage, followed by the raising of the upper stage. In another alternative, the venting, blowing, and raising of the upper stage may occur simultaneously. The gas or clean dry air may alternately be blown through the upper stage, followed by the raising of the upper stage, and followed still by the venting of the chamber via the gas injection tubes. Lastly, the gas or clean dry air may alternately be blown through the upper stage, followed by the venting of the chamber, and then followed by the raising of the upper stage.

After venting is finished and the upper stage is completely raised, the bonded substrates are unloaded (5241S). That is, upon completion of the venting, the upper stage 5121 is moved up to its final raised position and the bonded first and second glass substrates 5151 and 5152 are unloaded using the loader. Alternatively, the bonded first and second glass substrates 5151 and 5152 may be held to the upper stage

5152 and moved up where the loader then unloads the first and second glass substrates 5151 and 5152 from the raised upper stage 5121.

In order to shorten the fabrication time for the LCD, one of the first and second glass substrates to be bonded in a next bonding process may be loaded onto an empty stage while the fixed first and second glass substrates are unloaded. For example, after the second glass substrate 5152 to be bonded in a next bonding process is brought to the upper stage 5152 via the loader and held to the upper stage, the fixed first and second glass substrates on the lower stage 5122 may be unloaded. Alternatively, after the upper stage 5152 lifts the fixed first and second glass substrates 5151 and 5152, the loader may load a first glass substrate 5151 to be bonded in a next bonding process onto the lower stage, and the fixed first and second glass substrates may be unloaded.

A liquid crystal spreading process may optionally be added before the process of unloading the bonded substrates where the liquid crystal between the fixed substrates may be spread, for example, toward the seal. Alternatively, a liquid crystal spreading process may be carried out to evenly spread the liquid crystal toward the seal when the liquid crystal does not adequately spread after the unloading. The liquid crystal spreading process may be carried out for more than 10 min. under atmospheric pressure or in a vacuum.

As has been explained, the method for fabricating an LCD according to the present invention has the following advantages.

First, applying the liquid crystal on the first substrate and coating the seal on the second substrate shorten a fabrication time prior to bonding the two substrates together.

Second, applying the liquid crystal on the first substrate and coating the seal on the second substrate permits a balanced progression of the fabrication processes to the first and second substrates, thereby making efficient use of a production line.

Third, applying the liquid crystal on the first substrate and coating the seal and Ag dots on the second substrate minimizes contamination of the seal from particles because the substrate having the seal coated thereon may be cleaned just prior to bonding.

Fourth, positioning the substrate receiver under the substrate and evacuation of the vacuum bonding chamber permits the substrate affixed to the upper stage from falling down and breaking.

Fifth, sensing the time during which the two substrates come into contact and the varying the pressure in bonding the two substrates minimizes damage made by the liquid crystal to the orientation film.

Sixth, since the upper stage presses the substrate down by means of a plurality of shafts, each of which capable of applying pressure independently, uniform bonding of the seal can be achieved by independently applying a lower or higher pressures by predetermined shafts when the lower stage and the upper stage are not level or fail to bond to the seal uniformly.

Seventh, the two staged evacuation of the vacuum bonding chamber prevents deformation of the substrate and air flow in the chamber caused by a sudden vacuum.

Eighth, the application of pressure to the bonded substrates, bonded in a vacuum, by venting the bonding chamber to atmospheric pressure permits a uniform application of pressure to the bonded substrates.

Ninth, performing venting in two steps minimizes damage to the substrates.

Tenth, simultaneous loading and unloading of glass substrates shortens fabrication times.

Eleventh, inclusion of a liquid crystal spreading process shortens the LCD fabrication time.

Twelfth, the simultaneous venting and separation of the upper stage from the substrates reduces a venting time period.

FIGS. 162A to 162E are expanded perspective views illustrating a method for fabricating an LCD panel according to a first embodiment of the present invention. Although the drawings illustrate only four unit cells, the number of the unit cells may be varied depending upon the size of the substrate.

Figure 162A:
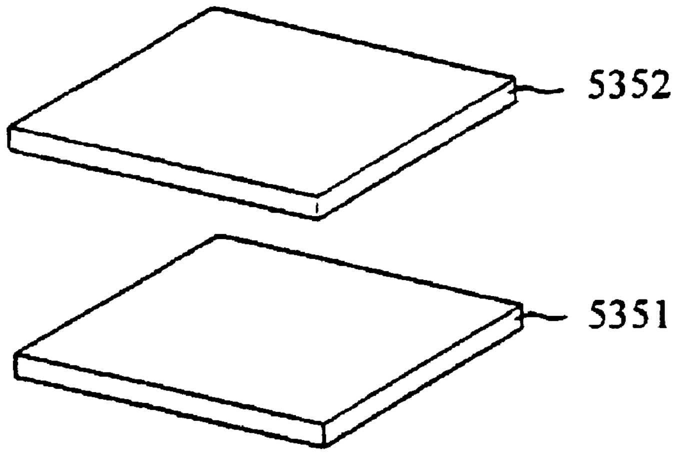

Referring to FIG. 162A, a lower substrate 5351 and an upper substrate 5352 are prepared for the process. A plurality of gate lines and data lines (both not shown) are formed on the lower substrate 5351 to cross each other defining pixel regions, a thin film transistor having a gate electrode, a gate insulating film, a semiconductor layer, an ohmic contact layer, source/drain electrodes, and protection film, is formed at every crossing point of the gate lines and the data lines. A pixel electrode is further formed at each of the pixel regions connected to the thin film transistor.

An orientation film is formed on the pixel electrodes for an initial orientation of the liquid crystal. The orientation film may be formed of polyimide, polyamide group compound, polyvinylalcohol (PVA), polyamic acid by rubbing, or a photosensitive material, such as polyvinvylcinnamate (PVCN) and polysilioxanecinnamate (PSCN). Alternatively, cellulosecinnamate (CelCN) group compound may be selected by using photo-alignment method.

A light shielding film is formed on the upper substrate 5352 for shielding a light leakage from the gate lines, the data lines, and the thin film transistor regions. A color filter layer of red, green, and blue is formed thereon. A common electrode is formed thereon in this order. Additionally, an overcoat layer may be formed between the color filter layer and the common electrode. The orientation film is formed on the common electrode.

Silver (Ag) dots are formed at the outside of the lower substrate 5351, for applying a voltage to the common electrode on the upper substrate 5352 after the lower and upper substrates 5351 and 5352 are bonded with each other. Alternatively, the silver dots may be formed on the upper substrate 5352.

In an in plane switching (IPS) mode LCD, a lateral field is induced by the common electrode formed on the lower substrate the same as the pixel electrode. The silver dots are not formed on the substrates.

Figure 162B:
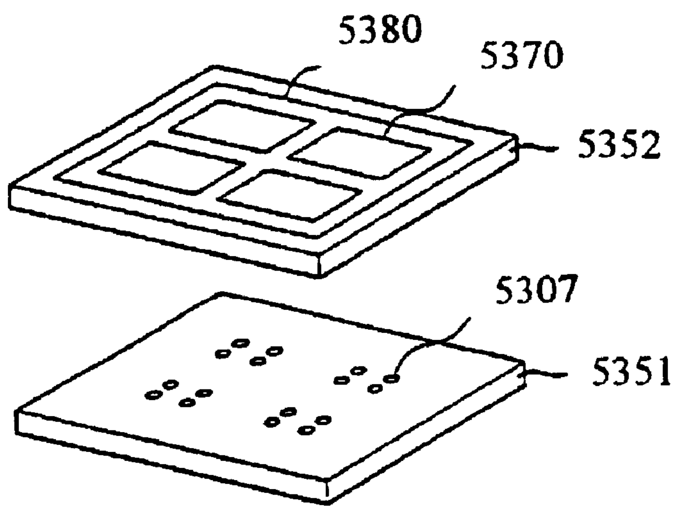

Referring to FIG. 162B, a main UV sealant 5370 is coated on the upper substrate 5352 in a closed pattern, and a dummy UV sealant 5380 is formed at the outside of the main UV sealant 5370 in a closed pattern. The sealant may be coated by using a dispensing method or a screen printing method. However, the screen printing method may damage the orientation film formed on the substrate since the screen comes into contact with the substrate. Also, the screen printing method may not be economically feasible due to a large amount of the sealant loss in a large substrate.

Then, the liquid crystal droplets 5307 are placed onto the lower substrate 5321 to form a liquid crystal layer. The liquid crystal may be contaminated when the liquid crystal meets the main sealant 5370 before the main sealant 5370 is hardened. Therefore, the liquid crystal droplets may have to be dropped onto the central part of the lower substrate 5351. The liquid crystal droplets 5307 dropped at the central part spread slowly even after the main sealant 5370 is hardened, so that it is distributed evenly throughout the entire substrate with the same concentration.

FIG. 162B illustrates that both the liquid crystal droplets 5307 and the sealants 5370 and 5380 are coated on the lower substrate 5351. However, as an alternative in practicing the present invention, the liquid crystal droplets 5307 may be formed on the upper substrate 5352, while the UV sealants 5370 and 5380 may be coated on the lower substrate 5351.

Moreover, the liquid crystal droplets 5307 and the UV sealants 5370 and 5380 may be formed on the same substrate. However, the liquid crystal and the sealant may have to be formed on different substrates in order to shorten the fabrication time period. When the liquid crystal droplets 5307 and the UV sealants 5370 and 5380 are formed on the same substrate, there occurs an unbalance in the fabricating process between the substrate with the liquid crystal and the sealant and the substrate without the liquid crystal. For example, the substrate may not be cleaned when the sealant is contaminated before the substrates are attached to each other since the liquid crystal and the sealant are formed on the same substrate.

Spacers may be formed on either of the two substrates 5351 or 5352 for maintaining a cell gap. The spacers may be sprayed at a high pressure onto the substrate from a spray nozzle mixed with ball spacers and a solution having an appropriate concentration. Alternatively, column spacers may be formed on portions of the substrate of the gate lines or data lines. The column spacers may be used for the large sized substrate since the ball spacers may cause an uneven cell gap for the large sized substrate. The column spacers may be formed of a photosensitive organic resin.

Figure 162C:
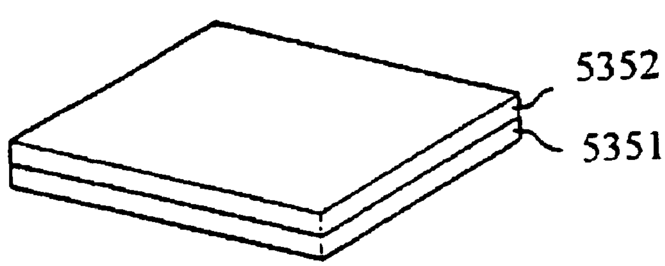

Referring to FIG. 162C, the lower substrate 5351 and the upper substrate 5352 are attached to each other. The lower substrate 5351 and the upper substrate 5352 may be bonded by the following processes. First, one of the substrates having the liquid crystal dropped thereon is placed at the lower side. The other substrate is turned by 180 degrees so that the side of the substrate at the upper side having layers faces into the upper surface of the substrate at the lower side. Thereafter, the substrate at the upper side is pressed, or the space between the substrates is evacuated, and releasing the vacuum, thereby attaching the two substrates.

Figure 162D:
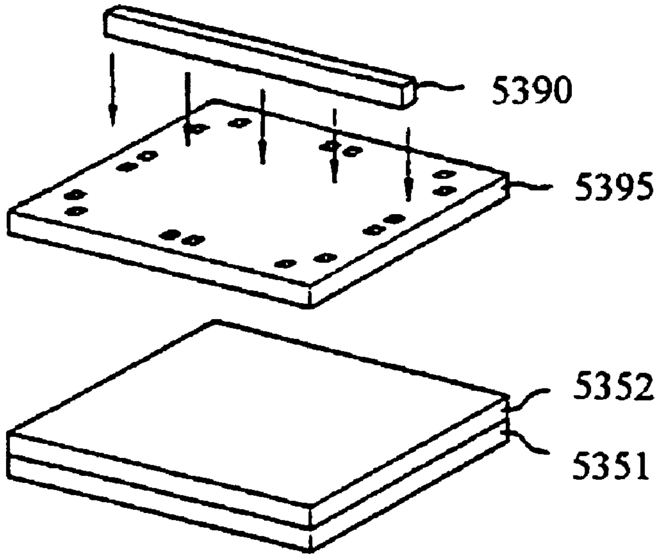

Then, referring to FIG. 162D, a mask 5395 is placed between the attached substrates 5351 and 5352 and a UV irradiating device 5390 for masking the overlapping region between the dummy UV sealant 5380 and the scribing line. A UV ray is then irradiated thereon. Upon irradiating the UV ray, monomers or oligomers are polymerized and hardened, thereby bonding the lower substrate 5351 and the upper substrate 5352.

The region masked by the mask 5395 is shaded from the U ray, so that the dummy UV sealant at this region is not hardened. Thus, the dummy UV sealant remains an initial coating condition, i.e., fluidic condition, so that the cell cutting process after the bonding process becomes easy.

Monomers or oligomers each having one end coupled to the acrylic group and the other end coupled to the epoxy group mixed with an initiator are used as the UV sealants 5370 and 5380. Since the epoxy group is not reactive with the UV irradiation, the sealant may have to be heated at about 120° C. for one hour after the UV irradiation for hardening the sealant. However, even if the dummy sealant is eventually hardened by the thermal process, the hardening ratio drops below 50%, such that the dummy sealant gives no influence to the cell cutting process.

Figure 162E:
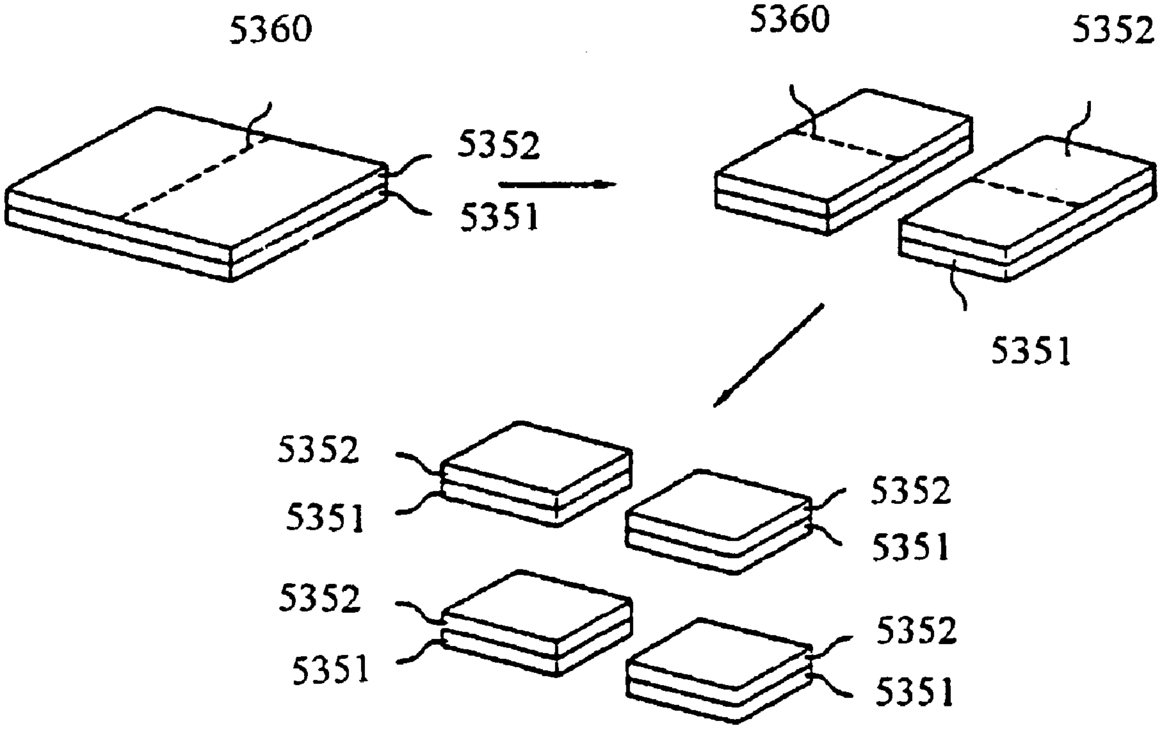

FIG. 162E illustrates that the bonded substrates are cut into the individual cells. In the cutting process, a cutting device of diamond such as a pen or a toothed wheel is used to cut the unit cells one by one along the scribe lines 5360 by the simultaneous scribing and breaking processes. The use of the cutting device that can carry out the simultaneous scribing and breaking processes may reduce both the space occupied by the device and the cutting time period.

A final inspection (not shown) is carried out after the cutting process. In the final inspection, presence of defects is determined before the substrates cut into the unit cells are assembled, by examining an operation condition of the pixels when a voltage applied thereto is turned on/off.

FIGS. 163A to 163C illustrate expanded perspective views each showing the UV irradiation process in the fabricating method of an LCD in accordance with a second embodiment of the present invention. All the fabricating process is similar to the first embodiment except for the UV irradiation process.

In the simultaneous scribing and breaking processes, when the substrates are cut in up and down directions starting from the scribe line at the end of the right or left side, the dummy UV sealant on the right or left side may be removed. Therefore, the removed dummy UV sealant gives no influence to the following cell cutting process.

Accordingly, the same result may be obtained in with masking the cell cutting process even if the UV ray is irradiated after upper and lower side regions of the dummy UV sealant overlapped the cell cutting lines, or only left and right side regions of the dummy UV sealant overlapped the scribing lines.

FIG. 163A illustrates the UV irradiation process, with masking only upper and lower side regions of the dummy UV sealant overlapping the cell cutting lines by using a mask 5395*a*. FIG. 163B illustrates the UV irradiation process, with masking only left and right side regions of the dummy UV sealant overlapping the cell cutting lines by using the mask 5395*a*. FIG. 163A is applicable to an embodiment where upper and lower end portions are cut first, while FIG. 163B is applicable to an embodiment where left and right end portions are cut first.

FIG. 163C illustrates a perspective view showing the UV irradiation process in the method for fabricating an LCD in accordance with a second embodiment of the present invention.

In the UV irradiation, if UV is irradiated to the entire surface of the attached substrates, the UV ray may deteriorate device characteristics of the thin film transistors on the substrates, and change a pre-tilt angle of the orientation film formed for the initial orientation of the liquid crystal.

Therefore, in FIG. 163C, the second embodiment of the present invention suggests irradiating the UV after a mask 5395*c* is placed between the attached substrates 5351 and 5352 and the UV irradiating device 5390, for masking the regions where the dummy UV sealant 5380 and the scribing lines are crossed, and the active regions inside the main UV sealant 5370.

As has been explained, the method for fabricating a liquid crystal display panel of the present invention has the following advantages.

The UV irradiation with masking the crossed regions of the dummy UV sealant and the scribing lines makes cell cutting by the simultaneous scribing and breaking processes easier since the dummy UV sealant on the scribing lines is not hardened.

The UV irradiation with masking the active regions in the main UV sealant prevents the UV irradiation from deteriorating characteristics of the thin film transistors, orientation films, and the like, formed on the substrates.

FIG. 164 is a schematic view of a UV irradiating device according to the first embodiment of the present invention.

As shown in FIG. 164, the UV irradiating device according to the first embodiment of the present invention includes a UV light source 5410, a support 5420, and a substrate stage 5430 on which a substrate to be irradiated with a UV light will be placed. The UV light source 5410 includes a UV lamp 5412 and a reflecting plate 5414 on which the UV lamp 5412 is disposed. The support 5420 supports the UV light source 5410 and is moveable to tilt with respect to a horizontal plane.

At this time, a high pressure mercury UV lamp, metal halide UV lamp, or metal UV lamp may be used as the UV lamp 5412.

The reflecting plate 5414 shields the UV lamp 5412, and an inner reflecting surface on which the UV lamp 5412 is placed such that the irradiated UV is reflected in a constant straight line as shown. Therefore, an irradiating angle of the UV light source depends on the tilt angle of the UV light source 5410.

The support 5420 is driven to tilt with respect to a horizontal plane around a driving axis. The tilt angle $\theta_1$ of the support 5420 is within the range of 0° to 90°.

Therefore, if the tilt angle $\theta_1$ of the support 5420 is changed, the UV light source from the UV light source 5410 is irradiated at an angle of $\theta_2$ with respect to a vertical plane where $\theta_1=\theta_2$ according to geometric principles.

Although the support 5420 is shown at an angle of $\theta_1$ with respect to the horizontal plane, the support 5420 may be driven upwardly at an angle of $-\theta_1$. Alternatively, the driving axis of the support 5420 may be changed from right of the support 5420 to left of the support 5420 or may be formed at the center of the support 5420, or at any other location along the support 5420.

The substrate stage 5430 is horizontal to receive an attached substrate to which a sealant has been applied. Also, for mass production, the substrate stage 5430 may be formed to move by means of a conveyer belt.

Meanwhile, if the substrate is large, it may be difficult for one UV light source 5410 to uniformly irradiate UV the whole substrate. Accordingly, a UV irradiating device provided with a plurality of UV light sources may be required.

FIGS. 165A and 165B are schematic views of a UV irradiating device provided with a plurality of UV light sources. As shown in FIG. 165A, a plurality of UV light sources 5410*b*, and 5410*c* may be supported by one support 5420. As shown in FIG. 165B, the UV light sources 5410*a*, 5410*b*, and 5410*c* may respectively be supported by respective supports 5420*a*, 5420*b*, and 5420*c*.

In case of FIG. 165A, the distance between each respective light source 5410*a*, 5410*b*, and 5410*c* of the UV irradiating device and the substrate may differ. Thus, the intensity of irradiation from the respective UV light sources onto the substrate surface, and thus onto the sealant to be cured, may differ. In case of FIG. 165B, the distance between each respective UV light source 5410*a*, 5410*b*, and 5410*c* and the substrate will be substantially the same, and, thus, the irradiating characteristics of the UV light from the respective UV light sources 5410*a*, 5410*b*, and 5410*c* will be substantially the same.

FIG. 166 is a schematic view of a UV irradiating device according to the second embodiment of the present invention.

As shown in FIG. 166, the UV irradiating device according to the second embodiment of the present invention includes a UV light source 5410, a support 5420, and a substrate stage 5430. The UV light source 5410 includes a UV lamp 5412 and a reflecting plate 5414 on which the UV lamp 5412 is disposed. The support 5420 supports the UV light source 5410 and is horizontal in a fixed state. A substrate to be irradiated with UV light will be placed on the substrate stage 5430. The substrate stage 5430 is moveable to tilt with respect to a horizontal plane.

In other words, in the UV irradiating device according to the second embodiment of the present invention, the substrate stage 5430 is moveable at a tilt angle instead of the support 5420 so that a UV light is irradiated upon the substrate stage 5430 at a tilt angle.

A high pressure mercury UV lamp, metal halide UV lamp, or metal UV lamp may be used as the UV lamp 5412. The reflecting plate 5414 shields the UV lamp 5412, and an inner reflecting surface on which the UV lamp 5412 is placed is formed such that the irradiated UV is reflected in a constant straight line or collimated.

The support 5420 is horizontally placed in a fixed state. Accordingly, the UV light source is vertically irradiated from the UV light source part 5410.

The substrate stage 5430 is driven to tilt with respect to a horizontal plane around a driving axis. The tilt angle θ of the substrate stage 5430 is within the range of 0° to 90°.

Therefore, if the tilt angle θ of the substrate stage 5430 is changed, the UV light source from the UV light source part 5410 is irradiated at a tilt angle of θ with respect to a vertical plane of the substrate stage 5430.

Although the substrate stage 5430 is shown at an angle of θ with respect to the horizontal plane, the substrate stage 5430 may be driven downwardly at an angle of −θ. Alternatively, the driving axis of the substrate stage 5430 may be changed from right of the substrate stage 5430 to left of the substrate stage 5430 or may be formed at the center of the substrate stage 5430 or at any other location along the substrate stage 5430.

A plurality of UV light sources can be used for a large substrate so that a large area of the substrate may be irradiated simultaneously.

FIG. 167 is a schematic view of a UV irradiating device according to an embodiment of the present invention.

As shown in FIG. 167, the UV irradiating device according to the third embodiment of the present invention includes a UV light source 5410, a support 5420, and a substrate stage 5430. The UV light source 5410 includes a UV lamp 5412 and a reflecting plate 5414 on which the UV lamp 5412 is disposed. Also, the reflecting plate 5414 is formed such that a UV light source is irradiated at a tilt angle θ with respect to a vertical plane. The support 5420 supports the UV light source 5410. A substrate to be irradiated with a UV light source will be placed on the substrate stage 5430.

In other words, in the UV irradiating device according to the third embodiment of the present invention, the support 5420 and the substrate stage 5430 are fixed in horizontal plane (or two parallel planes), and an inner reflecting surface of the reflecting plate 5414 is formed so that UV reflected on the reflecting plate 5414 is irradiated onto the substrate at a tilt angle.

A high pressure mercury UV lamp, metal halide UV lamp, or metal UV lamp may be used as the UV lamp 5412. The substrate stage 5430 may be moveable in the horizontal plane or moveable to be tilted with respect to the horizontal plane.

Since the inner reflecting surface of the reflecting plate 5414 is formed such that the irradiated UV is reflected at a tilt angle, the UV light from the UV light source 5410 is irradiated at a tilt angle of θ against a vertical plane of the substrate stage 5430 (e.g., at an angle of 90°−θ with respect to a horizontal plane if the substrate stage 5430 is in the horizontal plane). At this time, the tilt angle of θ can be adjusted by varying a shape of the inner reflecting surface of the reflecting plate 5414.

FIGS. 168A to 168D are perspective views illustrating an embodiment of a method of manufacturing an LCD device in accordance with the principles of the present invention.

Although the drawings illustrate only one unit cell, a plurality of unit cells may be formed depending upon the size of the substrate.

Figure 168A:
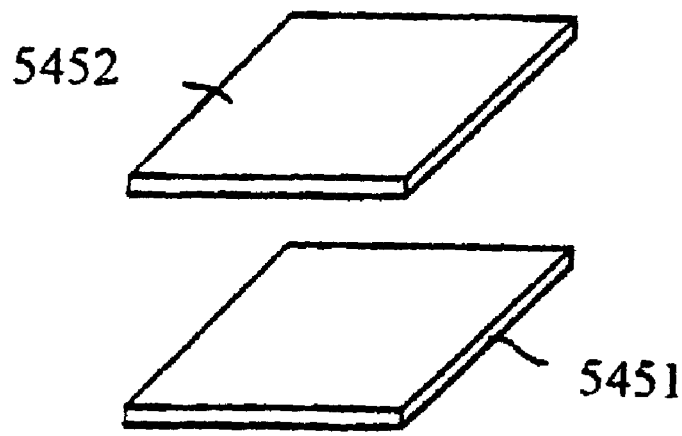
Figure 168B:
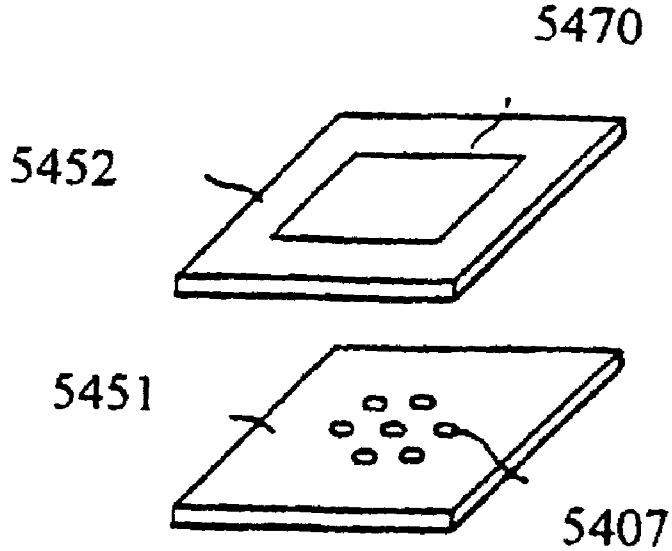

Referring to FIG. 168B, a lower substrate 5451 and an upper substrate 5452 are prepared. A plurality of gate and data lines (not shown) are formed on the lower substrate 5451. The gate lines cross the data lines to define a pixel region. A thin film transistor (not shown) having a gate electrode, a gate insulating layer, a semiconductor layer, an ohmic contact layer, source/drain electrodes, and a protection layer is formed at a crossing point of the gate lines and the data lines. A pixel electrode (not shown) connected with the thin film transistor is formed in the pixel region.

An alignment film (not shown) is formed on the pixel electrode for initial alignment of the liquid crystal. The alignment film may be formed of polyamide or polyimide based compound, polyvinylalcohol (PVA), and polyamic acid by rubbing. Alternatively, the alignment film may be formed of a photosensitive material, such as polyvinvylcinnamate (PVCN), polysilioxanecinnamate (PSCN) or cellulosecinnamate (CelCN) based compound, by using photo-alignment method.

A light-shielding layer (not shown) is formed on the upper substrate 5452 to shield light leakage from the gate lines, the data lines, and the thin film transistor regions. A color filter layer (not shown) of R, G, and B is formed on the light-shielding layer. A common electrode (not shown) is formed on the color filter layer. Additionally, an overcoat layer (not shown) may be formed between the color filter layer and the common electrode. The alignment film is formed on the common electrode.

Silver (Ag) dots (not shown) are formed outside the lower substrate 5451 to apply a voltage to the common electrode on the upper substrate 5452 after the lower and upper substrates 5451 and 5452 are bonded to each other. Alternatively, the silver dots may be formed on the upper substrate 5452.

In an in plane switching (IPS) mode LCD, the common electrode is formed on the lower substrate like the pixel electrode so that an electric field can be horizontally induced between the common electrode and the pixel electrode. In such case, the silver dots are not formed on the substrates.

Referring to FIG. 168B, a UV sealant 5470 is formed on one of the lower and upper substrates 5451 and 5452, and a liquid crystal 5407 is applied on one of the lower and upper substrates 5451 and 5452. In more detail, the liquid crystal 5407 is applied on the lower substrate 5451 to form a liquid crystal layer, and the UV sealant 5470 is formed on the upper substrate 5452. However, the liquid crystal 5407 may be formed on the upper substrate 5452, or the UV sealant 5470 may be formed on the lower substrate 5451.

Alternatively, both the liquid crystal 5407 and the UV sealant 5470 may be formed on one substrate. However, in this case, there is an imbalance between the processing times of the substrate with the liquid crystal and the sealant and the substrate without the liquid crystal and the sealant. For this reason, the manufacturing process time increases. Also, in the case that the liquid crystal and the sealant are formed on one substrate, the substrate may not be cleaned even if the sealant is contaminated before the substrates are bonded to each other.

Accordingly, a cleaning process for cleaning the upper substrate 5452 may additionally be provided before the bonding process after the UV sealant 5470 is formed on the upper substrate 5452.

At this time, monomers or oligomers each having both ends coupled to the acrylic group, mixed with an initiator are used as the UV sealant 5470. Alternatively, monomers or oligomers each having one end coupled to the acrylic group and the other end coupled to the epoxy group, mixed with an initiator are used as the UV sealant 5470. Such a UV sealant 5470 is formed in a closed pattern by using a dispensing method or a screen printing method.

The liquid crystal 5407 may be contaminated if it comes into contact with the sealant 5470 before the sealant 5470 is hardened. Accordingly, the liquid crystal 5407 may preferably be applied on the central part of the lower substrate 5451. In this case, the liquid crystal 5407 is gradually spread even after the sealant 5470 is hardened. Thus, the liquid crystal 5407 is uniformly distributed on the surface of the substrate.

Meanwhile, spacers may be formed on either of the two substrates 5451 and 5452 to maintain a cell gap. Preferably, the spacers may be formed on the upper substrate 5452.

Ball spacers or column spacers may be used as the spacers. The ball spacers may be formed in such a manner that they are mixed with a solution having an appropriate concentration and then spread at a high pressure onto the substrate from a spray nozzle. The column spacers may be formed on portions of the substrate corresponding to the gate lines or data lines. Preferably, the column spacers may be used for the large sized substrate since the ball spacers may cause an uneven cell gap for the large sized substrate. The column spacers may be formed of a photosensitive organic resin.

Figure 168C:
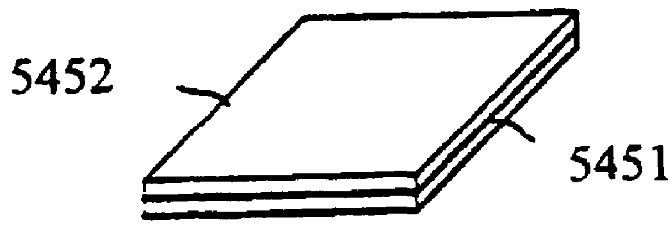

Referring to FIG. 168C, the lower substrate 5451 and the upper substrate 5452 are attached to each other by the following processes. First, one of the substrates having the liquid crystal applied thereon is placed at the lower side. The other substrate is turned by 180 degrees, e.g. flipped so that layers on the upper substrate face the substrate layers on the lower side, and so that the upper substrate is above the lower substrate. Thereafter, the substrate at the upper side is pressed, so that both substrates are attached to each other. Alternatively, the space between the substrates may be maintained under the vacuum state so that both substrates are attached to each other by releasing the vacuum state.

Figure 168D:
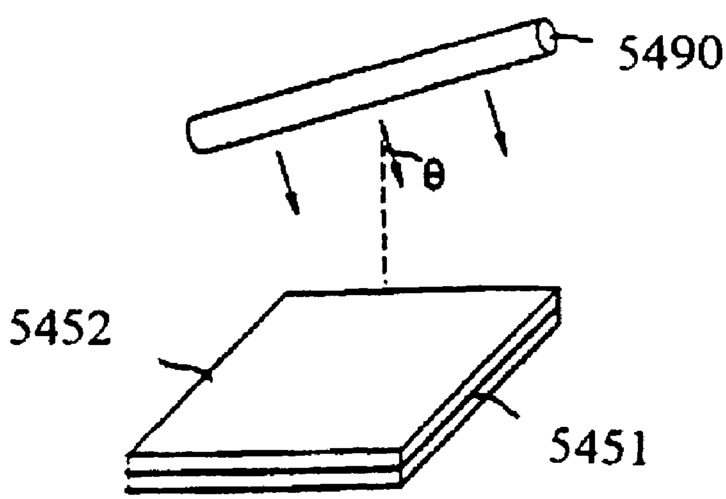

Then, referring to FIG. 168D, the attached substrate is horizontally arranged and a UV light source 5490 is irradiated at a tilt angle of θ with respect to a plane vertical to the substrate. Various light irradiating devices as described in the first and third embodiments may be used to irradiate the UV light source 5490 at a tilt angle.

Although the UV light source 5490 has been formed above the attached substrate in the drawing, it may be formed below the attached substrate. The upper substrate surface or the lower substrate surface of the attached substrate may be used as a UV irradiating surface of the UV light source.

Upon irradiating the V, monomers or oligomers activated by an initiator constituting the UV sealant are polymerized and hardened, thereby bonding the lower substrate 5451 to the upper substrate 5452. If the UV is irradiated at a tilt angle with respect to the substrate, the sealant is hardened even if a light-shielding layer or a metal line layer overlaps the UV sealant. Thus, adherence between the substrates is not comprised.

If monomers or oligomers each having one end coupled to the acrylic group and the other end coupled to the epoxy group, mixed with an initiator are used as the UV sealant 5470, the epoxy group is not completely polymerized. Therefore, the sealant may have to be additionally heated at about 120° C. for one hour after the UV irradiation, thereby hardening the sealant completely.

Meanwhile, FIG. 169A is a sectional view illustrating a process of irradiating UV upon an attached substrate having a light-shielding layer 5480 overlapping a sealant 5470 at a tilt angle of θ with respect to a plane vertical to the substrate, and FIG. 169B is a table illustrating a hardening rate of the sealant 5470 according to a change of a tilt angle of θ.

As will be aware of it from FIG. 169B, when the tilt angle of θ is within the range of 30° to 60°, the hardening rate of the sealant 5470 is 80% or greater. To compensate for angular shadows that may prevent some sections of the sealant 5470 from hardening completely or to a maximum possible extend, the UV light may be applied over a range of angles from 0°-90° or 0°-180° or any suitable range, either discretely or continuously.

Although not shown, the process of cutting a substrate into a unit cell after the UV irradiation and the final test process are performed.

In the cutting process, a cutting line is formed on a surface of the substrates with a pen or wheel of a material having hardness higher than that of glass, e.g., diamond (scribing process), and then the substrate is cut along the cutting line by mechanical impact (breaking process). Alternatively, the scribing process and the breaking process may simultaneously be performed using a pen or wheel of a the high hardness material having a toothed shape.

The final test process is to check whether there are any defects before a unit cell is assembled into a liquid crystal module. In the final test process, the liquid crystal module is tested to determine whether each pixel is driven properly when a voltage is applied or no voltage is applied.

FIGS. 170A to 170D are perspective views illustrating a method of manufacturing an LCD device according to principles of the present invention.

Figure 170A:
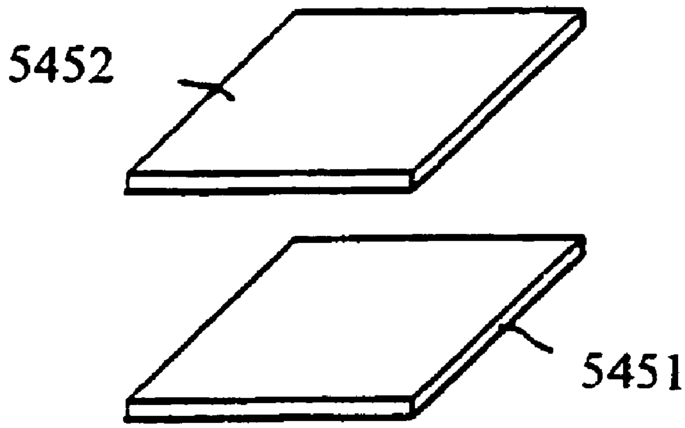
Figure 170B:
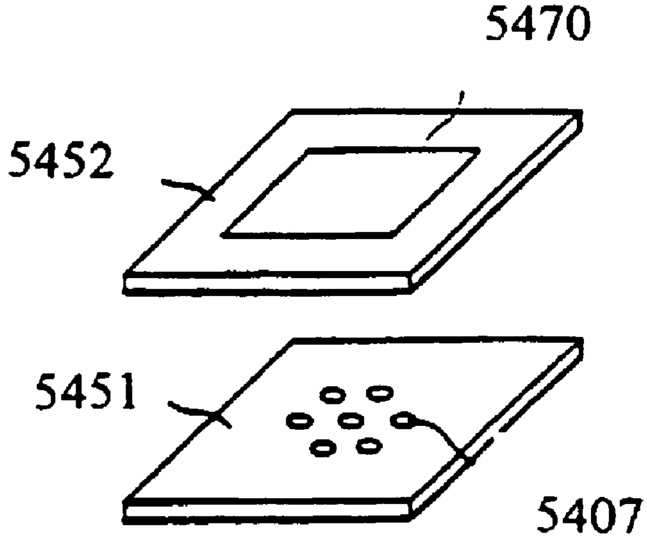
Figure 170C:
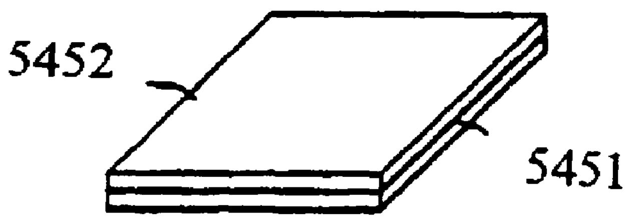
Figure 170D:
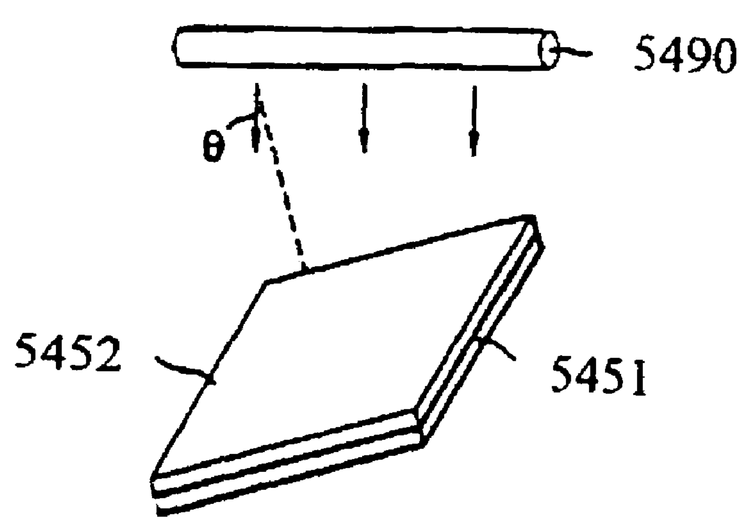

As shown in FIG. 170A, a lower substrate 5451 and an upper substrate 5452 are prepared. As shown in FIG. 170B, a UV sealant 5470 is formed on the upper substrate 5452, and a liquid crystal is applied on the lower substrate 5451. As shown in FIG. 170C, the lower substrate 5451 and the upper substrate 5452 are attached to each other. As shown in FIG. 160D, the attached substrates are located tilt and a UV light source 5490 is vertically irradiated upon the attached substrates.

The present embodiment is similar to the previous embodiment of the method except for the UV irradiation process. That is, according to the present embodiment unlike the previous embodiment, the attached substrates are placed at a tilt angle and the UV is vertically irradiated.

To tilt the attached substrate, a light irradiating device according to the second embodiment can be used.

Since the other elements of the present embodiment are identical to those of the previous embodiment, the same reference numerals will be given to the same elements and their detailed description will be omitted.

FIGS. 171A to 171D are perspective views illustrating another embodiment of the method of irradiating UV in manufacturing an LCD device according to the present invention.

In the UV irradiation, if UV is irradiated upon the entire surface of the attached substrate, the UV may deteriorate characteristics of devices such as a thin film transistor on the substrate or may change a pre-tilt angle of an alignment film formed for the initial alignment of the liquid crystal.

Therefore, in the present embodiment of the present invention shown in FIGS. 161A to 161D, UV light is irradiated at a tilt angle and areas where the sealant is not formed are covered with a mask.

Figure 171A:
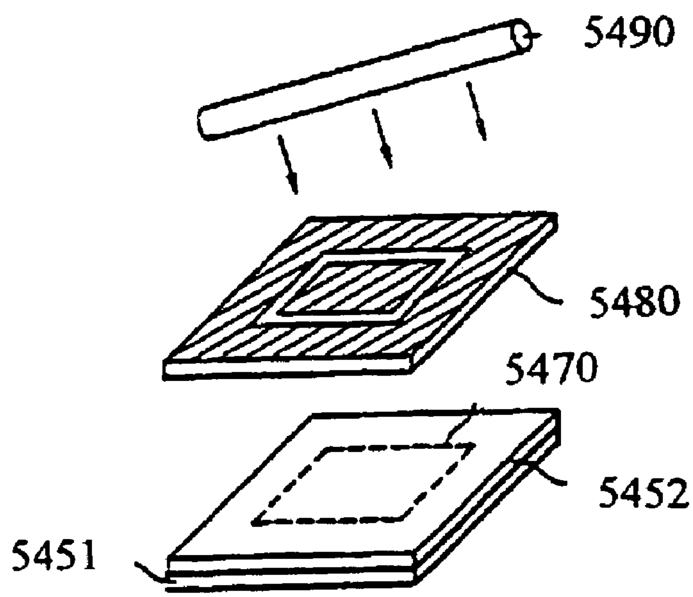

Referring to FIG. 171A, the attached substrates are placed in a horizontal direction, and a mask 5480 that covers the area where the sealant 5470 is not formed is placed in parallel with the attached substrates. The UV light source 5490 is then irradiated at a tilt angle.

At this time, it is preferable that the distance between the surface of the attached substrates and the mask 5480 is within the range of 1 mm to 5 mm.

Figure 171B:
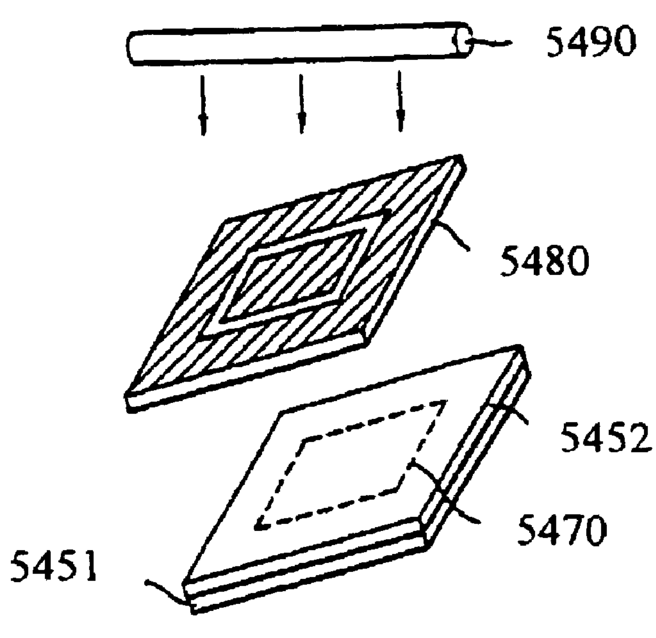

Referring to FIG. 171B, the attached substrates are tilted, and the mask 5480 that covers the area where the sealant 5470 is not formed is placed in parallel with the attached substrates. The UV light source 5490 is vertically irradiated.

Figure 171C:
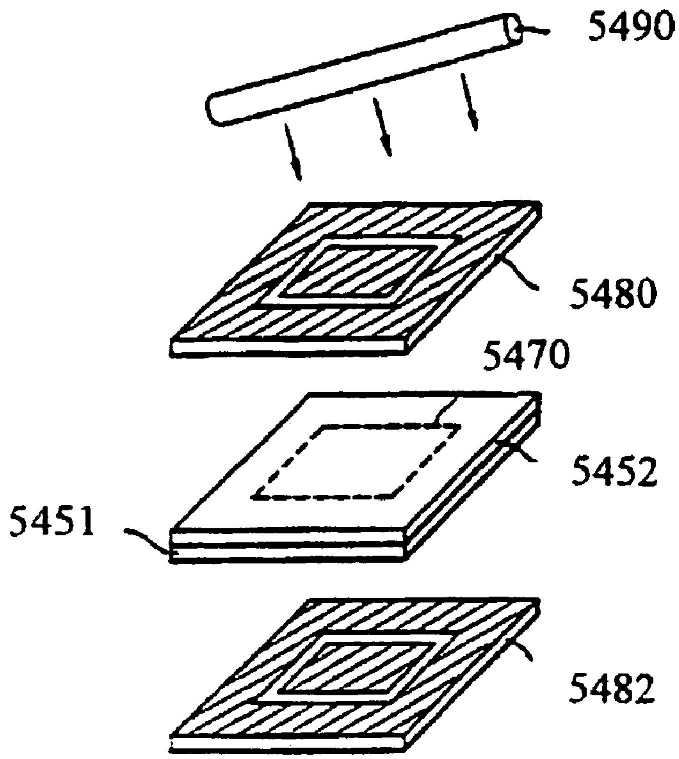

Referring to FIG. 171C, masks 5480 and 5482 that cover the area that lacks the sealant 5470 are formed at upper and lower sides of the attached substrates. In FIG. 171C, the attached substrates and the masks 5480 and 5482 are placed in a horizontal direction while the UV light source 5490 is irradiated at a tilt angle. The attached substrates and the masks 5480 and 5482 may be tilted while the UV light source 5490 may vertically be irradiated.

Once the masks 5480 and 5482 are formed at upper and lower sides of the attached substrates, the irradiated UV light is reflected so that the UV light is prevented from being irradiated upon the area lacking the sealant.

Figure 171D:
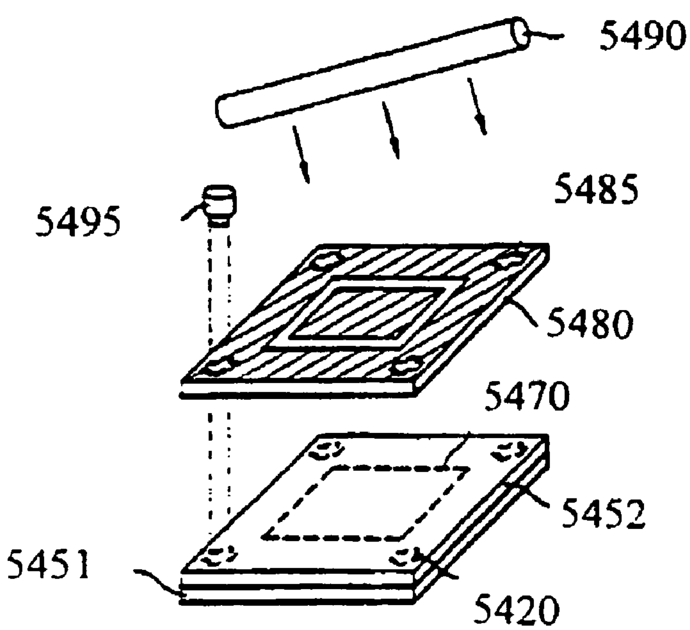

Referring to FIG. 171D, alignment marks 5420 and 5485 are formed in the attached substrates and the mask 5480 to accurately cover the area lacking the sealant 5470. The position of the attached substrates and the mask 5480 is adjusted by a camera 5495 checking the alignment marks 5420 and 5485.

The alignment mark 5420 of the attached substrates may be formed on either the upper substrate 5452 or the lower substrate 5451 of the attached substrates.

Referring to FIG. 171D, although the attached substrates and the mask 5480 are placed horizontally while the UV light source 5490 is irradiated at a tilt angle, the attached substrates and the mask 5480 may be tilted while the UV light source 5490 may vertically be irradiated. The masks with alignment marks may respectively be formed at upper and lower sides of the attached substrates.

FIG. 172 is a flowchart illustrating a method of manufacturing an LCD according to the present invention.

As shown in FIG. 172, an upper substrate is prepared and an alignment film is formed thereon. A sealant is then formed on the alignment film, thereby completing the upper substrate. Also, a lower substrate is prepared and an alignment film is formed thereon. A liquid crystal is then applied on the alignment film, thereby completing the lower substrate. At this time, the process of manufacturing the upper substrate and the process of manufacturing the lower substrate are simultaneously performed. The liquid crystal and the sealant may selectively be formed on the substrate.

Afterwards, the completed upper and lower substrates are attached to each other. The UV light is then irradiated to harden the sealant, thereby bonding the substrates. The substrates are cut into unit cells, and the final test process is performed, thereby completing one liquid crystal cell.

As aforementioned, the method of manufacturing an LCD according to the present invention has the following advantages.

The UV light is irradiated at a tilt angle upon the substrates where the UV sealant is formed. The sealant can thus be hardened even if the light shielding layer or the metal line layer is formed between the UV-irradiating surface and the sealant.

In addition, since the UV light is irradiated upon the substrate at a tilt angle in a state that the region where the sealant is not formed is covered with the mask, it is possible to prevent the thin film transistor or the alignment film formed on the substrate from being damaged.

Furthermore, since the substrate stage on which the attached substrates are placed is movably formed, yield is improved.

FIG. 173 is a flow chart showing an alignment process according to the present invention, FIG. 174 is a flow chart of a gap process according to the present invention, FIG. 173 shows an exemplary diagram of substrates having good and no-good (NG) substrate panel areas according to the present invention, and FIG. 176 shows a process layout of a process line according to the present invention. An array process and a color filter process (not shown) are performed to provide a first substrate and a second substrate, each having a plurality of substrate panel areas. Some of the substrate panel areas are good; some are no-good (NG). The good and NG substrate panel areas can be identified by electrical testing and visual testing. The first substrate and the second substrate include a TFT unit substrate and a CF unit substrate. After the array process and the color filter process are finished, the first substrate and the second substrate are loaded in first and second cassettes and transported to another production line that assembles the first and second substrates together.

A process for fabricating unit liquid crystal areas is described as follows. The overall process involves three separate production lines, each having loaders and unloaders. Those productions lines include an alignment process line, a gap process line, and a test process line.

The alignment process line carries out a cleaning process, an alignment layer printing process, an alignment layer curing process, a rubbing process, and a testing process. The gap process line carries out a cleaning process, a liquid crystal dropping process, a sealing material dropping process, a vacuum assembling process, and a sealing material curing process. The test process line carries out a scribe/break process, a grinding process, and a liquid crystal panel testing process.

FIG. 173 shows the operation of the alignment process line. A cleaning process 5520S is performed to remove particles. Then, an alignment layer forming process 5521S prints an alignment layer. In the alignment layer forming process 5521S a solution of an alignment material is dropped between a Doctor roll and an Anilox roll that rotates in a dispenser. This alignment material is maintained as a liquid film on the face of the Anilox roll. Alignment material is removed from the Anilox roll to a print roll having a print rubber plate. With the substrate fixed on a coating machine stage, the alignment material on the printing roll is printed onto the substrate.

Still referring to FIG. 173, the plasticizing process 5522S cures the alignment layer. In a process 5522S, a solvent in the alignment material printed on the substrate is driven off, and/or the alignment material is polymerized.

Still referring to FIG. 173, the inspection process 5523S inspects the alignment layer, and a rubbing process 5524S rubs the alignment layer to produce an alignment surface. Then, the rubbing process 5523S is carried. Finally, the test process 5524S tests the alignment layer to locate NG unit substrate areas based on defective alignment layers. For example, NG unit substrate areas can be found from a visual inspection. That information is stored in a computer or other type of processing unit. It should be noted that the alignment process is performed on both the first and second substrates.

After completion of the alignment process, the first substrate and second substrate are un-loader onto third and fourth cassette. Then, the third cassette and the fourth cassette are loaded by a loader of the second processing line that produces gap. The second line is divided into a first gap process line for processing the first substrate, a second gap process line for processing the second substrate, and an assembling line for assembling the first substrate and second substrate. That is, the two separate lines are used for processing the first substrate (say having TFT unit substrate areas) and the second substrate (say with CF unit substrate areas). The assembling line is a continuous line.

A gap process is carried out as follows.

As shown in FIG. 174, the selected substrates are cleaned (5525S). The first substrate is passed by a liquid crystal dispensing apparatus, and the second substrate is passed by an Ag dispensing apparatus and a seal dispensing apparatus.

Ag dots are formed, step 5526S, on the second substrate for enabling electrical connection between the common electrode of a plurality of the unit CF substrate areas and the pixel electrodes on a plurality of the unit TFT substrate areas. A sealing material is coated, in step 5527S, on peripheral portions of each unit CF substrate areas. As a sealing material, a photosensitive resin or a thermally curable resin may be used. After the first substrate and the second substrate are assembled, the sealing material is cured by photo or thermal treatment.

Meanwhile, in the liquid crystal dispensing process, liquid crystal is dropped, step 5528S, onto each substrate panel area of the TFT substrate. Those substrate panel areas correspond to substrate panel areas on the CF substrate.

The liquid crystal dropping process 5528S is carried out as follows. First, dissolved air in a liquid crystal contained in a liquid crystal container is removed by a vacuum. The liquid crystal container is assembled into a liquid crystal syringe on a head of a liquid crystal dispensing apparatus. Liquid crystal is then dropped to form liquid crystal dots having a uniform pitch on each unit TFT substrate areas.

Referring to step 5530S, the first substrate and the second substrate processed by the above processes are loaded into a vacuum chamber and assembled into a composite liquid crystal panel. Here, the liquid crystal is uniformly spread out over the substrate panel areas to form unit liquid crystal panel areas. Thereafter, the seal material is cured to form a composite liquid crystal panel having a plurality of unit liquid crystal panel areas formed from two substrate panel areas.

The assembling process 5530S is performed as follows.

First, the first substrate is mounted on a table in a vacuum vessel that enables movement in a horizontal direction, beneficially using a first suction device. Then, the second substrate is affixed by vacuum suction to second suction devices such that the second substrate is over the first substrate. The vacuum chamber is then closed and a vacuum is formed. The second suction device then descends so as to leave a predetermined interval between the first and second substrates. The first substrate is then moved horizontally so as to align with the second substrate.

Subsequently, the second suction device descends such that the second substrate is mated to the first substrate via the sealant. The first and second substrates are then pressurized together such that the unit liquid crystal panel areas are filled with the liquid crystals (which spread across the unit liquid crystal panel areas). Thus, a composite liquid crystal panel having a plurality of unit liquid crystal panel areas is fabricated. Thereafter, the composite liquid crystal panel is removed from the vacuum chamber and irradiated by UV light to cure the sealing material. Testing of the composite liquid crystal panel is then beneficially performed. Information regarding NG unit substrate areas is gathered and stored for subsequent use.

The composite liquid crystal panel has a plurality of unit liquid crystal panel areas the corresponding to the TFT and CF substrate panel areas. FIG. 175 shows nine TFT substrate panel areas 5630 and nine CF substrate panel areas 5640 that are formed on first and second substrates 5651 and 5652, respectively. The first and second substrates 5651 and 5652 may include NG (no good) TFT or CF substrate panel areas produced by the array and color filter forming processes.

Information about the NG substrate panel areas is stored in a central processing unit that handles all information regarding the process lines. Such information is transmitted to a local processing unit of a test process line that will be subsequently later.

Meanwhile, after completing the gap process the composite liquid crystal panel is loaded into the third line. The third line is a continuous production line that cuts the liquid crystal panel into a plurality of individual liquid crystal panels, a grinding process for grinding the cutting faces of the individual liquid crystal panels, and a test process for checking the appearance of the individual liquid crystal panels and for identifying electric failures.

FIG. 176 illustrates the processing layout of a test line 5680 according to the present invention. As shown, a cassette (not shown) holding a plurality of composite liquid crystal panels is arranged on a loader 5681. The composite liquid crystal panels are then cut into individual liquid crystal panels.

The cutting process 5630S produces a plurality of individual liquid crystal panels by forming grooves having a predetermined depth in the composite liquid crystal panels using a cutting wheel that is pressed at a predetermined pressure into the composite liquid crystal panel. That panel is then cut by propagating a crack downward using an external impact.

Subsequently, an inspection step 5631S is performed. That step checks the state of cut portions of the individual liquid crystal panels to determine whether a burr remains along the cut line of the individual liquid crystal panels.

The cut individual liquid crystal panels then pass by a buffer station 5600 on their way to a grinding process, reference step 5632S, that grinds the cut faces of the unit liquid crystal panels (5632S). However, before the grinding process 5632S, according to the embodiment of the present invention, a local processing unit 5690 receives information regarding NG unit substrate areas. That information, which is beneficially received from a central processing unit, enables the buffer station 5600 to determine whether a particular individual liquid crystal panel that passes the buffer station 5600 is known to be defective (NG) because it was made from at least one NG substrate panel area.

The unit liquid crystal panels that are not known to be defective (because they were made from good substrate panel areas) pass to the grinding process. However, NG individual liquid crystal panels are removed and stored in a buffer cassette. Units in the buffer cassette are subsequently discarded.

Therefore, the present invention enables a reduction of grinding and subsequent testing by removing known NG individual liquid crystal panel. This enables a reduction in worker fatigue and wasted time in processing defective units.

After grinding, a final checking step 5633S checks the appearance and electrical integrity of the individual liquid crystal panels is performed. The individual liquid crystal panels are then unloaded onto cassettes provided in an unloader 5691. This completes the fabrication process.

The checking step beneficially includes checking the appearance and A/P (Auto/Probe) testing to determine problems, such as cross-striped stains, black stains, color filter protrusions, oblique stains, rubbing stripes, pin holes, disconnection or electric shorts of gate and data lines. The stained-failure can be checked automatically by a human observer eyes or by using CCD (charge coupled device).

Thereafter, a module process (not shown) attaches a driver IC, a backlight, and the like is carried out. Accordingly, the process line in a liquid crystal display and fabrication method thereof has the following advantages or effects. The buffer cassette enables storing and handle of NG individual liquid crystal panels based on information regarding NG substrate panel areas, thereby reduce abrasion and testing steps on known defective units, which enables a reduction in worker fatigue and wasted time.

FIG. 177 schematically illustrates a first substrate of an LC panel according to an embodiment of the present invention, FIG. 178 schematically illustrates an unit LC panel area according to an embodiment of the present invention, FIG. 179 illustrates a magnified cross-sectional view of portion 'A' of FIG. 178, FIG. 180 illustrates a flowchart of an LCD fabrication method according to an embodiment of the present invention, FIG. 181 illustrates an inspection apparatus according to an embodiment of the present invention, and FIG. 182 schematically illustrates a structural layout of a composite LC panel according to an embodiment of the present invention.

Refer to FIG. 177 and FIG. 178 for illustrations of first and second substrates 5751 and 5752, respectively a TFT array substrate and a color filter array substrate. The first substrate 5751 includes a plurality of first substrate panel areas 5751*a*, while the second substrate 5752 includes a matching set of second substrate panel areas. Completed first and second substrates 5751 and 5752 are loaded on cassettes that enter an LC (liquid crystal) fabrication line.

The first substrate panel areas 5751*a* each include a plurality of gate lines 5750 that are arranged in one direction with a predetermined interval, and a plurality of data lines 5760 are arranged in a perpendicular direction and with a predetermined interval. Matrix type pixel areas 5770 are defined by the gate and data lines 5750 and 5760. A plurality of thin film transistors TFT and pixel electrodes are formed in the pixel areas 5770. An image display area 5780 is constructed from a plurality of the pixel areas 5770. Moreover, while not shown in the drawings, a gate electrode of each of the thin film transistors TFT is connected to a corresponding gate line 5750, while a source electrode is connected to a corresponding data line 5760. A drain electrode of each of the thin film transistors is connected to the pixel electrode in the pixel area 5770. Moreover, a plurality of the gate and data lines 5750 and 5760 are connected to gate and data pads 5790 and 5710 that are disposed along the circumference of the TFT unit substrate area 5751*a*.

Additionally, first and second metal lines 5721 and 5723 are formed in the column and row directions near edges of the first substrate 5751. External terminals 5721*a* and 5723*a* are formed at ends of the first and second metal lines 5721 and 5723. The first and second metal lines 5721 and 5723 are conductive lines that will be used for testing the composite liquid crystal panel during A/P testing. The first and second metal lines 5721 and 5723 are eventually discarded.

A column shorting bar 5720 and a row shorting bar 5722 for each substrate panel area electrically shorts the ends of the gate and data lines 5750 and 5760 by connecting to the pads 5790 and 5710, respectively. The row shorting bars 5722 are electrically connected to the first metal line 5721, while the column shorting bars 5720 are electrically connected to the second metal line 5723. As a result, all of the gate lines 5750 of all of the first substrate panel areas 5751*a* are tied together, and all of the data lines 5760 of all of the first substrate panel areas 5751*a* are tied together. It should be noted that static electricity produced at any gate or data pad 5790 and 5710 is discharged into all of the first substrate panel areas 5751*a* by the shorting bars.

Referring specifically to FIG. 178, a plurality of second substrate areas 5752*a* are formed on the second substrate 5752. The second substrate areas 5752*a* each include a black matrix layer 5810 that prevents light from passing through the second substrate area 5752*a*, except in the pixel areas 5770. They also include a color filter layer for three primary colors, a common electrode along an entire face of the second substrate, and a column type spacer (advantageous for a large LCD). The column type spacer is formed to correspond to the gate and data lines on the first substrate 5751.

A black circumference part 5820 is installed so as to block unnecessary light from the external surroundings of a display part 5780. The first and second substrates 5751 and 5752 having the first and second substrate areas 5751*a* and 5752*a* are assembled to each other using a sealant 5730 made of a photo-hardened or thermo-hardened resin.

FIG. 179 illustrates a magnified cross-sectional view of the portion 'A' of FIG. 178. As shown, an insulating layer 5727 is inserted between the column and row shorting bars 5720 and 5722 on the first substrate 5751 so as to isolate the column and row shorting bars 5720 and 5722 from each other.

The above-constructed first and second substrates 5751 and 5752 are fabricated into an individual LC panels using the processing flowchart of FIG. 180. As shown, the first and second substrates are transferred, by a loader, into an LC cell processing station. The LC cell processing station performs three main steps, the steps 5900, 6000, and 6100.

The first step 5900 is an alignment process for imparting uniform directivity to the liquid crystals. The alignment process is carried out by substrate cleaning 6020S, followed by alignment layer printing 6021S, then alignment layer plasticizing 6022S, followed by alignment layer inspecting 6023S, and finally alignment layer rubbing 6024S.

Several comments about the step 5900 may be helpful. After the cleaning process 6020S remove particles the substrate is ready for printing. An alignment layer liquid is dropped between Doctor and Anilox rolls that rotate in a dispenser. The alignment layer liquid is maintained as a liquid film on the face of the Anilox roll and is transferred to a print roll having a print rubber plate. A film of the alignment layer liquid is then coated on the first and second substrates by transcription.

Subsequently, a baking process plasticizes the alignment layer, reference step 6022S. Baking then evaporates a solvent in the alignment layer liquid. The alignment layer is then inspected (step 6023S) and rubbed (step 6024).

The second step 6000 is then performed. The substrate with the alignment layer is then cleaned (step 6025S). If the substrate is a CF substrate, a sealant is coated around the second substrate panel areas, step 6026S. Notably, the sealant has no injection hole.

If the substrate is a TFT substrate, the substrate is also cleaned, step 6025S, Then, Ag dots are formed to enable electrical connections to the common electrode of the CF substrate, step 6027S. Liquid crystals are then applied to the first substrate panel areas at locations that correspond to being inside the sealant on the color filter substrate. Beneficially, the liquid crystal is applied by dropping droplets, step 6029S.

Liquid crystal dropping is performed by removing bubbles from liquid crystals using vacuum, loading an LC dropping device on an LC dispensing equipment, loading the first substrate on the LC dispensing equipment, and dropping liquid crystals on the first substrate using the LC dropping device.

While the foregoing has discussed forming a seal on the CF substrate and dropping liquid crystal on the TFT substrate, in practice, seals could be formed on TFT substrates and liquid crystal could be dropped on the CF substrate.

After step 6000, the third step 6100 is performed. The first and second substrates are assembled to each other in a vacuum assembling equipment such that the first and second substrate panel areas are opposed. Then UV-rays are irradiated onto the sealant to harden the sealant, thus forming a composite LC panel.

While not shown in the figures, the assembling process is performed as follows. First, the first substrate is mounted on a table in a vacuum vessel that enables movement in a horizontal direction, beneficially, using a first suction device. Then, the second substrate is affixed by vacuum suction to second suction devices such that the second substrate is over the first. The vacuum chamber is then closed and a vacuum is formed. The second suction device then descends so as to leave a predetermined interval between the first and second substrates. The first substrate is then moved horizontally to align with the second substrate.

Subsequently, the second suction device descends such that the second substrate is assembled to the first substrate via the sealant. The first and second substrates are then pressed together such that the liquid crystal unit panel areas are filled with the liquid crystals (which spread across the first substrate liquid crystal unit panel areas). Thus, a large LC panel having a plurality of liquid crystal unit panel areas is fabricated. Thereafter, the panel is taken out of the vacuum chamber, and is irradiated by UV light so as to cure the sealing material.

An electrical lighting inspection is then performed, reference step 6040S. The electrical lighting inspection is carried out as follows. Referring now to FIGS. 180 and 181, the large LC panel is loaded on an inspection equipment 6200 by a robot arm, reference step 6041S. The inspection equipment 6200, as shown in FIG. 181, includes a stage 6300, at least three protrusions 6310 arranged so as to have a minimum contact area between the stage 6300 and the composite LC panel put on by the robot arm, a rotational member 6320 that tilts, and light sources 6330 within the stage 6300. The light sources 6330 radiate light uniformly from inside the stage. A first polarizer 6327 is arranged over the light source 6330. A fixing part (not shown in the drawing) fixes the 1 composite LC panel to the stage 6300 when the stage rotates.

The inspection equipment 6200 further includes at least two voltage terminals 6328 for applying a voltage to external connection terminals 5721*a* and 5723*a*, reference FIG.

177, which enable the application of electric power to the gate and data pads 5790 and 5710, reference FIG. 178.

Referring now to FIG. 181, the inspection equipment 6200 rotates at predetermined angles by way of the rotational member 6320 after the composite LC panel is loaded on the inspection equipment 6200 by the robot arm, reference steps 6041S and 6042S. The composite LC panel receives external power via the external connection terminals 6328.

Next, a user performs A/P testing using a second polarizer 6329 having a predetermined size that is coupled with the inspection equipment such that the first and second polarizers sandwich the composite LC panel, reference step 6044S.

FIG. 182 illustrates the layout of the composite LC panel according to an embodiment of the present invention. As shown, an external voltage is applied via external connection terminals 6328 to the terminal 5721*a*, connected to the first metal line 5723, and to the external connection terminal 5723*a*, connected to the second metal line 5723. Also, a predetermined DC voltage is applied to the common electrode of the second substrate 5752. This enables the A/P (auto probe) testing, reference step 6044S of FIG. 180.

The inspection equipment 6200 with a composite LC panel sandwiched between the first and second polarizers, together with the light from the light sources 6330 and the applied electrical power simulate an operating LC display module that produces a solid image. Electrical defects, such as open or shorted gate and data lines, will be visually apparent since areas will be blank (or have other distortions). Furthermore, image stains such as cross-striped areas, black regions, color filter protrusions, oblique stains, rubbing stripes, pin holes, open or shorted gate and data lines, and the like will be visible to human observers or to CCD (charge coupled device).

After completion of A/P test, the inspection equipment 6200 is rotated to return to its initial position, reference step 6045S. The large LC panel is then loaded into a cassette using the robot arm, reference step 6046S.

Beneficially, A/P test is performed in the processing assembly line, thereby preventing unnecessary delays and inconvenience.

Subsequently, a S/B (scribe/break) process is carried out, reference step 6047S. The S/B process includes a scribe step of forming cutting line on glass surfaces using a diamond-based pen, and a break step of cutting the glass by applying a force. The S/B process divides the large LC panel into a plurality of unit LC panels called cell units.

Then, a grinding process, step 6048S is performed to grind faces of the unit LC panels, thereby completing the third step 6100.

Thereafter, a module process that attaches a driver IC, a backlight, and the like is carried out.

Accordingly, the method of fabricating a liquid crystal display according to the present invention has the following advantages.

First, the electrode structure enables performing electrical and visual inspection of composite LC panels before the individual LC panels are completed. This enables a single inspection that reduces inspection time and worker fatigue. Furthermore, the present invention performs A/P testing in an early fabrication stage, thereby enabling feedback of defect information, which improves mass production.

FIG. 183 is a schematic block diagram of a cutter for cutting a liquid crystal display panel in accordance with a first embodiment of the present invention.

As shown in FIG. 183, a cutter for cutting a liquid crystal display panel in accordance with the first embodiment of the present invention includes a loading unit 6460 for loading and aligning first and second mother substrates that are attached to each other, a first scribing unit 6461 for forming a plurality of first scribing lines with a first upper wheel and a first lower wheel on the surface of the first and second mother substrates. A first breaking unit 6462 is to break the first and second mother substrates by pressing with first and second breaking bars along the first scribing lines formed on the surface of the first and second mother substrates. A first rotating unit 6463 is to rotate the first and second mother substrates by 90°. A second scribing unit 6464 is to form a plurality of second scribing lines with a second upper wheel and a second lower wheel on the surface of the first and second mother substrates. A second breaking unit 6465 is to break the first and second mother substrates by pressing with a third and a fourth breaking bars along the second scribing lines formed on the surface of the first and second mother substrates and to transmit a crack on the first and second mother substrate. Further, an unloading unit 6466 is to rotate the first and second mother substrate by 90° to be in the direction the same as the initial loading direction, sequentially unloading a plurality of unit liquid crystal panels cut along the first and second scribing lines, and conveying to the equipment for the further processes.

FIGS. 184A to 184G illustrate sequential processes for performing each block of FIG. 183.

Figure 184A:
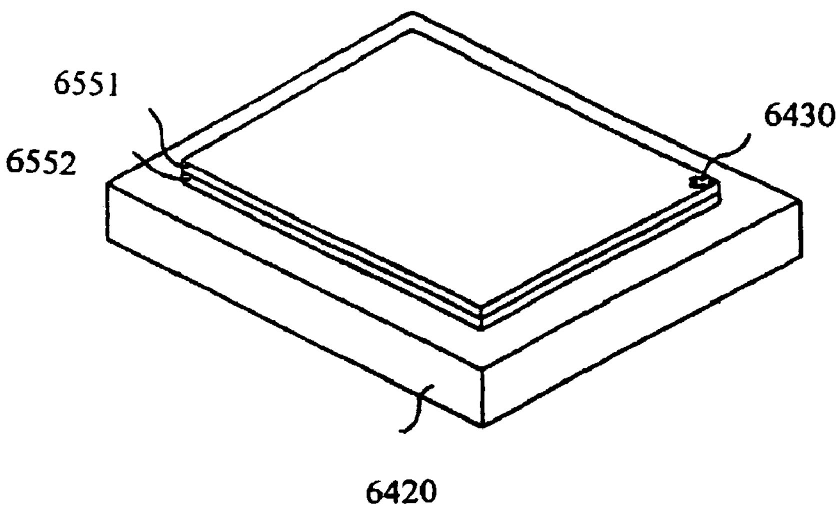

As shown in FIG. 184A, the loading unit 6460 loads a first mother substrate 6551 and a second mother substrate 6552 that are attached to each other. A plurality of thin film transistor array substrates are formed in the first mother substrate, and a plurality of color filter substrates are formed in the second mother substrate 6552. The first and second mother substrates 6551 and 6552 are aligned through an alignment mark 6430.

The first mother substrate 6551 including the thin film transistor array substrates is stacked on the second mother substrate 6552 including the color filter substrates. When the first and second mother substrates 6551 and 6552 are loaded as such a state, an impact to a gate pad unit or a data pad unit formed on the thin film transistor array substrate may be minimized by the following breaking process.

Figure 184B:
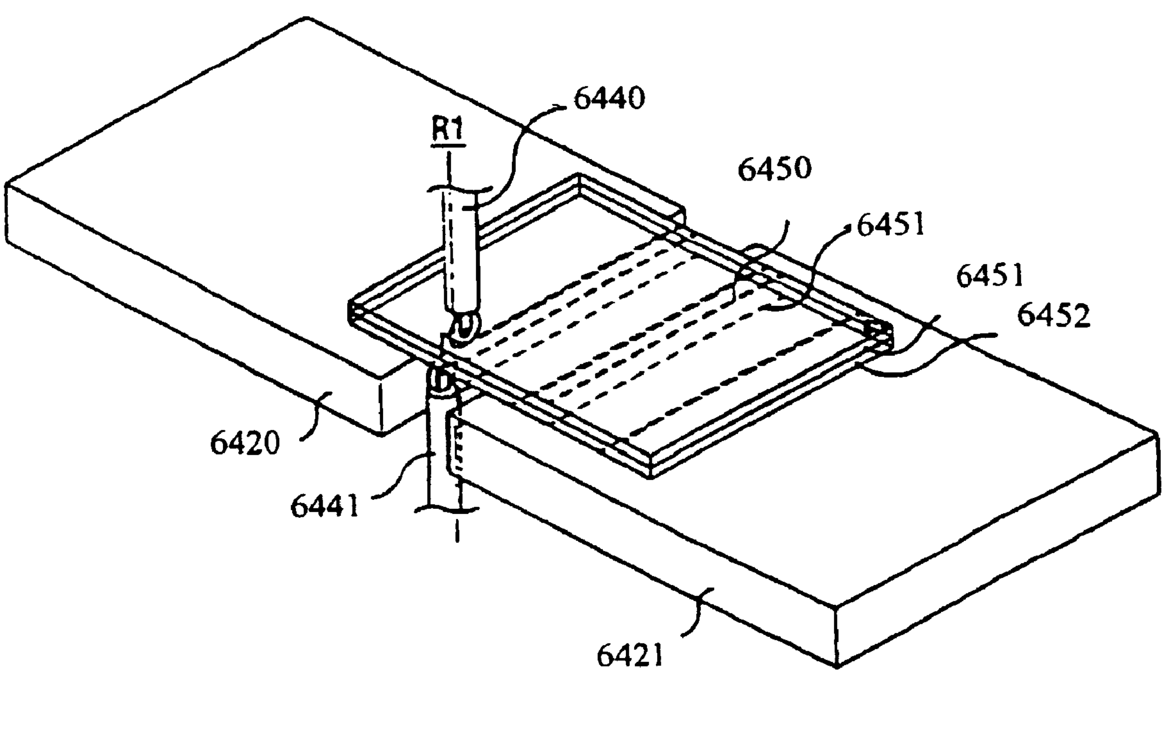

In FIG. 184B, the first scribing unit 6461 sequentially forms a plurality of first scribing lines 6450 and 6451 on the surface of the first and second mother substrates 6551 and 6552, with a first upper wheel 6440 and a first lower wheel 6441, in the space between the first and second tables 6420 and 6421. The first and second mother substrates 6551 and 6552 move to one direction so that the first and second mother substrates 6551 and 6552 are placed between the first table 6420 and the second table 6421 that are isolated by a space therebetween.

One side of the thin film transistor array substrates formed at the first mother substrate 6551 is protruded to be longer than the corresponding side of the color filter substrates formed at the second mother substrate 6552. This is because the data pad unit formed at the gate pad unit is formed at one of the left and right sides, and the data pad unit is formed at one of the upper and lower sides of the thin film transistor array substrate.

Accordingly, at the region where one side of the thin film transistor array substrates is protruded to be longer than the corresponding side of the color filter substrates, the first upper wheel 6440 is isolated for a certain distance to one side of a reference line R1, so as to form a first scribing line 6450 on the surface of the first mother substrate 6551. The first lower wheel 6441 is isolated for a certain distance in the opposite direction corresponding to the first upper wheel 6440 from the reference line R1, so as to form the first scribing line 6451 on the surface of the second mother substrate 6552.

At the region where no gate pad unit or data pad unit of the thin film transistor array substrates is formed (that is, the region where the thin film transistor array substrates are not protruded to be longer than the color filter substrates), the first upper wheel 6440 and the first lower wheel 6441 are aligned to the straight line, thereby forming the first scribing lines 6450 and 6451 on the surface of the first and second mother substrates 6551 and 6552.

Figure 184C:
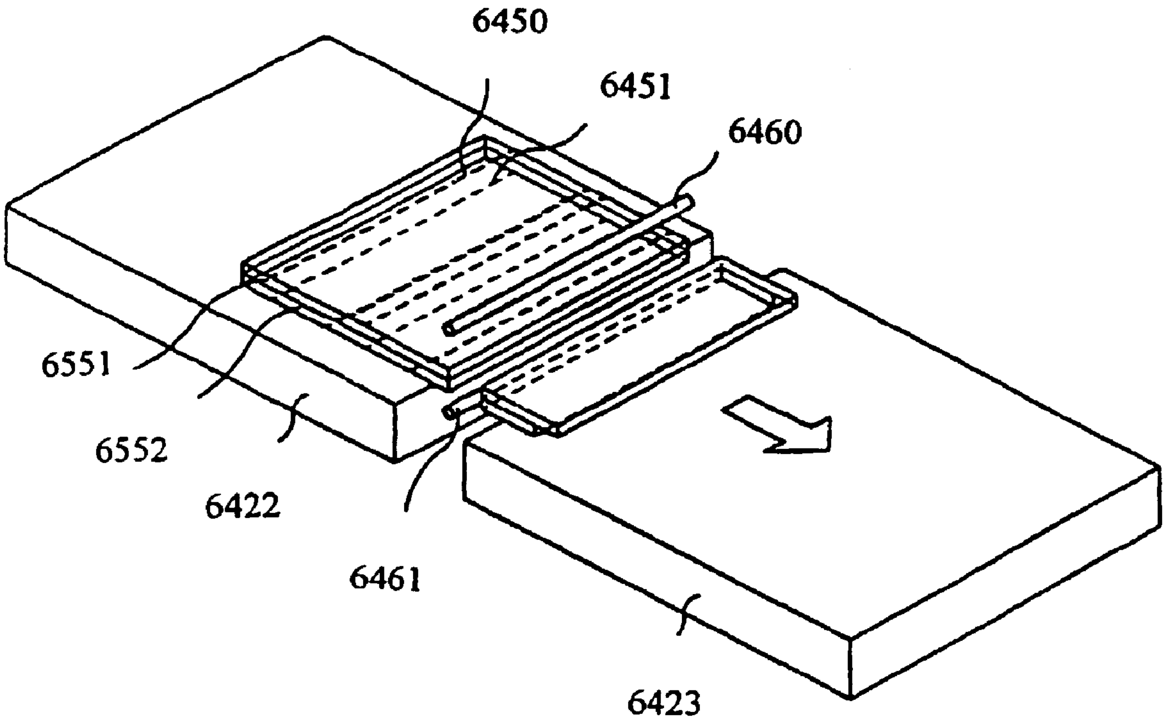

As shown in FIG. 184C, the first breaking unit 6462 breaks the first and second mother substrates 6551 and 6552 by pressing with first and second breaking bars 6460 and 6461, along the first scribing lines 6450 and 6451 formed on the surface of the first and second mother substrates 6551 and 6552, in the space between the third and fourth tables 6422 and 6423 to transmit a crack on the first and second mother substrates 6551 and 6552. The first and second mother substrates 6551 and 6552 move to be placed between the third and fourth tables 6422 and 6423, thereby cutting the first and second mother substrates 6551 and 6552.

When the first mother substrate 6551 is pressed by the first breaking bar 6460, the second breaking bar 6461 supports the second mother substrate 6552. When the second mother substrate 6552 is pressed by the second breaking bar 6461, the first breaking bar 6460 supports the first mother substrate 6551.

Figure 184D:
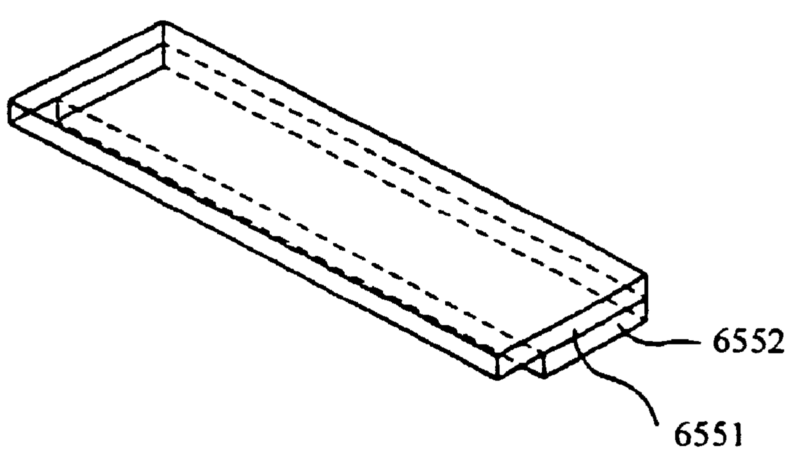

FIG. 184D illustrates the first rotating unit 6463 rotating the cut first and second mother substrates 6551 and 6552 by 90°.

Figure 184E:
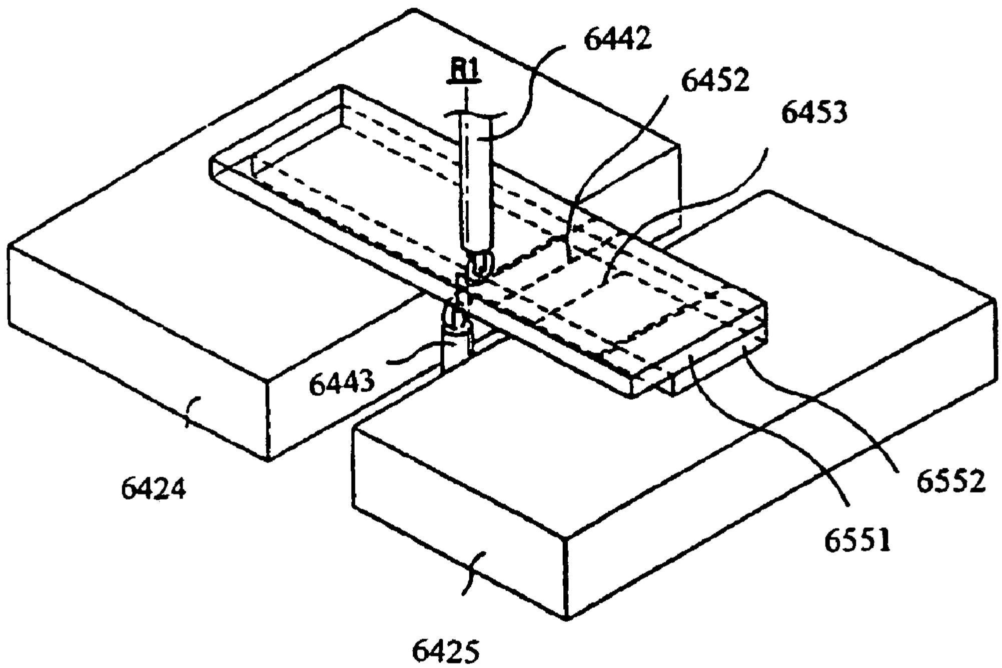

As shown in FIG. 184E, the second scribing unit 6464 sequentially forms the second scribing lines 6452 and 6453 on the surface of the first and second mother substrates 6551 and 6552, with the second upper wheel 6442 and the second lower wheel 6443 located at the space between the fifth and sixth tables 6424 and 6425, while the first and second mother substrates 6551 and 6552 move to be placed between the fifth and sixth tables 6424 and 6425 that are isolated by the space therebetween.

As mentioned above, one side of the thin film transistor array substrates formed at the first mother substrate 6551 is protruded to be longer than the corresponding side of the color filter substrates formed at the second mother substrate 6552. Thus, at the protruded region, like the first upper wheel 6440 and the first lower wheel 6441, the second upper wheel 6442 and the second lower wheel 6443 are isolated from each other by a certain distance in the opposite direction along the reference line R1, so as to form the second scribing lines 6452 and 6453 on the surface of the first and second mother substrates 6551 and 6552.

Meanwhile, at the region where the thin film transistor array substrates are not protruded to be longer than the color filter substrates, like the first upper wheel 6440 and the first lower wheel 6441, the second upper wheel 6442 and the second lower wheel 143 are aligned to each other, so as to form the second scribing lines 6452 and 6453 on the surface of the first and second mother substrates 6551 and 6552.

Figure 184F:
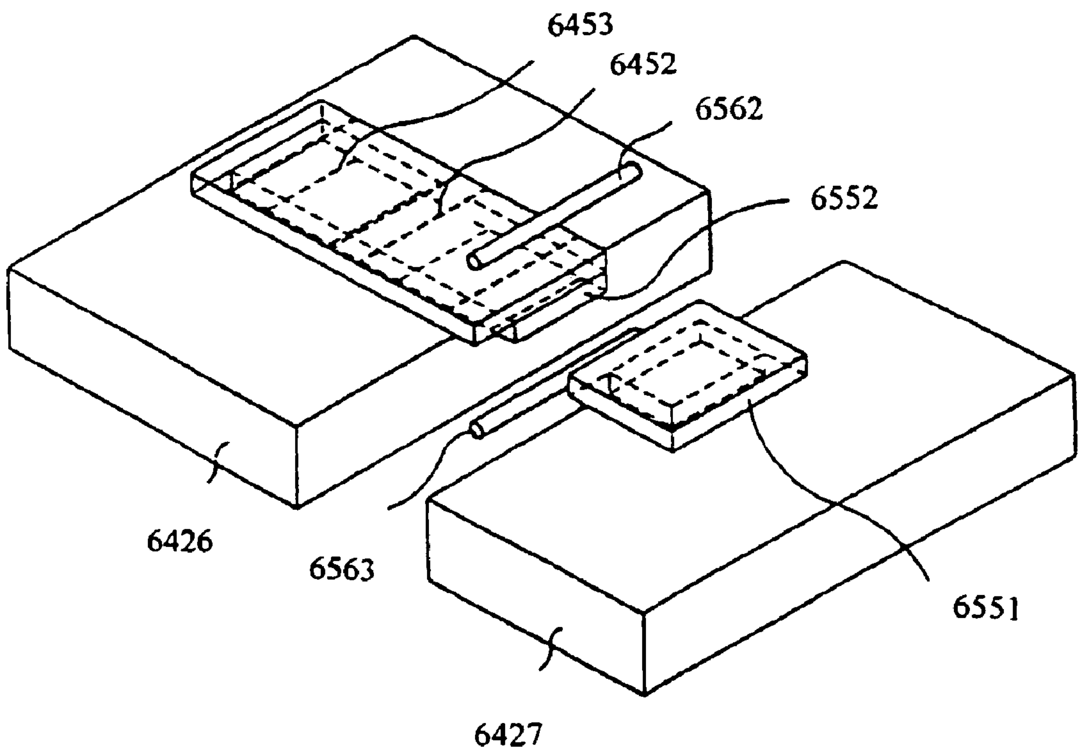

In FIG. 184F, the second breaking unit 6465 presses the first and second mother substrates 6551 and 6552 with third and fourth breaking bars 6462 and 6463 along the second scribing lines 6452 and 6453, formed on the surface of the first and second mother substrates 6551 and 6552 at the space between the seventh and eighth tables 6426 and 6427, to transmit a crack on the first and second mother substrates 6551 and 6552. The first and second mother substrates 6551 and 6552 move to be placed between the seventh and eighth tables 6426 and 6427, thereby cutting the first and second mother substrates 6551 and 6552.

When the first mother substrate 6551 is pressed by the third breaking bar 6462, the fourth breaking bar 6463 supports the second mother substrate 6552. When the second mother substrate 6552 is pressed by the fourth breaking bar 6463, the third breaking bar 6462 supports the first mother substrate 6551.

Figure 184G:
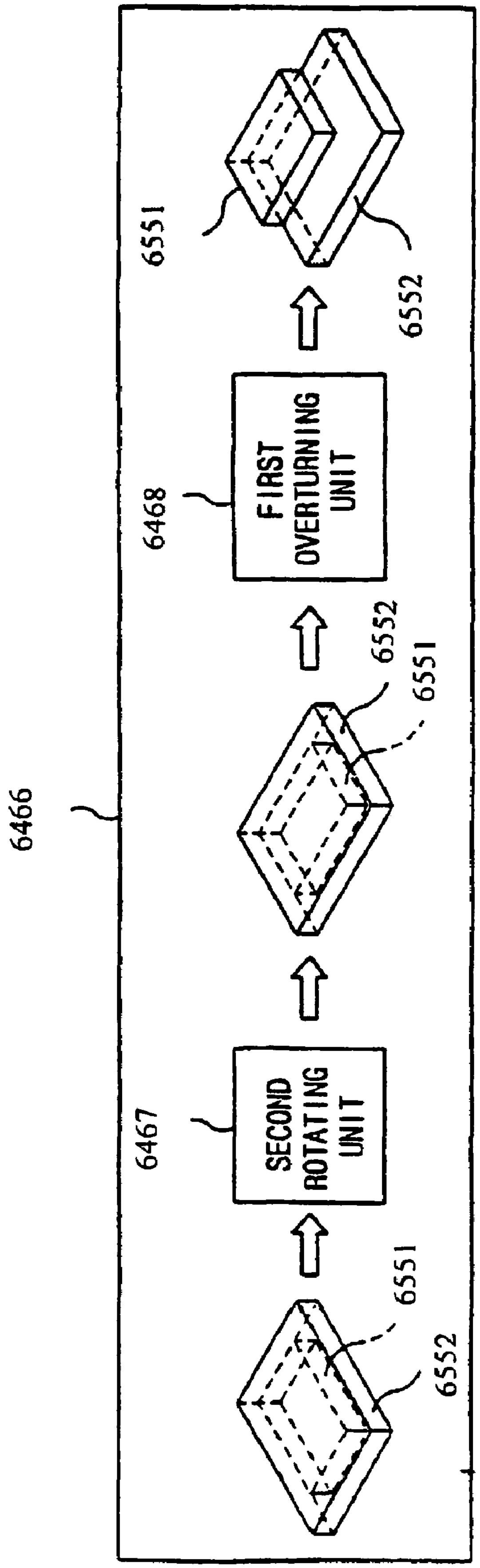

The unloading unit 6466 sequentially unloads the unit panels cut along the first and second scribing lines 6450 to 6453 and conveys to the equipment for the following processes, as shown in FIG. 184G.

Meanwhile, the unit panels conveyed to the unloading unit 6466 is rotated by 90° compared to the direction of the loading unit 6460, as shown in FIG. 184G. A second rotating unit 6467 is installed in the unloading unit 6466 so as to rotate the unit panels by 90° and unloads the unit panels for facilitating the following processes.

In addition, in the following process, when a unit panel requires a state that the color filter substrate is stacked on the thin film transistor array substrate, as shown in FIG. 184G, the first overturning unit 6468 may be installed in the unloading unit 6466 to overturn the unloaded unit panels and convey to the equipment in the following processes.

As aforementioned, referring to the cutter for cutting a liquid crystal display panel and the method for cutting using the same, there requires only two simultaneous scribings of the first and second mother substrates and two simultaneous breakings of the first and second mother substrates. Also, the formed liquid crystal display panels are individually cut into the unit panels by rotating the first and second mother substrates once only.

FIG. 185 is a schematic block diagram of a cutter for cutting a liquid crystal display panel in accordance another embodiment of the present invention.

As shown in FIG. 185, the cutter in accordance the second embodiment of the present invention includes a loading unit for loading and aligning first and second mother substrates that are attached to face into each other. A first scribing unit 6610 is to sequentially form a plurality of first scribing lines with a first upper wheel and a first lower wheel on the surface of the first and second mother substrates with moving the first and second mother substrates in one direction, rotating the first and second mother substrates by 90°. A plurality of second scribing lines are sequentially formed with the first upper wheel and the first lower wheel on the surface of the first and second mother substrates with moving the first and second mother substrates to the original position. A first breaking unit 6620 is to sequentially press the first and second mother substrates with first and second breaking bars along the second scribing lines formed on the surface of the first and second mother substrates with moving the first and second mother substrates in one direction to cut the first and second mother substrates. A second breaking unit 6630 is to rotate the first and second mother substrates by 90°. The first and second mother substrates are sequentially pressed with third and fourth breaking bars along the first scribing lines with moving the first and second mother substrates as much as a predetermined distance in one direction. An unloading unit 6640 is to sequentially unload the unit panels cut along the first and second scribing lines and convey to the equipment for the following processes.

FIGS. 186A to 186F illustrate sequential processes for performing each block of FIG. 185.

Initially, the loading unit 6600 loads first and second substrates 6603 and 6604 that thin film transistor array substrates and color filter substrates are formed and attached to face into each other, on a first table 6605. The first and second substrates 6603 and 6604 are aligned by an alignment mark 6606, as shown in FIG. 186A.

The first mother substrate 6603 including the thin film transistor array substrates is stacked on the second mother substrate 6604 with the color filter substrates. When the first and second mother substrates 6603 and 6604 are loaded to be such a state, an impact to a gate pad unit or a data pad unit formed on the thin film transistor array substrate may be minimized in the following breaking processes.

Figure 186B:
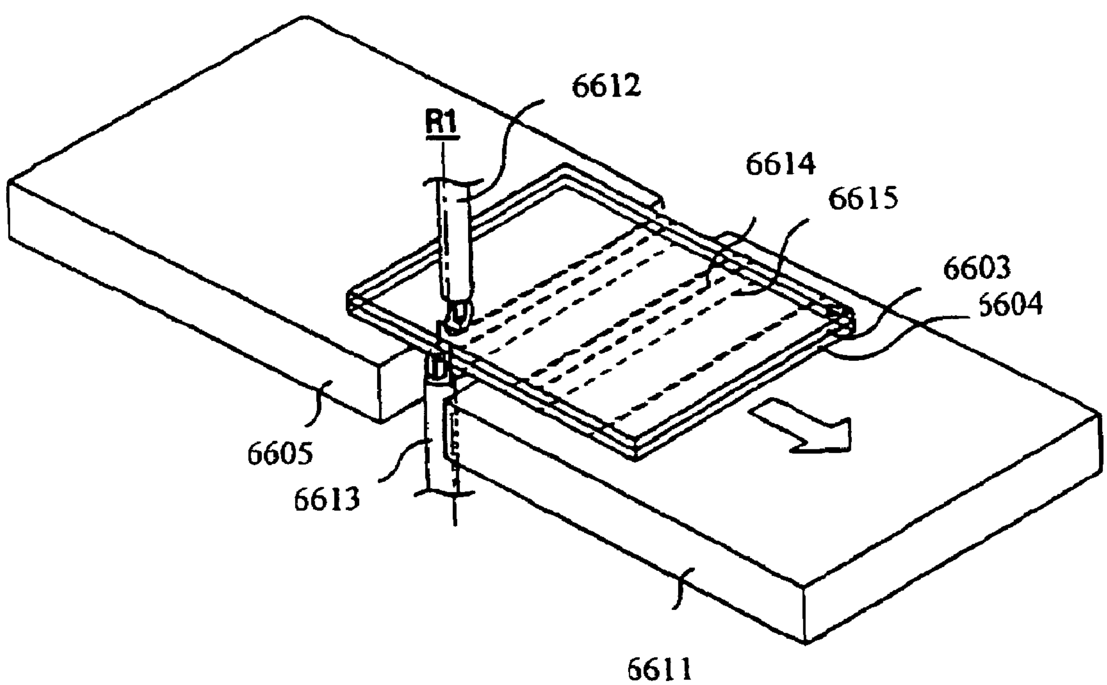

In FIG. 186B, the first scribing unit 6610 sequentially forms the first scribing lines 6614 and 6615 on the surface of the first and second mother substrates 6603 and 6604 with the first upper wheel 6612 and the first lower wheel 6613 in the space between the first and second tables 6605 and 6611. In this process, the first and second mother substrates 6603 and 6604 move to one direction as far as a predetermined distance so that the first and second mother substrates 6603 and 6604 may be placed between the first table 6605 and the second table 6611 that are isolated with the space therebetween.

Figure 186C:
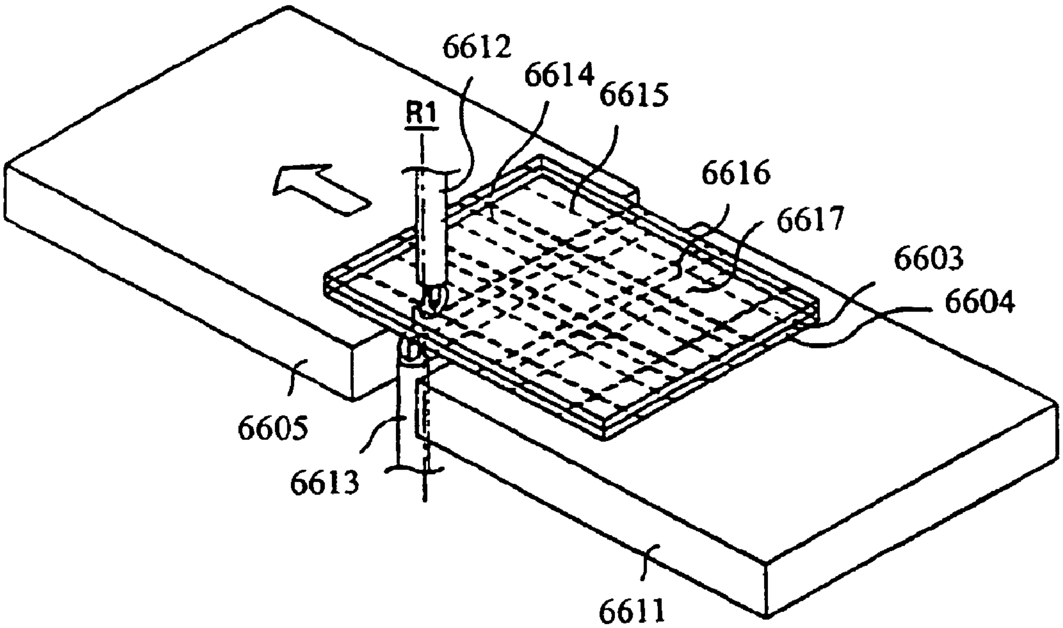

As shown in FIG. 186C, the first scribing unit 6610 rotates the first and second mother substrates 6603 and 6604 having the first scribing lines 6614 and 6615 by 90°, and sequentially forms a plurality of second scribing lines 6616 and 6617 on the surface of the first and second mother substrates 6603 and 6604 with the first upper wheel 6612 and the first lower wheel 6613 located at the space between the first and second tables 6605 and 6611. In this process, the first and second mother substrates 6603 and 6604 move back to the original position, so as to be placed between the first and second tables 6605 and 6611.

One side of the thin film transistor array substrates formed at the first mother substrate 6603 is protruded to be longer than the corresponding side of the color filter substrates formed at the second mother substrate 6604.

This is because the data pad unit is formed at one of the left and right sides and the data pad unit is formed at one of the upper and lower sides of the thin film transistor array substrate.

Accordingly, at the region where one side of the thin film transistor array substrates is protruded to be longer than the corresponding side of the color filter substrates, the first upper wheel 6612 is isolated for a certain distance to one side of a reference line R1 for forming first and second scribing lines 6614 and 6616 on the surface of the first mother substrate 6603. The first lower wheel 6613 is isolated for a certain distance to the opposite direction corresponding to the first upper wheel 6612 from the reference line R1 for forming the first and second scribing lines 6615 and 6617 on the surface of the second mother substrate 6604.

Meanwhile, at the region where no gate pad unit or data pad unit of the thin film transistor array substrates is formed (that is, the region where the thin film transistor array substrates are not protruded to be longer than the color filter substrates), the first upper wheel 6612 and the first lower wheel 6613 are aligned to the straight line. Thus, the first and second scribing lines 6614 to 6617 are formed on the surface of the first and second mother substrates 6603 and 6604.

Figure 186D:
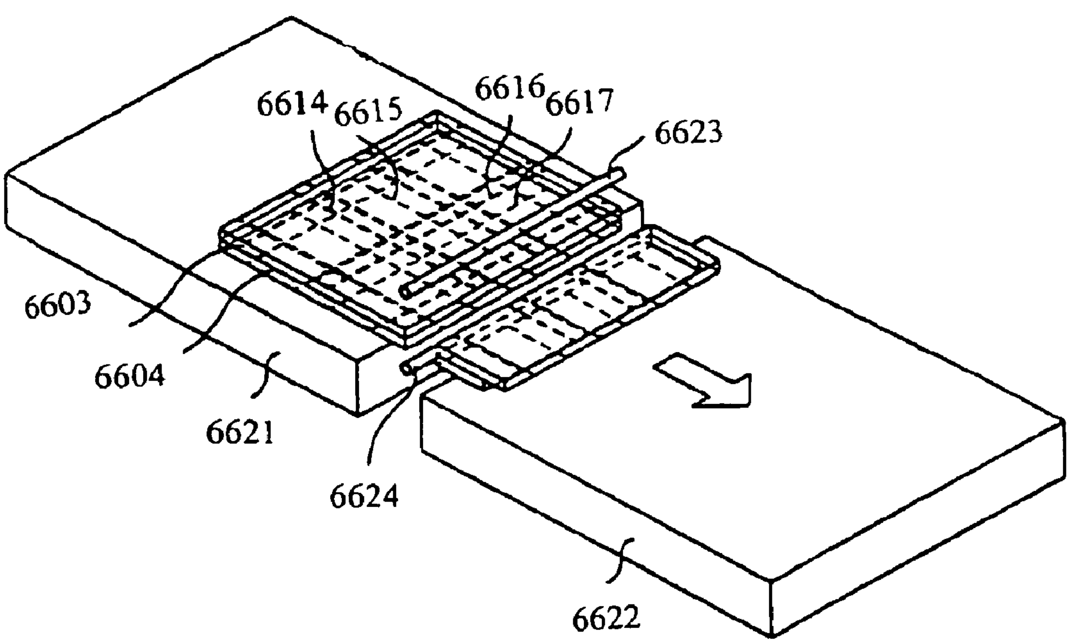

The first breaking unit 6620 in FIG. 186D presses the first and second mother substrates 6603 and 6604 with first and second breaking bars 6623 and 6624 along the second scribing lines 6616 and 6617 formed on the surface of the first and second mother substrates 6603 and 6604 at the space between the third and fourth tables 6621 and 6622. Thus, a crack is transmitted on the first and second mother substrates 6603 and 6604. In this process, the first and second mother substrates 6603 and 6604 move to be placed between the third and fourth tables 6621 and 6622, thereby cutting the first and second mother substrates 6603 and 6604.

When the first mother substrate 6603 is pressed by the first breaking bar 6623, the second breaking bar 6624 supports the second mother substrate 6604. When the second mother substrate 6604 is pressed by the second breaking bar 6624, the first breaking bar 6623 supports the first mother substrate 6603.

Figure 186E:
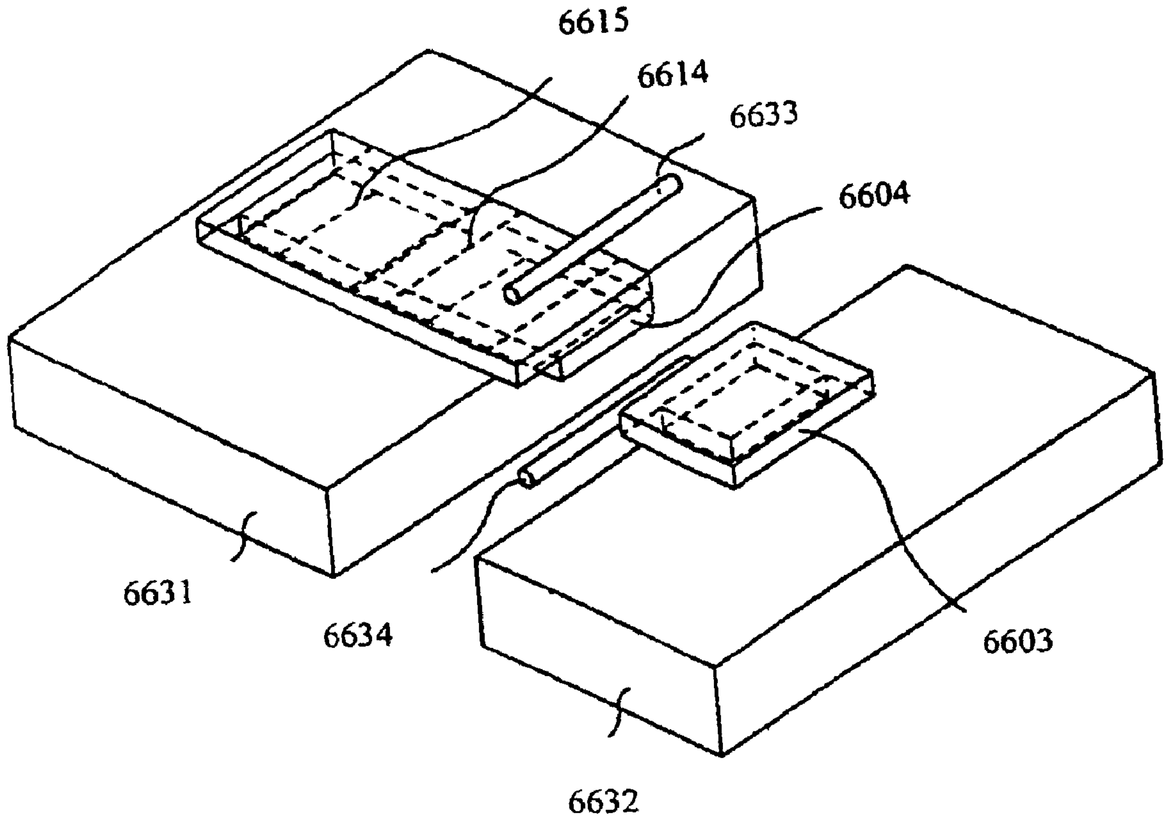

As shown in FIG. 186E, the second breaking unit 6630 rotates the cut first and second mother substrates 6603 and 6604 by 90°, and presses the first and second mother substrates 6603 and 6604 with third and fourth breaking bars 6633 and 6634 along the first scribing lines 6614 and 6615 formed on the surface of the first and second mother substrates 6603 and 6604 at the space between the fifth and sixth tables 6631 and 6632. Thus, a crack moves along the scribing lines in the first and second mother substrates 6603 and 6604 with moving the first and second mother substrates 6603 and 6604 to be placed between the fifth and sixth tables 6631 and 6632. The unit panels are then cut out from the first and second mother substrates 6603 and 6604.

When the third breaking bar 6633 presses the first mother substrate 6603, the fourth breaking bar 6634 supports the second mother substrate 6604. When the fourth breaking bar 6634 presses the second mother substrate 6604, the third breaking bar 6633 supports the first mother substrate 6603.

Figure 186F:
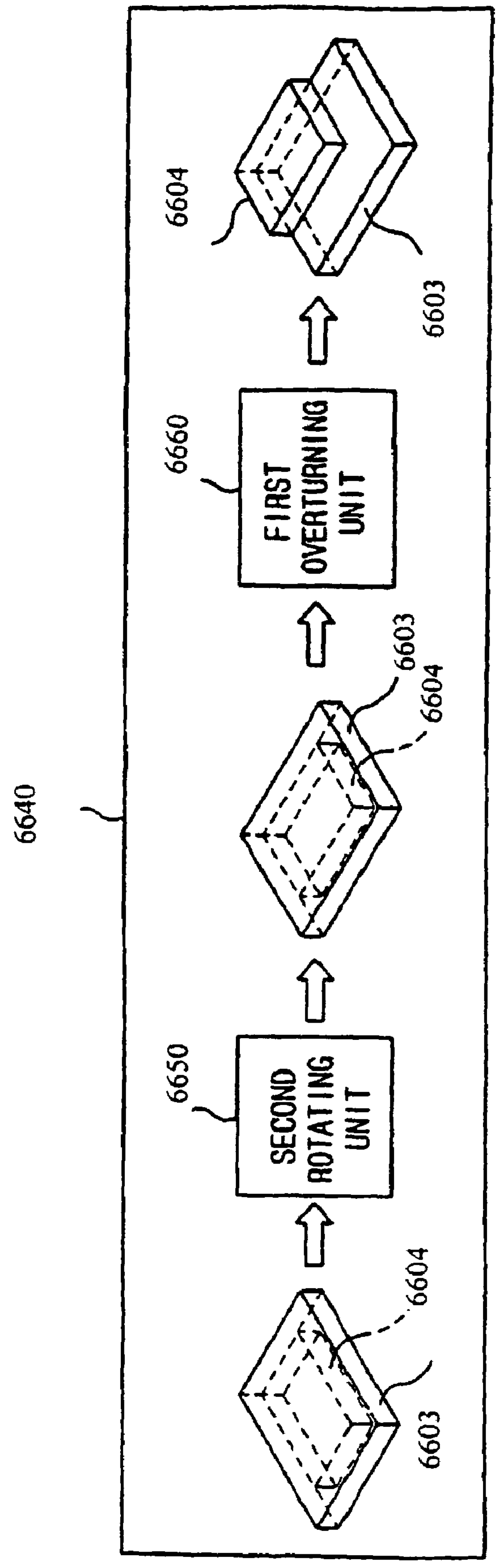

As shown in FIG. 186F, the unloading unit 6640 sequentially unloads the unit panels cut along the first and second scribing lines 6614 to 6617 and conveys to the equipment in the following processes.

Meanwhile, the unit panels conveyed to the unloading unit 6640 is rotated by 90° compared to the direction of the loading unit 6600, as shown in FIG. 186F. A second rotating unit 6650 is installed in the unloading unit 6640 so as to rotate the unit panels by 90° and unload the unit panels for more convenient processes.

In addition, in the following process, when a unit panel requires a state that the color filter substrate is stacked on the thin film transistor array substrate, as shown in FIG. 186F, the first overturning unit 6660 may be installed in the unloading unit 6640 to overturn the unloaded unit panels and convey to the equipment in the following processes.

As aforementioned, referring to the device for cutting a liquid crystal display panel and the method for cutting using the same in accordance with the second embodiment of the present invention, there requires only one time of simultaneous scribing of the first and second mother substrates and two simultaneous breakings of the first and second mother substrates. Also, the liquid crystal display panel is cut into the unit panels by rotating the first and second mother substrates twice.

FIGS. 187A to 187C illustrate different alignments of an upper wheel and a lower wheel for simultaneously scribing the first and second mother substrates in accordance with the present invention.

The scribing wheel may have to be replaced due to the abrasion. Thus, the wheel should be easily replaceable in order to improve productivity.

As shown in FIG. 187A, when an upper wheel 6700 and a lower wheel 6701 are aligned to the reference line R1, they are not easily replaceable and much time is required for a replacement.

Conversely, when the upper wheel 6700 and the lower wheel 6701 are positioned to be symmetrical in the horizontal direction from the reference line R1, as shown in FIG. 187B, their replacement would be convenient and quick.

FIG. 187C illustrates another embodiment of the upper wheel 6700 and the lower wheel 6701 to be symmetrical in the forward-backward direction from the reference line R1.

In both of the embodiments of the present invention as described above, the scribing and breaking processes are sequentially performed on the first and the second mother substrates with moving the first and second mother substrates. Alternatively, sequential scribing and breaking processes may be performed on the first and second mother substrates with moving the wheel and the breaking bar.

As described above, the device for cutting a liquid crystal display panel and the method for cutting using the same in accordance with the present invention have many advantages as follows.

That is, referring to the first embodiment, the liquid crystal display panels is cut into the unit panels by two simultaneous scribings of the first and second mother substrates, two simultaneous breakings of the first and second mother substrates, and one time of rotation of the first and second mother substrates.

Therefore, the time required for the scribing is minimized compared to that of the conventional art. Also, since the overturning unit is not necessary to overturn the first and second mother substrates, the time required for the scribing and overturning is reduced and productivity is improved. In addition, the problem of wasting an installation expense and an installation space of the equipment is prevented.

With respect to the second embodiment, the liquid crystal display panel is cut to the unit panels by one time of simultaneous scribing of the first and second mother substrates, two simultaneous breakings of the first and second mother substrates, and two rotations of the first and second mother substrates.

Therefore, the scribing equipment is reduced by one as compared to the first embodiment of the present invention, so that the installation expense and installation space of the equipment may be reduced more.

In addition, since the upper wheel and the lower wheel for the scribing of the present invention are positioned to be symmetrical in the horizontal direction and forward-backward direction from the reference line, they may be easily and conveniently replaced. Thus, the time for replacement may be reduced and the productivity may be improved.

FIG. 188 is a schematic block diagram of a device for cutting a liquid crystal display panel in accordance with a first embodiment of the present invention.

As shown in FIG. 188, the device for cutting a liquid crystal display panel includes a loading unit 6800 for loading and aligning first and second mother substrates including a plurality of unit liquid crystal display panels thereon. A first scribing unit 6810 is to form a first scribing line on the surface of the first and second mother substrates with a first upper wheel and a first lower wheel, and to press at least a portion of the first scribing line with a first roll in order to sequentially cut the first and second mother substrates. A first rotating unit 6820 is to rotate the cut first and second mother substrates by 90°. A second scribing unit 6830 is to form a second scribing line on the surface of the rotated first and second mother substrates with a second upper wheel and a second lower wheel and to press at least a portion of the second scribing line in order to sequentially cut the first and second mother substrates. An unloading unit 6840 is to unload the unit liquid crystal display panels cut by the first and second scribing units 6810 and 6430 and to convey to the equipment for the following processes.

FIGS. 189A to 189G illustrate sequential processes for performing each block of FIG. 188.

Figure 189A:
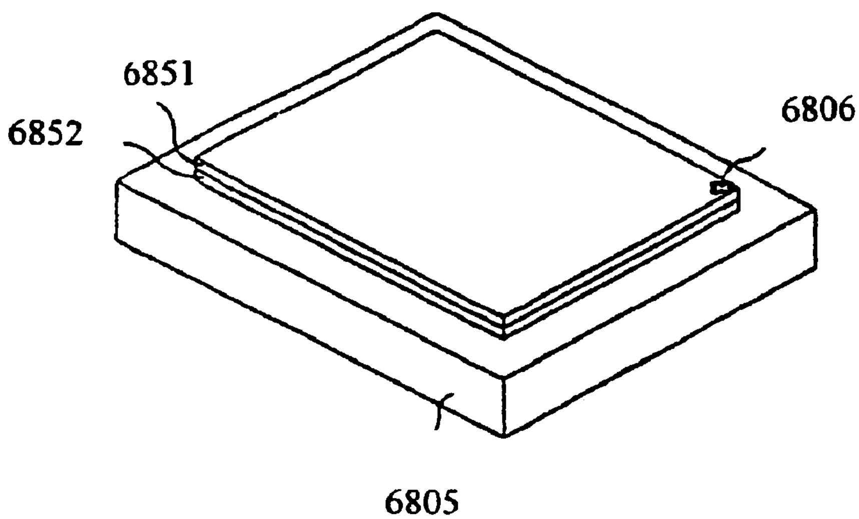

Initially referring to FIG. 189A, a loading unit 6800 loads a first mother substrate 6851 and a second mother substrate 6852 that are attached to each other placed on a first table 6805. The first mother substrate includes a plurality of thin film transistor array substrates formed thereon, and the second mother substrate includes a plurality of color filter substrates formed thereon. The first and second mother substrates 6851 and 6852 are aligned through an alignment mark 6806.

When the first and second mother substrates 6851 and 6852 are loaded on the first table 6805, the first mother substrate 6851 is stacked to be on the second mother substrate 6852. An impact to the thin film transistor array substrate or the color filter substrate in a cutting process of the first and second mother substrates 6851 and 6852 may be mitigated by this location.

Figure 189B:
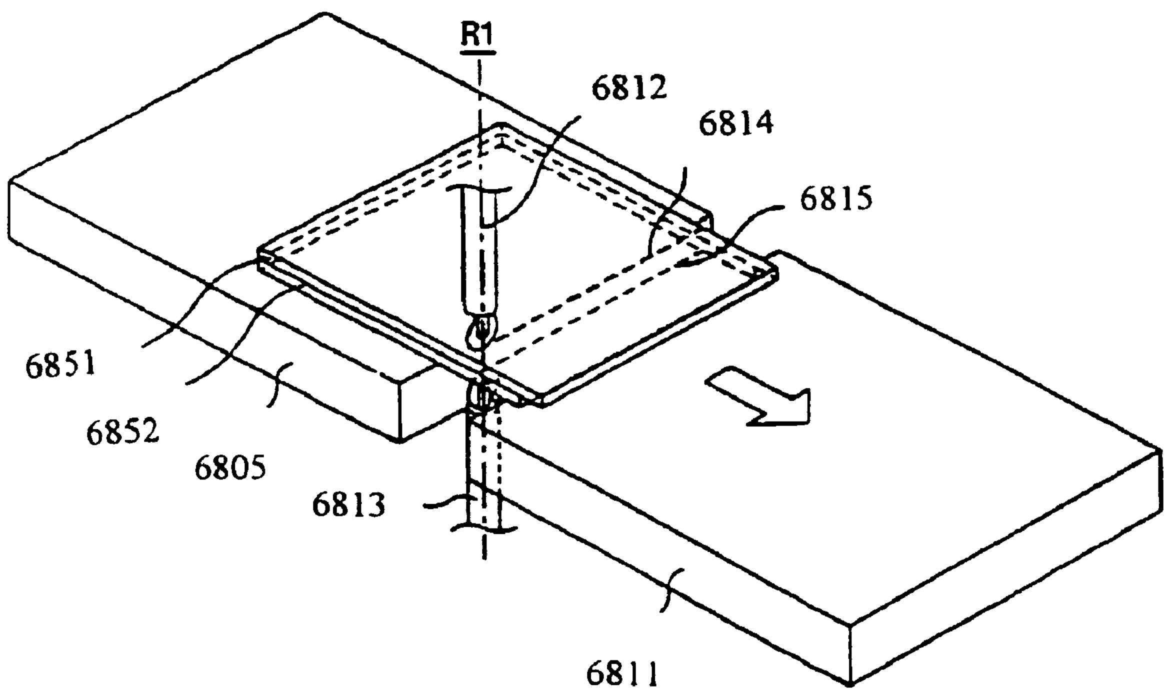

As shown in FIG. 189B, the first scribing unit 6810 sequentially forms first scribing lines 6814 and 6815 at the surface of the first and second mother substrates 6851 and 6852 through the first upper wheel 6812 and the first lower wheel 6813 located at the space between the first and second tables 6805 and 6811. In this process, the first and second mother substrates 6851 and 6852 move to be placed between the first table 6805 and the second table 6811.

One side of the thin film transistor array substrates formed at the first mother substrate 6851 is protruded to be longer than the corresponding side of the color filter substrates formed at the second mother substrate 6852.

This is because the gate pad unit is formed at one of the horizontal sides and the data pad unit is formed at one of the vertical sides of the thin film transistor array substrate.

Accordingly, at the protruded region of the thin film transistor array substrates longer than the corresponding side of the color filter substrates, the first scribing line 6814 is formed at the surface of the first mother substrate 6851 distanced from a reference line (R1) by using the first upper wheel 6812. The first scribing line 6815 is formed at the surface of the second mother substrate 6852 distanced from the reference line (R1) in the opposite direction corresponding to the first upper wheel 6812 by using the first lower wheel 6813.

Meanwhile, at the region where a gate pad unit or the data pad unit of the thin film transistor array substrates are not formed, the first upper wheel 6812 and the first lower wheel 6813 are aligned to form the first scribing lines 6814 and 6815 at the surfaces of the first and second mother substrates 6851 and 6852.

Figure 189C:
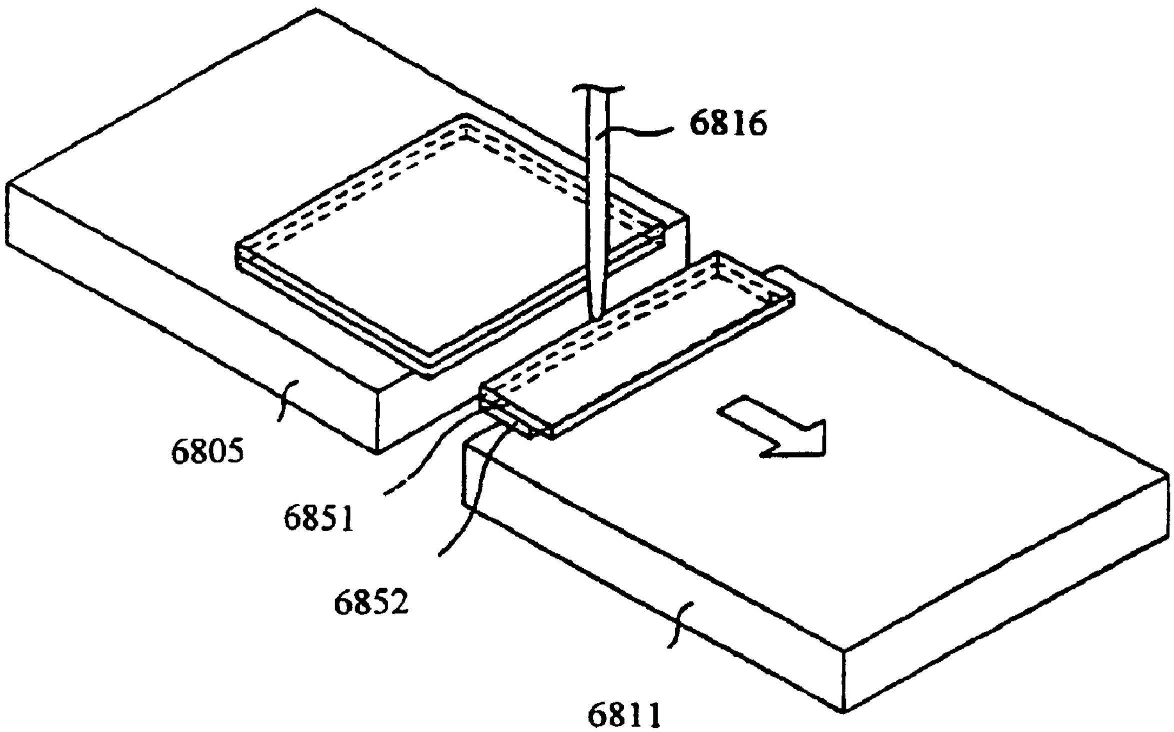

The first scribing unit 6810 presses a portion of the first scribing lines 6814 and 6815 with the first roll 6816 to sequentially cut the first and second mother substrates 6851 and 6852, as shown in FIG. 189C.

The first roll 6816 presses a portion or several portions of the first scribing line 6814 formed by the first upper wheel 6812. Thus, a crack is transmitted along the first scribing lines 6814 and 6815 on the first and second mother substrates 6851 and 6852.

The first upper wheel 6812 forms the first scribing line 6814 at the surface of the first mother substrate 6851 and is moved to the original position. The first roll 6816 works with the first wheel 6812 in motion, so that it may be applied along the first scribing line 6814.

The first roll 6816 may be applied only to the first scribing line 6815 formed at the surface of the second mother substrate 6852. Alternatively, it may be applied both to the first scribing lines 6814 and 6815 formed at the surfaces of the first and second mother substrates 6851 and 6852.

The first roll 6816 may be made of urethane so that it may be less slippery on a glass substrate when the first roll 6816 is applied. The first roll 6816 directly contacts the first mother substrate 6851 having the thin film transistor array substrate formed thereon. Also, a urethane material has an excellent characteristic in static electricity and generates less amount of particles upon contacting with the substrate.

Figure 189D:
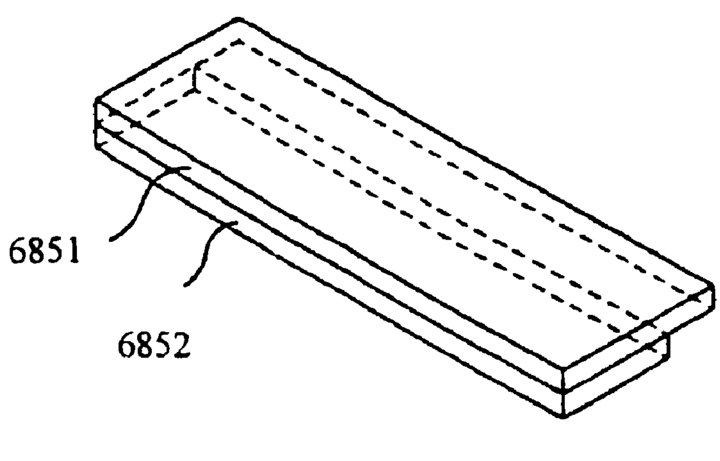

As shown in FIG. 189D, the first rotating unit 6820 rotates the first and second mother substrates 6851 and 6852 by 90°.

Figure 189E:
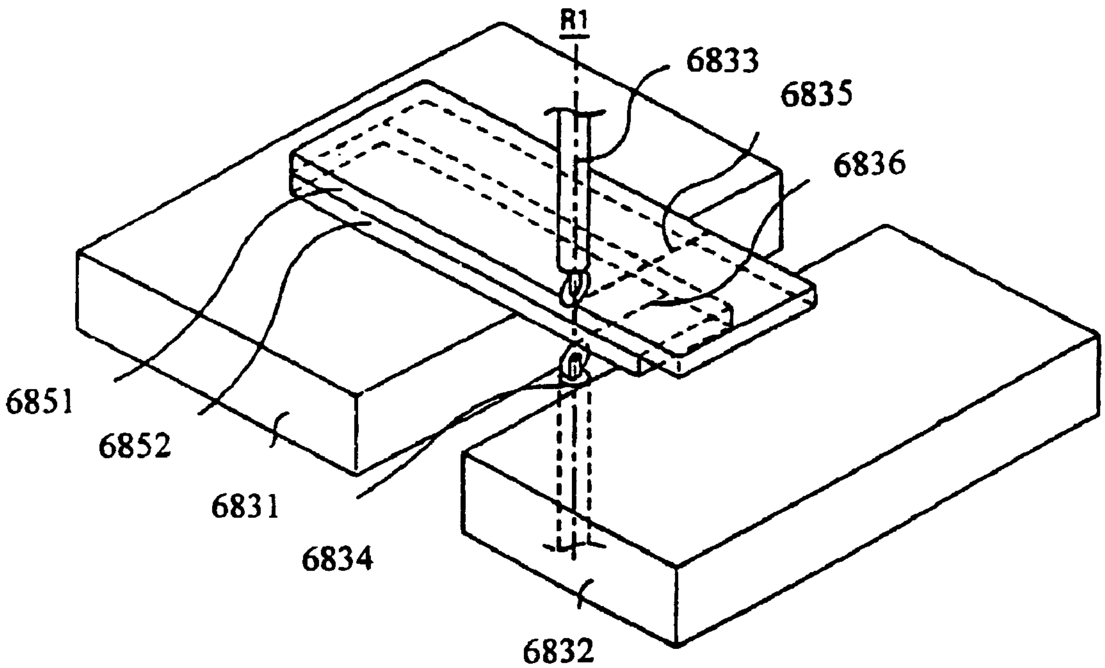

In FIG. 189E, the second scribing unit 6830 sequentially forms second scribing lines 6835 and 6836 at the surfaces of the first and second mother substrates 6851 and 6852 with a second upper wheel 6833 and a second lower wheel 6834 located at the space between the third and fourth tables 6831 and 6832. In this process, the rotated first and second mother substrates 6851 and 6852 move to be positioned between third and fourth tables 6831 and 6832.

In the same manner with the first upper wheel 6812 and the first lower wheel 6813, as described above with reference to FIG. 189B, the second upper wheel 6833 and the second lower wheel 6834 form the second scribing lines 6835 and 6836 at the surfaces of the first and second mother substrates 6851 and 6852. They are isolated with each other for a certain distance in the opposite direction from the reference line R1 at the region where one side of the thin film transistor array substrates is protruded to be longer than the corresponding side of the color filter substrates.

Meanwhile, at the region where the thin film transistor array substrates are not protruded to be longer than the color filter substrates, the second upper wheel 6833 and the second lower wheel 6834 are aligned to form the second scribing lines 6835 and 6836 at the surfaces of the first and second mother substrates 6851 and 6852.

Figure 189F:
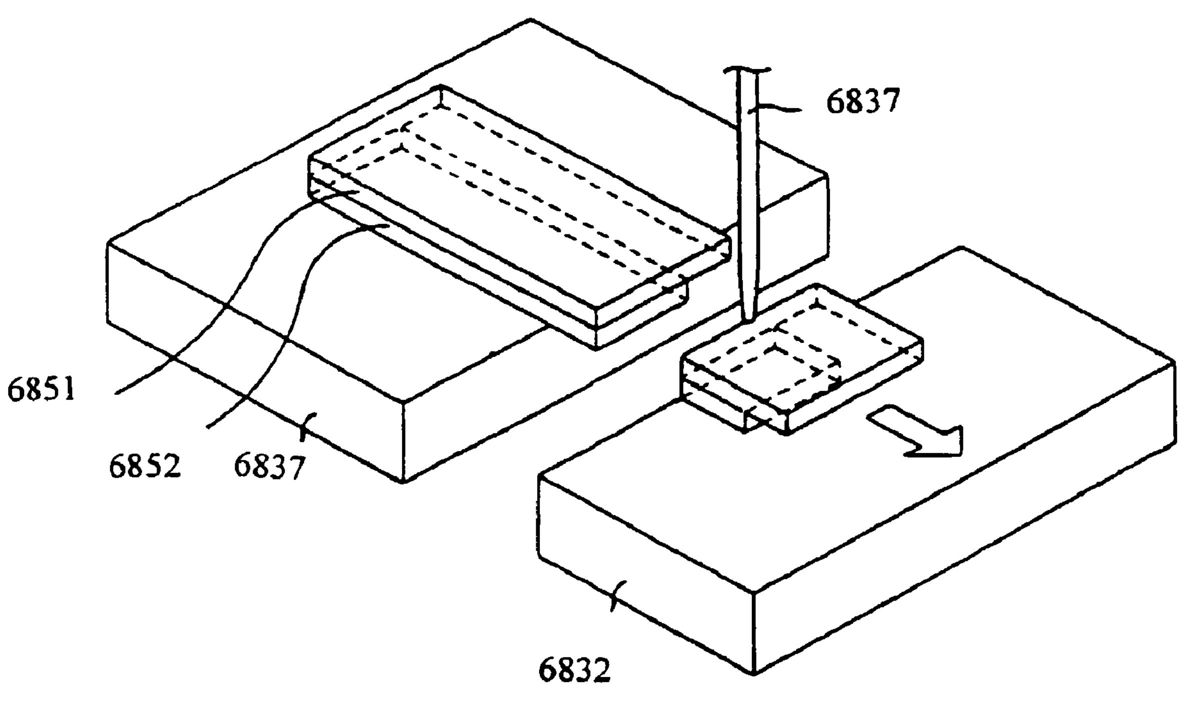

As shown in FIG. 189F, the second scribing unit 6830 presses a portion of the second scribing lines 6835 and 6836 with a second roll 6837 to sequentially cut out the first and second mother substrates 6851 and 6852.

In the same manner with the second roll 6837 and the first roll 6816 as described above with reference to FIG. 189C, one portion or several portions of the second scribing line 6835 formed by the second upper wheel 6833 is simultaneously pressed, so that a crack is transmitted along the second scribing lines 6833 and 6836 on the first and second mother substrates 6851 and 6852.

In this respect, after the second upper wheels 6833 forms second scribing line 6835 at the surface of the first mother substrate 6851, the second roll 6837 is moved to the original position while it presses along the second scribing line 6835 by working with the second upper wheel 6833. Thus, the second scribing line 6835 is more effectively pressed.

The second roll 6837 may be made of urethane since it has a little frictional force with a glass substrate and thus has an excellent characteristic in static electricity. Moreover, it generates a little amount of particles upon contacting with the glass substrate.

Figure 189G:
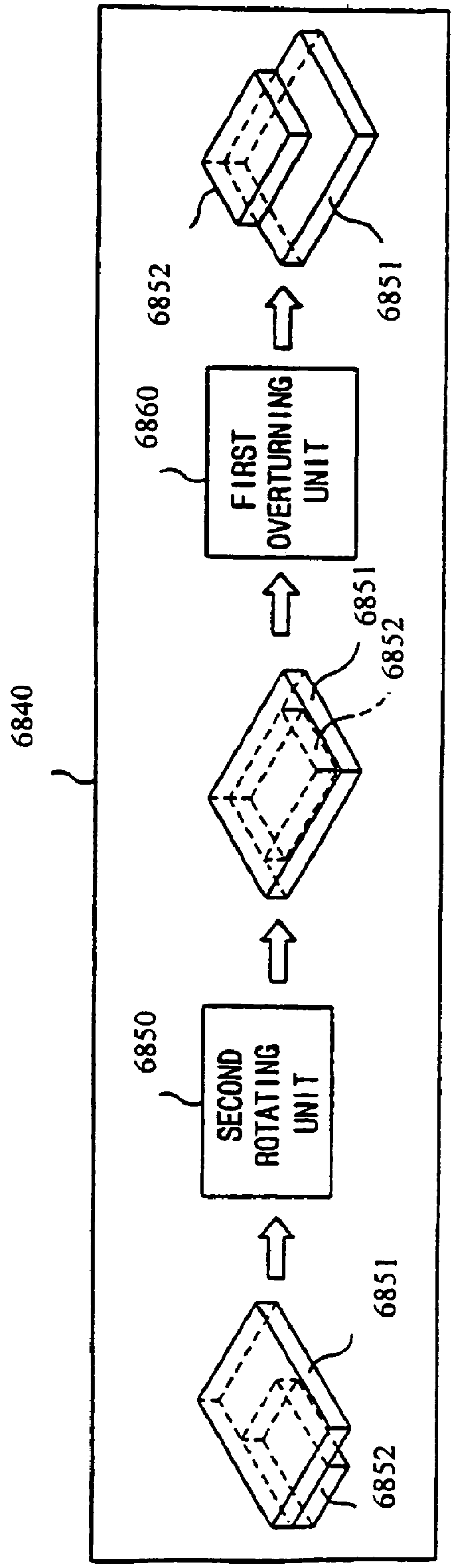

As shown in FIG. 189G, the unloading unit 6840 conveys the unit liquid crystal display panels sequentially cut along the first and second scribing lines 6814, 6815, 6835, and 6836 to the equipment for the following processes.

The sequentially cut unit panels is rotated by 90° compared to the direction of the loading unit 6800. Thus, as shown in FIG. 189G, the unit panels are rotated by 90° by inserting the second rotating unit 6850 into the unloading unit 6840 and unloaded to the equipment for the following processes. Thus, the present invention facilitates the following processes.

In addition, when the color filter substrate should be stacked on the thin film transistor array substrate in the following processes, as shown in FIG. 189G, after the unloaded unit panels are overturned by inserting the first overturning unit 6860 into the unloading unit 6840, they are conveyed to the equipment for the following processes.

As mentioned above, according to the device for cutting a liquid crystal display panel and the method for cutting using the same of the present invention, the first and second mother substrates are cut into the unit panels in such a manner that at least one portion of the first and second scribing lines is pressed with the first and second rolls while the first and second scribing lines are formed through one rotation process, and two simultaneous scribing processes of the first and second mother substrates.

Meanwhile, the thin film transistor array substrate and the color filter substrate attached to each other are fabricated to be separated apart on the first and second mother substrates. A dummy seal pattern may be formed at the exterior of the first and second mother substrates where unit panels are not formed, so as to prevent a distortion of the attached first and second mother substrates depending on the model of the liquid crystal display device.

However, when the first and second mother substrates having a dummy seal pattern is cut by using the first embodiment of the present invention, the first and second mother substrates may not be easily separated from each other.

FIG. 190 is a schematic block diagram of a device for cutting a liquid crystal display panel to effectively cut and separate first and second mother substrates having a dummy seal pattern in accordance with a second embodiment of the present invention.

As shown in FIG. 190, the device of a liquid crystal display panel in accordance with the second embodiment of the present invention includes a loading unit 6900 for loading and aligning first and second mother substrates where a plurality of unit liquid crystal display panels are formed thereon. The first and second mother substrates are placed on the first table. A first scribing unit 6910 is to load and hold the first and second mother substrates by vacuum suction so that it is placed on both the first table and the second table that are spaced apart by a certain distance. A first scribing line is formed at the surface of the first and second mother substrates with the first upper wheel and the first lower wheel. The first and second mother substrates are sequentially cut by moving the first and second tables in the direction so that they become distant from each other. A first rotating unit 6920 is to rotate the cut first and second mother substrates by 90°. A second scribing unit 6930 is to load and hold the rotated first and second mother substrates by vacuum suction to be bridged between the third and fourth tables that are spaced apart by a certain distance. The second scribing line is formed at the surface of the first and second mother substrates with the second upper wheel and the second lower wheels. The first and second mother substrates are sequentially cut by moving the third and fourth tables in a direction that they become distant from each other. An unloading unit 6940 is to unload the unit liquid crystal display panel cut and separated by the first and second scribing units 6910 and 6930 and to convey to the equipment for the following processes.

FIGS. 191A to 191G illustrate sequential processes for performing each block of FIG. 190.

Initially referring to FIG. 191A, the loading unit 6900 loads the first mother substrate 6951 and the second mother substrate 6952 that are attached to each other. The first mother substrate includes a plurality of thin film transistor array substrates formed thereon and the second mother substrate includes a plurality of color filter substrates formed thereon. They are placed on a first table 6905 and aligned through an alignment mark 6906.

If the first and second mother substrates 6951 and 6952 are stacked on the second mother substrate 6952, an impact caused in the cutting process to the thin film transistor array substrate or the color filter substrate may be mitigated.

As shown in FIG. 191B, the first scribing unit 6910 loads the first and second mother substrates 6951 and 6952, so as to be bridged between the first table 6905 and the second table 6911 that are spaced apart from each other. The first scribing unit 6910 also holds the substrates 6951 and 6952 through a plurality of vacuum suction holes 6912, and sequentially forms the first scribing lines 6915 and 6916 at the surfaces of the first and second substrates 6951 and 6952 through the first upper wheel 6913 and the first lower wheel 6914 located at the space between the first and the second tables 6905 and 6911.

One side of the thin film transistor array substrates formed at the first mother substrate 6951 is protruded to be longer than to the corresponding side of the color filter substrates formed on the second mother substrate 6952.

This is because the gate pad unit is formed at one of the horizontal sides and the data pad unit is formed at one of the vertical sides of the thin film transistor array substrate.

Accordingly, at the protruded region of the thin film transistor array substrates, the first scribing line 6915 is formed at the surface of the first mother substrate 6951 distanced from one side of a reference line (R1) by using the first upper wheel 6913. The first scribing line 6915 is formed at the surface of the second mother substrate 6952 distanced from the reference line (R1) in the opposite direction corresponding to the first upper wheel 6913 by using the first lower wheel 6914.

Meanwhile, at the region where a gate pad unit or the data pad unit of the thin film transistor array substrates are not formed, the first upper wheel 6913 and the first lower wheel 6914 are aligned to each other, so as to form the first scribing lines 6915 and 6916 at the surfaces of the first and second mother substrates 6951 and 6952.

In FIG. 191C, the first scribing unit 6910 moves the first and second tables 6905 and 6911 on which the first and second mother substrates 6951 and 6952 are held by the a plurality of vacuum suction holes 6912 in a direction that they become distant from each other. Thereafter, the first and the second mother substrates 6951 and 6952 are cut and separated along the first scribing lines 6915 and 6916.

The vacuum suction holes 6912 may be formed to be separated at constant intervals at the surfaces of the first and second tables 6905 and 6911. The first and second mother substrates 6951 and 6952 are held onto the first and second tables 6905 and 6911 by sucking air and released from the first and second tables 6905 and 6911 by injecting air when the first and second mother substrates are conveyed to the next process.

Meanwhile, as shown in FIG. 192, the vacuum suction holes 6912 may be formed as the vacuum suction unit 7012 having a certain area at the surface of the first and second tables 7005 and 7011, thereby effectively holding the first and second mother substrates 6951 and 6952. If a suction pressure is too high, a black dot stain may occur at the first and the second mother substrates 6951 and 6952. This problem may be prevented by using the vacuum suction unit 7012.

The first rotating unit 6920 rotates the cut first and second mother substrates 6951 and 6952 by 90°, as shown in FIG. 191A.

The second scribing unit 6930, in FIG. 191E, loads the rotated first and second mother substrates 6951 and 6952, so as to be bridged between the third and fourth tables 6931 and 6932 that are spaced apart by a certain distance. The first and second mother substrates 6951 and 6952 are held by the vacuum suction holes 6933. The second scribing lines 6936 and 6937 are sequentially formed at the surface of the first and second mother substrates 6951 and 6952 through the second upper wheel 6934 and the second lower wheel 6935 located at the space between the third and fourth tables 6931 and 6932.

In the same manner with the first upper wheel 6913 and the first lower wheel 6914 as described above with reference to FIG. 191B, the second upper wheel 6934 and the second lower wheel 6935 form the second scribing lines 6936 and 6937 at the surfaces of the first and second mother substrates 6951 and 6952, so as to be isolated to each other by a certain distance in the opposite direction from the reference line R1, at the region where one side of the thin film transistor array substrates is protruded to be longer than the corresponding side of the color filter substrates.

Meanwhile, at the region where the thin film transistor array substrates are not protruded to be longer than the color filter substrates, the second upper wheel 6934 and the second lower wheel 6935 are aligned to each other, so as to form the second scribing lines 6936 and 6937 at the surface of the first and second mother substrates 6951 and 6952.

As shown in FIG. 191F, the second scribing unit 6930 moves the third and fourth tables 6931 and 6932 on which the first and second mother substrates 6951 and 6952 are held by the vacuum suction holes 6933 in a direction that they become distance from each other. The first and second mother substrates 6951 and 6952 are cut and separated from each other along the second scribing lines 6936 and 6937.

The vacuum suction holes 6933 formed at the surface of the third and fourth tables 6931 and 6932 are the same as the vacuum suction holes 6912 formed at the surface of the aforementioned first and second tables 6905 and 6911. The vacuum suction holes 6933 may have a different shape, such as the vacuum suction holes 7012 having a rectangular shape, as illustrated in FIG. 192.

In FIG. 191G, the unloading unit 6940 conveys the unit liquid crystal display panels that are sequentially cut along the first and second scribing lines 6915, 6916, 6936, and 6937 to the equipment for the following processes.

The sequentially cut unit panels are rotated by 90° compared to the direction of the loading unit 6900. Thus, as shown in FIG. 191G, the unit panels are rotated by 90° by inserting the second rotating unit 6950 into the unloading unit 6940 and unloaded to the equipment for the following processes for facilitating the following processes.

If the color filter substrate should be stacked on the thin film transistor array substrate for the following processes, as shown in FIG. 191G, after the unloaded unit panels are overturned by inserting the first overturning unit 6960 into the unloading unit 6940, they may be conveyed to the equipment for the following processes.

As mentioned above, according to the cutter for cutting a liquid crystal display panel and the method for cutting using the same of the present invention, the first and second mother substrates are cut into the unit liquid crystal display panels in such a manner that the first and second tables or the third and fourth tables, on which the loaded and held first and the second mother substrates, are moved in the direction that they become distant from each other, while the first and second scribing lines are formed through one rotation process, and two simultaneous scribing processes of the first and second mother substrates.

The first and second scribing processes respectively include cutting and removing a dummy region where the unit panels are not formed from the first and second mother substrates and cutting the region where the unit panels from the first and second mother substrates, which are alternately performed.

That is, as shown in FIG. 193A, after the first and second mother substrates 7051 and 7052 are moved to be bridged between the first and second tables 7003 and 7004 that are spaced apart by a certain distance, the first scribing line 7007 is formed with the first upper wheel 7005 and the first lower wheel 7006. And then, similar to the first embodiment of the present invention, at least one portion of the first scribing line 7007 is pressed with the roll. Alternatively, similar to the second embodiment of the present invention, the first and second tables 7003 and 7004 on which the held first and second mother substrates 7051 and 7052 are moved in a direction that they become distant from each other. Then, the dummy region 7009 at one side where the unit liquid crystal display panels are not formed is cut out from the first and second mother substrates 7051 and 7052.

As shown in FIG. 193B, the first and second mother substrates 7051 and 7052 without the dummy region 7009 as being removed in the first cutting process are moved in one direction, so as to be bridged between the first and second tables 7003 and 7004. And then, the second scribing line 7008 is formed with the first upper wheel 7005 and the first lower wheel 7006, and at least one portion of the first scribing line 7008 is pressed with the roll, similar to the first embodiment of the present invention. Alternatively, the first and second tables 7003 and 7004 holding the first and second mother substrates 7051 and 7052 are moved in the opposite direction so that the unit panels are cut out from the first and second mother substrates 7051 and 7052.

Thereafter, the first cutting process is performed to cut out the dummy region 7009 where no unit panel is formed from the first and second mother substrates 7051 and 7052. The second cutting process is performed to cut out the unit panels from the first and second mother substrates 7051 and 7052. The first and second cutting processes may be repeatedly performed.

In this respect, however, when the cutting processes are performed on the model having the dummy seal pattern to prevent distortion of the first and second mother substrates 7051 and 7052 at the exterior where no unit panel is formed, the dummy region 7009 and the unit panels may not be completely separated in the first or second cutting process.

In addition, in the second cutting process in the second embodiment of the present invention, a unit panel is large enough to cut out the first and second mother substrates 7051 and 7052 held on the first and second tables 7003 and 7004. However, in the first cutting process, since the dummy region 7009 is very narrow, it is difficult to hold the first and second mother substrates 7051 and 7052 by the first and second tables 7003 and 7004.

FIGS. 194A to 194F illustrate sequential processes for cutting a liquid crystal display panel in accordance with a third embodiment of the present invention.

Figure 194A:
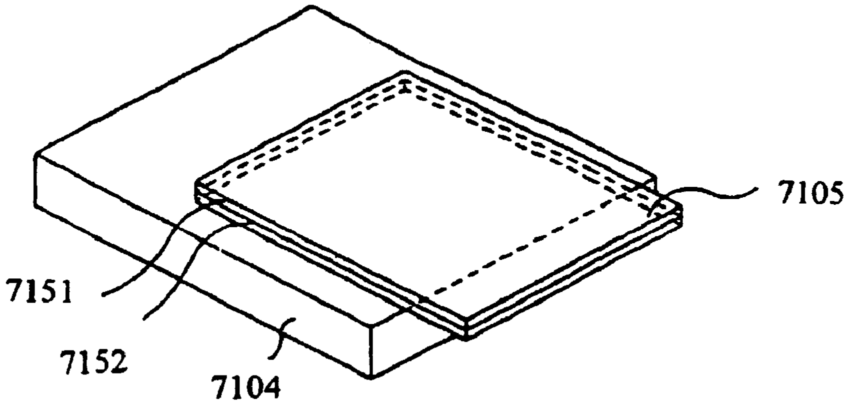

First, as shown in FIG. 194A, first and second mother substrates including a plurality of unit panels formed thereon are loaded on a first table 7104. And then, the first and second mother substrates 7151 and 7152 are moved in one direction, so that a dummy region 7105 where no unit panel is formed is protruded from one side of the first table 7104.

Figure 194B:
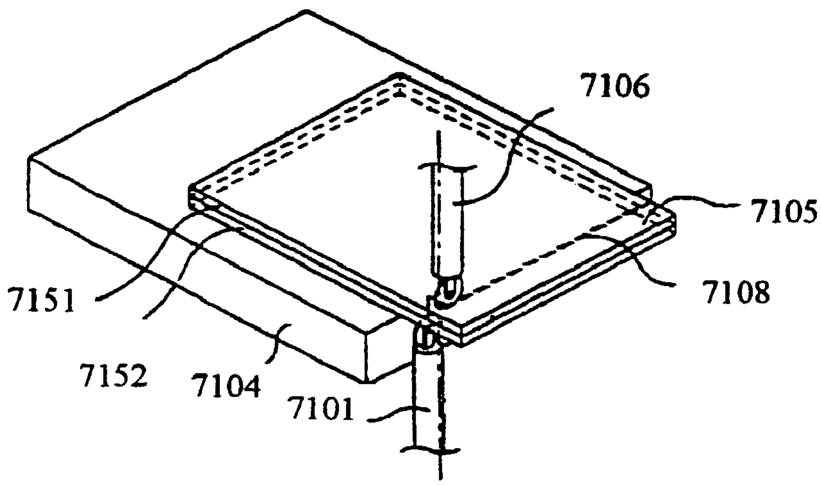

Next, as shown in FIG. 194B, a first scribing line 7108 is formed at the surface of the first and second mother substrates protruded from the first table 7104 by using first upper wheel 7106 and first lower wheel 7107.

Figure 194C:
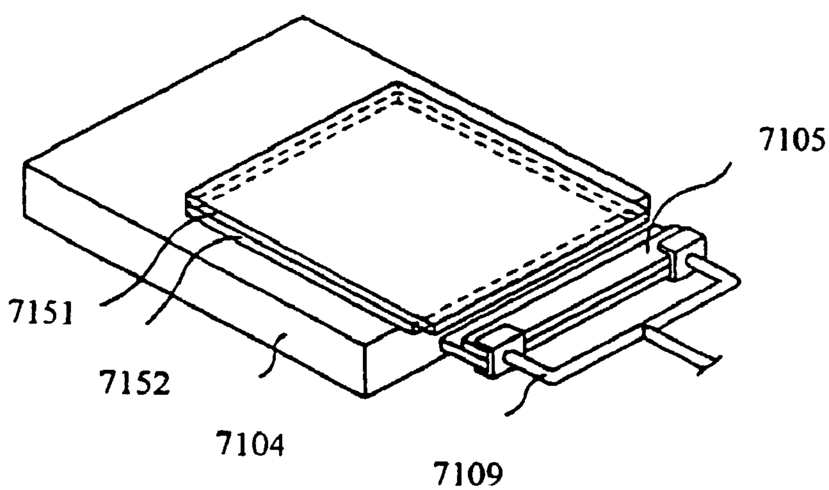

And then, as shown in FIG. 194C, the dummy region 7105 with no unit panel formed is removed from the first and second mother substrates 7151 and 7152 along the first scribing line 7108 by using a robot grip 7109.

In order to facilitate the removal of the dummy region 405 from the first and second mother substrates 7151 and 7152 with the robot grip 7109, at least one portion of the first scribing line 7108 is pressed with a roll, similar to the first embodiment of the present invention, after the first scribing line 7108 is formed with the first upper wheel 7106 and the first lower wheel 7107. Thus, a crack can be transmitted along the first scribing line 7108.

Since the liquid crystal display panel differs in size according to the model of a liquid crystal display device, the robot grip 7109 may have to be able to control the heights by using a sub motor.

When the first mother substrate 7151 with the thin film transistor array substrates formed thereon is stacked on the second mother substrate 7103 with the color filter substrates formed thereon, the robot grip 7109 is positioned to be lower than the first and second mother substrates 7151 and 7152, so as to hold the dummy region 7105, since the thin film transistor substrate is protruded to be longer than the color filter substrate. Conversely, the robot grip 7109 is positioned to be higher than the first and second mother substrates 7151 and 7152, so as to hold the dummy region 7105, so that an impact applied to the unit panel may be prevented in advance.

Figure 194D:
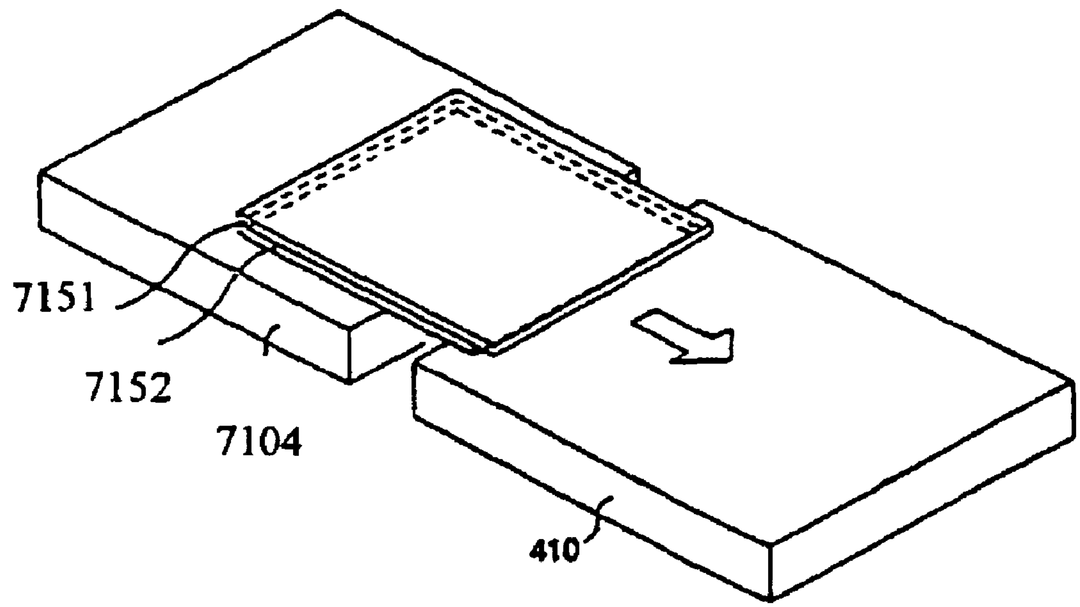

As shown in FIG. 194D, the first and second mother substrates 7151 and 7152 without the dummy region 7105 are moved in one direction to be bridged between the first table 7104 and the second table 7110 that are spaced apart a certain distance.

Figure 194E:
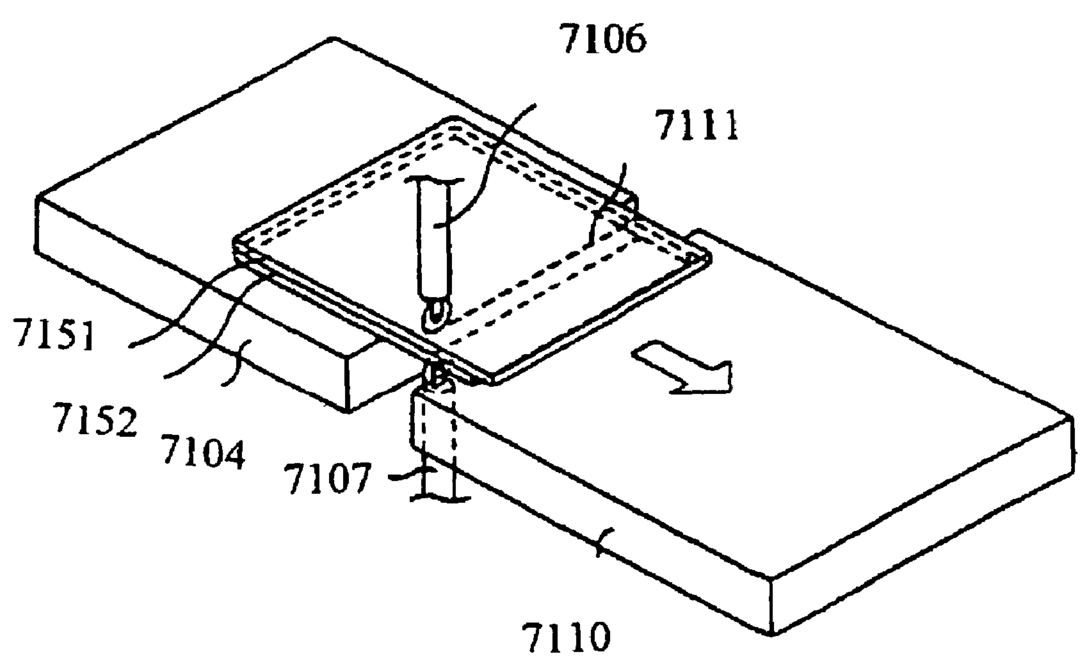

As shown in FIG. 194E, a second scribing line 7111 is formed at the surface of the first and second mother substrates 7151 and 7152 by using the first upper wheel 7106 and the first lower wheel 7107 located at the space between the first and second tables 7104 and 7110.

Figure 194F:
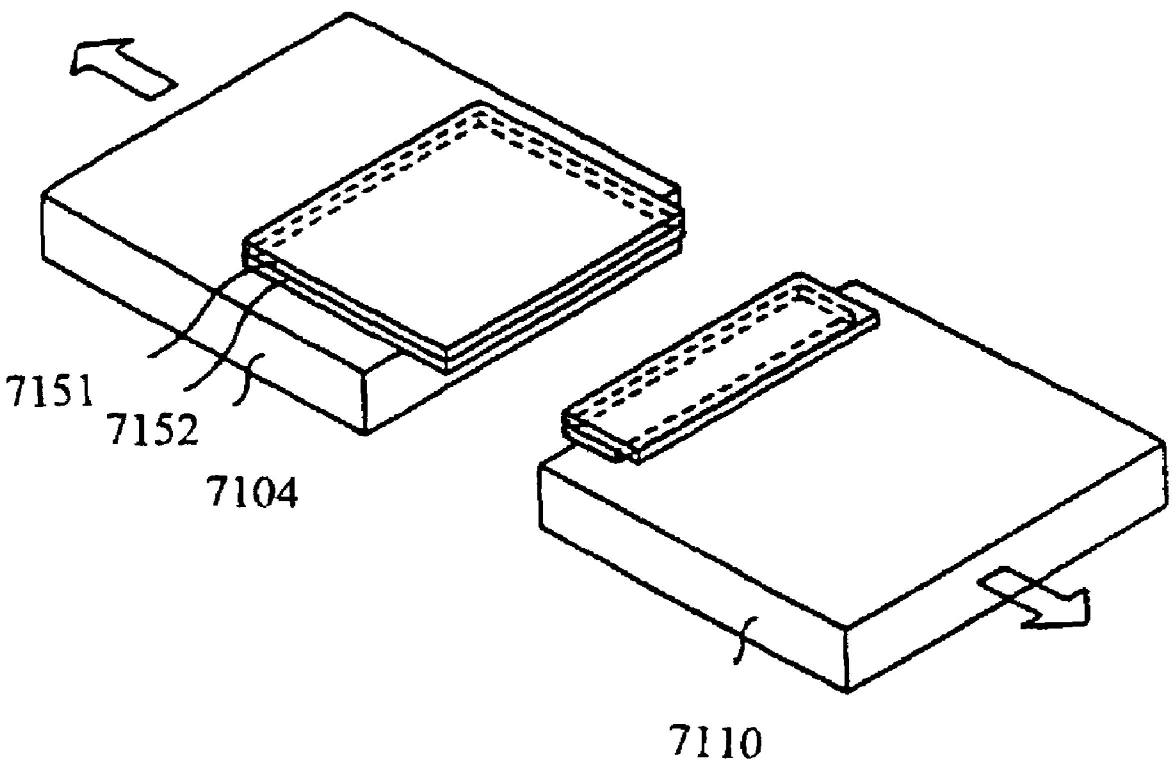

Next, as shown in FIG. 194F, the first and second tables 7104 and 7110 are moved in a direction that they become distant from each other. The unit panels are cut and separated from the first and second mother substrates 7151 and 7152 along the second scribing line 7111.

In order to easily cut and separate the unit panels from the first and second mother substrates 7151 and 7152 after moving the first and second tables 7104 and 7110 in the opposite direction, the second scribing line 7111 is formed through the first upper wheel 7106 and the first lower wheel 7107. Then, at least one portion of the second scribing line 7111 is pressed with a roll so that a crack can be transmitted along the second scribing line 7111.

As so far described, the device of a liquid crystal display panel and the method for cutting using the same in accordance with the present invention have the following advantages over the conventional art.

For example, referring back to the first embodiment of the present invention, the liquid crystal display panels may be cut into the unit liquid crystal display panels by forming the first and second scribing lines by one rotation process and two simultaneous scribing processes of the first and second mother substrates, and pressing a portion of or along the first and second scribing lines with the first and second rolls.

Thus, the time required for scribing may be minimized compared to that of the conventional art. Also, since an overturning unit for overturning the first and second mother substrates and a breaking unit for a crack transmission are not necessary, the time required for scribing, breaking, and overturning is reduced, thereby improving productivity. In addition, an installation expense and an installation space of equipment are effectively used.

Referring to the second embodiment of the present invention, the liquid crystal display panel may be cut into the unit liquid crystal display panels by forming the first and second scribing lines through one rotation process and two simultaneous scribing processes of the first and second mother substrates and moving the first and second table or the third and fourth tables, on which the first and second mother substrates in the opposite direction.

Thus, the unit panels may be more effectively cut out from the mother substrates. Especially, when the dummy seal pattern is formed to prevent distortion of the first and second mother substrates, the unit panels may be effectively cut out from the mother substrates.

Similarly, referring to the third embodiment of the present invention, in case that the dummy seal pattern is formed at the exterior where no unit panel is formed to prevent distortion of the first and second mother substrates, cutting of the unit panels may be effectively performed.

In addition, the dummy region having a small width may be held and processed without difficulty in the third embodiment of the present invention.

FIG. 195 illustrates a perspective view of a cutting wheel for a liquid crystal display panel according to a first embodiment of the present invention.

Referring to FIG. 195, a cutting wheel for a liquid crystal display panel according to the present invention has a circular shape and includes a first cutting wheel 7200 and a second cutting wheel 7300.

Penetrating holes 7201 and 7301 are formed at centers of the first and second cutting wheels 7200 and 7300 to receive a support spindle (not shown). And, unevenly-shaped, or serrated first and second blades 7202 and 7302 are formed along edges of the first and second cutting wheels 7200 and 7300, respectively. Protrusions of first and second blades 7202 and 7302 may also be evenly or unevenly spaced.

The first and second cutting blades 7202 and 7302 according to the first embodiment of the present invention are preferably made of diamond, which has a hardness greater than that of generally used tungsten carbide, which will extend the endurance of the cutting blades. Moreover, the first and second cutting wheels 7200 and 7300 can be formed individually to be bonded to a support spindle (not shown) through the penetrating holes 7201 and 7301, or the cutting wheels 7200 and 7300 can be built in one body, i.e., unitary.

When grooves are formed on a liquid crystal display panel using the first and second cutting wheels 7200 and 7300 according to the first embodiment of the present invention, the rotating first and second blades 7202 and 7302 along edges of the first and second cutting wheels 7200 and 7300 come into close contact with the liquid crystal display panel of glass at a uniform pressure so as to form grooves having a predetermined depth.

FIG. 196 illustrates an exemplary diagram of first and second grooves formed on a surface of a liquid crystal display panel using the first and second cutting wheels 7200 and 7300 according to the first embodiment of the present invention.

Referring to FIG. 196, first groove 7251 is formed on a surface of a liquid crystal display panel 7250 by first blades 7202 of the first cutting wheel 7200, and second groove 7252 is formed on the surface of the liquid crystal display panel 7250 by second blades 7302 of the second cutting wheel 7300. In this case, the first and second grooves 7251 and 7252 are shown as a pair of parallel dotted lines. In practice, the first and second grooves 7251 and 7252 are about 300 μm apart.

In the first embodiment of the present invention, the first and second blades 7202 and 7302 are formed along the edges of the first and second cutting wheels 7200 and 7300. The grooves are formed using a pair of the cutting wheels 7200 and 7300. Hence, the cutting of the liquid crystal display panel can be carried out at a pressure lower than the case of using a single cutting wheel.

Specifically, even if the first blades 7202 are partially broken or particles stick to the first blades 7202, the second blades 7302 are able to form a normal groove on the surface of liquid crystal display panel.

Namely, when the first blade 7202 of the first cutting wheel 7200 are deteriorated, a groove can be formed on the liquid crystal display panel using the second blade 7302 of the second cutting wheel 7300 instead of replacing the first cutting wheel 7200, as in the related art.

Therefore, the cutting wheel for the liquid crystal display panel according to the first embodiment of the present invention has an extended endurance longer than that of the cutting wheel having the blade according to the related art.

FIG. 197 illustrates a perspective view of first and second cutting wheels 7200 and 7300, of which first and second blades 7202 and 7302 are staggered or offset with respect to each other, respectively, according to a second embodiment of the present invention. The offset of the first and second blades 7202 and 7302 may be at a predetermined angle.

Referring to FIG. 197, first and second blades 7202 and 7302 are arranged so that the blades of the respective wheels 7200 and 7300 are staggered or offset with respect to each other. First and second groves 7251 and 7252, as shown in FIG. 198, also alternate with respect to each other on the surface of a liquid crystal display panel 7250. Cracks can be propagated well from the first and second grooves 7251 and 7252. Likewise, even when the first blades 7202 of the first cutting wheel 7200 are partially broken or particles stick between protrusions of the first blade 7202, a groove can be formed on the liquid crystal display panel using the second blade 7302 of the second cutting wheel 7300 so as to extend the endurance of the cutting wheel.

FIG. 199 illustrates an enlarged partial view of a liquid crystal display panel cutting wheel according to the present invention.

Referring to FIG. 199, a circular cutting wheel 7400 includes a penetrating hole 7401 at a center to receive a support spindle (not shown), evenly-spaced first blades 7402 are formed by grinding front and rear faces of the cutting wheel 7400 along edges so that protrusions of the first blades 7402 protrude from the center of the cutting wheel 7400 at a first radius R1, and evenly-spaced second blades 7403 alternating with the first blades 7402 respectively so that protrusions of the second blades 7403 protrude from the center of the cutting wheel 7400 by a second radius R2. The first and second blades 7402 and 7403 may be unevenly spaced and/or unevenly shaped.

The first and second blades 7402 and 7403 in FIG. 199 are preferably formed of diamond, which has a hardness greater than that of generally-used tungsten carbide.

Operation of the cutting wheel 7400 for a liquid crystal display panel according to the present invention is explained in detail as follows.

First, the first blades 7402 protruding from the center of the cutting wheel 7400 by the first radius R1 are made to adhere closely to a liquid crystal display panel at a predetermined pressure and are rotated thereon, to form a groove having a predetermined uniform depth. In this case, even though made of diamond, the first blades 7402 are abraded after grooves totaling 6000m in length have been formed on liquid crystal display panels such that a normal groove cannot be formed on the surface of the liquid crystal display panels.

However, when the first blades 7402 shown in FIG. 199 have been abraded, the second blades 7403 protruding from the center of the cutting wheel 7400 by the second radius R2 are capable of forming the normal groove on the surface of the liquid crystal display panels.

Namely, when the first blades 7402 are abraded so that the first radius R1 becomes less than the second radius R2 of the second blades 7403, the normal groove can be formed on the liquid crystal display panel using the second blades 7403 instead of replacing the cutting wheel 7400.

Therefore, the cutting wheel according to the third embodiment of the present invention has an extended endurance compared to that of the cutting wheel according to the related art, thereby extending the life of the cutting wheel.

FIG. 200 illustrates an enlarged partial view of a liquid crystal display panel cutting wheel according to a fourth embodiment of the present invention.

Referring to FIG. 200, a circular cutting wheel 7500 includes a penetrating hole 7501 at a center to receive a support spindle (not shown), evenly-spaced first blades 7502 formed by grinding front and rear faces of the cutting wheel along edges so as to have a first height H1 from a perceived edge of the cutting wheel 7500, and evenly-spaced second blades 7503 formed between the first blades 7502 so as a second height H2. The first and second blades 7502 and 7503 may be unevenly shaped and may be unevenly spaced with respect to one another.

When the first blades 7502 having the first height H1 have been abraded so as not to form a normal groove on a surface of the liquid crystal display panel, the second blades 7503 having the second height H2 are capable of forming the normal groove on the surface of the liquid crystal display panel.

Namely, when the first blades 7502 are abraded so that the first height H1 becomes lower than the second height H2 of the second blades 7503, the normal groove can be formed on the liquid crystal display panel using the second blades 7503 instead of replacing the cutting wheel 7500.

Therefore, the cutting wheel according to the present invention has an extended endurance compared to that of the cutting wheel according to the related art, thereby extending the life of the cutting wheel.

FIG. 201 illustrates a perspective view of a liquid crystal display panel cutting wheel according to the present invention.

Referring to FIG. 201, a first circular cutting wheel 7600 includes a penetrating hole 7601 at a center to receive a support spindle (not shown) and evenly-spaced first blades 7602 formed by grinding front and rear faces of the first cutting wheel 7600 along an edge to protrude from the center of the first cutting wheel 7600 by a first radius R1 and spaced apart from each other by a predetermined interval. A second circular cutting wheel 7610 includes a penetrating hole 7611 at a center to receive the support spindle and evenly-spaced second blades 7612 formed by grinding front and rear faces of the second cutting wheel 7610 along an edge to protrude from the center of the second cutting wheel 7610 by a second radius R2 and spaced apart from each other by a predetermined interval. The first and second blades 7602 and 7612 may be unevenly shaped and may be unevenly spaced with respect to each other. The second blades 7612 of the second wheel 7610 may be offset from the first blades 7602 of the first wheel 7600, for example, by a predetermined angle.

The first and second cutting wheels 7600 and 7610 are manufactured individually so as to be bonded to the support spindle through the penetrating holes 7601 and 7611 or can built in one body, i.e., be unitary.

Like the cutting wheels 7400 and 7500 for the liquid crystal display panels according to the previous embodiments of the present invention, when the first blades 7602 protruding from the center of the first cutting wheel 7600 by the first radius R1 have been abraded so as not to form a normal groove on a surface of the liquid crystal display panel, the second blades 7612 are capable of forming the normal groove on the surface of the liquid crystal display panel.

Namely, when the first blades 7602 of the first cutting wheel 7600 are abraded so that the first radius R1 becomes less than the second radius R2, the normal groove can be formed on the liquid crystal display panel using the second blades 7612 of the second cutting wheel 7610 instead of replacing the first cutting wheel 7600.

Therefore, as is the same case of the third or fourth embodiment of the present invention, the cutting wheel for the liquid crystal display panel according to another embodiment of the present invention has an extended endurance compared to that of the cutting wheel according to the related art, thereby extending the life of the cutting wheel.

Accordingly, the cutting wheel for the liquid crystal display panel according to the first or second embodiment of the present invention includes a pair of the same-sized cutting wheels and the blades along the edges respectively, which can be operated under an improved pressure condition compared to the conventional devices. Specifically, the cutting wheel for the liquid crystal display panel according to the first or second embodiment of the present invention is capable of forming a groove on the surface of the liquid crystal display panel continuously even if the blades of one of the cutting wheels are broken in part or particles are attached between the blades, thereby extending the life of the cutting wheel to improve a productivity as well as reduce a cost of purchasing the cutting wheel.

Moreover, the cutting wheel for the liquid crystal display panel according to the present invention has differentiated protruding heights of the blades formed along the edges of the circular cutting wheel, thereby extending the endurance of the cutting wheel compared to that of the related art. Therefore, the present invention extends the replacement time of the cutting wheel to improve productivity as well as reduce a cost of purchasing replacement cutting wheels.

FIG. 202 illustrates a diagram of a grinding table apparatus for a liquid crystal display panel and a grinder apparatus using the same according to an embodiment of the present invention.

Referring to FIG. 202, a grinder apparatus for a liquid crystal display panel according to the present invention includes a loading unit 7711 loading a unit liquid crystal display panel 7700, a first grinding unit 7715 having a pair of grinding tables 7712 and 7713 moving in a farther or closer direction to cope with a size of the unit liquid crystal display panel 7700 to receive the unit liquid crystal display panel 7700 loaded on the loading unit 7711 by suction for adherence and grinding short edge sides of the unit liquid crystal display panel 7700 through a first grind wheel 7714, a second grinding unit 7719 having another pair of grinding tables 7716 and 7717 moving in a farther or closer direction to receive and to hold the unit liquid crystal display panel 7700, of which short edge sides have been ground, by suction for adherence and grinding long edge sides of the unit liquid crystal display panel 7700 through a second grind wheel 7718, and an unloading unit 7720 for receiving the unit liquid crystal display panel 7700 of which long edge sides have been ground by the second grinding unit 7719.

In one embodiment, a plurality of suction holes 7721 are formed at surfaces of the grinding tables 7712, 7713, 7716, and 7717 to make the unit liquid crystal display panel 7700 adhere thereto by suction so as to support the liquid crystal display panel 7700 stably. And, the grinder apparatus may further include a rotating unit enabling grinding of long sides of the unit liquid crystal display panel 7700 by rotating the unit liquid crystal display panel, of which short sides have been ground, at 90°.

FIGS. 203A to 203C illustrate exemplary diagrams for grinding tables 7712 and 7713 of a first grinding unit 7715 that is capable of moving in a farther or closer in an x or y direction reciprocally so as to adapt with a size of a liquid crystal display panel 7700 in FIG. 202.

Referring to FIG. 203A, a pair of the grinding tables 7712 and 7713 are spaced apart from each other by a predetermined distance so as to make short sides of the liquid crystal display panel 7700 protrude from the corresponding edges of the tables 7712 and 7713. Thus, the grinding tables 7712 and 7713 support the liquid crystal display panel 7700 so that short edge sides of the unit liquid crystal display panel 7700 can be ground.

Referring to FIG. 203B, when a size of a unit liquid crystal display panel 7730 is greater than that of the liquid crystal display panel 7700 in FIG. 203A, the pair of the grinding tables 7712 and 7713 are displaced by a predetermined distance to move the grinding tables 7712 and 7713 farther from each other, i.e. in opposition directions, so as to make edges of a first side, e.g., a short side, of the unit liquid crystal display panel 7730 protrude sufficiently over the edges of the grinding tables for grinding. Thus, the tables 7712 and 7713 support the unit liquid crystal display panel 7730 so that short side edges of the unit liquid crystal display panel 7730 can be ground.

Referring to FIG. 203C, when a size of a unit liquid crystal display panel 7740 is smaller than that of the liquid crystal display panel 7700 in FIG. 203A, the pair of the grinding tables 7712 and 7713 are displaced by a predetermined distance to move the grinding tables 7712 and 7713 closer to each other, i.e. an inward direction, so as to make edges of a first side, e.g., a short side, of the unit liquid crystal display panel 7740 protrude sufficiently over the edges of the grinding table for grinding. Thus, the tables 7712 and 7713 support the unit liquid crystal display panel 7740 so that first side edges of the unit liquid crystal display panel 7740 can be ground.

The grinding tables 7712 and 7713 installed at the first grinding unit 7715 are preferably prepared to move to adhere closely to each other to cope with a minimum-sized model as well as move to be spaced apart with a maximum interval in a farther direction to cope with a maximum-sized model. Such relative movement can be achieved by keeping one of the grinding tables 7712 and 7713 fixed relative to the other while moving the other grinding table appropriately.

The other grinding tables 7716 and 7717 installed at the second grinding unit 7719 are preferably prepared to be displaced in order to cope with the various sizes of the unit liquid crystal display panels 7700, 7730, and 7740 like the grinding tables 7712 and 7713 installed at the first grinding unit 7715.

Similarly, such relative movement can be achieved by keeping one of the grinding tables 7716 and 7717 fixed relative to the other while moving the other table appropriately.

Moreover, suction holes 7721 may be formed at surfaces of the grinding tables 7712, 7713, 7716, and 7717 of the first and second grinding units 7715 and 7719, respectively, so as to support each of the variously-sized unit liquid crystal display panels 7700, 7730, and 7740 stably by making them adhere thereto by suction.

Therefore, the grinding table apparatus for the liquid crystal display panel and the grinder apparatus using the same are able to adapt with various sizes of the unit liquid crystal display panels without replacing the grinding table with a corresponding one.

FIG. 204 illustrates a diagram of a grinding table apparatus for a liquid crystal display panel and a grinder apparatus using the same according to another embodiment of the present invention.

Referring to FIG. 204, a grinder apparatus according to the present invention includes a loading unit 7811 for loading a liquid crystal display panel 7800 thereon, a first grinding unit 7817 having four grinding tables 7812 to 7815 capable of moving in farther or closer directions to adapt with a size of the unit liquid crystal display panel 7800 to receive the unit liquid crystal display panel 7800 loaded on the loading unit 7811 by suction for adherence and for grinding edges of the unit liquid crystal display panel 7800 through a first grind wheel 7816 and an unloading unit 7818 for receiving the unit liquid crystal display panel 7800 of which edges have been ground.

A plurality of suction holes 7819 may be formed at surfaces of the grinding tables 7812 to 7815 to make the unit liquid crystal display panel 7800 adhere thereto by suction to support the liquid crystal display panel 7800 stably.

FIGS. 205A to 205C illustrate exemplary diagrams for the grinding tables 7812 to 7815 of the first grinding unit 7817 moving farther or closer reciprocally to adapt with the size of the liquid crystal display panel 7800 in FIG. 204.

Referring to FIG. 205A, the grinding tables 7812 to 7815 are spaced apart from each other by predetermined distances to make edges of the liquid crystal display panel 7800 protrude from the corresponding edges of the tables sufficiently for grinding. Thus, the grinding tables 7812 to 7815 support the liquid crystal display panel 7800 so that the edges of the unit liquid crystal display panel 7800 can be ground.

Referring to FIG. 205B, when a size of a unit liquid crystal display panel 7830 is greater than that of the liquid crystal display panel 7800 in FIG. 205A, the grinding tables 7812 to 7815 are displaced by predetermined distances in directions to move the grinding tables 7812 to 7815 farther from each other to make edges of the unit liquid crystal display panel 7830 protrude somewhat over edges of the grinding tables. Thus, the tables 7812 to 7815 support the unit liquid crystal display panel 7830 so that the edges of the unit liquid crystal display panel 7830 of which size is greater than that of the unit liquid crystal display panel 7800 in FIG. 205A can be ground.

Referring to FIG. 205C, when a size of a unit liquid crystal display panel 7840 is smaller than that of the liquid crystal display panel 7800 in FIG. 205A, the grinding tables 7812 to 7815 are displaced by predetermined distances in directions to move the grinding tables 7812 to 7815 closer to each other to make edges of the unit liquid crystal display panel 7840 protrude somewhat over edges of the grinding tables. Thus, the grinding tables 7812 to 7815 support the unit liquid crystal display panel 7840 so that the edges of the unit liquid crystal display panel 240 of which size is smaller than that of the one 7800 in FIG. 205A can be ground.

The grinding tables 7812 to 7815 are preferably prepared so as to be close to each other to cope with a minimum-sized model, as well as to move to be spaced apart with a maximum interval to adapt to a maximum-sized model.

Moreover, suction holes 7819 are preferably formed at surfaces of the grinding tables 7812 to support each of the variously-sized unit liquid crystal display panels 7800, 7830, and 7840 stably by making the panels adhere to the tables by suction.

Therefore, the grinding table apparatus for the liquid crystal display panel and the grinder apparatus using the same enable to cope with various sizes of the unit liquid crystal display panels without replacing the grinding table by the corresponding one, thereby allowing grinding of all the edges of the liquid crystal display panel simultaneously. Compared to the foregoing embodiment of the present invention having the first and second grinding units to grind the long and short sides of the liquid crystal display panel respectively and the rotating unit to turn the unit liquid crystal display panel at 90°, this embodiment of the present invention enables the grinding process to be carried out conveniently and rapidly.

FIGS. 206A to 206C illustrate exemplary diagrams for grinding tables of a first grinding unit moving in farther or closer directions reciprocally to adapt with a size of a liquid crystal display panel according to a further embodiment of the present invention.

Referring to FIGS. 206A to 206C, four movable grinding tables 7912 to 7915 are displaced in farther or closer directions by predetermined distances to adapt for grinding edges of variously-sized unit liquid crystal display panels 7900, 7930, and 7940, respectively.

Besides, the grinder apparatus according to this embodiment of the present invention further includes a support table 7950 at a center of the four movable grinding tables 7912 to 7915. The support table 7950 maybe fixed at the center of the moveable grinding tables 7912 to 7915.

The support table 7950 supports each of the unit liquid crystal display panels 7900, 7930, and 7940 at the center when the grinding tables 7912 to 7915 are displaced father away from each other, thereby preventing bending, drooping or warping of the corresponding unit liquid crystal display panel 7900, 7930, or 7940.

Preferably, a plurality of suction holes 7919 are formed at surfaces of the grinding tables 7912 to 7915 and support table 7950 so as to support each of the variously-sized liquid crystal display panels 7900, 7930, and 7940 stably.

Accordingly, the grinding table for the liquid crystal display panel and the grinder apparatus using the same moves at least two of its grinding tables in a farther or closer direction to cope with various sizes of unit liquid crystal display panels, thereby enabling grinding of the edges of the corresponding liquid crystal display panel.

And, the present invention eliminates the need to replace the grinding tables, thereby reduces process time and improves productivity.

Moreover, the present invention does not require a plurality of grinding tables to cope with the various sizes of the unit liquid crystal display panels. Thus investment costs are reduced and excessive space for storing the grinding tables is not required, which makes the grinding table apparatus and grinder apparatus according to the present invention advantageous in a practical use of space.

FIG. 207 is a schematic view illustrating an indicator having a pattern for detecting a grinding amount of an LCD panel in accordance with the present invention.

As shown in FIG. 207, a unit LCD panel 8000 includes a picture display unit 8013 having liquid crystal cells arranged in a matrix form, a gate pad unit 8013 for connecting a plurality of gate lines GL1 to GLm of the picture display unit 8014 to a gate driver integrated circuit (not shown), to which a gate signal is applied, and a data pad unit 8015 for connecting a plurality of data lines DL1 to DLn of the picture display unit 8013 to a data driver integrated circuit (not shown), to which the picture information is applied. At this time, the gate pad unit 8014 and the data pad unit 8015 are formed at the marginal portion of the thin film transistor array substrate 8001 protruding to be longer than the color filter substrate 8002.

At the region where the data lines DL1 to DLn and the gate lines GL1 to GLm vertically cross one another, a thin film transistor is formed for switching the liquid crystal cell. A pixel electrode is formed to be connected to the thin film transistor for driving the liquid crystal cell. A passivation film is formed at the entire surface to protect the data lines DL1 to DLn, the gate lines GL1 to GLm, the thin film transistors and the electrodes.

Also, a shorting line (not shown) for electrically shorting out the conductive films is formed at the marginal portion of the thin film transistor array substrate 8001, to eliminate static electricity which may be generated in forming conductive films, such as a data line, a gate line, and an electrode, on the thin film transistor array substrate 8001.

At the color filter substrate 8002 of the picture display unit 8013, a plurality of color filters are coated and separated by cell regions with a black matrix. A common transparent electrode corresponding to the pixel electrode is formed at the thin film transistor array substrate 8001.

A cell gap is formed between the thin film transistor array substrate 8001 and the color filter substrate 8002 so that the two substrates are spaced apart and face into each other. The thin film transistor array substrate 8001 and the color filter substrate 8002 are attached by a sealant (not shown) formed at the exterior of the picture display unit 8013. A liquid crystal layer (not shown) is formed at the space between the thin film transistor array substrate 8001 and the color filter substrate 8002.

On the other hand, a predetermined number of tap marks 8050*a* to 8050*j* are formed and separated from one another for aligning the data lines DL1 to DLn, the gate lines GL1 to GLm to contact a plurality of pins of the gate driver integrated circuit and the data driver integrated circuit. For example, as shown in FIG. 207, three tap marks 8050*a* to 8050*c* are formed and separated from one another at the gate pad unit 8014 and seven tap marks 8050*d* to 8050*j* are formed to be separated from one another at the data pad unit 8015.

The above unit LCD panel 8000 must be ground to have a sloped edge from the end of the unit LCD panel 8000 to the grinding line R1, as shown in the expansion region EX1 of FIG. 207. However, the actual ground line of the unit LCD panel 8000 has an error margin D1 from the grinding line R1. Thus, when the error is beyond the error margin D1, it is determined that the grinding is defective.

Conventionally, an operator must take out the ground unit liquid crystal display panel 8000 from the production line for a predetermined period. The selected liquid crystal display panel is measured with an additional apparatus to determine whether the actual ground line of the unit LCD panel 8000 is beyond the error margin D1 using a high magnifying power camera or a projector positioned at the measuring apparatus.

However, in the embodiment of the present invention, as shown in FIG. 207, a pattern 8020 for judging grinding amount is formed at a region corresponding to an error margin D1. A grinding line R1 is formed in the middle of the error margin D1. At this time, the error margin D1 is set to be about ±100 μm from the grinding line R1. It is desirable that when the pattern for judging the grinding amount 8020 is formed at the gate pad unit 8014, the pattern and the gate lines GL1 to GLm are formed at the same time. When the pattern for judging the grinding amount 8020 is formed at the data pad unit 8015, the pattern and the data lines DL1 to DLn are formed at the same time.

Therefore, whether the actual ground line of the unit liquid crystal display panel 8000 is beyond the error margin D1 is determined by naked eyes.

Namely, if the observed pattern for deciding a grinding amount 8020 of the completed unit LCD panel 8000 is not ground at all, it should be more ground. If the observed pattern is completely ground so that no portion of the pattern remains, grinding is too excessive.

With the pattern for deciding a grinding amount of the LCD panel and a method for detecting grinding failure using the same in accordance with the first embodiment of the present invention, an additional measuring instrument is not required and the grinding failure is determined for all of the unit LCD panels 8000 unlike the conventional LCD and the method thereof.

FIG. 208 is a schematic view showing an indicator having a pattern for detecting a grinding amount of the LCD panel in accordance with the present invention.

The unit LCD panel 8000 in FIG. 208 includes a picture display unit 8013 having liquid crystal cells arranged in a matrix form, a gate pad unit 8014 for connecting a plurality of gate lines GL1 to GLm of the picture display unit 8013 to a gate driver integrated circuit (not shown), to which a gate signal is applied, and a data pad unit 8015 for connecting a plurality of data lines DL1 to DLn of the picture display unit 8013 to a data driver integrated circuit (not shown), to which picture information is applied. The gate pad unit 8014 and the data pad unit 8015 are formed at the marginal portion of the thin film transistor array substrate 8001 having vertical and horizontal side edges from the color filter substrate 8002.

At the region where the data lines DL1 to DLn and the gate lines GL1 to GLm vertically cross one another, a thin film transistor is formed for switching the liquid crystal cell. A pixel electrode is formed to be connected to the thin film transistor for driving the liquid crystal cell. A passivation film is formed at the entire surface to protect the data lines DL1 to DLn, the gate lines GL1 to GLm, the thin film transistors, and the electrodes.

Also, a shorting line (not shown) for electrically shorting out the conductive films is formed at the marginal portion of the thin film transistor array substrate 8001 to remove static electricity which may be generated in forming conductive films, such as a data line, a gate line, and an electrode on the thin film transistor array substrate 8001.

At the color filter substrate 8002 of the picture display unit 8013, a plurality of color filters formed to be separated by cell regions with a black matrix and a common transparent electrode corresponding to the pixel electrode are formed at the thin film transistor array substrate 8001.

A cell gap is formed between the thin film transistor array substrate 8001 and the color filter substrate 8002 so that the two substrates are spaced apart and face into each other. The thin film transistor array substrate 8001 and the color filter substrate 8002 are attached to each other by a sealant (not shown) formed at an exterior of the picture display unit 8013. A liquid crystal layer (not shown) is formed at the space between the thin film transistor array substrate 8001 and the color filter substrate 8002.

A plurality of tap marks 8050*a* to 8050*j* are formed separated from one another for aligning the data lines DL1 to DLn, the gate lines GL1 to GLm to contact a plurality of pins of the gate driver integrated circuit and the data driver integrated circuit. For example, as shown in FIG. 208, three tap marks 8050*a* to 8050*c* may be formed and separated apart at the gate pad unit 8014 and seven tap marks 8050*d* to 8050*j* are formed separated regularly at the data pad unit 8015.

The above unit LCD panel 8000 must be ground to have a sloped edge from the end END1 of the unit LCD panel 8000 to the grinding line R1, as shown in the expansion region EX1 of FIG. 207. The actual ground line of the unit LCD panel 8000 may have an error margin D1 from the grinding line R1. When the actual ground line is outside the error margin D1, it is determined that the grinding is defective.

In another embodiment of the present invention, a plurality of patterns 8120*a* to 8120*o* for detecting a grinding amount are formed to be apart at the region of the error margin D1 including the grinding line R1 in the middle of the error margin region.

The patterns 8120*a* to 8120*o* for detecting a grinding amount are examined by naked eyes by dividing the distance, such as about ±100 μm from the grinding line R1 in the middle of the error margin region D1, into a constant scale. Thus, the patterns may have a width of about 200 μm.

For instance, as shown in FIG. 208, when three patterns 8120*g* to 8120*i* for detecting a grinding amount are formed at the central portion, the first region is in the direction to the end END1 of the unit LCD panel 8000 and the second region is in the direction to the tap mark 8050*j*. The first and second regions are divided by the grinding line R1.

The first region having the patterns 8120*b* to 8120*f* for detecting a grinding amount is formed to be closer to the tap mark 8050*j*. The pattern 8120*a*, which is the same as the pattern 8120*b*, is formed at the furthermost from the central patterns 8120*g* to 8120*i*.

The second region having the patterns 8120*j* to 8120*n* for detecting a grinding amount is formed to be closer to the end END1 of the unit LCD panel 8000 at a constant distance level. Similarly, the pattern 8120*o*, which is the same as the pattern 8120*n*, is formed at the furthermost from the central patterns 8120*g* to 8120*i*.

The patterns 8120*a* and 8120*o* formed at the furthermost outside are formed for a reliable decision on grinding failure while the three patterns 8120*g* to 8120*i* formed at the central portion are to determine whether the actual ground line and the grinding line R1 of the unit LCD panel 8000 are identical with each other.

The actual ground amount of the unit LCD panel 8000 may be detected by a plurality of displaying marks. For example, numerical symbols such as (−10, −8, −6, −4, −2, −0, 2, 4, 6, 8, 10) may be used at a constant scale at the marginal portion of the region where the tap mark 8050*j* is formed corresponding to the patterns 8120*a* to 8120*o*. If the error margin D1 is about ±100 μm from the grinding line R1, the scale of the number (−10, −8, −6, −4, −2, −0, 2, 4, 6, 8, 10) is about 10 μm.

In accordance with this embodiment of the present invention, it can be determined whether the actual ground line of the unit LCD panel 8000 is beyond the error margin D1 through the examination with naked eyes.

For example, when the patterns 8120*a* and 8120*b* at the side marginal portion are not observed and the patterns 8120*a* to 8120*o* of the completed unit LCD panel 8000 are observed, it is determined to be defective because grinding is excessive. Conversely, when the patterns 8120*a* and 8120*o* at the other side marginal portion are not ground at all, it is determined to be defective because more grinding is needed.

The actual ground line and the grinding line R1 of the unit LCD panel 8000 may be checked by the examination with naked eyes. Moreover, the actual ground amount of the unit LCD panel 8000 may be detected within an error margin of about 20 μm by checking the numbers (−10, −8, −6, −4, −2, −0, 2, 4, 6, 8, 10) corresponding to the patterns 8120*a* to 8120*o* with a high magnifying power camera.

The error margin of about 20 μm may be reduced when the divided region is formed to have more patterns 8120*a* to 8120*o*, thereby forming more minute scales.

Therefore, when the error margin D1 is initially set to be about ±100 μm from the grinding line R1 and then changed to about ±80 μm, an operation can still be performed by checking the numbers (−10, −8, −6, −4, −2, −0, 2, 4, 6, 8, 10) corresponding to the patterns 8120*a* to 8120*o* with a high magnifying power camera according to the second embodiment of the present invention.

Therefore, according to the present invention, productivity is improved because the operator does not have to take out the unit LCD panel from the production line for examining the grinding amount of the cut unit LCD panel to measure the grinding amount. Also, since a measuring apparatus is not required, installing cost and maintaining and repairing costs are reduced.

Moreover, since the grinding failure for all unit LCD panels can be determined by a simple examination with naked eyes, reliability of the examination is improved unlike the conventional method requiring to take out the unit LCD panel for a period of time.

Conventionally, when a grinding failure occurs, the fabrication process must be stopped to examine the entire panel including both the sampled and unsampled panels. Therefore, some completed unit panels may have to be disposed due to the grinding failures. Accordingly, there is a significant waste of raw materials and time. However, the present invention prevents the above problems by inspecting the entire unit on the manufacturing line.

By using the pattern for deciding a grinding amount of the LCD panel and the method for detecting a grinding failure using the same, the detecting process is performed without any difficulty when the error margin becomes narrow, because the actual ground amount of the unit LCD panel is detected with the numbers corresponding to the pattern for judging the grinding amount.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A device for fabricating a liquid crystal display device, comprising:

- a liquid crystal dispensing device for dispensing liquid crystal in a predetermined dropping pattern onto one of a first and second substrates, wherein a first distance between adjacent one of liquid crystal drops along a first direction is different than a second distance between adjacent ones of liquid crystal drops along a second direction;
- a sealant applicator for applying sealant onto one of the first and second substrates;
- a bonding unit for bonding the first and second substrates to each other with the liquid crystal therebetween;
- a sealant curing device for curing the sealant after the first and second substrates have been bonded;
- a cutting device for cutting the bonded first and second substrates into unit liquid crystal panels; and
- a grinder for grinding edges of the unit liquid crystal panels, wherein the liquid crystal dispensing device includes:

- a single dropping amount calculation unit that calculates a single amount of liquid crystal to be dispensed within each liquid crystal drop;
- a dropping number calculation unit that calculates a number of liquid crystal drops on the substrate;
- a drop position calculation unit that calculates positions of liquid crystal drops on the one of the first and second substrates; and
- a dispensing pattern decision unit that determines the dispensing pattern of the liquid crystal drops.

2. The device according to claim 1, wherein the first distance is greater than the second distance.

3. The device according to claim 1, wherein a distance adjacent ones of the liquid crystal drops is about 8 to about 17 mm.

* * * * *